United States Patent
Eibl

(10) Patent No.: US 10,105,796 B2
(45) Date of Patent: Oct. 23, 2018

(54) CHROMIUM FREE AND LOW-CHROMIUM WEAR RESISTANT ALLOYS

(71) Applicant: Scoperta Inc., San Diego, CA (US)

(72) Inventor: Cameron Eibl, La Jolla, CA (US)

(73) Assignee: Scoperta, Inc., San Diego, CA (US)

( * ) Notice: Subject to any disclaimer, the term of this patent is extended or adjusted under 35 U.S.C. 154(b) by 0 days.

(21) Appl. No.: 15/254,668

(22) Filed: Sep. 1, 2016

(65) Prior Publication Data

US 2017/0066090 A1 Mar. 9, 2017

Related U.S. Application Data

(60) Provisional application No. 62/214,485, filed on Sep. 4, 2015, provisional application No. 62/311,507, filed
(Continued)

(51) Int. Cl.
| | |
|---|---|
| C22C 37/00 | (2006.01) |
| C22C 37/10 | (2006.01) |
| C22C 38/02 | (2006.01) |
| C22C 38/12 | (2006.01) |
| C22C 38/54 | (2006.01) |
| B23K 35/22 | (2006.01) |
| B23K 35/30 | (2006.01) |
| C21D 9/50 | (2006.01) |
| C22C 37/08 | (2006.01) |

(Continued)

(52) U.S. Cl.
CPC .......... *B23K 35/3093* (2013.01); *C21D 9/50* (2013.01); *C22C 37/08* (2013.01); *C22C 37/10* (2013.01); *C22C 38/02* (2013.01); *C22C 38/04* (2013.01); *C22C 38/08* (2013.01); *C22C 38/12* (2013.01); *C22C 38/54* (2013.01)

(58) Field of Classification Search
None
See application file for complete search history.

(56) References Cited

U.S. PATENT DOCUMENTS

| 2,043,952 A | 6/1936 | Ffield |
| 2,156,306 A | 5/1939 | Rapatz |

(Continued)

FOREIGN PATENT DOCUMENTS

| CN | 102233490 A | 11/2011 |
| CN | 102357750 A | 2/2012 |

(Continued)

OTHER PUBLICATIONS

Machine-English translation of JP 63-065056, Fujki Akira et al., dated Mar. 23, 1988.*

(Continued)

*Primary Examiner* — Deborah Yee
(74) *Attorney, Agent, or Firm* — Knobbe, Martens, Olson & Bear, LLP

(57) ABSTRACT

Disclosed herein are embodiments of hardfacing/hardbanding materials, alloys, or powder compositions that can have low chromium content or be chromium free. In some embodiments, the alloys can contain transition metal borides and borocarbides with a particular metallic component weight percentage. The disclosed alloys can have high hardness and ASTM G65 performance, making them advantageous for hardfacing/hardbanding applications.

20 Claims, 5 Drawing Sheets

Related U.S. Application Data on Mar. 22, 2016, provisional application No. 62/335,988, filed on May 13, 2016.

(51) Int. Cl.
  *C22C 38/04* (2006.01)
  *C22C 38/08* (2006.01)

(56) References Cited

U.S. PATENT DOCUMENTS

| | | | |
|---|---|---|---|
| 2,608,495 A | 8/1952 | Barry | |
| 2,873,187 A | 2/1959 | Dyrkaez et al. | |
| 2,936,229 A | 5/1960 | Shepard | |
| 3,024,137 A | 3/1962 | Witherell | |
| 3,113,021 A | 12/1963 | Witherell | |
| 3,181,970 A | 5/1965 | Witherell et al. | |
| 3,303,063 A | 2/1967 | Pietryka et al. | |
| 3,448,241 A | 6/1969 | Buckingham et al. | |
| 3,554,792 A | 1/1971 | Johnson | |
| 3,650,734 A | 3/1972 | Kantor et al. | |
| 3,843,359 A | 10/1974 | Fiene et al. | |
| 3,859,060 A | 1/1975 | Eiselstein et al. | |
| 3,942,954 A | 3/1976 | Frehn | |
| 3,975,612 A | 8/1976 | Nakazaki et al. | |
| 4,010,309 A | 3/1977 | Peterson | |
| 4,017,339 A | 4/1977 | Okuda et al. | |
| 4,042,383 A | 8/1977 | Petersen et al. | |
| 4,066,451 A | 1/1978 | Rudy | |
| 4,214,145 A | 7/1980 | Zvanut et al. | |
| 4,235,630 A | 11/1980 | Babu | |
| 4,255,709 A | 3/1981 | Zatsepium et al. | |
| 4,277,108 A | 7/1981 | Wallace | |
| 4,297,135 A | 10/1981 | Giessen et al. | |
| 4,318,733 A * | 3/1982 | Ray | B22F 9/008 419/33 |
| 4,365,994 A | 12/1982 | Ray | |
| 4,415,530 A | 11/1983 | Hunt | |
| 4,419,130 A | 12/1983 | Slaughter | |
| 4,576,653 A | 3/1986 | Ray | |
| 4,596,282 A | 6/1986 | Maddy et al. | |
| 4,606,977 A | 8/1986 | Dickson et al. | |
| 4,635,701 A | 1/1987 | Sare et al. | |
| 4,638,847 A * | 1/1987 | Day | B22D 27/00 164/122 |
| 4,639,576 A | 1/1987 | Shoemaker et al. | |
| 4,666,797 A | 5/1987 | Newman et al. | |
| 4,673,550 A | 6/1987 | Dallaire et al. | |
| 4,762,681 A | 8/1988 | Tassen et al. | |
| 4,803,045 A | 2/1989 | Ohriner et al. | |
| 4,822,415 A | 4/1989 | Dorfman et al. | |
| 4,919,728 A | 4/1990 | Kohl et al. | |
| 4,981,644 A | 1/1991 | Chang | |
| 5,094,812 A | 3/1992 | Dulmaine et al. | |
| 5,252,149 A | 10/1993 | Dolman | |
| 5,306,358 A | 4/1994 | Lai et al. | |
| 5,375,759 A | 12/1994 | Hiraishi et al. | |
| 5,567,251 A | 10/1996 | Peker et al. | |
| 5,570,636 A | 11/1996 | Lewis | |
| 5,618,451 A | 4/1997 | Ni | |
| 5,820,939 A | 10/1998 | Popoola et al. | |
| 5,858,558 A | 1/1999 | Zhao et al. | |
| 5,861,605 A | 1/1999 | Ogawa et al. | |
| 5,907,017 A | 5/1999 | Ober et al. | |
| 5,935,350 A | 8/1999 | Raghu et al. | |
| 5,942,289 A | 8/1999 | Jackson | |
| 5,988,302 A | 11/1999 | Sreshta et al. | |
| 6,117,493 A | 9/2000 | North | |
| 6,171,222 B1 | 1/2001 | Lakeland et al. | |
| 6,210,635 B1 | 4/2001 | Jackson et al. | |
| 6,232,000 B1 | 5/2001 | Singh et al. | |
| 6,326,582 B1 | 12/2001 | North | |
| 6,331,688 B1 | 12/2001 | Hallén et al. | |
| 6,332,936 B1 | 12/2001 | Hajaligo et al. | |
| 6,375,895 B1 | 4/2002 | Daemen | |
| 6,398,103 B2 | 6/2002 | Hasz et al. | |
| 6,441,334 B1 | 8/2002 | Aida et al. | |
| 6,582,126 B2 | 6/2003 | North | |
| 6,608,286 B2 | 8/2003 | Jiang | |
| 6,669,790 B1 | 12/2003 | Gundlach et al. | |
| 6,689,234 B2 | 2/2004 | Branagan | |
| 6,702,905 B1 | 3/2004 | Qiao et al. | |
| 6,702,906 B2 | 3/2004 | Ogawa et al. | |
| 6,750,430 B2 | 6/2004 | Kelly | |
| 7,052,561 B2 | 5/2006 | Lu et al. | |
| 7,219,727 B2 | 5/2007 | Slack et al. | |
| 7,285,151 B2 | 10/2007 | Sjodin et al. | |
| 7,361,411 B2 | 4/2008 | Daemen et al. | |
| 7,491,910 B2 | 2/2009 | Kapoor et al. | |
| 7,553,382 B2 | 6/2009 | Branagan et al. | |
| 7,569,286 B2 | 8/2009 | Daemen et al. | |
| 7,776,451 B2 | 8/2010 | Jiang et al. | |
| 7,935,198 B2 | 5/2011 | Branagan et al. | |
| 8,070,894 B2 | 12/2011 | Branagan | |
| 8,097,095 B2 | 1/2012 | Branagan | |
| 8,153,935 B2 | 4/2012 | Jang et al. | |
| 8,187,529 B2 | 5/2012 | Powell | |
| 8,187,725 B2 | 5/2012 | Kiser et al. | |
| 8,268,453 B2 | 9/2012 | Dallaire | |
| 8,474,541 B2 | 7/2013 | Branagan et al. | |
| 8,562,759 B2 | 10/2013 | Cheney et al. | |
| 8,562,760 B2 | 10/2013 | Cheney et al. | |
| 8,640,941 B2 | 2/2014 | Cheney | |
| 8,647,449 B2 | 2/2014 | Cheney et al. | |
| 8,658,934 B2 | 2/2014 | Branagan et al. | |
| 8,704,134 B2 | 4/2014 | Branagan et al. | |
| 8,801,872 B2 | 8/2014 | Wright et al. | |
| 8,808,471 B2 | 8/2014 | Wright et al. | |
| 8,973,806 B2 | 3/2015 | Cheney | |
| 9,174,293 B2 | 11/2015 | Lee | |
| 9,193,011 B2 | 11/2015 | Mars et al. | |
| 9,309,585 B2 | 4/2016 | Cheney et al. | |
| 2001/0019781 A1 | 9/2001 | Hasz | |
| 2002/0054972 A1 | 5/2002 | Charpentier et al. | |
| 2002/0148533 A1 | 10/2002 | Kim et al. | |
| 2004/0062677 A1 | 4/2004 | Chabenat et al. | |
| 2004/0079742 A1 | 4/2004 | Kelly | |
| 2004/0115086 A1 | 6/2004 | Chabenat et al. | |
| 2004/0206726 A1 | 10/2004 | Daemen et al. | |
| 2005/0047952 A1 | 3/2005 | Coleman | |
| 2005/0109431 A1 | 5/2005 | Kernan et al. | |
| 2006/0093752 A1 | 5/2006 | Darolia et al. | |
| 2006/0191606 A1 | 8/2006 | Ogawa et al. | |
| 2006/0260583 A1 | 11/2006 | Abi-Akar et al. | |
| 2007/0029295 A1 | 2/2007 | Branagan | |
| 2007/0090167 A1 | 4/2007 | Arjakine et al. | |
| 2007/0187369 A1 | 8/2007 | Menon et al. | |
| 2007/0253856 A1 | 11/2007 | Vecchio et al. | |
| 2007/0284018 A1 | 12/2007 | Hamano et al. | |
| 2008/0001115 A1 | 1/2008 | Qiao et al. | |
| 2008/0031769 A1 | 2/2008 | Yeh | |
| 2008/0053274 A1 * | 3/2008 | Branagan | C22C 38/02 75/254 |
| 2008/0149397 A1 | 6/2008 | Branagan | |
| 2008/0241580 A1 | 10/2008 | Kiser et al. | |
| 2008/0241584 A1 | 10/2008 | Daemen et al. | |
| 2009/0017328 A1 | 1/2009 | Katoh et al. | |
| 2009/0123765 A1 | 5/2009 | Branagan | |
| 2009/0258250 A1 | 10/2009 | Daemen et al. | |
| 2009/0285715 A1 | 11/2009 | Arjakine et al. | |
| 2010/0009089 A1 | 1/2010 | Junod et al. | |
| 2010/0044348 A1 | 2/2010 | Buchmann | |
| 2010/0101780 A1 | 4/2010 | Ballew et al. | |
| 2010/0155236 A1 | 6/2010 | Lee et al. | |
| 2010/0166594 A1 | 7/2010 | Hirata et al. | |
| 2010/0189588 A1 | 7/2010 | Kawatsu et al. | |
| 2010/0258217 A1 | 10/2010 | Kuehmann | |
| 2011/0004069 A1 | 1/2011 | Ochs et al. | |
| 2011/0064963 A1 | 3/2011 | Cheney et al. | |
| 2011/0139761 A1 | 6/2011 | Sugahara et al. | |
| 2011/0142713 A1 | 6/2011 | Kawasaki et al. | |
| 2011/0162612 A1 | 7/2011 | Qiao et al. | |
| 2011/0171485 A1 | 7/2011 | Kawamoto et al. | |
| 2011/0220415 A1 | 9/2011 | Jin et al. | |
| 2012/0055903 A1 | 3/2012 | Izutani et al. | |

(56) References Cited

U.S. PATENT DOCUMENTS

| | | |
|---|---|---|
| 2012/0103456 A1 | 5/2012 | Smith et al. |
| 2012/0156020 A1 | 6/2012 | Kottilingam et al. |
| 2012/0160363 A1 | 6/2012 | Jin et al. |
| 2012/0224992 A1* | 9/2012 | Cheney ............ B23K 35/3053 420/114 |
| 2012/0288400 A1 | 11/2012 | Hirata et al. |
| 2013/0094900 A1 | 4/2013 | Folkmann et al. |
| 2013/0167965 A1 | 4/2013 | Cheney et al. |
| 2013/0224516 A1 | 8/2013 | Kusinski et al. |
| 2013/0260177 A1 | 10/2013 | Wallin et al. |
| 2013/0266798 A1 | 10/2013 | Cheney |
| 2013/0294962 A1 | 11/2013 | Wallin et al. |
| 2014/0006531 A1 | 1/2014 | Sakiyama |
| 2014/0105780 A1 | 4/2014 | Cheney |
| 2014/0131338 A1 | 5/2014 | Postle |
| 2014/0171367 A1 | 6/2014 | Murthy et al. |
| 2014/0219859 A1 | 8/2014 | Cheney |
| 2014/0234154 A1 | 8/2014 | Cheney et al. |
| 2014/0248509 A1 | 9/2014 | Cheney |
| 2014/0263248 A1 | 9/2014 | Postle |
| 2015/0075681 A1 | 3/2015 | Wright et al. |
| 2015/0106035 A1 | 4/2015 | Vecchio et al. |
| 2015/0147591 A1 | 5/2015 | Cheney |
| 2015/0252631 A1 | 9/2015 | Miller |
| 2015/0275341 A1 | 10/2015 | Cheney |
| 2015/0284817 A1 | 10/2015 | Snyder et al. |
| 2015/0284829 A1 | 10/2015 | Cheney |
| 2015/0307968 A1 | 10/2015 | Mars et al. |
| 2015/0367454 A1 | 12/2015 | Cheney |
| 2016/0017463 A1 | 1/2016 | Cheney |
| 2016/0024621 A1 | 1/2016 | Cheney |
| 2016/0024624 A1 | 1/2016 | Cheney |
| 2016/0024628 A1 | 1/2016 | Cheney |
| 2016/0083830 A1 | 3/2016 | Cheney |
| 2016/0168670 A1 | 6/2016 | Cheney |
| 2016/0201169 A1 | 7/2016 | Vecchio |
| 2016/0201170 A1 | 7/2016 | Vecchio |
| 2016/0289803 A1 | 10/2016 | Cheney |

FOREIGN PATENT DOCUMENTS

| | | |
|---|---|---|
| DE | 27 54 437 | 7/1979 |
| DE | 33 20 513 | 12/1983 |
| DE | 42 02 828 | 8/1993 |
| EP | 0 365 884 | 5/1990 |
| EP | 1 338 663 | 8/2003 |
| EP | 2 305 415 | 8/2003 |
| EP | 1 857 204 | 11/2007 |
| EP | 2 778 247 | 9/2014 |
| EP | 2 563 942 | 10/2015 |
| EP | 3 055 802 | 8/2016 |
| GB | 2 153 846 A | 8/1985 |
| IN | MUMNP-2003-00842 | 4/2005 |
| JP | 58-132393 | 8/1983 |
| JP | 60-133996 A | 7/1985 |
| JP | 63-026205 A | 2/1988 |
| JP | 63-065056 * | 3/1988 |
| JP | 03-133593 A | 6/1991 |
| JP | 2012-000616 | 1/2012 |
| KR | 10-0935816 B1 | 1/2010 |
| TW | 200806801 A | 2/2008 |
| WO | WO 1984/000385 | 2/1984 |
| WO | WO 1984/004760 | 12/1984 |
| WO | WO 2006/086350 | 8/2006 |
| WO | WO 2008/011448 | 5/2008 |
| WO | WO 2010/044740 | 4/2010 |
| WO | WO 2011/035193 | 9/2010 |
| WO | WO 2011/021751 | 2/2011 |
| WO | WO 2011/071054 | 6/2011 |
| WO | WO 2011/158706 | 12/2011 |
| WO | WO/2012/037339 | 3/2012 |
| WO | WO/2012/129505 | 9/2012 |
| WO | WO 2013/101561 | 7/2013 |
| WO | WO/2013/13394 | 9/2013 |
| WO | WO 2014/059177 | 4/2014 |
| WO | WO 2014/081491 | 5/2014 |
| WO | WO 2014/114714 | 7/2014 |
| WO | WO 2014/114715 | 7/2014 |
| WO | WO 2014/127062 | 8/2014 |
| WO | WO 2015/081209 | 6/2015 |
| WO | WO 2015/157169 | 10/2015 |
| WO | WO 2015/183955 | 12/2015 |
| WO | WO 2015/191458 | 12/2015 |
| WO | WO 2016/014653 | 1/2016 |
| WO | WO 2016/014665 | 1/2016 |
| WO | WO 2016/014851 | 1/2016 |
| WO | WO 2016/044765 | 3/2016 |
| WO | WO 2016/100374 | 6/2016 |
| WO | WO 2016/112210 | 7/2016 |
| WO | WO 2016/112341 | 7/2016 |

OTHER PUBLICATIONS

Audouard, et al.: "Corrosion Performance and Field Experience With Super Duplex and Super Austenitic Stainless Steels in FGD Systems", Corrosion 2000; p. 4, table 2.

Branagan, et al.: Developing extreme hardness (>15GPa) in iron based nanocomosites, Composites Part A: Applied Science and Manufacturing, Elsevier Science Publishers B.V., Amsterdam, NL, vol. 33, No. 6, Jun. 1, 2002, pp. 855-859.

Chen et al.: "Characterization of Microstructure and Mechanical Properties of High Chromium Cast Irons Using SEM and Nanoindentation," JMEPEG 2015 (published online Oct. 30, 2014), vol. 24(1), pp. 98-105.

Cheney, et al.: "Development of quaternary Fe-based bulk metallic glasses," Materials Science and Engineering, vol. 492, No. 1-2, Sep. 25, 2008, pp. 230-235.

Cheney: Modeling the Glass Forming Ability of Metals. A Dissertation submitted in partial satisfaction of the Requirements for the degree of Doctor of Philosophy. University of California, San Diego. Dec. 2007.

Cr-C Phase Diagram [online], [retrieved on Jan. 27, 2015]. Retrieved from the Internet: http://www.azom.com/work/3ud2quvLOU9g4VBMjVEh_files/image002.gif.

Davis, Jr, ed. Stainless steels. ASM International, 1994; p. 447.

International Search Report and Written Opinion re PCT Application No. PCT/US2016/49889, dated Nov. 28, 2016.

Iron-Carbon (Fe—C) Phase diagram [online], [retrieved on Jan. 27, 2014]. Retrieved from the Internet: <URL:http://www.calphad.com/iron-carbon.html>.

Khalifa, et al.: "Effect of Mo—Fe substitution on glass forming ability, thermal stability, and hardness of Fe—C—B—Mo—Cr—W bulk amorphous allows," Materials Science and Engineering, vol. 490, No. 1-2, Aug. 25, 2008, pp. 221-228.

Miracle, D.B.: The efficient cluster packing model—An atomic structural model for metallic glasses, Acta Materialia vol. 54, Issue 16, Sep. 2006, pp. 4317-4336.

Mo-C Phase Diagram [online], [retrieved on Jan. 27, 2015]. Retrieved from the Internet: <URL: http://factsage.cn/fact/documentation/SGTE/C-Mo.JPG.

Nb-C Phase Diagram [online], [retrieved on Jan. 27, 2015]. Retrieved from the Internet: <URL: C.Crct.polymtl.ca/fact/documentation/Binary/C-Nb.JPG.

Tillack, et al.: "Selection of Nickel, Nickel-Copper, Nickel-Cromium, and Nickel-Chromium-Iron Allows", ASM Handbook, Welding, Brazing and Soldering, vol. 6, Dec. 1, 1993 (Dec. 1, 1993) pp. 586-592, XP008097120, p. 589.

Titanium-Boron (TiB) Phase Diagram [online], [retrieved on Jan. 27, 2015]. Retrieved from the internet<URL:http://www.calphad.com/titaniumboron.html>.

Yoo et al.: "The effect of boron on the wear behavior of iron-based hardfacing alloys for nuclear power plants valves," Journal of Nuclear Materials 352 (2006) 90-96.

* cited by examiner

CHROMIUM FREE AND LOW-CHROMIUM WEAR RESISTANT ALLOYS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

Embodiments of the disclosure relate generally to iron alloys having low or no chromium content.

Description of the Related Art

Abrasive and erosive wear is a major concern for operators in applications that involve sand, rock, or other hard media wearing away against a surface. Applications which see severe wear typically utilize materials of high hardness to resist material failure due to the severe wear. These materials typically contain carbides and/or borides as hard precipitates which resist abrasion and increase the bulk hardness of the material. These materials are often applied as a coating, known as hardfacing, through various welding processes or cast directly into a part.

The most commonly used wear resistant ferrous materials for casting and hardfacing contain chromium as an alloying addition. Chromium as an alloying element typically serves two purposes, improving hardenability and forming chromium containing carbides, borides, and/or borocarbides. Both these purposes improve the wear performance of the material. However, when an alloy containing chromium is cast or welded, carcinogenic hexavalent chromium fumes are released. The amount of chromium released is a largely function of the chromium content of the alloy with increasing chromium levels resulting in greater release. Hexavalent chromium levels released from these alloys commonly exceed standards, proposed standards, and guidelines set by OSHA, NIOSH, CARB, and other regulatory bodies. In areas that manufacture chromium bearing alloys, chromium levels frequently exceed EPA specified maximums. Recently, even lower acceptable safe levels have been proposed and new materials are needed that facilitate compliance with current and future laws and regulations.

U.S. Pat. Nos. 8,474,541 and 6,702,905, each of which is hereby incorporated by reference in its entirety, teach a chromium bearing Fe-based alloy which forms transition metal borides.

There have been some specific attempts at developing chromium free and wear resistant ferrous alloys. For example, U.S. Pub. No. 2013/0294962 ("Wallin"), hereby incorporated by reference in its entirety, describes a chromium free hardfacing consumable. The wear resistance of the alloys described in the application comes from a combination of niobium or titanium carbides and borides or borocarbides of which the metallic constituent comprises mostly iron.

Similarly, U.S. Pat. Nos. 7,569,286, 8,268,453, 4,673,550, 4,419,130, each of which is hereby incorporated by reference in its entirety, teach alloys, including chromium free alloys that rely on borides substantially for their wear resistance. These borides comprise predominantly Fe and Ti based borides.

U.S. Pat. No. 4,235,630 ("Babu") hereby incorporated by reference in its entirety, teaches a wear resistant alloy comprising a mixture of ferroboron and molybdenum. Babu teaches a volume and mole fraction of borides that exceeds the criteria described in this disclosure. Further Babu describes alloys where the matrix comprises substantial amounts of eutectic Fe—Mo intermetallics or iron borides.

SUMMARY

Embodiments of the present application include but are not limited to hardfacing/hardbanding materials, alloy or powder compositions used to make such hardfacing/hardbanding materials, methods of forming the hardfacing/hardbanding materials, and the components or substrates incorporating or protected by these hardfacing/hardbanding materials.

Disclosed herein are embodiments of a low chromium or chromium-free ferrous alloy comprising less than or equal to about 3 wt. % chromium, wherein the alloy is formed into or configured to form a material comprising, under equilibrium solidification conditions, a total mole fraction of transition metal borides and borocarbides of greater than or equal to about 5 wt. %, wherein a metallic component of the transition metal borides and borocarbides comprises greater than or equal to about 15 wt. % Ti+W+Mo+V.

In some embodiments a mole faction of isolated carbides, where the metallic component of the carbide comprises greater than 50 wt. % Vanadium, can be between 5 and 40%.

In some embodiments, the alloy can comprise less than or equal to about 0.5 wt. % chromium. In some embodiments, the alloy can comprise less than or equal to about 0.01 wt. % chromium. In some embodiments, the alloy can comprise no chromium.

In some embodiments, the material can comprise a total hard phase mole fraction at equilibrium at 1300K greater than or equal to about 10%, wherein the hard phase is selected from the group consisting of borides, borocarbides, nitrides, carbides, oxides, silicides, laves phases, aluminides, and carbonitrides. In some embodiments, a mole fraction of embrittling hard phase in the material can comprise $Fe_2B$, $M_{23}(C,B)_6$, $M_7(C,B)_3$, and $M_3(C,B)$ is less than or equal to about 10% when measured at a matrix solidus temperature, wherein M is greater than or equal to about 75 wt. % Fe.

In some embodiments, a FCC-BCC transition temperature of the material under equilibrium solidification conditions can be less than or equal to about 1300K. In some embodiments, a melt range of the material under equilibrium solidification conditions can be less than or equal to about 250 C, melt range being defined as the difference between a formation temperature of a first hard phase to solidify and a matrix liquidus temperature.

In some embodiments, the material can have a deposited hardness greater than or equal to about 55HRC. In some embodiments, a hardness of the material after austenitizing and quenching can be greater than or equal to about 55HRC. In some embodiments, a hardness of the material after austenitizing and quenching can be greater than or equal to about 60HRC.

In some embodiments, the material can comprise an alloy with a specified ASTM G65 performance. In some embodiments, the material can comprise an alloy with a specified ASTM G65 performance after an austenitizing, quenching, and tempering process.

In some embodiments, the alloy can be a powder. In some embodiments, the alloy can be formed into a hardfacing layer.

Also disclosed herein are embodiments of a low chromium or chromium free ferrous alloy comprising less than or equal to about 3 wt % chromium, wherein the alloy is formed into or configured to form a material comprising a total volume fraction of transition metal borides and borocarbides of between 5 and 50%, wherein a metallic component of the borides and borocarbides comprises greater than or equal to about 15 wt % Ti+W+Mo+V.

In some embodiments, the alloy can comprise less than or equal to about 0.5 wt % chromium. In some embodiments, the alloy can comprise less than or equal to about 0.01 wt % chromium. In some embodiments, the alloy can comprise no chromium.

In some embodiments, the total hard phase volume fraction of the material can be greater than or equal to about 10%, where hard phases are borides, borocarbides, nitrides, carbides, oxides, silicides, laves phases, aluminides, and carbonitrides. In some embodiments, the volume fraction of embrittling hard phase of the material can be less than or equal to about 10%, where embrittling hard phases comprise $M_{23}(C,B)_6$, $M_7(C,B)_3$, and $M_3(C,B)$ where M is greater than or equal to about 75 wt % Fe. In some embodiments, the material can have a volume fraction of isolated carbides greater than or equal to about 5%, where isolated carbides comprise MC type carbides comprising one or more of the following elements: V, Ti, Nb, Zr, Hf, W, Mo.

In some embodiments, the material can have an as deposited hardness greater than or equal to about 60HRC. In some embodiments, the material can have an ASTM G65 procedure A mass loss of less than or equal to about 0.16 g.

In some embodiments, the alloy can be a powder. In some embodiments, the alloy can be formed into a hardfacing layer.

Also disclosed herein are embodiments of a low chromium or chromium free alloy comprising, in weight percent with the balance iron and impurities, B: about 0.8 to about 4, C: about 0 to about 3, Cr: about 0 to about 3, Mo+W: about 2.1 to about 25, Ni: about 0 to about 5, and V: about 0 to about 20, wherein Nb, Ti, Zr, and/or Hf may be substituted for V at a 1:1 ratio so that a total amount of Nb, Ti, Zr, V, and Hf is between about 0 to about 20.

In some embodiments, the alloy can further comprise, in weight percent with the balance iron and impurities, B: about 0.9 to about 1.8, C: about 1.0 to about 2.2, Cr: about 0 to about 1.0, Mo: about 6.0 to about 14.0, Ni: about 0 to about 2, and V: about 6.0 to about 9.0, wherein Nb, Ti, Zr, and/or Hf may be substituted for V at a 1:1 ratio so that a total amount of Nb, Ti, Zr, V, and Hf is between about 6.0 to about 9.0. In some embodiments, the alloy can further comprise, in weight percent with the balance iron and impurities, B: about 0.95 to about 1.4, C: about 1.4 to about 2.0, Cr: about 0 to about 0.5, Mo: about 9.0 to about 14.0, Ni: about 0 to about 2, and V: about 6 to about 8.5, wherein Nb, Ti, Zr, and/or Hf may be substituted for V at a 1:1 ratio so that a total amount of Nb, Ti, Zr, V, and Hf is between about 6 and about 8.5. In some embodiments, the alloy can further comprise, in weight percent with the balance iron and impurities, B: about 1.1, C: about 1.7, Cr: about 0, Mo: about 9.5 to about 12, Ni: about 1 to about 2, and V: about 6.5 to about 8. In some embodiments, the alloy can comprise less than or equal to about 0.1 wt % chromium.

In some embodiments, the alloy can further comprise, in weight percent with the balance iron and impurities, B: about 0.3 to about 0.95, C: about 1.2 to about 2.1, Cr: about 0 to about 3, Mo: about 3 to about 9, Ni: about 0 to about 3, and V: about 4 to about 9.

In some embodiments, the alloy can further comprise, in weight percent with the balance iron and impurities: B: about 1.6 to about 2.2, C: about 2 to about 2.8, Cr: about 0 to about 3, Mn: about 0 to about 3, Mo: about 12.5 to about 19.5, Ni: about 0 to about 4; and V: about 8 to about 14. In some embodiments, the alloy can comprise less than about 1.5 wt. % chromium.

Also disclosed herein are embodiments of a low chromium or chromium free alloy described by ranges in chemistry that meet the thermodynamic and microstructural criteria elsewhere in this disclosure.

In some embodiments, the alloy can be configured to form a material having an as deposited hardness greater than or equal to about 55HRC. In some embodiments, the alloy can be configured to form a material having an ASTM G65 procedure A mass loss less than or equal to about 0.16 g.

In some embodiments, the alloy can be formed into a hardfacing layer. In some embodiments, the alloy can be a powder.

In some embodiments, the alloy can be formed into or configured to form a material comprising, under equilibrium solidification conditions, a total mole fraction of transition metal borides and borocarbides greater than or equal to about 5 wt. %, wherein a metallic component of the transition metal borides and borocarbides comprises greater than or equal to about 15 wt. % Ti+W+Mo+V. In some embodiments, the alloy can be formed into or configured to form a material comprising, under equilibrium solidification conditions, a total hard phase mole fraction greater than or equal to about 10%, wherein the hard phase is selected from the group consisting of borides, borocarbides, nitrides, carbides, oxides, silicides, laves phases, aluminides, and carbonitrides. In some embodiments, the alloy can be formed into or configured to form a material comprising, under equilibrium solidification conditions, a mole fraction of embrittling hard phase ($M_{23}(C,B)_6$, $M_7(C,B)_3$, and $M_3(C,B)$) less than or equal to about 10% when measured at a matrix solidus temperature, wherein M is greater than or equal to about 75 wt. % Fe. In some embodiments, the alloy is formed into or configured to form a material comprising, under equilibrium solidification conditions, a mole fraction of isolated carbides in the material greater than or equal to about 5%, where isolated carbides comprise MC type carbides that comprise one or more of the following elements: V, Ti, Nb, Zr, Hf, W, Mo. In some embodiments, the alloy can be formed into or configured to form a material comprising, under equilibrium solidification conditions, having a FCC-BCC transition temperature less than or equal to about 1300K. In some embodiments, the alloy can be formed into or configured to form a material comprising, under equilibrium solidification conditions, a melt range of less than or equal to about 250 C, melt range being defined as the difference between a formation temperature of a first hard phase to solidify and a matrix liquidus temperature Also disclosed herein are embodiments of a method of forming a hardfacing layer comprising thermally applying a layer of the alloy of any one of the preceding claims.

Also disclosed herein are embodiments of a low chromium or chromium-free ferrous hardfacing layer comprising less than or equal to about 3 wt. % chromium, and a total mole fraction of transition metal borides and borocarbides of greater than or equal to about 5 wt. %, wherein a metallic component of the transition metal borides and borocarbides comprises greater than or equal to about 15 wt. % Ti+W+Mo+V. Also disclosed herein are embodiments of a low chromium or chromium free ferrous hardfacing layer comprising less than or equal to about 3 wt % chromium, and a total volume fraction of transition metal borides and borocarbides of greater than or equal to about 5%, wherein a metallic component of the borides and borocarbides comprises greater than or equal to about 15 wt % Ti+W+Mo+V.

Disclosed herein are embodiments of a low chromium or chromium-free ferrous alloy comprising less than or equal to about 3 wt. % chromium, wherein the alloy is formed into or configured to form a material comprising, under equilibrium solidification conditions a total mole fraction of transition metal borides and borocarbides of between about 5 and about 50%, wherein a metallic portion of the transition metal borides and borocarbides comprises greater than or equal to about 15 wt. % W+Mo, and a mole fraction of isolated carbides in the material between about 5 and about 40%, wherein isolated carbides are defined as MC type carbides having one or more of the following elements: V, Ti, Nb, Zr, Hf, W, Mo.

In some embodiments, the isolated carbides can have a metallic component greater than or equal to about 50 wt. % vanadium. In some embodiments, the alloy can comprise less than or equal to about 0.01 wt. % chromium. In some embodiments, a mole fraction of an embrittling hard phase in the material comprising $Fe_2B$, $M_{23}(C,B)_6$, $M_7(C,B)_3$, and $M_3(C,B)$ can be less than or equal to about 10% when measured at a matrix solidus temperature, wherein M is greater than or equal to about 75 wt. % Fe. In some embodiments, the metallic portion of the transition metal borides and borocarbides can comprise greater than or equal to about 35 wt. % W+Mo. In some embodiments, an FCC-BCC transition temperature of the material under equilibrium solidification conditions can be less than or equal to about 1300K. In some embodiments, a melt range of the material under equilibrium solidification conditions can be less than or equal to about 250° C., melt range being defined as the difference between a formation temperature of a first hard phase to solidify and a matrix liquidus temperature. In some embodiments, the material can have a deposited hardness greater than or equal to about 55HRC, and wherein a hardness of the material after austenitizing and quenching is greater than or equal to about 55HRC.

In some embodiments, the disclosed alloy can be manufactured into a powder, wire, casting, and/or hardfacing layer for wear protection.

In some embodiments, the alloy can comprise, in weight percent, Fe and B: about 0.5 to about 4, C: about 0 to about 3, Cr: about 0 to about 3, Mo+W: about 2.1 to about 25, and V: about 0 to about 20, wherein Ti, Nb, Ta, Zr, and/or Hf may be substituted for V at about a 1:1 molar ratio, and wherein a weight ratio of Mo+1.9*W to B is between 6 and 10.25. In some embodiments, the alloy can comprise, in weight percent, Fe and B: 1.64, C: 2, Mo: 13.6, V: 8.5, B: 1.8, C: 2.2, Mo: 15, V: 9.35, B: 2.2, C: 2.8, Mo: 17.7, V: 12, B: 2.05, C: 2.6, Mo: 16.3, V: 11.1, B: 1.1, C: 2.85, Mo: 10, V: 11.7, B: 0.95, C: 2.45, Mo: 8.6, V: 10, B: 1.64, C: 2, Mn: 1, Mo: 13.6, Ni: 1.3, Si: 0.5 V: 8.5, B: 1.8, C: 2.2, Mn: 1, Mo: 15, Ni: 1.5, Si: 0.5, V: 9.35, B: 2.2, C: 2.8, Mn: 1, Mo: 17.7, Ni: 1.7; Si: 0.5, V12, B: 2.05, C: 2.6, Mn: 1, Mo: 16.3, Ni: 1.6, Si: 0.5, V11.1, B: 1.1, C: 2.85, Cr: 1, Mn: 1.2, Mo: 10, Ni: 1.4, Si: 0.6, V11.7, B: 0.95, C: 2.45, Cr: 0.8, Mn: 1, Mo: 8.6, Ni: 1.2, Si: 0.5, V: 10, B: 2.0, C: 2.8, Mo: 18, V: 13, B: 2.0, C: 2.8, Mo: 18, V: 11.5, B: 1.85, C: 2.6, Mo: 18, V: 12, B: 2.0, C: 2.8, Mn: 0.5, Mo: 18, Ni: 1.5, Si: 0.5, V: 13, B: 2.0, C: 2.8, Mn: 0.5, Mo: 18, Ni: 1.5, Si: 0.5, V: 11.5. B: 1.85, C: 2.6, Mn: 0.5, Mo: 18, Ni: 1.5, Si: 0.5, V: 12, or B: 0.65, C: 1.7, Cr: 0.5, Mn: 0.7, Mo: 6, Ni: 0.8, Si: 0.4, V: 7, wherein Ti, Nb, Ta, Zr, and/or Hf may be substituted for V at about a 1:1 molar ratio, and wherein W may be substituted for Mo at about a 1:1 molar ratio.

Also disclosed herein is Mining equipment which can incorporate the alloy disclosed herein for wear protection. In some embodiments, the mining equipment can comprise ground engaging tools, work tools, lip shrouds, cutting edges, blades, wear plates, and comminution equipment.

Further disclosed herein are embodiments of a low chromium or chromium free ferrous alloy comprising less than or equal to about 3 wt. % chromium, wherein the alloy is formed into or configured to form a material comprising a total volume fraction of transition metal borides and borocarbides of between about 5 and about 50%, wherein a metallic portion of the transition metal borides and borocarbides comprises greater than or equal to about 15 wt. % W+Mo, and a volume fraction of isolated carbides in the material between about 5 and about 40%, wherein isolated carbides are defined as MC type carbides that comprise one or more of the following elements: V, Ti, Nb, Zr, Hf, W, Mo.

In some embodiments, the MC type carbides can have a metallic component greater than or equal to about 50 wt. % vanadium. In some embodiments, the alloy can comprise less than or equal to about 0.01 wt. % chromium. In some embodiments, a volume fraction of embrittling hard phase of the material can be less than or equal to about 10%, where embrittling hard phases comprise $Fe_2B$, $M_{23}(C,B)_6$, $M_7(C,B)_3$, and $M_3(C,B)$ where M is greater than or equal to about 75 wt. % Fe. In some embodiments, the material can have a deposited hardness greater than or equal to about 55HRC, and wherein a hardness of the material after austenitizing and quenching is greater than or equal to about 55HRC.

In some embodiments, the alloy can comprise, in weight percent, Fe and B: about 0.5 to about 4, C: about 0 to about 3, Cr: about 0 to about 3, Mo+W: about 2.1 to about 25, and V: about 0 to about 20, wherein Ti, Nb, Ta, Zr, and/or Hf may be substituted for V at about a 1:1 molar ratio, and wherein a weight ratio of Mo+1.9*W to B is between 6 and 10.25.

In some embodiments, the alloy can comprise, in weight percent, Fe and B: 1.64, C: 2, Mo: 13.6, V: 8.5, B: 1.8, C: 2.2, Mo: 15, V: 9.35, B: 2.2, C: 2.8, Mo: 17.7, V: 12, B: 2.05, C: 2.6, Mo: 16.3, V: 11.1, B: 1.1, C: 2.85, Mo: 10, V: 11.7, B: 0.95, C: 2.45, Mo: 8.6, V: 10, B: 1.64, C: 2, Mn: 1, Mo: 13.6, Ni: 1.3, Si: 0.5, V: 8.5, B: 1.8, C: 2.2, Mn: 1, Mo: 15, Ni: 1.5, Si: 0.5, V: 9.35, B: 2.2, C: 2.8, Mn: 1, Mo: 17.7, Ni: 1.7; Si: 0.5, V12, B: 2.05, C: 2.6, Mn: 1, Mo: 16.3, Ni: 1.6, Si: 0.5, V11.1, B: 1.1, C: 2.85, Cr: 1, Mn: 1.2, Mo: 10, Ni: 1.4, Si: 0.6, V11.7, B: 0.95, C: 2.45, Cr: 0.8, Mn: 1, Mo: 8.6, Ni: 1.2, Si: 0.5, V: 10, B: 2.0, C: 2.8, Mo: 18, V: 13, B: 2.0, C: 2.8, Mo: 18, V: 11.5, B: 1.85, C: 2.6, Mo: 18, V: 12, B: 2.0, C: 2.8, Mn: 0.5, Mo: 18, Ni: 1.5, Si: 0.5, V: 13, B: 2.0, C: 2.8, Mn: 0.5, Mo: 18, Ni: 1.5, Si: 0.5, V: 11.5. B: 1.85, C: 2.6, Mn: 0.5, Mo: 18, Ni: 1.5, Si: 0.5, V: 12, or B: 0.65, C: 1.7, Cr: 0.5, Mn: 0.7, Mo: 6, Ni: 0.8, Si: 0.4, V: 7, wherein Ti, Nb, Ta, Zr, and/or Hf may be substituted for V at about a 1:1 molar ratio, and wherein W may be substituted for Mo at about a 1:1 molar ratio.

Further disclosed herein are embodiments of a low chromium or chromium free alloy comprising, in weight percent, Fe an, B: about 0.5 to about 4, C: about 0 to about 3, Cr: about 0 to about 3, Mo+W: about 2.1 to about 25, and V: about 0 to about 20, wherein a weight ratio of Mo+1.9*W to B is between 6 and 10.25, and wherein Ti, Nb, Ta, Zr, and/or Hf may be substituted for V at about a 1:1 molar ratio.

In some embodiments, the alloy can comprise, in weight percent, Fe and B: about 0.6 to about 2.4, C: about 1.6 to about 3, Mo: about 5.5 to about 20, and V: about 6.5 to about 14. In some embodiments, the alloy can further comprise, in weight percent, Mn: about 0 to about 3, Ni: about 0 to about 3, and Si: about 0 to about 1.5.

In some embodiments, the alloy can comprise, in weight percent, Fe and B: 1.64, C: 2, Mo: 13.6, V: 8.5, B: 1.8, C: 2.2, Mo: 15, V: 9.35, B: 2.2, C: 2.8, Mo: 17.7, V: 12, B: 2.05, C: 2.6, Mo: 16.3, V: 11.1, B: 1.1, C: 2.85, Mo: 10, V: 11.7, B: 0.95, C: 2.45, Mo: 8.6, V: 10, B: 0.65, C: 1.7, Mo: 6, V: 7, B: 1.64, C: 2, Mn: 1, Mo: 13.6, Ni: 1.3, Si: 0.5 V: 8.5, B: 1.8, C: 2.2, Mn: 1, Mo: 15, Ni: 1.5, Si: 0.5, V: 9.35, B: 2.2, C: 2.8, Mn: 1, Mo: 17.7, Ni: 1.7; Si: 0.5, V12, B: 2.05, C: 2.6, Mn: 1, Mo: 16.3, Ni: 1.6, Si: 0.5, V11.1, B: 1.1, C: 2.85, Cr: 1, Mn: 1.2, Mo: 10, Ni: 1.4, Si: 0.6, V11.7, B: 0.95, C: 2.45, Cr: 0.8, Mn: 1, Mo: 8.6, Ni: 1.2, Si: 0.5, V10, B: 0.65, C: 1.7, Cr: 0.5, Mn 0.7, Ni: 0.8, Si: 0.4, Mo: 6, V: 7, B: 2.0, C: 2.8, Mo: 18, V: 13, B: 2.0, C: 2.8, Mo: 18, V: 11.5, B: 1.85, C: 2.6, Mo: 18, V: 12, B: 2.0, C: 2.8, Mn: 0.5, Mo: 18, Ni: 1.5, Si: 0.5, V: 13, B: 2.0, C: 2.8, Mn: 0.5, Mo: 18, Ni: 1.5, Si: 0.5, V: 11.5, B: 1.85, C: 2.6, Mn: 0.5, Mo: 18, Ni: 1.5, Si: 0.5, V: 12, or B: 0.65, C: 1.7, Cr: 0.5, Mn: 0.7, Mo: 6, Ni: 0.8, Si: 0.4, V: 7, wherein Ti, Nb, Ta, Zr, and/or Hf may be substituted for V at about a 1:1 molar ratio, and wherein W may be substituted for Mo at about a 1:1 molar ratio.

DETAILED DESCRIPTION

Figure 1:
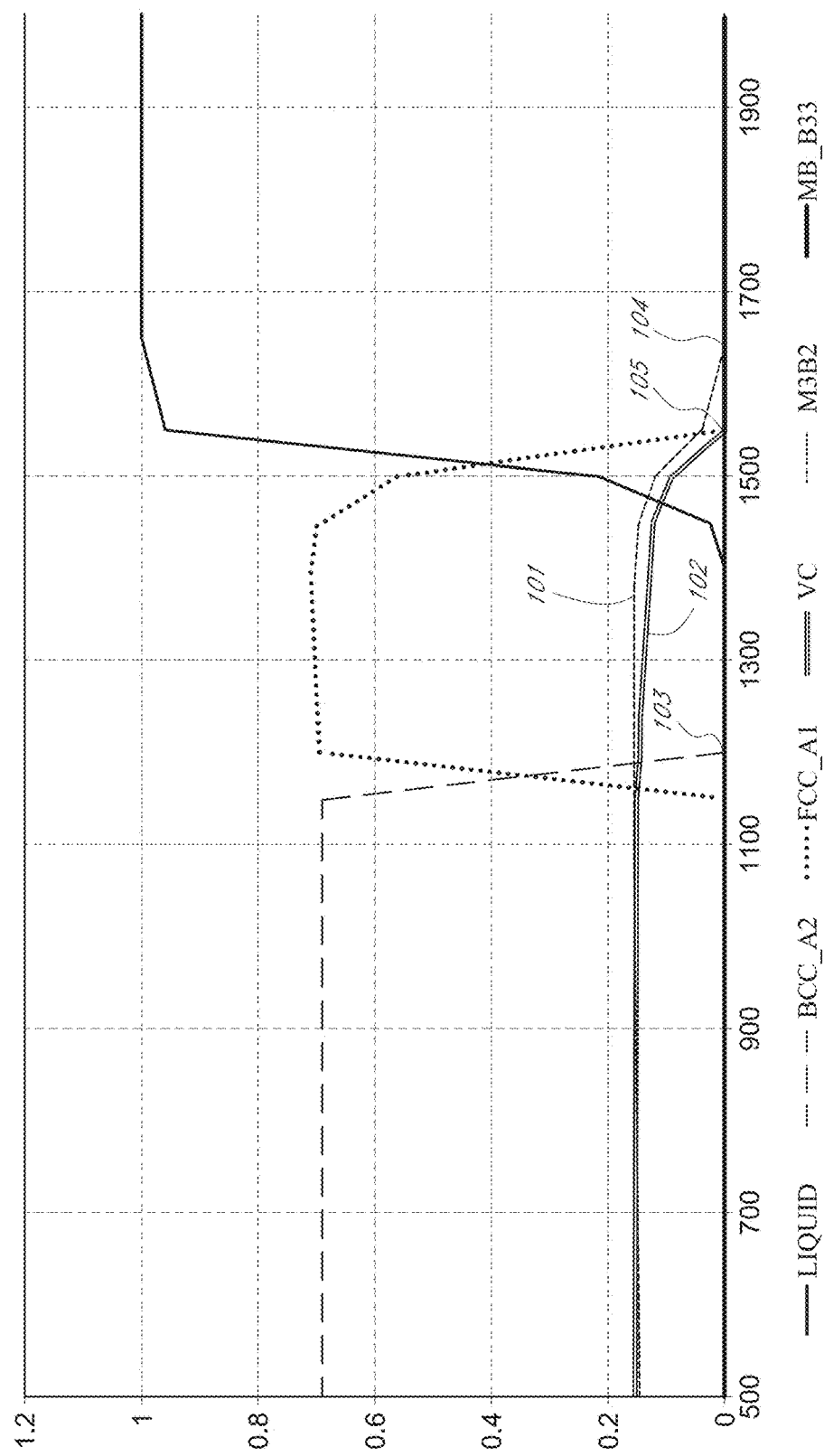
FIG. 1 shows an example equilibrium solidification diagram of an embodiment of a disclosed alloy (X1).

This disclosure describes embodiments of ferrous alloys that can provide the same or better wear resistance compared to chromium bearing materials, with no or minimal amounts of chromium. Specifically, embodiments of the alloys described herein can form complex eutectic borides and/or borocarbides that contain a significant portion of tungsten and/or molybdenum in a hard ferrous matrix, which makes them suitable as hardbanding/hardfacing alloys, while having no or low levels of chromium. Additionally these alloys can form isolated carbides of the MC type which add to their wear resistance with little reduction in impact resistance or toughness.

Further, embodiments of alloys discussed herein specifically describe alloys that avoid the formation of intermetallics or iron borides for wear performance. Instead, alloys in embodiments of this disclosure derive their wear performance from borides and/or borocarbides of which the metallic component comprises a substantial portion of tungsten and/or molybdenum. These iron borides are often undesirable for several reasons. Iron borides are typically substantially softer than borides of molybdenum and/or tungsten, reducing wear performance for a given phase fraction of boride. Additionally, they tend to form a needle like morphology, especially when present as a hypereutectic phase, reducing toughness and impact resistance. Titanium boride containing alloys often have poor weldability and significant oxide inclusions or porosity because titanium oxidizes very readily at the high temperatures seen during welding or other processing steps. Accordingly, some embodiments alloys described in this disclosure may not rely on titanium for wear resistance.

As disclosed herein, the terms hardbanding/hardfacing alloys generally refer to a class of materials which are deposited onto a substrate for the purpose of producing a hard layer resistant to various wear mechanisms: abrasion, impact, erosion, gouging, etc. Embodiments of the disclosure can relate to hardfacing/hardfacing layers and components protected by hardfacing/hardfacing layers made of the alloys described herein. Alloys described in this disclosure relate generally to wear resistant materials. These alloys may be used as a surface coating or processed to create a bulk material via casting, sintering, hot pressing, forging, or any other manufacturing process used to manufacture metallic components.

As disclosed herein, the term alloy can refer to the chemical composition forming the powder disclosed within, the powder itself, and the composition of the metal component formed by the heating and/or deposition of the powder. Further, the alloy can be a wire, casting, or other bulk alloy.

In some embodiments, computational metallurgy can be used to explore alloy compositional ranges where the morphology, phase fraction, and composition of phases can be controlled to achieve a specific microstructure and performance. The Fe—B—C—W—Mo system is sufficiently complex that controlling the fraction, type, composition, and morphology of phases is not obvious even to one skilled in the art. With the addition of one or more of the following elements: V, Ti, Zr, Hf, Si, Mn, Ni, Nb this becomes even more challenging. With computational metallurgy, the thermodynamic characteristics and, as a result, the microstructure and physical properties of alloys containing these elements can be closely controlled.

Metal Alloy Composition:

Embodiments of the disclosure can be defined by their particular metal alloy composition. As mentioned, embodiments of alloys disclosed herein can have no or limited chromium content. A limit is placed on the level of chromium in the alloy for at least these reasons: 1) Chromium free alloys may be applied as a deposit over chromium bearing materials resulting the incorporation of chromium in the alloy due to dilution. The chromium fumes released from such a process will still be less than those released from a higher chromium deposit, 2) Low levels of chromium may be incorporated into the alloy and still provide a significant reduction in chromium emissions compared to a standard alloy. This reduction may be enough to meet at least the following regulatory standards: OSHA-1910.1026, 1915.1026, 1926.1026, the entirety of each of which is hereby incorporated by reference, and 3) Unintentional chromium impurities may be incorporated into an alloy via various pathways.

In some embodiments, low chromium alloys can comprise ≤3 wt % (or ≤about 3 wt %) chromium. In some embodiments, low chromium alloys can comprise ≤2 wt % (or ≤about 2 wt %) chromium. In some embodiments, low chromium alloys can comprise ≤1.5 wt % (or ≤about 1.5 wt %) chromium. In some embodiments, low chromium alloys can comprise ≤1 wt % (or ≤about 1 wt %) chromium. In some embodiments, low chromium alloys can comprise ≤0.5 wt % (or ≤about 0.5 wt %) chromium.

In some embodiments, chromium free alloys can comprise ≤0.5 wt % (or ≤about 0.5 wt %) chromium. In some embodiments, chromium free alloys can comprise ≤0.25 wt % (or ≤0.25 wt %) chromium. In some embodiments, chromium free alloys can comprise ≤0.1 wt % (or ≤0.1 wt %) chromium. In some embodiments, chromium free alloys can comprise ≤0.05 wt % (or ≤0.05 wt %) chromium. In some embodiments, chromium free alloys can comprise ≤0.01 wt % (or ≤0.01 wt %) chromium. In some embodiments, chromium free alloys can comprise 0 wt % (or about 0 wt %) chromium.

In some embodiments, the alloy with low or no chromium can be described by specific compositions, in weight % with Fe making the balance. Alloys presented in Table 1 have been identified using computational metallurgy and experimentally manufactured successfully. In some embodiments, the alloys of Table 1 represent a final weld chemistry. These alloys meet the specific thermodynamic and microstructural embodiments described in this disclosure. Included are hardness and ASTM G65 procedure A wear testing results which are further discussed below.

Mo+W: 2.1-25 (or about 2.1 to about 25);
Ni: 0-5 (or about 0 to about 5);
V: 0-20 (or about 0 to about 20);
or
B: 0.5-4 (or about 0.5 to about 4);
C: 0-3 (or about 0 to about 3);
Cr: 0-3 (or about 0 to about 3);
Mo+W: 2.1-25 (or about 2.1 to about 25);
V: 0-20 (or about 0 to about 20);

In some embodiments, titanium, niobium, zirconium, tantalum, and/or hafnium can be substituted in a 1:1 (or a near 1:1 or an about 1:1) mole ratio for vanadium. In some embodiments, the total amount of vanadium, titanium, niobium, zirconium, tantalum, and/or hafnium is between 0-20 (or about 0 to about 20). These elements are all strong carbide/boride formers and can be used interchangeably to further refine the microstructural morphology and wear performance.

TABLE 1

Alloy Composition of Manufactured Ingots in wt. % with Fe Balance

|  | B | C | Cr | Mn | Mo | Ni | Ti | Si | V | HRC | G65 Mass Loss |
|---|---|---|---|---|---|---|---|---|---|---|---|
| X1 | 1.3 | 1.6 |  |  | 11 |  |  |  | 8 | 67 |  |
| MW(X1)-1 | 1.38 | 1.6 |  |  | 13.4 |  |  |  | 9.02 | 52 |  |
| X1-1 | 1.49 | 1.72 |  |  | 13.2 |  |  |  | 7.5 | 60.8 |  |
| X1-2 | 1.64 | 1.9 |  |  | 16.1 |  |  |  | 9.97 | 66.2 | 0.064 |
| X1-3 | 1.33 | 1.59 |  |  | 12.4 |  |  |  | 8.1 | 65 |  |
| X1-4 | 1.50 | 2.02 |  |  | 13.20 |  |  |  | 7.28 | 59.4 |  |
| X1-5 | 1.48 | 2.00 |  |  | 13.20 |  |  |  | 6.42 | 66.2 |  |
| X2 | 1.47 | 1.68 |  |  | 13.4 | 1.50 |  |  | 7.75 | 68 | 0.068 |
| X3 | 1.48 | 2.00 |  |  | 13.20 |  | 1 |  | 6.42 | 68 |  |
| X2A | 1.85 | 2.15 |  |  | 15.25 | 1.5 |  |  | 10.5 | 58 | 0.123 |
| X2B | 1.9 | 2.4 |  |  | 15.25 | 1.5 |  |  | 10.5 | 62 | 0.086 |
| X2C | 2.1 | 2.5 |  | 1 | 17.7 | 1.5 |  | 0.5 | 12 | 63 | 0.050 |
| X2D | 2.2 | 2.8 |  | 1 | 17.7 | 1.5 |  | 0.5 | 12 | 63.5 | 0.068 |
| X4 | 1.60 | 2.00 |  | 0.50 | 12.00 | 1.50 | 4.00 | 0.50 | 4.00 | 65.2 |  |
| X5 | 1.40 | 1.80 |  | 0.50 | 12.00 | 1.50 | 1.00 | 0.50 | 7.00 | 68.2 |  |
| X6 | 1.40 | 2.20 |  | 0.50 | 12.00 | 1.50 | 7.00 | 0.50 |  | 62.4 |  |
| X7 | 1.40 | 1.80 |  | 0.50 | 12.00 | 1.50 | 7.00 | 0.50 |  | 49 |  |
| X8 | 2.00 | 2.80 |  | 0.50 | 18.00 | 1.50 | 4.00 | 0.50 | 12.00 | 69.2 |  |
| X9 | 1.00 | 1.90 |  | 0.50 | 9.90 | 1.00 | 1.00 | 0.50 | 7.20 |  |  |
| X10 | 1.10 | 1.80 |  | 0.50 | 9.90 | 1.00 | 7.00 | 0.50 | 7.20 |  |  |
| X11 | 1.4 | 2.5 |  | 1 | 14 | 1 |  | 0.5 | 10 |  |  |
| X12 | 1.6 | 2.5 |  | 1 | 14 | 1 |  | 0.5 | 10 |  |  |
| X14 | 1.7 | 1.1 |  | 1 | 14 | 1 |  | 0.5 | 4 |  |  |
| X15 | 0.4 | 2.8 |  | 1 | 4 | 1 |  | 0.5 | 12 |  |  |
| X4.1 | 0.85 | 1.5 | 0.7 | 0.35 | 8 | 0.7 | 5.5 | 0.35 |  |  |  |
| X5.1 | 0.85 | 1.7 | 0.7 | 0.35 | 8 | 0.7 | 5.5 | 0.35 |  |  |  |
| X6.1 | 0.55 | 1.5 |  | 2 | 6 |  |  | 0.5 | 7 | 62 |  |
| X7.1 | 0.65 | 1.7 |  | 2 | 6 |  |  | 0.5 | 7 | 62.7 |  |
| X18.1 | 0.65 | 1.7 | 2 | 0.7 | 6 |  |  | .4 | 7 | 63 |  |
| X19.1 | 0.65 | 1.7 | 0.5 | 0.7 | 6 |  | .8 | .4 | 7 | 63 |  |
| X20 | 2 | 2.8 |  | 0.5 | 18 | 1.5 |  | 0.5 | 11.5 |  |  |
| X21 | 2 | 2.8 |  | 0.5 | 18 | 1.5 |  | 0.5 | 13 |  |  |
| X22 | 1.8 | 2.2 |  | 1 | 15 | 1.5 |  | .5 | 9.35 |  |  |
| X23 | 1.85 | 2.6 |  | .5 | 18 | 1.5 |  | .5 | 12 |  |  |

In some embodiments, low or no chromium alloys can be described by a range in chemistry. This range may be used to describe both feedstock chemistries used to manufacture wire or powder or to describe a final alloy chemistry. For example, in some embodiments the alloys can be made from the following, in weight percent, with the balance iron, impurities, and chromium from dilution with a chromium bearing substrate:

B: 0.8-4 (or about 0.8 to about 4);
C: 0-3 (or about 0 to about 3);
Cr: 0-3 (or about 0 to about 3);

In some embodiments, an alloy can further comprise, by weight percent with iron as the balance:

B: 0.9-1.8 (or about 0.9 to about 1.8);
C: 1.0-2.2 (or about 1.0 to about 2.2);
Cr: 0-1.0 (or about 0 to about 1.0);
Mo: 6-14.0 (or about 6.0 to about 14.0);
Ni: 0-2 (or about 0 to about 2); and
V: 6.0-9.0 (or about 6.0 to about 9.0).

In some embodiments, an alloy can further comprise, by weight percent with iron as the balance:

B: 0.95-1.4 (or about 0.95 to about 1.4);
C: 1.4-2.0 (or about 1.4 to about 2.0);
Cr: 0-0.5 (or about 0 to about 0.5);
Mo: 9.0-14.0 (or about 9.0 to about 14.0);
Ni: 0-2 (or about 0 to about 2); and
V: 6.0-8.5 (or about 6.0 to about 8.5).

In some embodiments, an alloy can further comprise, by weight percent with iron as the balance:
B: 0.3-0.95 (or about 0.3 to about 0.95);
C: 1.2-2.1 (or about 1.2 to about 2.1);
Cr: 0-3 (or about 0 to about 3);
Mo: 3.5-9.0 (or about 3.5 to about 9.0);
Ni: 0-3 (or about 0 to about 3); and
V: 4.0-9 (or about 4.0 to about 9).

In some embodiments, an alloy can further comprise, by weight percent with iron as the balance:
B: 1.6-2.2 (or about 1.6 to about 2.2);
C: 2.0-2.8 (or about 2.0 to about 2.8);
Cr: 0-3 (or about 0 to about 3);
Mn: 0-4 (or about 0 to about 4);
Mo: 12.5-19.5 (or about 12.5 to about 19.5);
Ni: 0-4 (or about 0 to about 4);
Si 0-3 (or about 0 to about 3); and
V: 8.0-14.0 (or about 8.0 to about 14).

In some embodiments, an alloy can further comprise, by weight percent with iron as the balance:
B: 0.6-2.4 (or about 0.6 to about 2.4)
C: 1.6-3 (or about 1.6 to about 3)
Mo: 5.5-20 (or about 5.5 to about 20)
V: 6.5-14 (or about 6.5 to about 14)

In some embodiments, an alloy can further comprise, by weight percent with iron as the balance:
Cr: 0-3 (or about 0 to about 3)
Mn: 0-3 (or about 0 to about 3)
Ni: 0-3 (or about 0 to about 3)
Si: 0-1.5 (or about 0 to about 3)

In some embodiments, an alloy can comprise, by weight percent with iron as the balance:
B: 1.6-2.3 (or about 1.6 to about 2.3)
C: 2-3 (or about 2 to about 3)
Cr: 0-3 (or about 0 to about 3)
Mo: 13-20 (or about 13 to about 20)
Mn: 0-3 (or about 0 to about 3)
Ni: 0-3 (or about 0 to about 3)
Si: 0-1.5 (or about 0 to about 1.5)
V: 8-14 (or about 8 to about 14)

In some embodiments the weight ratio of Mo+1.9*W to B may be between 6 and 10.25 (or between about 6 and about 10.25). In some embodiments the weight ratio of Mo+1.9*W to B may be between 7.75 and 10 (or between about 7.75 and about 10).

In some embodiments, manganese, silicon, titanium, and/or aluminum may be added to any of the described compositions to serve as a deoxidizing agent and to modify the properties of the melt. Generally, less than 5 wt. % (or less than about 5 wt. %) of manganese, silicon, and/or aluminum may be added. More titanium can be added to form carbides. In some embodiments, less than 6 wt. % (or less than about 6 wt. %) titanium can be added.

The Fe content identified in all of the compositions described in the above paragraphs may be the balance of the composition as indicated above, or alternatively, the balance of the composition may comprise Fe and other elements. In some embodiments, the balance may consist essentially of Fe and may include incidental impurities.

In some embodiments, alloys described in this disclosure may be manufactured into an atomized powder for cladding with PTA or laser, and for other powder metallurgy processing into a final part. These powders themselves may be fully described by their chemistry shown in Table 2. The alloys in Table 2, and welds made from the alloys, meet at least some of the thermodynamic, microstructure, performance, and other embodiments of this disclosure. The welding process can involve dilution with a substrate material to achieve a metallurgical bond. As a result, the chemistry of the weld may be changed from those listed above but can still satisfy some or all of the criteria discussed below.

TABLE 2

Alloy Composition of Manufactured Powders in wt. % with Fe Balance

| Alloy | B | C | Mn | Mo | Ni | Si | V |
|---|---|---|---|---|---|---|---|
| P1 | 2 | 2.8 | 0.5 | 18 | 1.5 | 0.5 | 11.5 |
| P2 | 2 | 2.8 | 0.5 | 18 | 1.5 | 0.5 | 13 |
| P3 | 1.8 | 2.2 | 1 | 15 | 1.5 | .5 | 9.35 |
| P4 | 1.85 | 2.6 | .5 | 18 | 1.5 | .5 | 12 |

In some embodiments, alloys manufactured into a solid or cored wire for welding or for use as a feedstock for another process may be described by specific chemistries. Table 3 describes cored wires that have been manufactured and can meet some or all of the specific criteria of this disclosure. As described above, when welded, there may be a degree of dilution with a substrate involved. When welded on steel and/or other iron based substrates, both the specified and diluted chemistries describe these alloys and meet the thermodynamic and microstructural embodiments described elsewhere in this disclosure. Dilution can typically range from 0% to 60% (or about 0% to about 60%).

TABLE 3

Alloy Composition of Manufactured Wires in wt. % with Fe Balance

| Alloy | B | C | Cr | Mn | Mo | Ni | Si | V |
|---|---|---|---|---|---|---|---|---|
| W1 | 1.85 | 2.15 | | 0.00 | 15.70 | 0.00 | 0.00 | 11.00 |
| W2 | 1.85 | 2.15 | | 0 | 15.25 | 1.5 | 0 | 10.5 |
| W3 | 1.9 | 2.4 | | 0 | 15.25 | 1.5 | 0 | 10.5 |
| W4 | 2.1 | 2.5 | | 1 | 17.7 | 1.7 | 0.5 | 12 |
| W5 | 2.2 | 2.8 | | 1 | 17.7 | 1.7 | 0.5 | 12 |
| W6 | 1.8 | 2.6 | | 0 | 15.25 | 1.5 | 0 | 10 |
| W7 | 2.1 | 3.1 | | 1 | 17.7 | 1.7 | 0.5 | 12 |
| W8 | 2.35 | 3.05 | | 1 | 19.3 | 1.7 | 0.5 | 13 |
| W9 | 1.6 | 2.7 | | 0 | 14.2 | 1.5 | 0 | 10.3 |
| W10 | 1.85 | 3.2 | | 1 | 16.5 | 1.7 | 0.5 | 12 |
| W11 | 1.85 | 3.4 | | 1 | 16.5 | 1.7 | 0.5 | 12 |
| W12 | 1.8 | 2.2 | | 2 | 15 | 0 | 1 | 9.35 |
| W13 | 1.8 | 2.6 | | 1 | 15 | 0 | 0.5 | 10.25 |
| W14 | 1.64 | 2 | | 2 | 13.6 | 0 | 1 | 8.5 |
| W15 | 1.64 | 2.4 | | 1 | 13.6 | 0 | 0.5 | 9.3 |
| W16 | 1.8 | 2.2 | | 1 | 15 | 1.5 | 0.5 | 9.35 |
| W17 | 1.64 | 2 | | 1 | 13.6 | 1.5 | 0.5 | 8.5 |
| W18 | 2.55 | 3.05 | | 1.6 | 16.13 | 1.57 | 0.47 | 10.95 |
| W19 | 2.5 | 2.8 | | 1 | 17.7 | 1.7 | 0.5 | 12 |
| W20 | 2.5 | 3 | | 1.5 | 17.7 | 1.7 | 0.5 | 12 |
| W21 | 2.2 | 2.8 | | 1 | 17.7 | 1.7 | 0.5 | 12 |
| W22 | 2 | 2.6 | | 1.6 | 16.3 | 1.57 | 0.47 | 10.95 |
| W19.1 | 1.1 | 2.85 | 0.95 | 1.2 | 10 | 1.4 | 0.6 | 11.7 |
| W19.1A | 1.2 | 3.1 | 1 | 1.2 | 10.9 | 1.5 | 0.6 | 12.8 |
| W23 | 1.34 | 1.46 | | 0.73 | 11.26 | 1.1 | 0.35 | 7.6 |
| W24 | 1.49 | 1.7 | | 0.92 | 12.41 | 1.27 | 0.45 | 8.37 |
| W25 | 1.52 | 1.74 | | 0.83 | 13.13 | 1.17 | 0.31 | 8.3 |
| W26 | 1.52 | 2.02 | | 0.95 | 14.06 | 1.3 | 0.3 | 8.62 |
| W27 | 1.3 | 1.63 | | 0.72 | 10.73 | 0.95 | 0.21 | 8.3 |
| W28 | 1.16 | 1.22 | | 0.73 | 8.25 | 0.82 | 0.3 | 6.67 |
| W29 | 1.11 | 1.22 | | 0.72 | 8.36 | 0.81 | 0..31 | 6.2 |
| W30 | .95 | 2.45 | .8 | 1 | 8.6 | 1.2 | .5 | 10 |

In some embodiments, weld deposits of the disclosed alloys may also be described by specific compositions measured directly using a range of spectroscopy techniques. Table 4 lists alloy chemistries as-deposited on a substrate, measured using glow discharge spectroscopy (GDS), which can meet some or all of the thermodynamic, microstructural, and other embodiments of this disclosure. There is a degree of imprecision in any spectroscopy technique with accuracy depending on various factors, as such there is a margin of error involved in the reported values for each element.

TABLE 4

Alloy Composition of Deposited Weld Chemistries in wt. % with Fe Balance

| Alloy | B | C | Mn | Mo | Ni | Si | V |
|---|---|---|---|---|---|---|---|
| WELD-1 | 0.93 | 1.70 | 1.96 | 12.40 | 0.31 | 0.68 | 7.14 |
| WELD-2 | 0.92 | 1.57 | 1.80 | 11.80 | 0.29 | 0.66 | 6.53 |
| WELD-3 | 0.93 | 1.93 | 1.12 | 12.30 | 0.36 | 0.51 | 7.46 |
| WELD-4 | 0.95 | 1.67 | 1.80 | 11.00 | 0.32 | 0.70 | 6.36 |
| WELD-5 | 0.92 | 2.20 | 1.05 | 9.77 | 1.54 | 0.48 | 5.98 |
| WELD-6 | 1.07 | 2.84 | 1.17 | 11.10 | 1.87 | 0.54 | 6.88 |
| WELD-7 | 0.62 | 1.41 | 0.89 | 0.18 | 0.33 | 0.69 | 6.25 |
| WELD-8 | 0.37 | 1.06 | 0.76 | 0.18 | 0.29 | 0.66 | 6.34 |
| WELD-9 | 0.90 | 1.87 | 1.89 | 11.40 | 0.49 | 0.67 | 6.83 |
| WELD-10 | 0.73 | 1.77 | 1.92 | 11.80 | 0.42 | 0.66 | 7.17 |
| WELD-11 | 0.79 | 1.90 | 0.96 | 10.10 | 1.71 | 0.47 | 6.66 |
| WELD-12 | 0.93 | 2.02 | 1.13 | 12.40 | 1.68 | 0.47 | 7.94 |
| WELD-13 | 0.78 | 1.54 | 1.10 | 9.70 | 1.30 | 0.49 | 6.43 |
| WELD-14 | 0.92 | 1.74 | 1.78 | 11.00 | 0.52 | 0.69 | 6.34 |
| WELD-15 | 0.91 | 1.92 | 1.01 | 12.90 | 1.61 | 0.47 | 7.70 |
| WELD-16 | 0.78 | 1.41 | 0.96 | 10.20 | 1.34 | 0.41 | 6.38 |
| WELD-17 | 0.87 | 1.53 | 1.78 | 11.20 | 0.27 | 0.57 | 6.20 |
| WELD-18 | 0.84 | 1.39 | 0.68 | 11.50 | 1.49 | 0.50 | 6.90 |
| WELD-19 | 0.91 | 2.06 | 0.74 | 10.20 | 1.55 | 0.52 | 6.56 |
| WELD-20 | 0.93 | 1.70 | 1.96 | 12.40 | 0.31 | 0.68 | 7.14 |
| WELD-21 | 0.92 | 1.57 | 1.80 | 11.80 | 0.29 | 0.66 | 6.53 |
| WELD-22 | 0.93 | 1.93 | 1.12 | 12.30 | 0.36 | 0.51 | 7.46 |
| WELD-23 | 0.95 | 1.67 | 1.80 | 11.00 | 0.32 | 0.70 | 6.36 |
| WELD-24 | 0.92 | 2.20 | 1.05 | 9.77 | 1.54 | 0.48 | 5.98 |
| WELD-25 | 1.07 | 2.84 | 1.17 | 11.10 | 1.87 | 0.54 | 6.88 |
| WELD-26 | 0.91 | 1.76 | 1.22 | 10.00 | 1.51 | 0.44 | 5.93 |
| WELD-27 | 0.96 | 2.27 | 1.02 | 10.40 | 1.71 | 0.46 | 6.26 |
| WELD-28 | 0.95 | 2.47 | 1.11 | 11.50 | 1.81 | 0.52 | 6.82 |
| WELD-29 | 1.01 | 2.48 | 1.22 | 11.40 | 1.89 | 0.57 | 6.75 |
| WELD-30 | 1.03 | 2.33 | 1.09 | 9.76 | 1.65 | 0.55 | 5.78 |
| WELD-31 | 0.87 | 1.82 | 0.67 | 11.40 | 1.61 | 0.49 | 6.87 |
| WELD-32 | 0.85 | 1.74 | 0.73 | 10.50 | 1.54 | 0.51 | 6.17 |
| WELD-33 | 0.97 | 1.90 | 0.73 | 11.20 | 1.58 | 0.53 | 6.86 |
| WELD-34 | 0.82 | 1.76 | 0.68 | 9.51 | 1.57 | 0.50 | 5.73 |
| WELD-35 | 0.86 | 2.30 | 1.05 | 12.80 | 1.91 | 0.49 | 7.30 |
| WELD-36 | 0.95 | 2.37 | 1.22 | 11.70 | 1.87 | 0.55 | 7.06 |
| WELD-37 | 0.91 | 2.33 | 1.16 | 12.20 | 2.01 | 0.52 | 7.42 |
| WELD-38 | 0.96 | 2.20 | 1.23 | 12.30 | 1.78 | 0.53 | 7.68 |
| WELD-39 | 0.88 | 2.04 | 0.76 | 13.00 | 1.92 | 0.53 | 7.91 |

In some embodiments, weld deposits of the disclosed alloys may also be described by specific compositions measured directly using a range of spectroscopy techniques. Table 5 lists alloy chemistries that fall under criteria described in this disclosure. These chemistries are measured using ICP, Leco C, and/or XRF spectroscopy techniques. There is a degree of imprecision in any spectroscopy technique with accuracy depending on various factors, as such there is a margin of error involved in the reported values for each element.

TABLE 5

Alloy Composition in wt. % with Fe Balance

| Alloy | B | C | Cr | Mn | Mo | Ni | Si | V | W |
|---|---|---|---|---|---|---|---|---|---|
| Alloy 1 | 1.92 | 2.61 | | .93 | 16.28 | 1.48 | .56 | 8.42 | |
| Alloy 1 weld | 1.34 | 1.46 | | .73 | 11.26 | 1.1 | .35 | 7.6 | |
| Alloy 2 | 1.95 | 2.75 | | .84 | 17.28 | 1.46 | .46 | 9.79 | |
| Alloy 2 weld | 1.52 | 1.74 | | .83 | 13.13 | 1.17 | .31 | 8.3 | |
| Alloy 3 weld | 1.62 | 1.9 | | 1.25 | 12.43 | 1.26 | .64 | 8.25 | |
| Alloy 4 weld | 1.62 | 1.84 | | .94 | 11.5 | 1.16 | .47 | 8.37 | |
| Alloy 5 | 1.96 | 2.72 | | .56 | 18.04 | 1.58 | .52 | 13.06 | |
| Alloy 6 | 1.8 | 2.19 | | .99 | 15.17 | 1.57 | .55 | 9.64 | |
| Alloy 7 | 1.91 | 2.7 | | .56 | 18 | 1.6 | .7 | 12 | |
| Alloy 8 | 1.9 | 2.76 | | .56 | 18.35 | 1.55 | .63 | 12.91 | |
| Alloy 9 | 2.0 | 1.77 | 1.83 | .83 | 17.76 | 2.56 | 1.44 | 11.24 | .88 |

In some embodiments, alloys described in this disclosure may be welded by a bulk process. These alloys are described in Table 6 by their nominal powder and final chemistries. In embodiments of this process, either a powder alloy is used or a powder is blended from other alloy powders (powder) such that its bulk chemistry reaches a target chemistry (final). The powder can be deposited on a substrate and steel wire can be welded on top of the powder and substrate. Thus, the final chemistry may be a combination of the powder, substrate, and/or steel wire along with any electrode used. This produces a weld deposit where the weld chemistry, microstructure, performance, and thermodynamics can be dictated by the parameters used and the chemistry of the powder. The primary welding parameters that change these properties are the powder to wire ratio and dilution of the weld puddle with the substrate. Powder to wire ratios using the powder described may range from 0.6:1 to 2.2:1 (or about 0.6:1 to about 2.2:1). Dilution may range from 0% to 50% (or about 0% to about 50%).

TABLE 6

Alloy Compositions of Powder Used in Bulk Welding Process, and Final Chemistry of Weld Bead produced in Bulk Welding Process, all in wt. % with Fe Balance

| Alloy | | B | C | Mn | Mo | Ni | Si | V |
|---|---|---|---|---|---|---|---|---|
| B1 | Powder | 4.32 | 5.27 | 2.19 | 34.21 | 2.91 | 1.40 | 23.60 |
| | Final | 1.41 | 1.83 | 1.00 | 11.30 | 1.00 | 0.50 | 7.80 |
| B2 | Powder | 4.25 | 5.21 | 2.40 | 33.96 | 3.01 | 1.55 | 23.27 |
| | Final | 1.41 | 1.83 | 1.00 | 11.30 | 1.00 | 0.50 | 7.80 |

Thus, the compositions disclosed in the above Tables 1-6 can be the compositions of the powder itself, the powder in combination with other materials (such as wires and substrates), the wire, the casting, or the final composition of the weld itself, and the compositions are not so limited as to a particular application.

Description of Alloying Additions

In this disclosure, certain specific alloying additions may be used to meet the various thermodynamic and microstructural criteria described below. The alloy additions described are intended to be non-limiting and serve as examples.

Embodiments of the disclosure allow for the formation of specific types of borides. Boron is a necessary alloy addition to form borides in the alloy. Borides, especially the transition metal borides that form in a ferrous alloy system, can be harder than iron matrix phases. Having harder phases will improve wear performance, making embodiments of the disclosed alloys particularly suitable for hardfacing applications. These borides are different from the borides described in Wallin, discussed above, that comprise almost entirely iron and boron.

Tungsten and/or molybdenum can be added to the alloy in sufficient quantity to form complex borides that have a different chemistry, structure, and properties than borides that comprise mostly iron and boron. The properties of these complex borides can include: 1) higher hardness allowing for the same wear performance with a lower boride phase fraction and higher toughness; 2) no rod like phases which is a less embrittling morphology further improving toughness; 3) a thermodynamically favorable phase allowing for precise control over the specific types of borides present in the alloy.

The above three alloying additions alone are sufficient to meet the microstructural and thermodynamic criteria of certain embodiments of this disclosure. However, additional alloying additions may be added for various reasons to modify the properties of the material and/or improve manufacture and processing.

Carbon may be added for two primary reasons: 1) carbon promotes the formation of a martensitic matrix which is harder than the other matrix types including ferrite, austenite, pearlite, and bainite; 2) carbon can combine with transition metals to form carbides which improve wear performance.

Vanadium, titanium, niobium, zirconium, hafnium, tantalum, and tungsten may be added to the alloy in addition to carbon. These elements combine with carbon to form MC type carbides which form an isolated morphology and are extremely hard resulting in tough wear resistant alloys. In contrast, other carbides such as those formed by iron and/or chromium, do not form an isolated morphology and are considerably softer than the MC type described above. The MC type carbides also form at a sufficiently high temperature that control over the amount of carbon in the liquid during solidification is possible over a wide range of solidification conditions. This allows for the elimination of embrittling borocarbide phases and further control over the performance of the alloy.

In some embodiments of this disclosure, vanadium may be used as a carbide former preferentially compared to titanium, niobium, zirconium, hafnium, tantalum, and/or tungsten. This allows improved fluidity of the liquid alloy at high temperature as MC type carbides containing mostly vanadium tend to form at a lower temperature improving viscosity. This allows for easier atomization of the alloy into a powder, improved bead morphology during welding, and easier casting.

Nickel and manganese may be added to the alloy to modify the FCC-BCC transition temperature to allow for the austenitizing step in various heat treatments to happen at different temperatures. Nickel also slows the formation of pearlite, ferrite, and bainite during solidification, improving hardenability which allows for a martensitic matrix at lower cooling rate.

Silicon, manganese, aluminum, and/or titanium have deoxidizing effects on the alloy which improves performance and avoids porosity when utilized in various processes where oxygen is present.

Nickel, silicon, manganese, vanadium, molybdenum, boron, carbon, and copper all can improve the hardenability of the alloy by increasing the carbon equivalent of the matrix.

Thermodynamic Criteria

Embodiments of alloys of the disclosure can be fully described by certain equilibrium thermodynamic criteria. The alloys can meet some, or all, of the described thermodynamic criteria.

In some embodiments, a thermodynamic criterion is the total mole fraction of transition metal borides and borocarbides where the metallic component comprises ≥15 wt % (or ≥about 15 wt %) W+Mo. In some embodiments, a thermodynamic criterion is the total mole fraction of transition metal borides and borocarbides where the metallic component comprises ≥25 wt % (or ≥about 25%) W+Mo. In some embodiments, a thermodynamic criterion is the total mole fraction of transition metal borides and borocarbides where the metallic component comprises ≥50 wt % (or ≥about 50 wt %) W+Mo.

In some embodiments, a thermodynamic criterion is the total mole fraction of transition metal borides and borocarbides where the metallic component comprises ≥15 wt % (or ≥about 15 wt %) Ti+W+Mo+V. In some embodiments, a thermodynamic criterion is the total mole fraction of transition metal borides and borocarbides where the metallic component comprises ≥25 wt % (or ≥about 25%) Ti+W+Mo+V. In some embodiments, a thermodynamic criterion is the total mole fraction of transition metal borides and borocarbides where the metallic component comprises ≥50 wt % (or ≥about 50 wt %) Ti+W+Mo+V.

This criteria will be abbreviated as "complex boride". Increasing the mole fraction of complex boride results in an improvement in the wear performance of the alloy. Because these complex boride phases are harder than borides with a metallic component that comprises mostly iron and/or chromium, a lower phase fraction is required to achieve comparable wear performance. For example, iron and/or chromium borides would have a hardness of 1700 HV (or about 1700 HV), whereas the borides described herein can have a hardness of greater than 2000 HV (or greater than 2000 HV). Toughness is inversely correlated with boride phase fraction in most alloys so providing the same wear performance with a lower fraction is advantageous.

The complex boride mole fraction is measured as the sum of all borides at equilibrium. In this disclosure the complex boride mole fraction and chemistry is measured at 1300K (or about 1300K) in an equilibrium solidification diagram. As the solubility of boron in a solid ferrous matrix is very small, 1300K is a very close approximation of the actual phase fraction in service. Phases that may meet the chemistry requirement may comprise $M_2B$, $M_3B_2$, and $B_2M$. In FIG. 1 the complex boride phase fraction is 15.6% measured as the mole fraction of M3B2 at 1300K [101]. The metallic component of $M_3B_2$ comprises ~74 wt % Mo satisfying the chemistry limitation. The alloy in FIG. 1 meets the most specific complex boride mole fraction embodiments.

Figure 3:
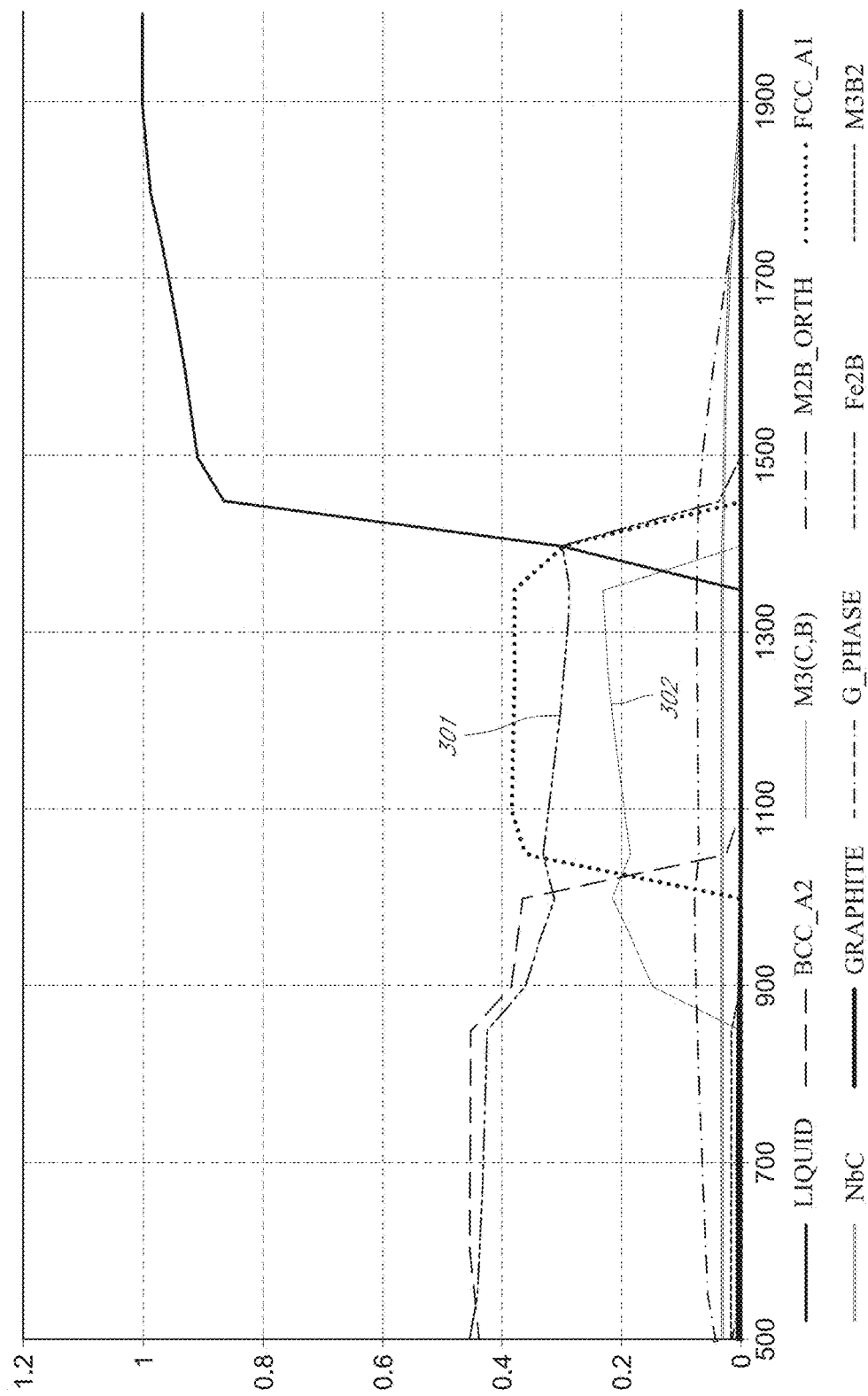
FIG. 3 shows an example equilibrium solidification diagram of an alloy outside of the disclosure (B: 3.8, C: 0.8, Mn: 1.8, Nb: 3, Ni: 1.9, Si: 0.6, W: 0.8).

In contrast, the chrome free weld deposit described in Wallin does not meet the embodiments of this criteria. The solidification diagram of this alloy is shown in FIG. 3. The boride and borocarbide phases all have <15 wt % W+Mo.

In some embodiments, the complex boride mole fraction of the alloy can be ≥5% (or ≥about 5%). In some embodiments, the complex boride mole fraction of the alloy can be ≥10% (or ≥about 10%). In some embodiments, the complex boride mole fraction of the alloy can be ≥15% (or ≥about 15%). In some embodiments, the complex boride mole fraction of the alloy can be between 5% and 50% (or between about 5% and about 45%). In some embodiments, the complex boride mole fraction of the alloy can be between 10% and 35% (or between about 10% and about 35%). In some embodiments, the complex boride mole fraction of the alloy can be between 10% and 25% (or between about 10% and about 25%). In some embodiments, the complex boride mole fraction of the alloy can be between 5% and 45% (or between about 5% and about 45%). In some embodiments, the complex boride mole fraction of the alloy can be between 5% and 30% (or between about 5% and about 30%). In some embodiments, the complex boride mole fraction of the alloy can be between 5% and 25% (or between about 5% and about 25%). In some embodiments, the complex boride mole fraction of the alloy can be between 7.5% and 30% (or between about 7.5% and about 30%). In some embodiments, the complex boride mole fraction of the alloy can be between 7.5% and 25% (or between about 7.5% and about 25%). In some embodiments, the complex boride mole fraction of the alloy can be between 10% and 30% (or between about 10% and about 30%). In some embodiments, the complex boride mole fraction of the alloy can be between 10% and 25% (or between about 10% and about 25%). In some embodiments, the complex boride mole fraction of the alloy can be between 12.5% and 25% (or between about 12.5% and about 25%). In some embodiments, the complex boride mole fraction of the alloy can be between 12.5% and 20% (or between about 12.5% and about 20%).

In some embodiments, a thermodynamic criterion is the mole fraction of isolated carbides. Examples of isolated carbides comprise MC type carbides that contain one or more of the following elements: V, Ti, Nb, Zr, Hf, W, Mo. Carbides formed from these elements can form in a discrete and isolated morphology which can reduce their impact on the alloy's toughness. $M_7C_3$, $M_{23}C_6$, and $M_3C$, are examples of carbides that do not form an isolated morphology. Increasing the isolated carbide fraction allows for improved wear performance without embrittling the alloy.

The mole fraction of isolated carbides is the measured as the sum, at equilibrium, of all carbide phases that adhere to the above composition. This criteria is measured at 1300K. In the alloy of FIG. 1 the only isolated carbide is VC, so the mole fraction of isolated carbide is 14.1% [102].

In some embodiments, the isolated carbide mole fraction is 0% (or about 0%). In some embodiments, the isolated carbide mole fraction can be ≥5% and <40% (or ≥about 5% and <about 40%). In some embodiments, the isolated carbide mole fraction can be ≥10% and <40% (or ≥about 10% and <about 40%). In some embodiments, the isolated carbide mole fraction can be ≥15% and <40% (or ≥about 15% and <about 40%)). In some embodiments, the isolated carbide mole fraction can be ≥10% and <30% (or ≥about 10% and <about 30%). In some embodiments, the isolated carbide mole fraction can be ≥5% and <45% (or ≥about 5% and <about 45%). In some embodiments, the isolated carbide mole fraction can be ≥5% and <30% (or ≥about 5% and <about 30%). In some embodiments, the isolated carbide mole fraction can be ≥5% and <25% (or ≥about 5% and <about 25%). In some embodiments, the isolated carbide mole fraction can be ≥5% and <20% (or ≥about 5% and <about 20%). In some embodiments, the isolated carbide mole fraction can be ≥7.5% and <30% (or ≥about 7.5% and <about 30%). In some embodiments, the isolated carbide mole fraction can be ≥7.5% and <25% (or ≥about 7.5% and <about 25%). In some embodiments, the isolated carbide mole fraction can be ≥10% and <30% (or ≥about 10% and <about 30%). In some embodiments, the isolated carbide mole fraction can be ≥10% and <25% (or ≥about 10% and <about 25%). In some embodiments, the isolated carbide mole fraction can be ≥12.5% and <25% (or ≥about 12.5% and <about 25%). In some embodiments, the isolated carbide mole fraction can be ≥12.5% and <20% (or ≥about 12.5% and <about 20%).

In some embodiments the isolated carbides may comprise predominantly vanadium as the metallic component. These will be known as vanadium carbides defined as MC type carbides where M comprises ≥50% vanadium (or ≥about 50%) form at lower temperatures facilitating the manufacture of powder, castings, and other components. vanadium also is a cost effective alloying addition relative to its contribution to wear resistance.

In some embodiments, the vanadium carbide mole fraction is 0% (or about 0%). In some embodiments, the vanadium carbide mole fraction can be ≥5% and <40% (or ≥about 5% and <about 40%). In some embodiments, the vanadium carbide mole fraction can be ≥10% and <40% (or ≥about 10% and <about 40%). In some embodiments, the vanadium carbide mole fraction can be ≥15% and <40% (or ≥about 15% and <about 40%). In some embodiments, the vanadium carbide mole fraction can be ≥10% and <30% (or ≥about 10% and <about 30%). In some embodiments, the vanadium carbide mole fraction can be ≥5% and <45% (or ≥about 5% and <about 45%). In some embodiments, the vanadium carbide mole fraction can be ≥5% and <30% (or ≥about 5% and <about 30%). In some embodiments, the vanadium carbide mole fraction can be ≥5% and <25% (or ≥about 5% and <about 25%). In some embodiments, the vanadium carbide mole fraction can be ≥5% and <20% (or ≥about 5% and <about 20%). In some embodiments, the vanadium carbide mole fraction can be ≥7.5% and <30% (or ≥about 7.5% and <about 30%). In some embodiments, the vanadium carbide mole fraction can be ≥7.5% and <25% (or ≥about 7.5% and <about 25%). In some embodiments, the vanadium carbide mole fraction can be ≥10% and <30% (or ≥about 10% and <about 30%). In some embodiments, the vanadium carbide mole fraction can be ≥10% and <25% (or ≥about 10% and <about 25%). In some embodiments, the vanadium carbide mole fraction can be ≥12.5% and <25% (or ≥about 12.5% and <about 25%). In some embodiments, the vanadium carbide mole fraction can be ≥12.5% and <20% (or ≥about 12.5% and <about 20%).

The next equilibrium thermodynamic criterion is the total hard phase mole fraction. Hard phases in this instance are borides, borocarbides, nitrides, carbides, oxides, silicides, laves phases, aluminides, and carbonitrides. In some instances, in this alloy space, it can be advantageous to have additional hard phases to complement the complex borides. This allows for fine tuning the microstructure, thermodynamics, and alloy properties. For example, carbides may be added to the microstructure to further increase the hard phase fraction and as a result the wear performance of the alloy without substantially changing the morphology of the complex borides. This can allow for an alloy with even more wear performance than provided by complex borides alone.

The total hard phase mole fraction is measured as the sum, at equilibrium, of all hard phases at 1300K. In FIG. 1 this is calculated as the sum of the two hardphases present at 1300K, $M_3B_2$ 15.6% [101] and VC 14.1% [102]. The total hard phase mole fraction of the alloy in FIG. 1 is 29.7% meeting some of the embodiments.

In some embodiments, the total hard phase mole fraction can be ≥5% (or ≥about 5%). In some embodiments, the total hard phase mole fraction can be ≥10%. In some embodiments, the total hard phase mole fraction can be ≥15% (or ≥about 15%). In some embodiments, the total hard phase mole fraction is ≥20% (or ≥about 20%). In some embodiments, the total hard phase mole fraction can be ≥25% (or ≥about 25%). In some embodiments, the total hard phase mole fraction can be ≥30% (or ≥about 30%). In some embodiments, the total hard phase mole fraction can be ≥35% (or ≥about 35%).

The next equilibrium thermodynamic criterion is the mole fraction of embrittling hard phase. In this disclosure, embrittling hard phase is the sum of Fe2B, $M_{23}(C,B)_6$, $M_7(C,B)_3$, and $M_3(C,B)$ that form before the solidus and where M is ≥75 wt % Fe (or ≥about 75 wt % Fe). These hard phases, when formed from the liquid during solidification, form an interconnected morphology that can embrittle the alloy reducing impact performance and toughness.

Figure 2:
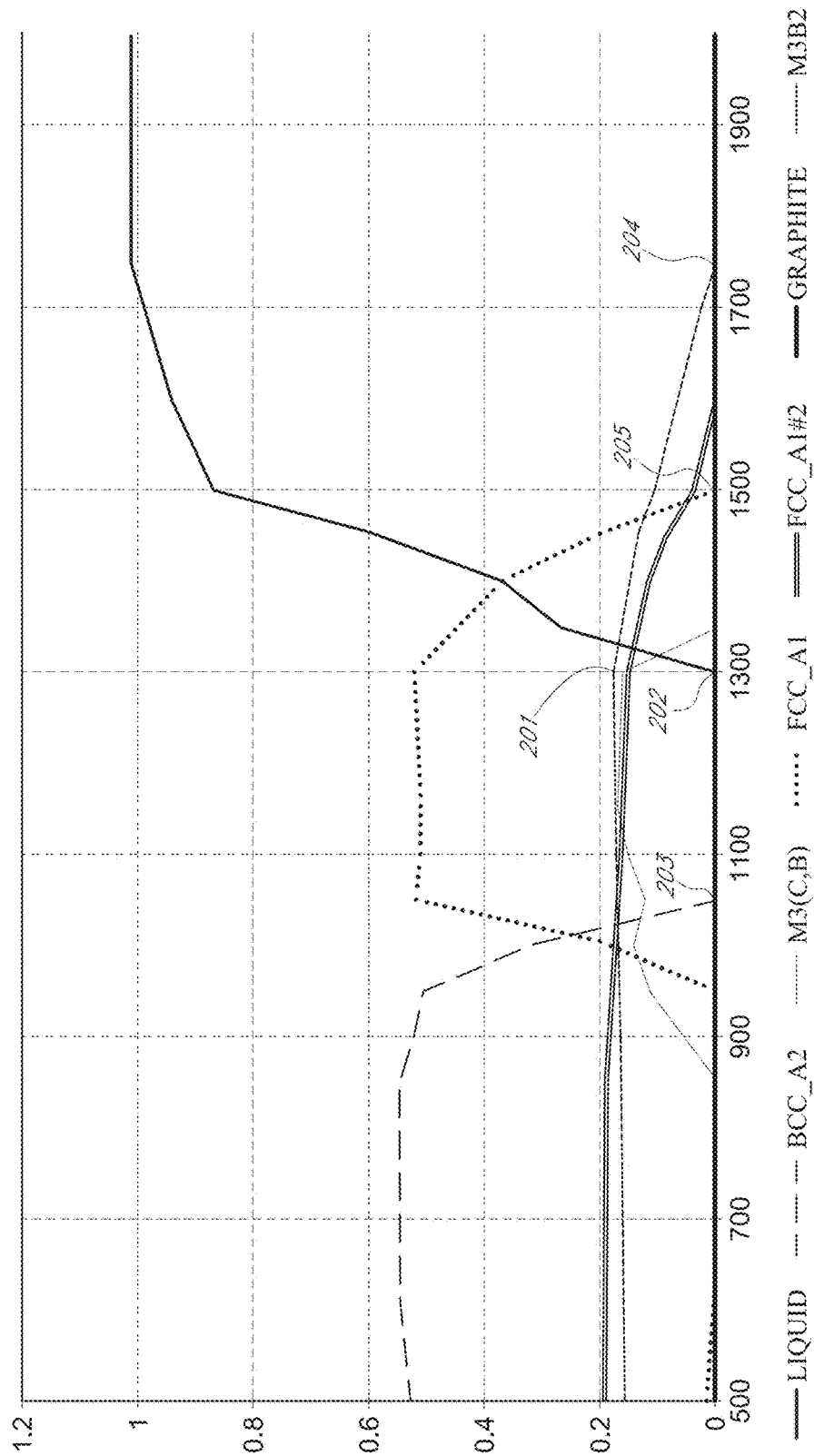
FIG. 2 shows an example equilibrium solidification diagram of an embodiment of a disclosed alloy having the composition (B: 2.2, C: 2.2, Mo: 12, Ni: 2, V: 8).

The mole fraction of embrittling hard phase is measured as the sum, at equilibrium, of $Fe_2B$, $M_{23}(C,B)_6$, $M_7(C,B)_3$, and $M_3(C,B)$ at the solidus temperature. In FIG. 1 there are none of these phases present at the solidus so the value is 0%. In FIG. 2 this criteria is the mole fraction of $M_3(C,B)$ at the solidus, 16% [201]. Where the solidus is defined as one temperature step below the lowest temperature where a liquid phase is present [202]. In this alloy the liquidus temperature is 1300K [202].

In contrast, the Wallin alloy "Wallin #2" has a total embrittling hardphase fraction of about 57% as shown in FIG. 3. This is calculated as the sum of the mole fractions of $Fe_2B$ [301] and $M_3(C,B)$ [302] measured at 1300K. These values are measured at 35% and 22% respectively.

In some embodiments, the embrittling hard phase mole fraction can be ≤10% (or ≤about 10%). In some embodiments, the embrittling hard phase mole fraction can be ≤5% (or ≤about 5%). In some embodiments, the embrittling hard phase mole fraction can be ≤3% (or ≤about 3%). In some embodiments, the embrittling hard phase mole fraction can be 0% (or about 0%).

The next equilibrium thermodynamic criterion is the FCC-BCC transition temperature. This transition temperature between austenite (FCC) and ferrite (BCC) indicates how the alloy will behave when subjected to various heat treatments. One example is when the alloy is applied as a coating on a steel substrate that will be subsequently hardened, such as quench and temper steel. The thermal cycle for hardening steels often involves transforming austenite into martensite and/or bainite. This can be done by heating the alloy in an austenitizing step to between 800 C and 1000 C then quenching in oil, water, or air. The success of this process can depend on a complete transformation of the matrix to austenite during heating. If the FCC-BCC transition temperature is near or above the austenitizing temperature of heat treatment cycle, complete transformation of the matrix to austenite will not occur and subsequent quenching will not form martensite or bainite The FCC-BCC transition temperature is defined as one temperature step above the first formation temperature of the BCC phase (ferrite) under equilibrium solidification conditions. In FIG. 1 the FCC-BCC transition temperature is 1200K [103]; in FIG. 2 it is 1050K [203].

In some embodiments, the FCC-BCC transition temperature can be ≤1350K (or ≤about 1350K). In some embodiments, the FCC-BCC transition temperature can be ≤1300K (or ≤about 1300K). In some embodiments, the FCC-BCC transition temperature can be ≤1200K (or ≤about 1200K). In some embodiments, the FCC-BCC transition temperature can be ≤1150K (or ≤about 1150K). In some embodiments, the FCC-BCC transition temperature is ≤1100K (or ≤1100K). In some embodiments, the FCC-BCC transition temperature can be ≤1050K (or ≤about 1100K).

The next additional equilibrium thermodynamic criterion is the melt range of the alloy. The melt range of the alloy is the difference between the first hard phase formation temperature [104] and the liquidus temperature of the matrix [105] in FIG. 1. If the carbides precipitate out from the liquid at elevated temperatures relative to the solidification of the matrix, this creates a variety of problems in the powder manufacturing process including but not limited to powder clogging, increased viscosity, lower yields at desired powder sizes, and improper particle shape. Thus, it can be advantageous to reduce the formation temperature of the extremely hard particles.

The hard phase formation temperature of an alloy is defined as the highest temperature at which a hard phase is thermodynamically present in the alloy. This temperature is compared against the liquidus temperature of the iron matrix phase, whether austenite or ferrite, and used to calculate the melt range. It is desirable for the powder manufacturing process to minimize the melt range. In FIG. 1 the hard phase ($M_3B_2$) formation temperature is 1650K [104] and the liquidus temperature [105] is 1550K giving a melt range of 100K. This value is within the range of the most specific embodiment. The alloy in FIG. 2 has a melt range of 250K [204] [205].

In some embodiments, the melt range can be ≤250K (or ≤about 250K). In some embodiments, the melt range can be ≤200K (or ≤about 200K). In some embodiments, the melt range can be ≤150K. In some embodiments, the melt range can be ≤100K (or ≤about 100K).

In some embodiments boron may substitute for some of the carbon in the MC type carbides. In some embodiments carbon may substitute for some of the boron in the complex boride phases. In some embodiments, up to 10% (or up to about 10%), up to 20% (or up to about 20%), up to 30% (or up to about 30%), up to 40% (or up to about 40%), or up to 50% (or up to about 50%) carbon can substitute for the boron.

The following Table 7 describes 43 alloys claimed in this disclosure and their associated chemistry while Table 8 describes specific thermodynamic characteristics. Also included in the tables are 2 alloys, Wallin #1 and #2, not covered under this disclosure. It can be seen that the Wallin alloys do not meet the specific thermodynamic criteria of this disclosure.

TABLE 7

| Example Compositions | | | | | | | | | | | |
|---|---|---|---|---|---|---|---|---|---|---|---|
| Alloy | B | C | Cr | Fe | Mn | Mo | Nb | Ni | Si | V | W |
| 1 | 1.85 | 2.15 | 0 | 69.3 | 0 | 15.7 | 0 | 0 | 0 | 11 | 0 |
| 2 | 1.85 | 2.15 | 0 | 68.75 | 0 | 15.25 | 0 | 1.5 | 0 | 10.5 | 0 |
| 3 | 1.9 | 2.4 | 0 | 68.45 | 0 | 15.25 | 0 | 1.5 | 0 | 10.5 | 0 |
| 4 | 2.1 | 2.5 | 0 | 62.5 | 1 | 17.7 | 0 | 1.7 | 0.5 | 12 | 0 |
| 5 | 1.8 | 2.6 | 0 | 68.85 | 0 | 15.25 | 0 | 1.5 | 0 | 10 | 0 |
| 6 | 2.1 | 3.1 | 0 | 61.9 | 1 | 17.7 | 0 | 1.7 | 0.5 | 12 | 0 |

TABLE 7-continued

Example Compositions

| Alloy | B | C | Cr | Fe | Mn | Mo | Nb | Ni | Si | V | W |
|---|---|---|---|---|---|---|---|---|---|---|---|
| 7 | 2.35 | 3.05 | 0 | 59.1 | 1 | 19.3 | 0 | 1.7 | 0.5 | 13 | 0 |
| 8 | 1.6 | 2.7 | 0 | 69.7 | 0 | 14.2 | 0 | 1.5 | 0 | 10.3 | 0 |
| 9 | 1.85 | 3.2 | 0 | 63.25 | 1 | 16.5 | 0 | 1.7 | 0.5 | 12 | 0 |
| 10 | 1.85 | 3.4 | 0 | 63.05 | 1 | 16.5 | 0 | 1.7 | 0.5 | 12 | 0 |
| 11 | 1.8 | 2.2 | 0 | 68.65 | 2 | 15 | 0 | 0 | 1 | 9.35 | 0 |
| 12 | 1.8 | 2.6 | 0 | 68.85 | 1 | 15 | 0 | 0 | 0.5 | 10.25 | 0 |
| 13 | 1.64 | 2 | 0 | 71.26 | 2 | 13.6 | 0 | 0 | 1 | 8.5 | 0 |
| 14 | 1.64 | 2.4 | 0 | 71.56 | 1 | 13.6 | 0 | 0 | 0.5 | 9.3 | 0 |
| 15 | 1.64 | 2 | 0 | 71.26 | 1 | 13.6 | 0 | 1.5 | 0.5 | 8.5 | 0 |
| 16 | 2.55 | 3.05 | 0 | 63.68 | 1.6 | 16.13 | 0 | 1.57 | 0.47 | 10.95 | 0 |
| 17 | 2.5 | 2.8 | 0 | 61.8 | 1 | 17.7 | 0 | 1.7 | 0.5 | 12 | 0 |
| 18 | 2.5 | 3 | 0 | 61.1 | 1.5 | 17.7 | 0 | 1.7 | 0.5 | 12 | 0 |
| 19 | 2.2 | 2.8 | 0 | 62.1 | 1 | 17.7 | 0 | 1.7 | 0.5 | 12 | 0 |
| 20 | 2 | 2.6 | 0 | 64.51 | 1.6 | 16.3 | 0 | 1.57 | 0.47 | 10.95 | 0 |
| 21 | 1.1 | 2.85 | 0.95 | 70.2 | 1.2 | 10 | 0 | 1.4 | 0.6 | 11.7 | 0 |
| 22 | 1.2 | 3.1 | 1 | 67.7 | 1.2 | 10.9 | 0 | 1.5 | 0.6 | 12.8 | 0 |
| 23 | 1.49 | 1.7 | 0 | 73.39 | 0.92 | 12.41 | 0 | 1.27 | 0.45 | 8.37 | 0 |
| 24 | 1.52 | 2.02 | 0 | 71.23 | 0.95 | 14.06 | 0 | 1.3 | 0.3 | 8.62 | 0 |
| 25 | 1.3 | 1.63 | 0 | 76.16 | 0.72 | 10.73 | 0 | 0.95 | 0.21 | 8.3 | 0 |
| 26 | 1.16 | 1.22 | 0 | 80.85 | 0.73 | 8.25 | 0 | 0.82 | 0.3 | 6.67 | 0 |
| 27 | 1.11 | 1.22 | 0 | 81.58 | 0.72 | 8.36 | 0 | 0.81 | 0 | 6.2 | 0 |
| 28 | 0.95 | 2.45 | 0.8 | 74.5 | 1 | 8.6 | 0 | 1.2 | 0.5 | 10 | 0 |
| 29 | 2 | 2.8 | 0 | 63.2 | 0.5 | 18 | 0 | 1.5 | 0.5 | 11.5 | 0 |
| 30 | 2 | 2.8 | 0 | 61.7 | 0.5 | 18 | 0 | 1.5 | 0.5 | 13 | 0 |
| 31 | 1.8 | 2.2 | 0 | 68.65 | 1 | 15 | 0 | 1.5 | 0.5 | 9.35 | 0 |
| 32 | 1.85 | 2.6 | 0 | 63.05 | 0.5 | 18 | 0 | 1.5 | 0.5 | 12 | 0 |
| 33 | 1.92 | 2.61 | 0 | 67.8 | 0.93 | 16.28 | 0 | 1.48 | 0.56 | 8.42 | 0 |
| 34 | 1.34 | 1.46 | 0 | 76.16 | 0.73 | 11.26 | 0 | 1.1 | 0.35 | 7.6 | 0 |
| 35 | 1.95 | 2.75 | 0 | 65.47 | 0.84 | 17.28 | 0 | 1.46 | 0.46 | 9.79 | 0 |
| 36 | 1.52 | 1.74 | 0 | 73 | 0.83 | 13.13 | 0 | 1.17 | 0.31 | 8.3 | 0 |
| 37 | 1.62 | 1.9 | 0 | 72.65 | 1.25 | 12.43 | 0 | 1.26 | 0.64 | 8.25 | 0 |
| 38 | 1.62 | 1.84 | 0 | 74.1 | 0.94 | 11.5 | 0 | 1.16 | 0.47 | 8.37 | 0 |
| 39 | 1.96 | 2.72 | 0 | 61.56 | 0.56 | 18.04 | 0 | 1.58 | 0.52 | 13.06 | 0 |
| 40 | 1.8 | 2.19 | 0 | 68.09 | 0.99 | 15.17 | 0 | 1.57 | 0.55 | 9.64 | 0 |
| 41 | 1.91 | 2.7 | 0 | 62.53 | 0.56 | 18 | 0 | 1.6 | 0.7 | 12 | 0 |
| 42 | 1.9 | 2.76 | 0 | 61.34 | 0.56 | 18.35 | 0 | 1.55 | 0.63 | 12.91 | 0 |
| 43 | 2 | 1.77 | 1.83 | 59.69 | 0.83 | 17.76 | 0 | 2.56 | 1.44 | 11.24 | 0.88 |
| Wallin #1 | 4.2 | 1 | 0 | 85.9 | 2 | 0.5 | 3.1 | 2 | 0.8 | 0 | 0.5 |
| Wallin #2 | 3.8 | 1 | 0.01 | 87.09 | 1.8 | 0.4 | 3 | 1.9 | 0.6 | 0 | 0.4 |

Table 8 shows the properties of the above-discussed alloys from Table 7. The column labeled "1" is the mole fraction of complex boride where the metallic constituent comprises Mo+W≥15 wt %. The column labeled "2" is the mole fraction of complex boride where the metallic constituent comprises Mo+W≥25 wt %. The column labeled "3" is the mole fraction of complex boride where the metallic constituent comprises Mo+W≥50 wt %. The column labeled "4" is the weight percent of Mo+W in the metallic component of the complex boride. The column labeled "5" is the mole fraction of isolated carbide. The column labeled "6" is the mole fraction of vanadium carbide. The column labeled "7" is the total hard phase mole fraction. The column labeled "8" is the FCC-BCC transition temperature. The column labeled "9" is the melt range of the alloy.

TABLE 8

Properties

| Alloy | 1 | 2 | 3 | 4 | 5 | 6 | 7 | 8 | 9 |
|---|---|---|---|---|---|---|---|---|---|
| 1 | 0.22 | 0.22 | 0.22 | 0.74 | 0.19 | 0.19 | 0.41 | 1200 | 200 |
| 2 | 0.22 | 0.22 | 0.22 | 0.73 | 0.19 | 0.19 | 0.41 | 1075 | 200 |
| 3 | 0.22 | 0.22 | 0.22 | 0.72 | 0.20 | 0.20 | 0.42 | 1050 | 200 |
| 4 | 0.24 | 0.24 | 0.24 | 0.74 | 0.22 | 0.22 | 0.46 | 800 | 250 |
| 5 | 0.21 | 0.21 | 0.21 | 0.73 | 0.20 | 0.20 | 0.40 | 1000 | 150 |
| 6 | 0.24 | 0.24 | 0.24 | 0.73 | 0.23 | 0.23 | 0.47 | 775 | 300 |

TABLE 8-continued

Properties

| Alloy | 1 | 2 | 3 | 4 | 5 | 6 | 7 | 8 | 9 |
|---|---|---|---|---|---|---|---|---|---|
| 7 | 0.26 | 0.26 | 0.26 | 0.73 | 0.25 | 0.25 | 0.51 | 800 | 300 |
| 8 | 0.19 | 0.19 | 0.19 | 0.75 | 0.20 | 0.20 | 0.39 | 1000 | 150 |
| 9 | 0.21 | 0.21 | 0.21 | 0.75 | 0.24 | 0.24 | 0.45 | 775 | 300 |
| 10 | 0.21 | 0.21 | 0.21 | 0.74 | 0.24 | 0.24 | 0.45 | 750 | 350 |
| 11 | 0.20 | 0.20 | 0.20 | 0.75 | 0.18 | 0.18 | 0.39 | 1050 | 200 |
| 12 | 0.20 | 0.20 | 0.20 | 0.74 | 0.20 | 0.20 | 0.41 | 1050 | 200 |
| 13 | 0.18 | 0.18 | 0.18 | 0.75 | 0.16 | 0.16 | 0.36 | 1075 | 200 |
| 14 | 0.19 | 0.19 | 0.19 | 0.73 | 0.18 | 0.18 | 0.37 | 1050 | 150 |
| 15 | 0.19 | 0.19 | 0.19 | 0.73 | 0.16 | 0.16 | 0.35 | 1000 | 150 |
| 16 | 0.22 | 0.22 | 0.22 | 0.72 | 0.21 | 0.21 | 0.62 | 1000 | 300 |
| 17 | 0.26 | 0.26 | 0.26 | 0.70 | 0.22 | 0.22 | 0.51 | 1025 | 350 |
| 18 | 0.24 | 0.24 | 0.24 | 0.72 | 0.23 | 0.23 | 0.52 | 1000 | 300 |
| 19 | 0.24 | 0.24 | 0.24 | 0.73 | 0.23 | 0.23 | 0.48 | 1000 | 250 |
| 20 | 0.22 | 0.22 | 0.22 | 0.74 | 0.21 | 0.21 | 0.44 | 775 | 250 |
| 21 | 0.13 | 0.13 | 0.13 | 0.74 | 0.23 | 0.23 | 0.35 | 775 | 150 |
| 22 | 0.14 | 0.14 | 0.14 | 0.74 | 0.25 | 0.25 | 0.39 | 775 | 250 |
| 23 | 0.18 | 0.18 | 0.18 | 0.73 | 0.15 | 0.15 | 0.33 | 1050 | 150 |
| 24 | 0.18 | 0.18 | 0.18 | 0.76 | 0.17 | 0.17 | 0.35 | 800 | 150 |
| 25 | 0.16 | 0.16 | 0.16 | 0.73 | 0.15 | 0.15 | 0.30 | 775 | 50 |
| 26 | 0.13 | 0.13 | 0.12 | 0.72 | 0.11 | 0.11 | 0.24 | 1150 | 0 |
| 27 | 0.13 | 0.13 | 0.13 | 0.72 | 0.11 | 0.11 | 0.24 | 1100 | 0 |
| 28 | 0.11 | 0.11 | 0.11 | 0.74 | 0.19 | 0.19 | 0.31 | 800 | 100 |
| 29 | 0.23 | 0.23 | 0.23 | 0.75 | 0.22 | 0.22 | 0.45 | 800 | 250 |
| 30 | 0.23 | 0.23 | 0.23 | 0.76 | 0.24 | 0.24 | 0.47 | 800 | 250 |
| 31 | 0.21 | 0.21 | 0.21 | 0.74 | 0.18 | 0.18 | 0.39 | 1000 | 200 |

TABLE 8-continued

Properties

| Alloy | 1 | 2 | 3 | 4 | 5 | 6 | 7 | 8 | 9 |
|---|---|---|---|---|---|---|---|---|---|
| 32 | 0.21 | 0.21 | 0.21 | 0.77 | 0.23 | 0.23 | 0.44 | 825 | 250 |
| 33 | 0.22 | 0.22 | 0.22 | 0.73 | 0.17 | 0.17 | 0.39 | 750 | 250 |
| 34 | 0.16 | 0.16 | 0.16 | 0.74 | 0.13 | 0.13 | 0.29 | 1100 | 100 |
| 35 | 0.22 | 0.22 | 0.22 | 0.75 | 0.20 | 0.20 | 0.42 | 775 | 200 |
| 36 | 0.18 | 0.18 | 0.18 | 0.75 | 0.15 | 0.15 | 0.33 | 1025 | 150 |
| 37 | 0.18 | 0.18 | 0.18 | 0.73 | 0.16 | 0.16 | 0.35 | 1025 | 150 |
| 38 | 0.17 | 0.17 | 0.17 | 0.71 | 0.15 | 0.15 | 0.35 | 1100 | 150 |
| 39 | 0.23 | 0.23 | 0.23 | 0.77 | 0.24 | 0.24 | 0.47 | 825 | 250 |
| 40 | 0.21 | 0.21 | 0.21 | 0.74 | 0.18 | 0.18 | 0.39 | 800 | 200 |
| 41 | 0.22 | 0.22 | 0.22 | 0.77 | 0.23 | 0.23 | 0.45 | 800 | 250 |
| 42 | 0.22 | 0.22 | 0.22 | 0.77 | 0.24 | 0.24 | 0.46 | 825 | 250 |
| 43 | 0.24 | 0.24 | 0.24 | 0.76 | 0.17 | 0.17 | 0.41 | 1350 | 300 |
| Wallin #1 | 0.00 | 0.00 | 0.00 | 0.04 | 0.03 | 0.00 | 0.71 | 1037.5 | 500 |
| Wallin #2 | 0.00 | 0.00 | 0.00 | 0.04 | 0.03 | 0.00 | 0.67 | 1037.5 | 475 |

Table 9 below describes the bulk equilibrium thermodynamic chemistry of the boride phase in the alloys described above.

TABLE 9

Bulk Equilibrium Thermodynamic Chemistry of Boride Phases

| No | B | Cr | Fe | Mo | Ni | W |
|---|---|---|---|---|---|---|
| 1 | 0.0817 | 0 | 0.2351 | 0.6833 | 0 | 0 |
| 2 | 0.0823 | 0 | 0.2462 | 0.6704 | 0.0011 | 0 |
| 3 | 0.0829 | 0 | 0.2588 | 0.6567 | 0.0016 | 0 |
| 4 | 0.0818 | 0 | 0.2375 | 0.6797 | 0.0009 | 0 |
| 5 | 0.0821 | 0 | 0.2427 | 0.6741 | 0.0011 | 0 |
| 6 | 0.0821 | 0 | 0.2425 | 0.6741 | 0.0013 | 0 |
| 7 | 0.0821 | 0 | 0.2432 | 0.6733 | 0.0013 | 0 |
| 8 | 0.0815 | 0 | 0.2315 | 0.6862 | 0.0008 | 0 |
| 9 | 0.0816 | 0 | 0.2324 | 0.6852 | 0.0009 | 0 |
| 10 | 0.0817 | 0 | 0.2354 | 0.6818 | 0.001 | 0 |
| 11 | 0.0814 | 0 | 0.2302 | 0.6883 | 0 | 0 |
| 12 | 0.0821 | 0 | 0.2428 | 0.6751 | 0 | 0 |
| 13 | 0.0814 | 0 | 0.2307 | 0.6878 | 0 | 0 |
| 14 | 0.0821 | 0 | 0.2439 | 0.674 | 0 | 0 |
| 15 | 0.0821 | 0 | 0.2433 | 0.6736 | 0.0009 | 0 |
| 16 | 0.0829 | 0 | 0.2574 | 0.658 | 0.0018 | 0 |
| 17 | 0.0836 | 0 | 0.2711 | 0.6431 | 0.0023 | 0 |
| 18 | 0.0829 | 0 | 0.2586 | 0.6566 | 0.0019 | 0 |
| 19 | 0.0823 | 0 | 0.2465 | 0.6699 | 0.0013 | 0 |
| 20 | 0.0817 | 0 | 0.2355 | 0.682 | 0.0008 | 0 |
| 21 | 0.0818 | 0.0118 | 0.2235 | 0.6825 | 0.0004 | 0 |
| 22 | 0.0818 | 0.0121 | 0.2234 | 0.6822 | 0.0004 | 0 |
| 23 | 0.0821 | 0 | 0.2427 | 0.6745 | 0.0007 | 0 |
| 24 | 0.0808 | 0 | 0.2181 | 0.7008 | 0.0002 | 0 |
| 25 | 0.0823 | 0 | 0.2468 | 0.6703 | 0.0006 | 0 |
| 26 | 0.0827 | 0 | 0.2544 | 0.6623 | 0.0006 | 0 |
| 27 | 0.0828 | 0 | 0.2578 | 0.6587 | 0.0006 | 0 |
| 28 | 0.0818 | 0.0108 | 0.2247 | 0.6824 | 0.0003 | 0 |
| 29 | 0.0812 | 0 | 0.2247 | 0.6936 | 0.0005 | 0 |
| 30 | 0.081 | 0 | 0.2205 | 0.6982 | 0.0004 | 0 |
| 31 | 0.0821 | 0 | 0.2423 | 0.6747 | 0.0009 | 0 |
| 32 | 0.0805 | 0 | 0.2122 | 0.7071 | 0.0001 | 0 |
| 33 | 0.0822 | 0 | 0.2449 | 0.6718 | 0.0011 | 0 |
| 34 | 0.0819 | 0 | 0.2392 | 0.6784 | 0.0005 | 0 |
| 35 | 0.0815 | 0 | 0.2317 | 0.686 | 0.0007 | 0 |
| 36 | 0.0814 | 0 | 0.2302 | 0.6879 | 0.0004 | 0 |
| 37 | 0.0823 | 0 | 0.2475 | 0.6694 | 0.0008 | 0 |
| 38 | 0.0833 | 0 | 0.2661 | 0.6496 | 0.0011 | 0 |
| 39 | 0.0807 | 0 | 0.2157 | 0.7033 | 0.0003 | 0 |
| 40 | 0.0819 | 0 | 0.2399 | 0.6773 | 0.0009 | 0 |
| 41 | 0.0807 | 0 | 0.2153 | 0.7037 | 0.0002 | 0 |
| 42 | 0.0805 | 0 | 0.2124 | 0.7069 | 0.0001 | 0 |
| 43 | 0.0798 | 0.0126 | 0.2046 | 0.6711 | 0.0003 | 0.032 |
| Wallin #1 | 0.0862 | 0 | 0.8657 | 0.0191 | 0.0098 | 0.019 |
| Wallin #2 | 0.0861 | 0.0003 | 0.8648 | 0.0198 | 0.0089 | 0.02 |

Table 10 and Table 11 show the chemistries and thermodynamic criteria for a list of alloys which meet the thermodynamic embodiments of this disclosure. Table 10 lists alloys where the isolated carbides may include but are not entirely composed of vanadium carbides. Titanium carbide and vanadium carbide are not limiting examples of potential isolated carbides. Table 11 lists alloys where all the isolated carbides are composed of vanadium carbide.

The column labeled "1" is the mole fraction of complex boride where the metallic constituent comprises Mo+W≥15 wt %. The column labeled "2" is the mole fraction of complex boride where the metallic constituent comprises Mo+W≥25 wt %. The column labeled "3" is the mole fraction of complex boride where the metallic constituent comprises Mo+W≥50 wt %. The column labeled "4" is the weight percent of Mo+W in the metallic component of the complex boride. The column labeled "5" is the mole fraction of isolated carbide. The column labeled "6" is the mole fraction of vanadium carbide. The column labeled "7" is the total hard phase mole fraction. The column labeled "8" is the FCC-BCC transition temperature. The column labeled "9" is the melt range of the alloy.

TABLE 10

Compositions and thermodynamic criteria for isolated carbides

| No | B | C | Fe | Mo | Nb | Ti | V | 1 | 2 | 3 | 4 | 5 | 6 | 7 | 8 | 9 |
|---|---|---|---|---|---|---|---|---|---|---|---|---|---|---|---|---|
| M1 | 1.8 | 2.2 | 79.5 | 15 | 0.5 | 0 | 1 | 19.4% | 19.4% | 19.4% | 75.9% | 2.6% | 2.2% | 43.0% | 1025 | 200 |
| M2 | 1.8 | 2.2 | 79 | 15 | 0.5 | 0 | 1.5 | 19.5% | 19.5% | 19.5% | 75.8% | 3.8% | 3.7% | 41.7% | 1025 | 200 |
| M3 | 1.8 | 2.2 | 78 | 15 | 1.5 | 0.5 | 1 | 19.7% | 19.7% | 19.7% | 75.7% | 4.7% | 3.2% | 40.4% | 1025 | 450 |
| M4 | 1.8 | 2.2 | 77.5 | 15 | 2 | 0.5 | 1 | 19.8% | 19.8% | 19.8% | 75.7% | 5.3% | 4.0% | 39.8% | 1025 | 450 |
| M5 | 1.8 | 2.2 | 77.5 | 15 | 1.5 | 0.5 | 1.5 | 16.4% | 16.4% | 16.4% | 76.5% | 5.8% | 2.9% | 22.2% | 1025 | 550 |
| M6 | 1.8 | 2.2 | 77.5 | 15 | 1.5 | 0 | 2 | 16.3% | 16.3% | 16.3% | 76.5% | 6.1% | 4.6% | 22.4% | 1025 | 550 |
| M7 | 1.8 | 2.2 | 77 | 15 | 2 | 1 | 1 | 19.9% | 19.9% | 19.9% | 75.5% | 6.4% | 5.8% | 38.5% | 1025 | 450 |
| M8 | 1.8 | 2.2 | 77 | 15 | 2 | 0 | 2 | 16.7% | 16.7% | 16.7% | 76.4% | 6.7% | 4.3% | 23.4% | 1025 | 550 |
| M9 | 1.8 | 2.2 | 77.5 | 15 | 0.5 | 0.5 | 2.5 | 19.6% | 19.6% | 19.6% | 75.3% | 6.9% | 6.8% | 38.3% | 1025 | 250 |
| M10 | 1.8 | 2.2 | 76.5 | 15 | 2.5 | 0.5 | 1.5 | 17.2% | 17.0% | 17.0% | 76.4% | 7.0% | 4.6% | 24.2% | 1025 | 550 |
| M11 | 1.8 | 2.2 | 76 | 15 | 3.5 | 0 | 1.5 | 20.1% | 20.1% | 20.1% | 75.4% | 7.4% | 5.2% | 38.3% | 1025 | 450 |
| M12 | 1.8 | 2.2 | 76.5 | 15 | 2 | 1 | 1.5 | 20.0% | 20.0% | 20.0% | 75.3% | 7.5% | 5.1% | 37.6% | 1025 | 450 |
| M13 | 1.8 | 2.2 | 75.5 | 15 | 4 | 0.5 | 1 | 20.3% | 20.3% | 20.3% | 75.4% | 7.7% | 7.0% | 37.6% | 1025 | 450 |
| M14 | 1.8 | 2.2 | 75.5 | 15 | 4 | 0 | 1.5 | 20.3% | 20.3% | 20.3% | 75.3% | 8.0% | 6.0% | 37.8% | 1025 | 450 |
| M15 | 1.8 | 2.2 | 76 | 15 | 3 | 0 | 2 | 18.4% | 17.0% | 17.0% | 76.4% | 8.1% | 4.0% | 26.4% | 1025 | 550 |

TABLE 10-continued

Compositions and thermodynamic criteria for isolated carbides

| No | B | C | Fe | Mo | Nb | Ti | V | 1 | 2 | 3 | 4 | 5 | 6 | 7 | 8 | 9 |
|---|---|---|---|---|---|---|---|---|---|---|---|---|---|---|---|---|
| M16 | 1.8 | 2.2 | 75.5 | 15 | 3.5 | 0.5 | 1.5 | 18.9% | 17.4% | 17.4% | 76.4% | 8.3% | 6.1% | 27.2% | 1025 | 550 |
| M17 | 1.8 | 2.2 | 76 | 15 | 2 | 1.5 | 1.5 | 20.1% | 20.1% | 20.1% | 75.1% | 8.5% | 7.5% | 36.5% | 1025 | 450 |
| M18 | 1.8 | 2.2 | 75 | 15 | 4.5 | 0 | 1.5 | 20.4% | 20.4% | 20.4% | 75.2% | 8.6% | 6.8% | 37.3% | 1025 | 450 |
| M19 | 1.8 | 2.2 | 74.5 | 15 | 5 | 0.5 | 1 | 20.6% | 20.6% | 20.6% | 75.1% | 8.9% | 8.6% | 36.7% | 1025 | 450 |
| M20 | 1.8 | 2.2 | 76 | 15 | 1.5 | 1 | 2.5 | 20.1% | 20.1% | 20.1% | 74.9% | 9.0% | 5.8% | 36.4% | 1025 | 450 |
| M21 | 1.8 | 2.2 | 75.5 | 15 | 2.5 | 1 | 2 | 20.3% | 20.3% | 20.3% | 74.9% | 9.1% | 5.5% | 36.3% | 1025 | 450 |
| M22 | 1.8 | 2.2 | 74.5 | 15 | 4.5 | 1 | 1 | 20.6% | 20.6% | 20.6% | 75.0% | 9.2% | 9.1% | 36.2% | 1025 | 400 |
| M23 | 1.8 | 2.2 | 76 | 15 | 1.5 | 0 | 3.5 | 20.1% | 20.1% | 20.1% | 74.8% | 9.5% | 8.5% | 36.8% | 1025 | 450 |
| M24 | 1.8 | 2.2 | 75.5 | 15 | 2 | 1 | 2.5 | 20.3% | 20.3% | 20.3% | 74.8% | 9.5% | 5.3% | 36.0% | 1025 | 450 |
| M25 | 1.8 | 2.2 | 75 | 15 | 3 | 1 | 2 | 20.4% | 20.4% | 20.4% | 74.8% | 9.6% | 6.3% | 35.9% | 1025 | 450 |
| M26 | 1.8 | 2.2 | 74.5 | 15 | 4 | 0.5 | 2 | 20.6% | 20.6% | 20.6% | 74.8% | 9.9% | 6.6% | 36.1% | 1025 | 450 |
| M27 | 1.8 | 2.2 | 75 | 15 | 2.5 | 1.5 | 2 | 20.5% | 20.5% | 20.5% | 74.6% | 10.1% | 7.0% | 35.5% | 1025 | 450 |
| M28 | 1.8 | 2.2 | 74.5 | 15 | 3.5 | 1.5 | 1.5 | 20.6% | 20.6% | 20.6% | 74.7% | 10.1% | 9.0% | 35.4% | 1025 | 400 |
| M29 | 1.8 | 2.2 | 74 | 15 | 4.5 | 1 | 1.5 | 20.8% | 20.8% | 20.8% | 74.7% | 10.3% | 8.8% | 35.5% | 1025 | 400 |
| M30 | 1.8 | 2.2 | 74 | 15 | 4.5 | 0.5 | 2 | 20.7% | 20.7% | 20.7% | 74.6% | 10.4% | 7.4% | 35.8% | 1025 | 450 |
| M31 | 1.8 | 2.2 | 75 | 15 | 2 | 1 | 3 | 20.5% | 20.5% | 20.5% | 74.4% | 10.5% | 4.0% | 35.4% | 1025 | 450 |
| M32 | 1.8 | 2.2 | 74.5 | 15 | 3.5 | 0 | 3 | 20.6% | 20.6% | 20.6% | 74.5% | 10.7% | 6.2% | 36.0% | 1025 | 450 |
| M33 | 1.8 | 2.2 | 74 | 15 | 4 | 1 | 2 | 20.8% | 20.8% | 20.8% | 74.5% | 10.8% | 7.9% | 35.3% | 1025 | 450 |
| M34 | 1.8 | 2.2 | 74 | 15 | 4 | 0.5 | 2.5 | 20.8% | 20.8% | 20.8% | 74.4% | 10.9% | 4.5% | 35.6% | 1025 | 450 |
| M35 | 1.8 | 2.2 | 73.5 | 15 | 5 | 0.5 | 2 | 20.9% | 20.9% | 20.9% | 74.4% | 11.0% | 8.1% | 35.5% | 1025 | 450 |
| M36 | 1.8 | 2.2 | 75 | 15 | 1.5 | 0.5 | 4 | 20.5% | 20.5% | 20.5% | 74.2% | 11.1% | 9.2% | 35.4% | 1025 | 450 |
| M37 | 1.8 | 2.2 | 74 | 15 | 3.5 | 1.5 | 2 | 20.8% | 20.8% | 20.8% | 74.3% | 11.1% | 8.6% | 35.0% | 1025 | 450 |
| M38 | 1.8 | 2.2 | 73.5 | 15 | 5 | 0 | 2.5 | 20.9% | 20.9% | 20.9% | 74.4% | 11.3% | 4.2% | 35.7% | 1025 | 450 |
| M39 | 1.8 | 2.2 | 73 | 15 | 5.5 | 1 | 1.5 | 21.1% | 21.1% | 21.1% | 74.3% | 11.4% | 10.3% | 35.1% | 1025 | 400 |
| M40 | 1.8 | 2.2 | 75 | 15 | 1.5 | 0 | 4.5 | 20.5% | 20.5% | 20.5% | 74.2% | 11.5% | 10.8% | 35.7% | 1025 | 450 |
| M41 | 1.8 | 2.2 | 74.5 | 15 | 2 | 1 | 3.5 | 20.7% | 20.7% | 20.7% | 74.0% | 11.5% | 7.8% | 35.0% | 1025 | 450 |
| M42 | 1.8 | 2.2 | 74 | 15 | 3 | 1.5 | 2.5 | 20.9% | 20.9% | 20.9% | 74.0% | 11.6% | 7.3% | 34.9% | 1025 | 450 |
| M43 | 1.8 | 2.2 | 73.5 | 15 | 4.5 | 0 | 3 | 21.0% | 21.0% | 21.0% | 74.2% | 11.8% | 5.7% | 35.6% | 1025 | 450 |
| M44 | 1.8 | 2.2 | 74.5 | 15 | 1.5 | 1.5 | 3.5 | 20.7% | 20.7% | 20.7% | 73.8% | 11.9% | 9.0% | 34.8% | 1025 | 450 |
| M45 | 1.8 | 2.2 | 74.5 | 15 | 2 | 0 | 4.5 | 20.7% | 20.7% | 20.7% | 73.9% | 12.0% | 10.5% | 35.5% | 1025 | 450 |
| M46 | 1.8 | 2.2 | 73 | 15 | 6 | 0 | 2 | 22.5% | 17.9% | 17.9% | 76.4% | 12.0% | 9.1% | 34.5% | 1025 | 550 |
| M47 | 1.8 | 2.2 | 74 | 15 | 3 | 0 | 4 | 20.8% | 20.8% | 20.8% | 73.9% | 12.1% | 8.8% | 35.5% | 1025 | 450 |
| M48 | 1.8 | 2.2 | 72.5 | 15 | 6.5 | 0.5 | 1.5 | 22.4% | 18.3% | 18.3% | 76.4% | 12.2% | 10.8% | 34.6% | 1025 | 500 |
| M49 | 1.8 | 2.2 | 73 | 15 | 4.5 | 1.5 | 2 | 21.2% | 21.2% | 21.2% | 73.8% | 12.3% | 10.0% | 34.8% | 1025 | 400 |
| M50 | 1.8 | 2.2 | 73 | 15 | 4.5 | 1 | 2.5 | 21.2% | 21.2% | 21.2% | 73.8% | 12.3% | 8.4% | 34.9% | 1025 | 450 |
| M51 | 1.8 | 2.2 | 74.5 | 15 | 1.5 | 0 | 5 | 20.8% | 20.8% | 20.8% | 73.7% | 12.4% | 11.8% | 35.4% | 1025 | 400 |
| M52 | 1.8 | 2.2 | 72.5 | 15 | 6.5 | 0 | 2 | 22.5% | 18.1% | 18.1% | 76.4% | 12.5% | 9.9% | 35.0% | 1025 | 500 |
| M53 | 1.8 | 2.2 | 72 | 15 | 6.5 | 1 | 1.5 | 21.5% | 21.5% | 21.5% | 73.8% | 12.6% | 11.7% | 34.9% | 1025 | 400 |
| M54 | 1.8 | 2.2 | 73.5 | 15 | 3.5 | 0 | 4 | 21.1% | 21.1% | 21.1% | 73.7% | 12.6% | 8.5% | 35.4% | 1025 | 450 |
| M55 | 1.8 | 2.2 | 72 | 15 | 6.5 | 0.5 | 2 | 21.5% | 21.5% | 21.5% | 73.7% | 12.7% | 10.4% | 35.1% | 1025 | 400 |
| M56 | 1.8 | 2.2 | 74 | 15 | 1.5 | 1.5 | 4 | 21.0% | 21.0% | 21.0% | 73.3% | 12.8% | 10.2% | 34.7% | 1025 | 450 |
| M57 | 1.8 | 2.2 | 72.5 | 15 | 5.5 | 0 | 3 | 21.4% | 21.4% | 21.4% | 73.7% | 12.9% | 5.2% | 35.4% | 1025 | 450 |
| M58 | 1.8 | 2.2 | 73.5 | 15 | 2.5 | 2 | 3 | 21.2% | 21.2% | 21.2% | 73.3% | 12.9% | 5.7% | 34.6% | 1025 | 450 |
| M59 | 1.8 | 2.2 | 72 | 15 | 6 | 1 | 2 | 21.6% | 21.6% | 21.6% | 73.5% | 13.0% | 10.8% | 35.0% | 1025 | 400 |
| M60 | 1.8 | 2.2 | 73 | 15 | 3.5 | 1.5 | 3 | 21.3% | 21.3% | 21.3% | 73.3% | 13.1% | 7.8% | 34.7% | 1025 | 450 |
| M61 | 1.8 | 2.2 | 73 | 15 | 4 | 0 | 4 | 21.3% | 21.3% | 21.3% | 73.5% | 13.2% | 8.3% | 35.3% | 1025 | 450 |
| M62 | 1.8 | 2.2 | 74 | 15 | 1 | 1 | 5 | 21.1% | 21.1% | 21.1% | 73.1% | 13.2% | 12.5% | 34.8% | 1025 | 400 |
| M63 | 1.8 | 2.2 | 72.5 | 15 | 4.5 | 1 | 3 | 21.5% | 21.5% | 21.5% | 73.3% | 13.3% | 8.1% | 34.9% | 1025 | 450 |
| M64 | 1.8 | 2.2 | 72 | 15 | 5.5 | 2 | 1.5 | 21.6% | 21.6% | 21.6% | 73.4% | 13.3% | 13.3% | 34.9% | 1025 | 400 |
| M65 | 1.8 | 2.2 | 72 | 15 | 5.5 | 1 | 2.5 | 21.6% | 21.6% | 21.6% | 73.2% | 13.4% | 9.8% | 35.0% | 1025 | 400 |
| M66 | 1.8 | 2.2 | 71.5 | 15 | 6.5 | 1.5 | 1.5 | 21.7% | 21.7% | 21.7% | 73.4% | 13.5% | 13.0% | 35.2% | 1025 | 400 |
| M67 | 1.8 | 2.2 | 71.5 | 15 | 7.5 | 0 | 2 | 22.5% | 18.4% | 18.4% | 76.4% | 13.5% | 11.3% | 36.0% | 1025 | 500 |
| M68 | 1.8 | 2.2 | 72.5 | 15 | 4 | 2 | 2.5 | 21.5% | 21.5% | 21.5% | 73.2% | 13.6% | 10.4% | 35.1% | 1025 | 400 |
| M69 | 1.8 | 2.8 | 71 | 15 | 7.5 | 1 | 1.5 | 21.8% | 21.8% | 21.8% | 73.4% | 13.7% | 13.1% | 35.5% | 1025 | 400 |
| M70 | 1.8 | 2.2 | 73.5 | 15 | 1.5 | 1 | 5 | 21.3% | 21.3% | 21.3% | 72.9% | 13.7% | 11.6% | 35.0% | 1025 | 450 |
| M71 | 1.8 | 2.2 | 71 | 15 | 7.5 | 0.5 | 2 | 21.8% | 21.8% | 21.8% | 73.4% | 13.8% | 11.8% | 35.6% | 1025 | 400 |
| M72 | 1.8 | 2.2 | 73 | 15 | 2.5 | 1.5 | 4 | 21.3% | 21.3% | 21.3% | 73.0% | 13.9% | 8.5% | 35.2% | 1025 | 450 |
| M73 | 1.8 | 2.2 | 73 | 15 | 2.5 | 1 | 4.5 | 21.3% | 21.3% | 21.3% | 73.0% | 13.9% | 9.6% | 35.2% | 1025 | 450 |
| M74 | 1.8 | 2.2 | 72.5 | 15 | 3.5 | 2 | 3 | 21.4% | 21.4% | 21.4% | 73.2% | 14.0% | 9.1% | 35.4% | 1025 | 400 |
| M75 | 1.8 | 2.2 | 72.5 | 15 | 3.5 | 2.5 | 2.5 | 21.4% | 21.4% | 21.4% | 73.2% | 14.0% | 11.8% | 35.4% | 1025 | 400 |
| M76 | 1.8 | 2.2 | 71.5 | 15 | 6 | 0.5 | 3 | 21.7% | 21.7% | 21.7% | 73.2% | 14.1% | 9.2% | 35.7% | 1025 | 400 |
| M77 | 1.8 | 2.2 | 72 | 15 | 4.5 | 2 | 2.5 | 21.5% | 21.5% | 21.5% | 73.3% | 14.1% | 11.1% | 35.7% | 1025 | 400 |
| M78 | 1.8 | 2.2 | 72 | 15 | 5 | 0 | 4 | 21.6% | 21.6% | 21.6% | 73.1% | 14.2% | 7.7% | 35.8% | 1025 | 450 |
| M79 | 1.8 | 2.2 | 73 | 15 | 2 | 2 | 4 | 21.3% | 21.3% | 21.3% | 73.0% | 14.2% | 9.7% | 35.5% | 1025 | 450 |
| M80 | 1.8 | 2.2 | 71.5 | 15 | 6 | 0 | 3.5 | 21.7% | 21.7% | 21.7% | 73.2% | 14.3% | 6.1% | 36.0% | 1025 | 450 |
| M81 | 1.8 | 2.2 | 71.5 | 15 | 5.5 | 1 | 3 | 21.6% | 21.6% | 21.6% | 73.3% | 14.3% | 9.6% | 36.0% | 1025 | 400 |
| M82 | 1.8 | 2.2 | 71 | 15 | 7 | 0 | 4.5 | 21.8% | 21.8% | 21.8% | 73.3% | 14.4% | 4.5% | 36.2% | 1025 | 400 |
| M83 | 1.8 | 2.2 | 71 | 15 | 6.5 | 1 | 2.5 | 21.7% | 21.7% | 21.7% | 73.3% | 14.5% | 11.2% | 36.2% | 1025 | 400 |
| M84 | 1.8 | 2.2 | 72 | 15 | 4 | 1.5 | 3.5 | 21.5% | 21.5% | 21.5% | 73.2% | 14.5% | 8.3% | 36.0% | 1025 | 400 |
| M85 | 1.8 | 2.2 | 73 | 15 | 1.5 | 1.5 | 5 | 21.2% | 21.2% | 21.2% | 73.0% | 14.6% | 12.4% | 35.8% | 1025 | 450 |
| M86 | 1.8 | 2.2 | 73 | 15 | 1.5 | 1 | 5.5 | 21.3% | 21.3% | 21.3% | 72.9% | 14.6% | 12.7% | 35.9% | 1025 | 450 |
| M87 | 1.8 | 2.2 | 71.5 | 15 | 5 | 2 | 2.5 | 21.6% | 21.6% | 21.6% | 73.3% | 14.7% | 11.8% | 36.2% | 1025 | 400 |
| M88 | 1.8 | 2.2 | 72.5 | 15 | 2.5 | 2 | 4 | 21.3% | 21.3% | 21.3% | 73.1% | 14.8% | 8.7% | 36.1% | 1025 | 450 |
| M89 | 1.8 | 2.2 | 72.5 | 15 | 2.5 | 2.5 | 3.5 | 21.3% | 21.3% | 21.3% | 73.1% | 14.8% | 7.8% | 36.1% | 1025 | 400 |
| M90 | 1.8 | 2.2 | 70 | 15 | 8.5 | 0.5 | 2 | 21.9% | 21.9% | 21.9% | 73.5% | 14.9% | 13.2% | 36.8% | 1025 | 400 |
| M91 | 1.8 | 2.2 | 72 | 15 | 4 | 0 | 5 | 21.5% | 21.5% | 21.5% | 73.1% | 14.9% | 10.3% | 36.4% | 1025 | 450 |

TABLE 10-continued

Compositions and thermodynamic criteria for isolated carbides

| No | B | C | Fe | Mo | Nb | Ti | V | 1 | 2 | 3 | 4 | 5 | 6 | 7 | 8 | 9 |
|---|---|---|---|---|---|---|---|---|---|---|---|---|---|---|---|---|
| M92 | 1.8 | 2.2 | 73 | 15 | 1 | 1 | 6 | 21.2% | 21.2% | 21.2% | 72.9% | 15.0% | 14.4% | 36.2% | 1025 | 400 |
| M93 | 1.8 | 2.2 | 70 | 15 | 9 | 0 | 2 | 22.6% | 18.8% | 18.8% | 76.5% | 15.0% | 13.4% | 37.6% | 1025 | 500 |
| M94 | 1.8 | 2.2 | 73 | 15 | 1 | 0.5 | 6.5 | 21.2% | 21.2% | 21.2% | 72.9% | 15.0% | 14.6% | 36.2% | 1025 | 350 |
| M95 | 1.8 | 2.2 | 72.5 | 15 | 2 | 1.5 | 5 | 21.3% | 21.3% | 21.3% | 73.1% | 15.1% | 11.5% | 36.4% | 1025 | 450 |
| M96 | 1.8 | 2.2 | 72.5 | 15 | 2.5 | 0 | 6 | 21.4% | 21.4% | 21.4% | 73.0% | 15.1% | 13.0% | 36.5% | 1025 | 450 |
| M97 | 1.8 | 2.2 | 71 | 15 | 5.5 | 2 | 2.5 | 21.6% | 21.6% | 21.6% | 73.4% | 15.2% | 12.5% | 36.8% | 1025 | 400 |
| M98 | 1.8 | 2.2 | 72 | 15 | 3.5 | 0 | 5.5 | 21.4% | 21.4% | 21.4% | 73.1% | 15.3% | 11.5% | 36.7% | 1025 | 450 |
| M99 | 1.8 | 2.2 | 70.5 | 15 | 7 | 0 | 3.5 | 21.8% | 21.8% | 21.8% | 73.3% | 15.3% | 5.7% | 37.0% | 1025 | 400 |
| M100 | 1.8 | 2.2 | 70.5 | 15 | 6.5 | 1.5 | 2.5 | 21.7% | 21.7% | 21.7% | 73.4% | 15.4% | 12.4% | 37.0% | 1025 | 400 |
| M101 | 1.8 | 2.2 | 70.5 | 15 | 6.5 | 1 | 3 | 21.7% | 21.7% | 21.7% | 73.4% | 15.4% | 11.0% | 37.1% | 1025 | 400 |
| M102 | 1.8 | 2.2 | 72.5 | 15 | 1.5 | 1.5 | 5.5 | 21.2% | 21.2% | 21.2% | 73.1% | 15.4% | 13.4% | 36.7% | 1025 | 450 |
| M103 | 1.8 | 2.2 | 72.5 | 15 | 2 | 0 | 6.5 | 21.3% | 21.3% | 21.3% | 73.0% | 15.5% | 1.3% | 36.8% | 1025 | 450 |
| M104 | 1.8 | 2.2 | 70 | 15 | 7.5 | 1.5 | 2 | 21.8% | 21.8% | 21.8% | 73.5% | 15.5% | 14.0% | 37.3% | 1025 | 400 |
| M105 | 1.8 | 2.2 | 71 | 15 | 5 | 2 | 3 | 21.5% | 21.5% | 21.5% | 73.4% | 15.6% | 11.4% | 37.1% | 1025 | 400 |
| M106 | 1.8 | 2.2 | 72 | 15 | 2.5 | 1.5 | 5 | 21.3% | 21.3% | 21.3% | 73.1% | 15.6% | 10.8% | 36.9% | 1025 | 450 |
| M107 | 1.8 | 2.2 | 69.5 | 15 | 8.5 | 1.5 | 1.5 | 21.9% | 21.9% | 21.9% | 73.6% | 15.6% | 15.6% | 37.5% | 1025 | 400 |
| M108 | 1.8 | 2.2 | 70.5 | 15 | 6 | 2 | 2.5 | 21.6% | 21.6% | 21.6% | 73.5% | 15.7% | 13.1% | 37.3% | 1025 | 400 |
| M109 | 1.8 | 2.2 | 70.5 | 15 | 6 | 1 | 3.5 | 21.6% | 21.6% | 21.6% | 73.4% | 15.8% | 10.1% | 37.4% | 1025 | 400 |
| M110 | 1.8 | 2.2 | 70 | 15 | 7.5 | 0 | 3.5 | 21.8% | 21.8% | 21.8% | 73.3% | 15.8% | 10.3% | 37.6% | 1025 | 400 |
| M111 | 1.8 | 2.2 | 71.5 | 15 | 3.5 | 2.5 | 3.5 | 21.4% | 21.4% | 21.4% | 73.3% | 15.8% | 10.1% | 37.2% | 1025 | 400 |
| M112 | 1.8 | 2.2 | 71.5 | 15 | 3.5 | 3 | 3 | 21.4% | 21.4% | 21.4% | 73.4% | 15.8% | 13.3% | 37.2% | 1025 | 400 |
| M113 | 1.8 | 2.2 | 69 | 15 | 9.5 | 0.5 | 2 | 22.0% | 22.0% | 22.0% | 73.5% | 15.9% | 14.6% | 37.9% | 1025 | 400 |
| M114 | 1.8 | 2.2 | 72 | 15 | 2 | 1.5 | 5.5 | 21.3% | 21.3% | 21.3% | 73.1% | 15.9% | 12.5% | 37.2% | 1050 | 450 |
| M115 | 1.8 | 2.2 | 69 | 15 | 10 | 0 | 2 | 22.6% | 19.1% | 19.1% | 76.5% | 16.0% | 14.7% | 38.6% | 1025 | 500 |
| M116 | 1.8 | 2.2 | 71 | 15 | 4.5 | 3 | 2.5 | 21.5% | 21.5% | 21.5% | 73.5% | 16.0% | 15.1% | 37.5% | 1050 | 400 |
| M117 | 1.8 | 2.2 | 69.5 | 15 | 8 | 1 | 2.5 | 21.8% | 21.8% | 21.8% | 73.5% | 16.1% | 13.3% | 37.9% | 1025 | 400 |
| M118 | 1.8 | 2.2 | 70.5 | 15 | 5.5 | 2.5 | 2.5 | 21.6% | 21.6% | 21.6% | 73.5% | 16.1% | 14.0% | 37.7% | 1050 | 400 |
| M119 | 1.8 | 2.2 | 71.5 | 15 | 3 | 2.5 | 4 | 21.3% | 21.3% | 21.3% | 73.3% | 16.1% | 7.8% | 37.5% | 1050 | 400 |
| M120 | 1.8 | 2.2 | 70 | 15 | 6.5 | 2 | 2.5 | 21.7% | 21.7% | 21.7% | 73.5% | 16.2% | 13.8% | 37.9% | 1050 | 400 |
| M121 | 1.8 | 2.2 | 70 | 15 | 6.5 | 2.5 | 2 | 21.7% | 21.7% | 21.7% | 73.6% | 16.3% | 15.7% | 37.9% | 1050 | 400 |
| M122 | 1.8 | 2.2 | 72 | 15 | 1.5 | 1 | 6.5 | 21.2% | 21.2% | 21.2% | 73.1% | 16.3% | 14.5% | 37.5% | 1050 | 450 |
| M123 | 1.8 | 2.2 | 71 | 15 | 4 | 2.5 | 3.5 | 21.4% | 21.4% | 21.4% | 73.4% | 16.3% | 10.9% | 37.7% | 1050 | 400 |
| M124 | 1.8 | 2.2 | 71 | 15 | 4 | 3 | 3 | 21.4% | 21.4% | 21.4% | 73.4% | 16.3% | 13.6% | 37.8% | 1050 | 400 |
| M125 | 1.8 | 2.2 | 69 | 15 | 9 | 0 | 3 | 21.9% | 21.9% | 21.9% | 73.5% | 16.4% | 3.8% | 38.3% | 1050 | 400 |
| M126 | 1.8 | 2.2 | 70.5 | 15 | 5 | 2 | 3.5 | 21.5% | 21.5% | 21.5% | 73.4% | 16.4% | 11.1% | 37.9% | 1050 | 400 |
| M127 | 1.8 | 2.2 | 70.5 | 15 | 5 | 2.5 | 3 | 21.5% | 21.5% | 21.5% | 73.5% | 16.5% | 12.9% | 38.0% | 1050 | 400 |
| M128 | 1.8 | 2.2 | 70.5 | 15 | 5 | 3 | 2.5 | 21.5% | 21.5% | 21.5% | 73.5% | 16.5% | 15.4% | 38.0% | 1050 | 400 |
| M129 | 1.8 | 2.2 | 69 | 15 | 8.5 | 1.5 | 2 | 21.9% | 21.9% | 21.9% | 73.6% | 16.5% | 15.3% | 38.4% | 1050 | 400 |
| M130 | 1.8 | 2.2 | 72 | 15 | 1 | 1.5 | 6.5 | 21.2% | 21.2% | 21.2% | 73.2% | 16.6% | 16.4% | 37.7% | 1050 | 400 |
| M131 | 1.8 | 2.2 | 71 | 15 | 3.5 | 2 | 4.5 | 21.4% | 21.4% | 21.4% | 73.3% | 16.6% | 8.6% | 38.0% | 1050 | 400 |
| M132 | 1.8 | 2.2 | 70.5 | 15 | 5 | 0 | 5.5 | 21.6% | 21.6% | 21.6% | 73.3% | 16.6% | 10.7% | 38.2% | 1050 | 450 |
| M133 | 1.8 | 2.2 | 68.5 | 15 | 9.5 | 1 | 2 | 22.0% | 22.0% | 22.0% | 73.6% | 16.7% | 15.5% | 38.7% | 1050 | 400 |
| M134 | 1.8 | 2.2 | 69.5 | 15 | 7 | 2 | 2.5 | 21.7% | 21.7% | 21.7% | 73.6% | 16.7% | 14.4% | 38.4% | 1050 | 400 |
| M135 | 1.8 | 2.2 | 69.5 | 15 | 7 | 2.5 | 2 | 21.7% | 21.7% | 21.7% | 73.6% | 16.8% | 16.3% | 38.5% | 1050 | 400 |
| M136 | 1.8 | 2.2 | 69.5 | 15 | 7 | 0.5 | 4 | 21.7% | 21.7% | 21.7% | 73.4% | 16.8% | 10.2% | 38.5% | 1050 | 400 |
| M137 | 1.8 | 2.2 | 71.5 | 15 | 2 | 3 | 4.5 | 21.2% | 21.2% | 21.2% | 73.3% | 16.9% | 17.5% | 38.1% | 1050 | 400 |
| M138 | 1.8 | 2.2 | 69 | 15 | 8 | 1.5 | 2.5 | 21.8% | 21.8% | 21.8% | 73.6% | 16.9% | 14.4% | 38.7% | 1050 | 400 |
| M139 | 1.8 | 2.2 | 68 | 15 | 10.5 | 0.5 | 2 | 22.1% | 22.1% | 22.1% | 73.6% | 16.9% | 15.9% | 39.0% | 1050 | 400 |
| M140 | 1.8 | 2.2 | 69 | 15 | 8 | 0.5 | 3.5 | 21.8% | 21.8% | 21.8% | 73.5% | 16.9% | 11.8% | 38.8% | 1050 | 400 |
| M141 | 1.8 | 2.2 | 71.5 | 15 | 2 | 0 | 7.5 | 21.3% | 21.3% | 21.3% | 73.1% | 17.0% | 1.2% | 38.2% | 1050 | 450 |
| M142 | 1.8 | 2.2 | 71.5 | 15 | 1.5 | 1 | 7 | 21.2% | 21.2% | 21.2% | 73.2% | 17.0% | 15.4% | 38.2% | 1050 | 450 |
| M143 | 1.8 | 2.2 | 69.5 | 15 | 6.5 | 1.5 | 3.5 | 21.7% | 21.7% | 21.7% | 73.5% | 17.0% | 11.9% | 38.7% | 1050 | 400 |
| M144 | 1.8 | 2.2 | 71.5 | 15 | 1.5 | 2 | 6 | 21.2% | 21.2% | 21.2% | 73.3% | 17.1% | 15.3% | 38.3% | 1050 | 450 |
| M145 | 1.8 | 2.2 | 68.5 | 15 | 9 | 0.5 | 3 | 21.9% | 21.9% | 21.9% | 73.6% | 17.1% | 13.3% | 39.0% | 1050 | 400 |
| M146 | 1.8 | 2.2 | 70.5 | 15 | 4 | 3 | 3.5 | 21.4% | 21.4% | 21.4% | 73.5% | 17.1% | 12.6% | 38.6% | 1050 | 400 |
| M147 | 1.8 | 2.2 | 71 | 15 | 2.5 | 1 | 6.5 | 21.3% | 21.3% | 21.3% | 73.3% | 17.2% | 3.8% | 38.5% | 1050 | 450 |
| M148 | 1.8 | 2.2 | 69.5 | 15 | 6.5 | 0 | 5 | 21.7% | 21.7% | 21.7% | 73.4% | 17.2% | 9.0% | 38.9% | 1050 | 450 |
| M149 | 1.8 | 2.2 | 69 | 15 | 7.5 | 2 | 2.5 | 21.8% | 21.8% | 21.8% | 73.6% | 17.2% | 15.1% | 39.0% | 1050 | 400 |
| M150 | 1.8 | 2.2 | 69 | 15 | 7.5 | 2.5 | 2 | 21.7% | 21.7% | 21.7% | 73.7% | 17.2% | 16.8% | 39.0% | 1050 | 400 |
| M151 | 1.8 | 2.2 | 69 | 15 | 7.5 | 0.5 | 4 | 21.8% | 21.8% | 21.8% | 73.5% | 17.3% | 10.9% | 39.0% | 1050 | 400 |
| M152 | 1.8 | 2.2 | 71.5 | 15 | 1 | 1.5 | 7 | 21.2% | 21.2% | 21.2% | 73.3% | 17.3% | 17.1% | 38.5% | 1050 | 400 |
| M153 | 1.8 | 2.2 | 70.5 | 15 | 3.5 | 1.5 | 5.5 | 21.4% | 21.4% | 21.4% | 73.4% | 17.3% | 6.6% | 38.7% | 1050 | 450 |
| M154 | 1.8 | 2.2 | 70.5 | 15 | 3.5 | 2 | 5 | 21.4% | 21.4% | 21.4% | 73.4% | 17.4% | 9.7% | 38.7% | 1050 | 400 |
| M155 | 1.8 | 2.2 | 69.5 | 15 | 6 | 2 | 3.5 | 21.6% | 21.6% | 21.6% | 73.6% | 17.4% | 12.5% | 39.0% | 1050 | 400 |
| M156 | 1.8 | 2.2 | 67.5 | 15 | 11 | 0.5 | 2 | 22.1% | 22.1% | 22.1% | 73.7% | 17.4% | 16.5% | 39.5% | 1050 | 400 |
| M157 | 1.8 | 2.2 | 69.5 | 15 | 6 | 2.5 | 3 | 21.6% | 21.6% | 21.6% | 73.6% | 17.4% | 14.2% | 39.0% | 1050 | 400 |
| M158 | 1.8 | 2.2 | 71 | 15 | 2 | 1.5 | 6.5 | 21.3% | 21.3% | 21.3% | 73.3% | 17.5% | 14.3% | 38.7% | 1075 | 450 |
| M159 | 1.8 | 2.2 | 70.5 | 15 | 3.5 | 3.5 | 3.5 | 21.4% | 21.4% | 21.4% | 73.5% | 17.5% | 15.5% | 38.9% | 1050 | 400 |
| M160 | 1.8 | 2.2 | 70.5 | 15 | 3.5 | 0 | 7 | 21.4% | 21.4% | 21.4% | 73.3% | 17.5% | 3.5% | 38.9% | 1050 | 450 |
| M161 | 1.8 | 2.2 | 70 | 15 | 5 | 1.5 | 4.5 | 22.1% | 18.5% | 18.5% | 76.5% | 17.5% | 9.3% | 39.6% | 1050 | 500 |
| M162 | 1.8 | 2.2 | 70 | 15 | 4.5 | 0.5 | 6 | 21.5% | 21.5% | 21.5% | 73.4% | 17.5% | 6.1% | 39.0% | 1050 | 450 |
| M163 | 1.8 | 2.2 | 69 | 15 | 7 | 0.5 | 4.5 | 21.7% | 21.7% | 21.7% | 73.5% | 17.6% | 10.0% | 39.3% | 1050 | 400 |
| M164 | 1.8 | 2.2 | 70.5 | 15 | 3 | 1 | 6.5 | 21.4% | 21.4% | 21.4% | 73.4% | 17.6% | 4.6% | 39.0% | 1100 | 450 |
| M165 | 1.8 | 2.2 | 70.5 | 15 | 3 | 2 | 5.5 | 21.3% | 21.3% | 21.3% | 73.4% | 17.7% | 11.3% | 39.0% | 1075 | 450 |
| M166 | 1.8 | 2.2 | 70.5 | 15 | 3 | 0.5 | 7 | 21.4% | 21.4% | 21.4% | 73.3% | 17.7% | 3.7% | 39.0% | 1100 | 450 |
| M167 | 1.8 | 2.2 | 68.5 | 15 | 8 | 1 | 3.5 | 21.8% | 21.8% | 21.8% | 73.6% | 17.7% | 12.8% | 39.5% | 1050 | 400 |

TABLE 10-continued

Compositions and thermodynamic criteria for isolated carbides

| No | B | C | Fe | Mo | Nb | Ti | V | 1 | 2 | 3 | 4 | 5 | 6 | 7 | 8 | 9 |
|---|---|---|---|---|---|---|---|---|---|---|---|---|---|---|---|---|
| M168 | 1.8 | 2.2 | 68.5 | 15 | 8 | 0.5 | 4 | 21.8% | 21.8% | 21.8% | 73.5% | 17.7% | 11.6% | 39.5% | 1050 | 400 |
| M169 | 1.8 | 2.2 | 71 | 15 | 1.5 | 1 | 7.5 | 21.2% | 21.2% | 21.2% | 73.3% | 17.7% | 16.1% | 39.0% | 1100 | 450 |
| M170 | 1.8 | 2.2 | 67 | 15 | 12 | 0 | 2 | 22.7% | 19.7% | 19.7% | 76.5% | 17.8% | 17.1% | 40.5% | 1050 | 500 |
| M171 | 1.8 | 2.2 | 69.5 | 15 | 5.5 | 0 | 6 | 21.6% | 21.6% | 21.6% | 73.4% | 17.8% | 11.2% | 39.4% | 1100 | 450 |
| M172 | 1.8 | 2.2 | 70.5 | 15 | 3 | 3.5 | 4 | 21.3% | 21.3% | 21.3% | 73.5% | 17.8% | 13.4% | 39.1% | 1075 | 400 |
| M173 | 1.8 | 2.2 | 69 | 15 | 6.5 | 2 | 3.5 | 21.7% | 21.7% | 21.7% | 73.6% | 17.8% | 4.6% | 39.5% | 1075 | 400 |
| M174 | 1.8 | 2.2 | 70 | 15 | 4 | 2.5 | 4.5 | 21.4% | 21.4% | 21.4% | 73.5% | 17.8% | 10.0% | 39.2% | 1100 | 400 |
| M175 | 1.8 | 2.2 | 69 | 15 | 6.5 | 2.5 | 3 | 21.6% | 21.6% | 21.6% | 73.6% | 17.9% | 3.0% | 39.5% | 1075 | 400 |
| M176 | 1.8 | 2.2 | 70.5 | 15 | 2.5 | 1.5 | 6.5 | 21.3% | 21.3% | 21.3% | 73.4% | 17.9% | 13.6% | 39.2% | 1100 | 450 |
| M177 | 1.8 | 2.2 | 70 | 15 | 4 | 0 | 7 | 21.5% | 21.5% | 21.5% | 73.3% | 17.9% | 4.2% | 39.4% | 1100 | 450 |
| M178 | 1.8 | 2.2 | 70 | 15 | 4 | 3.5 | 3.5 | 21.4% | 21.4% | 21.4% | 73.6% | 17.9% | 15.2% | 39.3% | 1100 | 400 |
| M179 | 1.8 | 2.2 | 69.5 | 15 | 5 | 2 | 4.5 | 21.5% | 21.5% | 21.5% | 73.6% | 18.0% | 7.4% | 39.5% | 1100 | 400 |
| M180 | 1.8 | 2.2 | 67.5 | 15 | 10 | 1.5 | 2 | 22.0% | 22.0% | 22.0% | 73.7% | 18.0% | 17.2% | 40.0% | 1075 | 350 |
| M181 | 1.8 | 2.2 | 69.5 | 15 | 5 | 2.5 | 4 | 21.5% | 21.5% | 21.5% | 73.6% | 18.0% | 12.1% | 39.5% | 1100 | 400 |
| M182 | 1.8 | 2.2 | 68.5 | 15 | 7.5 | 2.5 | 2.5 | 21.7% | 21.7% | 21.7% | 73.7% | 18.0% | 1.6% | 39.7% | 1075 | 400 |
| M183 | 1.8 | 2.2 | 70 | 15 | 3.5 | 1 | 6.5 | 21.4% | 21.4% | 21.4% | 73.5% | 18.0% | 12.6% | 39.4% | 1100 | 450 |
| M184 | 1.8 | 2.2 | 68.5 | 15 | 7.5 | 0 | 5 | 21.8% | 21.8% | 21.8% | 73.5% | 18.1% | 8.4% | 39.8% | 1100 | 450 |
| M185 | 1.8 | 2.2 | 70 | 15 | 3.5 | 2.5 | 5 | 21.4% | 21.4% | 21.4% | 73.6% | 18.1% | 9.4% | 39.5% | 1100 | 400 |
| M186 | 1.8 | 2.2 | 68 | 15 | 8.5 | 2 | 2.5 | 21.8% | 21.8% | 21.8% | 73.7% | 18.1% | 1.8% | 40.0% | 1100 | 400 |
| M187 | 1.8 | 2.2 | 67 | 15 | 11 | 0.5 | 2.5 | 22.1% | 22.1% | 22.1% | 73.7% | 18.2% | 16.2% | 40.2% | 1075 | 400 |
| M188 | 1.8 | 2.2 | 70.5 | 15 | 2 | 2 | 6.5 | 21.2% | 21.2% | 21.2% | 73.5% | 18.2% | 14.7% | 39.4% | 1100 | 450 |
| M189 | 1.8 | 2.2 | 69 | 15 | 6 | 0 | 6 | 21.6% | 21.6% | 21.6% | 73.5% | 18.2% | 11.0% | 39.8% | 1100 | 450 |
| M190 | 1.8 | 2.2 | 69.5 | 15 | 4.5 | 2 | 5 | 21.5% | 21.5% | 21.5% | 73.6% | 18.2% | 9.5% | 39.7% | 1100 | 400 |
| M191 | 1.8 | 2.2 | 68.5 | 15 | 7 | 2 | 3.5 | 21.7% | 21.7% | 21.7% | 73.7% | 18.2% | 13.8% | 39.9% | 1100 | 400 |
| M192 | 1.8 | 2.2 | 69.5 | 15 | 4.5 | 3 | 4 | 21.5% | 21.5% | 21.5% | 73.7% | 18.3% | 12.8% | 39.7% | 1100 | 400 |
| M193 | 1.8 | 2.2 | 66.5 | 15 | 12 | 0.5 | 2 | 22.2% | 22.2% | 22.2% | 73.8% | 18.3% | 17.7% | 40.5% | 1075 | 350 |
| M194 | 1.8 | 2.2 | 68.5 | 15 | 7 | 0 | 5.5 | 21.7% | 21.7% | 21.7% | 73.5% | 18.3% | 9.6% | 40.0% | 1100 | 450 |
| M195 | 1.8 | 2.2 | 69 | 15 | 5.5 | 1.5 | 5 | 21.6% | 21.6% | 21.6% | 73.6% | 18.3% | 9.9% | 39.9% | 1100 | 400 |
| M196 | 1.8 | 2.2 | 70.5 | 15 | 1.5 | 1 | 8 | 21.2% | 21.2% | 21.2% | 73.4% | 18.4% | 16.8% | 39.6% | 1125 | 450 |
| M197 | 1.8 | 2.2 | 68 | 15 | 8 | 0.5 | 4.5 | 21.8% | 21.8% | 21.8% | 73.6% | 18.4% | 7.1% | 40.2% | 1100 | 400 |
| M198 | 1.8 | 2.2 | 68 | 15 | 8 | 2.5 | 2.5 | 21.8% | 21.8% | 21.8% | 73.8% | 18.4% | 17.1% | 40.2% | 1100 | 400 |
| M199 | 1.8 | 2.2 | 69.5 | 15 | 4 | 1.5 | 6 | 21.4% | 21.4% | 21.4% | 73.6% | 18.4% | 11.2% | 39.9% | 1125 | 450 |
| M200 | 1.8 | 2.2 | 69 | 15 | 5.5 | 3.5 | 3 | 21.5% | 21.5% | 21.5% | 73.7% | 18.4% | 17.2% | 40.0% | 1150 | 400 |
| M201 | 1.8 | 2.2 | 67 | 15 | 10.5 | 0 | 3.5 | 22.1% | 22.1% | 22.1% | 73.7% | 18.5% | 4.2% | 40.5% | 1100 | 400 |
| M202 | 1.8 | 2.2 | 68.5 | 15 | 6.5 | 2.5 | 3.5 | 21.6% | 21.6% | 21.6% | 73.7% | 18.5% | 14.5% | 40.1% | 1150 | 400 |
| M203 | 1.8 | 2.2 | 70 | 15 | 2.5 | 1 | 7.5 | 21.3% | 21.3% | 21.3% | 73.5% | 18.5% | 15.0% | 39.8% | 1125 | 450 |
| M204 | 1.8 | 2.2 | 68.5 | 15 | 6.5 | 3 | 3 | 21.6% | 21.6% | 21.6% | 73.7% | 18.5% | 16.4% | 40.2% | 1150 | 400 |
| M205 | 1.8 | 2.2 | 68.5 | 15 | 6.5 | 0 | 6 | 21.7% | 21.7% | 21.7% | 73.5% | 18.6% | 10.7% | 40.2% | 1100 | 450 |
| M206 | 1.8 | 2.2 | 70.5 | 15 | 1 | 1 | 8.5 | 21.2% | 21.2% | 21.2% | 73.5% | 18.6% | 18.2% | 39.7% | 1150 | 400 |
| M207 | 1.8 | 2.2 | 69 | 15 | 5 | 2.5 | 4.5 | 21.5% | 21.5% | 21.5% | 73.7% | 18.6% | 11.7% | 40.1% | 1150 | 400 |
| M208 | 1.8 | 2.2 | 69 | 15 | 5 | 3 | 4 | 21.5% | 21.5% | 21.5% | 73.7% | 18.6% | 13.5% | 40.1% | 1150 | 400 |
| M209 | 1.8 | 2.2 | 70 | 15 | 2.5 | 0 | 8.5 | 21.3% | 21.3% | 21.3% | 73.4% | 18.7% | 16.8% | 40.0% | 1125 | 450 |
| M210 | 1.8 | 2.2 | 69.5 | 15 | 3.5 | 1.5 | 6.5 | 21.4% | 21.4% | 21.4% | 73.6% | 18.7% | 12.4% | 40.0% | 1150 | 450 |
| M211 | 1.8 | 2.2 | 69 | 15 | 5 | 0 | 7 | 21.5% | 21.5% | 21.5% | 73.5% | 18.7% | 13.1% | 40.2% | 1125 | 450 |
| M212 | 1.8 | 2.2 | 69.5 | 15 | 3.5 | 0.5 | 7.5 | 21.4% | 21.4% | 21.4% | 73.5% | 18.7% | 14.3% | 40.1% | 1125 | 450 |
| M213 | 1.8 | 2.2 | 67 | 15 | 10 | 0 | 4 | 22.0% | 22.0% | 22.0% | 73.7% | 18.7% | 5.4% | 40.7% | 1100 | 400 |
| M214 | 1.8 | 2.2 | 70 | 15 | 2 | 2 | 7 | 21.2% | 21.2% | 21.2% | 73.6% | 18.7% | 15.4% | 40.0% | 1150 | 450 |
| M215 | 1.8 | 2.2 | 70 | 15 | 2 | 2.5 | 6.5 | 21.2% | 21.2% | 21.2% | 73.6% | 18.8% | 15.2% | 40.0% | 1150 | 400 |
| M216 | 1.8 | 2.2 | 67.5 | 15 | 8.5 | 0.5 | 4.5 | 21.8% | 21.8% | 21.8% | 73.7% | 18.8% | 6.8% | 40.6% | 1125 | 400 |
| M217 | 1.8 | 2.2 | 66.5 | 15 | 11 | 1.5 | 2 | 22.1% | 22.1% | 22.1% | 73.8% | 18.8% | 18.5% | 40.9% | 1150 | 350 |
| M218 | 1.8 | 2.2 | 69 | 15 | 4.5 | 2 | 5.5 | 21.5% | 21.5% | 21.5% | 73.6% | 18.8% | 9.3% | 40.3% | 1150 | 400 |
| M219 | 1.8 | 2.2 | 67.5 | 15 | 8.5 | 0 | 5 | 21.9% | 21.9% | 21.9% | 73.6% | 18.8% | 7.9% | 40.7% | 1125 | 400 |
| M220 | 1.8 | 2.2 | 66.5 | 15 | 11 | 0 | 3.5 | 22.1% | 22.1% | 22.1% | 73.7% | 18.9% | 14.9% | 40.9% | 1100 | 400 |
| M221 | 1.8 | 2.2 | 68 | 15 | 7 | 0.5 | 5.5 | 21.7% | 21.7% | 21.7% | 73.6% | 18.9% | 9.2% | 40.6% | 1150 | 400 |
| M222 | 1.8 | 2.2 | 69 | 15 | 4.5 | 2 | 7.5 | 21.5% | 21.5% | 21.5% | 73.5% | 18.9% | 14.1% | 40.4% | 1125 | 450 |
| M223 | 1.8 | 2.2 | 68.5 | 15 | 5.5 | 1.5 | 5.5 | 21.6% | 21.6% | 21.6% | 73.7% | 18.9% | 9.2% | 40.5% | 1150 | 400 |
| M224 | 1.8 | 2.2 | 68 | 15 | 7 | 0 | 6 | 21.7% | 21.7% | 21.7% | 73.6% | 18.9% | 10.3% | 40.6% | 1125 | 450 |
| M225 | 1.8 | 2.2 | 70 | 15 | 1.5 | 1 | 8.5 | 21.2% | 21.2% | 21.2% | 73.5% | 18.9% | 17.4% | 40.1% | 1150 | 450 |
| M226 | 1.8 | 2.2 | 68.5 | 15 | 5.5 | 0.5 | 6.5 | 21.6% | 21.6% | 21.6% | 73.6% | 19.0% | 11.6% | 40.5% | 1150 | 450 |
| M227 | 1.8 | 2.2 | 67 | 15 | 9.5 | 0 | 4.5 | 21.9% | 21.9% | 21.9% | 73.7% | 19.0% | 6.5% | 40.9% | 1125 | 400 |
| M228 | 1.8 | 2.2 | 69 | 15 | 4 | 2 | 6 | 21.4% | 21.4% | 21.4% | 73.7% | 19.0% | 8.2% | 40.4% | 1175 | 400 |
| M229 | 1.8 | 2.2 | 69 | 15 | 4 | 2.5 | 5.5 | 21.4% | 21.4% | 21.4% | 73.7% | 19.0% | 9.5% | 40.4% | 1175 | 400 |
| M230 | 1.8 | 2.2 | 66.5 | 15 | 10.5 | 1.5 | 2.5 | 22.0% | 22.0% | 22.0% | 73.8% | 19.0% | 17.6% | 41.0% | 1150 | 350 |
| M231 | 1.8 | 2.2 | 68.5 | 15 | 5.5 | 0 | 7 | 21.6% | 21.6% | 21.6% | 73.6% | 19.0% | 12.7% | 40.6% | 1150 | 450 |
| M232 | 1.8 | 2.2 | 69.5 | 15 | 2.5 | 2 | 7 | 21.3% | 21.3% | 21.3% | 73.6% | 19.0% | 14.3% | 40.3% | 1175 | 450 |
| M233 | 1.8 | 2.2 | 69.5 | 15 | 2.5 | 2.5 | 6.5 | 21.3% | 21.3% | 21.3% | 73.7% | 19.0% | 13.6% | 40.3% | 1200 | 400 |
| M234 | 1.8 | 2.2 | 69.5 | 15 | 2.5 | 1 | 8 | 21.3% | 21.3% | 21.3% | 73.6% | 19.1% | 15.6% | 40.3% | 1150 | 450 |
| M235 | 1.8 | 2.2 | 70 | 15 | 1.5 | 0 | 9.5 | 21.2% | 21.2% | 21.2% | 73.5% | 19.1% | 18.7% | 40.3% | 1150 | 400 |
| M236 | 1.8 | 2.2 | 70 | 15 | 1 | 1.5 | 8.5 | 21.1% | 21.1% | 21.1% | 73.6% | 19.1% | 18.9% | 40.2% | 1175 | 400 |
| M237 | 1.8 | 2.2 | 69.5 | 15 | 2.5 | 0.5 | 8.5 | 21.3% | 21.3% | 21.3% | 73.5% | 19.1% | 16.3% | 40.4% | 1150 | 450 |
| M238 | 1.8 | 2.2 | 68.5 | 15 | 5 | 1.5 | 6 | 21.5% | 21.5% | 21.5% | 73.7% | 19.1% | 10.2% | 40.6% | 1175 | 400 |
| M239 | 1.8 | 2.2 | 66 | 15 | 11.5 | 1.5 | 2 | 22.1% | 22.1% | 22.1% | 73.8% | 19.1% | 19.1% | 41.2% | 1150 | 350 |
| M240 | 1.8 | 2.2 | 66 | 15 | 11.5 | 1 | 2.5 | 22.1% | 22.1% | 22.1% | 73.8% | 19.1% | 17.7% | 41.3% | 1150 | 350 |
| M241 | 1.8 | 2.2 | 68.5 | 15 | 5 | 0.5 | 7 | 21.5% | 21.5% | 21.5% | 73.6% | 19.2% | 12.6% | 40.7% | 1150 | 450 |
| M242 | 1.8 | 2.2 | 67 | 15 | 9 | 0 | 5 | 21.9% | 21.9% | 21.9% | 73.7% | 19.2% | 7.6% | 41.1% | 1150 | 400 |
| M243 | 1.8 | 2.2 | 69.5 | 15 | 2 | 3 | 6.5 | 21.2% | 21.2% | 21.2% | 73.7% | 19.2% | 15.7% | 40.4% | 1200 | 400 |

TABLE 10-continued

Compositions and thermodynamic criteria for isolated carbides

| No | B | C | Fe | Mo | Nb | Ti | V | 1 | 2 | 3 | 4 | 5 | 6 | 7 | 8 | 9 |
|---|---|---|---|---|---|---|---|---|---|---|---|---|---|---|---|---|
| M244 | 1.8 | 2.2 | 68 | 15 | 6 | 2 | 5 | 21.6% | 21.6% | 21.6% | 73.7% | 19.2% | 11.8% | 40.8% | 1200 | 400 |
| M245 | 1.8 | 2.2 | 68 | 15 | 6 | 3 | 4 | 21.6% | 21.6% | 21.6% | 73.8% | 19.2% | 15.0% | 40.8% | 1200 | 400 |
| M246 | 1.8 | 2.2 | 68.5 | 15 | 4.5 | 3.5 | 4.5 | 21.4% | 21.4% | 21.4% | 73.8% | 19.2% | 5.1% | 40.7% | 1200 | 400 |
| M247 | 1.8 | 2.2 | 67 | 15 | 8.5 | 2.5 | 3 | 21.8% | 21.8% | 21.8% | 73.8% | 19.2% | 17.3% | 41.0% | 1200 | 350 |
| M248 | 1.8 | 2.2 | 68.5 | 15 | 4.5 | 2.5 | 5.5 | 21.4% | 21.4% | 21.4% | 73.7% | 19.3% | 8.8% | 40.7% | 1200 | 400 |
| M249 | 1.8 | 2.2 | 65.5 | 15 | 12.5 | 0.5 | 2.5 | 22.2% | 22.2% | 22.2% | 73.8% | 19.3% | 18.0% | 41.5% | 1150 | 350 |
| M250 | 1.8 | 2.2 | 69 | 15 | 3 | 3.5 | 5.5 | 21.3% | 21.3% | 21.3% | 73.8% | 19.3% | 9.7% | 40.6% | 1250 | 400 |
| M251 | 1.8 | 2.2 | 69 | 15 | 3.5 | 0 | 8.5 | 21.4% | 21.4% | 21.4% | 73.5% | 19.3% | 16.0% | 40.7% | 1150 | 450 |
| M252 | 1.8 | 2.2 | 65.5 | 15 | 12.5 | 0 | 3 | 22.2% | 22.2% | 22.2% | 73.8% | 19.3% | 17.0% | 41.5% | 1150 | 400 |
| M253 | 1.8 | 2.2 | 66 | 15 | 11 | 1 | 3 | 22.1% | 22.1% | 22.1% | 73.8% | 19.3% | 16.9% | 41.4% | 1175 | 400 |
| M254 | 1.8 | 2.2 | 69.5 | 15 | 1.5 | 2 | 8 | 21.2% | 21.2% | 21.2% | 73.7% | 19.3% | 17.6% | 40.5% | 1200 | 450 |
| M255 | 1.8 | 2.2 | 68.5 | 15 | 4 | 3.5 | 5 | 21.4% | 21.4% | 21.4% | 73.8% | 19.4% | 6.6% | 40.7% | 1250 | 400 |
| M256 | 1.8 | 2.2 | 68.5 | 15 | 4 | 3 | 5.5 | 21.4% | 21.4% | 21.4% | 73.8% | 19.4% | 10.8% | 40.8% | 1250 | 400 |
| M257 | 1.8 | 2.2 | 66.5 | 15 | 9.5 | 1.5 | 3.5 | 21.9% | 21.9% | 21.9% | 73.8% | 19.4% | 15.9% | 41.3% | 1200 | 400 |
| M258 | 1.8 | 2.2 | 69.5 | 15 | 1.5 | 1 | 9 | 21.2% | 21.2% | 21.2% | 73.6% | 19.4% | 17.9% | 40.6% | 1200 | 450 |
| M259 | 1.8 | 2.2 | 68.5 | 15 | 4 | 2 | 6.5 | 21.4% | 21.4% | 21.4% | 73.7% | 19.4% | 8.1% | 40.8% | 1200 | 400 |
| M260 | 1.8 | 2.2 | 69 | 15 | 2.5 | 2.5 | 7 | 21.3% | 21.3% | 21.3% | 73.7% | 19.4% | 14.1% | 40.7% | 1250 | 400 |
| M261 | 1.8 | 2.2 | 69 | 15 | 2.5 | 2 | 7.5 | 21.3% | 21.3% | 21.3% | 73.7% | 19.4% | 14.7% | 40.7% | 1200 | 450 |
| M262 | 1.8 | 2.2 | 68 | 15 | 5 | 3 | 5 | 21.4% | 21.4% | 21.4% | 73.8% | 19.4% | 6.5% | 40.9% | 1250 | 400 |
| M263 | 1.8 | 2.2 | 68.5 | 15 | 4 | 1 | 7.5 | 21.4% | 21.4% | 21.4% | 73.7% | 19.5% | 13.4% | 40.9% | 1200 | 450 |
| M264 | 1.8 | 2.2 | 66 | 15 | 10.5 | 1.5 | 3 | 22.0% | 22.0% | 22.0% | 73.8% | 19.5% | 17.3% | 41.5% | 1200 | 350 |
| M265 | 1.8 | 2.2 | 68 | 15 | 5 | 2.5 | 5.5 | 21.5% | 21.5% | 21.5% | 73.8% | 19.5% | 8.2% | 40.9% | 1250 | 400 |
| M266 | 1.8 | 2.2 | 69.5 | 15 | 1 | 1.5 | 9 | 21.1% | 21.1% | 21.1% | 73.7% | 19.5% | 19.3% | 40.6% | 1200 | 400 |
| M267 | 1.8 | 2.2 | 66 | 15 | 10.5 | 1 | 3.5 | 22.0% | 22.0% | 22.0% | 73.8% | 19.5% | 16.0% | 41.5% | 1200 | 400 |
| M268 | 1.8 | 2.2 | 65.5 | 15 | 12 | 0 | 3.5 | 22.2% | 22.2% | 22.2% | 73.8% | 19.5% | 3.5% | 41.7% | 1175 | 400 |
| M269 | 1.8 | 2.2 | 69 | 15 | 2 | 2.5 | 7.5 | 21.1% | 21.1% | 21.1% | 73.9% | 19.5% | 15.9% | 40.7% | 1250 | 450 |
| M270 | 1.8 | 2.2 | 68 | 15 | 4.5 | 3 | 5.5 | 21.4% | 21.4% | 21.3% | 74.1% | 19.5% | 7.7% | 40.9% | 1275 | 400 |
| M271 | 1.8 | 2.2 | 69.5 | 15 | 1.5 | 0 | 10 | 21.2% | 21.2% | 21.2% | 73.5% | 19.5% | 19.2% | 40.7% | 1175 | 400 |
| M272 | 1.8 | 2.2 | 69 | 15 | 2.5 | 0.5 | 9 | 21.3% | 21.3% | 21.3% | 73.6% | 19.6% | 16.8% | 40.8% | 1200 | 450 |
| M273 | 1.8 | 2.2 | 69 | 15 | 2 | 2 | 8 | 21.2% | 21.2% | 21.2% | 73.7% | 19.6% | 16.2% | 40.8% | 1250 | 450 |
| M274 | 1.8 | 2.2 | 66.5 | 15 | 8.5 | 2.5 | 3.5 | 21.7% | 21.7% | 21.7% | 74.0% | 19.6% | 17.1% | 41.3% | 1250 | 400 |
| M275 | 1.8 | 2.2 | 69.5 | 15 | 1 | 0.5 | 10 | 21.1% | 21.1% | 21.1% | 73.6% | 19.6% | 19.4% | 40.7% | 1200 | 350 |
| M276 | 1.8 | 2.2 | 69 | 15 | 2 | 1.5 | 8.5 | 21.2% | 21.2% | 21.2% | 73.7% | 19.6% | 16.6% | 40.8% | 1250 | 450 |
| M277 | 1.8 | 2.2 | 68 | 15 | 5 | 0.5 | 7.5 | 21.5% | 21.5% | 21.5% | 73.7% | 19.6% | 13.1% | 41.1% | 1200 | 450 |
| M278 | 1.8 | 2.2 | 67.5 | 15 | 5.5 | 3 | 5 | 21.5% | 21.5% | 21.3% | 74.1% | 19.6% | 5.8% | 41.1% | 1275 | 400 |
| M279 | 1.8 | 2.2 | 66.5 | 15 | 8.5 | 2 | 4 | 21.8% | 21.8% | 21.8% | 73.8% | 19.6% | 15.6% | 41.4% | 1250 | 400 |
| M280 | 1.8 | 2.2 | 69 | 15 | 1.5 | 2 | 8.5 | 21.1% | 21.1% | 21.0% | 74.0% | 19.6% | 17.9% | 40.7% | 1250 | 450 |
| M281 | 1.8 | 2.2 | 69 | 15 | 2.5 | 0 | 9.5 | 21.3% | 21.3% | 21.3% | 73.6% | 19.6% | 17.9% | 40.9% | 1175 | 450 |
| M282 | 1.8 | 2.2 | 67 | 15 | 7.5 | 0.5 | 6 | 21.7% | 21.7% | 21.7% | 73.7% | 19.7% | 9.5% | 41.4% | 1200 | 400 |
| M283 | 1.8 | 2.2 | 67 | 15 | 7 | 2 | 5 | 21.6% | 21.6% | 21.6% | 73.9% | 19.7% | 13.2% | 41.3% | 1250 | 400 |
| M284 | 1.8 | 2.2 | 67.5 | 15 | 5.5 | 2 | 6 | 21.5% | 21.5% | 21.4% | 74.0% | 19.7% | 10.8% | 41.2% | 1250 | 400 |
| M285 | 1.8 | 2.2 | 65.5 | 15 | 11.5 | 0 | 4 | 22.1% | 22.1% | 22.1% | 73.8% | 19.7% | 4.5% | 41.8% | 1200 | 400 |
| M286 | 1.8 | 2.2 | 65 | 15 | 12.5 | 1 | 2.5 | 22.2% | 22.2% | 22.2% | 73.9% | 19.7% | 19.0% | 41.9% | 1200 | 350 |
| M287 | 1.8 | 2.2 | 69 | 15 | 2 | 0.5 | 9.5 | 21.2% | 21.2% | 21.2% | 73.6% | 19.7% | 17.8% | 40.9% | 1200 | 450 |
| M288 | 1.8 | 2.2 | 67.5 | 15 | 6 | 0.5 | 7 | 21.6% | 21.6% | 21.6% | 73.7% | 19.7% | 11.8% | 41.3% | 1200 | 450 |
| M289 | 1.8 | 2.2 | 67 | 15 | 6.5 | 2.5 | 5 | 21.6% | 21.6% | 21.4% | 74.1% | 19.7% | 5.9% | 41.3% | 1275 | 400 |
| M290 | 1.8 | 2.2 | 67.5 | 15 | 5 | 3 | 5.5 | 21.4% | 21.4% | 21.3% | 74.1% | 19.7% | 6.9% | 41.1% | 1325 | 400 |
| M291 | 1.8 | 2.2 | 65.5 | 15 | 10.5 | 2 | 3 | 22.0% | 22.0% | 21.8% | 74.1% | 19.7% | 18.6% | 41.7% | 1275 | 350 |
| M292 | 1.8 | 2.2 | 66 | 15 | 9.5 | 1.5 | 4 | 21.9% | 21.9% | 21.9% | 73.9% | 19.7% | 15.7% | 41.6% | 1250 | 400 |
| M293 | 1.8 | 2.2 | 68.5 | 15 | 3.5 | 0 | 9 | 21.4% | 21.4% | 21.4% | 73.6% | 19.7% | 16.6% | 41.1% | 1200 | 450 |
| M294 | 1.8 | 2.2 | 68 | 15 | 4.5 | 0.5 | 8 | 21.5% | 21.5% | 21.5% | 73.7% | 19.8% | 14.0% | 41.2% | 1200 | 450 |
| M295 | 1.8 | 2.2 | 66.5 | 15 | 8 | 1.5 | 5 | 21.7% | 21.7% | 21.7% | 74.0% | 19.8% | 13.4% | 41.5% | 1250 | 400 |
| M296 | 1.8 | 2.2 | 67.5 | 15 | 6 | 0 | 7.5 | 21.6% | 21.6% | 21.6% | 73.7% | 19.8% | 6.8% | 41.4% | 1200 | 450 |
| M297 | 1.8 | 2.2 | 66 | 15 | 9.5 | 1 | 4.5 | 21.9% | 21.9% | 21.9% | 73.8% | 19.8% | 14.3% | 41.7% | 1250 | 400 |
| M298 | 1.8 | 2.2 | 66.5 | 15 | 7.5 | 2.5 | 4.5 | 21.7% | 21.7% | 21.5% | 74.1% | 19.8% | 15.5% | 41.4% | 1325 | 400 |
| M299 | 1.8 | 2.2 | 68 | 15 | 3.5 | 2 | 7.5 | 21.3% | 21.3% | 21.1% | 74.1% | 19.8% | 12.8% | 41.1% | 1275 | 450 |
| M300 | 1.8 | 2.2 | 66.5 | 15 | 8.5 | 0 | 6 | 21.8% | 21.8% | 21.8% | 73.7% | 19.8% | 9.3% | 41.6% | 1200 | 400 |
| M301 | 1.8 | 2.2 | 67.5 | 15 | 5 | 1.5 | 7 | 21.4% | 21.4% | 21.3% | 74.1% | 19.8% | 8.7% | 41.2% | 1275 | 450 |
| M302 | 1.8 | 2.2 | 68 | 15 | 3 | 3.5 | 6.5 | 21.2% | 21.2% | 21.0% | 74.1% | 19.8% | 10.7% | 41.0% | 1650 | 400 |
| M303 | 1.8 | 2.2 | 66.5 | 15 | 8 | 1 | 5.5 | 21.8% | 21.8% | 21.8% | 73.8% | 19.8% | 12.1% | 41.6% | 1250 | 400 |
| M304 | 1.8 | 2.2 | 66 | 15 | 9.5 | 0.5 | 5 | 21.9% | 21.9% | 21.9% | 73.8% | 19.8% | 13.1% | 41.8% | 1200 | 400 |
| M305 | 1.8 | 2.2 | 68 | 15 | 3 | 3 | 7 | 21.2% | 21.2% | 21.1% | 74.0% | 19.8% | 12.1% | 41.1% | 1625 | 400 |
| M306 | 1.8 | 2.2 | 67 | 15 | 5.5 | 3.5 | 5 | 21.4% | 21.4% | 21.4% | 74.2% | 19.8% | 15.7% | 41.3% | 1650 | 400 |
| M307 | 1.8 | 2.2 | 68.5 | 15 | 2 | 1.5 | 9 | 21.2% | 21.2% | 21.0% | 74.1% | 19.9% | 16.9% | 41.0% | 1275 | 450 |
| M308 | 1.8 | 2.2 | 67.5 | 15 | 4 | 3.5 | 6 | 21.3% | 21.3% | 21.0% | 74.2% | 19.9% | 12.4% | 41.1% | 1650 | 400 |
| M309 | 1.8 | 2.2 | 66 | 15 | 8.5 | 2.5 | 4 | 21.8% | 21.8% | 21.6% | 74.1% | 19.9% | 17.0% | 41.6% | 1350 | 400 |
| M310 | 1.8 | 2.2 | 67 | 15 | 5 | 3.5 | 5.5 | 21.4% | 21.4% | 21.0% | 74.4% | 19.9% | 14.6% | 41.2% | 1650 | 400 |
| M311 | 1.8 | 2.2 | 67.5 | 15 | 4.5 | 2 | 7 | 21.4% | 21.4% | 21.2% | 74.1% | 19.9% | 11.0% | 41.3% | 1325 | 400 |
| M312 | 1.8 | 2.2 | 68.5 | 15 | 3 | 0 | 9.5 | 21.3% | 21.3% | 21.3% | 73.6% | 19.9% | 17.4% | 41.2% | 1200 | 450 |
| M313 | 1.8 | 2.2 | 68 | 15 | 3 | 2 | 8 | 21.2% | 21.2% | 21.1% | 74.1% | 19.9% | 14.0% | 41.1% | 1325 | 450 |
| M314 | 1.8 | 2.2 | 67 | 15 | 5.5 | 3 | 5.5 | 21.5% | 21.5% | 21.3% | 74.1% | 19.9% | 6.2% | 41.4% | 1625 | 400 |
| M315 | 1.8 | 2.2 | 68.5 | 15 | 1.5 | 2 | 9 | 21.1% | 21.1% | 20.9% | 74.1% | 19.9% | 18.2% | 41.0% | 1350 | 450 |
| M316 | 1.8 | 2.2 | 67.5 | 15 | 4 | 3 | 6.5 | 21.3% | 21.3% | 21.1% | 74.1% | 19.9% | 9.4% | 41.2% | 1650 | 400 |
| M317 | 1.8 | 2.2 | 67.5 | 15 | 5.5 | 0 | 8 | 21.6% | 21.6% | 21.6% | 73.7% | 19.9% | 6.1% | 41.5% | 1200 | 450 |
| M318 | 1.8 | 2.2 | 65.5 | 15 | 10 | 1 | 4.5 | 21.9% | 21.9% | 21.8% | 74.2% | 19.9% | 15.0% | 41.8% | 1275 | 400 |
| M319 | 1.8 | 2.2 | 64.5 | 15 | 13 | 0.5 | 3 | 22.2% | 22.2% | 22.2% | 73.9% | 19.9% | 18.4% | 42.2% | 1250 | 350 |

TABLE 10-continued

Compositions and thermodynamic criteria for isolated carbides

| No | B | C | Fe | Mo | Nb | Ti | V | 1 | 2 | 3 | 4 | 5 | 6 | 7 | 8 | 9 |
|---|---|---|---|---|---|---|---|---|---|---|---|---|---|---|---|---|
| M320 | 1.8 | 2.2 | 66.5 | 15 | 5 | 3.5 | 6 | 21.3% | 21.3% | 20.7% | 74.9% | 19.9% | 5.5% | 41.2% | 1700 | 400 |
| M321 | 1.8 | 2.2 | 66.5 | 15 | 6.5 | 3 | 5 | 21.5% | 21.5% | 21.3% | 74.2% | 20.0% | 4.5% | 41.5% | 1650 | 400 |
| M322 | 1.8 | 2.2 | 67.5 | 15 | 4 | 2.5 | 7 | 21.3% | 21.3% | 21.1% | 74.1% | 20.0% | 9.1% | 41.3% | 1625 | 400 |
| M323 | 1.8 | 2.2 | 67.5 | 15 | 5 | 0.5 | 8 | 21.5% | 21.5% | 21.5% | 73.8% | 20.0% | 13.6% | 41.5% | 1250 | 450 |
| M324 | 1.8 | 2.2 | 68 | 15 | 4 | 0 | 9 | 21.4% | 21.4% | 21.4% | 73.7% | 20.0% | 3.9% | 41.4% | 1200 | 450 |
| M325 | 1.8 | 2.2 | 67 | 15 | 4.5 | 3 | 6.5 | 21.3% | 21.3% | 20.9% | 74.5% | 20.0% | 8.4% | 41.3% | 1650 | 400 |
| M326 | 1.8 | 2.2 | 64.5 | 15 | 7 | 4 | 5.5 | 21.3% | 21.3% | 20.2% | 75.8% | 20.0% | 19.9% | 41.3% | 0 | 400 |
| M327 | 1.8 | 2.2 | 68 | 15 | 2.5 | 2.5 | 8 | 21.2% | 21.2% | 21.0% | 74.1% | 20.0% | 14.8% | 41.2% | 1625 | 400 |
| M328 | 1.8 | 2.2 | 66.5 | 15 | 7.5 | 0.5 | 6.5 | 21.7% | 21.7% | 21.7% | 73.9% | 20.0% | 10.1% | 41.7% | 1250 | 400 |
| M329 | 1.8 | 2.2 | 67.5 | 15 | 4 | 2 | 7.5 | 21.3% | 21.3% | 21.1% | 74.1% | 20.0% | 12.0% | 41.3% | 1375 | 400 |
| M330 | 1.8 | 2.2 | 68 | 15 | 3.5 | 0.5 | 9 | 21.3% | 21.3% | 21.3% | 73.8% | 20.0% | 15.8% | 41.3% | 1250 | 450 |
| M331 | 1.8 | 2.2 | 66 | 15 | 5 | 3.5 | 6.5 | 21.2% | 21.2% | 20.4% | 75.3% | 20.0% | 5.7% | 41.2% | 0 | 400 |
| M332 | 1.8 | 2.2 | 68 | 15 | 2 | 2.5 | 8.5 | 21.1% | 21.1% | 20.8% | 74.3% | 20.0% | 16.5% | 41.1% | 1650 | 400 |
| M333 | 1.8 | 2.2 | 66.5 | 15 | 6.5 | 2.5 | 5.5 | 21.5% | 21.5% | 21.4% | 74.1% | 20.0% | 6.2% | 41.5% | 1625 | 400 |
| M334 | 1.8 | 2.2 | 68.5 | 15 | 2 | 0.5 | 10 | 21.2% | 21.2% | 21.1% | 73.9% | 20.0% | 18.1% | 41.2% | 1250 | 450 |
| M335 | 1.8 | 2.2 | 67 | 15 | 3.5 | 3 | 7.5 | 21.2% | 21.2% | 20.6% | 74.9% | 20.0% | 10.9% | 41.2% | 1700 | 400 |
| M336 | 1.8 | 2.2 | 68.5 | 15 | 2.5 | 0 | 10 | 21.3% | 21.3% | 21.3% | 73.7% | 20.0% | 18.3% | 41.3% | 1225 | 450 |
| M337 | 1.8 | 2.2 | 66 | 15 | 8 | 2 | 5 | 21.7% | 21.7% | 21.5% | 74.1% | 20.0% | 14.7% | 41.7% | 1375 | 400 |
| M338 | 1.8 | 2.2 | 66 | 15 | 4.5 | 3.5 | 7 | 21.2% | 21.2% | 20.3% | 75.4% | 20.0% | 6.8% | 41.2% | 0 | 400 |
| M339 | 1.8 | 2.2 | 67 | 15 | 6 | 0.5 | 7.5 | 21.6% | 21.6% | 21.5% | 74.0% | 20.0% | 12.2% | 41.6% | 1250 | 450 |
| M340 | 1.8 | 2.2 | 65.5 | 15 | 7.5 | 3 | 5 | 21.5% | 21.5% | 21.0% | 74.9% | 20.0% | 16.9% | 41.6% | 1700 | 400 |
| M341 | 1.8 | 2.2 | 65 | 15 | 4.5 | 4 | 7.5 | 21.1% | 21.1% | 19.9% | 76.0% | 20.0% | 15.5% | 41.1% | 0 | 400 |
| M342 | 1.8 | 2.2 | 63.5 | 15 | 5 | 4.5 | 8 | 21.0% | 21.0% | 19.5% | 76.4% | 20.0% | 19.3% | 41.0% | 0 | 400 |
| M343 | 1.8 | 2.2 | 66 | 15 | 9 | 0 | 6 | 21.9% | 21.9% | 21.9% | 73.8% | 20.0% | 8.8% | 41.9% | 1250 | 400 |
| M344 | 1.8 | 2.2 | 64 | 15 | 6.5 | 4 | 6.5 | 21.2% | 21.2% | 20.0% | 76.1% | 20.0% | 18.9% | 41.2% | 0 | 400 |
| M345 | 1.8 | 2.2 | 67.5 | 15 | 5 | 0 | 8.5 | 21.5% | 21.5% | 21.5% | 73.7% | 20.0% | 5.3% | 41.5% | 1250 | 450 |
| M346 | 1.8 | 2.2 | 65.5 | 15 | 9 | 2.5 | 4 | 21.8% | 21.8% | 21.6% | 74.2% | 20.0% | 17.7% | 41.8% | 1650 | 350 |
| M347 | 1.8 | 2.2 | 67 | 15 | 2.5 | 3 | 8.5 | 21.0% | 21.0% | 20.3% | 75.2% | 20.0% | 14.2% | 41.1% | 0 | 400 |
| M348 | 1.8 | 2.2 | 66.5 | 15 | 6.5 | 2 | 6 | 21.6% | 21.6% | 21.4% | 74.1% | 20.0% | 12.3% | 41.6% | 1625 | 400 |
| M349 | 1.8 | 2.2 | 67.5 | 15 | 4.5 | 0.5 | 8.5 | 21.4% | 21.4% | 21.3% | 74.0% | 20.1% | 14.4% | 41.5% | 1250 | 450 |
| M350 | 1.8 | 2.2 | 66 | 15 | 7.5 | 2.5 | 5 | 21.6% | 21.6% | 21.4% | 74.2% | 20.1% | 15.4% | 41.7% | 1650 | 400 |
| M351 | 1.8 | 2.2 | 63.5 | 15 | 7 | 4 | 6.5 | 21.2% | 21.2% | 19.9% | 76.2% | 20.1% | 19.5% | 41.3% | 0 | 400 |
| M352 | 1.8 | 2.2 | 67 | 15 | 4.5 | 2.5 | 7 | 21.3% | 21.3% | 21.0% | 74.3% | 20.1% | 10.1% | 41.4% | 1650 | 400 |
| M353 | 1.8 | 2.2 | 64 | 15 | 6 | 4 | 7 | 21.2% | 21.2% | 19.9% | 76.2% | 20.1% | 18.0% | 41.2% | 0 | 400 |
| M354 | 1.8 | 2.2 | 65 | 15 | 8 | 3 | 5 | 21.5% | 21.5% | 20.8% | 75.2% | 20.1% | 17.6% | 41.6% | 0 | 400 |
| M355 | 1.8 | 2.2 | 65 | 15 | 6 | 3.5 | 6.5 | 21.3% | 21.3% | 20.2% | 75.7% | 20.1% | 16.1% | 41.3% | 0 | 400 |
| M356 | 1.8 | 2.2 | 64 | 15 | 5.5 | 4 | 7.5 | 21.1% | 21.1% | 19.8% | 76.2% | 20.1% | 17.2% | 41.2% | 0 | 400 |
| M357 | 1.8 | 2.2 | 66.5 | 15 | 7.5 | 0 | 7 | 21.7% | 21.7% | 21.7% | 73.8% | 20.1% | 8.9% | 41.8% | 1250 | 450 |
| M358 | 1.8 | 2.2 | 67 | 15 | 4 | 2.5 | 7.5 | 21.3% | 21.3% | 20.8% | 74.6% | 20.1% | 11.0% | 41.3% | 1675 | 400 |
| M359 | 1.8 | 2.2 | 63.5 | 15 | 6.5 | 4 | 7 | 21.2% | 21.2% | 19.8% | 76.3% | 20.1% | 18.7% | 41.3% | 0 | 400 |
| M360 | 1.8 | 2.2 | 65.5 | 15 | 6.5 | 3 | 6 | 21.4% | 21.4% | 20.7% | 75.2% | 20.1% | 15.2% | 41.5% | 0 | 400 |
| M361 | 1.8 | 2.2 | 65 | 15 | 7.5 | 3 | 5.5 | 21.5% | 21.5% | 20.7% | 75.3% | 20.1% | 16.8% | 41.5% | 0 | 400 |
| M362 | 1.8 | 2.2 | 64 | 15 | 7.5 | 3.5 | 6 | 21.4% | 21.4% | 20.2% | 75.9% | 20.1% | 18.4% | 41.4% | 0 | 400 |
| M363 | 1.8 | 2.2 | 66.5 | 15 | 3.5 | 3 | 8 | 21.1% | 21.1% | 20.3% | 75.3% | 20.1% | 11.0% | 41.2% | 0 | 400 |
| M364 | 1.8 | 2.2 | 63 | 15 | 7 | 4 | 7 | 21.2% | 21.2% | 19.8% | 76.4% | 20.1% | 19.4% | 41.3% | 0 | 400 |
| M365 | 1.8 | 2.2 | 64 | 15 | 13.5 | 0.5 | 3 | 22.3% | 22.3% | 22.1% | 74.2% | 20.1% | 19.1% | 42.4% | 1275 | 350 |
| M366 | 1.8 | 2.2 | 68 | 15 | 2 | 2 | 9 | 21.1% | 21.1% | 20.9% | 74.1% | 20.1% | 16.9% | 41.2% | 1650 | 450 |
| M367 | 1.8 | 2.2 | 64.5 | 15 | 8.5 | 3 | 5 | 21.5% | 21.5% | 20.7% | 75.4% | 20.1% | 18.3% | 41.6% | 0 | 400 |
| M368 | 1.8 | 2.2 | 64 | 15 | 9.5 | 3 | 4.5 | 21.6% | 21.6% | 20.7% | 75.5% | 20.1% | 19.8% | 41.7% | 0 | 350 |
| M369 | 1.8 | 2.2 | 64.5 | 15 | 3 | 4 | 9.5 | 20.8% | 20.8% | 19.4% | 76.3% | 20.1% | 11.0% | 40.9% | 0 | 400 |
| M370 | 1.8 | 2.2 | 63.5 | 15 | 5.5 | 4 | 8 | 21.1% | 21.1% | 19.6% | 76.4% | 20.1% | 17.0% | 41.2% | 0 | 400 |
| M371 | 1.8 | 2.2 | 65.5 | 15 | 8 | 2.5 | 5 | 21.6% | 21.6% | 21.2% | 74.6% | 20.1% | 16.1% | 41.7% | 1675 | 400 |
| M372 | 1.8 | 2.2 | 66.5 | 15 | 2.5 | 3 | 9 | 21.0% | 21.0% | 20.0% | 75.5% | 20.1% | 14.2% | 41.1% | 0 | 400 |
| M373 | 1.8 | 2.2 | 64.5 | 15 | 2.5 | 4 | 10 | 20.8% | 20.8% | 19.3% | 76.4% | 20.1% | 7.9% | 40.9% | 0 | 400 |
| M374 | 1.8 | 2.2 | 67 | 15 | 5.5 | 0.5 | 8 | 21.5% | 21.5% | 21.3% | 74.2% | 20.1% | 13.0% | 41.6% | 1275 | 450 |
| M375 | 1.8 | 2.2 | 67 | 15 | 3 | 2.5 | 8.5 | 21.1% | 21.1% | 20.5% | 74.9% | 20.1% | 13.5% | 41.2% | 1700 | 400 |
| M376 | 1.8 | 2.2 | 64.5 | 15 | 6 | 3.5 | 7 | 21.2% | 21.2% | 20.1% | 76.0% | 20.1% | 15.9% | 41.3% | 0 | 400 |
| M377 | 1.8 | 2.2 | 62.5 | 15 | 4 | 4.5 | 10 | 20.8% | 20.8% | 19.1% | 76.7% | 20.1% | 17.3% | 40.9% | 0 | 500 |
| M378 | 1.8 | 2.2 | 65.5 | 15 | 7.5 | 2.5 | 5.5 | 21.6% | 21.6% | 21.0% | 74.8% | 20.1% | 15.3% | 41.7% | 1675 | 400 |
| M379 | 1.8 | 2.2 | 63 | 15 | 8.5 | 3.5 | 6 | 21.4% | 21.4% | 20.1% | 76.2% | 20.1% | 19.7% | 41.5% | 0 | 400 |
| M380 | 1.8 | 2.2 | 63.5 | 15 | 7.5 | 3.5 | 6.5 | 21.3% | 21.3% | 20.1% | 76.1% | 20.1% | 18.3% | 41.4% | 0 | 400 |
| M381 | 1.8 | 2.2 | 63 | 15 | 5.5 | 4 | 8.5 | 21.0% | 21.0% | 19.5% | 76.5% | 20.1% | 16.9% | 41.2% | 0 | 400 |
| M382 | 1.8 | 2.2 | 65 | 15 | 10.5 | 1 | 4.5 | 22.0% | 22.0% | 21.8% | 74.2% | 20.1% | 15.7% | 42.1% | 1325 | 400 |
| M383 | 1.8 | 2.2 | 66 | 15 | 6 | 2.5 | 6.5 | 21.4% | 21.4% | 20.9% | 74.8% | 20.1% | 12.8% | 41.5% | 1675 | 400 |
| M384 | 1.8 | 2.2 | 64 | 15 | 6.5 | 3.5 | 7 | 21.2% | 21.2% | 20.0% | 76.1% | 20.1% | 16.7% | 41.4% | 0 | 400 |
| M385 | 1.8 | 2.2 | 67 | 15 | 4.5 | 2 | 7.5 | 21.4% | 21.4% | 21.1% | 74.2% | 20.1% | 11.3% | 41.5% | 1650 | 400 |
| M386 | 1.8 | 2.2 | 64.5 | 15 | 7.5 | 3 | 6 | 21.4% | 21.4% | 20.5% | 75.6% | 20.1% | 16.7% | 41.6% | 0 | 400 |
| M387 | 1.8 | 2.2 | 66 | 15 | 3 | 3 | 9 | 21.0% | 21.0% | 20.0% | 75.7% | 20.1% | 12.5% | 41.1% | 0 | 400 |
| M388 | 1.8 | 2.2 | 64.5 | 15 | 12 | 0.5 | 4 | 22.1% | 22.1% | 21.9% | 74.2% | 20.1% | 16.8% | 42.2% | 1275 | 400 |
| M389 | 1.8 | 2.2 | 64 | 15 | 13.5 | 0 | 3.5 | 22.3% | 22.3% | 22.1% | 74.2% | 20.2% | 17.9% | 42.4% | 1275 | 400 |
| M390 | 1.8 | 2.2 | 68 | 15 | 2 | 1.5 | 9.5 | 21.1% | 21.1% | 20.9% | 74.1% | 20.2% | 14.1% | 41.3% | 1625 | 450 |
| M391 | 1.8 | 2.2 | 66 | 15 | 5.5 | 2.5 | 7 | 21.3% | 21.3% | 20.7% | 75.0% | 20.2% | 11.9% | 41.5% | 0 | 400 |
| M392 | 1.8 | 2.2 | 65.5 | 15 | 4.5 | 3 | 8 | 21.1% | 21.1% | 20.1% | 75.7% | 20.2% | 11.4% | 41.3% | 0 | 400 |
| M393 | 1.8 | 2.2 | 63 | 15 | 5 | 4 | 9 | 21.0% | 21.0% | 19.4% | 76.5% | 20.2% | 16.0% | 41.1% | 0 | 400 |
| M394 | 1.8 | 2.2 | 66 | 15 | 7.5 | 1.5 | 6 | 21.7% | 21.7% | 21.5% | 74.1% | 20.2% | 12.5% | 41.8% | 1625 | 400 |
| M395 | 1.8 | 2.2 | 67 | 15 | 1.5 | 2.5 | 10 | 20.9% | 20.9% | 20.1% | 75.3% | 20.2% | 18.6% | 41.1% | 0 | 400 |

TABLE 10-continued

Compositions and thermodynamic criteria for isolated carbides

| No | B | C | Fe | Mo | Nb | Ti | V | 1 | 2 | 3 | 4 | 5 | 6 | 7 | 8 | 9 |
|---|---|---|---|---|---|---|---|---|---|---|---|---|---|---|---|---|
| M396 | 1.8 | 2.2 | 64.5 | 15 | 4.5 | 3.5 | 8.5 | 21.0% | 21.0% | 19.7% | 76.2% | 20.2% | 13.0% | 41.2% | 0 | 400 |
| M397 | 1.8 | 2.2 | 63 | 15 | 4.5 | 4 | 9.5 | 20.9% | 20.9% | 19.3% | 76.6% | 20.2% | 15.0% | 41.1% | 0 | 400 |
| M398 | 1.8 | 2.2 | 64 | 15 | 13 | 1 | 3 | 22.2% | 22.2% | 22.0% | 74.2% | 20.2% | 19.5% | 42.4% | 1625 | 350 |
| M399 | 1.8 | 2.2 | 66.5 | 15 | 5.5 | 2 | 7 | 21.4% | 21.4% | 21.1% | 74.4% | 20.2% | 10.6% | 41.6% | 1650 | 400 |
| M400 | 1.8 | 2.2 | 64 | 15 | 10 | 2.5 | 4.5 | 21.7% | 21.7% | 20.9% | 75.3% | 20.2% | 19.0% | 41.9% | 0 | 350 |
| M401 | 1.8 | 2.2 | 64 | 15 | 8 | 3 | 6 | 21.4% | 21.4% | 20.4% | 75.8% | 20.2% | 17.4% | 41.6% | 0 | 400 |
| M402 | 1.8 | 2.2 | 64.5 | 15 | 4 | 3.5 | 9 | 21.0% | 21.0% | 19.6% | 76.2% | 20.2% | 11.8% | 41.1% | 0 | 400 |
| M403 | 1.8 | 2.2 | 65.5 | 15 | 8 | 2 | 5.5 | 21.6% | 21.6% | 21.3% | 74.5% | 20.2% | 14.6% | 41.8% | 1650 | 400 |
| M404 | 1.8 | 2.2 | 62.5 | 15 | 5 | 4 | 9.5 | 20.9% | 20.9% | 19.3% | 76.6% | 20.2% | 15.9% | 41.1% | 0 | 400 |
| M405 | 1.8 | 2.2 | 62.5 | 15 | 8 | 3.5 | 7 | 21.3% | 21.3% | 19.9% | 76.4% | 20.2% | 18.8% | 41.5% | 0 | 400 |
| M406 | 1.8 | 2.2 | 67.5 | 15 | 3.5 | 1 | 9 | 21.3% | 21.3% | 21.1% | 74.1% | 20.2% | 5.1% | 41.5% | 1325 | 450 |
| M407 | 1.8 | 2.2 | 63.5 | 15 | 10.5 | 2.5 | 4.5 | 21.7% | 21.7% | 20.8% | 75.5% | 20.2% | 19.7% | 41.9% | 0 | 350 |
| M408 | 1.8 | 2.2 | 64 | 15 | 7.5 | 3 | 6.5 | 21.4% | 21.4% | 20.3% | 75.9% | 20.2% | 16.6% | 41.6% | 0 | 400 |
| M409 | 1.8 | 2.2 | 67 | 15 | 3.5 | 2 | 8.5 | 21.2% | 21.2% | 20.7% | 74.6% | 20.2% | 13.3% | 41.4% | 1675 | 450 |
| M410 | 1.8 | 2.2 | 65 | 15 | 9 | 2 | 5 | 21.7% | 21.7% | 21.3% | 74.6% | 20.2% | 16.1% | 41.9% | 1675 | 400 |
| M411 | 1.8 | 2.2 | 66.5 | 15 | 5 | 2 | 7.5 | 21.4% | 21.4% | 20.9% | 74.6% | 20.2% | 10.5% | 41.6% | 1650 | 400 |
| M412 | 1.8 | 2.2 | 65 | 15 | 5 | 3 | 8 | 21.2% | 21.2% | 20.1% | 75.8% | 20.2% | 12.3% | 41.4% | 0 | 400 |
| M413 | 1.8 | 2.2 | 65.5 | 15 | 7 | 2.5 | 6 | 22.1% | 19.4% | 19.4% | 76.5% | 20.2% | 14.4% | 42.3% | 0 | 500 |
| M414 | 1.8 | 2.2 | 66 | 15 | 7.5 | 1 | 6.5 | 21.7% | 21.7% | 21.5% | 74.1% | 20.2% | 11.2% | 41.9% | 1350 | 400 |
| M415 | 1.8 | 2.2 | 65.5 | 15 | 5.5 | 2.5 | 7.5 | 21.3% | 21.3% | 20.4% | 75.4% | 20.2% | 11.8% | 41.5% | 0 | 400 |
| M416 | 1.8 | 2.2 | 63 | 15 | 9 | 3 | 6 | 21.5% | 21.5% | 20.2% | 76.1% | 20.2% | 18.8% | 41.7% | 0 | 400 |
| M417 | 1.8 | 2.2 | 64.5 | 15 | 6 | 3 | 7.5 | 21.2% | 21.2% | 20.1% | 75.9% | 20.2% | 14.1% | 41.4% | 0 | 400 |
| M418 | 1.8 | 2.2 | 67 | 15 | 4.5 | 1.5 | 8 | 21.4% | 21.4% | 21.2% | 74.1% | 20.2% | 12.5% | 41.6% | 1625 | 450 |
| M419 | 1.8 | 2.2 | 67 | 15 | 3 | 2 | 9 | 21.1% | 21.1% | 20.6% | 74.8% | 20.2% | 14.4% | 41.4% | 1675 | 450 |
| M420 | 1.8 | 2.2 | 65 | 15 | 4 | 3 | 9 | 21.0% | 21.0% | 19.8% | 76.0% | 20.2% | 10.2% | 41.2% | 0 | 400 |
| M421 | 1.8 | 2.2 | 64 | 15 | 11 | 2 | 4 | 21.9% | 21.9% | 21.3% | 74.9% | 20.2% | 19.1% | 42.1% | 1700 | 350 |
| M422 | 1.8 | 2.2 | 63.5 | 15 | 7.5 | 3 | 7 | 21.3% | 21.3% | 20.1% | 76.1% | 20.2% | 16.5% | 41.6% | 0 | 400 |
| M423 | 1.8 | 2.2 | 67 | 15 | 2.5 | 2 | 9.5 | 21.1% | 21.1% | 20.4% | 75.0% | 20.2% | 15.7% | 41.3% | 0 | 450 |
| M424 | 1.8 | 2.2 | 64 | 15 | 6.5 | 3 | 7.5 | 21.2% | 21.2% | 20.0% | 76.0% | 20.2% | 14.9% | 41.5% | 0 | 400 |
| M425 | 1.8 | 2.2 | 67.5 | 15 | 3 | 1.5 | 9 | 21.2% | 21.2% | 21.0% | 74.1% | 20.2% | 15.2% | 41.5% | 1650 | 450 |
| M426 | 1.8 | 2.2 | 63 | 15 | 10.5 | 2.5 | 5 | 21.7% | 21.7% | 20.6% | 75.8% | 20.2% | 19.5% | 41.9% | 0 | 350 |
| M427 | 1.8 | 2.2 | 63.5 | 15 | 4.5 | 3.5 | 9.5 | 21.0% | 21.0% | 19.5% | 76.4% | 20.2% | 12.9% | 41.2% | 0 | 400 |
| M428 | 1.8 | 2.2 | 63 | 15 | 5.5 | 3.5 | 9 | 21.0% | 21.0% | 19.5% | 76.5% | 20.2% | 14.8% | 41.3% | 0 | 400 |
| M429 | 1.8 | 2.2 | 66.5 | 15 | 6 | 1 | 7.5 | 21.5% | 21.3% | 21.3% | 74.1% | 20.3% | 9.0% | 41.8% | 1375 | 450 |
| M430 | 1.8 | 2.2 | 62.5 | 15 | 11 | 2.5 | 5 | 21.7% | 21.7% | 20.5% | 76.0% | 20.3% | 20.2% | 41.9% | 0 | 350 |
| M431 | 1.8 | 2.2 | 63.5 | 15 | 7 | 3 | 7.5 | 21.3% | 21.3% | 20.0% | 76.2% | 20.3% | 15.7% | 41.5% | 0 | 400 |
| M432 | 1.8 | 2.2 | 65 | 15 | 10 | 1 | 5 | 21.9% | 21.9% | 21.7% | 74.2% | 20.3% | 15.0% | 42.2% | 1625 | 400 |
| M433 | 1.8 | 2.2 | 64.5 | 15 | 9 | 2 | 5.5 | 21.7% | 21.7% | 21.0% | 75.1% | 20.3% | 16.0% | 41.9% | 0 | 400 |
| M434 | 1.8 | 2.2 | 65.5 | 15 | 4.5 | 2.5 | 8.5 | 21.1% | 21.1% | 20.2% | 75.6% | 20.3% | 10.3% | 41.4% | 0 | 400 |
| M435 | 1.8 | 2.2 | 66.5 | 15 | 6.5 | 0 | 8 | 21.6% | 21.6% | 21.4% | 74.2% | 20.3% | 7.4% | 41.9% | 1275 | 450 |
| M436 | 1.8 | 2.2 | 67 | 15 | 4 | 1.5 | 8.5 | 21.3% | 21.3% | 21.0% | 74.3% | 20.3% | 13.4% | 41.6% | 1650 | 450 |
| M437 | 1.8 | 2.2 | 64.5 | 15 | 7 | 2.5 | 7 | 21.4% | 21.4% | 20.4% | 75.7% | 20.3% | 14.3% | 41.6% | 0 | 400 |
| M438 | 1.8 | 2.2 | 64 | 15 | 5.5 | 3 | 8.5 | 21.1% | 21.1% | 19.8% | 76.2% | 20.3% | 13.2% | 41.4% | 0 | 400 |
| M439 | 1.8 | 2.2 | 64.5 | 15 | 8 | 2.5 | 6 | 22.1% | 19.6% | 19.6% | 76.5% | 20.3% | 15.9% | 42.4% | 0 | 500 |
| M440 | 1.8 | 2.2 | 65 | 15 | 9.5 | 1.5 | 5 | 21.8% | 21.8% | 21.6% | 74.3% | 20.3% | 15.5% | 42.1% | 1650 | 400 |
| M441 | 1.8 | 2.2 | 62.5 | 15 | 10.5 | 2.5 | 5.5 | 21.6% | 21.6% | 20.4% | 76.0% | 20.3% | 19.4% | 41.9% | 0 | 350 |
| M442 | 1.8 | 2.2 | 56.5 | 15 | 15 | 0 | 9.5 | 21.8% | 21.8% | 19.8% | 76.8% | 20.3% | 18.7% | 43.3% | 0 | 400 |
| M443 | 1.8 | 2.2 | 64 | 15 | 11.5 | 1.5 | 4 | 22.0% | 22.0% | 21.5% | 74.6% | 20.3% | 18.5% | 42.3% | 1675 | 350 |
| M444 | 1.8 | 2.2 | 64.5 | 15 | 6.5 | 2.5 | 7.5 | 21.3% | 21.3% | 20.3% | 75.8% | 20.3% | 13.4% | 41.6% | 0 | 400 |
| M445 | 1.8 | 2.2 | 64 | 15 | 12.5 | 1 | 3.5 | 22.1% | 22.1% | 22.0% | 74.2% | 20.3% | 18.7% | 42.4% | 1625 | 350 |
| M446 | 1.8 | 2.2 | 62.5 | 15 | 5 | 3.5 | 10 | 21.0% | 21.0% | 19.3% | 76.6% | 20.3% | 13.8% | 41.2% | 0 | 400 |
| M447 | 1.8 | 2.2 | 65 | 15 | 10 | 0.5 | 5.5 | 21.9% | 21.9% | 21.7% | 74.2% | 20.3% | 13.7% | 42.2% | 1350 | 400 |
| M448 | 1.8 | 2.2 | 66 | 15 | 6.5 | 1.5 | 7 | 21.5% | 21.5% | 21.2% | 74.4% | 20.3% | 10.9% | 41.8% | 1650 | 400 |
| M449 | 1.8 | 2.2 | 63.5 | 15 | 8.5 | 2.5 | 6.5 | 21.5% | 21.5% | 20.4% | 75.9% | 20.3% | 15.5% | 41.8% | 0 | 400 |
| M450 | 1.8 | 2.2 | 64 | 15 | 8.5 | 2.5 | 6 | 22.2% | 19.6% | 19.6% | 76.5% | 20.3% | 16.6% | 42.5% | 0 | 500 |
| M451 | 1.8 | 2.2 | 62.5 | 15 | 12 | 2 | 4.5 | 21.8% | 21.8% | 20.8% | 75.8% | 20.3% | 0.0% | 42.1% | 0 | 350 |
| M452 | 1.8 | 2.2 | 64 | 15 | 7 | 2.5 | 7.5 | 21.3% | 21.3% | 20.2% | 75.9% | 20.3% | 14.2% | 41.6% | 0 | 400 |
| M453 | 1.8 | 2.2 | 65.5 | 15 | 5.5 | 2 | 8 | 21.3% | 21.3% | 20.5% | 75.3% | 20.3% | 9.8% | 41.6% | 0 | 400 |
| M454 | 1.8 | 2.2 | 63 | 15 | 9 | 2.5 | 6.5 | 21.5% | 21.5% | 20.3% | 76.0% | 20.3% | 17.2% | 41.8% | 0 | 400 |
| M455 | 1.8 | 2.2 | 64 | 15 | 4 | 3 | 10 | 20.9% | 20.9% | 19.5% | 76.3% | 20.3% | 10.2% | 41.3% | 0 | 400 |
| M456 | 1.8 | 2.2 | 66 | 15 | 6 | 1.5 | 7.5 | 21.4% | 21.4% | 21.0% | 74.6% | 20.3% | 10.1% | 41.8% | 1650 | 400 |
| M457 | 1.8 | 2.2 | 64.5 | 15 | 11 | 1 | 4.5 | 22.0% | 22.0% | 21.8% | 74.2% | 20.3% | 16.5% | 42.3% | 1625 | 400 |
| M458 | 1.8 | 2.2 | 66 | 15 | 7.5 | 0 | 7.5 | 21.7% | 21.7% | 21.5% | 74.2% | 20.3% | 8.9% | 42.0% | 1275 | 450 |
| M459 | 1.8 | 2.2 | 64.5 | 15 | 9.5 | 1.5 | 5.5 | 21.7% | 21.7% | 21.2% | 74.8% | 20.3% | 15.4% | 42.1% | 1675 | 400 |
| M460 | 1.8 | 2.2 | 65 | 15 | 4 | 2.5 | 9.5 | 21.0% | 21.0% | 19.9% | 75.9% | 20.3% | 11.4% | 41.4% | 0 | 400 |
| M461 | 1.8 | 2.2 | 65 | 15 | 8.5 | 1.5 | 6 | 21.7% | 21.7% | 21.2% | 74.7% | 20.3% | 13.9% | 42.0% | 1675 | 400 |
| M462 | 1.8 | 2.2 | 67 | 15 | 2.5 | 1.5 | 10 | 21.1% | 21.1% | 20.5% | 74.9% | 20.4% | 14.4% | 41.4% | 1675 | 450 |
| M463 | 1.8 | 2.2 | 62.5 | 15 | 11.5 | 2 | 5 | 21.8% | 21.8% | 20.7% | 75.8% | 20.4% | 19.5% | 42.1% | 0 | 350 |
| M464 | 1.8 | 2.2 | 62 | 15 | 10 | 2.5 | 6.5 | 21.5% | 21.5% | 20.2% | 76.3% | 20.4% | 1.8% | 41.9% | 0 | 400 |
| M465 | 1.8 | 2.2 | 63.5 | 15 | 14 | 0 | 3.5 | 22.3% | 22.3% | 22.1% | 74.2% | 20.4% | 18.7% | 42.7% | 1325 | 350 |
| M466 | 1.8 | 2.2 | 66.5 | 15 | 4 | 1.5 | 9 | 21.2% | 21.2% | 20.7% | 74.8% | 20.4% | 13.5% | 41.6% | 1675 | 450 |
| M467 | 1.8 | 2.2 | 65 | 15 | 6 | 2 | 8 | 21.3% | 21.3% | 20.4% | 75.5% | 20.4% | 11.3% | 41.7% | 0 | 400 |
| M468 | 1.8 | 2.2 | 63.5 | 15 | 7 | 2.5 | 8 | 21.3% | 21.3% | 20.0% | 76.1% | 20.4% | 14.1% | 41.6% | 0 | 400 |
| M469 | 1.8 | 2.2 | 65 | 15 | 9.5 | 1 | 5.5 | 21.8% | 21.8% | 21.6% | 74.2% | 20.4% | 14.2% | 42.2% | 1625 | 400 |
| M470 | 1.8 | 2.2 | 61 | 15 | 11 | 2.5 | 6.5 | 21.6% | 21.6% | 20.1% | 76.4% | 20.4% | 0.5% | 42.0% | 0 | 400 |
| M471 | 1.8 | 2.2 | 62.5 | 15 | 11 | 2 | 5.5 | 21.7% | 21.7% | 20.6% | 75.9% | 20.4% | 18.7% | 42.1% | 0 | 400 |

TABLE 10-continued

Compositions and thermodynamic criteria for isolated carbides

| No | B | C | Fe | Mo | Nb | Ti | V | 1 | 2 | 3 | 4 | 5 | 6 | 7 | 8 | 9 |
|---|---|---|---|---|---|---|---|---|---|---|---|---|---|---|---|---|
| M472 | 1.8 | 2.2 | 64.5 | 15 | 10.5 | 1 | 5 | 21.9% | 21.9% | 21.6% | 74.3% | 20.4% | 15.7% | 42.3% | 1650 | 400 |
| M473 | 1.8 | 2.2 | 62 | 15 | 9.5 | 2.5 | 7 | 21.5% | 21.5% | 20.1% | 76.3% | 20.4% | 17.8% | 41.9% | 0 | 400 |
| M474 | 1.8 | 2.2 | 67.5 | 15 | 2.5 | 1 | 10 | 21.2% | 21.2% | 20.9% | 74.2% | 20.4% | 3.3% | 41.6% | 1650 | 450 |
| M475 | 1.8 | 2.2 | 63.5 | 15 | 9 | 2 | 6.5 | 21.5% | 21.5% | 20.5% | 75.8% | 20.4% | 15.8% | 41.9% | 0 | 400 |
| M476 | 1.8 | 2.2 | 66 | 15 | 7 | 0.5 | 7.5 | 21.6% | 21.6% | 21.4% | 74.2% | 20.4% | 9.3% | 42.0% | 1375 | 450 |
| M477 | 1.8 | 2.2 | 66.5 | 15 | 3.5 | 1.5 | 9.5 | 21.2% | 21.2% | 20.5% | 75.0% | 20.4% | 14.5% | 41.5% | 1700 | 450 |
| M478 | 1.8 | 2.2 | 63 | 15 | 7.5 | 2.5 | 8 | 21.3% | 21.3% | 20.0% | 76.2% | 20.4% | 14.8% | 41.7% | 0 | 400 |
| M479 | 1.8 | 2.2 | 64 | 15 | 11.5 | 1 | 4.5 | 22.0% | 22.0% | 21.6% | 74.5% | 20.4% | 17.1% | 42.4% | 1650 | 400 |
| M480 | 1.8 | 2.2 | 66 | 15 | 6.5 | 1 | 7.5 | 21.5% | 21.5% | 21.3% | 74.2% | 20.4% | 9.7% | 41.9% | 1650 | 400 |
| M481 | 1.8 | 2.2 | 64.5 | 15 | 6.5 | 2 | 8 | 21.3% | 21.3% | 20.3% | 75.7% | 20.4% | 12.0% | 41.7% | 0 | 400 |
| M482 | 1.8 | 2.2 | 60.5 | 15 | 11 | 2.5 | 7 | 21.5% | 21.5% | 20.0% | 76.6% | 20.4% | 0.6% | 41.9% | 0 | 400 |
| M483 | 1.8 | 2.2 | 65.5 | 15 | 6 | 1.5 | 8 | 21.4% | 21.4% | 20.7% | 75.0% | 20.4% | 10.1% | 41.8% | 0 | 400 |
| M484 | 1.8 | 2.2 | 64.5 | 15 | 8.5 | 1.5 | 6.5 | 21.6% | 21.6% | 20.9% | 75.1% | 20.4% | 13.8% | 42.0% | 0 | 400 |
| M485 | 1.8 | 2.2 | 65 | 15 | 5 | 2 | 9 | 21.2% | 21.2% | 20.2% | 75.7% | 20.4% | 10.8% | 41.6% | 0 | 400 |
| M486 | 1.8 | 2.2 | 62.5 | 15 | 8 | 2.5 | 8 | 21.3% | 21.3% | 19.9% | 76.3% | 20.4% | 15.6% | 41.7% | 0 | 400 |
| M487 | 1.8 | 2.2 | 66.5 | 15 | 5 | 1 | 8.5 | 21.4% | 21.4% | 21.1% | 74.3% | 20.4% | 7.4% | 41.8% | 1650 | 450 |
| M488 | 1.8 | 2.2 | 62 | 15 | 11 | 2 | 6 | 21.7% | 21.7% | 20.4% | 76.1% | 20.4% | 18.7% | 42.1% | 0 | 400 |
| M489 | 1.8 | 2.2 | 63.5 | 15 | 13.5 | 0.5 | 3.5 | 22.2% | 22.2% | 22.1% | 74.2% | 20.4% | 19.0% | 42.7% | 1625 | 350 |
| M490 | 1.8 | 2.2 | 65 | 15 | 7 | 1.5 | 7.5 | 21.5% | 21.5% | 20.7% | 75.2% | 20.4% | 11.6% | 41.9% | 0 | 400 |
| M491 | 1.8 | 2.2 | 57.5 | 15 | 11.5 | 2 | 10 | 21.4% | 21.4% | 19.4% | 76.9% | 20.4% | 18.7% | 42.2% | 0 | 400 |
| M492 | 1.8 | 2.2 | 62.5 | 15 | 7.5 | 2.5 | 8.5 | 21.3% | 21.3% | 19.8% | 76.4% | 20.4% | 14.8% | 41.7% | 0 | 400 |
| M493 | 1.8 | 2.2 | 65 | 15 | 4.5 | 2 | 9.5 | 21.1% | 21.1% | 20.0% | 75.8% | 20.4% | 11.7% | 41.5% | 0 | 400 |
| M494 | 1.8 | 2.2 | 66 | 15 | 6 | 1 | 8 | 21.5% | 21.5% | 21.1% | 74.4% | 20.4% | 8.9% | 41.9% | 1650 | 450 |
| M495 | 1.8 | 2.2 | 63 | 15 | 11 | 1.5 | 5.5 | 21.8% | 21.8% | 20.8% | 75.6% | 20.4% | 17.5% | 42.2% | 0 | 400 |
| M496 | 1.8 | 2.2 | 64.5 | 15 | 5.5 | 2 | 9 | 21.2% | 21.2% | 20.1% | 75.8% | 20.4% | 10.1% | 41.6% | 0 | 400 |
| M497 | 1.8 | 2.2 | 66 | 15 | 4 | 1.5 | 9.5 | 21.2% | 21.2% | 20.4% | 75.2% | 20.4% | 13.7% | 41.6% | 0 | 450 |
| M498 | 1.8 | 2.2 | 62 | 15 | 12.5 | 1.5 | 5 | 21.9% | 21.9% | 20.8% | 75.9% | 20.5% | 0.9% | 42.3% | 0 | 350 |
| M499 | 1.8 | 2.2 | 65 | 15 | 6.5 | 1.5 | 8 | 21.4% | 21.4% | 20.6% | 75.3% | 20.5% | 10.8% | 41.8% | 0 | 400 |
| M500 | 1.8 | 2.2 | 63.5 | 15 | 5 | 2.5 | 10 | 21.0% | 21.0% | 19.6% | 76.3% | 20.5% | 10.7% | 41.5% | 0 | 400 |
| M501 | 1.8 | 2.2 | 61.5 | 15 | 11 | 2 | 6.5 | 21.6% | 21.6% | 20.3% | 76.3% | 20.5% | 1.9% | 42.1% | 0 | 400 |
| M502 | 1.8 | 2.2 | 62.5 | 15 | 13.5 | 1 | 4 | 22.1% | 22.1% | 21.3% | 75.3% | 20.5% | 0.5% | 42.5% | 0 | 350 |
| M503 | 1.8 | 2.2 | 64.5 | 15 | 7.5 | 1.5 | 7.5 | 21.5% | 21.5% | 20.6% | 75.4% | 20.5% | 12.3% | 41.9% | 0 | 400 |
| M504 | 1.8 | 2.2 | 66 | 15 | 3.5 | 1.5 | 10 | 21.1% | 21.1% | 20.3% | 75.3% | 20.5% | 14.6% | 41.6% | 0 | 450 |
| M505 | 1.8 | 2.2 | 62 | 15 | 8 | 2.5 | 8.5 | 21.3% | 21.3% | 19.8% | 76.4% | 20.5% | 15.5% | 41.8% | 0 | 400 |
| M506 | 1.8 | 2.2 | 65 | 15 | 8 | 1 | 7 | 21.6% | 21.6% | 21.1% | 74.8% | 20.5% | 11.9% | 42.1% | 1675 | 400 |
| M507 | 1.8 | 2.2 | 61 | 15 | 11.5 | 2 | 6.5 | 21.7% | 21.7% | 20.2% | 76.4% | 20.5% | 19.2% | 42.1% | 0 | 400 |
| M508 | 1.8 | 2.2 | 63.5 | 15 | 9.5 | 1.5 | 6.5 | 21.6% | 21.6% | 20.7% | 75.6% | 20.5% | 15.2% | 42.1% | 0 | 400 |
| M509 | 1.8 | 2.2 | 66.5 | 15 | 4 | 1 | 9.5 | 21.2% | 21.2% | 20.7% | 74.7% | 20.5% | 5.8% | 41.7% | 1675 | 450 |
| M510 | 1.8 | 2.2 | 60.5 | 15 | 12 | 2 | 6.5 | 21.7% | 21.7% | 20.2% | 76.4% | 20.5% | 0.6% | 42.2% | 0 | 400 |
| M511 | 1.8 | 2.2 | 66 | 15 | 5.5 | 1 | 8.5 | 21.4% | 21.4% | 20.9% | 74.6% | 20.5% | 8.2% | 41.9% | 1675 | 450 |
| M512 | 1.8 | 2.2 | 64 | 15 | 6 | 2 | 9 | 21.2% | 21.2% | 20.0% | 76.0% | 20.5% | 11.2% | 41.7% | 0 | 400 |
| M513 | 1.8 | 2.2 | 63 | 15 | 14 | 0.5 | 3.5 | 22.2% | 22.2% | 21.9% | 74.5% | 20.5% | 19.7% | 42.7% | 1650 | 350 |
| M514 | 1.8 | 2.2 | 64 | 15 | 8 | 1.5 | 7.5 | 21.5% | 21.5% | 20.5% | 75.6% | 20.5% | 13.0% | 42.0% | 0 | 400 |
| M515 | 1.8 | 2.2 | 64.5 | 15 | 4.5 | 2 | 10 | 21.1% | 21.1% | 19.9% | 76.0% | 20.5% | 11.8% | 41.6% | 0 | 450 |
| M516 | 1.8 | 2.2 | 63.5 | 15 | 13 | 0.5 | 4 | 22.2% | 22.2% | 21.9% | 74.3% | 20.5% | 18.2% | 42.7% | 1650 | 400 |
| M517 | 1.8 | 2.2 | 61.5 | 15 | 12.5 | 1.5 | 5.5 | 21.8% | 21.8% | 20.6% | 76.1% | 20.5% | 1.0% | 42.3% | 0 | 400 |
| M518 | 1.8 | 2.2 | 64 | 15 | 11.5 | 0.5 | 5 | 22.0% | 22.0% | 21.7% | 74.4% | 20.5% | 15.9% | 42.5% | 1650 | 400 |
| M519 | 1.8 | 2.2 | 63 | 15 | 10 | 1.5 | 6.5 | 21.6% | 21.6% | 20.6% | 75.8% | 20.5% | 15.9% | 42.1% | 0 | 400 |
| M520 | 1.8 | 2.2 | 62.5 | 15 | 6 | 2.5 | 10 | 21.1% | 21.1% | 19.6% | 76.5% | 20.5% | 12.4% | 41.6% | 0 | 400 |
| M521 | 1.8 | 2.2 | 66.5 | 15 | 3.5 | 1 | 10 | 21.2% | 21.2% | 20.6% | 74.9% | 20.5% | 15.5% | 41.7% | 1675 | 450 |
| M522 | 1.8 | 2.2 | 60 | 15 | 12 | 2 | 7 | 21.6% | 21.6% | 20.1% | 76.6% | 20.5% | 0.7% | 42.2% | 0 | 400 |
| M523 | 1.8 | 2.2 | 63 | 15 | 7.5 | 2 | 8.5 | 21.3% | 21.3% | 20.0% | 76.2% | 20.5% | 13.4% | 41.8% | 0 | 400 |
| M524 | 1.8 | 2.2 | 63.5 | 15 | 12.5 | 0.5 | 4.5 | 22.1% | 22.1% | 21.7% | 74.5% | 20.5% | 17.4% | 42.6% | 1650 | 400 |
| M525 | 1.8 | 2.2 | 62 | 15 | 13.5 | 1 | 4.5 | 22.0% | 22.0% | 21.1% | 75.6% | 20.5% | 0.7% | 42.5% | 0 | 350 |
| M526 | 1.8 | 2.2 | 61 | 15 | 13 | 1.5 | 5.5 | 21.8% | 21.8% | 20.6% | 76.2% | 20.5% | 0.3% | 42.4% | 0 | 350 |
| M527 | 1.8 | 2.2 | 61 | 15 | 10.5 | 2 | 7.5 | 21.5% | 21.5% | 20.0% | 76.4% | 20.5% | 2.8% | 42.1% | 0 | 400 |
| M528 | 1.8 | 2.2 | 58 | 15 | 11.5 | 2.5 | 9 | 21.4% | 21.4% | 19.5% | 76.9% | 20.5% | 20.2% | 42.0% | 0 | 400 |
| M529 | 1.8 | 2.2 | 64 | 15 | 7.5 | 1.5 | 8 | 21.4% | 21.4% | 20.4% | 75.7% | 20.5% | 12.2% | 41.9% | 0 | 400 |
| M530 | 1.8 | 2.2 | 65.5 | 15 | 8 | 0 | 7.5 | 21.7% | 21.7% | 21.5% | 74.2% | 20.5% | 11.0% | 42.2% | 1375 | 450 |
| M531 | 1.8 | 2.2 | 61.5 | 15 | 12 | 1.5 | 6 | 21.8% | 21.8% | 20.5% | 76.1% | 20.5% | 1.8% | 42.3% | 0 | 400 |
| M532 | 1.8 | 2.2 | 61.5 | 15 | 7 | 2.5 | 10 | 21.1% | 21.1% | 19.5% | 76.6% | 20.5% | 13.9% | 41.7% | 0 | 400 |
| M533 | 1.8 | 2.2 | 65 | 15 | 7 | 1 | 8 | 21.5% | 21.5% | 20.8% | 75.1% | 20.5% | 10.3% | 42.0% | 0 | 400 |
| M534 | 1.8 | 2.2 | 57.5 | 15 | 11.5 | 2.5 | 9.5 | 21.4% | 21.4% | 19.4% | 77.0% | 20.5% | 20.1% | 42.0% | 0 | 400 |
| M535 | 1.8 | 2.2 | 63 | 15 | 7 | 2 | 9 | 21.3% | 21.3% | 19.9% | 76.2% | 20.5% | 12.6% | 41.8% | 0 | 400 |
| M536 | 1.8 | 2.2 | 62 | 15 | 8.5 | 2 | 8.5 | 21.4% | 21.4% | 19.9% | 76.4% | 20.6% | 14.8% | 41.9% | 0 | 400 |
| M537 | 1.8 | 2.2 | 64 | 15 | 11 | 0.5 | 5.5 | 21.9% | 21.9% | 21.5% | 74.6% | 20.6% | 15.1% | 42.5% | 1650 | 400 |
| M538 | 1.8 | 2.2 | 64.5 | 15 | 6 | 1.5 | 9 | 21.3% | 21.3% | 20.2% | 75.7% | 20.6% | 10.0% | 41.8% | 0 | 400 |
| M539 | 1.8 | 2.2 | 59 | 15 | 12.5 | 2 | 7.5 | 21.6% | 21.6% | 19.9% | 76.7% | 20.6% | 20.4% | 42.2% | 0 | 400 |
| M540 | 1.8 | 2.2 | 63 | 15 | 14.5 | 0 | 3.5 | 22.3% | 22.3% | 22.2% | 74.2% | 20.6% | 19.4% | 42.9% | 1625 | 350 |
| M541 | 1.8 | 2.2 | 66 | 15 | 6 | 0.5 | 8.5 | 21.5% | 21.5% | 21.2% | 74.3% | 20.6% | 7.8% | 42.1% | 1650 | 450 |
| M542 | 1.8 | 2.2 | 62.5 | 15 | 12 | 1 | 5.5 | 21.9% | 21.9% | 20.9% | 75.6% | 20.6% | 17.6% | 42.4% | 0 | 400 |
| M543 | 1.8 | 2.2 | 60.5 | 15 | 13 | 1.5 | 6 | 21.8% | 21.8% | 20.4% | 76.3% | 20.6% | 0.5% | 42.4% | 0 | 400 |
| M544 | 1.8 | 2.2 | 61.5 | 15 | 9 | 2 | 8.5 | 21.4% | 21.4% | 19.9% | 76.4% | 20.6% | 15.5% | 41.9% | 0 | 400 |
| M545 | 1.8 | 2.2 | 62 | 15 | 10.5 | 1.5 | 7 | 21.6% | 21.6% | 20.4% | 76.1% | 20.6% | 16.5% | 42.2% | 0 | 400 |
| M546 | 1.8 | 2.2 | 63 | 15 | 6.5 | 2 | 9.5 | 21.2% | 21.2% | 19.8% | 76.3% | 20.6% | 11.9% | 41.8% | 0 | 400 |
| M547 | 1.8 | 2.2 | 66.5 | 15 | 4.5 | 0.5 | 9.5 | 21.3% | 21.3% | 21.0% | 74.4% | 20.6% | 5.6% | 41.9% | 1650 | 450 |

TABLE 10-continued

Compositions and thermodynamic criteria for isolated carbides

| No | B | C | Fe | Mo | Nb | Ti | V | 1 | 2 | 3 | 4 | 5 | 6 | 7 | 8 | 9 |
|---|---|---|---|---|---|---|---|---|---|---|---|---|---|---|---|---|
| M548 | 1.8 | 2.2 | 63.5 | 15 | 7.5 | 1.5 | 8.5 | 21.4% | 21.4% | 20.2% | 75.9% | 20.6% | 12.2% | 41.9% | 0 | 400 |
| M549 | 1.8 | 2.2 | 62 | 15 | 8 | 2 | 9 | 21.3% | 21.3% | 19.8% | 76.4% | 20.6% | 14.1% | 41.9% | 0 | 400 |
| M550 | 1.8 | 2.2 | 60 | 15 | 11 | 2 | 8 | 21.5% | 21.5% | 19.9% | 76.6% | 20.6% | 2.3% | 42.1% | 0 | 400 |
| M551 | 1.8 | 2.2 | 58.5 | 15 | 10 | 2.5 | 10 | 21.3% | 21.3% | 20.7% | 76.9% | 20.6% | 2.6% | 41.9% | 0 | 400 |
| M552 | 1.8 | 2.2 | 62 | 15 | 14.5 | 0.5 | 4 | 22.2% | 22.2% | 21.4% | 75.3% | 20.6% | 20.3% | 42.8% | 0 | 350 |
| M553 | 1.8 | 2.2 | 63.5 | 15 | 9.5 | 1 | 7 | 21.6% | 21.6% | 20.7% | 75.5% | 20.6% | 13.9% | 42.2% | 0 | 400 |
| M554 | 1.8 | 2.2 | 60.5 | 15 | 10 | 2 | 8.5 | 21.4% | 21.4% | 19.8% | 76.6% | 20.6% | 3.7% | 42.0% | 0 | 400 |
| M555 | 1.8 | 2.2 | 65 | 15 | 6 | 1 | 9 | 21.3% | 21.3% | 20.5% | 75.3% | 20.6% | 8.8% | 41.9% | 0 | 450 |
| M556 | 1.8 | 2.2 | 61 | 15 | 11.5 | 1.5 | 7 | 21.7% | 21.7% | 20.3% | 76.3% | 20.6% | 17.9% | 42.3% | 0 | 400 |
| M557 | 1.8 | 2.2 | 62 | 15 | 12 | 1 | 6 | 21.8% | 21.8% | 20.7% | 75.9% | 20.6% | 17.5% | 42.4% | 0 | 400 |
| M558 | 1.8 | 2.2 | 64.5 | 15 | 9 | 0.5 | 7 | 21.7% | 21.7% | 21.2% | 74.8% | 20.6% | 12.1% | 42.3% | 1675 | 400 |
| M559 | 1.8 | 2.2 | 65.5 | 15 | 4.5 | 1 | 10 | 21.2% | 21.2% | 20.4% | 75.3% | 20.6% | 6.5% | 41.8% | 0 | 450 |
| M560 | 1.8 | 2.2 | 64 | 15 | 6 | 1.5 | 9.5 | 21.2% | 21.2% | 20.1% | 75.9% | 20.6% | 9.9% | 41.8% | 0 | 400 |
| M561 | 1.8 | 2.2 | 59 | 15 | 11.5 | 2 | 8.5 | 21.5% | 21.5% | 19.7% | 76.8% | 20.6% | 18.9% | 42.1% | 0 | 400 |
| M562 | 1.8 | 2.2 | 65 | 15 | 9 | 0 | 7 | 21.8% | 21.8% | 21.6% | 74.2% | 20.6% | 9.6% | 42.4% | 1625 | 400 |
| M563 | 1.8 | 2.2 | 63.5 | 15 | 11 | 0.5 | 6 | 21.9% | 21.9% | 21.2% | 75.0% | 20.6% | 15.0% | 42.5% | 0 | 400 |
| M564 | 1.8 | 2.2 | 62.5 | 15 | 11 | 1 | 6.5 | 21.7% | 21.7% | 20.7% | 75.8% | 20.6% | 16.0% | 42.4% | 0 | 400 |
| M565 | 1.8 | 2.2 | 61.5 | 15 | 8 | 2 | 9.5 | 21.3% | 21.3% | 19.7% | 76.5% | 20.6% | 14.0% | 41.9% | 0 | 400 |
| M566 | 1.8 | 2.2 | 65 | 15 | 7.5 | 0.5 | 8 | 21.6% | 21.6% | 21.0% | 74.8% | 20.6% | 9.9% | 42.2% | 1675 | 450 |
| M567 | 1.8 | 2.2 | 60 | 15 | 10 | 2 | 9 | 21.4% | 21.4% | 19.7% | 76.7% | 20.6% | 3.8% | 42.0% | 0 | 400 |
| M568 | 1.8 | 2.2 | 64 | 15 | 11.5 | 0 | 5.5 | 22.0% | 22.0% | 21.8% | 74.2% | 20.6% | 14.8% | 42.7% | 1650 | 400 |
| M569 | 1.8 | 2.2 | 59.5 | 15 | 13 | 1.5 | 7 | 21.7% | 21.7% | 20.1% | 76.6% | 20.6% | 0.7% | 42.4% | 0 | 400 |
| M570 | 1.8 | 2.2 | 64.5 | 15 | 8.5 | 0.5 | 7.5 | 21.6% | 21.6% | 21.0% | 74.9% | 20.6% | 11.3% | 42.3% | 1700 | 400 |
| M571 | 1.8 | 2.2 | 59 | 15 | 13.5 | 1.5 | 7 | 21.8% | 21.8% | 20.1% | 76.6% | 20.6% | 0.0% | 42.4% | 0 | 400 |
| M572 | 1.8 | 2.2 | 58.5 | 15 | 11.5 | 2 | 9 | 21.5% | 21.5% | 19.6% | 76.8% | 20.6% | 18.8% | 42.1% | 0 | 400 |
| M573 | 1.8 | 2.2 | 63 | 15 | 13.5 | 0 | 4.5 | 22.2% | 22.2% | 21.8% | 74.6% | 20.7% | 17.8% | 42.8% | 1650 | 400 |
| M574 | 1.8 | 2.2 | 61.5 | 15 | 7.5 | 2 | 10 | 21.2% | 21.2% | 19.6% | 76.5% | 20.7% | 13.2% | 41.9% | 0 | 400 |
| M575 | 1.8 | 2.2 | 62.5 | 15 | 12.5 | 0.5 | 5.5 | 22.0% | 22.0% | 21.1% | 75.4% | 20.7% | 17.2% | 42.6% | 0 | 400 |
| M576 | 1.8 | 2.2 | 62.5 | 15 | 10.5 | 1 | 7 | 21.7% | 21.7% | 20.6% | 75.9% | 20.7% | 15.3% | 42.3% | 0 | 400 |
| M577 | 1.8 | 2.2 | 65.5 | 15 | 6 | 0.5 | 9 | 21.4% | 21.4% | 20.8% | 74.8% | 20.7% | 7.7% | 42.1% | 1675 | 450 |
| M578 | 1.8 | 2.2 | 60.5 | 15 | 13.5 | 1 | 6 | 21.9% | 21.9% | 20.5% | 76.3% | 20.7% | 1.1% | 42.5% | 0 | 400 |
| M579 | 1.8 | 2.2 | 59.5 | 15 | 12.5 | 1.5 | 7.5 | 21.7% | 21.7% | 20.1% | 76.6% | 20.7% | 1.5% | 42.3% | 0 | 400 |
| M580 | 1.8 | 2.2 | 63.5 | 15 | 12 | 0 | 5.5 | 22.0% | 22.0% | 21.6% | 74.6% | 20.7% | 15.5% | 42.7% | 1650 | 400 |
| M581 | 1.8 | 2.2 | 62.5 | 15 | 8 | 1.5 | 9 | 21.4% | 21.4% | 20.0% | 76.2% | 20.7% | 12.8% | 42.0% | 0 | 400 |
| M582 | 1.8 | 2.2 | 63 | 15 | 7 | 1.5 | 9.5 | 21.3% | 21.3% | 20.0% | 76.2% | 20.7% | 11.3% | 41.9% | 0 | 400 |
| M583 | 1.8 | 2.2 | 57.5 | 15 | 12 | 2 | 9.5 | 21.5% | 21.5% | 19.5% | 76.9% | 20.7% | 1.2% | 42.2% | 0 | 400 |
| M584 | 1.8 | 2.2 | 65 | 15 | 8.5 | 0 | 7.5 | 21.7% | 21.7% | 21.4% | 74.3% | 20.7% | 10.4% | 42.4% | 1650 | 450 |
| M585 | 1.8 | 2.2 | 62 | 15 | 11 | 1 | 7 | 21.7% | 21.7% | 20.5% | 76.0% | 20.7% | 16.0% | 42.4% | 0 | 400 |
| M586 | 1.8 | 2.2 | 64 | 15 | 9 | 0.5 | 7.5 | 21.6% | 21.6% | 20.9% | 75.2% | 20.7% | 12.0% | 42.3% | 0 | 400 |
| M587 | 1.8 | 2.2 | 60 | 15 | 14 | 1 | 6 | 21.9% | 21.9% | 20.5% | 76.3% | 20.7% | 0.4% | 42.6% | 0 | 400 |
| M588 | 1.8 | 2.2 | 64.5 | 15 | 9.5 | 0 | 7 | 21.8% | 21.8% | 21.4% | 74.5% | 20.7% | 11.7% | 42.5% | 1650 | 400 |
| M589 | 1.8 | 2.2 | 63 | 15 | 11 | 0.5 | 6.5 | 21.8% | 21.8% | 21.0% | 75.4% | 20.7% | 14.9% | 42.5% | 0 | 400 |
| M590 | 1.8 | 2.2 | 62 | 15 | 8.5 | 1.5 | 9 | 21.4% | 21.4% | 20.0% | 76.3% | 20.7% | 13.5% | 42.1% | 0 | 400 |
| M591 | 1.8 | 2.2 | 63 | 15 | 6.5 | 1.5 | 10 | 21.2% | 21.2% | 19.9% | 76.2% | 20.7% | 10.6% | 41.9% | 0 | 400 |
| M592 | 1.8 | 2.2 | 61 | 15 | 14.5 | 0.5 | 5 | 22.1% | 22.1% | 21.0% | 75.9% | 20.7% | 0.7% | 42.8% | 0 | 350 |
| M593 | 1.8 | 2.2 | 61.5 | 15 | 13.5 | 0.5 | 5.5 | 22.0% | 22.0% | 20.9% | 75.8% | 20.7% | 18.5% | 42.7% | 0 | 400 |
| M594 | 1.8 | 2.2 | 59 | 15 | 12.5 | 1.5 | 8 | 21.7% | 21.7% | 19.9% | 76.7% | 20.7% | 1.6% | 42.4% | 0 | 400 |
| M595 | 1.8 | 2.2 | 58 | 15 | 11 | 2 | 10 | 21.4% | 21.4% | 19.4% | 76.9% | 20.7% | 2.7% | 42.1% | 0 | 400 |
| M596 | 1.8 | 2.2 | 64.5 | 15 | 7.5 | 0.5 | 8.5 | 21.5% | 21.5% | 20.7% | 75.2% | 20.7% | 9.8% | 42.2% | 0 | 450 |
| M597 | 1.8 | 2.2 | 60 | 15 | 13.5 | 1 | 6.5 | 21.9% | 21.9% | 20.4% | 76.4% | 20.7% | 19.5% | 42.6% | 0 | 400 |
| M598 | 1.8 | 2.2 | 66.5 | 15 | 4.5 | 0 | 10 | 21.4% | 21.4% | 21.1% | 74.2% | 20.7% | 16.3% | 42.1% | 1650 | 450 |
| M599 | 1.8 | 2.2 | 62.5 | 15 | 11.5 | 0.5 | 6.5 | 21.8% | 21.8% | 20.9% | 75.6% | 20.7% | 15.6% | 42.5% | 0 | 400 |
| M600 | 1.8 | 2.2 | 64 | 15 | 6.5 | 1 | 9.5 | 21.3% | 21.3% | 20.2% | 75.8% | 20.7% | 9.5% | 42.0% | 0 | 450 |
| M601 | 1.8 | 2.2 | 62.5 | 15 | 13.5 | 0 | 5 | 22.1% | 22.1% | 21.5% | 75.1% | 20.7% | 17.6% | 42.8% | 0 | 400 |
| M602 | 1.8 | 2.2 | 64.5 | 15 | 9 | 0 | 7.5 | 21.7% | 21.7% | 21.3% | 74.7% | 20.7% | 9.8% | 42.5% | 1675 | 400 |
| M603 | 1.8 | 2.2 | 61 | 15 | 14 | 0.5 | 5.5 | 22.0% | 22.0% | 20.9% | 76.0% | 20.7% | 1.5% | 42.7% | 0 | 400 |
| M604 | 1.8 | 2.2 | 60.5 | 15 | 10 | 1.5 | 9 | 21.5% | 21.5% | 19.8% | 76.6% | 20.7% | 15.5% | 42.2% | 0 | 400 |
| M605 | 1.8 | 2.2 | 64 | 15 | 10 | 0 | 7 | 21.8% | 21.8% | 21.3% | 74.8% | 20.7% | 8.3% | 42.5% | 1675 | 400 |
| M606 | 1.8 | 2.2 | 62.5 | 15 | 9 | 1 | 8.5 | 21.5% | 21.5% | 20.2% | 76.1% | 20.7% | 13.0% | 42.2% | 0 | 400 |
| M607 | 1.8 | 2.2 | 57 | 15 | 14 | 1 | 9 | 21.7% | 21.7% | 19.7% | 76.9% | 20.7% | 19.7% | 42.7% | 0 | 400 |
| M608 | 1.8 | 2.2 | 60.5 | 15 | 14.5 | 0.5 | 5.5 | 22.0% | 22.0% | 20.8% | 76.1% | 20.8% | 0.8% | 42.8% | 0 | 400 |
| M609 | 1.8 | 2.2 | 61 | 15 | 9 | 1.5 | 9.5 | 21.4% | 21.4% | 19.8% | 76.5% | 20.8% | 14.1% | 42.1% | 0 | 400 |
| M610 | 1.8 | 2.2 | 64 | 15 | 8 | 0.5 | 8.5 | 21.5% | 21.5% | 20.6% | 75.4% | 20.8% | 10.5% | 42.3% | 0 | 400 |
| M611 | 1.8 | 2.2 | 62 | 15 | 7.5 | 1.5 | 10 | 21.3% | 21.3% | 19.8% | 76.4% | 20.8% | 12.0% | 42.0% | 0 | 400 |
| M612 | 1.8 | 2.2 | 61 | 15 | 13.5 | 0.5 | 6 | 21.9% | 21.9% | 20.7% | 76.0% | 20.8% | 18.4% | 42.7% | 0 | 400 |
| M613 | 1.8 | 2.2 | 58.5 | 15 | 12 | 1.5 | 9 | 21.6% | 21.6% | 19.7% | 76.8% | 20.8% | 2.5% | 42.3% | 0 | 400 |
| M614 | 1.8 | 2.2 | 64.5 | 15 | 8.5 | 0 | 8 | 21.7% | 21.7% | 21.1% | 74.8% | 20.8% | 10.6% | 42.4% | 1675 | 450 |
| M615 | 1.8 | 2.2 | 61 | 15 | 11 | 1 | 8 | 21.6% | 21.6% | 20.2% | 76.3% | 20.8% | 15.8% | 42.4% | 0 | 400 |
| M616 | 1.8 | 2.2 | 63 | 15 | 7.5 | 1 | 9.5 | 21.3% | 21.3% | 20.1% | 76.1% | 20.8% | 10.8% | 42.1% | 0 | 400 |
| M617 | 1.8 | 2.2 | 66 | 15 | 5 | 0 | 10 | 21.4% | 21.4% | 20.9% | 74.6% | 20.8% | 15.7% | 42.1% | 1650 | 450 |
| M618 | 1.8 | 2.2 | 59 | 15 | 11 | 1.5 | 9.5 | 21.5% | 21.5% | 19.7% | 76.8% | 20.8% | 4.0% | 42.3% | 0 | 400 |
| M619 | 1.8 | 2.2 | 60.5 | 15 | 14 | 0.5 | 6 | 22.0% | 22.0% | 20.7% | 76.2% | 20.8% | 1.7% | 42.7% | 0 | 400 |
| M620 | 1.8 | 2.2 | 62 | 15 | 13.5 | 0 | 5.5 | 22.1% | 22.1% | 21.2% | 75.4% | 20.8% | 17.5% | 42.8% | 0 | 400 |
| M621 | 1.8 | 2.2 | 60 | 15 | 14.5 | 0.5 | 6 | 22.0% | 22.0% | 20.6% | 76.3% | 20.8% | 1.0% | 42.8% | 0 | 400 |
| M622 | 1.8 | 2.2 | 58.5 | 15 | 14 | 1 | 7.5 | 21.8% | 21.8% | 20.1% | 76.7% | 20.8% | 20.0% | 42.6% | 0 | 400 |
| M623 | 1.8 | 2.2 | 65 | 15 | 7 | 0 | 9 | 21.5% | 21.5% | 20.9% | 74.9% | 20.8% | 12.8% | 42.3% | 1675 | 450 |

TABLE 10-continued

Compositions and thermodynamic criteria for isolated carbides

| No | B | C | Fe | Mo | Nb | Ti | V | 1 | 2 | 3 | 4 | 5 | 6 | 7 | 8 | 9 |
|---|---|---|---|---|---|---|---|---|---|---|---|---|---|---|---|---|
| M624 | 1.8 | 2.2 | 58 | 15 | 12 | 1.5 | 9.5 | 21.5% | 21.5% | 19.6% | 76.9% | 20.8% | 18.2% | 42.3% | 0 | 400 |
| M625 | 1.8 | 2.2 | 61 | 15 | 10.5 | 1 | 8.5 | 21.6% | 21.6% | 20.1% | 76.4% | 20.8% | 15.0% | 42.4% | 0 | 400 |
| M626 | 1.8 | 2.2 | 62.5 | 15 | 10 | 0.5 | 8 | 21.6% | 21.6% | 20.5% | 75.9% | 20.8% | 13.3% | 42.4% | 0 | 400 |
| M627 | 1.8 | 2.2 | 61.5 | 15 | 9.5 | 1 | 9 | 21.5% | 21.5% | 20.0% | 76.3% | 20.8% | 13.6% | 42.3% | 0 | 400 |
| M628 | 1.8 | 2.2 | 59.5 | 15 | 10 | 1.5 | 10 | 21.4% | 21.4% | 19.6% | 76.7% | 20.8% | 5.4% | 42.2% | 0 | 400 |
| M629 | 1.8 | 2.2 | 64 | 15 | 9 | 0 | 8 | 21.7% | 21.7% | 21.0% | 75.1% | 20.8% | 10.0% | 42.5% | 0 | 400 |
| M630 | 1.8 | 2.2 | 64 | 15 | 7 | 0.5 | 9.5 | 21.4% | 21.4% | 20.4% | 75.6% | 20.8% | 9.0% | 42.2% | 0 | 450 |
| M631 | 1.8 | 2.2 | 59 | 15 | 10.5 | 1.5 | 10 | 21.4% | 21.4% | 19.6% | 76.8% | 20.8% | 4.8% | 42.2% | 0 | 400 |
| M632 | 1.8 | 2.2 | 60 | 15 | 11.5 | 1 | 8.5 | 21.6% | 21.6% | 20.0% | 76.5% | 20.8% | 4.4% | 42.4% | 0 | 400 |
| M633 | 1.8 | 2.2 | 58 | 15 | 11.5 | 1.5 | 10 | 21.5% | 21.5% | 19.5% | 76.9% | 20.8% | 17.4% | 42.3% | 0 | 400 |
| M634 | 1.8 | 2.2 | 60.5 | 15 | 13 | 0.5 | 7 | 21.8% | 21.8% | 20.5% | 76.3% | 20.8% | 17.6% | 42.7% | 0 | 400 |
| M635 | 1.8 | 2.2 | 62 | 15 | 12.5 | 0 | 6.5 | 21.9% | 21.9% | 20.9% | 75.6% | 20.9% | 15.9% | 42.8% | 0 | 400 |
| M636 | 1.8 | 2.2 | 59 | 15 | 15 | 0.5 | 6.5 | 22.0% | 22.0% | 20.5% | 76.5% | 20.9% | 20.4% | 42.8% | 0 | 400 |
| M637 | 1.8 | 2.2 | 62.5 | 15 | 11.5 | 0 | 7 | 21.8% | 21.8% | 20.9% | 75.5% | 20.9% | 6.4% | 42.7% | 0 | 400 |
| M638 | 1.8 | 2.2 | 61.5 | 15 | 9 | 1 | 9.5 | 21.4% | 21.4% | 20.0% | 76.4% | 20.9% | 12.9% | 42.3% | 0 | 400 |
| M639 | 1.8 | 2.2 | 60 | 15 | 13.5 | 0.5 | 7 | 21.9% | 21.9% | 20.4% | 76.4% | 20.9% | 18.2% | 42.7% | 0 | 400 |
| M640 | 1.8 | 2.2 | 61 | 15 | 14 | 0 | 6 | 22.0% | 22.0% | 20.9% | 75.9% | 20.9% | 18.1% | 42.9% | 0 | 400 |
| M641 | 1.8 | 2.2 | 62 | 15 | 10 | 0.5 | 8.5 | 21.6% | 21.6% | 20.3% | 76.1% | 20.9% | 13.2% | 42.5% | 0 | 400 |
| M642 | 1.8 | 2.2 | 64.5 | 15 | 7 | 0 | 9.5 | 21.5% | 21.5% | 20.7% | 75.2% | 20.9% | 13.0% | 42.3% | 0 | 450 |
| M643 | 1.8 | 2.2 | 59 | 15 | 12 | 1 | 9 | 21.6% | 21.6% | 19.9% | 76.7% | 20.9% | 3.9% | 42.5% | 0 | 400 |
| M644 | 1.8 | 2.2 | 60 | 15 | 13 | 0.5 | 7.5 | 21.8% | 21.8% | 20.3% | 76.4% | 20.9% | 3.4% | 42.7% | 0 | 400 |
| M645 | 1.8 | 2.2 | 58.5 | 15 | 12.5 | 1 | 9 | 21.6% | 21.6% | 19.8% | 76.7% | 20.9% | 3.2% | 42.5% | 0 | 400 |
| M646 | 1.8 | 2.2 | 58 | 15 | 13 | 1 | 9 | 21.7% | 21.7% | 19.8% | 76.8% | 20.9% | 2.5% | 42.5% | 0 | 400 |
| M647 | 1.8 | 2.2 | 59.5 | 15 | 13.5 | 0.5 | 7.5 | 21.8% | 21.8% | 20.3% | 76.5% | 20.9% | 18.2% | 42.7% | 0 | 400 |
| M648 | 1.8 | 2.2 | 61.5 | 15 | 10.5 | 0.5 | 8.5 | 21.6% | 21.6% | 20.3% | 76.2% | 20.9% | 13.9% | 42.5% | 0 | 400 |
| M649 | 1.8 | 2.2 | 60 | 15 | 15 | 0 | 6 | 22.1% | 22.1% | 20.8% | 76.2% | 20.9% | 19.5% | 43.0% | 0 | 400 |
| M650 | 1.8 | 2.2 | 64.5 | 15 | 6.5 | 0 | 10 | 21.4% | 21.4% | 20.5% | 75.4% | 20.9% | 13.8% | 42.3% | 0 | 450 |
| M651 | 1.8 | 2.2 | 62.5 | 15 | 8.5 | 0.5 | 9.5 | 21.4% | 21.4% | 20.2% | 76.1% | 20.9% | 11.0% | 42.4% | 0 | 400 |
| M652 | 1.8 | 2.2 | 60 | 15 | 10 | 1 | 10 | 21.4% | 21.4% | 19.8% | 76.6% | 20.9% | 14.2% | 42.4% | 0 | 400 |
| M653 | 1.8 | 2.2 | 62.5 | 15 | 10.5 | 0 | 8 | 21.7% | 21.7% | 20.7% | 75.7% | 20.9% | 8.0% | 42.6% | 0 | 400 |
| M654 | 1.8 | 2.2 | 61.5 | 15 | 10 | 0.5 | 9 | 21.5% | 21.5% | 20.2% | 76.2% | 20.9% | 13.1% | 42.5% | 0 | 400 |
| M655 | 1.8 | 2.2 | 57.5 | 15 | 13 | 1 | 9.5 | 21.6% | 21.6% | 19.7% | 76.9% | 20.9% | 18.3% | 42.6% | 0 | 400 |
| M656 | 1.8 | 2.2 | 59.5 | 15 | 10.5 | 1 | 10 | 21.5% | 21.5% | 19.7% | 76.7% | 20.9% | 14.8% | 42.4% | 0 | 400 |
| M657 | 1.8 | 2.2 | 60 | 15 | 12 | 0.5 | 8.5 | 21.7% | 21.7% | 20.1% | 76.5% | 21.0% | 15.9% | 42.6% | 0 | 400 |
| M658 | 1.8 | 2.2 | 60.5 | 15 | 13.5 | 0 | 7 | 21.9% | 21.9% | 20.6% | 76.2% | 21.0% | 17.2% | 42.9% | 0 | 400 |
| M659 | 1.8 | 2.2 | 62.5 | 15 | 10 | 0 | 8.5 | 21.6% | 21.6% | 20.5% | 75.8% | 21.0% | 8.8% | 42.6% | 0 | 400 |
| M660 | 1.8 | 2.2 | 61.5 | 15 | 9.5 | 0.5 | 9.5 | 21.5% | 21.5% | 20.1% | 76.3% | 21.0% | 12.4% | 42.4% | 0 | 400 |
| M661 | 1.8 | 2.2 | 61 | 15 | 12.5 | 0 | 7.5 | 21.8% | 21.8% | 20.6% | 76.1% | 21.0% | 15.7% | 42.8% | 0 | 400 |
| M662 | 1.8 | 2.2 | 59 | 15 | 13 | 0.5 | 8.5 | 21.7% | 21.7% | 20.1% | 76.6% | 21.0% | 3.7% | 42.7% | 0 | 400 |
| M663 | 1.8 | 2.2 | 58.5 | 15 | 13.5 | 0.5 | 8.5 | 21.8% | 21.8% | 20.1% | 76.7% | 21.0% | 18.0% | 42.7% | 0 | 400 |
| M664 | 1.8 | 2.2 | 59.5 | 15 | 12 | 0.5 | 9 | 21.6% | 21.6% | 20.0% | 76.6% | 21.0% | 15.9% | 42.6% | 0 | 400 |
| M665 | 1.8 | 2.2 | 57 | 15 | 15 | 0.5 | 8.5 | 21.8% | 21.8% | 20.0% | 76.8% | 21.0% | 20.1% | 42.6% | 0 | 400 |
| M666 | 1.8 | 2.2 | 63 | 15 | 8.5 | 0 | 9.5 | 21.5% | 21.5% | 20.4% | 75.8% | 21.0% | 11.1% | 42.5% | 0 | 450 |
| M667 | 1.8 | 2.2 | 59 | 15 | 12.5 | 0.5 | 9 | 21.7% | 21.7% | 20.0% | 76.6% | 21.0% | 4.5% | 42.7% | 0 | 400 |
| M668 | 1.8 | 2.2 | 62 | 15 | 10 | 0 | 9 | 21.6% | 21.6% | 20.4% | 76.0% | 21.0% | 9.0% | 42.6% | 0 | 400 |
| M669 | 1.8 | 2.2 | 59.5 | 15 | 14 | 0 | 7.5 | 21.9% | 21.9% | 20.4% | 76.4% | 21.0% | 17.8% | 42.9% | 0 | 400 |
| M670 | 1.8 | 2.2 | 57.5 | 15 | 14 | 0.5 | 9 | 21.8% | 21.8% | 19.9% | 76.8% | 21.0% | 18.6% | 42.8% | 0 | 400 |
| M671 | 1.8 | 2.2 | 60.5 | 15 | 10 | 0.5 | 10 | 21.5% | 21.5% | 19.9% | 76.5% | 21.0% | 13.0% | 42.5% | 0 | 400 |
| M672 | 1.8 | 2.2 | 59 | 15 | 12 | 0.5 | 9.5 | 21.6% | 21.6% | 19.9% | 76.7% | 21.0% | 15.8% | 42.7% | 0 | 400 |
| M673 | 1.8 | 2.2 | 59.5 | 15 | 13.5 | 0 | 8 | 21.8% | 21.8% | 20.3% | 76.4% | 21.1% | 17.0% | 42.9% | 0 | 400 |
| M674 | 1.8 | 2.2 | 58.5 | 15 | 12.5 | 0.5 | 9.5 | 21.6% | 21.6% | 19.9% | 76.7% | 21.1% | 16.5% | 42.7% | 0 | 400 |
| M675 | 1.8 | 2.2 | 58.5 | 15 | 14.5 | 0 | 8 | 21.9% | 21.9% | 20.3% | 76.6% | 21.1% | 18.4% | 43.0% | 0 | 400 |
| M676 | 1.8 | 2.2 | 59 | 15 | 11.5 | 0.5 | 10 | 21.6% | 21.6% | 19.8% | 76.7% | 21.1% | 15.0% | 42.6% | 0 | 400 |
| M677 | 1.8 | 2.2 | 60.5 | 15 | 11.5 | 0 | 9 | 21.7% | 21.7% | 20.2% | 76.3% | 21.1% | 14.1% | 42.8% | 0 | 400 |
| M678 | 1.8 | 2.2 | 57.5 | 15 | 13 | 0.5 | 10 | 21.6% | 21.6% | 19.7% | 76.8% | 21.1% | 17.1% | 42.7% | 0 | 400 |
| M679 | 1.8 | 2.2 | 60 | 15 | 12 | 0 | 9 | 21.7% | 21.7% | 20.2% | 76.4% | 21.1% | 14.8% | 42.8% | 0 | 400 |
| M680 | 1.8 | 2.2 | 58.5 | 15 | 14 | 0 | 8.5 | 21.8% | 21.8% | 20.2% | 76.6% | 21.1% | 17.6% | 43.0% | 0 | 400 |
| M681 | 1.8 | 2.2 | 57 | 15 | 14 | 0 | 10 | 21.7% | 21.7% | 19.8% | 76.8% | 21.2% | 17.4% | 43.0% | 0 | 400 |
| M682 | 1.8 | 2.2 | 58 | 15 | 14 | 0 | 9 | 21.8% | 21.8% | 20.1% | 76.7% | 21.2% | 17.5% | 43.0% | 0 | 400 |
| M683 | 1.8 | 2.2 | 59 | 15 | 12.5 | 0 | 9.5 | 21.7% | 21.7% | 20.0% | 76.6% | 21.2% | 15.4% | 42.9% | 0 | 400 |
| M684 | 1.8 | 2.2 | 58 | 15 | 13.5 | 0 | 9.5 | 21.7% | 21.7% | 20.0% | 76.7% | 21.2% | 16.8% | 42.9% | 0 | 400 |
| M685 | 1.8 | 2.2 | 58.5 | 15 | 12.5 | 0 | 10 | 21.7% | 21.7% | 19.9% | 76.7% | 21.2% | 15.3% | 42.9% | 0 | 400 |

TABLE 11

Compositions and thermodynamic criteria for vanadium carbides

| No | B | C | Cr | Fe | Mn | Mo | Nb | Ni | Si | Ta | Ti | V | W | Zr |
|---|---|---|---|---|---|---|---|---|---|---|---|---|---|---|
| M686 | 2 | 3 | 0 | 73.5 | 1 | 6 | 0 | 2 | 0.5 | 0 | 0 | 12 | 0 | 0 |
| M687 | 2 | 2.7 | 0 | 73.8 | 1 | 7 | 0 | 2 | 0.5 | 0 | 0 | 11 | 0 | 0 |
| M688 | 2 | 2.7 | 0 | 73.3 | 1 | 7.5 | 0 | 2 | 0.5 | 0 | 0 | 11 | 0 | 0 |
| M689 | 2 | 2.6 | 0 | 74.4 | 1 | 7.5 | 0 | 2 | 0.5 | 0 | 0 | 10 | 0 | 0 |

TABLE 11-continued

Compositions and thermodynamic criteria for vanadium carbides

| | | | | | | | | | | | | | | |
|---|---|---|---|---|---|---|---|---|---|---|---|---|---|---|
| M690 | 2 | 2.6 | 0 | 70.4 | 1 | 10.5 | 0 | 2 | 0.5 | 0 | 0 | 11 | 0 | 0 |
| M691 | 2 | 2.5 | 0 | 73 | 1 | 9 | 0 | 2 | 0.5 | 0 | 0 | 10 | 0 | 0 |
| M692 | 1.7 | 3 | 0 | 72.8 | 1 | 6.5 | 0 | 2 | 0.5 | 0 | 0 | 12.5 | 0 | 0 |
| M693 | 2 | 2.6 | 0 | 75.4 | 1 | 6 | 0 | 2 | 0.5 | 0 | 0 | 10.5 | 0 | 0 |
| M694 | 2 | 2.3 | 0 | 77.2 | 1 | 6 | 0 | 2 | 0.5 | 0 | 0 | 9 | 0 | 0 |
| M695 | 2 | 2.8 | 0 | 72.7 | 1 | 7 | 0 | 2 | 0.5 | 0 | 0 | 12 | 0 | 0 |
| M696 | 2 | 2.9 | 0 | 73.1 | 1 | 6 | 0 | 2 | 0.5 | 0 | 0 | 12.5 | 0 | 0 |
| M697 | 2 | 2.6 | 0 | 74.9 | 1 | 6 | 0 | 2 | 0.5 | 0 | 0 | 11 | 0 | 0 |
| M698 | 2 | 1.6 | 0 | 81.9 | 1 | 6 | 0 | 2 | 0.5 | 0 | 0 | 5 | 0 | 0 |
| M699 | 2 | 2.9 | 0 | 69.1 | 1 | 9.5 | 0 | 2 | 0.5 | 0 | 0 | 13 | 0 | 0 |
| M700 | 1.9 | 2.5 | 0 | 73.6 | 1 | 8 | 0 | 2 | 0.5 | 0 | 0 | 10.5 | 0 | 0 |
| M701 | 1.9 | 1.7 | 0 | 77.9 | 1 | 9 | 0 | 2 | 0.5 | 0 | 0 | 6 | 0 | 0 |
| M702 | 1.6 | 2.7 | 0 | 70.2 | 1 | 10.5 | 0 | 2 | 0.5 | 0 | 0 | 11.5 | 0 | 0 |
| M703 | 1.8 | 2.7 | 0 | 71.5 | 1 | 9 | 0 | 2 | 0.5 | 0 | 0 | 11.5 | 0 | 0 |
| M704 | 1.5 | 2.5 | 0 | 75 | 1 | 7.5 | 0 | 2 | 0.5 | 0 | 0 | 10 | 0 | 0 |
| M705 | 1.2 | 3 | 0 | 72.8 | 1 | 7 | 0 | 2 | 0.5 | 0 | 0 | 12.5 | 0 | 0 |
| M706 | 1.8 | 3 | 0 | 68.2 | 1 | 10 | 0 | 2 | 0.5 | 0 | 0 | 13.5 | 0 | 0 |
| M707 | 2 | 2.5 | 0 | 73 | 1 | 8 | 0 | 2 | 0.5 | 0 | 0 | 11 | 0 | 0 |
| M708 | 2 | 2.5 | 0 | 72.5 | 1 | 8.5 | 0 | 2 | 0.5 | 0 | 0 | 11 | 0 | 0 |
| M709 | 2 | 1.2 | 0 | 81.3 | 1 | 8 | 0 | 2 | 0.5 | 0 | 0 | 4 | 0 | 0 |
| M710 | 2 | 1.2 | 0 | 77.8 | 1 | 11.5 | 0 | 2 | 0.5 | 0 | 0 | 4 | 0 | 0 |
| M711 | 1.9 | 1.5 | 0 | 79.1 | 1 | 8.5 | 0 | 2 | 0.5 | 0 | 0 | 5.5 | 0 | 0 |
| M712 | 2 | 3 | 0 | 67 | 1 | 10.5 | 0 | 2 | 0.5 | 0 | 0 | 14 | 0 | 0 |
| M713 | 1.8 | 1.5 | 0 | 81.7 | 1 | 6.5 | 0 | 2 | 0.5 | 0 | 0 | 5 | 0 | 0 |
| M714 | 2 | 1.3 | 0 | 83.2 | 1 | 6 | 0 | 2 | 0.5 | 0 | 0 | 4 | 0 | 0 |
| M715 | 2 | 1.3 | 0 | 81.7 | 1 | 7.5 | 0 | 2 | 0.5 | 0 | 0 | 4 | 0 | 0 |
| M716 | 2 | 1.3 | 0 | 80.7 | 1 | 8.5 | 0 | 2 | 0.5 | 0 | 0 | 4 | 0 | 0 |
| M717 | 1.9 | 2.4 | 0 | 74.2 | 1 | 7.5 | 0 | 2 | 0.5 | 0 | 0 | 10.5 | 0 | 0 |
| M718 | 1.9 | 1.2 | 0 | 83.4 | 1 | 6 | 0 | 2 | 0.5 | 0 | 0 | 4 | 0 | 0 |
| M719 | 1.8 | 2.4 | 0 | 70.3 | 1 | 11.5 | 0 | 2 | 0.5 | 0 | 0 | 10.5 | 0 | 0 |
| M720 | 2 | 2.5 | 0 | 75 | 1 | 6 | 0 | 2 | 0.5 | 0 | 0 | 11 | 0 | 0 |
| M721 | 2 | 3 | 0 | 73 | 1 | 7.5 | 0 | 1.5 | 0.5 | 0 | 0 | 11.5 | 0 | 0 |
| M722 | 2 | 1.9 | 0 | 77.6 | 1 | 7 | 0 | 2 | 0.5 | 0 | 0 | 8 | 0 | 0 |
| M723 | 1.7 | 2.8 | 0 | 70.5 | 1 | 9 | 0 | 2 | 0.5 | 0 | 0 | 12.5 | 0 | 0 |
| M724 | 1.6 | 2.8 | 0 | 69.6 | 1 | 10 | 0 | 2 | 0.5 | 0 | 0 | 12.5 | 0 | 0 |
| M725 | 1.9 | 2.7 | 0 | 75.9 | 1 | 6.5 | 0 | 1.5 | 0.5 | 0 | 0 | 10 | 0 | 0 |
| M726 | 1.9 | 2.7 | 0 | 74.9 | 1 | 7 | 0 | 2 | 0.5 | 0 | 0 | 10 | 0 | 0 |
| M727 | 1.5 | 1.4 | 0 | 81.1 | 1 | 7.5 | 0 | 2 | 0.5 | 0 | 0 | 5 | 0 | 0 |
| M728 | 2 | 2.5 | 0 | 74 | 1 | 6.5 | 0 | 2 | 0.5 | 0 | 0 | 11.5 | 0 | 0 |
| M729 | 2 | 3 | 0 | 70 | 1 | 7 | 0 | 2 | 0.5 | 0 | 0 | 14.5 | 0 | 0 |
| M730 | 2 | 3 | 0 | 68.5 | 1 | 7 | 0 | 2 | 0.5 | 0 | 0 | 16 | 0 | 0 |
| M731 | 2 | 3 | 0 | 69.5 | 1 | 7.5 | 0 | 2 | 0.5 | 0 | 0 | 14.5 | 0 | 0 |
| M732 | 2 | 3 | 0 | 69 | 1 | 7.5 | 0 | 2 | 0.5 | 0 | 0 | 15 | 0 | 0 |
| M733 | 2 | 3 | 0 | 68 | 1 | 7.5 | 0 | 2 | 0.5 | 0 | 0 | 16 | 0 | 0 |
| M734 | 2 | 3 | 0 | 68 | 1 | 8 | 0 | 2 | 0.5 | 0 | 0 | 15.5 | 0 | 0 |
| M735 | 2 | 3 | 0 | 67.5 | 1 | 8 | 0 | 2 | 0.5 | 0 | 0 | 16 | 0 | 0 |
| M736 | 2 | 3 | 0 | 66.5 | 1 | 9 | 0 | 2 | 0.5 | 0 | 0 | 16 | 0 | 0 |
| M737 | 2 | 2.8 | 0 | 71.7 | 1 | 9 | 0 | 1.5 | 0.5 | 0 | 0 | 11.5 | 0 | 0 |
| M738 | 1.9 | 1.9 | 0 | 77.7 | 1 | 7 | 0 | 2 | 0.5 | 0 | 0 | 8 | 0 | 0 |
| M739 | 2 | 2.7 | 0 | 70.3 | 1 | 11 | 0 | 1.5 | 0.5 | 0 | 0 | 11 | 0 | 0 |
| M740 | 2 | 3 | 0 | 65.5 | 1 | 10 | 0 | 2 | 0.5 | 0 | 0 | 16 | 0 | 0 |
| M741 | 2 | 3 | 0 | 65.5 | 1 | 10.5 | 0 | 2 | 0.5 | 0 | 0 | 15.5 | 0 | 0 |
| M742 | 1.6 | 3 | 0 | 68.9 | 1 | 9 | 0 | 2 | 0.5 | 0 | 0 | 14 | 0 | 0 |
| M743 | 1.6 | 3 | 0 | 68.4 | 1 | 9.5 | 0 | 2 | 0.5 | 0 | 0 | 14 | 0 | 0 |
| M744 | 1.8 | 1.1 | 0 | 81.6 | 1 | 8 | 0 | 2 | 0.5 | 0 | 0 | 4 | 0 | 0 |
| M745 | 1.8 | 1.1 | 0 | 80.1 | 1 | 9.5 | 0 | 2 | 0.5 | 0 | 0 | 4 | 0 | 0 |
| M746 | 2 | 2.8 | 0 | 71.7 | 1 | 6 | 0 | 2 | 0.5 | 0 | 0 | 14 | 0 | 0 |
| M747 | 2 | 1.1 | 0 | 82.9 | 1 | 6.5 | 0 | 2 | 0.5 | 0 | 0 | 4 | 0 | 0 |
| M748 | 1.7 | 2.8 | 0 | 73 | 1 | 6 | 0 | 2 | 0.5 | 0 | 0 | 13 | 0 | 0 |
| M749 | 1.9 | 1.1 | 0 | 80 | 1 | 9.5 | 0 | 2 | 0.5 | 0 | 0 | 4 | 0 | 0 |
| M750 | 1.6 | 2.9 | 0 | 68.5 | 1 | 9.5 | 0 | 2 | 0.5 | 0 | 0 | 14 | 0 | 0 |
| M751 | 1.7 | 2.8 | 0 | 71.5 | 1 | 7.5 | 0 | 2 | 0.5 | 0 | 0 | 13 | 0 | 0 |
| M752 | 1.7 | 2.8 | 0 | 71 | 1 | 7.5 | 0 | 2 | 0.5 | 0 | 0 | 13.5 | 0 | 0 |
| M753 | 1.7 | 2.8 | 0 | 70 | 1 | 8.5 | 0 | 2 | 0.5 | 0 | 0 | 13.5 | 0 | 0 |
| M754 | 2 | 2.6 | 0 | 71.9 | 1 | 7.5 | 0 | 2 | 0.5 | 0 | 0 | 12.5 | 0 | 0 |
| M755 | 1.8 | 1.2 | 0 | 81.5 | 1 | 7.5 | 0 | 2 | 0.5 | 0 | 0 | 4.5 | 0 | 0 |
| M756 | 1.6 | 2.7 | 0 | 69.7 | 1 | 10 | 0 | 2 | 0.5 | 0 | 0 | 12.5 | 0 | 0 |
| M757 | 1.9 | 2.4 | 0 | 75.2 | 1 | 6 | 0 | 2 | 0.5 | 0 | 0 | 11 | 0 | 0 |
| M758 | 1.8 | 2.9 | 0 | 71.8 | 1 | 6 | 0 | 2 | 0.5 | 0 | 0 | 14 | 0 | 0 |
| M759 | 1.2 | 3 | 0 | 72.8 | 1 | 6 | 0 | 2 | 0.5 | 0 | 0 | 13.5 | 0 | 0 |
| M760 | 1.2 | 3 | 0 | 70.8 | 1 | 7.5 | 0 | 2 | 0.5 | 0 | 0 | 14 | 0 | 0 |
| M761 | 1.9 | 2.7 | 0 | 70.4 | 1 | 6 | 0 | 2 | 0.5 | 0 | 0 | 15.5 | 0 | 0 |
| M762 | 1.7 | 2.9 | 0 | 69.9 | 1 | 6 | 0 | 2 | 0.5 | 0 | 0 | 16 | 0 | 0 |
| M763 | 1.9 | 2.9 | 0 | 69.7 | 1 | 6 | 0 | 2 | 0.5 | 0 | 0 | 16 | 0 | 0 |
| M764 | 2 | 1.7 | 0 | 71.3 | 1 | 13.5 | 0 | 2 | 0.5 | 0 | 0 | 8 | 0 | 0 |
| M765 | 2 | 2.4 | 0 | 71.6 | 1 | 8 | 0 | 2 | 0.5 | 0 | 0 | 12.5 | 0 | 0 |
| M766 | 2 | 2.7 | 0 | 72.8 | 1 | 8 | 0 | 1.5 | 0.5 | 0 | 0 | 11.5 | 0 | 0 |
| M767 | 1.9 | 2.2 | 0 | 78.4 | 1 | 6 | 0 | 1.5 | 0.5 | 0 | 0 | 8.5 | 0 | 0 |

TABLE 11-continued

Compositions and thermodynamic criteria for vanadium carbides

| | | | | | | | | | | | | | | |
|---|---|---|---|---|---|---|---|---|---|---|---|---|---|---|
| M768 | 1.9 | 2.8 | 0 | 70.3 | 1 | 6 | 0 | 2 | 0.5 | 0 | 0 | 15.5 | 0 | 0 |
| M769 | 1.6 | 2.1 | 0 | 73.3 | 1 | 10 | 0 | 2 | 0.5 | 0 | 0 | 9.5 | 0 | 0 |
| M770 | 1.9 | 1.8 | 0 | 74.3 | 1 | 10.5 | 0 | 2 | 0.5 | 0 | 0 | 8 | 0 | 0 |
| M771 | 1.6 | 2.8 | 0 | 69.1 | 1 | 9.5 | 0 | 2 | 0.5 | 0 | 0 | 13.5 | 0 | 0 |
| M772 | 2 | 2 | 0 | 74.5 | 1 | 6.5 | 0 | 2 | 0.5 | 0 | 0 | 11.5 | 0 | 0 |
| M773 | 1.4 | 2.9 | 0 | 71.7 | 1 | 6.5 | 0 | 2 | 0.5 | 0 | 0 | 14 | 0 | 0 |
| M774 | 1.5 | 1.1 | 0 | 83.9 | 1 | 6 | 0 | 2 | 0.5 | 0 | 0 | 4 | 0 | 0 |
| M775 | 1.2 | 1.1 | 0 | 82.7 | 1 | 7.5 | 0 | 2 | 0.5 | 0 | 0 | 4 | 0 | 0 |
| M776 | 1.9 | 1 | 0 | 83.6 | 1 | 6 | 0 | 2 | 0.5 | 0 | 0 | 4 | 0 | 0 |
| M777 | 2 | 1.9 | 0 | 80.1 | 1 | 6 | 0 | 1.5 | 0.5 | 0 | 0 | 7 | 0 | 0 |
| M778 | 2 | 1.9 | 0 | 78.1 | 1 | 7.5 | 0 | 1.5 | 0.5 | 0 | 0 | 7.5 | 0 | 0 |
| M779 | 1.9 | 1.8 | 0 | 77.8 | 1 | 6.5 | 0 | 2 | 0.5 | 0 | 0 | 8.5 | 0 | 0 |
| M780 | 1.6 | 2.8 | 0 | 70.1 | 1 | 7 | 0 | 2 | 0.5 | 0 | 0 | 15 | 0 | 0 |
| M781 | 1.6 | 2.6 | 0 | 76.3 | 1 | 6 | 0 | 1.5 | 0.5 | 0 | 0 | 10.5 | 0 | 0 |
| M782 | 1.9 | 2.3 | 0 | 71.8 | 1 | 7.5 | 0 | 2 | 0.5 | 0 | 0 | 13 | 0 | 0 |
| M783 | 1.6 | 2.2 | 0 | 77.7 | 1 | 7 | 0 | 1.5 | 0.5 | 0 | 0 | 8.5 | 0 | 0 |
| M784 | 1.3 | 2.9 | 0 | 71.8 | 1 | 6.5 | 0 | 2 | 0.5 | 0 | 0 | 14 | 0 | 0 |
| M785 | 1.3 | 2.9 | 0 | 71.3 | 1 | 7 | 0 | 2 | 0.5 | 0 | 0 | 14 | 0 | 0 |
| M786 | 1.7 | 2.3 | 0 | 75.5 | 1 | 6 | 0 | 2 | 0.5 | 0 | 0 | 11 | 0 | 0 |
| M787 | 1.9 | 1.7 | 0 | 75.4 | 1 | 11.5 | 0 | 1.5 | 0.5 | 0 | 0 | 6.5 | 0 | 0 |
| M788 | 1.7 | 2.3 | 0 | 73.5 | 1 | 7 | 0 | 2 | 0.5 | 0 | 0 | 12 | 0 | 0 |
| M789 | 1.6 | 1.8 | 0 | 78.6 | 1 | 6.5 | 0 | 2 | 0.5 | 0 | 0 | 8 | 0 | 0 |
| M790 | 1.9 | 1.8 | 0 | 73.8 | 1 | 9.5 | 0 | 2 | 0.5 | 0 | 0 | 9.5 | 0 | 0 |
| M791 | 1.9 | 2 | 0 | 74.1 | 1 | 8.5 | 0 | 2 | 0.5 | 0 | 0 | 10 | 0 | 0 |
| M792 | 2 | 2.8 | 0 | 66.2 | 1 | 13.5 | 0 | 1.5 | 0.5 | 0 | 0 | 12.5 | 0 | 0 |
| M793 | 1.9 | 2.2 | 0 | 72.9 | 1 | 8 | 0 | 2 | 0.5 | 0 | 0 | 11.5 | 0 | 0 |
| M794 | 1.9 | 2 | 0 | 73.1 | 1 | 9.5 | 0 | 2 | 0.5 | 0 | 0 | 10 | 0 | 0 |
| M795 | 2 | 1.7 | 0 | 73.8 | 1 | 10.5 | 0 | 2 | 0.5 | 0 | 0 | 8.5 | 0 | 0 |
| M796 | 1.7 | 1.5 | 0 | 76.8 | 1 | 9.5 | 0 | 2 | 0.5 | 0 | 0 | 7 | 0 | 0 |
| M797 | 1.7 | 2 | 0 | 79.3 | 1 | 6 | 0 | 1.5 | 0.5 | 0 | 0 | 8 | 0 | 0 |
| M798 | 1.9 | 1.2 | 0 | 83.4 | 1 | 6.5 | 0 | 1.5 | 0.5 | 0 | 0 | 4 | 0 | 0 |
| M799 | 1.7 | 1 | 0 | 81.8 | 1 | 8 | 0 | 2 | 0.5 | 0 | 0 | 4 | 0 | 0 |
| M800 | 1.9 | 2.6 | 0 | 69 | 1 | 12 | 0 | 1.5 | 0.5 | 0 | 0 | 11.5 | 0 | 0 |
| M801 | 2 | 1.2 | 0 | 83.8 | 1 | 6 | 0 | 1.5 | 0.5 | 0 | 0 | 4 | 0 | 0 |
| M802 | 2 | 1.3 | 0 | 74.2 | 1 | 12.5 | 0 | 2 | 0.5 | 0 | 0 | 6.5 | 0 | 0 |
| M803 | 1.2 | 1.1 | 0 | 83.2 | 1 | 7 | 0 | 2 | 0.5 | 0 | 0 | 4 | 0 | 0 |
| M804 | 2 | 1.2 | 0 | 76.3 | 1 | 11 | 0 | 2 | 0.5 | 0 | 0 | 6 | 0 | 0 |
| M805 | 1.9 | 1.9 | 0 | 80.7 | 1 | 6 | 0 | 2 | 0.5 | 0 | 0 | 6 | 0 | 0 |
| M806 | 1.9 | 1.5 | 0 | 76.1 | 1 | 8.5 | 0 | 2 | 0.5 | 0 | 0 | 8.5 | 0 | 0 |
| M807 | 1.6 | 2.3 | 0 | 75.1 | 1 | 6 | 0 | 2 | 0.5 | 0 | 0 | 11.5 | 0 | 0 |
| M808 | 1.9 | 1.9 | 0 | 74.7 | 1 | 11 | 0 | 2 | 0.5 | 0 | 0 | 7 | 0 | 0 |
| M809 | 2 | 1.4 | 0 | 77.1 | 1 | 8 | 0 | 2 | 0.5 | 0 | 0 | 8 | 0 | 0 |
| M810 | 1.9 | 1.7 | 0 | 75.4 | 1 | 8 | 0 | 2 | 0.5 | 0 | 0 | 9.5 | 0 | 0 |
| M811 | 1.8 | 1.3 | 0 | 83.9 | 1 | 6 | 0 | 1.5 | 0.5 | 0 | 0 | 4 | 0 | 0 |
| M812 | 1.9 | 1.3 | 0 | 77.8 | 1 | 9.5 | 0 | 2 | 0.5 | 0 | 0 | 6 | 0 | 0 |
| M813 | 1.9 | 1.1 | 0 | 81.5 | 1 | 6 | 0 | 2 | 0.5 | 0 | 0 | 6 | 0 | 0 |
| M814 | 2 | 1 | 0 | 81 | 1 | 7.5 | 0 | 2 | 0.5 | 0 | 0 | 5 | 0 | 0 |
| M815 | 1.9 | 1.2 | 0 | 83.9 | 1 | 6 | 0 | 1.5 | 0.5 | 0 | 0 | 4 | 0 | 0 |
| M816 | 1.9 | 1.2 | 0 | 81.4 | 1 | 6.5 | 0 | 2 | 0.5 | 0 | 0 | 5.5 | 0 | 0 |
| M817 | 2 | 1.2 | 0 | 79.3 | 1 | 6.5 | 0 | 2 | 0.5 | 0 | 0 | 7.5 | 0 | 0 |
| M818 | 2 | 2.4 | 0 | 74.1 | 1 | 8 | 0 | 1.5 | 0.5 | 0 | 0 | 10.5 | 0 | 0 |
| M819 | 1.7 | 2.8 | 0 | 74 | 1 | 6 | 0 | 1.5 | 0.5 | 0 | 0 | 12.5 | 0 | 0 |
| M820 | 2 | 1 | 0 | 77 | 1 | 10.5 | 0 | 2 | 0.5 | 0 | 0 | 6 | 0 | 0 |
| M821 | 1.7 | 3 | 0 | 71.8 | 1 | 7 | 0 | 1.5 | 0.5 | 0 | 0 | 13.5 | 0 | 0 |
| M822 | 2 | 1.1 | 0 | 77.4 | 1 | 10 | 0 | 2 | 0.5 | 0 | 0 | 6 | 0 | 0 |
| M823 | 1.7 | 3 | 0 | 70.3 | 1 | 8.5 | 0 | 1.5 | 0.5 | 0 | 0 | 13.5 | 0 | 0 |
| M824 | 1.7 | 2.9 | 0 | 69.4 | 1 | 11 | 0 | 1.5 | 0.5 | 0 | 0 | 12 | 0 | 0 |
| M825 | 1.9 | 2.1 | 0 | 76 | 1 | 8 | 0 | 1.5 | 0.5 | 0 | 0 | 9 | 0 | 0 |
| M826 | 1.7 | 1.2 | 0 | 80.1 | 1 | 10 | 0 | 1.5 | 0.5 | 0 | 0 | 4 | 0 | 0 |
| M827 | 1.9 | 1 | 0 | 77.1 | 1 | 11 | 0 | 2 | 0.5 | 0 | 0 | 5.5 | 0 | 0 |
| M828 | 1.8 | 1.5 | 0 | 78.2 | 1 | 6.5 | 0 | 2 | 0.5 | 0 | 0 | 8.5 | 0 | 0 |
| M829 | 1.7 | 1.5 | 0 | 77.8 | 1 | 8 | 0 | 2 | 0.5 | 0 | 0 | 7.5 | 0 | 0 |
| M830 | 1.8 | 1.2 | 0 | 81 | 1 | 7 | 0 | 2 | 0.5 | 0 | 0 | 5.5 | 0 | 0 |
| M831 | 1.3 | 1.5 | 0 | 81.2 | 1 | 6 | 0 | 2 | 0.5 | 0 | 0 | 6.5 | 0 | 0 |
| M832 | 1.8 | 3 | 0 | 72.7 | 1 | 6 | 0 | 1.5 | 0.5 | 0 | 0 | 13.5 | 0 | 0 |
| M833 | 1.8 | 2.9 | 0 | 66.8 | 1 | 11.5 | 0 | 1.5 | 0.5 | 0 | 0 | 14 | 0 | 0 |
| M834 | 2 | 2.9 | 0 | 75.1 | 1 | 6 | 0 | 1 | 0.5 | 0 | 0 | 11.5 | 0 | 0 |
| M835 | 2 | 3 | 0 | 66.5 | 1 | 9.5 | 0 | 1.5 | 0.5 | 0 | 0 | 16 | 0 | 0 |
| M836 | 2 | 1.2 | 0 | 76.8 | 1 | 13 | 0 | 1.5 | 0.5 | 0 | 0 | 4 | 0 | 0 |
| M837 | 1.3 | 1.1 | 0 | 82.1 | 1 | 7 | 0 | 2 | 0.5 | 0 | 0 | 5 | 0 | 0 |
| M838 | 2 | 2.6 | 0 | 76.4 | 1 | 7 | 0 | 1 | 0.5 | 0 | 0 | 9.5 | 0 | 0 |
| M839 | 2 | 1.7 | 0 | 75.3 | 1 | 11.5 | 0 | 2 | 0.5 | 0 | 0 | 6 | 0 | 0 |
| M840 | 1.9 | 2.6 | 0 | 70 | 1 | 9.5 | 0 | 1.5 | 0.5 | 0 | 0 | 13 | 0 | 0 |
| M841 | 1.3 | 2.6 | 0 | 73.6 | 1 | 8 | 0 | 1.5 | 0.5 | 0 | 0 | 11.5 | 0 | 0 |
| M842 | 1 | 3 | 0 | 73.5 | 1 | 6 | 0 | 1.5 | 0.5 | 0 | 0 | 13.5 | 0 | 0 |
| M843 | 1.9 | 2.7 | 0 | 73.9 | 1 | 8 | 0 | 1 | 0.5 | 0 | 0 | 11 | 0 | 0 |
| M844 | 2 | 2.5 | 0 | 77.5 | 1 | 6 | 0 | 1 | 0.5 | 0 | 0 | 9.5 | 0 | 0 |
| M845 | 1.4 | 1.1 | 0 | 81 | 1 | 7 | 0 | 2 | 0.5 | 0 | 0 | 6 | 0 | 0 |

TABLE 11-continued

Compositions and thermodynamic criteria for vanadium carbides

| | | | | | | | | | | | | | | |
|---|---|---|---|---|---|---|---|---|---|---|---|---|---|---|
| M846 | 2 | 2.1 | 0 | 78.9 | 1 | 7 | 0 | 1 | 0.5 | 0 | 0 | 7.5 | 0 | 0 |
| M847 | 1.8 | 1.1 | 0 | 81.6 | 1 | 8.5 | 0 | 1.5 | 0.5 | 0 | 0 | 4 | 0 | 0 |
| M848 | 2 | 3 | 0 | 74 | 1 | 6.5 | 0 | 2 | 0.5 | 0 | 0 | 11 | 0 | 0 |
| M849 | 2 | 2.4 | 0 | 74.1 | 1 | 9.5 | 0 | 1 | 0.5 | 0 | 0 | 9.5 | 0 | 0 |
| M850 | 2 | 2.4 | 0 | 70.6 | 1 | 10.5 | 0 | 1.5 | 0.5 | 0 | 0 | 11.5 | 0 | 0 |
| M851 | 2 | 2.7 | 0 | 75.3 | 1 | 6.5 | 0 | 1 | 0.5 | 0 | 0 | 11 | 0 | 0 |
| M852 | 2 | 2.7 | 0 | 74.3 | 1 | 7.5 | 0 | 1 | 0.5 | 0 | 0 | 11 | 0 | 0 |
| M853 | 2 | 2.6 | 0 | 76.9 | 1 | 6 | 0 | 1 | 0.5 | 0 | 0 | 10 | 0 | 0 |
| M854 | 2 | 2.6 | 0 | 75.9 | 1 | 6.5 | 0 | 1 | 0.5 | 0 | 0 | 10.5 | 0 | 0 |
| M855 | 2 | 2.6 | 0 | 70.9 | 1 | 8.5 | 0 | 1.5 | 0.5 | 0 | 0 | 13 | 0 | 0 |
| M856 | 1.5 | 1.7 | 0 | 80.3 | 1 | 6.5 | 0 | 1.5 | 0.5 | 0 | 0 | 7 | 0 | 0 |
| M857 | 1.8 | 2.9 | 0 | 71.3 | 1 | 6 | 0 | 1.5 | 0.5 | 0 | 0 | 15 | 0 | 0 |
| M858 | 2 | 2.6 | 0 | 69.9 | 1 | 12 | 0 | 1 | 0.5 | 0 | 0 | 11 | 0 | 0 |
| M859 | 2 | 2.1 | 0 | 76.9 | 1 | 9 | 0 | 1 | 0.5 | 0 | 0 | 7.5 | 0 | 0 |
| M860 | 1.2 | 2.9 | 0 | 71.9 | 1 | 7.5 | 0 | 1.5 | 0.5 | 0 | 0 | 13.5 | 0 | 0 |
| M861 | 2 | 1.6 | 0 | 82.9 | 1 | 6 | 0 | 1 | 0.5 | 0 | 0 | 5 | 0 | 0 |
| M862 | 2 | 1.7 | 0 | 72.3 | 1 | 13 | 0 | 1.5 | 0.5 | 0 | 0 | 8 | 0 | 0 |
| M863 | 1.9 | 2.1 | 0 | 79 | 1 | 7 | 0 | 1 | 0.5 | 0 | 0 | 7.5 | 0 | 0 |
| M864 | 2 | 2.1 | 0 | 79.9 | 1 | 6 | 0 | 1 | 0.5 | 0 | 0 | 7.5 | 0 | 0 |
| M865 | 2 | 2.8 | 0 | 74.2 | 1 | 6.5 | 0 | 1 | 0.5 | 0 | 0 | 12 | 0 | 0 |
| M866 | 1.7 | 2.8 | 0 | 75.5 | 1 | 6 | 0 | 1 | 0.5 | 0 | 0 | 11.5 | 0 | 0 |
| M867 | 2 | 3 | 0 | 73 | 1 | 6.5 | 0 | 1 | 0.5 | 0 | 0 | 13 | 0 | 0 |
| M868 | 2 | 2.9 | 0 | 72.6 | 1 | 7.5 | 0 | 1 | 0.5 | 0 | 0 | 12.5 | 0 | 0 |
| M869 | 1.9 | 1.9 | 0 | 74.7 | 1 | 9.5 | 0 | 1.5 | 0.5 | 0 | 0 | 9 | 0 | 0 |
| M870 | 1.9 | 2.2 | 0 | 75.4 | 1 | 7 | 0 | 1.5 | 0.5 | 0 | 0 | 10.5 | 0 | 0 |
| M871 | 1.6 | 2.6 | 0 | 71.8 | 1 | 8 | 0 | 1.5 | 0.5 | 0 | 0 | 13 | 0 | 0 |
| M872 | 1.9 | 2.8 | 0 | 70.3 | 1 | 6 | 0 | 1.5 | 0.5 | 0 | 0 | 16 | 0 | 0 |
| M873 | 1.7 | 2.8 | 0 | 72.5 | 1 | 9 | 0 | 1 | 0.5 | 0 | 0 | 11.5 | 0 | 0 |
| M874 | 1.8 | 1.5 | 0 | 81.2 | 1 | 6 | 0 | 1.5 | 0.5 | 0 | 0 | 6.5 | 0 | 0 |
| M875 | 1 | 2.9 | 0 | 73.1 | 1 | 6 | 0 | 1.5 | 0.5 | 0 | 0 | 14 | 0 | 0 |
| M876 | 1.4 | 1.8 | 0 | 76.8 | 0 | 10 | 0 | 2 | 0 | 0 | 0 | 8 | 0 | 0 |
| M877 | 1.9 | 2.9 | 0 | 74.2 | 1 | 6 | 0 | 1 | 0.5 | 0 | 0 | 12.5 | 0 | 0 |
| M878 | 1.7 | 1 | 0 | 84.3 | 1 | 6 | 0 | 1.5 | 0.5 | 0 | 0 | 4 | 0 | 0 |
| M879 | 1.2 | 2.9 | 0 | 71.9 | 1 | 7 | 0 | 1.5 | 0.5 | 0 | 0 | 14 | 0 | 0 |
| M880 | 1.9 | 1.6 | 0 | 82 | 1 | 7 | 0 | 1 | 0.5 | 0 | 0 | 5 | 0 | 0 |
| M881 | 2 | 2.1 | 0 | 75.4 | 1 | 6 | 0 | 1.5 | 0.5 | 0 | 0 | 11.5 | 0 | 0 |
| M882 | 1.9 | 1.6 | 0 | 81.5 | 1 | 7.5 | 0 | 1 | 0.5 | 0 | 0 | 5 | 0 | 0 |
| M883 | 1.7 | 2.8 | 0 | 75 | 1 | 6 | 0 | 1 | 0.5 | 0 | 0 | 12 | 0 | 0 |
| M884 | 1.7 | 1 | 0 | 81.3 | 1 | 9 | 0 | 1.5 | 0.5 | 0 | 0 | 4 | 0 | 0 |
| M885 | 2 | 1.2 | 0 | 79.8 | 1 | 10.5 | 0 | 1 | 0.5 | 0 | 0 | 4 | 0 | 0 |
| M886 | 1.7 | 1 | 0 | 80.8 | 1 | 9.5 | 0 | 1.5 | 0.5 | 0 | 0 | 4 | 0 | 0 |
| M887 | 2 | 1.2 | 0 | 76.3 | 1 | 11.5 | 0 | 1.5 | 0.5 | 0 | 0 | 6 | 0 | 0 |
| M888 | 1.9 | 1.8 | 0 | 79.8 | 1 | 7.5 | 0 | 1 | 0.5 | 0 | 0 | 6.5 | 0 | 0 |
| M889 | 1.9 | 1.8 | 0 | 78.3 | 1 | 9 | 0 | 1 | 0.5 | 0 | 0 | 6.5 | 0 | 0 |
| M890 | 2 | 1.2 | 0 | 77.8 | 1 | 12.5 | 0 | 1 | 0.5 | 0 | 0 | 4 | 0 | 0 |
| M891 | 1.2 | 2.3 | 0 | 76 | 1 | 7 | 0 | 1.5 | 0.5 | 0 | 0 | 10.5 | 0 | 0 |
| M892 | 2 | 1.4 | 0 | 83.1 | 1 | 7 | 0 | 1 | 0.5 | 0 | 0 | 4 | 0 | 0 |
| M893 | 1.9 | 1.6 | 0 | 75 | 1 | 10.5 | 0 | 1.5 | 0.5 | 0 | 0 | 8 | 0 | 0 |
| M894 | 1.9 | 1.8 | 0 | 77.3 | 1 | 10 | 0 | 1 | 0.5 | 0 | 0 | 6.5 | 0 | 0 |
| M895 | 1.9 | 1.8 | 0 | 76.8 | 1 | 10 | 0 | 1 | 0.5 | 0 | 0 | 7 | 0 | 0 |
| M896 | 1.6 | 2.8 | 0 | 71.1 | 1 | 10 | 0 | 1 | 0.5 | 0 | 0 | 12 | 0 | 0 |
| M897 | 2 | 1.3 | 0 | 83.7 | 1 | 6.5 | 0 | 1 | 0.5 | 0 | 0 | 4 | 0 | 0 |
| M898 | 1.3 | 2.1 | 0 | 75.6 | 1 | 8 | 0 | 1.5 | 0.5 | 0 | 0 | 10 | 0 | 0 |
| M899 | 2 | 2.5 | 0 | 73.5 | 1 | 8.5 | 0 | 1 | 0.5 | 0 | 0 | 11 | 0 | 0 |
| M900 | 2 | 2.5 | 0 | 72.5 | 1 | 9.5 | 0 | 1 | 0.5 | 0 | 0 | 11 | 0 | 0 |
| M901 | 1.9 | 1.1 | 0 | 79.5 | 1 | 9 | 0 | 1.5 | 0.5 | 0 | 0 | 5.5 | 0 | 0 |
| M902 | 2 | 2.8 | 0 | 71.2 | 1 | 9 | 0 | 1 | 0.5 | 0 | 0 | 12.5 | 0 | 0 |
| M903 | 0.8 | 3.3 | 0 | 75.4 | 1 | 4 | 0 | 1 | 0.5 | 0 | 0 | 14 | 0 | 0 |
| M904 | 1.9 | 1.1 | 0 | 78.5 | 1 | 10 | 0 | 1.5 | 0.5 | 0 | 0 | 5.5 | 0 | 0 |
| M905 | 1.9 | 1.9 | 0 | 80.2 | 1 | 6.5 | 0 | 2 | 0.5 | 0 | 0 | 6 | 0 | 0 |
| M906 | 0.8 | 3.7 | 0 | 73 | 1 | 4 | 0 | 1 | 0.5 | 0 | 0 | 16 | 0 | 0 |
| M907 | 2 | 1.2 | 0 | 77.3 | 1 | 13 | 0 | 1 | 0.5 | 0 | 0 | 4 | 0 | 0 |
| M908 | 1.9 | 3 | 0 | 73.6 | 1 | 7.5 | 0 | 1 | 0.5 | 0 | 0 | 11.5 | 0 | 0 |
| M909 | 1.3 | 1.2 | 0 | 82 | 1 | 7.5 | 0 | 1.5 | 0.5 | 0 | 0 | 5 | 0 | 0 |
| M910 | 1.9 | 1 | 0 | 79.1 | 1 | 10 | 0 | 1.5 | 0.5 | 0 | 0 | 5 | 0 | 0 |
| M911 | 1.7 | 1.8 | 0 | 77.5 | 1 | 6 | 0 | 1.5 | 0.5 | 0 | 0 | 10 | 0 | 0 |
| M912 | 1.5 | 2.5 | 0 | 75.5 | 1 | 7.5 | 0 | 1 | 0.5 | 0 | 0 | 10.5 | 0 | 0 |
| M913 | 2 | 1.2 | 0 | 84.3 | 1 | 6 | 0 | 1 | 0.5 | 0 | 0 | 4 | 0 | 0 |
| M914 | 2 | 1.2 | 0 | 82.8 | 1 | 7.5 | 0 | 1 | 0.5 | 0 | 0 | 4 | 0 | 0 |
| M915 | 1.6 | 1.6 | 0 | 82.8 | 1 | 6 | 0 | 1 | 0.5 | 0 | 0 | 5.5 | 0 | 0 |
| M916 | 1.7 | 1.8 | 0 | 81 | 1 | 6 | 0 | 1 | 0.5 | 0 | 0 | 7 | 0 | 0 |
| M917 | 1.7 | 2.3 | 0 | 75 | 1 | 9 | 0 | 1 | 0.5 | 0 | 0 | 9.5 | 0 | 0 |
| M918 | 1.8 | 1.5 | 0 | 82.7 | 1 | 6 | 0 | 1 | 0.5 | 0 | 0 | 5.5 | 0 | 0 |
| M919 | 1.8 | 1.5 | 0 | 81.2 | 1 | 7.5 | 0 | 1 | 0.5 | 0 | 0 | 5.5 | 0 | 0 |
| M920 | 1.5 | 2 | 0 | 79.5 | 1 | 7 | 0 | 1 | 0.5 | 0 | 0 | 7.5 | 0 | 0 |
| M921 | 2 | 1 | 0 | 79 | 1 | 8 | 0 | 1.5 | 0.5 | 0 | 0 | 7 | 0 | 0 |
| M922 | 1.5 | 1.4 | 0 | 83.1 | 1 | 6.5 | 0 | 1 | 0.5 | 0 | 0 | 5 | 0 | 0 |
| M923 | 1.6 | 1.2 | 0 | 82.7 | 1 | 6 | 0 | 1.5 | 0.5 | 0 | 0 | 5.5 | 0 | 0 |

TABLE 11-continued

Compositions and thermodynamic criteria for vanadium carbides

| | | | | | | | | | | | | | | |
|---|---|---|---|---|---|---|---|---|---|---|---|---|---|---|
| M924 | 1.7 | 2.9 | 0 | 70.4 | 1 | 9.5 | 0 | 1 | 0.5 | 0 | 0 | 13 | 0 | 0 |
| M925 | 2 | 1.6 | 0 | 80.4 | 1 | 8.5 | 0 | 1 | 0.5 | 0 | 0 | 5 | 0 | 0 |
| M926 | 2 | 1.1 | 0 | 77.9 | 1 | 8.5 | 0 | 1.5 | 0.5 | 0 | 0 | 7.5 | 0 | 0 |
| M927 | 1.9 | 1.9 | 0 | 78.2 | 1 | 7.5 | 0 | 1 | 0.5 | 0 | 0 | 8 | 0 | 0 |
| M928 | 2 | 1.9 | 0 | 73.6 | 1 | 12 | 0 | 1 | 0.5 | 0 | 0 | 8 | 0 | 0 |
| M929 | 0.8 | 4 | 0 | 70.7 | 1 | 4 | 0 | 1 | 0.5 | 0 | 0 | 18 | 0 | 0 |
| M930 | 1.9 | 1.8 | 0 | 76.8 | 1 | 9.5 | 0 | 1 | 0.5 | 0 | 0 | 7.5 | 0 | 0 |
| M931 | 1.3 | 1.4 | 0 | 81.8 | 1 | 8 | 0 | 1 | 0.5 | 0 | 0 | 5 | 0 | 0 |
| M932 | 1.9 | 1.3 | 0 | 79.3 | 1 | 10 | 0 | 1 | 0.5 | 0 | 0 | 5 | 0 | 0 |
| M933 | 1.5 | 1.3 | 0 | 82.2 | 1 | 8 | 0 | 1 | 0.5 | 0 | 0 | 4.5 | 0 | 0 |
| M934 | 1.7 | 1.1 | 0 | 79.2 | 1 | 9 | 0 | 1.5 | 0.5 | 0 | 0 | 6 | 0 | 0 |
| M935 | 1.5 | 1 | 0 | 80.5 | 1 | 9 | 0 | 1.5 | 0.5 | 0 | 0 | 5 | 0 | 0 |
| M936 | 1.2 | 3 | 0 | 72.8 | 1 | 7.5 | 0 | 1 | 0.5 | 0 | 0 | 13 | 0 | 0 |
| M937 | 1.9 | 1.4 | 0 | 81.7 | 1 | 7 | 0 | 1 | 0.5 | 0 | 0 | 5.5 | 0 | 0 |
| M938 | 0.7 | 4 | 0 | 70.8 | 1 | 4 | 0 | 1 | 0.5 | 0 | 0 | 18 | 0 | 0 |
| M939 | 1.9 | 2.7 | 0 | 73.4 | 1 | 7 | 0 | 1 | 0.5 | 0 | 0 | 12.5 | 0 | 0 |
| M940 | 2 | 2.5 | 0 | 74.5 | 1 | 7 | 0 | 1 | 0.5 | 0 | 0 | 11.5 | 0 | 0 |
| M941 | 1.9 | 1.6 | 0 | 81 | 1 | 6.5 | 0 | 1 | 0.5 | 0 | 0 | 6.5 | 0 | 0 |
| M942 | 1.9 | 1.2 | 0 | 80.4 | 1 | 9.5 | 0 | 1 | 0.5 | 0 | 0 | 4.5 | 0 | 0 |
| M943 | 1.9 | 1.1 | 0 | 83 | 1 | 7.5 | 0 | 1 | 0.5 | 0 | 0 | 4 | 0 | 0 |
| M944 | 2 | 3 | 0 | 72 | 1 | 6 | 0 | 1 | 0.5 | 0 | 0 | 14.5 | 0 | 0 |
| M945 | 1.8 | 1.1 | 0 | 79.6 | 1 | 11 | 0 | 1 | 0.5 | 0 | 0 | 4 | 0 | 0 |
| M946 | 1.8 | 1.1 | 0 | 79.1 | 1 | 11.5 | 0 | 1 | 0.5 | 0 | 0 | 4 | 0 | 0 |
| M947 | 2 | 3 | 0 | 71.5 | 1 | 6.5 | 0 | 1 | 0.5 | 0 | 0 | 14.5 | 0 | 0 |
| M948 | 2 | 3 | 0 | 71 | 1 | 7 | 0 | 1 | 0.5 | 0 | 0 | 14.5 | 0 | 0 |
| M949 | 2 | 3 | 0 | 69.5 | 1 | 7.5 | 0 | 1 | 0.5 | 0 | 0 | 15.5 | 0 | 0 |
| M950 | 2 | 3 | 0 | 70 | 1 | 8 | 0 | 1 | 0.5 | 0 | 0 | 14.5 | 0 | 0 |
| M951 | 0.8 | 3.2 | 0 | 75.5 | 1 | 4 | 0 | 1 | 0.5 | 0 | 0 | 14 | 0 | 0 |
| M952 | 1.7 | 2.3 | 0 | 77 | 1 | 6.5 | 0 | 1 | 0.5 | 0 | 0 | 10 | 0 | 0 |
| M953 | 2 | 1.3 | 0 | 78.7 | 1 | 11 | 0 | 1.5 | 0.5 | 0 | 0 | 4 | 0 | 0 |
| M954 | 1.8 | 2.9 | 0 | 73.3 | 1 | 6 | 0 | 1 | 0.5 | 0 | 0 | 13.5 | 0 | 0 |
| M955 | 1.8 | 2.9 | 0 | 68.8 | 1 | 8.5 | 0 | 1 | 0.5 | 0 | 0 | 15.5 | 0 | 0 |
| M956 | 1.5 | 2.4 | 0 | 73.6 | 1 | 9 | 0 | 1 | 0.5 | 0 | 0 | 11 | 0 | 0 |
| M957 | 1.9 | 2.7 | 0 | 72.4 | 1 | 6.5 | 0 | 1 | 0.5 | 0 | 0 | 14 | 0 | 0 |
| M958 | 1.9 | 2.7 | 0 | 72.9 | 1 | 7 | 0 | 1 | 0.5 | 0 | 0 | 13 | 0 | 0 |
| M959 | 1.9 | 2.9 | 0 | 69.2 | 1 | 9 | 0 | 1 | 0.5 | 0 | 0 | 14.5 | 0 | 0 |
| M960 | 2 | 1.7 | 0 | 71.3 | 1 | 13 | 0 | 2 | 0.5 | 0 | 0 | 8.5 | 0 | 0 |
| M961 | 2 | 2.1 | 0 | 77.9 | 1 | 6 | 0 | 1 | 0.5 | 0 | 0 | 9.5 | 0 | 0 |
| M962 | 1.4 | 1.1 | 0 | 80.5 | 1 | 8.5 | 0 | 1.5 | 0.5 | 0 | 0 | 5.5 | 0 | 0 |
| M963 | 1.6 | 1.1 | 0 | 84.3 | 1 | 6.5 | 0 | 1 | 0.5 | 0 | 0 | 4 | 0 | 0 |
| M964 | 1.5 | 1.1 | 0 | 80.9 | 1 | 10 | 0 | 1 | 0.5 | 0 | 0 | 4 | 0 | 0 |
| M965 | 2 | 3 | 0 | 71 | 1 | 6 | 0 | 1 | 0.5 | 0 | 0 | 15.5 | 0 | 0 |
| M966 | 1.7 | 2.9 | 0 | 70.4 | 1 | 8.5 | 0 | 1 | 0.5 | 0 | 0 | 14 | 0 | 0 |
| M967 | 2.2 | 0.8 | 0 | 77.5 | 1 | 14 | 0 | 1 | 0.5 | 0 | 0 | 3 | 0 | 0 |
| M968 | 1.9 | 1.8 | 0 | 79.8 | 1 | 6 | 0 | 1 | 0.5 | 0 | 0 | 8 | 0 | 0 |
| M969 | 0.8 | 3.5 | 0 | 73.2 | 1 | 4 | 0 | 1 | 0.5 | 0 | 0 | 16 | 0 | 0 |
| M970 | 2 | 2.7 | 0 | 71.3 | 1 | 7.5 | 0 | 1 | 0.5 | 0 | 0 | 14 | 0 | 0 |
| M971 | 1.7 | 2.8 | 0 | 72 | 1 | 7.5 | 0 | 1 | 0.5 | 0 | 0 | 13.5 | 0 | 0 |
| M972 | 1.7 | 2.8 | 0 | 71 | 1 | 8 | 0 | 1 | 0.5 | 0 | 0 | 14 | 0 | 0 |
| M973 | 2 | 2.6 | 0 | 72.4 | 1 | 6.5 | 0 | 1 | 0.5 | 0 | 0 | 14 | 0 | 0 |
| M974 | 1.7 | 2.8 | 0 | 70.5 | 1 | 9 | 0 | 1 | 0.5 | 0 | 0 | 13.5 | 0 | 0 |
| M975 | 1.6 | 3 | 0 | 72.9 | 1 | 6 | 0 | 1 | 0.5 | 0 | 0 | 14 | 0 | 0 |
| M976 | 1.6 | 3 | 0 | 72.4 | 1 | 6.5 | 0 | 1 | 0.5 | 0 | 0 | 14 | 0 | 0 |
| M977 | 1.7 | 2.3 | 0 | 74 | 1 | 9 | 0 | 1 | 0.5 | 0 | 0 | 10.5 | 0 | 0 |
| M978 | 1.9 | 1.8 | 0 | 73.3 | 1 | 12.5 | 0 | 1 | 0.5 | 0 | 0 | 8 | 0 | 0 |
| M979 | 2 | 1.3 | 0 | 82.7 | 1 | 6 | 0 | 1 | 0.5 | 0 | 0 | 5.5 | 0 | 0 |
| M980 | 1.9 | 2.2 | 0 | 76.4 | 1 | 9 | 0 | 1 | 0.5 | 0 | 0 | 8 | 0 | 0 |
| M981 | 2 | 2.3 | 0 | 72.7 | 1 | 8.5 | 0 | 1 | 0.5 | 0 | 0 | 12 | 0 | 0 |
| M982 | 1.9 | 2.7 | 0 | 71.9 | 1 | 6.5 | 0 | 1 | 0.5 | 0 | 0 | 14.5 | 0 | 0 |
| M983 | 1.7 | 1 | 0 | 83.3 | 1 | 7.5 | 0 | 1 | 0.5 | 0 | 0 | 4 | 0 | 0 |
| M984 | 1.1 | 1.1 | 0 | 84.3 | 1 | 7 | 0 | 1 | 0.5 | 0 | 0 | 4 | 0 | 0 |
| M985 | 1.7 | 1 | 0 | 79.8 | 1 | 11 | 0 | 1 | 0.5 | 0 | 0 | 4 | 0 | 0 |
| M986 | 1.6 | 2.9 | 0 | 72.5 | 1 | 6 | 0 | 1 | 0.5 | 0 | 0 | 14.5 | 0 | 0 |
| M987 | 1.6 | 2.9 | 0 | 72 | 1 | 6.5 | 0 | 1 | 0.5 | 0 | 0 | 14.5 | 0 | 0 |
| M988 | 2 | 2 | 0 | 71 | 1 | 12.5 | 0 | 1 | 0.5 | 0 | 0 | 10 | 0 | 0 |
| M989 | 1.9 | 1.8 | 0 | 78.8 | 1 | 6.5 | 0 | 1 | 0.5 | 0 | 0 | 8.5 | 0 | 0 |
| M990 | 0.8 | 3.8 | 0 | 70.9 | 1 | 4 | 0 | 1 | 0.5 | 0 | 0 | 18 | 0 | 0 |
| M991 | 0.8 | 3.9 | 0 | 70.8 | 1 | 2 | 0 | 1 | 0.5 | 0 | 0 | 20 | 0 | 0 |
| M992 | 2 | 1.4 | 0 | 81.6 | 1 | 8.5 | 0 | 1 | 0.5 | 0 | 0 | 4 | 0 | 0 |
| M993 | 1.9 | 1 | 0 | 80.6 | 1 | 10 | 0 | 1 | 0.5 | 0 | 0 | 4 | 0 | 0 |
| M994 | 1.9 | 1 | 0 | 79.6 | 1 | 11 | 0 | 1 | 0.5 | 0 | 0 | 4 | 0 | 0 |
| M995 | 1.9 | 1 | 0 | 77.6 | 1 | 13 | 0 | 1 | 0.5 | 0 | 0 | 4 | 0 | 0 |
| M996 | 1.7 | 2.3 | 0 | 75 | 1 | 7.5 | 0 | 1 | 0.5 | 0 | 0 | 11 | 0 | 0 |
| M997 | 1.9 | 2.6 | 0 | 70 | 1 | 8.5 | 0 | 1 | 0.5 | 0 | 0 | 14.5 | 0 | 0 |
| M998 | 1.6 | 2.3 | 0 | 74.1 | 1 | 8 | 0 | 1 | 0.5 | 0 | 0 | 11.5 | 0 | 0 |
| M999 | 1.7 | 2.3 | 0 | 74 | 1 | 8 | 0 | 1 | 0.5 | 0 | 0 | 11.5 | 0 | 0 |
| M1000 | 2 | 2.6 | 0 | 70.9 | 1 | 7.5 | 0 | 1 | 0.5 | 0 | 0 | 14.5 | 0 | 0 |
| M1001 | 1.9 | 2.8 | 0 | 68.8 | 1 | 7.5 | 0 | 1.5 | 0.5 | 0 | 0 | 16 | 0 | 0 |

TABLE 11-continued

Compositions and thermodynamic criteria for vanadium carbides

| | | | | | | | | | | | | | | |
|---|---|---|---|---|---|---|---|---|---|---|---|---|---|---|
| M1002 | 1.7 | 1.8 | 0 | 78.5 | 1 | 7.5 | 0 | 1 | 0.5 | 0 | 0 | 8 | 0 | 0 |
| M1003 | 1.9 | 2.2 | 0 | 74.4 | 1 | 8 | 0 | 1 | 0.5 | 0 | 0 | 11 | 0 | 0 |
| M1004 | 1.9 | 2.7 | 0 | 69.4 | 1 | 6.5 | 0 | 2 | 0.5 | 0 | 0 | 16 | 0 | 0 |
| M1005 | 1.7 | 1.2 | 0 | 80.1 | 1 | 9 | 0 | 1 | 0.5 | 0 | 0 | 5.5 | 0 | 0 |
| M1006 | 1.9 | 1.3 | 0 | 82.3 | 1 | 6 | 0 | 1 | 0.5 | 0 | 0 | 6 | 0 | 0 |
| M1007 | 2.2 | 0.6 | 0 | 79.7 | 1 | 12 | 0 | 1 | 0.5 | 0 | 0 | 3 | 0 | 0 |
| M1008 | 1.9 | 1.7 | 0 | 76.4 | 1 | 7 | 0 | 1 | 0.5 | 0 | 0 | 10.5 | 0 | 0 |
| M1009 | 2 | 1.2 | 0 | 76.3 | 1 | 13.5 | 0 | 1.5 | 0.5 | 0 | 0 | 4 | 0 | 0 |
| M1010 | 1.9 | 1 | 0 | 80.6 | 1 | 9.5 | 0 | 1 | 0.5 | 0 | 0 | 4.5 | 0 | 0 |
| M1011 | 1.7 | 1.8 | 0 | 77.5 | 1 | 7 | 0 | 1 | 0.5 | 0 | 0 | 9.5 | 0 | 0 |
| M1012 | 2 | 1.7 | 0 | 78.8 | 1 | 6 | 0 | 1 | 0.5 | 0 | 0 | 9 | 0 | 0 |
| M1013 | 1.1 | 1.8 | 0 | 80.1 | 1 | 6.5 | 0 | 1 | 0.5 | 0 | 0 | 8 | 0 | 0 |
| M1014 | 1.5 | 1.7 | 0 | 80.3 | 1 | 6 | 0 | 1 | 0.5 | 0 | 0 | 8 | 0 | 0 |
| M1015 | 1.8 | 1.2 | 0 | 80.5 | 1 | 8.5 | 0 | 1 | 0.5 | 0 | 0 | 5.5 | 0 | 0 |
| M1016 | 1.9 | 1.1 | 0 | 81 | 1 | 7 | 0 | 1 | 0.5 | 0 | 0 | 6.5 | 0 | 0 |
| M1017 | 1.9 | 1.2 | 0 | 81.4 | 1 | 6 | 0 | 1 | 0.5 | 0 | 0 | 7 | 0 | 0 |
| M1018 | 1.9 | 1.2 | 0 | 80.4 | 1 | 7 | 0 | 1 | 0.5 | 0 | 0 | 7 | 0 | 0 |
| M1019 | 1 | 1 | 0 | 85.5 | 1 | 6 | 0 | 1 | 0.5 | 0 | 0 | 4 | 0 | 0 |
| M1020 | 1.4 | 1.4 | 0 | 81.2 | 1 | 6 | 0 | 1 | 0.5 | 0 | 0 | 7.5 | 0 | 0 |
| M1021 | 0.8 | 2.3 | 0 | 80.4 | 1 | 2 | 0 | 1 | 0.5 | 0 | 0 | 12 | 0 | 0 |
| M1022 | 1.9 | 1.5 | 0 | 82.6 | 1 | 6.5 | 0 | 2 | 0.5 | 0 | 0 | 4 | 0 | 0 |
| M1023 | 1.3 | 1.2 | 0 | 82 | 1 | 7 | 0 | 1 | 0.5 | 0 | 0 | 6 | 0 | 0 |
| M1024 | 1.8 | 1.2 | 0 | 80 | 1 | 6 | 0 | 1 | 0.5 | 0 | 0 | 8.5 | 0 | 0 |
| M1025 | 2.2 | 2.2 | 0 | 73.6 | 0 | 12 | 0 | 2 | 0 | 0 | 0 | 8 | 0 | 0 |
| M1026 | 2.2 | 3 | 0 | 65.8 | 0 | 14 | 0 | 1 | 0 | 0 | 0 | 14 | 0 | 0 |
| M1027 | 1.9 | 2 | 0 | 74.6 | 1 | 11.5 | 0 | 1 | 0.5 | 0 | 0 | 7.5 | 0 | 0 |
| M1028 | 1.9 | 2.9 | 0 | 65.7 | 1 | 13 | 0 | 1 | 0.5 | 0 | 0 | 14 | 0 | 0 |
| M1029 | 2 | 1.2 | 0 | 76.8 | 1 | 13.5 | 0 | 1 | 0.5 | 0 | 0 | 4 | 0 | 0 |
| M1030 | 1.8 | 1.3 | 0 | 79.4 | 1 | 6 | 0 | 1 | 0.5 | 0 | 0 | 9 | 0 | 0 |
| M1031 | 1.8 | 2 | 0 | 81.2 | 1 | 6 | 0 | 1 | 0.5 | 0 | 0 | 6.5 | 0 | 0 |
| M1032 | 1.9 | 2.8 | 0 | 69.3 | 1 | 7.5 | 0 | 1 | 0.5 | 0 | 0 | 16 | 0 | 0 |
| M1033 | 1.8 | 3 | 0 | 70.2 | 0 | 10 | 0 | 1 | 0 | 0 | 0 | 14 | 0 | 0 |
| M1034 | 0.7 | 3.8 | 0 | 73 | 1 | 4 | 0 | 1 | 0.5 | 0 | 0 | 16 | 0 | 0 |
| M1035 | 1.9 | 1.6 | 0 | 79.5 | 1 | 9 | 0 | 1.5 | 0.5 | 0 | 0 | 5 | 0 | 0 |
| M1036 | 2 | 3 | 0 | 65.5 | 1 | 14 | 0 | 1 | 0.5 | 0 | 0 | 13 | 0 | 0 |
| M1037 | 1.9 | 2.7 | 0 | 73.9 | 1 | 8.5 | 0 | 1.5 | 0.5 | 0 | 0 | 10 | 0 | 0 |
| M1038 | 1 | 1.5 | 0 | 82.5 | 1 | 6.5 | 0 | 1.5 | 0.5 | 0 | 0 | 5.5 | 0 | 0 |
| M1039 | 2 | 1.7 | 0 | 82.3 | 1 | 6 | 0 | 2 | 0.5 | 0 | 0 | 4.5 | 0 | 0 |
| M1040 | 1.8 | 2.8 | 0 | 75.4 | 1 | 6.5 | 0 | 2 | 0.5 | 0 | 0 | 10 | 0 | 0 |
| M1041 | 1.2 | 1 | 0 | 82.3 | 1 | 8 | 0 | 2 | 0.5 | 0 | 0 | 4 | 0 | 0 |
| M1042 | 1.2 | 2.2 | 0 | 75.6 | 1 | 8 | 0 | 2 | 0.5 | 0 | 0 | 9.5 | 0 | 0 |
| M1043 | 1.6 | 1.1 | 0 | 77.8 | 1 | 11 | 0 | 2 | 0.5 | 0 | 0 | 5 | 0 | 0 |
| M1044 | 1.5 | 2.9 | 0 | 69.1 | 1 | 8 | 0 | 2 | 0.5 | 0 | 0 | 15 | 0 | 0 |
| M1045 | 1.3 | 2 | 0 | 78.7 | 0 | 10 | 0 | 0 | 0 | 0 | 0 | 8 | 0 | 0 |
| M1046 | 1.4 | 2 | 0 | 80.6 | 0 | 8 | 0 | 0 | 0 | 0 | 0 | 8 | 0 | 0 |
| M1047 | 2 | 2 | 0 | 76 | 0 | 12 | 0 | 0 | 0 | 0 | 0 | 8 | 0 | 0 |
| M1048 | 2 | 1.2 | 0 | 78.8 | 0 | 14 | 0 | 0 | 0 | 0 | 0 | 4 | 0 | 0 |
| M1049 | 1 | 1.2 | 0 | 89.8 | 0 | 4 | 0 | 0 | 0 | 0 | 0 | 4 | 0 | 0 |
| M1050 | 1.2 | 1.1 | 0 | 83.2 | 1 | 8 | 0 | 1 | 0.5 | 0 | 0 | 4 | 0 | 0 |
| M1051 | 1.7 | 2.9 | 0 | 73.4 | 1 | 8 | 0 | 1.5 | 0.5 | 0 | 0 | 11 | 0 | 0 |
| M1052 | 1 | 2 | 0 | 85 | 0 | 4 | 0 | 0 | 0 | 0 | 0 | 8 | 0 | 0 |
| M1053 | 1.8 | 2 | 0 | 75.2 | 0 | 13 | 0 | 0 | 0 | 0 | 0 | 8 | 0 | 0 |
| M1054 | 1 | 1 | 0 | 84 | 1 | 6.5 | 0 | 2 | 0.5 | 0 | 0 | 4 | 0 | 0 |
| M1055 | 0.8 | 2.6 | 0 | 81.6 | 0 | 4 | 0 | 0 | 0 | 0 | 0 | 11 | 0 | 0 |
| M1056 | 1.6 | 1 | 0 | 83.4 | 0 | 10 | 0 | 0 | 0 | 0 | 0 | 4 | 0 | 0 |
| M1057 | 1 | 2 | 0 | 80.5 | 1 | 6.5 | 0 | 1 | 0.5 | 0 | 0 | 7.5 | 0 | 0 |
| M1058 | 2.4 | 2.2 | 0 | 69.4 | 0 | 18 | 0 | 0 | 0 | 0 | 8 | 0 | 0 | 0 |
| M1059 | 1.4 | 3 | 0 | 71.6 | 0 | 10 | 0 | 0 | 0 | 0 | 0 | 14 | 0 | 0 |
| M1060 | 0.8 | 2.4 | 0 | 81.8 | 0 | 4 | 0 | 0 | 0 | 0 | 0 | 11 | 0 | 0 |
| M1061 | 1 | 1.8 | 0 | 85.2 | 0 | 4 | 0 | 0 | 0 | 0 | 0 | 8 | 0 | 0 |
| M1062 | 1.9 | 2.1 | 0 | 71.5 | 1 | 13 | 0 | 2 | 0.5 | 0 | 0 | 8 | 0 | 0 |
| M1063 | 1 | 1 | 0 | 90 | 0 | 4 | 0 | 0 | 0 | 0 | 0 | 4 | 0 | 0 |
| M1064 | 1.5 | 1.8 | 0 | 79.7 | 0 | 8 | 0 | 0 | 0 | 0 | 0 | 9 | 0 | 0 |
| M1065 | 2.2 | 2.4 | 0 | 71.4 | 0 | 10 | 0 | 0 | 0 | 0 | 0 | 14 | 0 | 0 |
| M1066 | 2.2 | 2.4 | 0 | 71.4 | 0 | 12 | 0 | 0 | 0 | 0 | 0 | 12 | 0 | 0 |
| M1067 | 0.8 | 1.8 | 0 | 84.4 | 0 | 4 | 0 | 0 | 0 | 0 | 0 | 9 | 0 | 0 |
| M1068 | 1.2 | 2.4 | 0 | 80.4 | 0 | 4 | 0 | 0 | 0 | 0 | 0 | 12 | 0 | 0 |
| M1069 | 1.4 | 2 | 0 | 83.6 | 0 | 2 | 0 | 0 | 0 | 0 | 0 | 11 | 0 | 0 |
| M1070 | 1.4 | 2.2 | 0 | 82.4 | 0 | 2 | 0 | 0 | 0 | 0 | 0 | 12 | 0 | 0 |
| M1071 | 1.4 | 2.6 | 0 | 80 | 0 | 2 | 0 | 0 | 0 | 0 | 0 | 14 | 0 | 0 |
| M1072 | 1.8 | 1.7 | 0 | 78.5 | 0 | 9 | 0 | 0 | 0 | 0 | 0 | 9 | 0 | 0 |
| M1073 | 1.7 | 1.5 | 0 | 82.8 | 1 | 6.5 | 0 | 2 | 0.5 | 0 | 0 | 4 | 0 | 0 |
| M1074 | 2.4 | 1.6 | 0 | 72 | 0 | 18 | 0 | 0 | 0 | 0 | 6 | 0 | 0 | 0 |
| M1075 | 2 | 2.2 | 0 | 73.3 | 1 | 11.5 | 0 | 1.5 | 0.5 | 0 | 0 | 8 | 0 | 0 |
| M1076 | 1 | 1 | 0 | 90 | 0 | 4 | 0 | 0 | 0 | 0 | 2 | 2 | 0 | 0 |
| M1077 | 2 | 2 | 0 | 80 | 1 | 7 | 0 | 1.5 | 0.5 | 0 | 0 | 6 | 0 | 0 |
| M1078 | 2.4 | 2 | 0 | 69.6 | 0 | 18 | 0 | 0 | 0 | 0 | 8 | 0 | 0 | 0 |
| M1079 | 0.6 | 3.6 | 0 | 73.3 | 1 | 2 | 0 | 1 | 0.5 | 0 | 0 | 18 | 0 | 0 |

TABLE 11-continued

Compositions and thermodynamic criteria for vanadium carbides

| | | | | | | | | | | | | | | |
|---|---|---|---|---|---|---|---|---|---|---|---|---|---|---|
| M1080 | 1.1 | 2.6 | 0 | 76.3 | 1 | 6.5 | 0 | 2 | 0.5 | 0 | 0 | 10 | 0 | 0 |
| M1081 | 2.4 | 2.4 | 0 | 67.2 | 0 | 18 | 0 | 0 | 0 | 0 | 10 | 0 | 0 | 0 |
| M1082 | 1.6 | 1.6 | 0 | 83.3 | 1 | 6 | 0 | 1.5 | 0.5 | 0 | 0 | 4.5 | 0 | 0 |
| M1083 | 1 | 1 | 0 | 85 | 1 | 6.5 | 0 | 1 | 0.5 | 0 | 0 | 4 | 0 | 0 |
| M1084 | 2.4 | 1.8 | 0 | 69.8 | 0 | 18 | 0 | 0 | 0 | 0 | 8 | 0 | 0 | 0 |
| M1085 | 2.4 | 2.2 | 0 | 67.4 | 0 | 18 | 0 | 0 | 0 | 0 | 10 | 0 | 0 | 0 |
| M1086 | 1.7 | 2.6 | 0 | 72.2 | 1 | 10.5 | 0 | 1.5 | 0.5 | 0 | 0 | 10 | 0 | 0 |
| M1087 | 1.7 | 2.3 | 0 | 77 | 1 | 8 | 0 | 1.5 | 0.5 | 0 | 0 | 8 | 0 | 0 |
| M1088 | 1.5 | 2.9 | 0 | 70.1 | 1 | 6 | 0 | 2 | 0.5 | 0 | 0 | 16 | 0 | 0 |
| M1089 | 1.9 | 2.2 | 0 | 72.4 | 1 | 8 | 0 | 1 | 0.5 | 0 | 0 | 13 | 0 | 0 |
| M1090 | 1.7 | 3 | 0 | 73.3 | 1 | 7.5 | 0 | 2 | 0.5 | 0 | 0 | 11 | 0 | 0 |
| M1091 | 1.8 | 2 | 0 | 81.7 | 1 | 6 | 0 | 1 | 0.5 | 0 | 0 | 6 | 0 | 0 |
| M1092 | 1.9 | 2.7 | 0 | 77.9 | 1 | 6 | 0 | 1 | 0.5 | 0 | 0 | 9 | 0 | 0 |
| M1093 | 1.8 | 1.2 | 0 | 79 | 0 | 14 | 0 | 0 | 0 | 0 | 0 | 4 | 0 | 0 |
| M1094 | 2 | 2.1 | 0 | 81.4 | 1 | 6 | 0 | 1 | 0.5 | 0 | 0 | 6 | 0 | 0 |
| M1095 | 0.8 | 3.5 | 0 | 75.2 | 1 | 4 | 0 | 1 | 0.5 | 0 | 0 | 14 | 0 | 0 |
| M1096 | 1.2 | 2.6 | 0 | 72.7 | 1 | 8 | 0 | 1.5 | 0.5 | 0 | 0 | 12.5 | 0 | 0 |
| M1097 | 1.9 | 1.8 | 0 | 75.3 | 1 | 11.5 | 0 | 2 | 0.5 | 0 | 0 | 6 | 0 | 0 |
| M1098 | 1.2 | 2.8 | 0 | 71.5 | 1 | 8 | 0 | 1.5 | 0.5 | 0 | 0 | 13.5 | 0 | 0 |
| M1099 | 1.2 | 2.5 | 0 | 76.8 | 1 | 7.5 | 0 | 1 | 0.5 | 0 | 0 | 9.5 | 0 | 0 |
| M1100 | 1.8 | 2.3 | 0 | 79.4 | 1 | 6 | 0 | 2 | 0.5 | 0 | 0 | 7 | 0 | 0 |
| M1101 | 1.6 | 2.8 | 0 | 69.6 | 1 | 9 | 0 | 1 | 0.5 | 0 | 0 | 14.5 | 0 | 0 |
| M1102 | 1.9 | 2.2 | 0 | 69.9 | 1 | 10.5 | 0 | 2 | 0.5 | 0 | 0 | 12 | 0 | 0 |
| M1103 | 1.8 | 1.6 | 0 | 83.6 | 1 | 6.5 | 0 | 1 | 0.5 | 0 | 0 | 4 | 0 | 0 |
| M1104 | 1.6 | 3 | 0 | 68.4 | 1 | 9 | 0 | 1 | 0.5 | 0 | 0 | 15.5 | 0 | 0 |
| M1105 | 1.6 | 2.2 | 0 | 78.2 | 1 | 8 | 0 | 1 | 0.5 | 0 | 0 | 7.5 | 0 | 0 |
| M1106 | 0.8 | 3.1 | 0 | 77.6 | 1 | 4 | 0 | 1 | 0.5 | 0 | 0 | 12 | 0 | 0 |
| M1107 | 2 | 1.2 | 0 | 75.3 | 1 | 12.5 | 0 | 1 | 0.5 | 0 | 0 | 6.5 | 0 | 0 |
| M1108 | 1.9 | 1.5 | 0 | 75.6 | 1 | 9.5 | 0 | 1 | 0.5 | 0 | 0 | 9 | 0 | 0 |
| M1109 | 2.4 | 1.8 | 0 | 71.8 | 0 | 18 | 0 | 0 | 0 | 0 | 6 | 0 | 0 | 0 |
| M1110 | 1.9 | 3 | 0 | 74.6 | 1 | 7.5 | 0 | 1 | 0.5 | 0 | 0 | 10.5 | 0 | 0 |
| M1111 | 0.7 | 3.5 | 0 | 75.3 | 1 | 4 | 0 | 1 | 0.5 | 0 | 0 | 14 | 0 | 0 |
| M1112 | 2 | 1.6 | 0 | 75.9 | 1 | 7 | 0 | 1 | 0.5 | 0 | 0 | 11 | 0 | 0 |
| M1113 | 1.9 | 2.4 | 0 | 69.2 | 1 | 13.5 | 0 | 1 | 0.5 | 0 | 0 | 10.5 | 0 | 0 |
| M1114 | 1.3 | 2.7 | 0 | 76.5 | 1 | 7 | 0 | 1 | 0.5 | 0 | 0 | 10 | 0 | 0 |
| M1115 | 1.9 | 2.2 | 0 | 70.9 | 1 | 10.5 | 0 | 1 | 0.5 | 0 | 0 | 12 | 0 | 0 |
| M1116 | 1.9 | 1.5 | 0 | 80.6 | 1 | 9.5 | 0 | 1 | 0.5 | 0 | 0 | 4 | 0 | 0 |
| M1117 | 1.9 | 2.4 | 0 | 78.7 | 1 | 7 | 0 | 1 | 0.5 | 0 | 0 | 7.5 | 0 | 0 |
| M1118 | 2 | 2.4 | 0 | 80.1 | 1 | 6 | 0 | 1 | 0.5 | 0 | 0 | 7 | 0 | 0 |
| M1119 | 1.9 | 2.2 | 0 | 70.9 | 1 | 9.5 | 0 | 1.5 | 0.5 | 0 | 0 | 12.5 | 0 | 0 |
| M1120 | 1.8 | 1.9 | 0 | 76.8 | 1 | 10 | 0 | 2 | 0.5 | 0 | 0 | 6 | 0 | 0 |
| M1121 | 1 | 1.9 | 0 | 80.6 | 1 | 6.5 | 0 | 2 | 0.5 | 0 | 0 | 6.5 | 0 | 0 |
| M1122 | 1.9 | 2.4 | 0 | 76.2 | 1 | 9 | 0 | 1 | 0.5 | 0 | 0 | 8 | 0 | 0 |
| M1123 | 0.9 | 1.1 | 0 | 84.5 | 1 | 6 | 0 | 2 | 0.5 | 0 | 0 | 4 | 0 | 0 |
| M1124 | 1.8 | 2 | 0 | 82.2 | 1 | 6 | 0 | 1 | 0.5 | 0 | 0 | 5.5 | 0 | 0 |
| M1125 | 2 | 2.1 | 0 | 80.4 | 1 | 6.5 | 0 | 2 | 0.5 | 0 | 0 | 5.5 | 0 | 0 |
| M1126 | 1.7 | 1.5 | 0 | 77.8 | 1 | 7 | 0 | 1 | 0.5 | 0 | 0 | 9.5 | 0 | 0 |
| M1127 | 1.9 | 2.2 | 0 | 75.9 | 1 | 9.5 | 0 | 2 | 0.5 | 0 | 0 | 7 | 0 | 0 |
| M1128 | 0.9 | 3 | 0 | 73.6 | 1 | 6 | 0 | 2 | 0.5 | 0 | 0 | 13 | 0 | 0 |
| M1129 | 1.3 | 2.7 | 0 | 76 | 1 | 7.5 | 0 | 1 | 0.5 | 0 | 0 | 10 | 0 | 0 |
| M1130 | 0.8 | 4 | 0 | 72.7 | 1 | 4 | 0 | 1 | 0.5 | 0 | 0 | 16 | 0 | 0 |
| M1131 | 2 | 3 | 0 | 63 | 1 | 13.5 | 0 | 2 | 0.5 | 0 | 0 | 15 | 0 | 0 |
| M1132 | 1.9 | 1.8 | 0 | 75.3 | 0 | 10 | 0 | 0 | 0 | 0 | 0 | 11 | 0 | 0 |
| M1133 | 1.5 | 2.7 | 0 | 70.8 | 1 | 7.5 | 0 | 1.5 | 0.5 | 0 | 0 | 14.5 | 0 | 0 |
| M1134 | 1.7 | 2.9 | 0 | 72.9 | 1 | 9 | 0 | 1.5 | 0.5 | 0 | 0 | 10.5 | 0 | 0 |
| M1135 | 2 | 2.4 | 0 | 68.6 | 1 | 14.5 | 0 | 1.5 | 0.5 | 0 | 0 | 9.5 | 0 | 0 |
| M1136 | 1.9 | 1.8 | 0 | 76.3 | 1 | 11 | 0 | 2 | 0.5 | 0 | 0 | 5.5 | 0 | 0 |
| M1137 | 1.1 | 1.6 | 0 | 80.8 | 1 | 7.5 | 0 | 1 | 0.5 | 0 | 0 | 6.5 | 0 | 0 |
| M1138 | 1.6 | 1.4 | 0 | 83 | 0 | 10 | 0 | 0 | 0 | 0 | 0 | 4 | 0 | 0 |
| M1139 | 1.7 | 2.8 | 0 | 76.5 | 1 | 7 | 0 | 1 | 0.5 | 0 | 0 | 9.5 | 0 | 0 |
| M1140 | 1.9 | 2.1 | 0 | 77 | 1 | 9.5 | 0 | 1.5 | 0.5 | 0 | 0 | 6.5 | 0 | 0 |
| M1141 | 1.9 | 2.8 | 0 | 67.8 | 1 | 9.5 | 0 | 1 | 0.5 | 0 | 0 | 15.5 | 0 | 0 |
| M1142 | 1.2 | 2.7 | 0 | 71.6 | 1 | 7.5 | 0 | 2 | 0.5 | 0 | 0 | 13.5 | 0 | 0 |
| M1143 | 1.2 | 2.9 | 0 | 74.9 | 1 | 7.5 | 0 | 1 | 0.5 | 0 | 0 | 11 | 0 | 0 |
| M1144 | 1.6 | 2.1 | 0 | 73.3 | 1 | 8.5 | 0 | 1.5 | 0.5 | 0 | 0 | 11.5 | 0 | 0 |
| M1145 | 1.5 | 2.9 | 0 | 70.1 | 1 | 6.5 | 0 | 1.5 | 0.5 | 0 | 0 | 16 | 0 | 0 |
| M1146 | 1.9 | 2.7 | 0 | 75.4 | 1 | 8.5 | 0 | 1 | 0.5 | 0 | 0 | 9 | 0 | 0 |
| M1147 | 1.3 | 2.8 | 0 | 72.4 | 1 | 6 | 0 | 1 | 0.5 | 0 | 0 | 15 | 0 | 0 |
| M1148 | 1.9 | 2.2 | 0 | 72.4 | 1 | 7.5 | 0 | 1 | 0.5 | 0 | 0 | 13.5 | 0 | 0 |
| M1149 | 1.9 | 2.4 | 0 | 79.7 | 1 | 6.5 | 0 | 1 | 0.5 | 0 | 0 | 7 | 0 | 0 |
| M1150 | 1.9 | 1.9 | 0 | 81.7 | 1 | 6.5 | 0 | 2 | 0.5 | 0 | 0 | 4.5 | 0 | 0 |
| M1151 | 1.8 | 2 | 0 | 81.7 | 1 | 6 | 0 | 2 | 0.5 | 0 | 0 | 5 | 0 | 0 |
| M1152 | 1.9 | 2.4 | 0 | 71.2 | 1 | 7.5 | 0 | 1 | 0.5 | 0 | 0 | 14.5 | 0 | 0 |
| M1153 | 1.5 | 1.9 | 0 | 81.1 | 1 | 7 | 0 | 1.5 | 0.5 | 0 | 0 | 5.5 | 0 | 0 |
| M1154 | 1.8 | 2.9 | 0 | 66.3 | 1 | 10 | 0 | 2 | 0.5 | 0 | 0 | 15.5 | 0 | 0 |
| M1155 | 0.8 | 3.8 | 0 | 70.9 | 1 | 2 | 0 | 1 | 0.5 | 0 | 0 | 20 | 0 | 0 |
| M1156 | 2 | 1 | 0 | 79 | 1 | 7.5 | 0 | 1 | 0.5 | 0 | 0 | 8 | 0 | 0 |
| M1157 | 1.3 | 2.3 | 0 | 73.4 | 1 | 9 | 0 | 1.5 | 0.5 | 0 | 0 | 11 | 0 | 0 |

TABLE 11-continued

Compositions and thermodynamic criteria for vanadium carbides

| | | | | | | | | | | | | | | |
|---|---|---|---|---|---|---|---|---|---|---|---|---|---|---|
| M1158 | 1.9 | 1.8 | 0 | 80.8 | 1 | 8 | 0 | 1.5 | 0.5 | 0 | 0 | 4.5 | 0 | 0 |
| M1159 | 1.6 | 3 | 0 | 67.4 | 1 | 8.5 | 0 | 2 | 0.5 | 0 | 0 | 16 | 0 | 0 |
| M1160 | 2 | 1.7 | 0 | 70.8 | 1 | 14.5 | 0 | 2 | 0.5 | 0 | 0 | 7.5 | 0 | 0 |
| M1161 | 2 | 2.9 | 0 | 77.1 | 1 | 6 | 0 | 2 | 0.5 | 0 | 0 | 8.5 | 0 | 0 |
| M1162 | 2 | 1 | 0 | 79.5 | 1 | 6.5 | 0 | 1 | 0.5 | 0 | 0 | 8.5 | 0 | 0 |
| M1163 | 1.5 | 1.9 | 0 | 74.6 | 1 | 10 | 0 | 1 | 0.5 | 0 | 0 | 9.5 | 0 | 0 |
| M1164 | 1 | 2 | 0 | 79 | 1 | 7 | 0 | 2 | 0.5 | 0 | 0 | 7.5 | 0 | 0 |
| M1165 | 2.2 | 0.7 | 0 | 75.6 | 1 | 16 | 0 | 1 | 0.5 | 0 | 0 | 3 | 0 | 0 |
| M1166 | 2 | 2.2 | 0 | 80.8 | 1 | 6.5 | 0 | 1.5 | 0.5 | 0 | 0 | 5.5 | 0 | 0 |
| M1167 | 1.9 | 1.9 | 0 | 78.2 | 1 | 10 | 0 | 1 | 0.5 | 0 | 0 | 5.5 | 0 | 0 |
| M1168 | 0.9 | 2.4 | 0 | 77.2 | 1 | 6 | 0 | 1 | 0.5 | 0 | 0 | 11 | 0 | 0 |
| M1169 | 2.4 | 2.6 | 0 | 65 | 0 | 18 | 0 | 0 | 0 | 0 | 12 | 0 | 0 | 0 |
| M1170 | 1.9 | 1.9 | 0 | 80.7 | 1 | 7.5 | 0 | 2 | 0.5 | 0 | 0 | 4.5 | 0 | 0 |
| M1171 | 1.6 | 1.1 | 0 | 78.3 | 1 | 11.5 | 0 | 1.5 | 0.5 | 0 | 0 | 4.5 | 0 | 0 |
| M1172 | 2 | 2.4 | 0 | 74.1 | 1 | 10.5 | 0 | 2 | 0.5 | 0 | 0 | 7.5 | 0 | 0 |
| M1173 | 1.5 | 2.3 | 0 | 80.2 | 1 | 6.5 | 0 | 1 | 0.5 | 0 | 0 | 7 | 0 | 0 |
| M1174 | 2 | 3 | 0 | 70.5 | 1 | 11 | 0 | 1.5 | 0.5 | 0 | 0 | 10.5 | 0 | 0 |
| M1175 | 1.6 | 2.7 | 0 | 71.7 | 1 | 11 | 0 | 1.5 | 0.5 | 0 | 0 | 10 | 0 | 0 |
| M1176 | 1.8 | 1.9 | 0 | 81.3 | 1 | 7 | 0 | 2 | 0.5 | 0 | 0 | 4.5 | 0 | 0 |
| M1177 | 1.9 | 2.9 | 0 | 74.7 | 1 | 8.5 | 0 | 1 | 0.5 | 0 | 0 | 9.5 | 0 | 0 |
| M1178 | 0.6 | 3.1 | 0 | 77.8 | 1 | 4 | 0 | 1 | 0.5 | 0 | 0 | 12 | 0 | 0 |
| M1179 | 2 | 1.4 | 0 | 78.6 | 0 | 14 | 0 | 0 | 0 | 0 | 0 | 4 | 0 | 0 |
| M1180 | 2 | 2 | 0 | 75.5 | 1 | 11.5 | 0 | 1.5 | 0.5 | 0 | 0 | 6 | 0 | 0 |
| M1181 | 1.3 | 2.6 | 0 | 76.6 | 1 | 7.5 | 0 | 1.5 | 0.5 | 0 | 0 | 9 | 0 | 0 |
| M1182 | 1 | 1.6 | 0 | 89.4 | 0 | 4 | 0 | 0 | 0 | 0 | 0 | 4 | 0 | 0 |
| M1183 | 1.9 | 2 | 0 | 83.1 | 1 | 6 | 0 | 1 | 0.5 | 0 | 0 | 4.5 | 0 | 0 |
| M1184 | 1.2 | 2.4 | 0 | 73.9 | 1 | 8.5 | 0 | 2 | 0.5 | 0 | 0 | 10.5 | 0 | 0 |
| M1185 | 1 | 2.9 | 0 | 73.1 | 1 | 7 | 0 | 2 | 0.5 | 0 | 0 | 12.5 | 0 | 0 |
| M1186 | 1 | 3 | 0 | 72.5 | 1 | 7 | 0 | 2 | 0.5 | 0 | 0 | 13 | 0 | 0 |
| M1187 | 2 | 1.2 | 0 | 75.8 | 1 | 10 | 0 | 1.5 | 0.5 | 0 | 0 | 8 | 0 | 0 |
| M1188 | 2 | 1.2 | 0 | 75.8 | 1 | 11 | 0 | 1 | 0.5 | 0 | 0 | 7.5 | 0 | 0 |
| M1189 | 1.7 | 2.9 | 0 | 67.4 | 1 | 10.5 | 0 | 1 | 0.5 | 0 | 0 | 15 | 0 | 0 |
| M1190 | 2 | 2.4 | 0 | 80.1 | 1 | 6.5 | 0 | 1.5 | 0.5 | 0 | 0 | 6 | 0 | 0 |
| M1191 | 2.1 | 0.9 | 0 | 75.5 | 1 | 14 | 0 | 1 | 0.5 | 0 | 0 | 5 | 0 | 0 |
| M1192 | 0.8 | 3.7 | 0 | 75 | 1 | 4 | 0 | 1 | 0.5 | 0 | 0 | 14 | 0 | 0 |
| M1193 | 1.6 | 1.9 | 0 | 83 | 1 | 6 | 0 | 1.5 | 0.5 | 0 | 0 | 4.5 | 0 | 0 |
| M1194 | 1.9 | 2.3 | 0 | 75.8 | 1 | 10 | 0 | 1.5 | 0.5 | 0 | 0 | 7 | 0 | 0 |
| M1195 | 1.6 | 1.1 | 0 | 79.8 | 1 | 6 | 0 | 2 | 0.5 | 0 | 0 | 8 | 0 | 0 |
| M1196 | 1.2 | 2.2 | 0 | 75.6 | 1 | 8.5 | 0 | 1.5 | 0.5 | 0 | 0 | 9.5 | 0 | 0 |
| M1197 | 1 | 1.3 | 0 | 81.7 | 1 | 7 | 0 | 2 | 0.5 | 0 | 0 | 5.5 | 0 | 0 |
| M1198 | 1.9 | 1.3 | 0 | 78.3 | 1 | 6 | 0 | 1 | 0.5 | 0 | 0 | 10 | 0 | 0 |
| M1199 | 0.6 | 3.5 | 0 | 73.4 | 1 | 2 | 0 | 1 | 0.5 | 0 | 0 | 18 | 0 | 0 |
| M1200 | 2 | 2.1 | 0 | 82.9 | 1 | 6 | 0 | 1 | 0.5 | 0 | 0 | 4.5 | 0 | 0 |
| M1201 | 1.9 | 1.9 | 0 | 81.2 | 1 | 8 | 0 | 1 | 0.5 | 0 | 0 | 4.5 | 0 | 0 |
| M1202 | 1.2 | 2.2 | 0 | 79.1 | 1 | 7 | 0 | 2 | 0.5 | 0 | 0 | 7 | 0 | 0 |
| M1203 | 1.8 | 2 | 0 | 83.2 | 1 | 6 | 0 | 1 | 0.5 | 0 | 0 | 4.5 | 0 | 0 |
| M1204 | 1.9 | 2.3 | 0 | 81.3 | 1 | 6 | 0 | 1.5 | 0.5 | 0 | 0 | 5.5 | 0 | 0 |
| M1205 | 2 | 1.2 | 0 | 76.8 | 1 | 8 | 0 | 1.5 | 0.5 | 0 | 0 | 9 | 0 | 0 |
| M1206 | 1.5 | 1.8 | 0 | 80.2 | 1 | 8.5 | 0 | 1.5 | 0.5 | 0 | 0 | 5 | 0 | 0 |
| M1207 | 0.9 | 2.7 | 0 | 76.4 | 1 | 6.5 | 0 | 2 | 0.5 | 0 | 0 | 10 | 0 | 0 |
| M1208 | 1 | 1 | 0 | 83 | 1 | 7 | 0 | 2 | 0.5 | 0 | 0 | 4.5 | 0 | 0 |
| M1209 | 1.4 | 2.9 | 0 | 69.2 | 1 | 10 | 0 | 1.5 | 0.5 | 0 | 0 | 13.5 | 0 | 0 |
| M1210 | 1 | 2.9 | 0 | 74.1 | 1 | 7 | 0 | 1 | 0.5 | 0 | 0 | 12.5 | 0 | 0 |
| M1211 | 0.8 | 3.3 | 0 | 77.4 | 1 | 4 | 0 | 1 | 0.5 | 0 | 0 | 12 | 0 | 0 |
| M1212 | 2 | 1.7 | 0 | 72.3 | 1 | 15 | 0 | 2 | 0.5 | 0 | 0 | 5.5 | 0 | 0 |
| M1213 | 1.6 | 3 | 0 | 66.9 | 1 | 9 | 0 | 2 | 0.5 | 0 | 0 | 16 | 0 | 0 |
| M1214 | 1.7 | 1.5 | 0 | 75.3 | 1 | 10 | 0 | 1.5 | 0.5 | 0 | 0 | 8.5 | 0 | 0 |
| M1215 | 1.2 | 2.6 | 0 | 72.7 | 1 | 7 | 0 | 1.5 | 0.5 | 0 | 0 | 13.5 | 0 | 0 |
| M1216 | 1.6 | 2.3 | 0 | 78.1 | 1 | 8.5 | 0 | 1 | 0.5 | 0 | 0 | 7 | 0 | 0 |
| M1217 | 2 | 2 | 0 | 72 | 1 | 8 | 0 | 1.5 | 0.5 | 0 | 0 | 13 | 0 | 0 |
| M1218 | 1.2 | 2.6 | 0 | 73.2 | 1 | 8.5 | 0 | 1 | 0.5 | 0 | 0 | 12 | 0 | 0 |
| M1219 | 1.9 | 1.9 | 0 | 80.2 | 1 | 9 | 0 | 1 | 0.5 | 0 | 0 | 4.5 | 0 | 0 |
| M1220 | 1 | 2.9 | 0 | 72.6 | 1 | 6.5 | 0 | 1 | 0.5 | 0 | 0 | 14.5 | 0 | 0 |
| M1221 | 1.2 | 2.9 | 0 | 73.4 | 1 | 8.5 | 0 | 2 | 0.5 | 0 | 0 | 10.5 | 0 | 0 |
| M1222 | 1.2 | 2.9 | 0 | 71.4 | 1 | 6 | 0 | 1.5 | 0.5 | 0 | 0 | 15.5 | 0 | 0 |
| M1223 | 1.9 | 2.7 | 0 | 79.9 | 1 | 6 | 0 | 1 | 0.5 | 0 | 0 | 7 | 0 | 0 |
| M1224 | 0.9 | 1.4 | 0 | 82.2 | 1 | 6 | 0 | 1 | 0.5 | 0 | 0 | 7 | 0 | 0 |
| M1225 | 1.3 | 2 | 0 | 77.2 | 1 | 9.5 | 0 | 1 | 0.5 | 0 | 0 | 7.5 | 0 | 0 |
| M1226 | 2 | 2.8 | 0 | 72.2 | 1 | 11 | 0 | 1.5 | 0.5 | 0 | 0 | 9 | 0 | 0 |
| M1227 | 1.9 | 1.6 | 0 | 74 | 1 | 10.5 | 0 | 1 | 0.5 | 0 | 0 | 9.5 | 0 | 0 |
| M1228 | 1.6 | 3 | 0 | 67.9 | 1 | 9 | 0 | 1 | 0.5 | 0 | 0 | 16 | 0 | 0 |
| M1229 | 2 | 2.1 | 0 | 83.4 | 1 | 6 | 0 | 1 | 0.5 | 0 | 0 | 4 | 0 | 0 |
| M1230 | 1.3 | 2.2 | 0 | 74 | 1 | 7 | 0 | 2 | 0.5 | 0 | 0 | 12 | 0 | 0 |
| M1231 | 1.3 | 1.6 | 0 | 77.6 | 1 | 9.5 | 0 | 2 | 0.5 | 0 | 0 | 6.5 | 0 | 0 |
| M1232 | 1.8 | 0.9 | 0 | 77.8 | 1 | 12 | 0 | 1 | 0.5 | 0 | 0 | 5 | 0 | 0 |
| M1233 | 2.2 | 2.4 | 0 | 66.4 | 0 | 16 | 1 | 0 | 0 | 0 | 0 | 12 | 0 | 0 |
| M1234 | 1.2 | 3 | 0 | 70.8 | 1 | 7 | 0 | 1 | 0.5 | 0 | 0 | 15.5 | 0 | 0 |
| M1235 | 2 | 1.7 | 0 | 72.3 | 1 | 15 | 0 | 1.5 | 0.5 | 0 | 0 | 6 | 0 | 0 |

TABLE 11-continued

Compositions and thermodynamic criteria for vanadium carbides

| | | | | | | | | | | | | | | |
|---|---|---|---|---|---|---|---|---|---|---|---|---|---|---|
| M1236 | 1.7 | 1 | 0 | 78.3 | 1 | 12.5 | 0 | 1 | 0.5 | 0 | 0 | 4 | 0 | 0 |
| M1237 | 1.9 | 1.8 | 0 | 77.3 | 1 | 11 | 0 | 2 | 0.5 | 0 | 0 | 4.5 | 0 | 0 |
| M1238 | 0.6 | 3.6 | 0 | 73.3 | 1 | 4 | 0 | 1 | 0.5 | 0 | 0 | 16 | 0 | 0 |
| M1239 | 1.9 | 2.5 | 0 | 74.1 | 1 | 10.5 | 0 | 2 | 0.5 | 0 | 0 | 7.5 | 0 | 0 |
| M1240 | 0.9 | 2.8 | 0 | 72.8 | 1 | 6 | 0 | 2 | 0.5 | 0 | 0 | 14 | 0 | 0 |
| M1241 | 2 | 1.8 | 0 | 78.2 | 1 | 10.5 | 0 | 2 | 0.5 | 0 | 0 | 4 | 0 | 0 |
| M1242 | 1.6 | 2.5 | 0 | 71.4 | 1 | 12 | 0 | 1.5 | 0.5 | 0 | 0 | 9.5 | 0 | 0 |
| M1243 | 2 | 2.3 | 0 | 71.7 | 1 | 13.5 | 0 | 1.5 | 0.5 | 0 | 0 | 7.5 | 0 | 0 |
| M1244 | 2 | 2.6 | 0 | 75.9 | 1 | 9 | 0 | 2 | 0.5 | 0 | 0 | 7 | 0 | 0 |
| M1245 | 1.9 | 2.8 | 0 | 66.3 | 1 | 11.5 | 0 | 1 | 0.5 | 0 | 0 | 15 | 0 | 0 |
| M1246 | 1.1 | 2.9 | 0 | 71 | 1 | 7.5 | 0 | 1.5 | 0.5 | 0 | 0 | 14.5 | 0 | 0 |
| M1247 | 1.6 | 2.1 | 0 | 82.3 | 1 | 6.5 | 0 | 1 | 0.5 | 0 | 0 | 5 | 0 | 0 |
| M1248 | 1 | 2.7 | 0 | 73.8 | 1 | 7 | 0 | 1 | 0.5 | 0 | 0 | 13 | 0 | 0 |
| M1249 | 2 | 2.5 | 0 | 81.5 | 1 | 6 | 0 | 1 | 0.5 | 0 | 0 | 5.5 | 0 | 0 |
| M1250 | 2 | 2.5 | 0 | 78 | 1 | 8.5 | 0 | 1 | 0.5 | 0 | 0 | 6.5 | 0 | 0 |
| M1251 | 1.6 | 2.2 | 0 | 70.7 | 1 | 10.5 | 0 | 2 | 0.5 | 0 | 0 | 11.5 | 0 | 0 |
| M1252 | 1.2 | 2.1 | 0 | 74.2 | 1 | 8.5 | 0 | 2 | 0.5 | 0 | 0 | 10.5 | 0 | 0 |
| M1253 | 1.8 | 1.6 | 0 | 74.1 | 1 | 9 | 0 | 2 | 0.5 | 0 | 0 | 10 | 0 | 0 |
| M1254 | 1.9 | 2.6 | 0 | 79 | 1 | 7 | 0 | 1.5 | 0.5 | 0 | 0 | 6.5 | 0 | 0 |
| M1255 | 1.6 | 1.8 | 0 | 76.1 | 1 | 12 | 0 | 1 | 0.5 | 0 | 0 | 6 | 0 | 0 |
| M1256 | 1.6 | 2.5 | 0 | 68.9 | 1 | 10.5 | 0 | 2 | 0.5 | 0 | 0 | 13 | 0 | 0 |
| M1257 | 1.9 | 2.5 | 0 | 75.1 | 1 | 10.5 | 0 | 1 | 0.5 | 0 | 0 | 7.5 | 0 | 0 |
| M1258 | 1.6 | 2.2 | 0 | 71.2 | 1 | 9.5 | 0 | 2 | 0.5 | 0 | 0 | 12 | 0 | 0 |
| M1259 | 2 | 3 | 0 | 76 | 1 | 7.5 | 0 | 2 | 0.5 | 0 | 0 | 8 | 0 | 0 |
| M1260 | 1.6 | 2.6 | 0 | 71.8 | 1 | 11.5 | 0 | 2 | 0.5 | 0 | 0 | 9 | 0 | 0 |
| M1261 | 1.4 | 2.4 | 0 | 78.2 | 1 | 7.5 | 0 | 2 | 0.5 | 0 | 0 | 7 | 0 | 0 |
| M1262 | 2 | 2.8 | 0 | 74.7 | 1 | 9.5 | 0 | 1.5 | 0.5 | 0 | 0 | 8 | 0 | 0 |
| M1263 | 1 | 2.1 | 0 | 76.4 | 1 | 6 | 0 | 2 | 0.5 | 0 | 0 | 11 | 0 | 0 |
| M1264 | 1 | 1.8 | 0 | 83.2 | 1 | 6.5 | 0 | 1 | 0.5 | 0 | 0 | 5 | 0 | 0 |
| M1265 | 2 | 3 | 0 | 79 | 1 | 6 | 0 | 1 | 0.5 | 0 | 0 | 7.5 | 0 | 0 |
| M1266 | 1.2 | 1.8 | 0 | 80 | 1 | 9 | 0 | 1 | 0.5 | 0 | 0 | 5.5 | 0 | 0 |
| M1267 | 1.3 | 1.6 | 0 | 81.6 | 1 | 8.5 | 0 | 1.5 | 0.5 | 0 | 0 | 4 | 0 | 0 |
| M1268 | 2 | 2.7 | 0 | 77.8 | 1 | 7.5 | 0 | 2 | 0.5 | 0 | 0 | 6.5 | 0 | 0 |
| M1269 | 1.6 | 2.9 | 0 | 67 | 1 | 9.5 | 0 | 2 | 0.5 | 0 | 0 | 15.5 | 0 | 0 |
| M1270 | 1.7 | 2.7 | 0 | 70.1 | 1 | 12.5 | 0 | 2 | 0.5 | 0 | 0 | 9.5 | 0 | 0 |
| M1271 | 1.6 | 2.2 | 0 | 81.2 | 1 | 6.5 | 0 | 2 | 0.5 | 0 | 0 | 5 | 0 | 0 |
| M1272 | 1 | 2.5 | 0 | 74 | 1 | 6 | 0 | 2 | 0.5 | 0 | 0 | 13 | 0 | 0 |
| M1273 | 0.9 | 2.3 | 0 | 80.3 | 1 | 6.5 | 0 | 1 | 0.5 | 0 | 0 | 7.5 | 0 | 0 |
| M1274 | 1.7 | 2.3 | 0 | 82 | 1 | 6 | 0 | 1.5 | 0.5 | 0 | 0 | 5 | 0 | 0 |
| M1275 | 0.8 | 3.7 | 0 | 73 | 1 | 6 | 0 | 1 | 0.5 | 0 | 0 | 14 | 0 | 0 |
| M1276 | 0.3 | 3.9 | 0 | 75.3 | 1 | 2 | 0 | 1 | 0.5 | 0 | 0 | 16 | 0 | 0 |
| M1277 | 2 | 2.8 | 0 | 68.2 | 1 | 14.5 | 0 | 1 | 0.5 | 0 | 0 | 10 | 0 | 0 |
| M1278 | 1.5 | 1.9 | 0 | 77.1 | 1 | 10.5 | 0 | 2 | 0.5 | 0 | 0 | 5.5 | 0 | 0 |
| M1279 | 2 | 2.9 | 0 | 79.1 | 1 | 6 | 0 | 2 | 0.5 | 0 | 0 | 6.5 | 0 | 0 |
| M1280 | 1.9 | 2.1 | 0 | 81.5 | 1 | 7.5 | 0 | 1.5 | 0.5 | 0 | 0 | 4 | 0 | 0 |
| M1281 | 2 | 2.4 | 0 | 74.6 | 1 | 11 | 0 | 2 | 0.5 | 0 | 0 | 6.5 | 0 | 0 |
| M1282 | 0.8 | 4 | 0 | 70.7 | 1 | 6 | 0 | 1 | 0.5 | 0 | 0 | 16 | 0 | 0 |
| M1283 | 1.9 | 1.8 | 0 | 79.3 | 1 | 10.5 | 0 | 1 | 0.5 | 0 | 0 | 4 | 0 | 0 |
| M1284 | 1.7 | 1.3 | 0 | 76.5 | 1 | 10.5 | 0 | 1 | 0.5 | 0 | 0 | 7.5 | 0 | 0 |
| M1285 | 2 | 2.7 | 0 | 78.8 | 1 | 7.5 | 0 | 1 | 0.5 | 0 | 0 | 6.5 | 0 | 0 |
| M1286 | 0.8 | 3.9 | 0 | 74.8 | 1 | 4 | 0 | 1 | 0.5 | 0 | 0 | 14 | 0 | 0 |
| M1287 | 2 | 2.9 | 0 | 71.6 | 1 | 11.5 | 0 | 1.5 | 0.5 | 0 | 0 | 9 | 0 | 0 |
| M1288 | 0.8 | 3 | 0 | 74.7 | 1 | 6 | 0 | 2 | 0.5 | 0 | 0 | 12 | 0 | 0 |
| M1289 | 1.9 | 1.4 | 0 | 75.7 | 1 | 14.5 | 0 | 1 | 0.5 | 0 | 0 | 4 | 0 | 0 |
| M1290 | 1.9 | 1.8 | 0 | 73.3 | 1 | 14.5 | 0 | 1 | 0.5 | 0 | 0 | 6 | 0 | 0 |
| M1291 | 1.3 | 2.6 | 0 | 73.1 | 1 | 10 | 0 | 2 | 0.5 | 0 | 0 | 9.5 | 0 | 0 |
| M1292 | 1.3 | 2.2 | 0 | 73.5 | 1 | 7.5 | 0 | 2 | 0.5 | 0 | 0 | 12 | 0 | 0 |
| M1293 | 1.2 | 3 | 0 | 77.8 | 1 | 6 | 0 | 1 | 0.5 | 0 | 0 | 9.5 | 0 | 0 |
| M1294 | 2 | 3 | 0 | 79.5 | 1 | 6 | 0 | 1 | 0.5 | 0 | 0 | 7 | 0 | 0 |
| M1295 | 2 | 1.8 | 0 | 78.2 | 1 | 11.5 | 0 | 1 | 0.5 | 0 | 0 | 4 | 0 | 0 |
| M1296 | 0.6 | 3.7 | 0 | 71.2 | 1 | 4 | 0 | 1 | 0.5 | 0 | 0 | 18 | 0 | 0 |
| M1297 | 0.8 | 3.3 | 0 | 75.4 | 1 | 6 | 0 | 1 | 0.5 | 0 | 0 | 12 | 0 | 0 |
| M1298 | 1.9 | 2.5 | 0 | 80.6 | 1 | 7 | 0 | 1 | 0.5 | 0 | 0 | 5.5 | 0 | 0 |
| M1299 | 2 | 2.8 | 0 | 73.7 | 1 | 10.5 | 0 | 1.5 | 0.5 | 0 | 0 | 8 | 0 | 0 |
| M1300 | 1.3 | 2.8 | 0 | 69.4 | 1 | 8.5 | 0 | 2 | 0.5 | 0 | 0 | 14.5 | 0 | 0 |
| M1301 | 1.3 | 2.6 | 0 | 70.6 | 1 | 9.5 | 0 | 1.5 | 0.5 | 0 | 0 | 13 | 0 | 0 |
| M1302 | 2 | 1.7 | 0 | 70.3 | 1 | 14 | 0 | 1.5 | 0.5 | 0 | 0 | 9 | 0 | 0 |
| M1303 | 1 | 2.9 | 0 | 74.6 | 1 | 7.5 | 0 | 1 | 0.5 | 0 | 0 | 11.5 | 0 | 0 |
| M1304 | 1 | 2 | 0 | 78 | 1 | 7.5 | 0 | 2 | 0.5 | 0 | 0 | 8 | 0 | 0 |
| M1305 | 0.8 | 2.6 | 0 | 84.6 | 0 | 4 | 0 | 0 | 0 | 0 | 0 | 8 | 0 | 0 |
| M1306 | 1.4 | 2.2 | 0 | 75.4 | 1 | 10.5 | 0 | 2 | 0.5 | 0 | 0 | 7 | 0 | 0 |
| M1307 | 0.9 | 2.2 | 0 | 79.4 | 1 | 7 | 0 | 2 | 0.5 | 0 | 0 | 7 | 0 | 0 |
| M1308 | 0.8 | 3.5 | 0 | 77.2 | 1 | 4 | 0 | 1 | 0.5 | 0 | 0 | 12 | 0 | 0 |
| M1309 | 0.9 | 2.4 | 0 | 80.7 | 1 | 6 | 0 | 1 | 0.5 | 0 | 0 | 7.5 | 0 | 0 |
| M1310 | 1.6 | 2.8 | 0 | 79.1 | 1 | 6 | 0 | 2 | 0.5 | 0 | 0 | 7 | 0 | 0 |
| M1311 | 0.9 | 2.8 | 0 | 77.3 | 1 | 6.5 | 0 | 1.5 | 0.5 | 0 | 0 | 9.5 | 0 | 0 |
| M1312 | 1.3 | 1.6 | 0 | 78.6 | 1 | 6.5 | 0 | 1 | 0.5 | 0 | 0 | 9.5 | 0 | 0 |
| M1313 | 1.9 | 1.8 | 0 | 75.8 | 1 | 12.5 | 0 | 2 | 0.5 | 0 | 0 | 4.5 | 0 | 0 |

TABLE 11-continued

Compositions and thermodynamic criteria for vanadium carbides

| | | | | | | | | | | | | | | |
|---|---|---|---|---|---|---|---|---|---|---|---|---|---|---|
| M1314 | 1.6 | 1.7 | 0 | 73.7 | 1 | 12 | 0 | 1.5 | 0.5 | 0 | 0 | 8 | 0 | 0 |
| M1315 | 2 | 2.8 | 0 | 74.2 | 1 | 10 | 0 | 2 | 0.5 | 0 | 0 | 7.5 | 0 | 0 |
| M1316 | 2 | 1.1 | 0 | 77.9 | 0 | 11 | 0 | 0 | 0 | 0 | 0 | 8 | 0 | 0 |
| M1317 | 1.8 | 2.9 | 0 | 65.8 | 1 | 13.5 | 0 | 1 | 0.5 | 0 | 0 | 13.5 | 0 | 0 |
| M1318 | 2 | 2 | 0 | 73.5 | 1 | 13.5 | 0 | 2 | 0.5 | 0 | 0 | 5.5 | 0 | 0 |
| M1319 | 1.4 | 1 | 0 | 80.6 | 1 | 10.5 | 0 | 1 | 0.5 | 0 | 0 | 4 | 0 | 0 |
| M1320 | 1.1 | 2.3 | 0 | 79.1 | 1 | 7.5 | 0 | 1.5 | 0.5 | 0 | 0 | 7 | 0 | 0 |
| M1321 | 2 | 2.8 | 0 | 71.7 | 1 | 12 | 0 | 1.5 | 0.5 | 0 | 0 | 8.5 | 0 | 0 |
| M1322 | 1.7 | 2.4 | 0 | 80.9 | 1 | 6.5 | 0 | 2 | 0.5 | 0 | 0 | 5 | 0 | 0 |
| M1323 | 1.6 | 2 | 0 | 71.9 | 1 | 12 | 0 | 1.5 | 0.5 | 0 | 0 | 9.5 | 0 | 0 |
| M1324 | 1 | 2.8 | 0 | 74.7 | 1 | 7.5 | 0 | 1 | 0.5 | 0 | 0 | 11.5 | 0 | 0 |
| M1325 | 1.1 | 2.2 | 0 | 76.2 | 1 | 6 | 0 | 1 | 0.5 | 0 | 0 | 12 | 0 | 0 |
| M1326 | 1.5 | 2.8 | 0 | 69.2 | 1 | 9 | 0 | 1 | 0.5 | 0 | 0 | 15 | 0 | 0 |
| M1327 | 1.6 | 2.2 | 0 | 74.2 | 1 | 12 | 0 | 1.5 | 0.5 | 0 | 0 | 7 | 0 | 0 |
| M1328 | 0.9 | 1.9 | 0 | 80.7 | 1 | 7 | 0 | 2 | 0.5 | 0 | 0 | 6 | 0 | 0 |
| M1329 | 1.9 | 1.9 | 0 | 74.2 | 1 | 6 | 0 | 1 | 0.5 | 0 | 0 | 13.5 | 0 | 0 |
| M1330 | 0.8 | 3.4 | 0 | 73.3 | 1 | 6 | 0 | 1 | 0.5 | 0 | 0 | 14 | 0 | 0 |
| M1331 | 2 | 1.4 | 0 | 74.6 | 1 | 9 | 0 | 1.5 | 0.5 | 0 | 0 | 10 | 0 | 0 |
| M1332 | 0.8 | 3.1 | 0 | 79.6 | 1 | 4 | 0 | 1 | 0.5 | 0 | 0 | 10 | 0 | 0 |
| M1333 | 1.2 | 2.5 | 0 | 79.3 | 1 | 6.5 | 0 | 2 | 0.5 | 0 | 0 | 7 | 0 | 0 |
| M1334 | 0.6 | 4 | 0 | 68.9 | 1 | 4 | 0 | 1 | 0.5 | 0 | 0 | 20 | 0 | 0 |
| M1335 | 2 | 1.9 | 0 | 71.1 | 1 | 10 | 0 | 1.5 | 0.5 | 0 | 0 | 12 | 0 | 0 |
| M1336 | 1.7 | 2.1 | 0 | 77.2 | 1 | 10.5 | 0 | 1.5 | 0.5 | 0 | 0 | 5.5 | 0 | 0 |
| M1337 | 0.8 | 3.8 | 0 | 70.9 | 1 | 6 | 0 | 1 | 0.5 | 0 | 0 | 16 | 0 | 0 |
| M1338 | 1.6 | 2.4 | 0 | 71.5 | 1 | 12.5 | 0 | 2 | 0.5 | 0 | 0 | 8.5 | 0 | 0 |
| M1339 | 1.2 | 1.1 | 0 | 81.7 | 1 | 7 | 0 | 1 | 0.5 | 0 | 0 | 6.5 | 0 | 0 |
| M1340 | 0.8 | 3 | 0 | 73.7 | 1 | 6 | 0 | 2 | 0.5 | 0 | 0 | 13 | 0 | 0 |
| M1341 | 1.7 | 1.2 | 0 | 77.6 | 1 | 13 | 0 | 1 | 0.5 | 0 | 0 | 4 | 0 | 0 |
| M1342 | 2 | 1.5 | 0 | 72.5 | 1 | 15.5 | 0 | 2 | 0.5 | 0 | 0 | 5 | 0 | 0 |
| M1343 | 1.7 | 2.4 | 0 | 75.9 | 1 | 10 | 0 | 2 | 0.5 | 0 | 0 | 6.5 | 0 | 0 |
| M1344 | 1.9 | 2.2 | 0 | 79.4 | 1 | 9 | 0 | 1.5 | 0.5 | 0 | 0 | 4.5 | 0 | 0 |
| M1345 | 1.2 | 2.4 | 0 | 77.9 | 1 | 8.5 | 0 | 1 | 0.5 | 0 | 0 | 7.5 | 0 | 0 |
| M1346 | 2 | 2.1 | 0 | 71.4 | 1 | 6 | 0 | 2 | 0.5 | 0 | 0 | 15 | 0 | 0 |
| M1347 | 1.9 | 1.1 | 0 | 76 | 1 | 9.5 | 0 | 2 | 0.5 | 0 | 0 | 8 | 0 | 0 |
| M1348 | 0.8 | 2.9 | 0 | 75.8 | 1 | 6 | 0 | 1 | 0.5 | 0 | 0 | 12 | 0 | 0 |
| M1349 | 2 | 3 | 0 | 79.5 | 1 | 6 | 0 | 2 | 0.5 | 0 | 0 | 6 | 0 | 0 |
| M1350 | 1.7 | 2.8 | 0 | 74.5 | 1 | 9.5 | 0 | 2 | 0.5 | 0 | 0 | 8 | 0 | 0 |
| M1351 | 1.7 | 2.2 | 0 | 73.1 | 1 | 13 | 0 | 1.5 | 0.5 | 0 | 0 | 7 | 0 | 0 |
| M1352 | 1.7 | 2.3 | 0 | 82.5 | 1 | 6 | 0 | 2 | 0.5 | 0 | 0 | 4 | 0 | 0 |
| M1353 | 1.8 | 3 | 0 | 72.2 | 1 | 10.5 | 0 | 2 | 0.5 | 0 | 0 | 9 | 0 | 0 |
| M1354 | 0.8 | 2.5 | 0 | 76.2 | 1 | 6 | 0 | 2 | 0.5 | 0 | 0 | 11 | 0 | 0 |
| M1355 | 0.8 | 2.3 | 0 | 80.4 | 1 | 6 | 0 | 2 | 0.5 | 0 | 0 | 7 | 0 | 0 |
| M1356 | 1 | 3 | 0 | 70.5 | 1 | 6.5 | 0 | 2 | 0.5 | 0 | 0 | 15.5 | 0 | 0 |
| M1357 | 1.3 | 2.1 | 0 | 80.6 | 1 | 8 | 0 | 1 | 0.5 | 0 | 0 | 5.5 | 0 | 0 |
| M1358 | 2 | 2.3 | 0 | 69.7 | 1 | 9 | 0 | 1 | 0.5 | 0 | 0 | 14.5 | 0 | 0 |
| M1359 | 1.6 | 2.3 | 0 | 81.6 | 1 | 6.5 | 0 | 2 | 0.5 | 0 | 0 | 4.5 | 0 | 0 |
| M1360 | 1.2 | 2.9 | 0 | 69.4 | 1 | 9 | 0 | 2 | 0.5 | 0 | 0 | 14 | 0 | 0 |
| M1361 | 1.9 | 1.6 | 0 | 72.5 | 1 | 12.5 | 0 | 1 | 0.5 | 0 | 0 | 9 | 0 | 0 |
| M1362 | 1.6 | 2.2 | 0 | 77.7 | 1 | 9.5 | 0 | 2 | 0.5 | 0 | 0 | 5.5 | 0 | 0 |
| M1363 | 1 | 2.7 | 0 | 72.8 | 1 | 6.5 | 0 | 1.5 | 0.5 | 0 | 0 | 14 | 0 | 0 |
| M1364 | 1.9 | 1.1 | 0 | 76.5 | 1 | 10.5 | 0 | 1 | 0.5 | 0 | 0 | 7.5 | 0 | 0 |
| M1365 | 1.2 | 2.3 | 0 | 74.5 | 1 | 7 | 0 | 1 | 0.5 | 0 | 0 | 12.5 | 0 | 0 |
| M1366 | 1.6 | 2.2 | 0 | 80.7 | 1 | 7.5 | 0 | 2 | 0.5 | 0 | 0 | 4.5 | 0 | 0 |
| M1367 | 1.6 | 2.8 | 0 | 68.6 | 1 | 9 | 0 | 1 | 0.5 | 0 | 0 | 15.5 | 0 | 0 |
| M1368 | 1 | 2.8 | 0 | 75.2 | 1 | 8 | 0 | 2 | 0.5 | 0 | 0 | 9.5 | 0 | 0 |
| M1369 | 2.2 | 0.7 | 0 | 74.6 | 1 | 16 | 0 | 1 | 0.5 | 0 | 0 | 4 | 0 | 0 |
| M1370 | 1.9 | 2.6 | 0 | 65 | 1 | 14.5 | 0 | 2 | 0.5 | 0 | 0 | 12.5 | 0 | 0 |
| M1371 | 2.2 | 1.8 | 0 | 70 | 0 | 16 | 0 | 0 | 0 | 0 | 0 | 10 | 0 | 0 |
| M1372 | 0.8 | 2.3 | 0 | 76.9 | 1 | 6 | 0 | 2 | 0.5 | 0 | 0 | 10.5 | 0 | 0 |
| M1373 | 1.2 | 2.9 | 0 | 70.9 | 1 | 6 | 0 | 1.5 | 0.5 | 0 | 0 | 16 | 0 | 0 |
| M1374 | 1.9 | 1.2 | 0 | 76.4 | 1 | 9.5 | 0 | 1 | 0.5 | 0 | 0 | 8.5 | 0 | 0 |
| M1375 | 0.8 | 3.4 | 0 | 75.3 | 1 | 6 | 0 | 1 | 0.5 | 0 | 0 | 12 | 0 | 0 |
| M1376 | 1.3 | 2.3 | 0 | 77.4 | 1 | 9.5 | 0 | 1 | 0.5 | 0 | 0 | 7 | 0 | 0 |
| M1377 | 1.3 | 2.6 | 0 | 75.6 | 1 | 9 | 0 | 2 | 0.5 | 0 | 0 | 8 | 0 | 0 |
| M1378 | 1 | 3 | 0 | 72.5 | 1 | 7.5 | 0 | 1 | 0.5 | 0 | 0 | 13.5 | 0 | 0 |
| M1379 | 2 | 2.5 | 0 | 79.5 | 1 | 8.5 | 0 | 1 | 0.5 | 0 | 0 | 5 | 0 | 0 |
| M1380 | 1.9 | 2.7 | 0 | 66.4 | 1 | 9.5 | 0 | 2 | 0.5 | 0 | 0 | 16 | 0 | 0 |
| M1381 | 0.9 | 2.3 | 0 | 79.3 | 1 | 7 | 0 | 2 | 0.5 | 0 | 0 | 7 | 0 | 0 |
| M1382 | 1.4 | 2.7 | 0 | 75.4 | 1 | 9.5 | 0 | 1 | 0.5 | 0 | 0 | 8.5 | 0 | 0 |
| M1383 | 1.3 | 1.6 | 0 | 77.6 | 1 | 10 | 0 | 1.5 | 0.5 | 0 | 0 | 6.5 | 0 | 0 |
| M1384 | 1.7 | 2.9 | 0 | 73.9 | 1 | 10 | 0 | 1.5 | 0.5 | 0 | 0 | 8.5 | 0 | 0 |
| M1385 | 2 | 1.2 | 0 | 74.8 | 1 | 15.5 | 0 | 1 | 0.5 | 0 | 0 | 4 | 0 | 0 |
| M1386 | 0.9 | 1.3 | 0 | 82.8 | 1 | 7 | 0 | 2 | 0.5 | 0 | 0 | 4.5 | 0 | 0 |
| M1387 | 2.2 | 2.8 | 0 | 67 | 0 | 18 | 0 | 0 | 0 | 0 | 10 | 0 | 0 | 0 |
| M1388 | 1.7 | 1.5 | 0 | 76.3 | 1 | 8 | 0 | 1 | 0.5 | 0 | 0 | 10 | 0 | 0 |
| M1389 | 1.2 | 2.7 | 0 | 75.6 | 1 | 8.5 | 0 | 2 | 0.5 | 0 | 0 | 8.5 | 0 | 0 |
| M1390 | 2 | 1.7 | 0 | 71.8 | 1 | 15.5 | 0 | 1 | 0.5 | 0 | 0 | 6.5 | 0 | 0 |
| M1391 | 1.7 | 3 | 0 | 72.3 | 1 | 11 | 0 | 1 | 0.5 | 0 | 0 | 9.5 | 0 | 0 |

TABLE 11-continued

Compositions and thermodynamic criteria for vanadium carbides

| | | | | | | | | | | | | | | |
|---|---|---|---|---|---|---|---|---|---|---|---|---|---|---|
| M1392 | 1.6 | 2.2 | 0 | 81.7 | 1 | 7 | 0 | 2 | 0.5 | 0 | 0 | 4 | 0 | 0 |
| M1393 | 1.6 | 1.8 | 0 | 75.6 | 1 | 12.5 | 0 | 1 | 0.5 | 0 | 0 | 6 | 0 | 0 |
| M1394 | 1.7 | 2.8 | 0 | 69 | 1 | 13.5 | 0 | 1.5 | 0.5 | 0 | 0 | 10 | 0 | 0 |
| M1395 | 1.2 | 1.6 | 0 | 80.2 | 1 | 9.5 | 0 | 1.5 | 0.5 | 0 | 0 | 4.5 | 0 | 0 |
| M1396 | 1.5 | 2.1 | 0 | 77.9 | 1 | 10 | 0 | 1.5 | 0.5 | 0 | 0 | 5.5 | 0 | 0 |
| M1397 | 1.6 | 1.8 | 0 | 73.6 | 1 | 12.5 | 0 | 2 | 0.5 | 0 | 0 | 7 | 0 | 0 |
| M1398 | 1.6 | 1.7 | 0 | 74.2 | 1 | 12.5 | 0 | 2 | 0.5 | 0 | 0 | 6.5 | 0 | 0 |
| M1399 | 0.8 | 4 | 0 | 68.7 | 1 | 6 | 0 | 1 | 0.5 | 0 | 0 | 18 | 0 | 0 |
| M1400 | 1.35 | 1.65 | 0 | 77.95 | 1 | 10.5 | 0 | 0 | 1 | 0 | 0 | 6.55 | 0 | 0 |
| M1401 | 0.8 | 2 | 0 | 77.7 | 1 | 6 | 0 | 2 | 0.5 | 0 | 0 | 10 | 0 | 0 |
| M1402 | 0.8 | 3.1 | 0 | 73.6 | 1 | 6 | 0 | 1 | 0.5 | 0 | 0 | 14 | 0 | 0 |
| M1403 | 0.8 | 3.4 | 0 | 71.3 | 1 | 4 | 0 | 1 | 0.5 | 0 | 0 | 18 | 0 | 0 |
| M1404 | 1.7 | 2.7 | 0 | 65.6 | 1 | 13 | 0 | 2 | 0.5 | 0 | 0 | 13.5 | 0 | 0 |
| M1405 | 2.2 | 2.8 | 0 | 65 | 0 | 18 | 0 | 0 | 0 | 0 | 0 | 12 | 0 | 0 |
| M1406 | 2 | 1.7 | 0 | 71.3 | 1 | 15.5 | 0 | 1 | 0.5 | 0 | 0 | 7 | 0 | 0 |
| M1407 | 1.9 | 2 | 0 | 73.1 | 1 | 14 | 0 | 2 | 0.5 | 0 | 0 | 5.5 | 0 | 0 |
| M1408 | 1.7 | 1.5 | 0 | 73.8 | 1 | 13 | 0 | 1 | 0.5 | 0 | 0 | 7.5 | 0 | 0 |
| M1409 | 0.8 | 3.8 | 0 | 68.9 | 1 | 4 | 0 | 1 | 0.5 | 0 | 0 | 20 | 0 | 0 |
| M1410 | 0.8 | 3 | 0 | 75.7 | 1 | 6.5 | 0 | 1.5 | 0.5 | 0 | 0 | 11 | 0 | 0 |
| M1411 | 1.8 | 2.8 | 0 | 80.9 | 1 | 6 | 0 | 2 | 0.5 | 0 | 0 | 5 | 0 | 0 |
| M1412 | 0.8 | 3.6 | 0 | 71.1 | 1 | 2 | 0 | 1 | 0.5 | 0 | 0 | 20 | 0 | 0 |
| M1413 | 0.9 | 2.3 | 0 | 76.3 | 1 | 6 | 0 | 1 | 0.5 | 0 | 0 | 12 | 0 | 0 |
| M1414 | 2 | 2.5 | 0 | 71.5 | 1 | 14 | 0 | 1 | 0.5 | 0 | 0 | 7.5 | 0 | 0 |
| M1415 | 0.8 | 1.9 | 0 | 79.8 | 1 | 6 | 0 | 1 | 0.5 | 0 | 0 | 9 | 0 | 0 |
| M1416 | 1.6 | 1.3 | 0 | 78.1 | 1 | 6.5 | 0 | 1.5 | 0.5 | 0 | 0 | 9.5 | 0 | 0 |
| M1417 | 2 | 1.7 | 0 | 74.3 | 1 | 14.5 | 0 | 2 | 0.5 | 0 | 0 | 4 | 0 | 0 |
| M1418 | 2 | 2.3 | 0 | 67.7 | 1 | 15.5 | 0 | 1 | 0.5 | 0 | 0 | 10 | 0 | 0 |
| M1419 | 1.6 | 3 | 0 | 78.4 | 1 | 7 | 0 | 1 | 0.5 | 0 | 0 | 7.5 | 0 | 0 |
| M1420 | 1.6 | 1.8 | 0 | 73.1 | 1 | 11.5 | 0 | 1 | 0.5 | 0 | 0 | 9.5 | 0 | 0 |
| M1421 | 1.5 | 2.4 | 0 | 76.1 | 1 | 10.5 | 0 | 1 | 0.5 | 0 | 0 | 7 | 0 | 0 |
| M1422 | 0.8 | 3.9 | 0 | 72.8 | 1 | 6 | 0 | 1 | 0.5 | 0 | 0 | 14 | 0 | 0 |
| M1423 | 0.8 | 3.9 | 0 | 68.8 | 1 | 6 | 0 | 1 | 0.5 | 0 | 0 | 18 | 0 | 0 |
| M1424 | 1.6 | 2.3 | 0 | 81.1 | 1 | 7.5 | 0 | 1.5 | 0.5 | 0 | 0 | 4.5 | 0 | 0 |
| M1425 | 0.8 | 2.9 | 0 | 73.3 | 1 | 6 | 0 | 1.5 | 0.5 | 0 | 0 | 14 | 0 | 0 |
| M1426 | 1.7 | 3 | 0 | 73.3 | 1 | 10 | 0 | 2 | 0.5 | 0 | 0 | 8.5 | 0 | 0 |
| M1427 | 1.6 | 2.6 | 0 | 69.3 | 1 | 7.5 | 0 | 2 | 0.5 | 0 | 0 | 15.5 | 0 | 0 |
| M1428 | 1.6 | 2.8 | 0 | 67.6 | 1 | 8.5 | 0 | 2 | 0.5 | 0 | 0 | 16 | 0 | 0 |
| M1429 | 1.7 | 1.8 | 0 | 76.5 | 1 | 12.5 | 0 | 1.5 | 0.5 | 0 | 0 | 4.5 | 0 | 0 |
| M1430 | 1.7 | 2.9 | 0 | 73.9 | 1 | 10.5 | 0 | 1 | 0.5 | 0 | 0 | 8.5 | 0 | 0 |
| M1431 | 1.7 | 2.4 | 0 | 77.4 | 1 | 9.5 | 0 | 2 | 0.5 | 0 | 0 | 5.5 | 0 | 0 |
| M1432 | 1.3 | 2.8 | 0 | 73.4 | 1 | 10.5 | 0 | 1 | 0.5 | 0 | 0 | 9.5 | 0 | 0 |
| M1433 | 2 | 3 | 0 | 63.5 | 1 | 15.5 | 0 | 1 | 0.5 | 0 | 0 | 13.5 | 0 | 0 |
| M1434 | 0.8 | 2.8 | 0 | 77.4 | 1 | 6.5 | 0 | 1 | 0.5 | 0 | 0 | 10 | 0 | 0 |
| M1435 | 0.9 | 1.1 | 0 | 84.5 | 1 | 7 | 0 | 1 | 0.5 | 0 | 0 | 4 | 0 | 0 |
| M1436 | 1.7 | 2.7 | 0 | 66.6 | 1 | 13 | 0 | 1 | 0.5 | 0 | 0 | 13.5 | 0 | 0 |
| M1437 | 0.9 | 1.3 | 0 | 83.3 | 1 | 7 | 0 | 1 | 0.5 | 0 | 0 | 5 | 0 | 0 |
| M1438 | 1.6 | 2.1 | 0 | 70.8 | 1 | 12.5 | 0 | 2 | 0.5 | 0 | 0 | 9.5 | 0 | 0 |
| M1439 | 1.7 | 2.9 | 0 | 79.9 | 1 | 6.5 | 0 | 1.5 | 0.5 | 0 | 0 | 6 | 0 | 0 |
| M1440 | 1.2 | 1.9 | 0 | 76.4 | 1 | 7.5 | 0 | 1 | 0.5 | 0 | 0 | 10.5 | 0 | 0 |
| M1441 | 2 | 3 | 0 | 81.5 | 1 | 6 | 0 | 1 | 0.5 | 0 | 0 | 5 | 0 | 0 |
| M1442 | 1.5 | 2.5 | 0 | 78 | 1 | 9 | 0 | 1 | 0.5 | 0 | 0 | 6.5 | 0 | 0 |
| M1443 | 1 | 2.6 | 0 | 78.4 | 1 | 7.5 | 0 | 1 | 0.5 | 0 | 0 | 8 | 0 | 0 |
| M1444 | 1 | 3 | 0 | 70.5 | 1 | 6 | 0 | 2 | 0.5 | 0 | 0 | 16 | 0 | 0 |
| M1445 | 0.9 | 1.6 | 0 | 81.5 | 1 | 7 | 0 | 1 | 0.5 | 0 | 0 | 6.5 | 0 | 0 |
| M1446 | 1.8 | 2.6 | 0 | 75.6 | 1 | 10.5 | 0 | 1.5 | 0.5 | 0 | 0 | 6.5 | 0 | 0 |
| M1447 | 0.8 | 2.8 | 0 | 75.4 | 1 | 6.5 | 0 | 2 | 0.5 | 0 | 0 | 11 | 0 | 0 |
| M1448 | 1.9 | 3 | 0 | 70.6 | 1 | 12.5 | 0 | 1.5 | 0.5 | 0 | 0 | 9 | 0 | 0 |
| M1449 | 1.1 | 1.1 | 0 | 81.3 | 1 | 6 | 0 | 2 | 0.5 | 0 | 0 | 7 | 0 | 0 |
| M1450 | 0.8 | 3.3 | 0 | 79.4 | 1 | 4 | 0 | 1 | 0.5 | 0 | 0 | 10 | 0 | 0 |
| M1451 | 0.9 | 3 | 0 | 73.6 | 1 | 7 | 0 | 1 | 0.5 | 0 | 0 | 13 | 0 | 0 |
| M1452 | 1 | 2.7 | 0 | 72.8 | 1 | 6 | 0 | 1.5 | 0.5 | 0 | 0 | 14.5 | 0 | 0 |
| M1453 | 1.9 | 2.1 | 0 | 71 | 1 | 7 | 0 | 2 | 0.5 | 0 | 0 | 14.5 | 0 | 0 |
| M1454 | 0.5 | 3.8 | 0 | 73.2 | 1 | 4 | 0 | 1 | 0.5 | 0 | 0 | 16 | 0 | 0 |
| M1455 | 1.5 | 2.4 | 0 | 82.6 | 1 | 6 | 0 | 2 | 0.5 | 0 | 0 | 4 | 0 | 0 |
| M1456 | 0.9 | 2.4 | 0 | 81.2 | 1 | 6 | 0 | 1.5 | 0.5 | 0 | 0 | 6.5 | 0 | 0 |
| M1457 | 1.3 | 2.6 | 0 | 76.6 | 1 | 9 | 0 | 1.5 | 0.5 | 0 | 0 | 7.5 | 0 | 0 |
| M1458 | 1.3 | 2.6 | 0 | 72.1 | 1 | 10.5 | 0 | 2 | 0.5 | 0 | 0 | 10 | 0 | 0 |
| M1459 | 1 | 2 | 0 | 77.5 | 1 | 8 | 0 | 2 | 0.5 | 0 | 0 | 8 | 0 | 0 |
| M1460 | 1 | 1.9 | 0 | 81.6 | 1 | 8 | 0 | 1 | 0.5 | 0 | 0 | 5 | 0 | 0 |
| M1461 | 1.7 | 2.8 | 0 | 81.5 | 1 | 6 | 0 | 1.5 | 0.5 | 0 | 0 | 5 | 0 | 0 |
| M1462 | 2.2 | 1.8 | 0 | 72 | 0 | 18 | 0 | 0 | 0 | 0 | 6 | 0 | 0 | 0 |
| M1463 | 1.2 | 2.8 | 0 | 71.5 | 1 | 6.5 | 0 | 1 | 0.5 | 0 | 0 | 15.5 | 0 | 0 |
| M1464 | 0.8 | 2.2 | 0 | 78.5 | 1 | 6.5 | 0 | 2 | 0.5 | 0 | 0 | 8.5 | 0 | 0 |
| M1465 | 0.8 | 2.5 | 0 | 77.7 | 1 | 6.5 | 0 | 1.5 | 0.5 | 0 | 0 | 9.5 | 0 | 0 |
| M1466 | 1.9 | 1 | 0 | 74.6 | 1 | 15 | 0 | 2 | 0.5 | 0 | 0 | 4 | 0 | 0 |
| M1467 | 1.2 | 2.8 | 0 | 72.5 | 1 | 9.5 | 0 | 1 | 0.5 | 0 | 0 | 11.5 | 0 | 0 |
| M1468 | 2 | 1.8 | 0 | 75.7 | 1 | 14 | 0 | 1 | 0.5 | 0 | 0 | 4 | 0 | 0 |
| M1469 | 1.9 | 1.2 | 0 | 77.9 | 1 | 6 | 0 | 1 | 0.5 | 0 | 0 | 10.5 | 0 | 0 |

TABLE 11-continued

Compositions and thermodynamic criteria for vanadium carbides

| ID | | | | | | | | | | | | | | |
|---|---|---|---|---|---|---|---|---|---|---|---|---|---|---|
| M1470 | 1.8 | 2.2 | 0 | 72 | 1 | 14.5 | 0 | 1 | 0.5 | 0 | 0 | 7 | 0 | 0 |
| M1471 | 2.2 | 2.8 | 0 | 63 | 0 | 18 | 2 | 0 | 0 | 0 | 0 | 12 | 0 | 0 |
| M1472 | 0.7 | 3.8 | 0 | 73 | 1 | 6 | 0 | 1 | 0.5 | 0 | 0 | 14 | 0 | 0 |
| M1473 | 1 | 2.9 | 0 | 72.1 | 1 | 6 | 0 | 1 | 0.5 | 0 | 0 | 15.5 | 0 | 0 |
| M1474 | 2 | 1.4 | 0 | 73.6 | 1 | 9 | 0 | 2 | 0.5 | 0 | 0 | 10.5 | 0 | 0 |
| M1475 | 2 | 2.2 | 0 | 66.8 | 1 | 15.5 | 0 | 1 | 0.5 | 0 | 0 | 11 | 0 | 0 |
| M1476 | 1.6 | 1.9 | 0 | 72 | 1 | 12.5 | 0 | 1.5 | 0.5 | 0 | 0 | 9 | 0 | 0 |
| M1477 | 1.8 | 1.3 | 0 | 73.9 | 1 | 12.5 | 0 | 1.5 | 0.5 | 0 | 0 | 7.5 | 0 | 0 |
| M1478 | 2.2 | 3 | 0 | 61.8 | 0 | 18 | 1 | 0 | 0 | 0 | 0 | 14 | 0 | 0 |
| M1479 | 1.7 | 2.8 | 0 | 74.5 | 1 | 10.5 | 0 | 1.5 | 0.5 | 0 | 0 | 7.5 | 0 | 0 |
| M1480 | 1.3 | 2.2 | 0 | 82.5 | 1 | 6.5 | 0 | 2 | 0.5 | 0 | 0 | 4 | 0 | 0 |
| M1481 | 1.2 | 2 | 0 | 74.8 | 1 | 9.5 | 0 | 2 | 0.5 | 0 | 0 | 9 | 0 | 0 |
| M1482 | 0.8 | 2.6 | 0 | 77.6 | 1 | 6.5 | 0 | 1 | 0.5 | 0 | 0 | 10 | 0 | 0 |
| M1483 | 0.9 | 2.4 | 0 | 76.2 | 1 | 7 | 0 | 1 | 0.5 | 0 | 0 | 11 | 0 | 0 |
| M1484 | 0.9 | 3.2 | 0 | 77.4 | 1 | 6 | 0 | 1 | 0.5 | 0 | 0 | 10 | 0 | 0 |
| M1485 | 0.8 | 3.6 | 0 | 69.1 | 1 | 6 | 0 | 1 | 0.5 | 0 | 0 | 18 | 0 | 0 |
| M1486 | 2 | 2.8 | 0 | 75.2 | 1 | 10.5 | 0 | 2 | 0.5 | 0 | 0 | 6 | 0 | 0 |
| M1487 | 1.9 | 1.1 | 0 | 78 | 0 | 11 | 0 | 0 | 0 | 0 | 0 | 8 | 0 | 0 |
| M1488 | 1.6 | 2.2 | 0 | 73.7 | 1 | 13 | 0 | 1 | 0.5 | 0 | 0 | 7 | 0 | 0 |
| M1489 | 1.7 | 2.6 | 0 | 77.7 | 1 | 9 | 0 | 2 | 0.5 | 0 | 0 | 5.5 | 0 | 0 |
| M1490 | 1.8 | 2.8 | 0 | 81.9 | 1 | 6 | 0 | 2 | 0.5 | 0 | 0 | 4 | 0 | 0 |
| M1491 | 2 | 2.1 | 0 | 77.4 | 1 | 12 | 0 | 1 | 0.5 | 0 | 0 | 4 | 0 | 0 |
| M1492 | 1.2 | 3 | 0 | 74.3 | 1 | 9 | 0 | 1.5 | 0.5 | 0 | 0 | 9.5 | 0 | 0 |
| M1493 | 1.2 | 2.6 | 0 | 73.7 | 1 | 10 | 0 | 2 | 0.5 | 0 | 0 | 9 | 0 | 0 |
| M1494 | 1.4 | 3 | 0 | 78.6 | 1 | 6.5 | 0 | 2 | 0.5 | 0 | 0 | 7 | 0 | 0 |
| M1495 | 1.2 | 2.7 | 0 | 73.1 | 1 | 10 | 0 | 2 | 0.5 | 0 | 0 | 9.5 | 0 | 0 |
| M1496 | 0.8 | 4 | 0 | 66.7 | 1 | 6 | 0 | 1 | 0.5 | 0 | 0 | 20 | 0 | 0 |
| M1497 | 2.2 | 2.8 | 0 | 63 | 0 | 18 | 0 | 0 | 0 | 0 | 0 | 14 | 0 | 0 |
| M1498 | 0.9 | 3 | 0 | 76.6 | 1 | 7 | 0 | 1.5 | 0.5 | 0 | 0 | 9.5 | 0 | 0 |
| M1499 | 1.9 | 3 | 0 | 77.1 | 1 | 9 | 0 | 1 | 0.5 | 0 | 0 | 6.5 | 0 | 0 |
| M1500 | 1.7 | 2.8 | 0 | 77.5 | 1 | 9 | 0 | 1 | 0.5 | 0 | 0 | 6.5 | 0 | 0 |
| M1501 | 1.7 | 2.2 | 0 | 71.6 | 1 | 14 | 0 | 2 | 0.5 | 0 | 0 | 7 | 0 | 0 |
| M1502 | 1.8 | 2.2 | 0 | 74 | 0 | 15 | 0 | 0 | 0 | 0 | 0.5 | 6.5 | 0 | 0 |
| M1503 | 1.2 | 2.4 | 0 | 73.9 | 1 | 9.5 | 0 | 1 | 0.5 | 0 | 0 | 10.5 | 0 | 0 |
| M1504 | 2 | 2.7 | 0 | 80.8 | 1 | 8 | 0 | 1 | 0.5 | 0 | 0 | 4 | 0 | 0 |
| M1505 | 2 | 1.5 | 0 | 73 | 1 | 16 | 0 | 1 | 0.5 | 0 | 0 | 5 | 0 | 0 |
| M1506 | 1.5 | 2.5 | 0 | 81 | 1 | 7 | 0 | 2 | 0.5 | 0 | 0 | 4.5 | 0 | 0 |
| M1507 | 1.7 | 2.4 | 0 | 67.9 | 1 | 13.5 | 0 | 2 | 0.5 | 0 | 0 | 11 | 0 | 0 |
| M1508 | 1.2 | 2.3 | 0 | 76 | 1 | 10 | 0 | 1.5 | 0.5 | 0 | 0 | 7.5 | 0 | 0 |
| M1509 | 1.2 | 2 | 0 | 80.3 | 1 | 8.5 | 0 | 2 | 0.5 | 0 | 0 | 4.5 | 0 | 0 |
| M1510 | 1.7 | 2.9 | 0 | 69.4 | 1 | 13.5 | 0 | 1.5 | 0.5 | 0 | 0 | 9.5 | 0 | 0 |
| M1511 | 1.2 | 3 | 0 | 68.3 | 1 | 8 | 0 | 2 | 0.5 | 0 | 0 | 16 | 0 | 0 |
| M1512 | 1.7 | 2.9 | 0 | 81.4 | 1 | 6 | 0 | 2 | 0.5 | 0 | 0 | 4.5 | 0 | 0 |
| M1513 | 0.8 | 3.6 | 0 | 75.1 | 1 | 6 | 0 | 1 | 0.5 | 0 | 0 | 12 | 0 | 0 |
| M1514 | 1 | 2.9 | 0 | 75.6 | 1 | 8.5 | 0 | 1 | 0.5 | 0 | 0 | 9.5 | 0 | 0 |
| M1515 | 0.2 | 4 | 0 | 75.3 | 1 | 2 | 0 | 1 | 0.5 | 0 | 0 | 16 | 0 | 0 |
| M1516 | 1 | 1 | 0 | 83.5 | 1 | 8 | 0 | 1 | 0.5 | 0 | 0 | 4 | 0 | 0 |
| M1517 | 1.9 | 1.3 | 0 | 74.3 | 1 | 10.5 | 0 | 1.5 | 0.5 | 0 | 0 | 9 | 0 | 0 |
| M1518 | 2 | 2.6 | 0 | 70.9 | 1 | 14.5 | 0 | 1 | 0.5 | 0 | 0 | 7.5 | 0 | 0 |
| M1519 | 1.7 | 0.6 | 0 | 79.2 | 1 | 12 | 0 | 1 | 0.5 | 0 | 0 | 4 | 0 | 0 |
| M1520 | 1 | 3 | 0 | 70 | 1 | 6.5 | 0 | 2 | 0.5 | 0 | 0 | 16 | 0 | 0 |
| M1521 | 0.9 | 2.2 | 0 | 77.4 | 1 | 7.5 | 0 | 2 | 0.5 | 0 | 0 | 8.5 | 0 | 0 |
| M1522 | 1.7 | 0.8 | 0 | 78 | 1 | 12 | 0 | 1 | 0.5 | 0 | 0 | 5 | 0 | 0 |
| M1523 | 1.9 | 2.1 | 0 | 69.5 | 1 | 15.5 | 0 | 2 | 0.5 | 0 | 0 | 7.5 | 0 | 0 |
| M1524 | 1.2 | 2.9 | 0 | 69.4 | 1 | 8 | 0 | 1.5 | 0.5 | 0 | 0 | 15.5 | 0 | 0 |
| M1525 | 1.8 | 1.5 | 0 | 74.7 | 1 | 14.5 | 0 | 1 | 0.5 | 0 | 0 | 5 | 0 | 0 |
| M1526 | 0.7 | 4 | 0 | 70.8 | 1 | 6 | 0 | 1 | 0.5 | 0 | 0 | 16 | 0 | 0 |
| M1527 | 1 | 2.8 | 0 | 75.7 | 1 | 8.5 | 0 | 1 | 0.5 | 0 | 0 | 9.5 | 0 | 0 |
| M1528 | 1.8 | 2.7 | 0 | 68 | 1 | 15 | 0 | 2 | 0.5 | 0 | 0 | 9 | 0 | 0 |
| M1529 | 1.3 | 2.6 | 0 | 75.1 | 1 | 10.5 | 0 | 1 | 0.5 | 0 | 0 | 8 | 0 | 0 |
| M1530 | 0.9 | 1.8 | 0 | 83.8 | 1 | 7 | 0 | 1 | 0.5 | 0 | 0 | 4 | 0 | 0 |
| M1531 | 0.8 | 2.1 | 0 | 77.1 | 1 | 6 | 0 | 1.5 | 0.5 | 0 | 0 | 11 | 0 | 0 |
| M1532 | 0.8 | 3 | 0 | 71.2 | 1 | 6 | 0 | 2 | 0.5 | 0 | 0 | 15.5 | 0 | 0 |
| M1533 | 2 | 3 | 0 | 65.5 | 1 | 16 | 0 | 2 | 0.5 | 0 | 0 | 10 | 0 | 0 |
| M1534 | 1.2 | 1.7 | 0 | 76.1 | 1 | 9.5 | 0 | 1.5 | 0.5 | 0 | 0 | 8.5 | 0 | 0 |
| M1535 | 1.9 | 1.8 | 0 | 73.8 | 1 | 15 | 0 | 1.5 | 0.5 | 0 | 0 | 4.5 | 0 | 0 |
| M1536 | 1.2 | 3 | 0 | 72.3 | 1 | 10 | 0 | 1 | 0.5 | 0 | 0 | 11 | 0 | 0 |
| M1537 | 0.8 | 2.6 | 0 | 76.6 | 1 | 6.5 | 0 | 1 | 0.5 | 0 | 0 | 11 | 0 | 0 |
| M1538 | 1.5 | 2.4 | 0 | 80.6 | 1 | 8 | 0 | 1.5 | 0.5 | 0 | 0 | 4.5 | 0 | 0 |
| M1539 | 1.9 | 3 | 0 | 78.6 | 1 | 8 | 0 | 2 | 0.5 | 0 | 0 | 5 | 0 | 0 |
| M1540 | 0.8 | 1.7 | 0 | 81.5 | 1 | 6.5 | 0 | 1 | 0.5 | 0 | 0 | 7 | 0 | 0 |
| M1541 | 1.5 | 3 | 0 | 79.5 | 1 | 6.5 | 0 | 2 | 0.5 | 0 | 0 | 6 | 0 | 0 |
| M1542 | 1.8 | 2.9 | 0 | 82.8 | 1 | 6 | 0 | 1 | 0.5 | 0 | 0 | 4 | 0 | 0 |
| M1543 | 1.9 | 1.8 | 0 | 74.3 | 1 | 15 | 0 | 1 | 0.5 | 0 | 0 | 4.5 | 0 | 0 |
| M1544 | 1.2 | 2.8 | 0 | 77 | 1 | 8.5 | 0 | 1 | 0.5 | 0 | 0 | 8 | 0 | 0 |
| M1545 | 0.3 | 3.5 | 0 | 73.7 | 1 | 2 | 0 | 1 | 0.5 | 0 | 0 | 18 | 0 | 0 |
| M1546 | 1.3 | 2.7 | 0 | 80 | 1 | 7 | 0 | 1.5 | 0.5 | 0 | 0 | 6 | 0 | 0 |
| M1547 | 1.7 | 2.8 | 0 | 83 | 1 | 6 | 0 | 1 | 0.5 | 0 | 0 | 4 | 0 | 0 |

TABLE 11-continued

Compositions and thermodynamic criteria for vanadium carbides

| | | | | | | | | | | | | | | |
|---|---|---|---|---|---|---|---|---|---|---|---|---|---|---|
| M1548 | 1.7 | 2.8 | 0 | 80.5 | 1 | 7.5 | 0 | 1 | 0.5 | 0 | 0 | 5 | 0 | 0 |
| M1549 | 1 | 2.9 | 0 | 71.6 | 1 | 6.5 | 0 | 1 | 0.5 | 0 | 0 | 15.5 | 0 | 0 |
| M1550 | 1.3 | 2.3 | 0 | 80.9 | 1 | 7.5 | 0 | 2 | 0.5 | 0 | 0 | 4.5 | 0 | 0 |
| M1551 | 1.3 | 2.2 | 0 | 75 | 1 | 11 | 0 | 2 | 0.5 | 0 | 0 | 7 | 0 | 0 |
| M1552 | 0.8 | 2.6 | 0 | 74.6 | 1 | 6 | 0 | 1 | 0.5 | 0 | 0 | 13.5 | 0 | 0 |
| M1553 | 1.6 | 1.3 | 0 | 75.6 | 1 | 13 | 0 | 2 | 0.5 | 0 | 0 | 5 | 0 | 0 |
| M1554 | 0.8 | 3 | 0 | 77.7 | 1 | 6 | 0 | 2 | 0.5 | 0 | 0 | 9 | 0 | 0 |
| M1555 | 1.5 | 1.7 | 0 | 72.8 | 1 | 12 | 0 | 2 | 0.5 | 0 | 0 | 8.5 | 0 | 0 |
| M1556 | 0.8 | 2.7 | 0 | 74 | 1 | 6 | 0 | 1 | 0.5 | 0 | 0 | 14 | 0 | 0 |
| M1557 | 1.3 | 2.2 | 0 | 72 | 1 | 10 | 0 | 1.5 | 0.5 | 0 | 0 | 11.5 | 0 | 0 |
| M1558 | 1.8 | 2.8 | 0 | 71.4 | 1 | 13 | 0 | 1.5 | 0.5 | 0 | 0 | 8 | 0 | 0 |
| M1559 | 1.1 | 1.6 | 0 | 78.3 | 1 | 6.5 | 0 | 1.5 | 0.5 | 0 | 0 | 9.5 | 0 | 0 |
| M1560 | 1.7 | 2.7 | 0 | 66.6 | 1 | 12 | 0 | 1 | 0.5 | 0 | 0 | 14.5 | 0 | 0 |
| M1561 | 0.7 | 2 | 0 | 80.3 | 1 | 6 | 0 | 2 | 0.5 | 0 | 0 | 7.5 | 0 | 0 |
| M1562 | 0.8 | 2.6 | 0 | 76.1 | 1 | 6.5 | 0 | 1 | 0.5 | 0 | 0 | 11.5 | 0 | 0 |
| M1563 | 0.7 | 3.9 | 0 | 70.9 | 1 | 6 | 0 | 1 | 0.5 | 0 | 0 | 16 | 0 | 0 |
| M1564 | 1.5 | 2.1 | 0 | 73.9 | 1 | 6.5 | 0 | 1 | 0.5 | 0 | 0 | 13.5 | 0 | 0 |
| M1565 | 1 | 2 | 0 | 76 | 1 | 8 | 0 | 1.5 | 0.5 | 0 | 0 | 10 | 0 | 0 |
| M1566 | 0.8 | 2.7 | 0 | 75.5 | 1 | 6.5 | 0 | 1 | 0.5 | 0 | 0 | 12 | 0 | 0 |
| M1567 | 1.6 | 2.6 | 0 | 79.8 | 1 | 8 | 0 | 2 | 0.5 | 0 | 0 | 4.5 | 0 | 0 |
| M1568 | 1.8 | 2.2 | 0 | 72.5 | 0 | 15 | 2.5 | 0 | 0 | 0 | 1 | 5 | 0 | 0 |
| M1569 | 1.3 | 3 | 0 | 67.2 | 1 | 10 | 0 | 1.5 | 0.5 | 0 | 0 | 15.5 | 0 | 0 |
| M1570 | 0.9 | 1.9 | 0 | 77.2 | 1 | 7 | 0 | 1.5 | 0.5 | 0 | 0 | 10 | 0 | 0 |
| M1571 | 0.8 | 3.3 | 0 | 71.4 | 1 | 4 | 0 | 1 | 0.5 | 0 | 0 | 18 | 0 | 0 |
| M1572 | 1.1 | 2.9 | 0 | 74.5 | 1 | 9.5 | 0 | 1 | 0.5 | 0 | 0 | 9.5 | 0 | 0 |
| M1573 | 0.9 | 1.7 | 0 | 78.9 | 1 | 6 | 0 | 1.5 | 0.5 | 0 | 0 | 9.5 | 0 | 0 |
| M1574 | 1.6 | 1.7 | 0 | 77.2 | 1 | 13 | 0 | 1 | 0.5 | 0 | 0 | 4 | 0 | 0 |
| M1575 | 0.8 | 3.5 | 0 | 71.2 | 1 | 2 | 0 | 1 | 0.5 | 0 | 0 | 20 | 0 | 0 |
| M1576 | 2 | 2.9 | 0 | 78.6 | 1 | 9 | 0 | 1.5 | 0.5 | 0 | 0 | 4.5 | 0 | 0 |
| M1577 | 0.8 | 3.7 | 0 | 69 | 1 | 4 | 0 | 1 | 0.5 | 0 | 0 | 20 | 0 | 0 |
| M1578 | 0.8 | 3.9 | 0 | 66.8 | 1 | 6 | 0 | 1 | 0.5 | 0 | 0 | 20 | 0 | 0 |
| M1579 | 1.9 | 2.8 | 0 | 75.3 | 1 | 11 | 0 | 1.5 | 0.5 | 0 | 0 | 6 | 0 | 0 |
| M1580 | 0.5 | 2.9 | 0 | 76.1 | 1 | 4 | 0 | 1 | 0.5 | 0 | 0 | 14 | 0 | 0 |
| M1581 | 1.7 | 2.5 | 0 | 67.8 | 1 | 13.5 | 0 | 1 | 0.5 | 0 | 0 | 12 | 0 | 0 |
| M1582 | 1.6 | 1.7 | 0 | 72.7 | 1 | 11.5 | 0 | 1.5 | 0.5 | 0 | 0 | 9.5 | 0 | 0 |
| M1583 | 0.9 | 2.4 | 0 | 75.2 | 1 | 7.5 | 0 | 2 | 0.5 | 0 | 0 | 10.5 | 0 | 0 |
| M1584 | 1.7 | 2.6 | 0 | 75.2 | 1 | 11.5 | 0 | 1 | 0.5 | 0 | 0 | 6.5 | 0 | 0 |
| M1585 | 0.4 | 3.4 | 0 | 73.7 | 1 | 2 | 0 | 1 | 0.5 | 0 | 0 | 18 | 0 | 0 |
| M1586 | 0.5 | 3.3 | 0 | 73.7 | 1 | 4 | 0 | 1 | 0.5 | 0 | 0 | 16 | 0 | 0 |
| M1587 | 2.4 | 1.6 | 0 | 70 | 0 | 18 | 0 | 0 | 0 | 0 | 8 | 0 | 0 | 0 |
| M1588 | 1.4 | 3 | 0 | 73.6 | 1 | 10.5 | 0 | 1 | 0.5 | 0 | 0 | 9 | 0 | 0 |
| M1589 | 0.9 | 2.3 | 0 | 75.3 | 1 | 7 | 0 | 1 | 0.5 | 0 | 0 | 12 | 0 | 0 |
| M1590 | 2 | 2.9 | 0 | 61.6 | 1 | 16 | 0 | 2 | 0.5 | 0 | 0 | 14 | 0 | 0 |
| M1591 | 1.9 | 1.6 | 0 | 72 | 1 | 15.5 | 0 | 1.5 | 0.5 | 0 | 0 | 6 | 0 | 0 |
| M1592 | 1 | 2.6 | 0 | 74.9 | 1 | 8.5 | 0 | 1.5 | 0.5 | 0 | 0 | 10 | 0 | 0 |
| M1593 | 1.7 | 3 | 0 | 74.8 | 1 | 10.5 | 0 | 1 | 0.5 | 0 | 0 | 7.5 | 0 | 0 |
| M1594 | 0.8 | 3 | 0 | 76.2 | 1 | 7 | 0 | 2 | 0.5 | 0 | 0 | 9.5 | 0 | 0 |
| M1595 | 0.8 | 2.4 | 0 | 79.8 | 1 | 7 | 0 | 1 | 0.5 | 0 | 0 | 7.5 | 0 | 0 |
| M1596 | 1.8 | 2.2 | 0 | 72 | 0 | 15 | 5 | 0 | 0 | 0 | 0.5 | 3.5 | 0 | 0 |
| M1597 | 1 | 2.6 | 0 | 73.9 | 1 | 8.5 | 0 | 2 | 0.5 | 0 | 0 | 10.5 | 0 | 0 |
| M1598 | 1.3 | 2.2 | 0 | 77.5 | 1 | 10 | 0 | 2 | 0.5 | 0 | 0 | 5.5 | 0 | 0 |
| M1599 | 1.6 | 2.8 | 0 | 72.6 | 1 | 12 | 0 | 1.5 | 0.5 | 0 | 0 | 8 | 0 | 0 |
| M1600 | 1.8 | 2.8 | 0 | 65.4 | 1 | 12 | 0 | 1 | 0.5 | 0 | 0 | 15.5 | 0 | 0 |
| M1601 | 1.5 | 2.6 | 0 | 81.4 | 1 | 7 | 0 | 2 | 0.5 | 0 | 0 | 4 | 0 | 0 |
| M1602 | 2.4 | 2.8 | 0 | 64.8 | 0 | 20 | 0 | 0 | 0 | 0 | 10 | 0 | 0 | 0 |
| M1603 | 1 | 2.6 | 0 | 72.4 | 1 | 6 | 0 | 2 | 0.5 | 0 | 0 | 14.5 | 0 | 0 |
| M1604 | 1.7 | 2.9 | 0 | 82.4 | 1 | 6.5 | 0 | 1 | 0.5 | 0 | 0 | 4 | 0 | 0 |
| M1605 | 1.6 | 2 | 0 | 73.9 | 1 | 13.5 | 0 | 2 | 0.5 | 0 | 0 | 5.5 | 0 | 0 |
| M1606 | 2 | 2.2 | 0 | 73.3 | 1 | 14.5 | 0 | 1.5 | 0.5 | 0 | 0 | 5 | 0 | 0 |
| M1607 | 0.5 | 3.2 | 0 | 73.8 | 1 | 4 | 0 | 1 | 0.5 | 0 | 0 | 16 | 0 | 0 |
| M1608 | 1.9 | 1.6 | 0 | 70.5 | 1 | 14 | 0 | 1.5 | 0.5 | 0 | 0 | 9 | 0 | 0 |
| M1609 | 1.9 | 2.7 | 0 | 64.9 | 1 | 11 | 0 | 2 | 0.5 | 0 | 0 | 16 | 0 | 0 |
| M1610 | 1.5 | 2.9 | 0 | 81.6 | 1 | 6.5 | 0 | 1 | 0.5 | 0 | 0 | 5 | 0 | 0 |
| M1611 | 2.4 | 2.4 | 0 | 67.2 | 0 | 20 | 0 | 0 | 0 | 0 | 8 | 0 | 0 | 0 |
| M1612 | 1.6 | 2.9 | 0 | 65.5 | 1 | 13 | 0 | 2 | 0.5 | 0 | 0 | 13.5 | 0 | 0 |
| M1613 | 1.6 | 3 | 0 | 78.9 | 1 | 8 | 0 | 1 | 0.5 | 0 | 0 | 6 | 0 | 0 |
| M1614 | 1.7 | 2.9 | 0 | 70.9 | 1 | 13 | 0 | 1.5 | 0.5 | 0 | 0 | 8.5 | 0 | 0 |
| M1615 | 1.3 | 3 | 0 | 66.7 | 1 | 10.5 | 0 | 2 | 0.5 | 0 | 0 | 15 | 0 | 0 |
| M1616 | 1.7 | 2.9 | 0 | 63.4 | 1 | 13.5 | 0 | 2 | 0.5 | 0 | 0 | 15 | 0 | 0 |
| M1617 | 1.2 | 2.2 | 0 | 74.1 | 1 | 7.5 | 0 | 1 | 0.5 | 0 | 0 | 12.5 | 0 | 0 |
| M1618 | 1.5 | 1.3 | 0 | 78.2 | 1 | 6 | 0 | 1.5 | 0.5 | 0 | 0 | 10 | 0 | 0 |
| M1619 | 1.7 | 2.6 | 0 | 74.7 | 1 | 12 | 0 | 1 | 0.5 | 0 | 0 | 6.5 | 0 | 0 |
| M1620 | 1.6 | 2 | 0 | 73.9 | 1 | 13.5 | 0 | 1.5 | 0.5 | 0 | 0 | 6 | 0 | 0 |
| M1621 | 1.3 | 2.5 | 0 | 81.2 | 1 | 7 | 0 | 2 | 0.5 | 0 | 0 | 4.5 | 0 | 0 |
| M1622 | 1.3 | 1.45 | 0 | 78.7 | 1 | 10.5 | 0 | 0 | 0.5 | 0 | 0 | 6.55 | 0 | 0 |
| M1623 | 1.5 | 1.7 | 0 | 75.3 | 1 | 7 | 0 | 1.5 | 0.5 | 0 | 0 | 11.5 | 0 | 0 |
| M1624 | 1.5 | 2.1 | 0 | 72.9 | 1 | 7 | 0 | 1.5 | 0.5 | 0 | 0 | 13.5 | 0 | 0 |
| M1625 | 0.5 | 4 | 0 | 69 | 1 | 4 | 0 | 1 | 0.5 | 0 | 0 | 20 | 0 | 0 |

TABLE 11-continued

Compositions and thermodynamic criteria for vanadium carbides

| ID | c1 | c2 | c3 | c4 | c5 | c6 | c7 | c8 | c9 | c10 | c11 | c12 | c13 | c14 |
|---|---|---|---|---|---|---|---|---|---|---|---|---|---|---|
| M1626 | 2 | 2.5 | 0 | 77.5 | 1 | 11.5 | 0 | 1 | 0.5 | 0 | 0 | 4 | 0 | 0 |
| M1627 | 2.4 | 2 | 0 | 69.6 | 0 | 20 | 0 | 0 | 0 | 0 | 6 | 0 | 0 | 0 |
| M1628 | 2 | 2.8 | 0 | 77.7 | 1 | 10.5 | 0 | 1 | 0.5 | 0 | 0 | 4.5 | 0 | 0 |
| M1629 | 1.5 | 2.5 | 0 | 71 | 1 | 6 | 0 | 1.5 | 0.5 | 0 | 0 | 16 | 0 | 0 |
| M1630 | 2 | 2.6 | 0 | 77.9 | 1 | 11 | 0 | 1 | 0.5 | 0 | 0 | 4 | 0 | 0 |
| M1631 | 2.4 | 2.6 | 0 | 67 | 0 | 20 | 0 | 0 | 0 | 0 | 8 | 0 | 0 | 0 |
| M1632 | 2 | 2.5 | 0 | 65 | 1 | 16.5 | 0 | 2 | 0.5 | 0 | 0 | 10.5 | 0 | 0 |
| M1633 | 1.3 | 1.1 | 0 | 79.1 | 1 | 9.5 | 0 | 1 | 0.5 | 0 | 0 | 6.5 | 0 | 0 |
| M1634 | 1.6 | 1.2 | 0 | 75.7 | 1 | 13 | 0 | 1 | 0.5 | 0 | 0 | 6 | 0 | 0 |
| M1635 | 2 | 1.5 | 0 | 72.5 | 1 | 16.5 | 0 | 1 | 0.5 | 0 | 0 | 5 | 0 | 0 |
| M1636 | 2.2 | 2.2 | 0 | 71.6 | 0 | 18 | 0 | 0 | 0 | 0 | 6 | 0 | 0 | 0 |
| M1637 | 0.5 | 3.9 | 0 | 69.1 | 1 | 4 | 0 | 1 | 0.5 | 0 | 0 | 20 | 0 | 0 |
| M1638 | 2.2 | 3 | 0 | 66.8 | 0 | 18 | 0 | 0 | 0 | 0 | 0 | 10 | 0 | 0 |
| M1639 | 2 | 1.4 | 0 | 75.1 | 1 | 7 | 0 | 1 | 0.5 | 0 | 0 | 12 | 0 | 0 |
| M1640 | 1.2 | 2.5 | 0 | 81.8 | 1 | 6.5 | 0 | 2 | 0.5 | 0 | 0 | 4.5 | 0 | 0 |
| M1641 | 2.4 | 1.6 | 0 | 72 | 0 | 14 | 0 | 0 | 0 | 0 | 10 | 0 | 0 | 0 |
| M1642 | 1.4 | 1.45 | 0 | 77.6 | 1.5 | 10.5 | 0 | 0 | 1 | 0 | 0 | 6.55 | 0 | 0 |
| M1643 | 1.9 | 2 | 0 | 72.1 | 1 | 16 | 0 | 1 | 0.5 | 0 | 0 | 5.5 | 0 | 0 |
| M1644 | 0.8 | 2 | 0 | 81.7 | 1 | 7 | 0 | 2 | 0.5 | 0 | 0 | 5 | 0 | 0 |
| M1645 | 1 | 2 | 0 | 77 | 1 | 8.5 | 0 | 2 | 0.5 | 0 | 0 | 8 | 0 | 0 |
| M1646 | 1.7 | 2.7 | 0 | 66.6 | 1 | 14 | 0 | 1.5 | 0.5 | 0 | 0 | 12 | 0 | 0 |
| M1647 | 1 | 1.9 | 0 | 81.6 | 1 | 8.5 | 0 | 1 | 0.5 | 0 | 0 | 4.5 | 0 | 0 |
| M1648 | 0.9 | 2.8 | 0 | 71.8 | 1 | 6.5 | 0 | 1.5 | 0.5 | 0 | 0 | 15 | 0 | 0 |
| M1649 | 1.3 | 2.9 | 0 | 79.8 | 1 | 7 | 0 | 1.5 | 0.5 | 0 | 0 | 6 | 0 | 0 |
| M1650 | 0.7 | 4 | 0 | 68.8 | 1 | 6 | 0 | 1 | 0.5 | 0 | 0 | 18 | 0 | 0 |
| M1651 | 1.7 | 1 | 0 | 76.8 | 1 | 14 | 0 | 1 | 0.5 | 0 | 0 | 4 | 0 | 0 |
| M1652 | 1.2 | 2.1 | 0 | 79.7 | 1 | 9.5 | 0 | 1 | 0.5 | 0 | 0 | 5 | 0 | 0 |
| M1653 | 1.8 | 1.6 | 0 | 73.1 | 1 | 10.5 | 0 | 1 | 0.5 | 0 | 0 | 10.5 | 0 | 0 |
| M1654 | 2.2 | 1.8 | 0 | 69 | 0 | 16 | 1 | 0 | 0 | 0 | 0 | 10 | 0 | 0 |
| M1655 | 1.8 | 2.2 | 0 | 69.5 | 0 | 15 | 8 | 0 | 0 | 0 | 0 | 3.5 | 0 | 0 |
| M1656 | 0.9 | 2.2 | 0 | 76.4 | 1 | 7.5 | 0 | 1 | 0.5 | 0 | 0 | 10.5 | 0 | 0 |
| M1657 | 1.8 | 0.6 | 0 | 79.6 | 0 | 14 | 0 | 0 | 0 | 0 | 0 | 4 | 0 | 0 |
| M1658 | 1.9 | 3 | 0 | 61.6 | 1 | 15.5 | 0 | 2 | 0.5 | 0 | 0 | 14.5 | 0 | 0 |
| M1659 | 1.6 | 2.6 | 0 | 80.3 | 1 | 8.5 | 0 | 1.5 | 0.5 | 0 | 0 | 4 | 0 | 0 |
| M1660 | 2 | 3 | 0 | 79 | 1 | 9.5 | 0 | 1 | 0.5 | 0 | 0 | 4 | 0 | 0 |
| M1661 | 1.4 | 2.6 | 0 | 78 | 1 | 9 | 0 | 2 | 0.5 | 0 | 0 | 5.5 | 0 | 0 |
| M1662 | 1.3 | 2.6 | 0 | 81.1 | 1 | 7 | 0 | 2 | 0.5 | 0 | 0 | 4.5 | 0 | 0 |
| M1663 | 2 | 1.1 | 0 | 72.9 | 1 | 16.5 | 0 | 1.5 | 0.5 | 0 | 0 | 4.5 | 0 | 0 |
| M1664 | 2 | 3 | 0 | 61.5 | 1 | 16.5 | 0 | 2 | 0.5 | 0 | 0 | 13.5 | 0 | 0 |
| M1665 | 1.8 | 2.2 | 0 | 72 | 0 | 15 | 6 | 0 | 0 | 0 | 0.5 | 2.5 | 0 | 0 |
| M1666 | 1.2 | 2.9 | 0 | 72.4 | 1 | 10.5 | 0 | 1.5 | 0.5 | 0 | 0 | 10 | 0 | 0 |
| M1667 | 2.2 | 0.7 | 0 | 73.6 | 1 | 18 | 0 | 1 | 0.5 | 0 | 0 | 3 | 0 | 0 |
| M1668 | 1.2 | 2.6 | 0 | 70.7 | 1 | 8 | 0 | 1.5 | 0.5 | 0 | 0 | 14.5 | 0 | 0 |
| M1669 | 2.4 | 2.2 | 0 | 67.4 | 0 | 20 | 0 | 0 | 0 | 0 | 8 | 0 | 0 | 0 |
| M1670 | 0.7 | 2.2 | 0 | 82.6 | 1 | 6 | 0 | 1.5 | 0.5 | 0 | 0 | 5.5 | 0 | 0 |
| M1671 | 0.7 | 3 | 0 | 73.8 | 1 | 6 | 0 | 1 | 0.5 | 0 | 0 | 14 | 0 | 0 |
| M1672 | 0.9 | 2.4 | 0 | 74.7 | 1 | 7.5 | 0 | 1 | 0.5 | 0 | 0 | 12 | 0 | 0 |
| M1673 | 0.8 | 2.9 | 0 | 71.3 | 1 | 6 | 0 | 2 | 0.5 | 0 | 0 | 15.5 | 0 | 0 |
| M1674 | 2.2 | 0.9 | 0 | 72.4 | 1 | 18 | 0 | 1 | 0.5 | 0 | 0 | 4 | 0 | 0 |
| M1675 | 1 | 1.8 | 0 | 77.2 | 1 | 6.5 | 0 | 1.5 | 0.5 | 0 | 0 | 10.5 | 0 | 0 |
| M1676 | 1.6 | 1.6 | 0 | 75.8 | 1 | 13.5 | 0 | 2 | 0.5 | 0 | 0 | 4 | 0 | 0 |
| M1677 | 0.8 | 2.6 | 0 | 73.1 | 1 | 6 | 0 | 2 | 0.5 | 0 | 0 | 14 | 0 | 0 |
| M1678 | 2.4 | 2.6 | 0 | 65 | 0 | 20 | 0 | 0 | 0 | 0 | 10 | 0 | 0 | 0 |
| M1679 | 1.6 | 2.7 | 0 | 77.7 | 1 | 10 | 0 | 1 | 0.5 | 0 | 0 | 5.5 | 0 | 0 |
| M1680 | 0.8 | 3 | 0 | 70.7 | 1 | 6 | 0 | 2 | 0.5 | 0 | 0 | 16 | 0 | 0 |
| M1681 | 1 | 2.8 | 0 | 71.2 | 1 | 6.5 | 0 | 1.5 | 0.5 | 0 | 0 | 15.5 | 0 | 0 |
| M1682 | 2.4 | 1.8 | 0 | 69.8 | 0 | 20 | 0 | 0 | 0 | 0 | 6 | 0 | 0 | 0 |
| M1683 | 1.9 | 1.6 | 0 | 71.5 | 1 | 12.5 | 0 | 1 | 0.5 | 0 | 0 | 10 | 0 | 0 |
| M1684 | 0.3 | 3.4 | 0 | 73.8 | 1 | 2 | 0 | 1 | 0.5 | 0 | 0 | 18 | 0 | 0 |
| M1685 | 1.8 | 2.4 | 0 | 67.3 | 1 | 15 | 0 | 1.5 | 0.5 | 0 | 0 | 10.5 | 0 | 0 |
| M1686 | 1.9 | 2.7 | 0 | 65.4 | 1 | 11.5 | 0 | 1 | 0.5 | 0 | 0 | 16 | 0 | 0 |
| M1687 | 0.8 | 1.9 | 0 | 77.3 | 1 | 6 | 0 | 2 | 0.5 | 0 | 0 | 10.5 | 0 | 0 |
| M1688 | 1.4 | 2.6 | 0 | 76 | 1 | 10.5 | 0 | 1.5 | 0.5 | 0 | 0 | 6.5 | 0 | 0 |
| M1689 | 0.8 | 3.4 | 0 | 71.3 | 1 | 2 | 0 | 1 | 0.5 | 0 | 0 | 20 | 0 | 0 |
| M1690 | 0.9 | 2.6 | 0 | 76.5 | 1 | 8 | 0 | 2 | 0.5 | 0 | 0 | 8.5 | 0 | 0 |
| M1691 | 0.8 | 3.6 | 0 | 69.1 | 1 | 4 | 0 | 1 | 0.5 | 0 | 0 | 20 | 0 | 0 |
| M1692 | 1.2 | 2.7 | 0 | 78.1 | 1 | 8.5 | 0 | 1.5 | 0.5 | 0 | 0 | 6.5 | 0 | 0 |
| M1693 | 0.8 | 3.4 | 0 | 69.3 | 1 | 6 | 0 | 1 | 0.5 | 0 | 0 | 18 | 0 | 0 |
| M1694 | 0.9 | 2.3 | 0 | 82.3 | 1 | 6.5 | 0 | 1.5 | 0.5 | 0 | 0 | 5 | 0 | 0 |
| M1695 | 1.25 | 1.5 | 0 | 79.2 | 0 | 10.5 | 0 | 0 | 1 | 0 | 0 | 6.55 | 0 | 0 |
| M1696 | 2 | 2.9 | 0 | 61.1 | 1 | 16.5 | 0 | 2 | 0.5 | 0 | 0 | 14 | 0 | 0 |
| M1697 | 1.6 | 3 | 0 | 77.4 | 1 | 9 | 0 | 2 | 0.5 | 0 | 0 | 5.5 | 0 | 0 |
| M1698 | 1.5 | 2.7 | 0 | 67.8 | 1 | 10.5 | 0 | 1 | 0.5 | 0 | 0 | 15 | 0 | 0 |
| M1699 | 1.8 | 1 | 0 | 74.7 | 1 | 15 | 0 | 2 | 0.5 | 0 | 0 | 4 | 0 | 0 |
| M1700 | 1.6 | 2 | 0 | 69.9 | 1 | 11.5 | 0 | 2 | 0.5 | 0 | 0 | 11.5 | 0 | 0 |
| M1701 | 1.25 | 1.5 | 0 | 78.2 | 1 | 10.5 | 0 | 0 | 1 | 0 | 0 | 6.55 | 0 | 0 |
| M1702 | 1 | 2.8 | 0 | 80.7 | 1 | 6 | 0 | 2 | 0.5 | 0 | 0 | 6 | 0 | 0 |
| M1703 | 1.8 | 2.2 | 0 | 67.5 | 0 | 15 | 8 | 0 | 0 | 0 | 0 | 5.5 | 0 | 0 |

TABLE 11-continued

Compositions and thermodynamic criteria for vanadium carbides

| | | | | | | | | | | | | | | |
|---|---|---|---|---|---|---|---|---|---|---|---|---|---|---|
| M1704 | 1.3 | 2.5 | 0 | 80.2 | 1 | 8 | 0 | 2 | 0.5 | 0 | 0 | 4.5 | 0 | 0 |
| M1705 | 1.3 | 1.3 | 0 | 78.4 | 1 | 8 | 0 | 1 | 0.5 | 0 | 0 | 8.5 | 0 | 0 |
| M1706 | 1.4 | 2.8 | 0 | 78.3 | 1 | 8.5 | 0 | 2 | 0.5 | 0 | 0 | 5.5 | 0 | 0 |
| M1707 | 1.5 | 2.9 | 0 | 75.6 | 1 | 10 | 0 | 2 | 0.5 | 0 | 0 | 6.5 | 0 | 0 |
| M1708 | 1.8 | 2.2 | 0 | 72.5 | 0 | 15 | 5.5 | 0 | 0 | 0 | 0 | 3 | 0 | 0 |
| M1709 | 1.8 | 2.2 | 0 | 67 | 0 | 15 | 10 | 0 | 0 | 0 | 0 | 4 | 0 | 0 |
| M1710 | 1.7 | 3 | 0 | 74.8 | 1 | 11 | 0 | 1.5 | 0.5 | 0 | 0 | 6.5 | 0 | 0 |
| M1711 | 2.4 | 2.2 | 0 | 69.4 | 0 | 20 | 0 | 0 | 0 | 0 | 6 | 0 | 0 | 0 |
| M1712 | 1.7 | 3 | 0 | 76.3 | 1 | 10 | 0 | 2 | 0.5 | 0 | 0 | 5.5 | 0 | 0 |
| M1713 | 1.8 | 2.8 | 0 | 77.9 | 1 | 10 | 0 | 2 | 0.5 | 0 | 0 | 4 | 0 | 0 |
| M1714 | 1.8 | 2.2 | 0 | 67 | 0 | 15 | 9 | 0 | 0 | 0 | 0 | 5 | 0 | 0 |
| M1715 | 1.5 | 2.9 | 0 | 76.1 | 1 | 10 | 0 | 1.5 | 0.5 | 0 | 0 | 6.5 | 0 | 0 |
| M1716 | 0.7 | 2.8 | 0 | 74 | 1 | 6 | 0 | 1 | 0.5 | 0 | 0 | 14 | 0 | 0 |
| M1717 | 2.1 | 2.9 | 0 | 64 | 1 | 18 | 0 | 1 | 0.5 | 0 | 0 | 10.5 | 0 | 0 |
| M1718 | 0.9 | 2.2 | 0 | 74.9 | 1 | 6 | 0 | 2 | 0.5 | 0 | 0 | 12.5 | 0 | 0 |
| M1719 | 1.7 | 2.8 | 0 | 75 | 1 | 11.5 | 0 | 1.5 | 0.5 | 0 | 0 | 6 | 0 | 0 |
| M1720 | 1.8 | 3 | 0 | 79.7 | 1 | 9 | 0 | 1 | 0.5 | 0 | 0 | 4 | 0 | 0 |
| M1721 | 1.8 | 2.7 | 0 | 65 | 1 | 13 | 0 | 1 | 0.5 | 0 | 0 | 15 | 0 | 0 |
| M1722 | 1.9 | 1.9 | 0 | 69.7 | 1 | 16 | 0 | 1.5 | 0.5 | 0 | 0 | 7.5 | 0 | 0 |
| M1723 | 1.6 | 2.2 | 0 | 76.2 | 1 | 12.5 | 0 | 1 | 0.5 | 0 | 0 | 5 | 0 | 0 |
| M1724 | 1.9 | 2.7 | 0 | 73.9 | 1 | 13 | 0 | 1.5 | 0.5 | 0 | 0 | 5.5 | 0 | 0 |
| M1725 | 1.5 | 3 | 0 | 79 | 1 | 8 | 0 | 2 | 0.5 | 0 | 0 | 5 | 0 | 0 |
| M1726 | 1.6 | 2.5 | 0 | 77.9 | 1 | 10.5 | 0 | 1.5 | 0.5 | 0 | 0 | 4.5 | 0 | 0 |
| M1727 | 1.3 | 2.7 | 0 | 77.5 | 1 | 9.5 | 0 | 1 | 0.5 | 0 | 0 | 6.5 | 0 | 0 |
| M1728 | 2.4 | 1.6 | 0 | 70 | 0 | 20 | 0 | 0 | 0 | 0 | 6 | 0 | 0 | 0 |
| M1729 | 0.9 | 2.3 | 0 | 74.8 | 1 | 7 | 0 | 1 | 0.5 | 0 | 0 | 12.5 | 0 | 0 |
| M1730 | 1.9 | 1.7 | 0 | 72.4 | 1 | 7 | 0 | 2 | 0.5 | 0 | 0 | 13.5 | 0 | 0 |
| M1731 | 1.4 | 2.5 | 0 | 79.6 | 1 | 9 | 0 | 1.5 | 0.5 | 0 | 0 | 4.5 | 0 | 0 |
| M1732 | 2.4 | 2 | 0 | 67.6 | 0 | 20 | 0 | 0 | 0 | 0 | 8 | 0 | 0 | 0 |
| M1733 | 0.7 | 4 | 0 | 66.8 | 1 | 6 | 0 | 1 | 0.5 | 0 | 0 | 20 | 0 | 0 |
| M1734 | 1.2 | 2.7 | 0 | 70.6 | 1 | 6.5 | 0 | 1.5 | 0.5 | 0 | 0 | 16 | 0 | 0 |
| M1735 | 1.4 | 1.3 | 0 | 75.3 | 1 | 11 | 0 | 2 | 0.5 | 0 | 0 | 7.5 | 0 | 0 |
| M1736 | 1.4 | 3 | 0 | 67.6 | 1 | 12 | 0 | 1.5 | 0.5 | 0 | 0 | 13 | 0 | 0 |
| M1737 | 1.7 | 2.6 | 0 | 76.7 | 1 | 11 | 0 | 2 | 0.5 | 0 | 0 | 4.5 | 0 | 0 |
| M1738 | 1.8 | 2.2 | 0 | 68.5 | 0 | 15 | 4.5 | 0 | 0 | 0 | 3 | 5 | 0 | 0 |
| M1739 | 1 | 2.8 | 0 | 78.2 | 1 | 7.5 | 0 | 2 | 0.5 | 0 | 0 | 7 | 0 | 0 |
| M1740 | 0.8 | 3.9 | 0 | 78.8 | 1 | 4 | 0 | 1 | 0.5 | 0 | 0 | 10 | 0 | 0 |
| M1741 | 1.9 | 1.1 | 0 | 73 | 1 | 14 | 0 | 1.5 | 0.5 | 0 | 0 | 7 | 0 | 0 |
| M1742 | 0.7 | 1.1 | 0 | 85.7 | 1 | 6 | 0 | 1 | 0.5 | 0 | 0 | 4 | 0 | 0 |
| M1743 | 2.4 | 2.4 | 0 | 65.2 | 0 | 20 | 0 | 0 | 0 | 0 | 10 | 0 | 0 | 0 |
| M1744 | 0.7 | 3.9 | 0 | 66.9 | 1 | 6 | 0 | 1 | 0.5 | 0 | 0 | 20 | 0 | 0 |
| M1745 | 1.7 | 2.3 | 0 | 75 | 1 | 13 | 0 | 1.5 | 0.5 | 0 | 0 | 5 | 0 | 0 |
| M1746 | 2.4 | 2 | 0 | 67.6 | 0 | 18 | 0 | 0 | 0 | 0 | 10 | 0 | 0 | 0 |
| M1747 | 1.5 | 2.7 | 0 | 79.8 | 1 | 9 | 0 | 1 | 0.5 | 0 | 0 | 4.5 | 0 | 0 |
| M1748 | 1.7 | 2.8 | 0 | 65 | 1 | 12.5 | 0 | 1 | 0.5 | 0 | 0 | 15.5 | 0 | 0 |
| M1749 | 1.8 | 2.2 | 0 | 66.5 | 0 | 15 | 10.5 | 0 | 0 | 0 | 2 | 2 | 0 | 0 |
| M1750 | 1.3 | 3 | 0 | 75.7 | 1 | 9.5 | 0 | 1.5 | 0.5 | 0 | 0 | 7.5 | 0 | 0 |
| M1751 | 1.3 | 2.7 | 0 | 81.5 | 1 | 7.5 | 0 | 1 | 0.5 | 0 | 0 | 4.5 | 0 | 0 |
| M1752 | 1.7 | 1.3 | 0 | 75.5 | 1 | 8.5 | 0 | 1.5 | 0.5 | 0 | 0 | 10 | 0 | 0 |
| M1753 | 0.8 | 4 | 0 | 74.7 | 1 | 6 | 0 | 1 | 0.5 | 0 | 0 | 12 | 0 | 0 |
| M1754 | 1 | 2.1 | 0 | 74.4 | 1 | 7 | 0 | 2 | 0.5 | 0 | 0 | 12 | 0 | 0 |
| M1755 | 1.8 | 2.5 | 0 | 73.7 | 1 | 13.5 | 0 | 1.5 | 0.5 | 0 | 0 | 5.5 | 0 | 0 |
| M1756 | 2.4 | 2.8 | 0 | 62.8 | 0 | 20 | 0 | 0 | 0 | 0 | 12 | 0 | 0 | 0 |
| M1757 | 1 | 2.7 | 0 | 79.8 | 1 | 7.5 | 0 | 1 | 0.5 | 0 | 0 | 6.5 | 0 | 0 |
| M1758 | 2.2 | 2.2 | 0 | 65.6 | 0 | 18 | 0 | 0 | 0 | 0 | 0 | 12 | 0 | 0 |
| M1759 | 1 | 1.3 | 0 | 80.7 | 1 | 8.5 | 0 | 1.5 | 0.5 | 0 | 0 | 5.5 | 0 | 0 |
| M1760 | 1.6 | 2.8 | 0 | 68.6 | 1 | 14 | 0 | 2 | 0.5 | 0 | 0 | 9.5 | 0 | 0 |
| M1761 | 1.1 | 3 | 0 | 70.4 | 1 | 9.5 | 0 | 1 | 0.5 | 0 | 0 | 13.5 | 0 | 0 |
| M1762 | 1.2 | 2.2 | 0 | 75.6 | 0 | 8 | 0 | 0 | 0 | 0 | 0 | 13 | 0 | 0 |
| M1763 | 1.4 | 2.2 | 0 | 74.4 | 0 | 12 | 3 | 1 | 0 | 0 | 1 | 5 | 0 | 0 |
| M1764 | 2 | 2.8 | 0 | 62.2 | 1 | 15 | 0 | 1 | 0.5 | 0 | 0 | 15.5 | 0 | 0 |
| M1765 | 0.9 | 2.2 | 0 | 81.9 | 1 | 7.5 | 0 | 1 | 0.5 | 0 | 0 | 5 | 0 | 0 |
| M1766 | 2 | 1 | 0 | 74 | 1 | 12 | 0 | 1.5 | 0.5 | 0 | 0 | 8 | 0 | 0 |
| M1767 | 1.8 | 2.3 | 0 | 74.4 | 1 | 13.5 | 0 | 2 | 0.5 | 0 | 0 | 4.5 | 0 | 0 |
| M1768 | 1.3 | 2.1 | 0 | 71.6 | 1 | 10.5 | 0 | 1.5 | 0.5 | 0 | 0 | 11.5 | 0 | 0 |
| M1769 | 2.4 | 1.8 | 0 | 67.8 | 0 | 20 | 0 | 0 | 0 | 0 | 8 | 0 | 0 | 0 |
| M1770 | 1.8 | 2.2 | 0 | 74.5 | 0 | 15 | 2 | 0 | 0 | 0 | 4.5 | 0 | 0 | 0 |
| M1771 | 1 | 2.8 | 0 | 74.7 | 1 | 9 | 0 | 1.5 | 0.5 | 0 | 0 | 9.5 | 0 | 0 |
| M1772 | 1.8 | 2.2 | 0 | 68 | 0 | 15 | 4 | 0 | 0 | 0 | 5.5 | 3.5 | 0 | 0 |
| M1773 | 1.1 | 2.6 | 0 | 77.3 | 1 | 9 | 0 | 2 | 0.5 | 0 | 0 | 6.5 | 0 | 0 |
| M1774 | 2 | 3 | 0 | 62 | 1 | 17 | 0 | 1 | 0.5 | 0 | 0 | 13.5 | 0 | 0 |
| M1775 | 1.5 | 2.5 | 0 | 76 | 1 | 11.5 | 0 | 1.5 | 0.5 | 0 | 0 | 5.5 | 0 | 0 |
| M1776 | 0.8 | 1.2 | 0 | 81 | 1 | 6.5 | 0 | 2 | 0.5 | 0 | 0 | 7 | 0 | 0 |
| M1777 | 0.7 | 3.4 | 0 | 71.4 | 1 | 2 | 0 | 1 | 0.5 | 0 | 0 | 20 | 0 | 0 |
| M1778 | 1.9 | 1.9 | 0 | 71.7 | 1 | 6.5 | 0 | 1.5 | 0.5 | 0 | 0 | 15 | 0 | 0 |
| M1779 | 2.4 | 2.2 | 0 | 65.4 | 0 | 20 | 0 | 0 | 0 | 0 | 10 | 0 | 0 | 0 |
| M1780 | 0.7 | 3.4 | 0 | 69.4 | 1 | 6 | 0 | 1 | 0.5 | 0 | 0 | 18 | 0 | 0 |
| M1781 | 1.6 | 1 | 0 | 76.4 | 1 | 13.5 | 0 | 2 | 0.5 | 0 | 0 | 4 | 0 | 0 |

TABLE 11-continued

Compositions and thermodynamic criteria for vanadium carbides

| | | | | | | | | | | | | | | |
|---|---|---|---|---|---|---|---|---|---|---|---|---|---|---|
| M1782 | 1.2 | 0.6 | 0 | 84.2 | 0 | 10 | 0 | 0 | 0 | 0 | 0 | 4 | 0 | 0 |
| M1783 | 1 | 2.2 | 0 | 79.8 | 1 | 8.5 | 0 | 2 | 0.5 | 0 | 0 | 5 | 0 | 0 |
| M1784 | 1.2 | 2.2 | 0 | 75.6 | 1 | 10.5 | 0 | 1.5 | 0.5 | 0 | 0 | 7.5 | 0 | 0 |
| M1785 | 1.2 | 2.8 | 0 | 69.5 | 1 | 8 | 0 | 1 | 0.5 | 0 | 0 | 16 | 0 | 0 |
| M1786 | 2 | 2.4 | 0 | 72.6 | 1 | 15 | 0 | 2 | 0.5 | 0 | 0 | 4.5 | 0 | 0 |
| M1787 | 1.1 | 1.9 | 0 | 77 | 0 | 8 | 0 | 0 | 0 | 0 | 0 | 12 | 0 | 0 |
| M1788 | 1.7 | 1.6 | 0 | 73.7 | 0 | 13 | 0 | 0 | 0 | 0 | 0 | 10 | 0 | 0 |
| M1789 | 1.8 | 3 | 0 | 64.2 | 0 | 14 | 1 | 0 | 0 | 0 | 0 | 16 | 0 | 0 |
| M1790 | 1 | 2.8 | 0 | 82.7 | 1 | 6 | 0 | 1 | 0.5 | 0 | 0 | 5 | 0 | 0 |
| M1791 | 1.2 | 2.5 | 0 | 70.8 | 1 | 9 | 0 | 1 | 0.5 | 0 | 0 | 14 | 0 | 0 |
| M1792 | 1.1 | 3 | 0 | 79.4 | 1 | 7.5 | 0 | 1 | 0.5 | 0 | 0 | 6.5 | 0 | 0 |
| M1793 | 1.2 | 2.7 | 0 | 81.6 | 1 | 7.5 | 0 | 1 | 0.5 | 0 | 0 | 4.5 | 0 | 0 |
| M1794 | 1.6 | 1.4 | 0 | 74 | 1 | 13.5 | 0 | 1 | 0.5 | 0 | 0 | 7 | 0 | 0 |
| M1795 | 0.7 | 2.4 | 0 | 76.4 | 1 | 4 | 0 | 1 | 0.5 | 0 | 0 | 14 | 0 | 0 |
| M1796 | 2 | 2.1 | 0 | 69.4 | 1 | 7.5 | 0 | 1.5 | 0.5 | 0 | 0 | 16 | 0 | 0 |
| M1797 | 2 | 2.2 | 0 | 66.8 | 1 | 10.5 | 0 | 2 | 0.5 | 0 | 0 | 15 | 0 | 0 |
| M1798 | 1.8 | 3 | 0 | 63.2 | 0 | 14 | 2 | 0 | 0 | 0 | 0 | 16 | 0 | 0 |
| M1799 | 2.2 | 1.8 | 0 | 68 | 0 | 16 | 2 | 0 | 0 | 0 | 0 | 10 | 0 | 0 |
| M1800 | 2.2 | 2 | 0 | 66.8 | 0 | 16 | 1 | 0 | 0 | 0 | 0 | 12 | 0 | 0 |
| M1801 | 2.2 | 2.4 | 0 | 63.4 | 0 | 18 | 2 | 0 | 0 | 0 | 0 | 12 | 0 | 0 |
| M1802 | 1.9 | 1.2 | 0 | 73.4 | 1 | 12.5 | 0 | 1 | 0.5 | 0 | 0 | 8.5 | 0 | 0 |
| M1803 | 0.8 | 3.3 | 0 | 71.4 | 1 | 2 | 0 | 1 | 0.5 | 0 | 0 | 20 | 0 | 0 |
| M1804 | 2.2 | 2.2 | 0 | 65.6 | 0 | 16 | 0 | 0 | 0 | 0 | 0 | 14 | 0 | 0 |
| M1805 | 1.2 | 3 | 0 | 82.8 | 1 | 6 | 0 | 1.5 | 0.5 | 0 | 0 | 4 | 0 | 0 |
| M1806 | 1 | 2.7 | 0 | 71.8 | 1 | 6.5 | 0 | 1 | 0.5 | 0 | 0 | 15.5 | 0 | 0 |
| M1807 | 2 | 2.3 | 0 | 66.2 | 1 | 12.5 | 0 | 1 | 0.5 | 0 | 0 | 14.5 | 0 | 0 |
| M1808 | 0.8 | 1.7 | 0 | 81.5 | 1 | 7 | 0 | 1 | 0.5 | 0 | 0 | 6.5 | 0 | 0 |
| M1809 | 1.8 | 1 | 0 | 78.2 | 0 | 9 | 0 | 0 | 0 | 0 | 0 | 10 | 0 | 0 |
| M1810 | 1.3 | 2.7 | 0 | 77.5 | 1 | 9.5 | 0 | 2 | 0.5 | 0 | 0 | 5.5 | 0 | 0 |
| M1811 | 0.8 | 2.9 | 0 | 73.8 | 1 | 2 | 0 | 1 | 0.5 | 0 | 0 | 18 | 0 | 0 |
| M1812 | 1.8 | 2.2 | 0 | 66 | 0 | 15 | 7.5 | 0 | 0 | 0 | 2.5 | 5 | 0 | 0 |
| M1813 | 1.8 | 3 | 0 | 76.7 | 1 | 11 | 0 | 2 | 0.5 | 0 | 0 | 4 | 0 | 0 |
| M1814 | 0.8 | 2.7 | 0 | 79 | 1 | 7.5 | 0 | 1 | 0.5 | 0 | 0 | 7.5 | 0 | 0 |
| M1815 | 1.3 | 2.6 | 0 | 68.6 | 1 | 9 | 0 | 2 | 0.5 | 0 | 0 | 15 | 0 | 0 |
| M1816 | 1.2 | 2.5 | 0 | 77.3 | 1 | 10 | 0 | 1.5 | 0.5 | 0 | 0 | 6 | 0 | 0 |
| M1817 | 1.2 | 1.5 | 0 | 76.3 | 1 | 10 | 0 | 1 | 0.5 | 0 | 0 | 8.5 | 0 | 0 |
| M1818 | 2 | 3 | 0 | 71.5 | 1 | 14.5 | 0 | 1.5 | 0.5 | 0 | 0 | 6 | 0 | 0 |
| M1819 | 1.1 | 2.8 | 0 | 70.1 | 1 | 7.5 | 0 | 1 | 0.5 | 0 | 0 | 16 | 0 | 0 |
| M1820 | 1.4 | 2.2 | 0 | 74.4 | 0 | 12 | 7 | 1 | 0 | 0 | 1 | 1 | 0 | 0 |
| M1821 | 1.1 | 2.8 | 0 | 69.6 | 1 | 9.5 | 0 | 2 | 0.5 | 0 | 0 | 13.5 | 0 | 0 |
| M1822 | 0.9 | 2.7 | 0 | 80.4 | 1 | 7 | 0 | 1.5 | 0.5 | 0 | 0 | 6 | 0 | 0 |
| M1823 | 1.1 | 3 | 0 | 77.9 | 1 | 8 | 0 | 2 | 0.5 | 0 | 0 | 6.5 | 0 | 0 |
| M1824 | 2 | 4 | 0 | 58.5 | 0.5 | 18 | 0 | 1.5 | 0.5 | 0 | 0 | 15 | 0 | 0 |
| M1825 | 2.4 | 2.4 | 0 | 69.2 | 0 | 20 | 0 | 0 | 0 | 6 | 0 | 0 | 0 | 0 |
| M1826 | 0.9 | 2.6 | 0 | 83.5 | 1 | 6 | 0 | 1 | 0.5 | 0 | 0 | 4.5 | 0 | 0 |
| M1827 | 1.4 | 1.8 | 0 | 75.8 | 0 | 12 | 4 | 1 | 0 | 0 | 1 | 3 | 0 | 0 |
| M1828 | 1.7 | 3 | 0 | 68.8 | 1 | 15 | 0 | 1 | 0.5 | 0 | 0 | 9 | 0 | 0 |
| M1829 | 1.4 | 2.8 | 0 | 66.3 | 1 | 11 | 0 | 1.5 | 0.5 | 0 | 0 | 15.5 | 0 | 0 |
| M1830 | 1.5 | 2.9 | 0 | 70.6 | 1 | 13.5 | 0 | 1 | 0.5 | 0 | 0 | 9 | 0 | 0 |
| M1831 | 1.4 | 2.7 | 0 | 66.4 | 1 | 11 | 0 | 2 | 0.5 | 0 | 0 | 15 | 0 | 0 |
| M1832 | 0.8 | 2.7 | 0 | 77.5 | 1 | 7.5 | 0 | 1.5 | 0.5 | 0 | 0 | 8.5 | 0 | 0 |
| M1833 | 1.9 | 1.8 | 0 | 72.3 | 1 | 7 | 0 | 1 | 0.5 | 0 | 0 | 14.5 | 0 | 0 |
| M1834 | 1.6 | 1.8 | 0 | 70.6 | 1 | 11.5 | 0 | 2 | 0.5 | 0 | 0 | 11 | 0 | 0 |
| M1835 | 1.8 | 2.9 | 0 | 63.8 | 1 | 15.5 | 0 | 1.5 | 0.5 | 0 | 0 | 13 | 0 | 0 |
| M1836 | 1 | 2.9 | 0 | 76.6 | 1 | 9 | 0 | 1 | 0.5 | 0 | 0 | 8 | 0 | 0 |
| M1837 | 1.8 | 2.2 | 0 | 75 | 0 | 15 | 2 | 0 | 0 | 0 | 1.5 | 2.5 | 0 | 0 |
| M1838 | 1.2 | 2.8 | 0 | 68 | 1 | 8.5 | 0 | 2 | 0.5 | 0 | 0 | 16 | 0 | 0 |
| M1839 | 1.4 | 2.2 | 0 | 69.4 | 1 | 11 | 0 | 2 | 0.5 | 0 | 0 | 12.5 | 0 | 0 |
| M1840 | 2 | 2.9 | 0 | 74.6 | 1 | 13.5 | 0 | 1.5 | 0.5 | 0 | 0 | 4 | 0 | 0 |
| M1841 | 1.7 | 2.8 | 0 | 64 | 1 | 13.5 | 0 | 1 | 0.5 | 0 | 0 | 15.5 | 0 | 0 |
| M1842 | 1.9 | 1.3 | 0 | 74.3 | 1 | 8 | 0 | 1.5 | 0.5 | 0 | 0 | 11.5 | 0 | 0 |
| M1843 | 1.4 | 2.2 | 0 | 74.4 | 0 | 12 | 0 | 0 | 0 | 0 | 2 | 8 | 0 | 0 |
| M1844 | 1.1 | 2.8 | 0 | 80.1 | 1 | 8 | 0 | 1 | 0.5 | 0 | 0 | 5.5 | 0 | 0 |
| M1845 | 1.4 | 2.8 | 0 | 79.3 | 1 | 9.5 | 0 | 1 | 0.5 | 0 | 0 | 4.5 | 0 | 0 |
| M1846 | 2 | 1.7 | 0 | 68.3 | 1 | 17 | 0 | 1.5 | 0.5 | 0 | 0 | 8 | 0 | 0 |
| M1847 | 2 | 2.1 | 0 | 69.4 | 1 | 8 | 0 | 1 | 0.5 | 0 | 0 | 16 | 0 | 0 |
| M1848 | 0.9 | 1.7 | 0 | 78.4 | 1 | 6 | 0 | 1 | 0.5 | 0 | 0 | 10.5 | 0 | 0 |
| M1849 | 1.4 | 2.5 | 0 | 75.6 | 1 | 11.5 | 0 | 2 | 0.5 | 0 | 0 | 5.5 | 0 | 0 |
| M1850 | 1.6 | 1.1 | 0 | 76.3 | 1 | 10.5 | 0 | 1 | 0.5 | 0 | 0 | 8 | 0 | 0 |
| M1851 | 1.4 | 2.4 | 0 | 74.2 | 1 | 12.5 | 0 | 1 | 0.5 | 0 | 0 | 7 | 0 | 0 |
| M1852 | 1.6 | 2.7 | 0 | 77.2 | 1 | 11.5 | 0 | 1 | 0.5 | 0 | 0 | 4.5 | 0 | 0 |
| M1853 | 0.6 | 3.4 | 0 | 71.5 | 1 | 2 | 0 | 1 | 0.5 | 0 | 0 | 20 | 0 | 0 |
| M1854 | 1.7 | 1.3 | 0 | 76 | 1 | 6.5 | 0 | 1.5 | 0.5 | 0 | 0 | 11.5 | 0 | 0 |
| M1855 | 2 | 2.6 | 0 | 72.4 | 1 | 15.5 | 0 | 1 | 0.5 | 0 | 0 | 5 | 0 | 0 |
| M1856 | 0.9 | 1.6 | 12 | 61.8 | 1 | 12 | 0 | 3 | 0.5 | 0 | 0 | 7.2 | 0 | 0 |
| M1857 | 0.9 | 1.6 | 12 | 60.8 | 2 | 12 | 0 | 3 | 0.5 | 0 | 0 | 7.2 | 0 | 0 |
| M1858 | 1.3 | 2.1 | 0 | 73.1 | 1 | 7.5 | 0 | 1 | 0.5 | 0 | 0 | 13.5 | 0 | 0 |
| M1859 | 2.2 | 3 | 0 | 58.8 | 0 | 18 | 2 | 0 | 0 | 0 | 0 | 16 | 0 | 0 |

TABLE 11-continued

Compositions and thermodynamic criteria for vanadium carbides

| | | | | | | | | | | | | | | |
|---|---|---|---|---|---|---|---|---|---|---|---|---|---|---|
| M1860 | 2 | 1 | 0 | 76 | 1 | 6 | 0 | 2 | 0.5 | 0 | 0 | 11.5 | 0 | 0 |
| M1861 | 0.9 | 1.6 | 12 | 64.8 | 1 | 10 | 0 | 2 | 0.5 | 0 | 0 | 7.2 | 0 | 0 |
| M1862 | 1.1 | 2.8 | 0 | 81.6 | 1 | 7 | 0 | 2 | 0.5 | 0 | 0 | 4 | 0 | 0 |
| M1863 | 1.1 | 2.6 | 0 | 81.3 | 1 | 8 | 0 | 1 | 0.5 | 0 | 0 | 4.5 | 0 | 0 |
| M1864 | 1.3 | 2.7 | 0 | 75.5 | 1 | 11 | 0 | 1.5 | 0.5 | 0 | 0 | 6.5 | 0 | 0 |
| M1865 | 1.1 | 3 | 0 | 77.4 | 1 | 8.5 | 0 | 2 | 0.5 | 0 | 0 | 6.5 | 0 | 0 |
| M1866 | 1.6 | 2.3 | 0 | 69.1 | 1 | 10 | 0 | 1 | 0.5 | 0 | 0 | 14.5 | 0 | 0 |
| M1867 | 1.2 | 1.5 | 0 | 75.8 | 1 | 8.5 | 0 | 2 | 0.5 | 0 | 0 | 9.5 | 0 | 0 |
| M1868 | 0.7 | 3.3 | 0 | 69.5 | 1 | 6 | 0 | 1 | 0.5 | 0 | 0 | 18 | 0 | 0 |
| M1869 | 2 | 1.7 | 0 | 67.3 | 1 | 15 | 0 | 2 | 0.5 | 0 | 0 | 10.5 | 0 | 0 |
| M1870 | 1.4 | 1.4 | 0 | 78.2 | 0 | 12 | 5 | 1 | 0 | 0 | 0 | 1 | 0 | 0 |
| M1871 | 0.8 | 3.4 | 0 | 69.3 | 1 | 4 | 0 | 1 | 0.5 | 0 | 0 | 20 | 0 | 0 |
| M1872 | 1.4 | 2.2 | 0 | 73.4 | 0 | 12 | 2 | 1 | 0 | 0 | 6 | 2 | 0 | 0 |
| M1873 | 1 | 2 | 0 | 79 | 1 | 9 | 0 | 1.5 | 0.5 | 0 | 0 | 6 | 0 | 0 |
| M1874 | 1.6 | 2.8 | 0 | 75.1 | 1 | 12 | 0 | 2 | 0.5 | 0 | 0 | 5 | 0 | 0 |
| M1875 | 1.5 | 2.7 | 0 | 77.8 | 1 | 11 | 0 | 1 | 0.5 | 0 | 0 | 4.5 | 0 | 0 |
| M1876 | 1 | 1.3 | 0 | 79.2 | 1 | 7.5 | 0 | 1 | 0.5 | 0 | 0 | 8.5 | 0 | 0 |
| M1877 | 0.7 | 2.3 | 0 | 83 | 1 | 6 | 0 | 2 | 0.5 | 0 | 0 | 4.5 | 0 | 0 |
| M1878 | 2 | 2.1 | 0 | 67.9 | 1 | 10.5 | 0 | 1 | 0.5 | 0 | 0 | 15 | 0 | 0 |
| M1879 | 1.7 | 2.3 | 0 | 71 | 1 | 15 | 0 | 1 | 0.5 | 0 | 0 | 7.5 | 0 | 0 |
| M1880 | 1.4 | 2.8 | 0 | 78.8 | 1 | 10 | 0 | 1 | 0.5 | 0 | 0 | 4.5 | 0 | 0 |
| M1881 | 2 | 4 | 0 | 57.5 | 0.5 | 18 | 0 | 1.5 | 0.5 | 0 | 0 | 16 | 0 | 0 |
| M1882 | 1.4 | 1.4 | 0 | 78.2 | 0 | 12 | 3 | 0 | 0 | 0 | 1 | 3 | 0 | 0 |
| M1883 | 0.8 | 2.8 | 0 | 72.4 | 1 | 7 | 0 | 1 | 0.5 | 0 | 0 | 14.5 | 0 | 0 |
| M1884 | 2 | 3 | 0 | 64.5 | 1 | 18 | 0 | 1.5 | 0.5 | 0 | 0 | 9.5 | 0 | 0 |
| M1885 | 0.8 | 4 | 0 | 76.7 | 1 | 6 | 0 | 1 | 0.5 | 0 | 0 | 10 | 0 | 0 |
| M1886 | 0.9 | 2.6 | 0 | 80.5 | 1 | 7.5 | 0 | 1.5 | 0.5 | 0 | 0 | 5.5 | 0 | 0 |
| M1887 | 2.4 | 2.6 | 0 | 63 | 0 | 20 | 0 | 0 | 0 | 0 | 12 | 0 | 0 | 0 |
| M1888 | 1.4 | 1.8 | 0 | 73.8 | 0 | 12 | 1 | 0 | 0 | 0 | 2 | 8 | 0 | 0 |
| M1889 | 1 | 2.9 | 0 | 76.6 | 1 | 9 | 0 | 1.5 | 0.5 | 0 | 0 | 7.5 | 0 | 0 |
| M1890 | 1.5 | 1.3 | 0 | 74.2 | 1 | 12.5 | 0 | 1 | 0.5 | 0 | 0 | 8 | 0 | 0 |
| M1891 | 0.8 | 1.8 | 0 | 76.9 | 1 | 6.5 | 0 | 2 | 0.5 | 0 | 0 | 10.5 | 0 | 0 |
| M1892 | 1.9 | 1.2 | 0 | 74.9 | 1 | 6.5 | 0 | 2 | 0.5 | 0 | 0 | 12 | 0 | 0 |
| M1893 | 1.5 | 1.9 | 0 | 73.1 | 1 | 7 | 0 | 1 | 0.5 | 0 | 0 | 14 | 0 | 0 |
| M1894 | 1.2 | 2.9 | 0 | 78.9 | 1 | 9 | 0 | 1 | 0.5 | 0 | 0 | 5.5 | 0 | 0 |
| M1895 | 1 | 2.8 | 0 | 83.2 | 1 | 6.5 | 0 | 1 | 0.5 | 0 | 0 | 4 | 0 | 0 |
| M1896 | 2 | 2.1 | 0 | 67.9 | 1 | 8.5 | 0 | 2 | 0.5 | 0 | 0 | 16 | 0 | 0 |
| M1897 | 2 | 3.8 | 0 | 58.7 | 0.5 | 18 | 0 | 1.5 | 0.5 | 0 | 0 | 15 | 0 | 0 |
| M1898 | 1.8 | 3 | 0 | 63.2 | 0 | 14 | 0 | 0 | 0 | 0 | 0 | 18 | 0 | 0 |
| M1899 | 1.1 | 2.9 | 0 | 81 | 1 | 7.5 | 0 | 1.5 | 0.5 | 0 | 0 | 4.5 | 0 | 0 |
| M1900 | 1.1 | 2.9 | 0 | 68 | 1 | 9.5 | 0 | 1 | 0.5 | 0 | 0 | 16 | 0 | 0 |
| M1901 | 0.9 | 1.6 | 12 | 63.8 | 3 | 10 | 0 | 1 | 0.5 | 0 | 0 | 7.2 | 0 | 0 |
| M1902 | 0.9 | 2.5 | 0 | 81.6 | 1 | 7.5 | 0 | 1 | 0.5 | 0 | 0 | 5 | 0 | 0 |
| M1903 | 1.8 | 2.9 | 0 | 72.3 | 1 | 14 | 0 | 2 | 0.5 | 0 | 0 | 5.5 | 0 | 0 |
| M1904 | 1.8 | 1.3 | 0 | 73.9 | 0 | 13 | 0 | 0 | 0 | 0 | 0 | 10 | 0 | 0 |
| M1905 | 0.6 | 3.9 | 0 | 71 | 1 | 6 | 0 | 1 | 0.5 | 0 | 0 | 16 | 0 | 0 |
| M1906 | 1.9 | 1.6 | 0 | 69 | 1 | 15 | 0 | 1 | 0.5 | 0 | 0 | 10 | 0 | 0 |
| M1907 | 2 | 1 | 0 | 73.5 | 1 | 12 | 0 | 1 | 0.5 | 0 | 0 | 9 | 0 | 0 |
| M1908 | 1.1 | 1 | 0 | 80.4 | 1 | 7 | 0 | 1.5 | 0.5 | 0 | 0 | 7.5 | 0 | 0 |
| M1909 | 2 | 1.7 | 0 | 71.3 | 1 | 7.5 | 0 | 1.5 | 0.5 | 0 | 0 | 14.5 | 0 | 0 |
| M1910 | 2 | 3 | 0 | 68 | 1 | 16.5 | 0 | 2 | 0.5 | 0 | 0 | 7 | 0 | 0 |
| M1911 | 0.9 | 1.6 | 12 | 64.3 | 3 | 10 | 0 | 1 | 0 | 0 | 0 | 7.2 | 0 | 0 |
| M1912 | 0.7 | 2.9 | 0 | 80.4 | 1 | 6 | 0 | 2 | 0.5 | 0 | 0 | 6.5 | 0 | 0 |
| M1913 | 2 | 2 | 0 | 66.5 | 1 | 14 | 0 | 1 | 0.5 | 0 | 0 | 13 | 0 | 0 |
| M1914 | 1.4 | 2 | 0 | 73.6 | 0 | 12 | 1 | 1 | 0 | 0 | 4 | 5 | 0 | 0 |
| M1915 | 0.9 | 3 | 0 | 81.1 | 1 | 6.5 | 0 | 1.5 | 0.5 | 0 | 0 | 5.5 | 0 | 0 |
| M1916 | 1.7 | 2.2 | 0 | 67.1 | 1 | 13 | 0 | 1.5 | 0.5 | 0 | 0 | 13 | 0 | 0 |
| M1917 | 1.2 | 2.1 | 0 | 72.2 | 1 | 8 | 0 | 2 | 0.5 | 0 | 0 | 13 | 0 | 0 |
| M1918 | 0.6 | 2.9 | 0 | 77 | 1 | 6 | 0 | 2 | 0.5 | 0 | 0 | 10 | 0 | 0 |
| M1919 | 1.3 | 2.6 | 0 | 77.6 | 1 | 10.5 | 0 | 1.5 | 0.5 | 0 | 0 | 5 | 0 | 0 |
| M1920 | 2 | 2.4 | 0 | 63.6 | 1 | 15 | 0 | 1 | 0.5 | 0 | 0 | 14.5 | 0 | 0 |
| M1921 | 1.6 | 1.3 | 0 | 72.6 | 1 | 13 | 0 | 2 | 0.5 | 0 | 0 | 8 | 0 | 0 |
| M1922 | 0.6 | 2.5 | 0 | 81.4 | 1 | 6 | 0 | 2 | 0.5 | 0 | 0 | 6 | 0 | 0 |
| M1923 | 0.9 | 1.6 | 12 | 65.3 | 3 | 10 | 0 | 0 | 0 | 0 | 0 | 7.2 | 0 | 0 |
| M1924 | 1.3 | 2.7 | 0 | 67.5 | 1 | 9 | 0 | 2 | 0.5 | 0 | 0 | 16 | 0 | 0 |
| M1925 | 0.9 | 2.5 | 0 | 80.6 | 1 | 8 | 0 | 1 | 0.5 | 0 | 0 | 5.5 | 0 | 0 |
| M1926 | 1.4 | 1.4 | 0 | 77.2 | 0 | 12 | 5 | 1 | 0 | 0 | 2 | 0 | 0 | 0 |
| M1927 | 2 | 2.6 | 0 | 72.4 | 1 | 15.5 | 0 | 2 | 0.5 | 0 | 0 | 4 | 0 | 0 |
| M1928 | 0.8 | 3.5 | 0 | 67.2 | 1 | 6 | 0 | 1 | 0.5 | 0 | 0 | 20 | 0 | 0 |
| M1929 | 1.6 | 1.7 | 0 | 73.7 | 1 | 6.5 | 0 | 1.5 | 0.5 | 0 | 0 | 13.5 | 0 | 0 |
| M1930 | 1.5 | 2.8 | 0 | 75.2 | 1 | 12 | 0 | 1.5 | 0.5 | 0 | 0 | 5.5 | 0 | 0 |
| M1931 | 1.8 | 2.3 | 0 | 73.9 | 1 | 15 | 0 | 1 | 0.5 | 0 | 0 | 4.5 | 0 | 0 |
| M1932 | 1.4 | 2 | 0 | 71.6 | 0 | 12 | 6 | 0 | 0 | 0 | 5 | 2 | 0 | 0 |
| M1933 | 1.6 | 2.1 | 0 | 70.3 | 1 | 14 | 0 | 2 | 0.5 | 0 | 0 | 8.5 | 0 | 0 |
| M1934 | 2 | 2.1 | 0 | 68.4 | 1 | 17.5 | 0 | 1 | 0.5 | 0 | 0 | 7.5 | 0 | 0 |
| M1935 | 1.1 | 3 | 0 | 77.9 | 1 | 9 | 0 | 1 | 0.5 | 0 | 0 | 6.5 | 0 | 0 |
| M1936 | 1.3 | 1.6 | 0 | 74.6 | 1 | 9 | 0 | 1 | 0.5 | 0 | 0 | 11 | 0 | 0 |
| M1937 | 1.3 | 2.7 | 0 | 67.5 | 1 | 10 | 0 | 1 | 0.5 | 0 | 0 | 16 | 0 | 0 |

TABLE 11-continued

Compositions and thermodynamic criteria for vanadium carbides

| | | | | | | | | | | | | | | | |
|---|---|---|---|---|---|---|---|---|---|---|---|---|---|---|---|
| M1938 | 0.8 | 2.7 | 0 | 82.5 | 1 | 6 | 0 | 2 | 0.5 | 0 | 0 | 4.5 | 0 | 0 |
| M1939 | 1.9 | 1.3 | 0 | 73.8 | 1 | 8 | 0 | 1 | 0.5 | 0 | 0 | 12.5 | 0 | 0 |
| M1940 | 0.7 | 2.4 | 0 | 83.4 | 1 | 6 | 0 | 1.5 | 0.5 | 0 | 0 | 4.5 | 0 | 0 |
| M1941 | 0.9 | 2.4 | 0 | 72.7 | 1 | 7 | 0 | 1 | 0.5 | 0 | 0 | 14.5 | 0 | 0 |
| M1942 | 1.4 | 1.4 | 0 | 74.2 | 0 | 12 | 6 | 1 | 0 | 0 | 0 | 4 | 0 | 0 |
| M1943 | 2 | 1.9 | 0 | 65.6 | 1 | 16.5 | 0 | 1.5 | 0.5 | 0 | 0 | 11 | 0 | 0 |
| M1944 | 1.5 | 2.1 | 0 | 71.9 | 1 | 6 | 0 | 1 | 0.5 | 0 | 0 | 16 | 0 | 0 |
| M1945 | 1.4 | 1.4 | 0 | 76.2 | 0 | 12 | 4 | 0 | 0 | 0 | 4 | 1 | 0 | 0 |
| M1946 | 1.3 | 2.7 | 0 | 67 | 1 | 11 | 0 | 1 | 0.5 | 0 | 0 | 15.5 | 0 | 0 |
| M1947 | 0.9 | 2.8 | 0 | 82.8 | 1 | 6.5 | 0 | 1 | 0.5 | 0 | 0 | 4.5 | 0 | 0 |
| M1948 | 1 | 2.9 | 0 | 80.1 | 1 | 7.5 | 0 | 2 | 0.5 | 0 | 0 | 5 | 0 | 0 |
| M1949 | 1.4 | 1.8 | 0 | 72.8 | 0 | 12 | 4 | 0 | 0 | 0 | 4 | 4 | 0 | 0 |
| M1950 | 0.9 | 1.6 | 10 | 63.3 | 2 | 12 | 0 | 3 | 0 | 0 | 0 | 7.2 | 0 | 0 |
| M1951 | 0.8 | 2.7 | 0 | 83.5 | 1 | 6 | 0 | 1 | 0.5 | 0 | 0 | 4.5 | 0 | 0 |
| M1952 | 1.1 | 1.7 | 0 | 77.2 | 0 | 8 | 0 | 0 | 0 | 0 | 0 | 12 | 0 | 0 |
| M1953 | 2 | 1.7 | 0 | 70.3 | 1 | 9 | 0 | 1.5 | 0.5 | 0 | 0 | 14 | 0 | 0 |
| M1954 | 1.2 | 1.9 | 0 | 72.9 | 1 | 9.5 | 0 | 1.5 | 0.5 | 0 | 0 | 11.5 | 0 | 0 |
| M1955 | 1.9 | 1.2 | 0 | 72.9 | 1 | 11 | 0 | 1 | 0.5 | 0 | 0 | 10.5 | 0 | 0 |
| M1956 | 2 | 1 | 0 | 71.5 | 1 | 15.5 | 0 | 1 | 0.5 | 0 | 0 | 7.5 | 0 | 0 |
| M1957 | 1.9 | 2.3 | 0 | 71.8 | 1 | 16 | 0 | 2 | 0.5 | 0 | 0 | 4.5 | 0 | 0 |
| M1958 | 1 | 2.7 | 0 | 69.8 | 1 | 8 | 0 | 1.5 | 0.5 | 0 | 0 | 15.5 | 0 | 0 |
| M1959 | 0.8 | 2.7 | 0 | 71.5 | 1 | 6.5 | 0 | 1.5 | 0.5 | 0 | 0 | 15.5 | 0 | 0 |
| M1960 | 1.4 | 2.1 | 0 | 72 | 1 | 6 | 0 | 2 | 0.5 | 0 | 0 | 15 | 0 | 0 |
| M1961 | 1.2 | 2.7 | 0 | 68.1 | 1 | 9.5 | 0 | 1 | 0.5 | 0 | 0 | 16 | 0 | 0 |
| M1962 | 1.1 | 2.1 | 0 | 73.3 | 1 | 7 | 0 | 1 | 0.5 | 0 | 0 | 14 | 0 | 0 |
| M1963 | 1.6 | 2.7 | 0 | 72.7 | 1 | 14 | 0 | 1 | 0.5 | 0 | 0 | 6.5 | 0 | 0 |
| M1964 | 2.1 | 1.1 | 0 | 71.3 | 1 | 18 | 0 | 1 | 0.5 | 0 | 0 | 5 | 0 | 0 |
| M1965 | 0.6 | 3 | 0 | 76.9 | 1 | 6 | 0 | 1 | 0.5 | 0 | 0 | 11 | 0 | 0 |
| M1966 | 0.8 | 3 | 0 | 71.7 | 1 | 2 | 0 | 1 | 0.5 | 0 | 0 | 20 | 0 | 0 |
| M1967 | 1.3 | 2.8 | 0 | 75.9 | 1 | 11 | 0 | 1.5 | 0.5 | 0 | 0 | 6 | 0 | 0 |
| M1968 | 1.3 | 1.6 | 0 | 77.6 | 1 | 11.5 | 0 | 1.5 | 0.5 | 0 | 0 | 5 | 0 | 0 |
| M1969 | 1.7 | 2.7 | 0 | 63.6 | 1 | 12.5 | 0 | 2 | 0.5 | 0 | 0 | 16 | 0 | 0 |
| M1970 | 1.3 | 2.2 | 0 | 77 | 1 | 11.5 | 0 | 2 | 0.5 | 0 | 0 | 4.5 | 0 | 0 |
| M1971 | 0.9 | 2.7 | 0 | 81.4 | 1 | 7 | 0 | 2 | 0.5 | 0 | 0 | 4.5 | 0 | 0 |
| M1972 | 1.4 | 2.2 | 0 | 80.4 | 0 | 12 | 0 | 0 | 0 | 0 | 4 | 0 | 0 | 0 |
| M1973 | 0.7 | 2.7 | 0 | 72.1 | 1 | 6 | 0 | 1 | 0.5 | 0 | 0 | 16 | 0 | 0 |
| M1974 | 1.6 | 2.1 | 0 | 67.3 | 1 | 13.5 | 0 | 2 | 0.5 | 0 | 0 | 12 | 0 | 0 |
| M1975 | 1.7 | 1.5 | 0 | 73.3 | 1 | 8 | 0 | 1 | 0.5 | 0 | 0 | 13 | 0 | 0 |
| M1976 | 1.9 | 1.3 | 0 | 72.8 | 1 | 9 | 0 | 2 | 0.5 | 0 | 0 | 11.5 | 0 | 0 |
| M1977 | 1.7 | 1.5 | 0 | 73.8 | 1 | 6.5 | 0 | 2 | 0.5 | 0 | 0 | 13 | 0 | 0 |
| M1978 | 1 | 2.1 | 0 | 73.9 | 1 | 6.5 | 0 | 1 | 0.5 | 0 | 0 | 14 | 0 | 0 |
| M1979 | 0.4 | 3.3 | 0 | 71.8 | 1 | 2 | 0 | 1 | 0.5 | 0 | 0 | 20 | 0 | 0 |
| M1980 | 1.2 | 1.7 | 0 | 74.1 | 1 | 9 | 0 | 1 | 0.5 | 0 | 0 | 11.5 | 0 | 0 |
| M1981 | 1 | 2.8 | 0 | 78.2 | 1 | 9 | 0 | 1 | 0.5 | 0 | 0 | 6.5 | 0 | 0 |
| M1982 | 0.8 | 2.7 | 0 | 71.5 | 1 | 6 | 0 | 1.5 | 0.5 | 0 | 0 | 16 | 0 | 0 |
| M1983 | 0.9 | 2.6 | 0 | 80.5 | 1 | 8 | 0 | 1 | 0.5 | 0 | 0 | 5.5 | 0 | 0 |
| M1984 | 0.8 | 2.1 | 0 | 75.1 | 1 | 6 | 0 | 1 | 0.5 | 0 | 0 | 13.5 | 0 | 0 |
| M1985 | 2 | 2.8 | 0 | 59.7 | 1 | 16 | 0 | 2 | 0.5 | 0 | 0 | 16 | 0 | 0 |
| M1986 | 1.8 | 2.6 | 0 | 70.1 | 1 | 16 | 0 | 1.5 | 0.5 | 0 | 0 | 6.5 | 0 | 0 |
| M1987 | 1.2 | 1 | 0 | 79.8 | 0 | 10 | 0 | 0 | 0 | 0 | 0 | 8 | 0 | 0 |
| M1988 | 1.3 | 2.7 | 0 | 77 | 1 | 11 | 0 | 1 | 0.5 | 0 | 0 | 5.5 | 0 | 0 |
| M1989 | 0.9 | 2.4 | 0 | 72.7 | 1 | 6 | 0 | 1 | 0.5 | 0 | 0 | 15.5 | 0 | 0 |
| M1990 | 1.6 | 2.2 | 0 | 74.7 | 1 | 14 | 0 | 1.5 | 0.5 | 0 | 0 | 4.5 | 0 | 0 |
| M1991 | 1 | 2.6 | 0 | 75.4 | 1 | 9.5 | 0 | 2 | 0.5 | 0 | 0 | 8 | 0 | 0 |
| M1992 | 1.3 | 1 | 0 | 77.2 | 1 | 10 | 0 | 1 | 0.5 | 0 | 0 | 8 | 0 | 0 |
| M1993 | 1.1 | 2.1 | 0 | 72.8 | 1 | 7.5 | 0 | 1 | 0.5 | 0 | 0 | 14 | 0 | 0 |
| M1994 | 1.7 | 0.5 | 0 | 76.3 | 1 | 14 | 0 | 1 | 0.5 | 0 | 0 | 5 | 0 | 0 |
| M1995 | 1.1 | 2.9 | 0 | 78 | 1 | 9 | 0 | 2 | 0.5 | 0 | 0 | 5.5 | 0 | 0 |
| M1996 | 1.1 | 2.6 | 0 | 79.8 | 1 | 9 | 0 | 1.5 | 0.5 | 0 | 0 | 4.5 | 0 | 0 |
| M1997 | 0.6 | 2.5 | 0 | 79.4 | 1 | 6 | 0 | 2 | 0.5 | 0 | 0 | 8 | 0 | 0 |
| M1998 | 1 | 2.7 | 0 | 80.3 | 1 | 8 | 0 | 2 | 0.5 | 0 | 0 | 4.5 | 0 | 0 |
| M1999 | 2 | 3.8 | 0 | 57.7 | 0.5 | 18 | 0 | 1.5 | 0.5 | 0 | 0 | 16 | 0 | 0 |
| M2000 | 1.3 | 2.6 | 0 | 67.1 | 1 | 11 | 0 | 1.5 | 0.5 | 0 | 0 | 15 | 0 | 0 |
| M2001 | 1.7 | 2.5 | 0 | 72.8 | 1 | 14.5 | 0 | 2 | 0.5 | 0 | 0 | 5 | 0 | 0 |
| M2002 | 1.5 | 1 | 0 | 77 | 1 | 13 | 0 | 2 | 0.5 | 0 | 0 | 4 | 0 | 0 |
| M2003 | 1.4 | 3 | 0 | 78.1 | 1 | 10.5 | 0 | 1 | 0.5 | 0 | 0 | 4.5 | 0 | 0 |
| M2004 | 1.1 | 2.1 | 0 | 71.8 | 1 | 9.5 | 0 | 1 | 0.5 | 0 | 0 | 13 | 0 | 0 |
| M2005 | 1 | 2.8 | 0 | 76.2 | 1 | 9.5 | 0 | 2 | 0.5 | 0 | 0 | 7 | 0 | 0 |
| M2006 | 1.4 | 2.6 | 0 | 77 | 1 | 11.5 | 0 | 1.5 | 0.5 | 0 | 0 | 4.5 | 0 | 0 |
| M2007 | 1.2 | 2.5 | 0 | 69.3 | 1 | 8.5 | 0 | 1 | 0.5 | 0 | 0 | 16 | 0 | 0 |
| M2008 | 1.9 | 2.1 | 0 | 66.5 | 1 | 12 | 0 | 1.5 | 0.5 | 0 | 0 | 14.5 | 0 | 0 |
| M2009 | 0.5 | 4 | 0 | 75 | 1 | 6 | 0 | 1 | 0.5 | 0 | 0 | 12 | 0 | 0 |
| M2010 | 2 | 2.7 | 0 | 60.3 | 1 | 16.5 | 0 | 1.5 | 0.5 | 0 | 0 | 15.5 | 0 | 0 |
| M2011 | 0.8 | 2.5 | 0 | 74.2 | 1 | 2 | 0 | 1 | 0.5 | 0 | 0 | 18 | 0 | 0 |
| M2012 | 0.9 | 2.9 | 0 | 79.7 | 1 | 7.5 | 0 | 2 | 0.5 | 0 | 0 | 5.5 | 0 | 0 |
| M2013 | 2 | 1.7 | 0 | 67.3 | 1 | 14 | 0 | 2 | 0.5 | 0 | 0 | 11.5 | 0 | 0 |
| M2014 | 0.7 | 2.4 | 0 | 83.9 | 1 | 6 | 0 | 1.5 | 0.5 | 0 | 0 | 4 | 0 | 0 |
| M2015 | 2.1 | 0.8 | 0 | 71.6 | 1 | 18 | 0 | 1 | 0.5 | 0 | 0 | 5 | 0 | 0 |

TABLE 11-continued

Compositions and thermodynamic criteria for vanadium carbides

| | | | | | | | | | | | | | | |
|---|---|---|---|---|---|---|---|---|---|---|---|---|---|---|
| M2016 | 1.9 | 1.6 | 0 | 71.5 | 1 | 7.5 | 0 | 1 | 0.5 | 0 | 0 | 15 | 0 | 0 |
| M2017 | 1.6 | 2.2 | 0 | 68.2 | 1 | 10 | 0 | 2 | 0.5 | 0 | 0 | 14.5 | 0 | 0 |
| M2018 | 1.6 | 2.7 | 0 | 63.7 | 1 | 13 | 0 | 2 | 0.5 | 0 | 0 | 15.5 | 0 | 0 |
| M2019 | 1.1 | 2.1 | 0 | 72.3 | 1 | 8 | 0 | 1.5 | 0.5 | 0 | 0 | 13.5 | 0 | 0 |
| M2020 | 0.9 | 1.7 | 0 | 76.4 | 1 | 6.5 | 0 | 1.5 | 0.5 | 0 | 0 | 11.5 | 0 | 0 |
| M2021 | 0.6 | 2.5 | 0 | 82.4 | 1 | 6 | 0 | 1.5 | 0.5 | 0 | 0 | 5.5 | 0 | 0 |
| M2022 | 1 | 2.6 | 0 | 81.9 | 1 | 8 | 0 | 1 | 0.5 | 0 | 0 | 4 | 0 | 0 |
| M2023 | 1.7 | 1 | 0 | 73.3 | 1 | 13.5 | 0 | 1 | 0.5 | 0 | 0 | 8 | 0 | 0 |
| M2024 | 1.2 | 2.6 | 0 | 68.7 | 1 | 8 | 0 | 2 | 0.5 | 0 | 0 | 16 | 0 | 0 |
| M2025 | 0.8 | 3.1 | 0 | 69.6 | 1 | 4 | 0 | 1 | 0.5 | 0 | 0 | 20 | 0 | 0 |
| M2026 | 1.7 | 2.7 | 0 | 62.6 | 1 | 14.5 | 0 | 1.5 | 0.5 | 0 | 0 | 15.5 | 0 | 0 |
| M2027 | 1.9 | 1 | 0 | 73.6 | 1 | 10.5 | 0 | 1 | 0.5 | 0 | 0 | 10.5 | 0 | 0 |
| M2028 | 0.9 | 2.7 | 0 | 80.4 | 1 | 8 | 0 | 1 | 0.5 | 0 | 0 | 5.5 | 0 | 0 |
| M2029 | 1.2 | 1.5 | 0 | 75.3 | 1 | 8 | 0 | 1.5 | 0.5 | 0 | 0 | 11 | 0 | 0 |
| M2030 | 1.3 | 1.6 | 0 | 74.6 | 1 | 7 | 0 | 1.5 | 0.5 | 0 | 0 | 12.5 | 0 | 0 |
| M2031 | 0.8 | 2.1 | 0 | 74.6 | 1 | 6 | 0 | 1 | 0.5 | 0 | 0 | 14 | 0 | 0 |
| M2032 | 1.8 | 2.9 | 0 | 74.3 | 1 | 14 | 0 | 1.5 | 0.5 | 0 | 0 | 4 | 0 | 0 |
| M2033 | 0.9 | 2.8 | 0 | 77.8 | 1 | 8.5 | 0 | 2 | 0.5 | 0 | 0 | 6.5 | 0 | 0 |
| M2034 | 0.7 | 2.6 | 0 | 83.2 | 1 | 6 | 0 | 1.5 | 0.5 | 0 | 0 | 4.5 | 0 | 0 |
| M2035 | 1.7 | 2.4 | 0 | 64.9 | 1 | 13 | 0 | 2 | 0.5 | 0 | 0 | 14.5 | 0 | 0 |
| M2036 | 1.8 | 3 | 0 | 62.2 | 0 | 14 | 1 | 0 | 0 | 0 | 0 | 18 | 0 | 0 |
| M2037 | 1.6 | 1 | 0 | 75.4 | 1 | 9.5 | 0 | 2 | 0.5 | 0 | 0 | 9 | 0 | 0 |
| M2038 | 1.4 | 2 | 0 | 68.6 | 0 | 12 | 8 | 1 | 0 | 0 | 2 | 5 | 0 | 0 |
| M2039 | 1.9 | 1.2 | 0 | 72.4 | 1 | 10 | 0 | 2 | 0.5 | 0 | 0 | 11 | 0 | 0 |
| M2040 | 2 | 2.3 | 0 | 63.7 | 1 | 13.5 | 0 | 2 | 0.5 | 0 | 0 | 15 | 0 | 0 |
| M2041 | 0.7 | 3 | 0 | 79.8 | 1 | 6.5 | 0 | 2 | 0.5 | 0 | 0 | 6.5 | 0 | 0 |
| M2042 | 1.9 | 1.1 | 0 | 73.5 | 1 | 16.5 | 0 | 1.5 | 0.5 | 0 | 0 | 4 | 0 | 0 |
| M2043 | 1.2 | 1.6 | 0 | 77.65 | 2 | 10.5 | 0 | 0 | 0.5 | 0 | 0 | 6.55 | 0 | 0 |
| M2044 | 1.6 | 2.7 | 0 | 71.2 | 1 | 14.5 | 0 | 2 | 0.5 | 0 | 0 | 6.5 | 0 | 0 |
| M2045 | 0.9 | 2.2 | 0 | 72.9 | 1 | 7 | 0 | 1 | 0.5 | 0 | 0 | 14.5 | 0 | 0 |
| M2046 | 1.8 | 2.7 | 0 | 71.5 | 1 | 15.5 | 0 | 1.5 | 0.5 | 0 | 0 | 5.5 | 0 | 0 |
| M2047 | 1.8 | 2.2 | 0 | 76 | 0 | 15 | 3 | 0 | 0 | 0 | 0 | 2 | 0 | 0 |
| M2048 | 1.8 | 3 | 0 | 70.7 | 1 | 15.5 | 0 | 1 | 0.5 | 0 | 0 | 6.5 | 0 | 0 |
| M2049 | 0.8 | 2.7 | 0 | 78.5 | 1 | 8 | 0 | 2 | 0.5 | 0 | 0 | 6.5 | 0 | 0 |
| M2050 | 0.7 | 2.7 | 0 | 82.1 | 1 | 6.5 | 0 | 1 | 0.5 | 0 | 0 | 5.5 | 0 | 0 |
| M2051 | 1.6 | 2.1 | 0 | 68.8 | 1 | 14 | 0 | 2 | 0.5 | 0 | 0 | 10 | 0 | 0 |
| M2052 | 0.8 | 1.6 | 0 | 77.1 | 1 | 6.5 | 0 | 1 | 0.5 | 0 | 0 | 11.5 | 0 | 0 |
| M2053 | 0.9 | 2.9 | 0 | 80.2 | 1 | 7.5 | 0 | 2 | 0.5 | 0 | 0 | 5 | 0 | 0 |
| M2054 | 1.9 | 1.1 | 0 | 71.5 | 1 | 13 | 0 | 2 | 0.5 | 0 | 0 | 9 | 0 | 0 |
| M2055 | 1 | 2.2 | 0 | 71.8 | 1 | 8 | 0 | 1 | 0.5 | 0 | 0 | 14.5 | 0 | 0 |
| M2056 | 0.8 | 2.4 | 0 | 74.3 | 1 | 2 | 0 | 1 | 0.5 | 0 | 0 | 18 | 0 | 0 |
| M2057 | 0.9 | 2.4 | 0 | 80.7 | 1 | 8.5 | 0 | 1 | 0.5 | 0 | 0 | 5 | 0 | 0 |
| M2058 | 1.2 | 2.7 | 0 | 79.1 | 1 | 10 | 0 | 1 | 0.5 | 0 | 0 | 4.5 | 0 | 0 |
| M2059 | 1.6 | 2.7 | 0 | 72.7 | 1 | 14 | 0 | 2 | 0.5 | 0 | 0 | 5.5 | 0 | 0 |
| M2060 | 1.7 | 2.7 | 0 | 62.6 | 1 | 13.5 | 0 | 2 | 0.5 | 0 | 0 | 16 | 0 | 0 |
| M2061 | 1.8 | 1 | 0 | 73.7 | 1 | 10.5 | 0 | 1.5 | 0.5 | 0 | 0 | 10 | 0 | 0 |
| M2062 | 1.2 | 3 | 0 | 78.8 | 1 | 9.5 | 0 | 1.5 | 0.5 | 0 | 0 | 4.5 | 0 | 0 |
| M2063 | 0.8 | 3 | 0 | 69.7 | 1 | 4 | 0 | 1 | 0.5 | 0 | 0 | 20 | 0 | 0 |
| M2064 | 1 | 1.3 | 0 | 77.7 | 1 | 6.5 | 0 | 2 | 0.5 | 0 | 0 | 10 | 0 | 0 |
| M2065 | 1.4 | 1 | 0 | 76.1 | 1 | 9.5 | 0 | 2 | 0.5 | 0 | 0 | 8.5 | 0 | 0 |
| M2066 | 0.7 | 3.3 | 0 | 67.5 | 1 | 6 | 0 | 1 | 0.5 | 0 | 0 | 20 | 0 | 0 |
| M2067 | 1.8 | 3 | 0 | 69.2 | 1 | 16 | 0 | 1.5 | 0.5 | 0 | 0 | 7 | 0 | 0 |
| M2068 | 1.9 | 1 | 0 | 74.1 | 1 | 16.5 | 0 | 1 | 0.5 | 0 | 0 | 4 | 0 | 0 |
| M2069 | 1.6 | 2.7 | 0 | 73.7 | 1 | 14 | 0 | 1 | 0.5 | 0 | 0 | 5.5 | 0 | 0 |
| M2070 | 0.6 | 4 | 0 | 76.9 | 1 | 6 | 0 | 1 | 0.5 | 0 | 0 | 10 | 0 | 0 |
| M2071 | 2 | 1.7 | 0 | 67.3 | 1 | 13 | 0 | 1 | 0.5 | 0 | 0 | 13.5 | 0 | 0 |
| M2072 | 1.4 | 1 | 0 | 77.6 | 1 | 6 | 0 | 2 | 0.5 | 0 | 0 | 10.5 | 0 | 0 |
| M2073 | 1.5 | 1.7 | 0 | 72.3 | 1 | 7.5 | 0 | 1.5 | 0.5 | 0 | 0 | 14 | 0 | 0 |
| M2074 | 1 | 2.1 | 0 | 71.9 | 1 | 8.5 | 0 | 2 | 0.5 | 0 | 0 | 13 | 0 | 0 |
| M2075 | 1 | 2.6 | 0 | 79.9 | 1 | 9 | 0 | 1 | 0.5 | 0 | 0 | 5 | 0 | 0 |
| M2076 | 0.8 | 2.7 | 0 | 80.5 | 1 | 7.5 | 0 | 1.5 | 0.5 | 0 | 0 | 5.5 | 0 | 0 |
| M2077 | 1.2 | 2.9 | 0 | 75.4 | 1 | 11 | 0 | 1.5 | 0.5 | 0 | 0 | 6.5 | 0 | 0 |
| M2078 | 1 | 1.7 | 0 | 74.8 | 1 | 7.5 | 0 | 1.5 | 0.5 | 0 | 0 | 12 | 0 | 0 |
| M2079 | 2 | 1.6 | 0 | 68.9 | 1 | 10.5 | 0 | 2 | 0.5 | 0 | 0 | 13.5 | 0 | 0 |
| M2080 | 0.8 | 2.1 | 0 | 73.6 | 1 | 7 | 0 | 2 | 0.5 | 0 | 0 | 13 | 0 | 0 |
| M2081 | 1.6 | 2.1 | 0 | 67.8 | 1 | 11 | 0 | 1 | 0.5 | 0 | 0 | 15 | 0 | 0 |
| M2082 | 1.7 | 1 | 0 | 74.8 | 1 | 9 | 0 | 1 | 0.5 | 0 | 0 | 11 | 0 | 0 |
| M2083 | 1.7 | 2.5 | 0 | 63.3 | 1 | 14.5 | 0 | 1.5 | 0.5 | 0 | 0 | 15 | 0 | 0 |
| M2084 | 0.9 | 1.8 | 0 | 75.3 | 1 | 6 | 0 | 2 | 0.5 | 0 | 0 | 12.5 | 0 | 0 |
| M2085 | 0.7 | 2.7 | 0 | 77.1 | 1 | 7 | 0 | 1.5 | 0.5 | 0 | 0 | 9.5 | 0 | 0 |
| M2086 | 0.8 | 2.7 | 0 | 81 | 1 | 7.5 | 0 | 1 | 0.5 | 0 | 0 | 5.5 | 0 | 0 |
| M2087 | 2 | 1.1 | 0 | 73.4 | 1 | 7 | 0 | 2 | 0.5 | 0 | 0 | 13 | 0 | 0 |
| M2088 | 0.7 | 2.5 | 0 | 82.8 | 1 | 6.5 | 0 | 1.5 | 0.5 | 0 | 0 | 4.5 | 0 | 0 |
| M2089 | 1.7 | 1.8 | 0 | 71 | 1 | 15 | 0 | 1.5 | 0.5 | 0 | 0 | 7.5 | 0 | 0 |
| M2090 | 0.9 | 2.3 | 0 | 71.8 | 1 | 7 | 0 | 1.5 | 0.5 | 0 | 0 | 15 | 0 | 0 |
| M2091 | 0.7 | 2.5 | 0 | 83.3 | 1 | 6.5 | 0 | 1 | 0.5 | 0 | 0 | 4.5 | 0 | 0 |
| M2092 | 0.9 | 2.7 | 0 | 71.4 | 1 | 8 | 0 | 1 | 0.5 | 0 | 0 | 14.5 | 0 | 0 |
| M2093 | 0.8 | 2.7 | 0 | 81.5 | 1 | 7 | 0 | 2 | 0.5 | 0 | 0 | 4.5 | 0 | 0 |

TABLE 11-continued

Compositions and thermodynamic criteria for vanadium carbides

| | | | | | | | | | | | | | | | |
|---|---|---|---|---|---|---|---|---|---|---|---|---|---|---|---|
| M2094 | 1.4 | 2.7 | 0 | 74.9 | 1 | 12.5 | 0 | 1.5 | 0.5 | 0 | 0 | 5.5 | 0 | 0 |
| M2095 | 0.6 | 2.9 | 0 | 79.5 | 1 | 6.5 | 0 | 2 | 0.5 | 0 | 0 | 7 | 0 | 0 |
| M2096 | 0.8 | 2.8 | 0 | 78.9 | 1 | 8 | 0 | 1.5 | 0.5 | 0 | 0 | 6.5 | 0 | 0 |
| M2097 | 0.7 | 2.6 | 0 | 80.7 | 1 | 7 | 0 | 2 | 0.5 | 0 | 0 | 5.5 | 0 | 0 |
| M2098 | 1.7 | 1.5 | 0 | 72.8 | 1 | 6 | 0 | 2 | 0.5 | 0 | 0 | 14.5 | 0 | 0 |
| M2099 | 1.7 | 3 | 0 | 62.8 | 1 | 15 | 0 | 1.5 | 0.5 | 0 | 0 | 14.5 | 0 | 0 |
| M2100 | 0.9 | 2.7 | 0 | 82.4 | 1 | 7.5 | 0 | 1 | 0.5 | 0 | 0 | 4 | 0 | 0 |
| M2101 | 1.4 | 2.2 | 0 | 71.4 | 0 | 12 | 2 | 0 | 0 | 0 | 8 | 3 | 0 | 0 |
| M2102 | 1.6 | 1.2 | 0 | 74.2 | 1 | 8 | 0 | 1.5 | 0.5 | 0 | 0 | 12 | 0 | 0 |
| M2103 | 1.1 | 2.7 | 0 | 79.7 | 1 | 9.5 | 0 | 1 | 0.5 | 0 | 0 | 4.5 | 0 | 0 |
| M2104 | 1.8 | 3 | 0 | 69.7 | 1 | 16 | 0 | 1.5 | 0.5 | 0 | 0 | 6.5 | 0 | 0 |
| M2105 | 1.9 | 2.6 | 0 | 61.5 | 1 | 16.5 | 0 | 1.5 | 0.5 | 0 | 0 | 14.5 | 0 | 0 |
| M2106 | 0.8 | 2.6 | 0 | 82.1 | 1 | 7 | 0 | 2 | 0.5 | 0 | 0 | 4 | 0 | 0 |
| M2107 | 1.9 | 2.1 | 0 | 65.5 | 1 | 16.5 | 0 | 1 | 0.5 | 0 | 0 | 11.5 | 0 | 0 |
| M2108 | 2 | 3.6 | 0 | 57.9 | 0.5 | 18 | 0 | 1.5 | 0.5 | 0 | 0 | 16 | 0 | 0 |
| M2109 | 1.8 | 2.2 | 0 | 78 | 0 | 15 | 0.5 | 0 | 0 | 0 | 1 | 1.5 | 0 | 0 |
| M2110 | 1.7 | 1 | 0 | 74.8 | 1 | 8.5 | 0 | 1 | 0.5 | 0 | 0 | 11.5 | 0 | 0 |
| M2111 | 1.5 | 2.3 | 0 | 66.7 | 1 | 11 | 0 | 1.5 | 0.5 | 0 | 0 | 15.5 | 0 | 0 |
| M2112 | 0.6 | 2.7 | 0 | 72.2 | 1 | 4 | 0 | 1 | 0.5 | 0 | 0 | 18 | 0 | 0 |
| M2113 | 1.2 | 3 | 0 | 77.8 | 1 | 10 | 0 | 2 | 0.5 | 0 | 0 | 4.5 | 0 | 0 |
| M2114 | 1 | 1.4 | 0 | 77.1 | 1 | 6 | 0 | 1 | 0.5 | 0 | 0 | 12 | 0 | 0 |
| M2115 | 1.2 | 2.9 | 0 | 75.4 | 1 | 11 | 0 | 2 | 0.5 | 0 | 0 | 6 | 0 | 0 |
| M2116 | 1 | 2.9 | 0 | 79.6 | 1 | 8.5 | 0 | 2 | 0.5 | 0 | 0 | 4.5 | 0 | 0 |
| M2117 | 1.9 | 1.3 | 0 | 71.8 | 1 | 8 | 0 | 2 | 0.5 | 0 | 0 | 13.5 | 0 | 0 |
| M2118 | 2.2 | 2 | 0 | 64.8 | 0 | 16 | 1 | 0 | 0 | 0 | 0 | 14 | 0 | 0 |
| M2119 | 1.9 | 2.1 | 0 | 63.5 | 1 | 16.5 | 0 | 2 | 0.5 | 0 | 0 | 12.5 | 0 | 0 |
| M2120 | 2 | 2.3 | 0 | 62.2 | 1 | 15 | 0 | 2 | 0.5 | 0 | 0 | 15 | 0 | 0 |
| M2121 | 0.8 | 2.8 | 0 | 82.4 | 1 | 7 | 0 | 1 | 0.5 | 0 | 0 | 4.5 | 0 | 0 |
| M2122 | 0.8 | 2.7 | 0 | 72 | 1 | 2 | 0 | 1 | 0.5 | 0 | 0 | 20 | 0 | 0 |
| M2123 | 1.4 | 2.9 | 0 | 72.7 | 1 | 13 | 0 | 2 | 0.5 | 0 | 0 | 6.5 | 0 | 0 |
| M2124 | 1.9 | 1.6 | 0 | 70 | 1 | 8 | 0 | 1.5 | 0.5 | 0 | 0 | 15.5 | 0 | 0 |
| M2125 | 1.2 | 1 | 0 | 77.3 | 1 | 8.5 | 0 | 1 | 0.5 | 0 | 0 | 9.5 | 0 | 0 |
| M2126 | 1.4 | 1.4 | 0 | 73.2 | 0 | 12 | 3 | 1 | 0 | 0 | 2 | 6 | 0 | 0 |
| M2127 | 0.8 | 2.6 | 0 | 79.6 | 1 | 8 | 0 | 2 | 0.5 | 0 | 0 | 5.5 | 0 | 0 |
| M2128 | 1.6 | 1.6 | 0 | 70.8 | 1 | 9.5 | 0 | 1.5 | 0.5 | 0 | 0 | 13.5 | 0 | 0 |
| M2129 | 1.2 | 1.5 | 0 | 73.8 | 1 | 8.5 | 0 | 2 | 0.5 | 0 | 0 | 11.5 | 0 | 0 |
| M2130 | 0.7 | 1.8 | 0 | 77 | 1 | 4 | 0 | 1 | 0.5 | 0 | 0 | 14 | 0 | 0 |
| M2131 | 1.3 | 1.1 | 0 | 76.1 | 1 | 7.5 | 0 | 2 | 0.5 | 0 | 0 | 10.5 | 0 | 0 |
| M2132 | 0.6 | 3 | 0 | 80.9 | 1 | 6 | 0 | 2 | 0.5 | 0 | 0 | 6 | 0 | 0 |
| M2133 | 1.3 | 1.2 | 0 | 75.5 | 1 | 7.5 | 0 | 1.5 | 0.5 | 0 | 0 | 11.5 | 0 | 0 |
| M2134 | 0.7 | 2.5 | 0 | 83.3 | 1 | 6.5 | 0 | 1.5 | 0.5 | 0 | 0 | 4 | 0 | 0 |
| M2135 | 1.6 | 2.7 | 0 | 72.7 | 1 | 14.5 | 0 | 1.5 | 0.5 | 0 | 0 | 5.5 | 0 | 0 |
| M2136 | 0.7 | 2.9 | 0 | 80.4 | 1 | 7 | 0 | 1.5 | 0.5 | 0 | 0 | 6 | 0 | 0 |
| M2137 | 2 | 1.6 | 0 | 66.9 | 1 | 13.5 | 0 | 1.5 | 0.5 | 0 | 0 | 13 | 0 | 0 |
| M2138 | 0.6 | 2.5 | 0 | 82.4 | 1 | 6.5 | 0 | 1 | 0.5 | 0 | 0 | 5.5 | 0 | 0 |
| M2139 | 0.6 | 3.7 | 0 | 79.2 | 1 | 6 | 0 | 1 | 0.5 | 0 | 0 | 8 | 0 | 0 |
| M2140 | 0.9 | 1.9 | 0 | 73.7 | 1 | 6.5 | 0 | 1.5 | 0.5 | 0 | 0 | 14 | 0 | 0 |
| M2141 | 0.9 | 2.5 | 0 | 80.1 | 1 | 8.5 | 0 | 2 | 0.5 | 0 | 0 | 4.5 | 0 | 0 |
| M2142 | 0.7 | 2.9 | 0 | 80.9 | 1 | 7 | 0 | 1 | 0.5 | 0 | 0 | 6 | 0 | 0 |
| M2143 | 1.4 | 2.9 | 0 | 76.2 | 1 | 12 | 0 | 1.5 | 0.5 | 0 | 0 | 4.5 | 0 | 0 |
| M2144 | 0.9 | 2.8 | 0 | 80.8 | 1 | 8 | 0 | 1.5 | 0.5 | 0 | 0 | 4.5 | 0 | 0 |
| M2145 | 1.8 | 3 | 0 | 61.2 | 0 | 14 | 2 | 0 | 0 | 0 | 0 | 18 | 0 | 0 |
| M2146 | 0.9 | 1 | 0 | 78.6 | 1 | 7.5 | 0 | 2 | 0.5 | 0 | 0 | 8.5 | 0 | 0 |
| M2147 | 1 | 3 | 0 | 80.5 | 1 | 8.5 | 0 | 1 | 0.5 | 0 | 0 | 4.5 | 0 | 0 |
| M2148 | 1.2 | 1.5 | 0 | 74.8 | 1 | 7 | 0 | 1 | 0.5 | 0 | 0 | 13 | 0 | 0 |
| M2149 | 1.6 | 0.7 | 0 | 78.2 | 1 | 14 | 0 | 1 | 0.5 | 0 | 0 | 3 | 0 | 0 |
| M2150 | 1.2 | 1.7 | 0 | 73.1 | 1 | 8 | 0 | 1 | 0.5 | 0 | 0 | 13.5 | 0 | 0 |
| M2151 | 1.9 | 1 | 0 | 70.6 | 1 | 14 | 0 | 1.5 | 0.5 | 0 | 0 | 9.5 | 0 | 0 |
| M2152 | 0.7 | 2.8 | 0 | 80.5 | 1 | 7 | 0 | 2 | 0.5 | 0 | 0 | 5.5 | 0 | 0 |
| M2153 | 2 | 1.6 | 0 | 66.9 | 1 | 13 | 0 | 2 | 0.5 | 0 | 0 | 13 | 0 | 0 |
| M2154 | 1.6 | 1.1 | 0 | 74.3 | 0 | 14 | 0 | 0 | 0 | 0 | 0 | 9 | 0 | 0 |
| M2155 | 1.3 | 2.4 | 0 | 76.8 | 1 | 12 | 0 | 1.5 | 0.5 | 0 | 0 | 4.5 | 0 | 0 |
| M2156 | 0.9 | 1.9 | 0 | 73.7 | 1 | 6 | 0 | 2 | 0.5 | 0 | 0 | 14 | 0 | 0 |
| M2157 | 1.4 | 4 | 0 | 63.1 | 0.5 | 14 | 0 | 1.5 | 0.5 | 0 | 0 | 15 | 0 | 0 |
| M2158 | 0.8 | 2.7 | 0 | 79.5 | 1 | 8 | 0 | 2 | 0.5 | 0 | 0 | 5.5 | 0 | 0 |
| M2159 | 1.3 | 1.2 | 0 | 76 | 1 | 7 | 0 | 1 | 0.5 | 0 | 0 | 12 | 0 | 0 |
| M2160 | 1 | 2.8 | 0 | 79.2 | 1 | 9 | 0 | 2 | 0.5 | 0 | 0 | 4.5 | 0 | 0 |
| M2161 | 1.4 | 3 | 0 | 76.1 | 1 | 12 | 0 | 1.5 | 0.5 | 0 | 0 | 4.5 | 0 | 0 |
| M2162 | 1 | 1.1 | 0 | 77.4 | 1 | 7.5 | 0 | 1.5 | 0.5 | 0 | 0 | 10 | 0 | 0 |
| M2163 | 2 | 1.1 | 0 | 69.4 | 1 | 14 | 0 | 1.5 | 0.5 | 0 | 0 | 10.5 | 0 | 0 |
| M2164 | 1.7 | 2.4 | 0 | 65.4 | 1 | 15 | 0 | 2 | 0.5 | 0 | 0 | 12 | 0 | 0 |
| M2165 | 0.8 | 2.7 | 0 | 81 | 1 | 7.5 | 0 | 2 | 0.5 | 0 | 0 | 4.5 | 0 | 0 |
| M2166 | 1.4 | 1 | 0 | 76.6 | 1 | 6 | 0 | 1.5 | 0.5 | 0 | 0 | 12 | 0 | 0 |
| M2167 | 0.9 | 2.9 | 0 | 81.2 | 1 | 8 | 0 | 1 | 0.5 | 0 | 0 | 4.5 | 0 | 0 |
| M2168 | 1.7 | 2.5 | 0 | 72.8 | 1 | 15.5 | 0 | 1 | 0.5 | 0 | 0 | 5 | 0 | 0 |
| M2169 | 2.2 | 3 | 0 | 62.8 | 0 | 20 | 0 | 0 | 0 | 0 | 0 | 12 | 0 | 0 |
| M2170 | 0.9 | 3 | 0 | 70.6 | 1 | 8.5 | 0 | 2 | 0.5 | 0 | 0 | 13.5 | 0 | 0 |
| M2171 | 1.1 | 2.7 | 0 | 78.7 | 1 | 10 | 0 | 1.5 | 0.5 | 0 | 0 | 4.5 | 0 | 0 |

TABLE 11-continued

Compositions and thermodynamic criteria for vanadium carbides

| | | | | | | | | | | | | | | |
|---|---|---|---|---|---|---|---|---|---|---|---|---|---|---|
| M2172 | 0.6 | 2.6 | 0 | 83.3 | 1 | 6 | 0 | 1.5 | 0.5 | 0 | 0 | 4.5 | 0 | 0 |
| M2173 | 0.7 | 3 | 0 | 83.3 | 1 | 6 | 0 | 1.5 | 0.5 | 0 | 0 | 4 | 0 | 0 |
| M2174 | 0.9 | 3 | 0 | 78.1 | 1 | 9 | 0 | 1 | 0.5 | 0 | 0 | 6.5 | 0 | 0 |
| M2175 | 1.8 | 3 | 0 | 69.7 | 1 | 16.5 | 0 | 1 | 0.5 | 0 | 0 | 6.5 | 0 | 0 |
| M2176 | 1.4 | 1.4 | 0 | 73.2 | 0 | 12 | 6 | 0 | 0 | 0 | 3 | 3 | 0 | 0 |
| M2177 | 1 | 1 | 0 | 78 | 1 | 6.5 | 0 | 2 | 0.5 | 0 | 0 | 10 | 0 | 0 |
| M2178 | 0.9 | 2.3 | 0 | 70.8 | 1 | 6.5 | 0 | 2 | 0.5 | 0 | 0 | 16 | 0 | 0 |
| M2179 | 0.9 | 3 | 0 | 81.1 | 1 | 8 | 0 | 1 | 0.5 | 0 | 0 | 4.5 | 0 | 0 |
| M2180 | 1.4 | 2.8 | 0 | 74.3 | 1 | 13 | 0 | 1.5 | 0.5 | 0 | 0 | 5.5 | 0 | 0 |
| M2181 | 0.8 | 2.6 | 0 | 72.1 | 1 | 2 | 0 | 1 | 0.5 | 0 | 0 | 20 | 0 | 0 |
| M2182 | 0.9 | 2.9 | 0 | 80.7 | 1 | 8 | 0 | 2 | 0.5 | 0 | 0 | 4 | 0 | 0 |
| M2183 | 1.6 | 1.6 | 0 | 70.8 | 1 | 8 | 0 | 1.5 | 0.5 | 0 | 0 | 15 | 0 | 0 |
| M2184 | 1.6 | 1.5 | 0 | 69.9 | 1 | 12.5 | 0 | 1 | 0.5 | 0 | 0 | 12 | 0 | 0 |
| M2185 | 1.5 | 2.7 | 0 | 75.3 | 1 | 13.5 | 0 | 1 | 0.5 | 0 | 0 | 4.5 | 0 | 0 |
| M2186 | 1.8 | 3 | 0 | 69.2 | 1 | 16.5 | 0 | 2 | 0.5 | 0 | 0 | 6 | 0 | 0 |
| M2187 | 1.4 | 1.1 | 0 | 78.5 | 1 | 12.5 | 0 | 1 | 0.5 | 0 | 0 | 4 | 0 | 0 |
| M2188 | 1.5 | 3 | 0 | 75 | 1 | 13 | 0 | 2 | 0.5 | 0 | 0 | 4 | 0 | 0 |
| M2189 | 0.6 | 2.5 | 0 | 77.4 | 1 | 6 | 0 | 1.5 | 0.5 | 0 | 0 | 10.5 | 0 | 0 |
| M2190 | 1.2 | 3 | 0 | 77.8 | 1 | 10.5 | 0 | 2 | 0.5 | 0 | 0 | 4 | 0 | 0 |
| M2191 | 1.6 | 1.4 | 0 | 72 | 0 | 12 | 2 | 1 | 0 | 0 | 2 | 8 | 0 | 0 |
| M2192 | 2.2 | 2.8 | 0 | 69 | 0 | 20 | 0 | 0 | 0 | 0 | 6 | 0 | 0 | 0 |
| M2193 | 1.4 | 2.9 | 0 | 73.2 | 1 | 13.5 | 0 | 1 | 0.5 | 0 | 0 | 6.5 | 0 | 0 |
| M2194 | 1.9 | 1.4 | 0 | 69.2 | 1 | 10 | 0 | 2 | 0.5 | 0 | 0 | 14 | 0 | 0 |
| M2195 | 1.8 | 2.2 | 0 | 61 | 0 | 15 | 15 | 0 | 0 | 0 | 1 | 4 | 0 | 0 |
| M2196 | 2 | 3.6 | 0 | 56.9 | 0.5 | 18 | 0 | 1.5 | 0.5 | 0 | 0 | 17 | 0 | 0 |
| M2197 | 1.7 | 1 | 0 | 73.3 | 1 | 9 | 0 | 1.5 | 0.5 | 0 | 0 | 12 | 0 | 0 |
| M2198 | 0.7 | 2.9 | 0 | 80.9 | 1 | 7 | 0 | 2 | 0.5 | 0 | 0 | 5 | 0 | 0 |
| M2199 | 0.7 | 2.7 | 0 | 80.6 | 1 | 7.5 | 0 | 1.5 | 0.5 | 0 | 0 | 5.5 | 0 | 0 |
| M2200 | 1.2 | 1.9 | 0 | 70.4 | 1 | 9 | 0 | 1.5 | 0.5 | 0 | 0 | 14.5 | 0 | 0 |
| M2201 | 0.9 | 2.8 | 0 | 80.8 | 1 | 8.5 | 0 | 1 | 0.5 | 0 | 0 | 4.5 | 0 | 0 |
| M2202 | 2 | 2.4 | 0 | 70.1 | 1 | 18 | 0 | 2 | 0.5 | 0 | 0 | 4 | 0 | 0 |
| M2203 | 1 | 2.3 | 0 | 70.2 | 1 | 9 | 0 | 1 | 0.5 | 0 | 0 | 15 | 0 | 0 |
| M2204 | 1.6 | 1.6 | 0 | 69.8 | 1 | 9 | 0 | 2 | 0.5 | 0 | 0 | 14.5 | 0 | 0 |
| M2205 | 0.8 | 1.6 | 0 | 75.6 | 1 | 6 | 0 | 1.5 | 0.5 | 0 | 0 | 13 | 0 | 0 |
| M2206 | 2 | 3.4 | 0 | 58.1 | 0.5 | 18 | 0 | 1.5 | 0.5 | 0 | 0 | 16 | 0 | 0 |
| M2207 | 1.8 | 3 | 0 | 61.2 | 0 | 14 | 0 | 0 | 0 | 0 | 0 | 20 | 0 | 0 |
| M2208 | 1 | 3 | 0 | 79.5 | 1 | 9 | 0 | 2 | 0.5 | 0 | 0 | 4 | 0 | 0 |
| M2209 | 1.1 | 2.8 | 0 | 79.6 | 1 | 10 | 0 | 1 | 0.5 | 0 | 0 | 4 | 0 | 0 |
| M2210 | 0.9 | 2.9 | 0 | 80.2 | 1 | 8.5 | 0 | 1.5 | 0.5 | 0 | 0 | 4.5 | 0 | 0 |
| M2211 | 0.8 | 3 | 0 | 80.2 | 1 | 8 | 0 | 1 | 0.5 | 0 | 0 | 5.5 | 0 | 0 |
| M2212 | 1.9 | 1.6 | 0 | 66.5 | 1 | 13 | 0 | 2 | 0.5 | 0 | 0 | 13.5 | 0 | 0 |
| M2213 | 1.8 | 2.2 | 0 | 66 | 0 | 14 | 0 | 0 | 0 | 0 | 0 | 16 | 0 | 0 |
| M2214 | 1.6 | 1.2 | 0 | 72.2 | 1 | 8.5 | 0 | 2 | 0.5 | 0 | 0 | 13 | 0 | 0 |
| M2215 | 1.7 | 2.2 | 0 | 64.1 | 1 | 13 | 0 | 1.5 | 0.5 | 0 | 0 | 16 | 0 | 0 |
| M2216 | 0.7 | 2.8 | 0 | 81.5 | 1 | 7 | 0 | 2 | 0.5 | 0 | 0 | 4.5 | 0 | 0 |
| M2217 | 1.8 | 2.3 | 0 | 70.9 | 1 | 17 | 0 | 1.5 | 0.5 | 0 | 0 | 5 | 0 | 0 |
| M2218 | 1.8 | 1.1 | 0 | 71.6 | 1 | 11 | 0 | 1 | 0.5 | 0 | 0 | 12 | 0 | 0 |
| M2219 | 1 | 1.9 | 0 | 74.6 | 1 | 9 | 0 | 1 | 0.5 | 0 | 0 | 11 | 0 | 0 |
| M2220 | 1.3 | 2.8 | 0 | 73.9 | 1 | 13 | 0 | 1 | 0.5 | 0 | 0 | 6.5 | 0 | 0 |
| M2221 | 1.2 | 2 | 0 | 76.8 | 1 | 11.5 | 0 | 1.5 | 0.5 | 0 | 0 | 5.5 | 0 | 0 |
| M2222 | 0.9 | 2.3 | 0 | 80.3 | 1 | 9 | 0 | 2 | 0.5 | 0 | 0 | 4 | 0 | 0 |
| M2223 | 0.6 | 2.5 | 0 | 82.9 | 1 | 6.5 | 0 | 1.5 | 0.5 | 0 | 0 | 4.5 | 0 | 0 |
| M2224 | 1 | 2.8 | 0 | 76.7 | 1 | 10.5 | 0 | 1 | 0.5 | 0 | 0 | 6.5 | 0 | 0 |
| M2225 | 0.8 | 2.9 | 0 | 80.3 | 1 | 8 | 0 | 1.5 | 0.5 | 0 | 0 | 5 | 0 | 0 |
| M2226 | 1 | 1.9 | 0 | 72.1 | 1 | 9 | 0 | 1 | 0.5 | 0 | 0 | 13.5 | 0 | 0 |
| M2227 | 2 | 1 | 0 | 70 | 1 | 11.5 | 0 | 2 | 0.5 | 0 | 0 | 12 | 0 | 0 |
| M2228 | 0.8 | 2.7 | 0 | 81 | 1 | 8 | 0 | 1.5 | 0.5 | 0 | 0 | 4.5 | 0 | 0 |
| M2229 | 0.3 | 3.8 | 0 | 73.4 | 1 | 4 | 0 | 1 | 0.5 | 0 | 0 | 16 | 0 | 0 |
| M2230 | 0.8 | 2.1 | 0 | 74.6 | 1 | 2 | 0 | 1 | 0.5 | 0 | 0 | 18 | 0 | 0 |
| M2231 | 0.7 | 2.9 | 0 | 79.9 | 1 | 7.5 | 0 | 2 | 0.5 | 0 | 0 | 5.5 | 0 | 0 |
| M2232 | 1.7 | 1.6 | 0 | 68.7 | 1 | 9.5 | 0 | 2 | 0.5 | 0 | 0 | 15 | 0 | 0 |
| M2233 | 2 | 3 | 0 | 63.5 | 1 | 19.5 | 0 | 1.5 | 0.5 | 0 | 0 | 9 | 0 | 0 |
| M2234 | 1 | 2.3 | 0 | 70.7 | 1 | 9 | 0 | 2 | 0.5 | 0 | 0 | 13.5 | 0 | 0 |
| M2235 | 0.7 | 2.9 | 0 | 80.4 | 1 | 7.5 | 0 | 1.5 | 0.5 | 0 | 0 | 5.5 | 0 | 0 |
| M2236 | 1.4 | 3.8 | 0 | 63.3 | 0.5 | 14 | 0 | 1.5 | 0.5 | 0 | 0 | 15 | 0 | 0 |
| M2237 | 1.3 | 2.5 | 0 | 76.2 | 1 | 12.5 | 0 | 1.5 | 0.5 | 0 | 0 | 4.5 | 0 | 0 |
| M2238 | 0.7 | 2.9 | 0 | 80.9 | 1 | 7.5 | 0 | 1 | 0.5 | 0 | 0 | 5.5 | 0 | 0 |
| M2239 | 1 | 1.5 | 0 | 76 | 1 | 9 | 0 | 1.5 | 0.5 | 0 | 0 | 9.5 | 0 | 0 |
| M2240 | 2 | 3 | 0 | 69 | 1 | 18 | 0 | 2 | 0.5 | 0 | 0 | 4.5 | 0 | 0 |
| M2241 | 2 | 1.6 | 0 | 68.9 | 1 | 18 | 0 | 2 | 0.5 | 0 | 0 | 6 | 0 | 0 |
| M2242 | 0.8 | 2.8 | 0 | 80.9 | 1 | 8 | 0 | 1.5 | 0.5 | 0 | 0 | 4.5 | 0 | 0 |
| M2243 | 2 | 2.7 | 0 | 61.8 | 1 | 18 | 0 | 1.5 | 0.5 | 0 | 0 | 12.5 | 0 | 0 |
| M2244 | 1 | 2.4 | 0 | 75.1 | 1 | 10 | 0 | 2 | 0.5 | 0 | 0 | 8 | 0 | 0 |
| M2245 | 0.7 | 2 | 0 | 73.3 | 1 | 6 | 0 | 1.5 | 0.5 | 0 | 0 | 15 | 0 | 0 |
| M2246 | 0.7 | 3 | 0 | 81.8 | 1 | 7 | 0 | 1.5 | 0.5 | 0 | 0 | 4.5 | 0 | 0 |
| M2247 | 2.2 | 2.8 | 0 | 63 | 0 | 20 | 0 | 0 | 0 | 0 | 0 | 12 | 0 | 0 |
| M2248 | 0.6 | 2.9 | 0 | 73.5 | 1 | 6 | 0 | 2 | 0.5 | 0 | 0 | 13.5 | 0 | 0 |
| M2249 | 1.3 | 2.8 | 0 | 68.4 | 1 | 12 | 0 | 1 | 0.5 | 0 | 0 | 13 | 0 | 0 |

TABLE 11-continued

Compositions and thermodynamic criteria for vanadium carbides

| | | | | | | | | | | | | | | |
|---|---|---|---|---|---|---|---|---|---|---|---|---|---|---|
| M2250 | 1.9 | 1 | 0 | 70.1 | 1 | 14 | 0 | 1 | 0.5 | 0 | 0 | 10.5 | 0 | 0 |
| M2251 | 2 | 2.7 | 0 | 64.8 | 1 | 19 | 0 | 1 | 0.5 | 0 | 0 | 9 | 0 | 0 |
| M2252 | 1.4 | 3 | 0 | 75.1 | 1 | 13 | 0 | 1.5 | 0.5 | 0 | 0 | 4.5 | 0 | 0 |
| M2253 | 1.8 | 3 | 0 | 61.2 | 0 | 16 | 0 | 0 | 0 | 0 | 0 | 18 | 0 | 0 |
| M2254 | 0.7 | 2.8 | 0 | 81.5 | 1 | 7.5 | 0 | 1 | 0.5 | 0 | 0 | 5 | 0 | 0 |
| M2255 | 1.2 | 2.8 | 0 | 74 | 1 | 12.5 | 0 | 1.5 | 0.5 | 0 | 0 | 6.5 | 0 | 0 |
| M2256 | 1.4 | 1.8 | 0 | 71.8 | 0 | 12 | 0 | 1 | 0 | 0 | 6 | 6 | 0 | 0 |
| M2257 | 0.7 | 2.4 | 0 | 79.4 | 1 | 7.5 | 0 | 1 | 0.5 | 0 | 0 | 7.5 | 0 | 0 |
| M2258 | 1.5 | 1 | 0 | 74 | 1 | 9.5 | 0 | 1 | 0.5 | 0 | 0 | 11.5 | 0 | 0 |
| M2259 | 1.4 | 1.3 | 0 | 73.3 | 1 | 8 | 0 | 1 | 0.5 | 0 | 0 | 13.5 | 0 | 0 |
| M2260 | 0.9 | 2.9 | 0 | 79.7 | 1 | 9 | 0 | 1.5 | 0.5 | 0 | 0 | 4.5 | 0 | 0 |
| M2261 | 2 | 2.3 | 0 | 64.7 | 1 | 18 | 0 | 1 | 0.5 | 0 | 0 | 10.5 | 0 | 0 |
| M2262 | 1.3 | 1.3 | 0 | 74.4 | 1 | 6.5 | 0 | 1 | 0.5 | 0 | 0 | 14 | 0 | 0 |
| M2263 | 0.7 | 2.1 | 0 | 82.7 | 1 | 7.5 | 0 | 1 | 0.5 | 0 | 0 | 4.5 | 0 | 0 |
| M2264 | 1.8 | 0.5 | 0 | 75.7 | 0 | 14 | 0 | 0 | 0 | 0 | 0 | 8 | 0 | 0 |
| M2265 | 2 | 4 | 0 | 53.5 | 0.5 | 18 | 0 | 1.5 | 0.5 | 0 | 0 | 20 | 0 | 0 |
| M2266 | 1.9 | 1.5 | 0 | 67.1 | 1 | 11 | 0 | 2 | 0.5 | 0 | 0 | 15 | 0 | 0 |
| M2267 | 1 | 1.3 | 0 | 75.2 | 1 | 7 | 0 | 1.5 | 0.5 | 0 | 0 | 12.5 | 0 | 0 |
| M2268 | 1.6 | 2.9 | 0 | 67.5 | 1 | 16 | 0 | 1.5 | 0.5 | 0 | 0 | 9 | 0 | 0 |
| M2269 | 1.1 | 1.6 | 0 | 72.8 | 1 | 6 | 0 | 2 | 0.5 | 0 | 0 | 15 | 0 | 0 |
| M2270 | 1.8 | 1.5 | 0 | 68.2 | 1 | 12 | 0 | 1 | 0.5 | 0 | 0 | 14 | 0 | 0 |
| M2271 | 1.2 | 2 | 0 | 68.8 | 1 | 9.5 | 0 | 1.5 | 0.5 | 0 | 0 | 15.5 | 0 | 0 |
| M2272 | 2.4 | 1.6 | 0 | 68 | 0 | 20 | 0 | 0 | 0 | 0 | 8 | 0 | 0 | 0 |
| M2273 | 1.9 | 2.6 | 0 | 62 | 1 | 17 | 0 | 2 | 0.5 | 0 | 0 | 13 | 0 | 0 |
| M2274 | 1.8 | 3 | 0 | 60.2 | 0 | 14 | 1 | 0 | 0 | 0 | 0 | 20 | 0 | 0 |
| M2275 | 1.8 | 3 | 0 | 71.2 | 1 | 16.5 | 0 | 2 | 0.5 | 0 | 0 | 4 | 0 | 0 |
| M2276 | 1.3 | 2.8 | 0 | 74.9 | 1 | 13 | 0 | 1 | 0.5 | 0 | 0 | 5.5 | 0 | 0 |
| M2277 | 1.3 | 1 | 0 | 74.7 | 1 | 7.5 | 0 | 2 | 0.5 | 0 | 0 | 12 | 0 | 0 |
| M2278 | 0.6 | 3 | 0 | 80.4 | 1 | 7 | 0 | 2 | 0.5 | 0 | 0 | 5.5 | 0 | 0 |
| M2279 | 0.7 | 2.5 | 0 | 82.3 | 1 | 7.5 | 0 | 1.5 | 0.5 | 0 | 0 | 4 | 0 | 0 |
| M2280 | 1.6 | 1.4 | 0 | 69.5 | 1 | 12.5 | 0 | 1 | 0.5 | 0 | 0 | 12.5 | 0 | 0 |
| M2281 | 2 | 1 | 0 | 70 | 1 | 11 | 0 | 1.5 | 0.5 | 0 | 0 | 13 | 0 | 0 |
| M2282 | 0.7 | 2.8 | 0 | 82 | 1 | 7.5 | 0 | 1 | 0.5 | 0 | 0 | 4.5 | 0 | 0 |
| M2283 | 2 | 2.5 | 0 | 64.5 | 1 | 18.5 | 0 | 1 | 0.5 | 0 | 0 | 10 | 0 | 0 |
| M2284 | 0.6 | 2.6 | 0 | 77.8 | 1 | 6.5 | 0 | 1 | 0.5 | 0 | 0 | 10 | 0 | 0 |
| M2285 | 0.6 | 2.4 | 0 | 77.5 | 1 | 6 | 0 | 1 | 0.5 | 0 | 0 | 11 | 0 | 0 |
| M2286 | 0.7 | 2.9 | 0 | 79.4 | 1 | 8 | 0 | 2 | 0.5 | 0 | 0 | 5.5 | 0 | 0 |
| M2287 | 0.8 | 2.7 | 0 | 79 | 1 | 9 | 0 | 1.5 | 0.5 | 0 | 0 | 5.5 | 0 | 0 |
| M2288 | 1.5 | 2 | 0 | 74.5 | 1 | 14.5 | 0 | 1.5 | 0.5 | 0 | 0 | 4.5 | 0 | 0 |
| M2289 | 2 | 3.4 | 0 | 57.1 | 0.5 | 18 | 0 | 1.5 | 0.5 | 0 | 0 | 17 | 0 | 0 |
| M2290 | 1.1 | 2.8 | 0 | 74.1 | 1 | 12 | 0 | 2 | 0.5 | 0 | 0 | 6.5 | 0 | 0 |
| M2291 | 0.8 | 1.3 | 0 | 75.9 | 1 | 6 | 0 | 2 | 0.5 | 0 | 0 | 12.5 | 0 | 0 |
| M2292 | 2.2 | 2.6 | 0 | 59.2 | 0 | 16 | 2 | 0 | 0 | 0 | 0 | 18 | 0 | 0 |
| M2293 | 1.3 | 1.4 | 0 | 71.8 | 1 | 8 | 0 | 2 | 0.5 | 0 | 0 | 14 | 0 | 0 |
| M2294 | 1 | 1.2 | 0 | 75.3 | 1 | 7.5 | 0 | 1.5 | 0.5 | 0 | 0 | 12 | 0 | 0 |
| M2295 | 1.7 | 2.7 | 0 | 66.1 | 1 | 16.5 | 0 | 2 | 0.5 | 0 | 0 | 9.5 | 0 | 0 |
| M2296 | 1.4 | 1 | 0 | 75.1 | 1 | 6 | 0 | 1.5 | 0.5 | 0 | 0 | 13.5 | 0 | 0 |
| M2297 | 1.8 | 2.2 | 0 | 63 | 0 | 15 | 9 | 0 | 0 | 0 | 4.5 | 4.5 | 0 | 0 |
| M2298 | 0.7 | 3 | 0 | 74.8 | 1 | 8 | 0 | 1.5 | 0.5 | 0 | 0 | 10.5 | 0 | 0 |
| M2299 | 0.9 | 2 | 0 | 71.6 | 1 | 7 | 0 | 1 | 0.5 | 0 | 0 | 16 | 0 | 0 |
| M2300 | 0.7 | 3 | 0 | 78.3 | 1 | 8.5 | 0 | 1.5 | 0.5 | 0 | 0 | 6.5 | 0 | 0 |
| M2301 | 2 | 2.5 | 0 | 67 | 1 | 19.5 | 0 | 1 | 0.5 | 0 | 0 | 6.5 | 0 | 0 |
| M2302 | 1.6 | 2.7 | 0 | 72.2 | 1 | 15.5 | 0 | 2 | 0.5 | 0 | 0 | 4.5 | 0 | 0 |
| M2303 | 1 | 1.8 | 0 | 79.7 | 1 | 10 | 0 | 2 | 0.5 | 0 | 0 | 4 | 0 | 0 |
| M2304 | 1.1 | 2.9 | 0 | 76.5 | 1 | 11.5 | 0 | 1 | 0.5 | 0 | 0 | 5.5 | 0 | 0 |
| M2305 | 0.9 | 2.7 | 0 | 79.4 | 1 | 9.5 | 0 | 1.5 | 0.5 | 0 | 0 | 4.5 | 0 | 0 |
| M2306 | 1.4 | 4 | 0 | 61.1 | 0.5 | 14 | 0 | 1.5 | 0.5 | 0 | 0 | 17 | 0 | 0 |
| M2307 | 1.5 | 2.5 | 0 | 75 | 1 | 14.5 | 0 | 1 | 0.5 | 0 | 0 | 4 | 0 | 0 |
| M2308 | 1.3 | 2.1 | 0 | 76.6 | 1 | 13 | 0 | 1.5 | 0.5 | 0 | 0 | 4 | 0 | 0 |
| M2309 | 1.4 | 1.6 | 0 | 73 | 0 | 12 | 3 | 1 | 0 | 0 | 6 | 2 | 0 | 0 |
| M2310 | 1.7 | 2.8 | 0 | 64 | 1 | 15.5 | 0 | 1 | 0.5 | 0 | 0 | 13.5 | 0 | 0 |
| M2311 | 1.6 | 1.6 | 0 | 68.3 | 1 | 10.5 | 0 | 1.5 | 0.5 | 0 | 0 | 15 | 0 | 0 |
| M2312 | 1.8 | 3 | 0 | 59.2 | 0 | 16 | 0 | 0 | 0 | 0 | 0 | 20 | 0 | 0 |
| M2313 | 1.8 | 2.6 | 0 | 68.6 | 1 | 18 | 0 | 1.5 | 0.5 | 0 | 0 | 6 | 0 | 0 |
| M2314 | 1.4 | 3.8 | 0 | 62.3 | 0.5 | 14 | 0 | 1.5 | 0.5 | 0 | 0 | 16 | 0 | 0 |
| M2315 | 2.4 | 1.8 | 0 | 67.8 | 0 | 18 | 0 | 0 | 0 | 0 | 10 | 0 | 0 | 0 |
| M2316 | 0.7 | 2.9 | 0 | 80.9 | 1 | 8 | 0 | 1 | 0.5 | 0 | 0 | 5 | 0 | 0 |
| M2317 | 1.2 | 1 | 0 | 76.3 | 1 | 6 | 0 | 1 | 0.5 | 0 | 0 | 13 | 0 | 0 |
| M2318 | 0.8 | 2.8 | 0 | 80.4 | 1 | 8.5 | 0 | 2 | 0.5 | 0 | 0 | 4 | 0 | 0 |
| M2319 | 1.9 | 1.7 | 0 | 70.4 | 1 | 17.5 | 0 | 1 | 0.5 | 0 | 0 | 6 | 0 | 0 |
| M2320 | 0.7 | 2 | 0 | 72.8 | 1 | 6 | 0 | 1 | 0.5 | 0 | 0 | 16 | 0 | 0 |
| M2321 | 1.4 | 2.2 | 0 | 66.4 | 0 | 12 | 7 | 0 | 0 | 0 | 3 | 8 | 0 | 0 |
| M2322 | 2 | 1.1 | 0 | 72.4 | 1 | 18 | 0 | 1 | 0.5 | 0 | 0 | 4 | 0 | 0 |
| M2323 | 0.8 | 1 | 0 | 82.7 | 1 | 7.5 | 0 | 2 | 0.5 | 0 | 0 | 4.5 | 0 | 0 |
| M2324 | 1.3 | 1 | 0 | 75.2 | 1 | 6 | 0 | 1.5 | 0.5 | 0 | 0 | 13.5 | 0 | 0 |
| M2325 | 1.4 | 3.6 | 0 | 63.5 | 0.5 | 14 | 0 | 1.5 | 0.5 | 0 | 0 | 15 | 0 | 0 |
| M2326 | 0.6 | 2.4 | 0 | 77 | 1 | 6 | 0 | 1 | 0.5 | 0 | 0 | 11.5 | 0 | 0 |
| M2327 | 1.9 | 1.5 | 0 | 66.1 | 1 | 13 | 0 | 1.5 | 0.5 | 0 | 0 | 14.5 | 0 | 0 |

TABLE 11-continued

Compositions and thermodynamic criteria for vanadium carbides

| | | | | | | | | | | | | | | |
|---|---|---|---|---|---|---|---|---|---|---|---|---|---|---|
| M2328 | 1.3 | 1.1 | 0 | 72.6 | 1 | 9.5 | 0 | 2 | 0.5 | 0 | 0 | 12 | 0 | 0 |
| M2329 | 0.7 | 2.4 | 0 | 79.4 | 1 | 8 | 0 | 1.5 | 0.5 | 0 | 0 | 6.5 | 0 | 0 |
| M2330 | 0.7 | 3 | 0 | 74.8 | 1 | 8.5 | 0 | 2 | 0.5 | 0 | 0 | 9.5 | 0 | 0 |
| M2331 | 1.8 | 3 | 0 | 59.2 | 0 | 14 | 2 | 0 | 0 | 0 | 0 | 20 | 0 | 0 |
| M2332 | 0.7 | 2.4 | 0 | 81.4 | 1 | 8 | 0 | 2 | 0.5 | 0 | 0 | 4 | 0 | 0 |
| M2333 | 1.4 | 1.4 | 0 | 71.7 | 1 | 7 | 0 | 1.5 | 0.5 | 0 | 0 | 15.5 | 0 | 0 |
| M2334 | 1.2 | 1.4 | 0 | 72.9 | 1 | 6.5 | 0 | 1.5 | 0.5 | 0 | 0 | 15 | 0 | 0 |
| M2335 | 1.4 | 1.1 | 0 | 74 | 1 | 7 | 0 | 1 | 0.5 | 0 | 0 | 14 | 0 | 0 |
| M2336 | 1.2 | 2 | 0 | 67.8 | 1 | 10 | 0 | 1.5 | 0.5 | 0 | 0 | 16 | 0 | 0 |
| M2337 | 1.8 | 2.6 | 0 | 61.6 | 0 | 14 | 2 | 0 | 0 | 0 | 0 | 18 | 0 | 0 |
| M2338 | 2.2 | 2.8 | 0 | 61 | 0 | 20 | 2 | 0 | 0 | 0 | 0 | 12 | 0 | 0 |
| M2339 | 1.2 | 2.8 | 0 | 74 | 1 | 13 | 0 | 1.5 | 0.5 | 0 | 0 | 6 | 0 | 0 |
| M2340 | 2 | 4 | 0 | 52.5 | 0.5 | 18 | 0 | 1.5 | 0.5 | 0 | 0 | 21 | 0 | 0 |
| M2341 | 0.9 | 3 | 0 | 71.1 | 1 | 9 | 0 | 1 | 0.5 | 0 | 0 | 13.5 | 0 | 0 |
| M2342 | 0.7 | 1.2 | 0 | 77.1 | 1 | 6.5 | 0 | 1 | 0.5 | 0 | 0 | 12 | 0 | 0 |
| M2343 | 0.9 | 3 | 0 | 73.1 | 1 | 10.5 | 0 | 2 | 0.5 | 0 | 0 | 9 | 0 | 0 |
| M2344 | 0.6 | 2.8 | 0 | 74.1 | 1 | 6 | 0 | 1 | 0.5 | 0 | 0 | 14 | 0 | 0 |
| M2345 | 1.9 | 2.7 | 0 | 59.9 | 1 | 17 | 0 | 1.5 | 0.5 | 0 | 0 | 15.5 | 0 | 0 |
| M2346 | 1.6 | 2.9 | 0 | 71.5 | 1 | 16 | 0 | 1.5 | 0.5 | 0 | 0 | 5 | 0 | 0 |
| M2347 | 0.7 | 2.5 | 0 | 79.8 | 1 | 8.5 | 0 | 2 | 0.5 | 0 | 0 | 5 | 0 | 0 |
| M2348 | 0.9 | 3 | 0 | 79.6 | 1 | 9.5 | 0 | 1.5 | 0.5 | 0 | 0 | 4 | 0 | 0 |
| M2349 | 1 | 2.8 | 0 | 78.2 | 1 | 10.5 | 0 | 2 | 0.5 | 0 | 0 | 4 | 0 | 0 |
| M2350 | 1.2 | 3 | 0 | 75.8 | 1 | 12.5 | 0 | 1 | 0.5 | 0 | 0 | 5 | 0 | 0 |
| M2351 | 0.7 | 3 | 0 | 77.8 | 1 | 9 | 0 | 1.5 | 0.5 | 0 | 0 | 6.5 | 0 | 0 |
| M2352 | 1.4 | 2 | 0 | 67.6 | 0 | 12 | 4 | 1 | 0 | 0 | 4 | 8 | 0 | 0 |
| M2353 | 1.3 | 1.2 | 0 | 71.5 | 1 | 10 | 0 | 2 | 0.5 | 0 | 0 | 12.5 | 0 | 0 |
| M2354 | 0.9 | 2.7 | 0 | 70.4 | 1 | 8.5 | 0 | 2 | 0.5 | 0 | 0 | 14 | 0 | 0 |
| M2355 | 2 | 1 | 0 | 75 | 0 | 18 | 0 | 0 | 0 | 0 | 0 | 4 | 0 | 0 |
| M2356 | 0.9 | 2.9 | 0 | 71.7 | 1 | 9 | 0 | 1 | 0.5 | 0 | 0 | 13 | 0 | 0 |
| M2357 | 2 | 2.8 | 0 | 66.2 | 1 | 20 | 0 | 1.5 | 0.5 | 0 | 0 | 6 | 0 | 0 |
| M2358 | 1.3 | 2.8 | 0 | 69.4 | 1 | 13.5 | 0 | 2 | 0.5 | 0 | 0 | 9.5 | 0 | 0 |
| M2359 | 1.3 | 2.8 | 0 | 71.9 | 1 | 14 | 0 | 1 | 0.5 | 0 | 0 | 7.5 | 0 | 0 |
| M2360 | 1.8 | 2.9 | 0 | 62.3 | 1 | 16.5 | 0 | 1 | 0.5 | 0 | 0 | 14 | 0 | 0 |
| M2361 | 0.8 | 1.2 | 0 | 78.5 | 1 | 7.5 | 0 | 1.5 | 0.5 | 0 | 0 | 9 | 0 | 0 |
| M2362 | 0.9 | 2.9 | 0 | 73.7 | 1 | 10.5 | 0 | 2 | 0.5 | 0 | 0 | 8.5 | 0 | 0 |
| M2363 | 2.4 | 2 | 0 | 65.6 | 0 | 20 | 0 | 0 | 0 | 0 | 10 | 0 | 0 | 0 |
| M2364 | 1.1 | 2.9 | 0 | 73 | 1 | 12.5 | 0 | 1.5 | 0.5 | 0 | 0 | 7.5 | 0 | 0 |
| M2365 | 2.2 | 2 | 0 | 61.8 | 0 | 18 | 0 | 0 | 0 | 0 | 0 | 16 | 0 | 0 |
| M2366 | 0.9 | 2.5 | 0 | 77.1 | 1 | 10 | 0 | 1 | 0.5 | 0 | 0 | 7 | 0 | 0 |
| M2367 | 2 | 3.4 | 0 | 56.1 | 0.5 | 18 | 0 | 1.5 | 0.5 | 0 | 0 | 18 | 0 | 0 |
| M2368 | 2 | 4 | 0 | 51.5 | 0.5 | 18 | 0 | 1.5 | 0.5 | 0 | 0 | 22 | 0 | 0 |
| M2369 | 2.2 | 2.4 | 0 | 65.4 | 0 | 18 | 0 | 0 | 0 | 0 | 12 | 0 | 0 | 0 |
| M2370 | 1.7 | 1.6 | 0 | 66.2 | 1 | 14 | 0 | 1 | 0.5 | 0 | 0 | 14 | 0 | 0 |
| M2371 | 2 | 3.8 | 0 | 52.7 | 0.5 | 18 | 0 | 1.5 | 0.5 | 0 | 0 | 21 | 0 | 0 |
| M2372 | 1.3 | 2.7 | 0 | 69 | 1 | 13 | 0 | 2 | 0.5 | 0 | 0 | 10.5 | 0 | 0 |
| M2373 | 1.5 | 1.3 | 0 | 71.2 | 1 | 7.5 | 0 | 1.5 | 0.5 | 0 | 0 | 15.5 | 0 | 0 |
| M2374 | 1.3 | 2 | 0 | 75.2 | 1 | 13 | 0 | 1.5 | 0.5 | 0 | 0 | 5.5 | 0 | 0 |
| M2375 | 0.7 | 2.8 | 0 | 78 | 1 | 9 | 0 | 1.5 | 0.5 | 0 | 0 | 6.5 | 0 | 0 |
| M2376 | 0.7 | 3 | 0 | 77.8 | 1 | 9 | 0 | 2 | 0.5 | 0 | 0 | 6 | 0 | 0 |
| M2377 | 1.6 | 2.7 | 0 | 63.7 | 1 | 14.5 | 0 | 1 | 0.5 | 0 | 0 | 15 | 0 | 0 |
| M2378 | 1 | 2.8 | 0 | 70.2 | 1 | 9.5 | 0 | 1 | 0.5 | 0 | 0 | 14 | 0 | 0 |
| M2379 | 1.4 | 1 | 0 | 74.6 | 1 | 6 | 0 | 1 | 0.5 | 0 | 0 | 14.5 | 0 | 0 |
| M2380 | 0.7 | 3 | 0 | 79.3 | 1 | 8.5 | 0 | 2 | 0.5 | 0 | 0 | 5 | 0 | 0 |
| M2381 | 2 | 3.4 | 0 | 55.1 | 0.5 | 18 | 0 | 1.5 | 0.5 | 0 | 0 | 19 | 0 | 0 |
| M2382 | 1.9 | 1.7 | 0 | 70.4 | 1 | 18 | 0 | 2 | 0.5 | 0 | 0 | 4.5 | 0 | 0 |
| M2383 | 1.1 | 2.9 | 0 | 69 | 1 | 10.5 | 0 | 1 | 0.5 | 0 | 0 | 14 | 0 | 0 |
| M2384 | 1.7 | 2.6 | 0 | 65.7 | 1 | 16.5 | 0 | 2 | 0.5 | 0 | 0 | 10 | 0 | 0 |
| M2385 | 0.8 | 1.6 | 0 | 73.1 | 1 | 7 | 0 | 1.5 | 0.5 | 0 | 0 | 14.5 | 0 | 0 |
| M2386 | 1.8 | 3 | 0 | 58.2 | 0 | 16 | 1 | 0 | 0 | 0 | 0 | 20 | 0 | 0 |
| M2387 | 2 | 3.2 | 0 | 56.3 | 0.5 | 18 | 0 | 1.5 | 0.5 | 0 | 0 | 18 | 0 | 0 |
| M2388 | 2 | 3.8 | 0 | 51.7 | 0.5 | 18 | 0 | 1.5 | 0.5 | 0 | 0 | 22 | 0 | 0 |
| M2389 | 0.8 | 2.6 | 0 | 78.1 | 1 | 9.5 | 0 | 1 | 0.5 | 0 | 0 | 6.5 | 0 | 0 |
| M2390 | 1.2 | 1.3 | 0 | 72.5 | 1 | 6.5 | 0 | 2 | 0.5 | 0 | 0 | 15 | 0 | 0 |
| M2391 | 0.7 | 2.5 | 0 | 80.8 | 1 | 8.5 | 0 | 1.5 | 0.5 | 0 | 0 | 4.5 | 0 | 0 |
| M2392 | 1.7 | 1.3 | 0 | 68 | 1 | 13.5 | 0 | 1 | 0.5 | 0 | 0 | 13 | 0 | 0 |
| M2393 | 0.9 | 2.7 | 0 | 69.4 | 1 | 8.5 | 0 | 1 | 0.5 | 0 | 0 | 16 | 0 | 0 |
| M2394 | 0.8 | 2.9 | 0 | 80.3 | 1 | 9 | 0 | 1.5 | 0.5 | 0 | 0 | 4 | 0 | 0 |
| M2395 | 0.8 | 3 | 0 | 79.7 | 1 | 9 | 0 | 2 | 0.5 | 0 | 0 | 4 | 0 | 0 |
| M2396 | 0.7 | 3 | 0 | 78.8 | 1 | 9 | 0 | 1 | 0.5 | 0 | 0 | 6 | 0 | 0 |
| M2397 | 1.4 | 4 | 0 | 62.1 | 0.5 | 16 | 0 | 1.5 | 0.5 | 0 | 0 | 14 | 0 | 0 |
| M2398 | 2 | 3.2 | 0 | 55.3 | 0.5 | 18 | 0 | 1.5 | 0.5 | 0 | 0 | 19 | 0 | 0 |
| M2399 | 1.6 | 1.1 | 0 | 70.8 | 1 | 9.5 | 0 | 1.5 | 0.5 | 0 | 0 | 14 | 0 | 0 |
| M2400 | 0.8 | 2.9 | 0 | 80.8 | 1 | 9 | 0 | 1 | 0.5 | 0 | 0 | 4 | 0 | 0 |
| M2401 | 0.8 | 2.9 | 0 | 78.8 | 1 | 9.5 | 0 | 1.5 | 0.5 | 0 | 0 | 5 | 0 | 0 |
| M2402 | 1.7 | 1.4 | 0 | 66.9 | 1 | 14.5 | 0 | 1 | 0.5 | 0 | 0 | 13 | 0 | 0 |
| M2403 | 0.9 | 2.9 | 0 | 75.7 | 1 | 11 | 0 | 1 | 0.5 | 0 | 0 | 7 | 0 | 0 |
| M2404 | 1.3 | 2.2 | 0 | 76.5 | 1 | 13.5 | 0 | 1 | 0.5 | 0 | 0 | 4 | 0 | 0 |
| M2405 | 1.4 | 1.4 | 0 | 70.2 | 0 | 12 | 4 | 1 | 0 | 0 | 2 | 8 | 0 | 0 |

TABLE 11-continued

Compositions and thermodynamic criteria for vanadium carbides

| | | | | | | | | | | | | | | |
|---|---|---|---|---|---|---|---|---|---|---|---|---|---|---|
| M2406 | 1.2 | 2.8 | 0 | 76.5 | 1 | 12.5 | 0 | 1.5 | 0.5 | 0 | 0 | 4 | 0 | 0 |
| M2407 | 1.4 | 2.8 | 0 | 66.3 | 1 | 13 | 0 | 1 | 0.5 | 0 | 0 | 14 | 0 | 0 |
| M2408 | 0.9 | 3 | 0 | 74.6 | 1 | 11 | 0 | 1 | 0.5 | 0 | 0 | 8 | 0 | 0 |
| M2409 | 1.2 | 2.9 | 0 | 76.4 | 1 | 12.5 | 0 | 1.5 | 0.5 | 0 | 0 | 4 | 0 | 0 |
| M2410 | 0.6 | 3 | 0 | 81.9 | 1 | 7.5 | 0 | 1 | 0.5 | 0 | 0 | 4.5 | 0 | 0 |
| M2411 | 2 | 1 | 0 | 66 | 1 | 17.5 | 0 | 1.5 | 0.5 | 0 | 0 | 10.5 | 0 | 0 |
| M2412 | 1.3 | 1.2 | 0 | 71 | 1 | 10 | 0 | 2 | 0.5 | 0 | 0 | 13 | 0 | 0 |
| M2413 | 1 | 2.3 | 0 | 78.7 | 1 | 11 | 0 | 1.5 | 0.5 | 0 | 0 | 4 | 0 | 0 |
| M2414 | 0.9 | 3 | 0 | 73.1 | 1 | 11 | 0 | 2 | 0.5 | 0 | 0 | 8.5 | 0 | 0 |
| M2415 | 1.9 | 2.4 | 0 | 67.7 | 1 | 19 | 0 | 1 | 0.5 | 0 | 0 | 6.5 | 0 | 0 |
| M2416 | 1.9 | 2.9 | 0 | 70.2 | 1 | 18.5 | 0 | 1 | 0.5 | 0 | 0 | 4 | 0 | 0 |
| M2417 | 1.2 | 2.4 | 0 | 75.9 | 1 | 13 | 0 | 1 | 0.5 | 0 | 0 | 5 | 0 | 0 |
| M2418 | 1.1 | 3 | 0 | 68.9 | 1 | 11.5 | 0 | 2 | 0.5 | 0 | 0 | 12 | 0 | 0 |
| M2419 | 1.4 | 3 | 0 | 66.1 | 1 | 13.5 | 0 | 1 | 0.5 | 0 | 0 | 13.5 | 0 | 0 |
| M2420 | 1.7 | 2.7 | 0 | 63.6 | 1 | 15.5 | 0 | 1 | 0.5 | 0 | 0 | 14 | 0 | 0 |
| M2421 | 1.2 | 3 | 0 | 76.8 | 1 | 12.5 | 0 | 1 | 0.5 | 0 | 0 | 4 | 0 | 0 |
| M2422 | 1.1 | 1.5 | 0 | 71.4 | 1 | 8 | 0 | 1.5 | 0.5 | 0 | 0 | 15 | 0 | 0 |
| M2423 | 1.2 | 2.9 | 0 | 73.9 | 1 | 13.5 | 0 | 1 | 0.5 | 0 | 0 | 6 | 0 | 0 |
| M2424 | 1.6 | 1.2 | 0 | 71.2 | 1 | 14.5 | 0 | 1 | 0.5 | 0 | 0 | 9 | 0 | 0 |
| M2425 | 1.7 | 1.3 | 0 | 67 | 1 | 13 | 0 | 2 | 0.5 | 0 | 0 | 13.5 | 0 | 0 |
| M2426 | 1.7 | 1.2 | 0 | 68.1 | 1 | 14 | 0 | 1 | 0.5 | 0 | 0 | 12.5 | 0 | 0 |
| M2427 | 0.9 | 3 | 0 | 72.6 | 1 | 10.5 | 0 | 1.5 | 0.5 | 0 | 0 | 10 | 0 | 0 |
| M2428 | 1.4 | 1.5 | 0 | 70.1 | 1 | 8.5 | 0 | 1 | 0.5 | 0 | 0 | 16 | 0 | 0 |
| M2429 | 0.8 | 3 | 0 | 71.2 | 1 | 8.5 | 0 | 2 | 0.5 | 0 | 0 | 13 | 0 | 0 |
| M2430 | 0.6 | 3 | 0 | 78.4 | 1 | 8.5 | 0 | 2 | 0.5 | 0 | 0 | 6 | 0 | 0 |
| M2431 | 0.9 | 1.6 | 4 | 69.8 | 2 | 12 | 0 | 2 | 0.5 | 0 | 0 | 7.2 | 0 | 0 |
| M2432 | 0.6 | 3.3 | 0 | 69.6 | 1 | 6 | 0 | 1 | 0.5 | 0 | 0 | 18 | 0 | 0 |
| M2433 | 2 | 2.8 | 0 | 67.7 | 1 | 20 | 0 | 1 | 0.5 | 0 | 0 | 5 | 0 | 0 |
| M2434 | 1.7 | 2.5 | 0 | 72.3 | 1 | 17 | 0 | 1 | 0.5 | 0 | 0 | 4 | 0 | 0 |
| M2435 | 0.7 | 2.8 | 0 | 73 | 1 | 7 | 0 | 1 | 0.5 | 0 | 0 | 14 | 0 | 0 |
| M2436 | 1.2 | 2.6 | 0 | 75.7 | 1 | 13 | 0 | 1.5 | 0.5 | 0 | 0 | 4.5 | 0 | 0 |
| M2437 | 1.4 | 4 | 0 | 60.1 | 0.5 | 14 | 0 | 1.5 | 0.5 | 0 | 0 | 18 | 0 | 0 |
| M2438 | 2 | 3.2 | 0 | 54.3 | 0.5 | 18 | 0 | 1.5 | 0.5 | 0 | 0 | 20 | 0 | 0 |
| M2439 | 1.6 | 2.6 | 0 | 68.8 | 1 | 17 | 0 | 2 | 0.5 | 0 | 0 | 6.5 | 0 | 0 |
| M2440 | 2 | 1.1 | 0 | 67.9 | 1 | 12 | 0 | 1 | 0.5 | 0 | 0 | 14.5 | 0 | 0 |
| M2441 | 0.7 | 2.9 | 0 | 73.9 | 1 | 8 | 0 | 1.5 | 0.5 | 0 | 0 | 11.5 | 0 | 0 |
| M2442 | 0.7 | 2 | 0 | 77.8 | 1 | 7 | 0 | 1.5 | 0.5 | 0 | 0 | 9.5 | 0 | 0 |
| M2443 | 0.8 | 1.6 | 0 | 72.1 | 1 | 7 | 0 | 2 | 0.5 | 0 | 0 | 15 | 0 | 0 |
| M2444 | 0.8 | 1.6 | 0 | 79.6 | 1 | 8 | 0 | 2 | 0.5 | 0 | 0 | 6.5 | 0 | 0 |
| M2445 | 1.6 | 3 | 0 | 64.4 | 1 | 15.5 | 0 | 1 | 0.5 | 0 | 0 | 13 | 0 | 0 |
| M2446 | 1.1 | 2.8 | 0 | 72.1 | 1 | 12 | 0 | 1 | 0.5 | 0 | 0 | 9.5 | 0 | 0 |
| M2447 | 1.5 | 3 | 0 | 73 | 1 | 15.5 | 0 | 1 | 0.5 | 0 | 0 | 4.5 | 0 | 0 |
| M2448 | 1.8 | 2.5 | 0 | 65.7 | 1 | 17.5 | 0 | 1.5 | 0.5 | 0 | 0 | 9.5 | 0 | 0 |
| M2449 | 2 | 2.6 | 0 | 58.4 | 1 | 18 | 0 | 1.5 | 0.5 | 0 | 0 | 16 | 0 | 0 |
| M2450 | 1.2 | 2.9 | 0 | 75.4 | 1 | 13 | 0 | 1.5 | 0.5 | 0 | 0 | 4.5 | 0 | 0 |
| M2451 | 1.7 | 2.6 | 0 | 65.2 | 1 | 16.5 | 0 | 2 | 0.5 | 0 | 0 | 10.5 | 0 | 0 |
| M2452 | 1.8 | 2.9 | 0 | 68.3 | 1 | 18.5 | 0 | 2 | 0.5 | 0 | 0 | 5 | 0 | 0 |
| M2453 | 1.1 | 1.6 | 0 | 78.3 | 1 | 11 | 0 | 2 | 0.5 | 0 | 0 | 4.5 | 0 | 0 |
| M2454 | 1.7 | 2.9 | 0 | 62.4 | 1 | 16 | 0 | 2 | 0.5 | 0 | 0 | 13.5 | 0 | 0 |
| M2455 | 2 | 0.8 | 0 | 75.2 | 0 | 18 | 0 | 0 | 0 | 0 | 0 | 4 | 0 | 0 |
| M2456 | 1.1 | 2.8 | 0 | 68.1 | 1 | 10.5 | 0 | 2 | 0.5 | 0 | 0 | 14 | 0 | 0 |
| M2457 | 2 | 0.7 | 0 | 73.8 | 1 | 18 | 0 | 1 | 0.5 | 0 | 0 | 3 | 0 | 0 |
| M2458 | 1.3 | 2.7 | 0 | 69.5 | 1 | 13 | 0 | 1 | 0.5 | 0 | 0 | 11 | 0 | 0 |
| M2459 | 1.5 | 2.7 | 0 | 72.8 | 1 | 15.5 | 0 | 2 | 0.5 | 0 | 0 | 4 | 0 | 0 |
| M2460 | 1.3 | 3 | 0 | 68.2 | 1 | 14 | 0 | 1.5 | 0.5 | 0 | 0 | 10.5 | 0 | 0 |
| M2461 | 0.7 | 3 | 0 | 80.8 | 1 | 8.5 | 0 | 1.5 | 0.5 | 0 | 0 | 4 | 0 | 0 |
| M2462 | 0.7 | 2.9 | 0 | 78.4 | 1 | 9.5 | 0 | 1 | 0.5 | 0 | 0 | 6 | 0 | 0 |
| M2463 | 0.6 | 3 | 0 | 78.9 | 1 | 8.5 | 0 | 2 | 0.5 | 0 | 0 | 5.5 | 0 | 0 |
| M2464 | 1.4 | 3.6 | 0 | 62.5 | 0.5 | 14 | 0 | 1.5 | 0.5 | 0 | 0 | 16 | 0 | 0 |
| M2465 | 1.3 | 1.5 | 0 | 69.2 | 1 | 11 | 0 | 1 | 0.5 | 0 | 0 | 14.5 | 0 | 0 |
| M2466 | 1.4 | 1.4 | 0 | 76.2 | 0 | 12 | 4 | 0 | 0.5 | 0 | 5 | 0 | 0 | 0 |
| M2467 | 0.7 | 2.4 | 0 | 74.4 | 1 | 7 | 0 | 2 | 0.5 | 0 | 0 | 12 | 0 | 0 |
| M2468 | 2 | 0.6 | 0 | 75.4 | 0 | 18 | 0 | 0 | 0 | 0 | 0 | 4 | 0 | 0 |
| M2469 | 1.2 | 1.4 | 0 | 70.9 | 1 | 7 | 0 | 2 | 0.5 | 0 | 0 | 16 | 0 | 0 |
| M2470 | 2 | 0.8 | 0 | 71.2 | 0 | 18 | 0 | 0 | 0 | 0 | 0 | 8 | 0 | 0 |
| M2471 | 0.9 | 3 | 0 | 74.6 | 1 | 11.5 | 0 | 1 | 0.5 | 0 | 0 | 7.5 | 0 | 0 |
| M2472 | 2.4 | 2.4 | 0 | 63.2 | 0 | 20 | 0 | 0 | 0 | 0 | 12 | 0 | 0 | 0 |
| M2473 | 1.1 | 1.2 | 0 | 72.2 | 1 | 8 | 0 | 2 | 0.5 | 0 | 0 | 14 | 0 | 0 |
| M2474 | 0.6 | 3 | 0 | 79.4 | 1 | 8.5 | 0 | 1.5 | 0.5 | 0 | 0 | 5.5 | 0 | 0 |
| M2475 | 1.4 | 3 | 0 | 73.1 | 1 | 15 | 0 | 2 | 0.5 | 0 | 0 | 4 | 0 | 0 |
| M2476 | 1.6 | 2.8 | 0 | 71.1 | 1 | 17 | 0 | 2 | 0.5 | 0 | 0 | 4 | 0 | 0 |
| M2477 | 2 | 3.2 | 0 | 53.3 | 0.5 | 18 | 0 | 1.5 | 0.5 | 0 | 0 | 21 | 0 | 0 |
| M2478 | 1.7 | 1.7 | 0 | 72.6 | 1 | 16.5 | 0 | 1.5 | 0.5 | 0 | 0 | 4.5 | 0 | 0 |
| M2479 | 1.7 | 2.8 | 0 | 69.5 | 1 | 18.5 | 0 | 2 | 0.5 | 0 | 0 | 4 | 0 | 0 |
| M2480 | 2 | 0.8 | 0 | 72.7 | 1 | 18 | 0 | 1 | 0.5 | 0 | 0 | 4 | 0 | 0 |
| M2481 | 1.2 | 2.9 | 0 | 75.9 | 1 | 13 | 0 | 1.5 | 0.5 | 0 | 0 | 4 | 0 | 0 |
| M2482 | 1.7 | 1.8 | 0 | 71 | 1 | 16.5 | 0 | 2 | 0.5 | 0 | 0 | 5.5 | 0 | 0 |
| M2483 | 0.7 | 3 | 0 | 70.8 | 1 | 7 | 0 | 1.5 | 0.5 | 0 | 0 | 15.5 | 0 | 0 |

TABLE 11-continued

Compositions and thermodynamic criteria for vanadium carbides

| | | | | | | | | | | | | | | |
|---|---|---|---|---|---|---|---|---|---|---|---|---|---|---|
| M2484 | 0.7 | 2.9 | 0 | 77.9 | 1 | 9.5 | 0 | 2 | 0.5 | 0 | 0 | 5.5 | 0 | 0 |
| M2485 | 2.2 | 2.6 | 0 | 57.2 | 0 | 18 | 0 | 0 | 0 | 0 | 0 | 20 | 0 | 0 |
| M2486 | 0.9 | 1.2 | 0 | 73.9 | 1 | 7.5 | 0 | 1.5 | 0.5 | 0 | 0 | 13.5 | 0 | 0 |
| M2487 | 1.8 | 2.9 | 0 | 67.3 | 1 | 20 | 0 | 2 | 0.5 | 0 | 0 | 4.5 | 0 | 0 |
| M2488 | 1.9 | 2.6 | 0 | 68 | 1 | 20 | 0 | 2 | 0.5 | 0 | 0 | 4 | 0 | 0 |
| M2489 | 0.9 | 3 | 0 | 71.1 | 1 | 9.5 | 0 | 1 | 0.5 | 0 | 0 | 13 | 0 | 0 |
| M2490 | 2 | 0.6 | 0 | 71.9 | 1 | 18 | 0 | 1 | 0.5 | 0 | 0 | 5 | 0 | 0 |
| M2491 | 1.6 | 2.7 | 0 | 72.2 | 1 | 16.5 | 0 | 1.5 | 0.5 | 0 | 0 | 4 | 0 | 0 |
| M2492 | 1.3 | 3 | 0 | 68.7 | 1 | 15 | 0 | 2 | 0.5 | 0 | 0 | 8.5 | 0 | 0 |
| M2493 | 1.2 | 3 | 0 | 74.8 | 1 | 13.5 | 0 | 2 | 0.5 | 0 | 0 | 4 | 0 | 0 |
| M2494 | 1.3 | 2.7 | 0 | 70 | 1 | 13.5 | 0 | 1 | 0.5 | 0 | 0 | 10 | 0 | 0 |
| M2495 | 1.4 | 2.9 | 0 | 72.2 | 1 | 15.5 | 0 | 2 | 0.5 | 0 | 0 | 4.5 | 0 | 0 |
| M2496 | 1.5 | 2.9 | 0 | 69.6 | 1 | 17.5 | 0 | 2 | 0.5 | 0 | 0 | 5 | 0 | 0 |
| M2497 | 1.1 | 1.2 | 0 | 72.2 | 1 | 9 | 0 | 1.5 | 0.5 | 0 | 0 | 13.5 | 0 | 0 |
| M2498 | 1.8 | 2.6 | 0 | 68.6 | 1 | 19.5 | 0 | 2 | 0.5 | 0 | 0 | 4 | 0 | 0 |
| M2499 | 1.8 | 2.6 | 0 | 68.1 | 1 | 20 | 0 | 2 | 0.5 | 0 | 0 | 4 | 0 | 0 |
| M2500 | 1.5 | 2.8 | 0 | 70.7 | 1 | 17 | 0 | 2 | 0.5 | 0 | 0 | 4.5 | 0 | 0 |
| M2501 | 1.1 | 3 | 0 | 73.9 | 1 | 14 | 0 | 2 | 0.5 | 0 | 0 | 4.5 | 0 | 0 |
| M2502 | 1.3 | 1.5 | 0 | 69.2 | 1 | 10.5 | 0 | 1 | 0.5 | 0 | 0 | 15 | 0 | 0 |
| M2503 | 1.2 | 2.7 | 0 | 74.1 | 1 | 14.5 | 0 | 2 | 0.5 | 0 | 0 | 4 | 0 | 0 |
| M2504 | 1.1 | 3 | 0 | 74.4 | 1 | 13 | 0 | 1.5 | 0.5 | 0 | 0 | 5.5 | 0 | 0 |
| M2505 | 1.5 | 2.7 | 0 | 70.8 | 1 | 17 | 0 | 2 | 0.5 | 0 | 0 | 4.5 | 0 | 0 |
| M2506 | 1.9 | 2.1 | 0 | 66 | 1 | 18 | 0 | 2 | 0.5 | 0 | 0 | 8.5 | 0 | 0 |
| M2507 | 0.8 | 2.9 | 0 | 78.3 | 1 | 10.5 | 0 | 2 | 0.5 | 0 | 0 | 4 | 0 | 0 |
| M2508 | 0.9 | 2.9 | 0 | 75.2 | 1 | 11.5 | 0 | 1 | 0.5 | 0 | 0 | 7 | 0 | 0 |
| M2509 | 1.6 | 2.8 | 0 | 67.1 | 1 | 20 | 0 | 2 | 0.5 | 0 | 0 | 5 | 0 | 0 |
| M2510 | 1 | 2.8 | 0 | 76.2 | 1 | 12.5 | 0 | 2 | 0.5 | 0 | 0 | 4 | 0 | 0 |
| M2511 | 1.3 | 3 | 0 | 70.2 | 1 | 15.5 | 0 | 1.5 | 0.5 | 0 | 0 | 7 | 0 | 0 |
| M2512 | 2.2 | 1.6 | 0 | 70.2 | 0 | 20 | 0 | 0 | 0 | 0 | 6 | 0 | 0 | 0 |
| M2513 | 1.6 | 2.7 | 0 | 68.7 | 1 | 19 | 0 | 2 | 0.5 | 0 | 0 | 4.5 | 0 | 0 |
| M2514 | 1.6 | 2.7 | 0 | 68.2 | 1 | 19 | 0 | 2 | 0.5 | 0 | 0 | 5 | 0 | 0 |
| M2515 | 1.3 | 2.8 | 0 | 73.4 | 1 | 14.5 | 0 | 2 | 0.5 | 0 | 0 | 4.5 | 0 | 0 |
| M2516 | 1.1 | 2.9 | 0 | 73.5 | 1 | 14.5 | 0 | 2 | 0.5 | 0 | 0 | 4.5 | 0 | 0 |
| M2517 | 1 | 1.5 | 0 | 71 | 1 | 8.5 | 0 | 1.5 | 0.5 | 0 | 0 | 15 | 0 | 0 |
| M2518 | 1.4 | 1.8 | 0 | 68.8 | 0 | 12 | 3 | 1 | 0 | 0 | 6 | 6 | 0 | 0 |
| M2519 | 0.7 | 3 | 0 | 78.8 | 1 | 9.5 | 0 | 1 | 0.5 | 0 | 0 | 5.5 | 0 | 0 |
| M2520 | 0.7 | 3 | 0 | 78.8 | 1 | 9.5 | 0 | 2 | 0.5 | 0 | 0 | 4.5 | 0 | 0 |
| M2521 | 1.4 | 2.7 | 0 | 72.4 | 1 | 16 | 0 | 2 | 0.5 | 0 | 0 | 4 | 0 | 0 |
| M2522 | 0.7 | 3 | 0 | 77.8 | 1 | 11 | 0 | 2 | 0.5 | 0 | 0 | 4 | 0 | 0 |
| M2523 | 1.4 | 2.7 | 0 | 70.4 | 1 | 17.5 | 0 | 2 | 0.5 | 0 | 0 | 4.5 | 0 | 0 |
| M2524 | 0.8 | 3 | 0 | 78.2 | 1 | 10.5 | 0 | 2 | 0.5 | 0 | 0 | 4 | 0 | 0 |
| M2525 | 1.2 | 2.8 | 0 | 74 | 1 | 14 | 0 | 2 | 0.5 | 0 | 0 | 4.5 | 0 | 0 |
| M2526 | 1.3 | 2.9 | 0 | 71.8 | 1 | 16 | 0 | 2 | 0.5 | 0 | 0 | 4.5 | 0 | 0 |
| M2527 | 0.7 | 2.8 | 0 | 77 | 1 | 11.5 | 0 | 2 | 0.5 | 0 | 0 | 4.5 | 0 | 0 |
| M2528 | 0.6 | 3 | 0 | 78.4 | 1 | 10 | 0 | 2 | 0.5 | 0 | 0 | 4.5 | 0 | 0 |
| M2529 | 1.6 | 2.8 | 0 | 71.6 | 1 | 17 | 0 | 1.5 | 0.5 | 0 | 0 | 4 | 0 | 0 |
| M2530 | 0.9 | 2.7 | 0 | 75.9 | 1 | 12.5 | 0 | 2 | 0.5 | 0 | 0 | 4.5 | 0 | 0 |
| M2531 | 1.1 | 3 | 0 | 66.4 | 1 | 10.5 | 0 | 2 | 0.5 | 0 | 0 | 15.5 | 0 | 0 |
| M2532 | 1.6 | 2.8 | 0 | 71.1 | 1 | 17.5 | 0 | 1.5 | 0.5 | 0 | 0 | 4 | 0 | 0 |
| M2533 | 0.9 | 3 | 0 | 74.6 | 1 | 13 | 0 | 2 | 0.5 | 0 | 0 | 5 | 0 | 0 |
| M2534 | 2 | 0.6 | 0 | 71.4 | 0 | 18 | 0 | 0 | 0 | 0 | 0 | 8 | 0 | 0 |
| M2535 | 0.8 | 2.9 | 0 | 75.8 | 1 | 12 | 0 | 2 | 0.5 | 0 | 0 | 5 | 0 | 0 |
| M2536 | 1.3 | 3 | 0 | 74.2 | 1 | 14.5 | 0 | 1.5 | 0.5 | 0 | 0 | 4 | 0 | 0 |
| M2537 | 0.9 | 3 | 0 | 74.1 | 1 | 12 | 0 | 2 | 0.5 | 0 | 0 | 6.5 | 0 | 0 |
| M2538 | 1.3 | 3 | 0 | 72.2 | 1 | 16 | 0 | 1.5 | 0.5 | 0 | 0 | 4.5 | 0 | 0 |
| M2539 | 0.8 | 2.7 | 0 | 79 | 1 | 10 | 0 | 2 | 0.5 | 0 | 0 | 4 | 0 | 0 |
| M2540 | 0.7 | 2.8 | 0 | 80 | 1 | 9 | 0 | 2 | 0.5 | 0 | 0 | 4 | 0 | 0 |
| M2541 | 0.7 | 2.8 | 0 | 78.5 | 1 | 10 | 0 | 2 | 0.5 | 0 | 0 | 4.5 | 0 | 0 |
| M2542 | 1.2 | 2.9 | 0 | 75.4 | 1 | 13.5 | 0 | 1.5 | 0.5 | 0 | 0 | 4 | 0 | 0 |
| M2543 | 0.9 | 2.9 | 0 | 75.2 | 1 | 13 | 0 | 2 | 0.5 | 0 | 0 | 4.5 | 0 | 0 |
| M2544 | 0.8 | 2.6 | 0 | 79.1 | 1 | 10 | 0 | 2 | 0.5 | 0 | 0 | 4 | 0 | 0 |
| M2545 | 0.9 | 2.6 | 0 | 77 | 1 | 12 | 0 | 2 | 0.5 | 0 | 0 | 4 | 0 | 0 |
| M2546 | 1.1 | 2.8 | 0 | 73.1 | 1 | 15 | 0 | 2 | 0.5 | 0 | 0 | 4.5 | 0 | 0 |
| M2547 | 1.3 | 2.7 | 0 | 71 | 1 | 16.5 | 0 | 2 | 0.5 | 0 | 0 | 5 | 0 | 0 |
| M2548 | 1 | 2.9 | 0 | 74.6 | 1 | 12.5 | 0 | 2 | 0.5 | 0 | 0 | 5.5 | 0 | 0 |
| M2549 | 0.8 | 2.8 | 0 | 77.4 | 1 | 11 | 0 | 2 | 0.5 | 0 | 0 | 4.5 | 0 | 0 |
| M2550 | 0.7 | 2.9 | 0 | 78.4 | 1 | 10.5 | 0 | 2 | 0.5 | 0 | 0 | 4 | 0 | 0 |
| M2551 | 0.7 | 3 | 0 | 77.8 | 1 | 10.5 | 0 | 2 | 0.5 | 0 | 0 | 4.5 | 0 | 0 |
| M2552 | 1.1 | 2.7 | 0 | 74.2 | 1 | 14 | 0 | 2 | 0.5 | 0 | 0 | 4.5 | 0 | 0 |
| M2553 | 1.8 | 1 | 0 | 70.2 | 1 | 9 | 0 | 1 | 0.5 | 0 | 0 | 15.5 | 0 | 0 |
| M2554 | 0.9 | 2.8 | 0 | 76.8 | 1 | 12 | 0 | 2 | 0.5 | 0 | 0 | 4 | 0 | 0 |
| M2555 | 0.7 | 3 | 0 | 75.8 | 1 | 12 | 0 | 2 | 0.5 | 0 | 0 | 5 | 0 | 0 |
| M2556 | 0.9 | 2.8 | 0 | 75.3 | 1 | 13 | 0 | 2 | 0.5 | 0 | 0 | 4.5 | 0 | 0 |
| M2557 | 0.7 | 2.9 | 0 | 76.9 | 1 | 11.5 | 0 | 2 | 0.5 | 0 | 0 | 4.5 | 0 | 0 |
| M2558 | 0.6 | 3 | 0 | 78.4 | 1 | 9 | 0 | 2 | 0.5 | 0 | 0 | 5.5 | 0 | 0 |
| M2559 | 0.6 | 2.5 | 0 | 79.9 | 1 | 8 | 0 | 1 | 0.5 | 0 | 0 | 6.5 | 0 | 0 |
| M2560 | 1.6 | 1.6 | 0 | 65.8 | 1 | 12 | 0 | 1.5 | 0.5 | 0 | 0 | 16 | 0 | 0 |
| M2561 | 0.6 | 2.9 | 0 | 79 | 1 | 9 | 0 | 1 | 0.5 | 0 | 0 | 6 | 0 | 0 |

TABLE 11-continued

Compositions and thermodynamic criteria for vanadium carbides

| | | | | | | | | | | | | | | | |
|---|---|---|---|---|---|---|---|---|---|---|---|---|---|---|---|
| M2562 | 1.1 | 2.8 | 0 | 75.6 | 1 | 13.5 | 0 | 1.5 | 0.5 | 0 | 0 | 4 | 0 | 0 |
| M2563 | 1 | 2.5 | 0 | 75.5 | 1 | 13.5 | 0 | 2 | 0.5 | 0 | 0 | 4 | 0 | 0 |
| M2564 | 0.9 | 2.9 | 0 | 77.2 | 1 | 11.5 | 0 | 1.5 | 0.5 | 0 | 0 | 4.5 | 0 | 0 |
| M2565 | 0.9 | 3 | 0 | 73.6 | 1 | 12.5 | 0 | 2 | 0.5 | 0 | 0 | 6.5 | 0 | 0 |
| M2566 | 1 | 3 | 0 | 75 | 1 | 13.5 | 0 | 1.5 | 0.5 | 0 | 0 | 4.5 | 0 | 0 |
| M2567 | 1.7 | 2.3 | 0 | 62.5 | 1 | 15.5 | 0 | 1.5 | 0.5 | 0 | 0 | 15 | 0 | 0 |
| M2568 | 0.8 | 3 | 0 | 79.2 | 1 | 10 | 0 | 1.5 | 0.5 | 0 | 0 | 4 | 0 | 0 |
| M2569 | 1.2 | 2.6 | 0 | 74.7 | 1 | 14.5 | 0 | 1.5 | 0.5 | 0 | 0 | 4 | 0 | 0 |
| M2570 | 0.7 | 3 | 0 | 79.8 | 1 | 9.5 | 0 | 1.5 | 0.5 | 0 | 0 | 4 | 0 | 0 |
| M2571 | 0.7 | 3 | 0 | 79.3 | 1 | 9.5 | 0 | 1.5 | 0.5 | 0 | 0 | 4.5 | 0 | 0 |
| M2572 | 1.5 | 2.6 | 0 | 72.9 | 1 | 16 | 0 | 1.5 | 0.5 | 0 | 0 | 4 | 0 | 0 |
| M2573 | 1.3 | 2.9 | 0 | 73.8 | 1 | 14.5 | 0 | 1 | 0.5 | 0 | 0 | 5 | 0 | 0 |
| M2574 | 1.5 | 2.6 | 0 | 72.4 | 1 | 16.5 | 0 | 1.5 | 0.5 | 0 | 0 | 4 | 0 | 0 |
| M2575 | 1.1 | 2.7 | 0 | 76.7 | 1 | 12.5 | 0 | 1.5 | 0.5 | 0 | 0 | 4 | 0 | 0 |
| M2576 | 1.4 | 2.7 | 0 | 70.9 | 1 | 17.5 | 0 | 1.5 | 0.5 | 0 | 0 | 4.5 | 0 | 0 |
| M2577 | 0.8 | 3 | 0 | 78.7 | 1 | 10.5 | 0 | 1.5 | 0.5 | 0 | 0 | 4 | 0 | 0 |
| M2578 | 0.8 | 3 | 0 | 78.2 | 1 | 10.5 | 0 | 1.5 | 0.5 | 0 | 0 | 4.5 | 0 | 0 |
| M2579 | 1.1 | 1.6 | 0 | 69.3 | 1 | 8.5 | 0 | 2 | 0.5 | 0 | 0 | 16 | 0 | 0 |
| M2580 | 0.8 | 3 | 0 | 77.7 | 1 | 10.5 | 0 | 1.5 | 0.5 | 0 | 0 | 5 | 0 | 0 |
| M2581 | 0.7 | 2.6 | 0 | 78.7 | 1 | 9.5 | 0 | 2 | 0.5 | 0 | 0 | 5 | 0 | 0 |
| M2582 | 1.4 | 2.9 | 0 | 69.7 | 1 | 18 | 0 | 1.5 | 0.5 | 0 | 0 | 5 | 0 | 0 |
| M2583 | 1.3 | 2.9 | 0 | 72.8 | 1 | 15.5 | 0 | 1.5 | 0.5 | 0 | 0 | 4.5 | 0 | 0 |
| M2584 | 0.6 | 3 | 0 | 78.9 | 1 | 9 | 0 | 1 | 0.5 | 0 | 0 | 6 | 0 | 0 |
| M2585 | 1.2 | 2.8 | 0 | 73 | 1 | 15.5 | 0 | 1.5 | 0.5 | 0 | 0 | 4.5 | 0 | 0 |
| M2586 | 1.5 | 2.8 | 0 | 70.2 | 1 | 18 | 0 | 1.5 | 0.5 | 0 | 0 | 4.5 | 0 | 0 |
| M2587 | 1.4 | 2.6 | 0 | 72.5 | 1 | 16.5 | 0 | 1.5 | 0.5 | 0 | 0 | 4 | 0 | 0 |
| M2588 | 1.4 | 3 | 0 | 72.6 | 1 | 16 | 0 | 1 | 0.5 | 0 | 0 | 4.5 | 0 | 0 |
| M2589 | 1.7 | 2.8 | 0 | 70 | 1 | 19 | 0 | 1 | 0.5 | 0 | 0 | 4 | 0 | 0 |
| M2590 | 1.5 | 3 | 0 | 71 | 1 | 17.5 | 0 | 1 | 0.5 | 0 | 0 | 4.5 | 0 | 0 |
| M2591 | 0.9 | 2.5 | 0 | 78.1 | 1 | 11 | 0 | 1.5 | 0.5 | 0 | 0 | 4.5 | 0 | 0 |
| M2592 | 0.7 | 3 | 0 | 75.8 | 1 | 12 | 0 | 1.5 | 0.5 | 0 | 0 | 5.5 | 0 | 0 |
| M2593 | 0.7 | 3 | 0 | 75.8 | 1 | 12.5 | 0 | 1.5 | 0.5 | 0 | 0 | 5 | 0 | 0 |
| M2594 | 0.7 | 2.6 | 0 | 78.7 | 1 | 11 | 0 | 1.5 | 0.5 | 0 | 0 | 4 | 0 | 0 |
| M2595 | 1.6 | 1.5 | 0 | 66.4 | 1 | 13 | 0 | 1 | 0.5 | 0 | 0 | 15 | 0 | 0 |
| M2596 | 0.9 | 2.7 | 0 | 78.4 | 1 | 11 | 0 | 1.5 | 0.5 | 0 | 0 | 4 | 0 | 0 |
| M2597 | 1.9 | 1.5 | 0 | 71.6 | 1 | 18 | 0 | 1 | 0.5 | 0 | 0 | 4.5 | 0 | 0 |
| M2598 | 1.4 | 3 | 0 | 73.6 | 1 | 15.5 | 0 | 1 | 0.5 | 0 | 0 | 4 | 0 | 0 |
| M2599 | 1.2 | 2.7 | 0 | 72.6 | 1 | 16 | 0 | 1.5 | 0.5 | 0 | 0 | 4.5 | 0 | 0 |
| M2600 | 0.9 | 3 | 0 | 73.6 | 1 | 14.5 | 0 | 1.5 | 0.5 | 0 | 0 | 5 | 0 | 0 |
| M2601 | 0.8 | 2.9 | 0 | 76.8 | 1 | 12 | 0 | 1.5 | 0.5 | 0 | 0 | 4.5 | 0 | 0 |
| M2602 | 0.9 | 2.5 | 0 | 78.6 | 1 | 11 | 0 | 1.5 | 0.5 | 0 | 0 | 4 | 0 | 0 |
| M2603 | 1 | 2.8 | 0 | 74.7 | 1 | 14 | 0 | 1.5 | 0.5 | 0 | 0 | 4.5 | 0 | 0 |
| M2604 | 0.7 | 2.8 | 0 | 78.5 | 1 | 10.5 | 0 | 1.5 | 0.5 | 0 | 0 | 4.5 | 0 | 0 |
| M2605 | 0.9 | 2.6 | 0 | 77 | 1 | 12.5 | 0 | 1.5 | 0.5 | 0 | 0 | 4 | 0 | 0 |
| M2606 | 1.8 | 2.9 | 0 | 69.3 | 1 | 19 | 0 | 1 | 0.5 | 0 | 0 | 4.5 | 0 | 0 |
| M2607 | 0.7 | 2.9 | 0 | 78.4 | 1 | 10.5 | 0 | 1.5 | 0.5 | 0 | 0 | 4.5 | 0 | 0 |
| M2608 | 1.3 | 2.4 | 0 | 74.3 | 1 | 14.5 | 0 | 1.5 | 0.5 | 0 | 0 | 4.5 | 0 | 0 |
| M2609 | 1.3 | 2.9 | 0 | 70.8 | 1 | 15.5 | 0 | 1.5 | 0.5 | 0 | 0 | 6.5 | 0 | 0 |
| M2610 | 0.6 | 3 | 0 | 78.9 | 1 | 9.5 | 0 | 1.5 | 0.5 | 0 | 0 | 5 | 0 | 0 |
| M2611 | 1.8 | 2.2 | 0 | 59 | 0 | 15 | 13.5 | 0 | 0 | 0 | 1.5 | 7 | 0 | 0 |
| M2612 | 0.9 | 3 | 0 | 76.1 | 1 | 13.5 | 0 | 1 | 0.5 | 0 | 0 | 4 | 0 | 0 |
| M2613 | 1.5 | 2.7 | 0 | 72.3 | 1 | 17 | 0 | 1 | 0.5 | 0 | 0 | 4 | 0 | 0 |
| M2614 | 1.8 | 2.2 | 0 | 69.5 | 1 | 18.5 | 0 | 1.5 | 0.5 | 0 | 0 | 5 | 0 | 0 |
| M2615 | 2 | 3.2 | 0 | 52.3 | 0.5 | 18 | 0 | 1.5 | 0.5 | 0 | 0 | 22 | 0 | 0 |
| M2616 | 0.8 | 2.9 | 0 | 78.8 | 1 | 11 | 0 | 1 | 0.5 | 0 | 0 | 4 | 0 | 0 |
| M2617 | 1.3 | 1.6 | 0 | 68.1 | 1 | 11 | 0 | 1 | 0.5 | 0 | 0 | 15.5 | 0 | 0 |
| M2618 | 0.9 | 3 | 0 | 71.6 | 1 | 10.5 | 0 | 1.5 | 0.5 | 0 | 0 | 11 | 0 | 0 |
| M2619 | 1.1 | 2.8 | 0 | 76.6 | 1 | 13 | 0 | 1 | 0.5 | 0 | 0 | 4 | 0 | 0 |
| M2620 | 0.9 | 3 | 0 | 74.1 | 1 | 12 | 0 | 1.5 | 0.5 | 0 | 0 | 7 | 0 | 0 |
| M2621 | 2.2 | 1 | 0 | 70.3 | 1 | 20 | 0 | 1 | 0.5 | 0 | 0 | 4 | 0 | 0 |
| M2622 | 1.3 | 2.8 | 0 | 74.4 | 1 | 15 | 0 | 1 | 0.5 | 0 | 0 | 4 | 0 | 0 |
| M2623 | 1.3 | 2.8 | 0 | 72.4 | 1 | 16.5 | 0 | 1 | 0.5 | 0 | 0 | 4.5 | 0 | 0 |
| M2624 | 1.4 | 2.9 | 0 | 72.7 | 1 | 16 | 0 | 1 | 0.5 | 0 | 0 | 4.5 | 0 | 0 |
| M2625 | 1.3 | 2.9 | 0 | 68.3 | 1 | 13.5 | 0 | 1 | 0.5 | 0 | 0 | 11.5 | 0 | 0 |
| M2626 | 1 | 2.9 | 0 | 77.1 | 1 | 12.5 | 0 | 1 | 0.5 | 0 | 0 | 4 | 0 | 0 |
| M2627 | 0.7 | 3 | 0 | 79.3 | 1 | 9.5 | 0 | 1 | 0.5 | 0 | 0 | 5 | 0 | 0 |
| M2628 | 0.7 | 3 | 0 | 79.8 | 1 | 10 | 0 | 1 | 0.5 | 0 | 0 | 4 | 0 | 0 |
| M2629 | 0.7 | 3 | 0 | 79.3 | 1 | 10 | 0 | 1 | 0.5 | 0 | 0 | 4.5 | 0 | 0 |
| M2630 | 0.7 | 3 | 0 | 78.8 | 1 | 10 | 0 | 1 | 0.5 | 0 | 0 | 5 | 0 | 0 |
| M2631 | 1.8 | 2.6 | 0 | 69.1 | 1 | 20 | 0 | 1 | 0.5 | 0 | 0 | 4 | 0 | 0 |
| M2632 | 1.4 | 2.7 | 0 | 68.4 | 1 | 15 | 0 | 2 | 0.5 | 0 | 0 | 9 | 0 | 0 |
| M2633 | 0.9 | 2.8 | 0 | 78.8 | 1 | 11 | 0 | 1 | 0.5 | 0 | 0 | 4 | 0 | 0 |
| M2634 | 1.5 | 2.8 | 0 | 71.7 | 1 | 17 | 0 | 1 | 0.5 | 0 | 0 | 4.5 | 0 | 0 |
| M2635 | 0.7 | 2.4 | 0 | 80.9 | 1 | 9.5 | 0 | 1 | 0.5 | 0 | 0 | 4 | 0 | 0 |
| M2636 | 0.6 | 3 | 0 | 78.4 | 1 | 10.5 | 0 | 1 | 0.5 | 0 | 0 | 5 | 0 | 0 |
| M2637 | 0.9 | 2.7 | 0 | 77.4 | 1 | 12.5 | 0 | 1 | 0.5 | 0 | 0 | 4 | 0 | 0 |
| M2638 | 0.9 | 2.7 | 0 | 76.4 | 1 | 13 | 0 | 1 | 0.5 | 0 | 0 | 4.5 | 0 | 0 |
| M2639 | 1.1 | 3 | 0 | 67.4 | 1 | 11 | 0 | 2 | 0.5 | 0 | 0 | 14 | 0 | 0 |

TABLE 11-continued

Compositions and thermodynamic criteria for vanadium carbides

| | | | | | | | | | | | | | | |
|---|---|---|---|---|---|---|---|---|---|---|---|---|---|---|
| M2640 | 1 | 3 | 0 | 70 | 1 | 10.5 | 0 | 1 | 0.5 | 0 | 0 | 13 | 0 | 0 |
| M2641 | 0.6 | 2.9 | 0 | 78.5 | 1 | 11 | 0 | 1 | 0.5 | 0 | 0 | 4.5 | 0 | 0 |
| M2642 | 0.8 | 1 | 0 | 75.7 | 1 | 6 | 0 | 1.5 | 0.5 | 0 | 0 | 13.5 | 0 | 0 |
| M2643 | 1 | 1.9 | 0 | 76.1 | 1 | 10 | 0 | 1.5 | 0.5 | 0 | 0 | 8 | 0 | 0 |
| M2644 | 1.1 | 2.4 | 0 | 76.5 | 1 | 13.5 | 0 | 1 | 0.5 | 0 | 0 | 4 | 0 | 0 |
| M2645 | 1.1 | 2.9 | 0 | 72 | 1 | 13 | 0 | 1 | 0.5 | 0 | 0 | 8.5 | 0 | 0 |
| M2646 | 0.6 | 2.8 | 0 | 81.1 | 1 | 9 | 0 | 1 | 0.5 | 0 | 0 | 4 | 0 | 0 |
| M2647 | 0.7 | 2.8 | 0 | 79.5 | 1 | 10.5 | 0 | 1 | 0.5 | 0 | 0 | 4 | 0 | 0 |
| M2648 | 0.6 | 2.8 | 0 | 78.6 | 1 | 9.5 | 0 | 1.5 | 0.5 | 0 | 0 | 5.5 | 0 | 0 |
| M2649 | 0.9 | 2.9 | 0 | 75.2 | 1 | 13.5 | 0 | 1 | 0.5 | 0 | 0 | 5 | 0 | 0 |
| M2650 | 1.1 | 2.8 | 0 | 74.1 | 1 | 15 | 0 | 1 | 0.5 | 0 | 0 | 4.5 | 0 | 0 |
| M2651 | 1.1 | 2.8 | 0 | 73.6 | 1 | 15 | 0 | 1 | 0.5 | 0 | 0 | 5 | 0 | 0 |
| M2652 | 0.9 | 2.9 | 0 | 74.7 | 1 | 14 | 0 | 1 | 0.5 | 0 | 0 | 5 | 0 | 0 |
| M2653 | 0.9 | 2.6 | 0 | 77.5 | 1 | 12.5 | 0 | 1 | 0.5 | 0 | 0 | 4 | 0 | 0 |
| M2654 | 0.8 | 1.5 | 0 | 72.7 | 1 | 6 | 0 | 1.5 | 0.5 | 0 | 0 | 16 | 0 | 0 |
| M2655 | 1.3 | 2.7 | 0 | 72 | 1 | 17 | 0 | 1 | 0.5 | 0 | 0 | 4.5 | 0 | 0 |
| M2656 | 1.4 | 2.8 | 0 | 69.3 | 1 | 18.5 | 0 | 1.5 | 0.5 | 0 | 0 | 5 | 0 | 0 |
| M2657 | 1.2 | 2.6 | 0 | 74.7 | 1 | 15 | 0 | 1 | 0.5 | 0 | 0 | 4 | 0 | 0 |
| M2658 | 1.5 | 2.6 | 0 | 70.9 | 1 | 17.5 | 0 | 1 | 0.5 | 0 | 0 | 5 | 0 | 0 |
| M2659 | 0.7 | 2.9 | 0 | 79.4 | 1 | 10 | 0 | 1 | 0.5 | 0 | 0 | 4.5 | 0 | 0 |
| M2660 | 0.7 | 2.9 | 0 | 78.4 | 1 | 10.5 | 0 | 1 | 0.5 | 0 | 0 | 5 | 0 | 0 |
| M2661 | 0.6 | 2.8 | 0 | 78.6 | 1 | 11 | 0 | 1 | 0.5 | 0 | 0 | 4.5 | 0 | 0 |
| M2662 | 0.8 | 2.8 | 0 | 78.9 | 1 | 10.5 | 0 | 1 | 0.5 | 0 | 0 | 4.5 | 0 | 0 |
| M2663 | 0.8 | 2.8 | 0 | 76.9 | 1 | 12.5 | 0 | 1 | 0.5 | 0 | 0 | 4.5 | 0 | 0 |
| M2664 | 2 | 1.5 | 0 | 63 | 1 | 18 | 0 | 1 | 0.5 | 0 | 0 | 13 | 0 | 0 |
| M2665 | 0.7 | 3 | 0 | 77.8 | 1 | 12 | 0 | 1 | 0.5 | 0 | 0 | 4 | 0 | 0 |
| M2666 | 0.9 | 2.8 | 0 | 76.3 | 1 | 13 | 0 | 1 | 0.5 | 0 | 0 | 4.5 | 0 | 0 |
| M2667 | 0.7 | 2.4 | 0 | 78.4 | 1 | 8.5 | 0 | 1 | 0.5 | 0 | 0 | 7.5 | 0 | 0 |
| M2668 | 0.7 | 2.5 | 0 | 80.3 | 1 | 10 | 0 | 1 | 0.5 | 0 | 0 | 4 | 0 | 0 |
| M2669 | 0.6 | 3 | 0 | 79.4 | 1 | 9 | 0 | 1 | 0.5 | 0 | 0 | 5.5 | 0 | 0 |
| M2670 | 1.1 | 2.6 | 0 | 75.8 | 1 | 13 | 0 | 1 | 0.5 | 0 | 0 | 5 | 0 | 0 |
| M2671 | 0.6 | 3 | 0 | 79.4 | 1 | 10 | 0 | 1 | 0.5 | 0 | 0 | 4.5 | 0 | 0 |
| M2672 | 1.4 | 3.8 | 0 | 62.3 | 0.5 | 16 | 0 | 1.5 | 0.5 | 0 | 0 | 14 | 0 | 0 |
| M2673 | 1.2 | 3 | 0 | 71.3 | 1 | 15.5 | 0 | 1 | 0.5 | 0 | 0 | 6.5 | 0 | 0 |
| M2674 | 1 | 1.8 | 0 | 72.7 | 1 | 9.5 | 0 | 1.5 | 0.5 | 0 | 0 | 12 | 0 | 0 |
| M2675 | 1.6 | 2.8 | 0 | 66.6 | 1 | 20 | 0 | 2 | 0.5 | 0 | 0 | 5.5 | 0 | 0 |
| M2676 | 1.8 | 2.8 | 0 | 60.4 | 1 | 16.5 | 0 | 1 | 0.5 | 0 | 0 | 16 | 0 | 0 |
| M2677 | 1.4 | 2.6 | 0 | 69.5 | 1 | 14.5 | 0 | 1 | 0.5 | 0 | 0 | 9.5 | 0 | 0 |
| M2678 | 0.7 | 2.9 | 0 | 76.9 | 1 | 13 | 0 | 1 | 0.5 | 0 | 0 | 4 | 0 | 0 |
| M2679 | 1.4 | 2.5 | 0 | 72.1 | 1 | 15.5 | 0 | 1 | 0.5 | 0 | 0 | 6 | 0 | 0 |
| M2680 | 1 | 2.3 | 0 | 74.7 | 1 | 10.5 | 0 | 1 | 0.5 | 0 | 0 | 9 | 0 | 0 |
| M2681 | 2 | 0.5 | 0 | 74 | 1 | 18 | 0 | 1 | 0.5 | 0 | 0 | 3 | 0 | 0 |
| M2682 | 1.4 | 2.8 | 0 | 69.8 | 1 | 18.5 | 0 | 1 | 0.5 | 0 | 0 | 5 | 0 | 0 |
| M2683 | 0.7 | 3 | 0 | 76.8 | 1 | 10.5 | 0 | 1 | 0.5 | 0 | 0 | 6.5 | 0 | 0 |
| M2684 | 2.2 | 3 | 0 | 56.8 | 0 | 20 | 0 | 0 | 0 | 0 | 0 | 18 | 0 | 0 |
| M2685 | 1.5 | 2.8 | 0 | 68.7 | 1 | 18 | 0 | 1.5 | 0.5 | 0 | 0 | 6 | 0 | 0 |
| M2686 | 2.2 | 1.1 | 0 | 69.2 | 1 | 20 | 0 | 1 | 0.5 | 0 | 0 | 5 | 0 | 0 |
| M2687 | 1.7 | 2.3 | 0 | 66.5 | 1 | 16.5 | 0 | 2 | 0.5 | 0 | 0 | 9.5 | 0 | 0 |
| M2688 | 0.6 | 3 | 0 | 77.4 | 1 | 10.5 | 0 | 1 | 0.5 | 0 | 0 | 6 | 0 | 0 |
| M2689 | 1.1 | 2.8 | 0 | 67.1 | 1 | 10.5 | 0 | 1 | 0.5 | 0 | 0 | 16 | 0 | 0 |
| M2690 | 1.7 | 1.5 | 0 | 72.8 | 1 | 16.5 | 0 | 2 | 0.5 | 0 | 0 | 4 | 0 | 0 |
| M2691 | 1.1 | 1.6 | 0 | 69.3 | 1 | 9.5 | 0 | 1 | 0.5 | 0 | 0 | 16 | 0 | 0 |
| M2692 | 1 | 2.3 | 0 | 76.7 | 1 | 12.5 | 0 | 2 | 0.5 | 0 | 0 | 4 | 0 | 0 |
| M2693 | 1.7 | 1 | 0 | 70.8 | 1 | 15.5 | 0 | 2 | 0.5 | 0 | 0 | 7.5 | 0 | 0 |
| M2694 | 2.4 | 2.8 | 0 | 60.8 | 0 | 20 | 0 | 0 | 0 | 0 | 14 | 0 | 0 | 0 |
| M2695 | 1.1 | 2.6 | 0 | 68.3 | 1 | 10.5 | 0 | 1 | 0.5 | 0 | 0 | 15 | 0 | 0 |
| M2696 | 0.8 | 1.6 | 0 | 70.6 | 1 | 7.5 | 0 | 2 | 0.5 | 0 | 0 | 16 | 0 | 0 |
| M2697 | 2.2 | 2.8 | 0 | 57 | 0 | 20 | 2 | 0 | 0 | 0 | 0 | 16 | 0 | 0 |
| M2698 | 0.7 | 2.5 | 0 | 79.8 | 1 | 10 | 0 | 1 | 0.5 | 0 | 0 | 4.5 | 0 | 0 |
| M2699 | 1.7 | 2.8 | 0 | 63 | 1 | 16.5 | 0 | 2 | 0.5 | 0 | 0 | 12.5 | 0 | 0 |
| M2700 | 1.8 | 2.2 | 0 | 70 | 1 | 19.5 | 0 | 1 | 0.5 | 0 | 0 | 4 | 0 | 0 |
| M2701 | 1.6 | 1.4 | 0 | 76 | 0 | 12 | 2 | 0 | 0 | 0 | 7 | 0 | 0 | 0 |
| M2702 | 1 | 1.5 | 0 | 77 | 1 | 9.5 | 0 | 1 | 0.5 | 0 | 0 | 8.5 | 0 | 0 |
| M2703 | 0.7 | 2 | 0 | 81.8 | 1 | 8.5 | 0 | 1 | 0.5 | 0 | 0 | 4.5 | 0 | 0 |
| M2704 | 1.7 | 2.7 | 0 | 67.1 | 1 | 18.5 | 0 | 1 | 0.5 | 0 | 0 | 7.5 | 0 | 0 |
| M2705 | 2.2 | 0.9 | 0 | 70.4 | 1 | 20 | 0 | 1 | 0.5 | 0 | 0 | 4 | 0 | 0 |
| M2706 | 1.7 | 2.3 | 0 | 69 | 1 | 19 | 0 | 2 | 0.5 | 0 | 0 | 4.5 | 0 | 0 |
| M2707 | 0.9 | 1 | 0 | 74.6 | 1 | 6 | 0 | 1.5 | 0.5 | 0 | 0 | 14.5 | 0 | 0 |
| M2708 | 1.4 | 1.8 | 0 | 69.8 | 0 | 12 | 3 | 1 | 0 | 0 | 7 | 4 | 0 | 0 |
| M2709 | 1.9 | 1.2 | 0 | 63.9 | 1 | 16 | 0 | 2 | 0.5 | 0 | 0 | 13.5 | 0 | 0 |
| M2710 | 0.6 | 3 | 0 | 76.9 | 1 | 11 | 0 | 1 | 0.5 | 0 | 0 | 6 | 0 | 0 |
| M2711 | 0.9 | 3 | 0 | 73.6 | 1 | 14 | 0 | 1 | 0.5 | 0 | 0 | 6 | 0 | 0 |
| M2712 | 1 | 2.5 | 0 | 75.5 | 1 | 13.5 | 0 | 1.5 | 0.5 | 0 | 0 | 4.5 | 0 | 0 |
| M2713 | 1.3 | 2.7 | 0 | 68.5 | 1 | 13 | 0 | 1 | 0.5 | 0 | 0 | 12 | 0 | 0 |
| M2714 | 1.1 | 2.4 | 0 | 76 | 1 | 13.5 | 0 | 1 | 0.5 | 0 | 0 | 4.5 | 0 | 0 |
| M2715 | 1.3 | 2.7 | 0 | 70 | 1 | 17.5 | 0 | 2 | 0.5 | 0 | 0 | 5 | 0 | 0 |
| M2716 | 0.6 | 2.6 | 0 | 68.3 | 1 | 6 | 0 | 1 | 0.5 | 0 | 0 | 20 | 0 | 0 |
| M2717 | 0.7 | 1.6 | 0 | 78.7 | 1 | 7 | 0 | 1 | 0.5 | 0 | 0 | 9.5 | 0 | 0 |

TABLE 11-continued

Compositions and thermodynamic criteria for vanadium carbides

| ID | | | | | | | | | | | | | | |
|---|---|---|---|---|---|---|---|---|---|---|---|---|---|---|
| M2718 | 1.4 | 4 | 0 | 59.1 | 0.5 | 14 | 0 | 1.5 | 0.5 | 0 | 0 | 19 | 0 | 0 |
| M2719 | 1.7 | 2.6 | 0 | 67.7 | 1 | 19 | 0 | 1.5 | 0.5 | 0 | 0 | 6 | 0 | 0 |
| M2720 | 1.2 | 1.7 | 0 | 77.6 | 1 | 12.5 | 0 | 1 | 0.5 | 0 | 0 | 4.5 | 0 | 0 |
| M2721 | 1 | 3 | 0 | 72 | 1 | 16 | 0 | 1 | 0.5 | 0 | 0 | 5.5 | 0 | 0 |
| M2722 | 1 | 1.5 | 0 | 72.5 | 1 | 9.5 | 0 | 1 | 0.5 | 0 | 0 | 13 | 0 | 0 |
| M2723 | 1.6 | 2.3 | 0 | 70.1 | 1 | 19 | 0 | 1.5 | 0.5 | 0 | 0 | 4 | 0 | 0 |
| M2724 | 1 | 2.7 | 0 | 74.3 | 1 | 13 | 0 | 1.5 | 0.5 | 0 | 0 | 6 | 0 | 0 |
| M2725 | 1.1 | 2.7 | 0 | 73.2 | 1 | 14 | 0 | 1.5 | 0.5 | 0 | 0 | 6 | 0 | 0 |
| M2726 | 2 | 2.8 | 0 | 60.2 | 1 | 19.5 | 0 | 2 | 0.5 | 0 | 0 | 12 | 0 | 0 |
| M2727 | 1.2 | 2.3 | 0 | 73 | 1 | 13.5 | 0 | 2 | 0.5 | 0 | 0 | 6.5 | 0 | 0 |
| M2728 | 1.4 | 2.9 | 0 | 67.7 | 1 | 19.5 | 0 | 1.5 | 0.5 | 0 | 0 | 5.5 | 0 | 0 |
| M2729 | 2 | 2.2 | 0 | 65.3 | 1 | 19.5 | 0 | 1 | 0.5 | 0 | 0 | 8.5 | 0 | 0 |
| M2730 | 1.6 | 2.3 | 0 | 70.6 | 1 | 19 | 0 | 1 | 0.5 | 0 | 0 | 4 | 0 | 0 |
| M2731 | 1.2 | 2.7 | 0 | 70.6 | 1 | 17 | 0 | 2 | 0.5 | 0 | 0 | 5 | 0 | 0 |
| M2732 | 2 | 1.2 | 0 | 66.8 | 0 | 14 | 0 | 0 | 0 | 0 | 0 | 16 | 0 | 0 |
| M2733 | 0.6 | 2.9 | 0 | 75 | 1 | 9 | 0 | 2 | 0.5 | 0 | 0 | 9 | 0 | 0 |
| M2734 | 1.9 | 1.1 | 0 | 74.5 | 1 | 18 | 0 | 1 | 0.5 | 0 | 0 | 2 | 0 | 0 |
| M2735 | 1.4 | 2.7 | 0 | 67.9 | 1 | 15.5 | 0 | 2 | 0.5 | 0 | 0 | 9 | 0 | 0 |
| M2736 | 1.1 | 2.1 | 0 | 68.3 | 1 | 10.5 | 0 | 2 | 0.5 | 0 | 0 | 14.5 | 0 | 0 |
| M2737 | 0.7 | 2.9 | 0 | 74.9 | 1 | 13.5 | 0 | 1.5 | 0.5 | 0 | 0 | 5 | 0 | 0 |
| M2738 | 1.4 | 3.4 | 0 | 62.7 | 0.5 | 14 | 0 | 1.5 | 0.5 | 0 | 0 | 16 | 0 | 0 |
| M2739 | 1.7 | 1.5 | 0 | 63.8 | 1 | 14 | 0 | 1.5 | 0.5 | 0 | 0 | 16 | 0 | 0 |
| M2740 | 2.2 | 2.6 | 0 | 57.2 | 0 | 20 | 0 | 0 | 0 | 0 | 0 | 18 | 0 | 0 |
| M2741 | 2.2 | 3 | 0 | 54.8 | 0 | 20 | 0 | 0 | 0 | 0 | 0 | 20 | 0 | 0 |
| M2742 | 1.4 | 2 | 0 | 66.6 | 0 | 12 | 6 | 0 | 0 | 0 | 6 | 6 | 0 | 0 |
| M2743 | 0.7 | 2.8 | 0 | 75 | 1 | 13 | 0 | 2 | 0.5 | 0 | 0 | 5 | 0 | 0 |
| M2744 | 0.6 | 3 | 0 | 75.9 | 1 | 12.5 | 0 | 1 | 0.5 | 0 | 0 | 5.5 | 0 | 0 |
| M2745 | 1.5 | 2.2 | 0 | 70.8 | 1 | 16 | 0 | 1.5 | 0.5 | 0 | 0 | 6.5 | 0 | 0 |
| M2746 | 2.2 | 1.6 | 0 | 68.2 | 0 | 20 | 0 | 0 | 0 | 0 | 8 | 0 | 0 | 0 |
| M2747 | 1.1 | 2.9 | 0 | 69.5 | 1 | 12.5 | 0 | 1.5 | 0.5 | 0 | 0 | 11 | 0 | 0 |
| M2748 | 1.6 | 1 | 0 | 66.9 | 1 | 13.5 | 0 | 2 | 0.5 | 0 | 0 | 13.5 | 0 | 0 |
| M2749 | 1.3 | 2.7 | 0 | 70 | 1 | 18 | 0 | 1.5 | 0.5 | 0 | 0 | 5 | 0 | 0 |
| M2750 | 1.1 | 2.9 | 0 | 70 | 1 | 17 | 0 | 2 | 0.5 | 0 | 0 | 5.5 | 0 | 0 |
| M2751 | 0.7 | 2.3 | 0 | 79.5 | 1 | 10.5 | 0 | 1.5 | 0.5 | 0 | 0 | 4 | 0 | 0 |
| M2752 | 1.7 | 2.8 | 0 | 62.5 | 1 | 16.5 | 0 | 2 | 0.5 | 0 | 0 | 13 | 0 | 0 |
| M2753 | 1.6 | 2.2 | 0 | 67.2 | 1 | 15 | 0 | 1 | 0.5 | 0 | 0 | 11.5 | 0 | 0 |
| M2754 | 1.4 | 3.8 | 0 | 61.3 | 0.5 | 16 | 0 | 1.5 | 0.5 | 0 | 0 | 15 | 0 | 0 |
| M2755 | 1.9 | 2.1 | 0 | 65.5 | 1 | 18.5 | 0 | 2 | 0.5 | 0 | 0 | 8.5 | 0 | 0 |
| M2756 | 1.7 | 2.4 | 0 | 67.9 | 1 | 19 | 0 | 2 | 0.5 | 0 | 0 | 5.5 | 0 | 0 |
| M2757 | 0.9 | 2.9 | 0 | 73.2 | 1 | 12 | 0 | 1 | 0.5 | 0 | 0 | 8.5 | 0 | 0 |
| M2758 | 0.9 | 3 | 0 | 71.6 | 1 | 12.5 | 0 | 2 | 0.5 | 0 | 0 | 8.5 | 0 | 0 |
| M2759 | 0.7 | 2.8 | 0 | 76 | 1 | 13 | 0 | 1 | 0.5 | 0 | 0 | 5 | 0 | 0 |
| M2760 | 1.4 | 3.6 | 0 | 62.5 | 0.5 | 16 | 0 | 1.5 | 0.5 | 0 | 0 | 14 | 0 | 0 |
| M2761 | 2.2 | 0.5 | 0 | 70.8 | 1 | 20 | 0 | 1 | 0.5 | 0 | 0 | 4 | 0 | 0 |
| M2762 | 1 | 2.2 | 0 | 76.3 | 1 | 13 | 0 | 2 | 0.5 | 0 | 0 | 4 | 0 | 0 |
| M2763 | 1.1 | 2.9 | 0 | 69.5 | 1 | 13.5 | 0 | 2 | 0.5 | 0 | 0 | 9.5 | 0 | 0 |
| M2764 | 1.7 | 2.6 | 0 | 64.2 | 1 | 17 | 0 | 2 | 0.5 | 0 | 0 | 11 | 0 | 0 |
| M2765 | 1.9 | 1 | 0 | 64.6 | 1 | 17 | 0 | 1 | 0.5 | 0 | 0 | 13 | 0 | 0 |
| M2766 | 1.3 | 1.1 | 0 | 70.1 | 1 | 9 | 0 | 1 | 0.5 | 0 | 0 | 16 | 0 | 0 |
| M2767 | 1.1 | 2.7 | 0 | 71.7 | 1 | 15 | 0 | 2 | 0.5 | 0 | 0 | 6 | 0 | 0 |
| M2768 | 2.2 | 3 | 0 | 52.8 | 0 | 20 | 2 | 0 | 0 | 0 | 0 | 20 | 0 | 0 |
| M2769 | 1 | 1.2 | 0 | 71.3 | 1 | 8 | 0 | 1 | 0.5 | 0 | 0 | 16 | 0 | 0 |
| M2770 | 0.9 | 2.9 | 0 | 71.7 | 1 | 11.5 | 0 | 1.5 | 0.5 | 0 | 0 | 10 | 0 | 0 |
| M2771 | 1.3 | 2.7 | 0 | 66 | 1 | 12.5 | 0 | 1 | 0.5 | 0 | 0 | 15 | 0 | 0 |
| M2772 | 2.2 | 1.8 | 0 | 60 | 0 | 18 | 0 | 0 | 0 | 0 | 0 | 18 | 0 | 0 |
| M2773 | 1.8 | 2.6 | 0 | 65.6 | 1 | 19.5 | 0 | 1 | 0.5 | 0 | 0 | 8 | 0 | 0 |
| M2774 | 2.2 | 2.8 | 0 | 54 | 0 | 20 | 1 | 0 | 0 | 0 | 0 | 20 | 0 | 0 |
| M2775 | 0.6 | 2.7 | 0 | 77.7 | 1 | 11.5 | 0 | 1 | 0.5 | 0 | 0 | 5 | 0 | 0 |
| M2776 | 1.1 | 3 | 0 | 68.9 | 1 | 14 | 0 | 2 | 0.5 | 0 | 0 | 9.5 | 0 | 0 |
| M2777 | 1.9 | 2.6 | 0 | 63 | 1 | 20 | 0 | 2 | 0.5 | 0 | 0 | 9 | 0 | 0 |
| M2778 | 2 | 2.9 | 0 | 60.1 | 1 | 19.5 | 0 | 1 | 0.5 | 0 | 0 | 13 | 0 | 0 |
| M2779 | 1.3 | 2.6 | 0 | 65.1 | 1 | 12.5 | 0 | 1 | 0.5 | 0 | 0 | 16 | 0 | 0 |
| M2780 | 2.4 | 1.6 | 0 | 68 | 0 | 18 | 0 | 0 | 0 | 0 | 10 | 0 | 0 | 0 |
| M2781 | 2.2 | 2 | 0 | 58.8 | 0 | 20 | 1 | 0 | 0 | 0 | 0 | 16 | 0 | 0 |
| M2782 | 2.2 | 2.2 | 0 | 55.6 | 0 | 18 | 2 | 0 | 0 | 0 | 0 | 20 | 0 | 0 |
| M2783 | 1.4 | 2.9 | 0 | 67.7 | 1 | 19.5 | 0 | 1 | 0.5 | 0 | 0 | 6 | 0 | 0 |
| M2784 | 1.7 | 1.1 | 0 | 66.2 | 1 | 13.5 | 0 | 1 | 0.5 | 0 | 0 | 15 | 0 | 0 |
| M2785 | 0.7 | 2.8 | 0 | 74.5 | 1 | 13 | 0 | 2 | 0.5 | 0 | 0 | 5.5 | 0 | 0 |
| M2786 | 1.8 | 1.5 | 0 | 61.7 | 1 | 16 | 0 | 1.5 | 0.5 | 0 | 0 | 16 | 0 | 0 |
| M2787 | 1.9 | 2.6 | 0 | 63.5 | 1 | 20 | 0 | 1.5 | 0.5 | 0 | 0 | 9 | 0 | 0 |
| M2788 | 0.6 | 3 | 0 | 74.4 | 1 | 12 | 0 | 2 | 0.5 | 0 | 0 | 6.5 | 0 | 0 |
| M2789 | 2.2 | 0.5 | 0 | 71.8 | 1 | 20 | 0 | 1 | 0.5 | 0 | 0 | 3 | 0 | 0 |
| M2790 | 1.3 | 1.1 | 0 | 69.6 | 1 | 9.5 | 0 | 1 | 0.5 | 0 | 0 | 16 | 0 | 0 |
| M2791 | 1.6 | 2.4 | 0 | 68.5 | 1 | 20 | 0 | 1.5 | 0.5 | 0 | 0 | 4.5 | 0 | 0 |
| M2792 | 2.2 | 2.4 | 0 | 53.4 | 0 | 20 | 2 | 0 | 0 | 0 | 0 | 20 | 0 | 0 |
| M2793 | 1.1 | 2.1 | 0 | 75.3 | 1 | 13 | 0 | 2 | 0.5 | 0 | 0 | 5 | 0 | 0 |
| M2794 | 1.5 | 2.2 | 0 | 70.3 | 1 | 18.5 | 0 | 2 | 0.5 | 0 | 0 | 4 | 0 | 0 |
| M2795 | 0.6 | 2.9 | 0 | 75.5 | 1 | 10 | 0 | 1.5 | 0.5 | 0 | 0 | 8 | 0 | 0 |

TABLE 11-continued

Compositions and thermodynamic criteria for vanadium carbides

| | | | | | | | | | | | | | | |
|---|---|---|---|---|---|---|---|---|---|---|---|---|---|---|
| M2796 | 0.9 | 3 | 0 | 71.1 | 1 | 12 | 0 | 1.5 | 0.5 | 0 | 0 | 10 | 0 | 0 |
| M2797 | 2 | 1.8 | 0 | 68.2 | 1 | 20 | 0 | 1 | 0.5 | 0 | 0 | 5.5 | 0 | 0 |
| M2798 | 0.6 | 2.6 | 0 | 77.3 | 1 | 10.5 | 0 | 2 | 0.5 | 0 | 0 | 5.5 | 0 | 0 |
| M2799 | 0.9 | 2.8 | 0 | 67.8 | 1 | 9 | 0 | 2 | 0.5 | 0 | 0 | 16 | 0 | 0 |
| M2800 | 2.2 | 2.2 | 0 | 53.6 | 0 | 20 | 2 | 0 | 0 | 0 | 0 | 20 | 0 | 0 |
| M2801 | 0.6 | 3 | 0 | 73.9 | 1 | 13 | 0 | 2 | 0.5 | 0 | 0 | 6 | 0 | 0 |
| M2802 | 0.9 | 2.5 | 0 | 69.6 | 1 | 9 | 0 | 2 | 0.5 | 0 | 0 | 14.5 | 0 | 0 |
| M2803 | 0.6 | 2.9 | 0 | 74.5 | 1 | 9 | 0 | 1.5 | 0.5 | 0 | 0 | 10 | 0 | 0 |
| M2804 | 1.8 | 2 | 0 | 67.7 | 1 | 18.5 | 0 | 2 | 0.5 | 0 | 0 | 6.5 | 0 | 0 |
| M2805 | 1.3 | 2.8 | 0 | 67.9 | 1 | 14 | 0 | 1 | 0.5 | 0 | 0 | 11.5 | 0 | 0 |
| M2806 | 1.3 | 2.8 | 0 | 67.9 | 1 | 19 | 0 | 2 | 0.5 | 0 | 0 | 5.5 | 0 | 0 |
| M2807 | 2 | 1.8 | 0 | 58.2 | 0 | 16 | 2 | 0 | 0 | 0 | 0 | 20 | 0 | 0 |
| M2808 | 2.2 | 1.8 | 0 | 56 | 0 | 18 | 2 | 0 | 0 | 0 | 0 | 20 | 0 | 0 |
| M2809 | 2.2 | 2.6 | 0 | 54.2 | 0 | 20 | 1 | 0 | 0 | 0 | 0 | 20 | 0 | 0 |
| M2810 | 0.8 | 2.8 | 0 | 74.4 | 1 | 12.5 | 0 | 1.5 | 0.5 | 0 | 0 | 6.5 | 0 | 0 |
| M2811 | 1.7 | 2 | 0 | 69.8 | 1 | 19 | 0 | 2 | 0.5 | 0 | 0 | 4 | 0 | 0 |
| M2812 | 1.4 | 2 | 0 | 65.6 | 0 | 12 | 5 | 0 | 0 | 0 | 6 | 8 | 0 | 0 |
| M2813 | 1.4 | 4 | 0 | 58.1 | 0.5 | 14 | 0 | 1.5 | 0.5 | 0 | 0 | 20 | 0 | 0 |
| M2814 | 1.6 | 2 | 0 | 58.4 | 0 | 16 | 2 | 0 | 0 | 0 | 0 | 20 | 0 | 0 |
| M2815 | 1 | 1.7 | 0 | 77.3 | 1 | 10.5 | 0 | 1 | 0.5 | 0 | 0 | 7 | 0 | 0 |
| M2816 | 2.4 | 1.8 | 0 | 65.8 | 0 | 20 | 0 | 0 | 0 | 0 | 10 | 0 | 0 | 0 |
| M2817 | 2.2 | 2.2 | 0 | 56.6 | 0 | 18 | 1 | 0 | 0 | 0 | 0 | 20 | 0 | 0 |
| M2818 | 0.7 | 2.3 | 0 | 79 | 1 | 11.5 | 0 | 1 | 0.5 | 0 | 0 | 4 | 0 | 0 |
| M2819 | 0.6 | 1.9 | 0 | 81.5 | 1 | 8 | 0 | 1 | 0.5 | 0 | 0 | 5.5 | 0 | 0 |
| M2820 | 0.9 | 3 | 0 | 70.1 | 1 | 11 | 0 | 1.5 | 0.5 | 0 | 0 | 12 | 0 | 0 |
| M2821 | 1.3 | 3 | 0 | 66.2 | 1 | 14.5 | 0 | 1.5 | 0.5 | 0 | 0 | 12 | 0 | 0 |
| M2822 | 1 | 2.8 | 0 | 71.7 | 1 | 15.5 | 0 | 1.5 | 0.5 | 0 | 0 | 6 | 0 | 0 |
| M2823 | 1.7 | 2.2 | 0 | 68.1 | 1 | 20 | 0 | 2 | 0.5 | 0 | 0 | 4.5 | 0 | 0 |
| M2824 | 1.4 | 1.6 | 0 | 73 | 0 | 12 | 0 | 0 | 0 | 0 | 8 | 4 | 0 | 0 |
| M2825 | 1.4 | 1.8 | 0 | 67.8 | 0 | 12 | 5 | 0 | 0 | 0 | 6 | 6 | 0 | 0 |
| M2826 | 0.7 | 3 | 0 | 74.3 | 1 | 12.5 | 0 | 1 | 0.5 | 0 | 0 | 7 | 0 | 0 |
| M2827 | 1.7 | 1.9 | 0 | 70.4 | 1 | 18.5 | 0 | 2 | 0.5 | 0 | 0 | 4 | 0 | 0 |
| M2828 | 1.6 | 2.3 | 0 | 69.6 | 1 | 18 | 0 | 1 | 0.5 | 0 | 0 | 6 | 0 | 0 |
| M2829 | 1.2 | 2.7 | 0 | 70.1 | 1 | 17.5 | 0 | 1.5 | 0.5 | 0 | 0 | 5.5 | 0 | 0 |
| M2830 | 2.2 | 2 | 0 | 56.8 | 0 | 18 | 1 | 0 | 0 | 0 | 0 | 20 | 0 | 0 |
| M2831 | 1.9 | 1 | 0 | 63.1 | 1 | 16 | 0 | 2 | 0.5 | 0 | 0 | 14.5 | 0 | 0 |
| M2832 | 1.6 | 1 | 0 | 70.9 | 1 | 15 | 0 | 2 | 0.5 | 0 | 0 | 8 | 0 | 0 |
| M2833 | 0.7 | 2.3 | 0 | 72.5 | 1 | 7.5 | 0 | 1 | 0.5 | 0 | 0 | 14.5 | 0 | 0 |
| M2834 | 0.7 | 2.3 | 0 | 78 | 1 | 10.5 | 0 | 2 | 0.5 | 0 | 0 | 5 | 0 | 0 |
| M2835 | 1.7 | 1.8 | 0 | 65.5 | 1 | 16 | 0 | 1.5 | 0.5 | 0 | 0 | 12 | 0 | 0 |
| M2836 | 1.3 | 3 | 0 | 67.2 | 1 | 20 | 0 | 1 | 0.5 | 0 | 0 | 6 | 0 | 0 |
| M2837 | 1.7 | 2.2 | 0 | 68.6 | 1 | 20 | 0 | 1.5 | 0.5 | 0 | 0 | 4.5 | 0 | 0 |
| M2838 | 1.4 | 2 | 0 | 67.6 | 0 | 12 | 1 | 0 | 0 | 0 | 8 | 8 | 0 | 0 |
| M2839 | 1 | 2.9 | 0 | 70.6 | 1 | 16.5 | 0 | 1.5 | 0.5 | 0 | 0 | 6 | 0 | 0 |
| M2840 | 0.7 | 2.8 | 0 | 74 | 1 | 13 | 0 | 2 | 0.5 | 0 | 0 | 6 | 0 | 0 |
| M2841 | 1.4 | 3.4 | 0 | 61.7 | 0.5 | 14 | 0 | 1.5 | 0.5 | 0 | 0 | 17 | 0 | 0 |
| M2842 | 0.7 | 2.9 | 0 | 70.4 | 1 | 7.5 | 0 | 1.5 | 0.5 | 0 | 0 | 15.5 | 0 | 0 |
| M2843 | 1.8 | 1.8 | 0 | 57.4 | 0 | 18 | 1 | 0 | 0 | 0 | 0 | 20 | 0 | 0 |
| M2844 | 1.3 | 2.8 | 0 | 66.4 | 1 | 14 | 0 | 2 | 0.5 | 0 | 0 | 12 | 0 | 0 |
| M2845 | 1.3 | 1.6 | 0 | 72.6 | 1 | 12.5 | 0 | 1.5 | 0.5 | 0 | 0 | 9 | 0 | 0 |
| M2846 | 2.4 | 2.2 | 0 | 63.4 | 0 | 20 | 0 | 0 | 0 | 0 | 12 | 0 | 0 | 0 |
| M2847 | 1.6 | 1.1 | 0 | 67.8 | 1 | 15 | 0 | 2 | 0.5 | 0 | 0 | 11 | 0 | 0 |
| M2848 | 1.3 | 2.9 | 0 | 65.3 | 1 | 13.5 | 0 | 2 | 0.5 | 0 | 0 | 13.5 | 0 | 0 |
| M2849 | 1.7 | 1.7 | 0 | 71.1 | 1 | 18 | 0 | 2 | 0.5 | 0 | 0 | 4 | 0 | 0 |
| M2850 | 2 | 1.8 | 0 | 56.2 | 0 | 20 | 2 | 0 | 0 | 0 | 0 | 18 | 0 | 0 |
| M2851 | 1.7 | 2.5 | 0 | 65.3 | 1 | 19 | 0 | 2 | 0.5 | 0 | 0 | 8 | 0 | 0 |
| M2852 | 1.4 | 3.6 | 0 | 61.5 | 0.5 | 16 | 0 | 1.5 | 0.5 | 0 | 0 | 15 | 0 | 0 |
| M2853 | 1.7 | 1.8 | 0 | 70.5 | 1 | 18 | 0 | 1.5 | 0.5 | 0 | 0 | 5 | 0 | 0 |
| M2854 | 0.1 | 3.8 | 0 | 73.6 | 1 | 6 | 0 | 1 | 0.5 | 0 | 0 | 14 | 0 | 0 |
| M2855 | 0.7 | 3 | 0 | 73.3 | 1 | 14 | 0 | 1 | 0.5 | 0 | 0 | 6.5 | 0 | 0 |
| M2856 | 1.6 | 2.1 | 0 | 69.3 | 1 | 19 | 0 | 2 | 0.5 | 0 | 0 | 4.5 | 0 | 0 |
| M2857 | 1.8 | 2.2 | 0 | 61.5 | 0 | 15 | 6 | 0 | 0 | 0 | 7.5 | 6 | 0 | 0 |
| M2858 | 1.5 | 2.4 | 0 | 68.6 | 1 | 19.5 | 0 | 1.5 | 0.5 | 0 | 0 | 5 | 0 | 0 |
| M2859 | 0.7 | 3 | 0 | 71.3 | 1 | 9 | 0 | 1.5 | 0.5 | 0 | 0 | 13 | 0 | 0 |
| M2860 | 0.8 | 1.6 | 0 | 78.6 | 1 | 9 | 0 | 2 | 0.5 | 0 | 0 | 6.5 | 0 | 0 |
| M2861 | 1.1 | 2.9 | 0 | 69 | 1 | 15.5 | 0 | 2 | 0.5 | 0 | 0 | 8 | 0 | 0 |
| M2862 | 1.4 | 1.8 | 0 | 72.8 | 0 | 12 | 4 | 0 | 0 | 0 | 8 | 0 | 0 | 0 |
| M2863 | 1.4 | 4 | 0 | 57.1 | 0.5 | 14 | 0 | 1.5 | 0.5 | 0 | 0 | 21 | 0 | 0 |
| M2864 | 2 | 0.4 | 0 | 67.6 | 0 | 18 | 0 | 0 | 0 | 0 | 0 | 12 | 0 | 0 |
| M2865 | 1.4 | 1.4 | 0 | 76.2 | 0 | 12 | 0 | 0 | 0 | 0 | 8 | 1 | 0 | 0 |
| M2866 | 1.3 | 2.8 | 0 | 67.4 | 1 | 14.5 | 0 | 1 | 0.5 | 0 | 0 | 11.5 | 0 | 0 |
| M2867 | 1 | 1.4 | 0 | 75.1 | 1 | 10 | 0 | 2 | 0.5 | 0 | 0 | 9 | 0 | 0 |
| M2868 | 2 | 1.1 | 0 | 60.9 | 1 | 18 | 0 | 1.5 | 0.5 | 0 | 0 | 15 | 0 | 0 |
| M2869 | 1.4 | 2.2 | 0 | 68.4 | 0 | 12 | 8 | 0 | 0 | 0 | 8 | 0 | 0 | 0 |
| M2870 | 1 | 1.2 | 0 | 68.8 | 0 | 10 | 0 | 1 | 0 | 0 | 0 | 18 | 0 | 0 |
| M2871 | 1.3 | 2.6 | 0 | 70.1 | 1 | 17 | 0 | 1 | 0.5 | 0 | 0 | 6.5 | 0 | 0 |
| M2872 | 1 | 1 | 0 | 79 | 1 | 10 | 0 | 2 | 0.5 | 0 | 0 | 5.5 | 0 | 0 |
| M2873 | 1.3 | 2.7 | 0 | 69 | 1 | 18.5 | 0 | 1 | 0.5 | 0 | 0 | 6 | 0 | 0 |

TABLE 11-continued

Compositions and thermodynamic criteria for vanadium carbides

| | | | | | | | | | | | | | | |
|---|---|---|---|---|---|---|---|---|---|---|---|---|---|---|
| M2874 | 0.5 | 3.2 | 0 | 67.8 | 1 | 6 | 0 | 1 | 0.5 | 0 | 0 | 20 | 0 | 0 |
| M2875 | 1.4 | 3.8 | 0 | 57.3 | 0.5 | 14 | 0 | 1.5 | 0.5 | 0 | 0 | 21 | 0 | 0 |
| M2876 | 1.8 | 0.7 | 0 | 67.5 | 0 | 14 | 0 | 0 | 0 | 0 | 0 | 16 | 0 | 0 |
| M2877 | 1.4 | 4 | 0 | 56.1 | 0.5 | 14 | 0 | 1.5 | 0.5 | 0 | 0 | 22 | 0 | 0 |
| M2878 | 2 | 0.8 | 0 | 67.2 | 0 | 10 | 0 | 0 | 0 | 0 | 0 | 20 | 0 | 0 |
| M2879 | 1.4 | 3.4 | 0 | 60.7 | 0.5 | 14 | 0 | 1.5 | 0.5 | 0 | 0 | 18 | 0 | 0 |
| M2880 | 1.3 | 2.3 | 0 | 70.4 | 1 | 18 | 0 | 2 | 0.5 | 0 | 0 | 4.5 | 0 | 0 |
| M2881 | 0.8 | 2.8 | 0 | 72.9 | 1 | 12.5 | 0 | 1.5 | 0.5 | 0 | 0 | 8 | 0 | 0 |
| M2882 | 2 | 1 | 0 | 60 | 1 | 18.5 | 0 | 1 | 0.5 | 0 | 0 | 16 | 0 | 0 |
| M2883 | 2 | 1 | 0 | 60 | 1 | 18.5 | 0 | 1.5 | 0.5 | 0 | 0 | 15.5 | 0 | 0 |
| M2884 | 0.7 | 2.8 | 0 | 74 | 1 | 14.5 | 0 | 1 | 0.5 | 0 | 0 | 5.5 | 0 | 0 |
| M2885 | 1.7 | 2.4 | 0 | 65.9 | 1 | 18 | 0 | 1 | 0.5 | 0 | 0 | 9.5 | 0 | 0 |
| M2886 | 1.4 | 3.2 | 0 | 61.9 | 0.5 | 14 | 0 | 1.5 | 0.5 | 0 | 0 | 17 | 0 | 0 |
| M2887 | 1 | 2.3 | 0 | 73.2 | 1 | 13 | 0 | 2 | 0.5 | 0 | 0 | 7 | 0 | 0 |
| M2888 | 2 | 1.8 | 0 | 65.7 | 1 | 20 | 0 | 2 | 0.5 | 0 | 0 | 7 | 0 | 0 |
| M2889 | 1.7 | 1 | 0 | 62.3 | 1 | 15.5 | 0 | 2 | 0.5 | 0 | 0 | 16 | 0 | 0 |
| M2890 | 1.7 | 1.6 | 0 | 70.2 | 1 | 17.5 | 0 | 2 | 0.5 | 0 | 0 | 5.5 | 0 | 0 |
| M2891 | 2 | 1.1 | 0 | 59.4 | 1 | 18.5 | 0 | 1.5 | 0.5 | 0 | 0 | 16 | 0 | 0 |
| M2892 | 2 | 1.1 | 0 | 69.4 | 1 | 19 | 0 | 2 | 0.5 | 0 | 0 | 5 | 0 | 0 |
| M2893 | 1.9 | 1 | 0 | 60.1 | 1 | 17.5 | 0 | 2 | 0.5 | 0 | 0 | 16 | 0 | 0 |
| M2894 | 1.1 | 2.7 | 0 | 70.7 | 1 | 17 | 0 | 1 | 0.5 | 0 | 0 | 6 | 0 | 0 |
| M2895 | 2 | 2.3 | 0 | 60.2 | 1 | 19 | 0 | 1 | 0.5 | 0 | 0 | 14 | 0 | 0 |
| M2896 | 1.7 | 2.8 | 0 | 61.5 | 1 | 17 | 0 | 2 | 0.5 | 0 | 0 | 13.5 | 0 | 0 |
| M2897 | 1.4 | 3.8 | 0 | 56.3 | 0.5 | 14 | 0 | 1.5 | 0.5 | 0 | 0 | 22 | 0 | 0 |
| M2898 | 1.4 | 3.2 | 0 | 60.9 | 0.5 | 14 | 0 | 1.5 | 0.5 | 0 | 0 | 18 | 0 | 0 |
| M2899 | 0.7 | 3 | 0 | 71.8 | 1 | 15.5 | 0 | 1.5 | 0.5 | 0 | 0 | 6 | 0 | 0 |
| M2900 | 1.5 | 1.9 | 0 | 70.6 | 1 | 16 | 0 | 1.5 | 0.5 | 0 | 0 | 7 | 0 | 0 |
| M2901 | 0.7 | 2 | 0 | 71.3 | 1 | 7.5 | 0 | 1 | 0.5 | 0 | 0 | 16 | 0 | 0 |
| M2902 | 0.7 | 2.5 | 0 | 74.3 | 1 | 8.5 | 0 | 1 | 0.5 | 0 | 0 | 11.5 | 0 | 0 |
| M2903 | 1.5 | 1.3 | 0 | 71.2 | 1 | 14.5 | 0 | 1.5 | 0.5 | 0 | 0 | 8.5 | 0 | 0 |
| M2904 | 1.2 | 2.2 | 0 | 76.6 | 0 | 4 | 0 | 0 | 0 | 0 | 0 | 10 | 6 | 0 |
| M2905 | 0.9 | 3 | 0 | 70.6 | 1 | 13.5 | 0 | 1 | 0.5 | 0 | 0 | 9.5 | 0 | 0 |
| M2906 | 1.5 | 2.5 | 0 | 67 | 1 | 18.5 | 0 | 2 | 0.5 | 0 | 0 | 7 | 0 | 0 |
| M2907 | 1.4 | 3.2 | 0 | 59.9 | 0.5 | 14 | 0 | 1.5 | 0.5 | 0 | 0 | 19 | 0 | 0 |
| M2908 | 1 | 1.8 | 0 | 74.2 | 1 | 10.5 | 0 | 2 | 0.5 | 0 | 0 | 9 | 0 | 0 |
| M2909 | 1 | 3 | 0 | 69.5 | 1 | 17 | 0 | 1 | 0.5 | 0 | 0 | 7 | 0 | 0 |
| M2910 | 0.7 | 2.4 | 0 | 74.4 | 1 | 8.5 | 0 | 1.5 | 0.5 | 0 | 0 | 11 | 0 | 0 |
| M2911 | 0.7 | 2.8 | 0 | 73 | 1 | 12.5 | 0 | 2 | 0.5 | 0 | 0 | 7.5 | 0 | 0 |
| M2912 | 1 | 2.3 | 0 | 72.7 | 1 | 13 | 0 | 2 | 0.5 | 0 | 0 | 7.5 | 0 | 0 |
| M2913 | 1.4 | 1.6 | 0 | 72 | 0 | 12 | 2 | 1 | 0 | 0 | 8 | 2 | 0 | 0 |
| M2914 | 2 | 1.1 | 0 | 59.4 | 1 | 19 | 0 | 1.5 | 0.5 | 0 | 0 | 15.5 | 0 | 0 |
| M2915 | 1.4 | 2 | 0 | 69.6 | 0 | 12 | 6 | 1 | 0 | 0 | 8 | 0 | 0 | 0 |
| M2916 | 1 | 1.5 | 0 | 69.5 | 1 | 10 | 0 | 1.5 | 0.5 | 0 | 0 | 15 | 0 | 0 |
| M2917 | 1.6 | 1 | 0 | 63.9 | 1 | 15 | 0 | 2 | 0.5 | 0 | 0 | 15 | 0 | 0 |
| M2918 | 1.4 | 4 | 0 | 58.1 | 0.5 | 16 | 0 | 1.5 | 0.5 | 0 | 0 | 18 | 0 | 0 |
| M2919 | 0.6 | 2.4 | 0 | 77.5 | 1 | 12.5 | 0 | 1 | 0.5 | 0 | 0 | 4.5 | 0 | 0 |
| M2920 | 1.1 | 2.4 | 0 | 72.5 | 1 | 16.5 | 0 | 1 | 0.5 | 0 | 0 | 5 | 0 | 0 |
| M2921 | 1.4 | 1.6 | 0 | 73 | 0 | 12 | 2 | 0 | 0 | 0 | 8 | 2 | 0 | 0 |
| M2922 | 2 | 1.2 | 0 | 60.3 | 1 | 18.5 | 0 | 1.5 | 0.5 | 0 | 0 | 15 | 0 | 0 |
| M2923 | 1.4 | 2 | 0 | 67.6 | 0 | 12 | 8 | 1 | 0 | 0 | 8 | 0 | 0 | 0 |
| M2924 | 1.4 | 1.8 | 0 | 73.3 | 1 | 16.5 | 0 | 1.5 | 0.5 | 0 | 0 | 4 | 0 | 0 |
| M2925 | 0.8 | 2.7 | 0 | 70.5 | 1 | 9 | 0 | 1 | 0.5 | 0 | 0 | 14.5 | 0 | 0 |
| M2926 | 1 | 2.4 | 0 | 72.6 | 1 | 12.5 | 0 | 1 | 0.5 | 0 | 0 | 9 | 0 | 0 |
| M2927 | 0.6 | 2.8 | 0 | 72.6 | 1 | 8 | 0 | 1.5 | 0.5 | 0 | 0 | 13 | 0 | 0 |
| M2928 | 1.8 | 2.2 | 0 | 56.5 | 0 | 15 | 14.5 | 0 | 0 | 0 | 4 | 6 | 0 | 0 |
| M2929 | 0.7 | 2.8 | 0 | 72.5 | 1 | 11 | 0 | 1.5 | 0.5 | 0 | 0 | 10 | 0 | 0 |
| M2930 | 1.4 | 2.2 | 0 | 65.4 | 0 | 12 | 8 | 1 | 0 | 0 | 8 | 2 | 0 | 0 |
| M2931 | 2 | 1 | 0 | 60 | 1 | 19 | 0 | 2 | 0.5 | 0 | 0 | 14.5 | 0 | 0 |
| M2932 | 1.6 | 0.9 | 0 | 76 | 1 | 16 | 0 | 1 | 0.5 | 0 | 0 | 3 | 0 | 0 |
| M2933 | 0.7 | 2.1 | 0 | 77.2 | 1 | 12.5 | 0 | 2 | 0.5 | 0 | 0 | 4 | 0 | 0 |
| M2934 | 1.7 | 3 | 0 | 61.8 | 1 | 19.5 | 0 | 1 | 0.5 | 0 | 0 | 11.5 | 0 | 0 |
| M2935 | 1.6 | 1.6 | 0 | 68.3 | 1 | 15.5 | 0 | 2 | 0.5 | 0 | 0 | 9.5 | 0 | 0 |
| M2936 | 1.4 | 3.2 | 0 | 58.9 | 0.5 | 14 | 0 | 1.5 | 0.5 | 0 | 0 | 20 | 0 | 0 |
| M2937 | 1.9 | 2.1 | 0 | 64.5 | 1 | 19 | 0 | 1.5 | 0.5 | 0 | 0 | 9.5 | 0 | 0 |
| M2938 | 2 | 2.1 | 0 | 59.4 | 1 | 19 | 0 | 1.5 | 0.5 | 0 | 0 | 14.5 | 0 | 0 |
| M2939 | 1.7 | 2.8 | 0 | 63 | 1 | 19 | 0 | 1 | 0.5 | 0 | 0 | 11 | 0 | 0 |
| M2940 | 0.8 | 2 | 0 | 78.2 | 1 | 12.5 | 0 | 1 | 0.5 | 0 | 0 | 4 | 0 | 0 |
| M2941 | 2 | 1.1 | 0 | 59.4 | 1 | 19.5 | 0 | 1 | 0.5 | 0 | 0 | 15.5 | 0 | 0 |
| M2942 | 1.4 | 3.4 | 0 | 61.7 | 0.5 | 16 | 0 | 1.5 | 0.5 | 0 | 0 | 15 | 0 | 0 |
| M2943 | 1.2 | 3 | 0 | 66.3 | 1 | 14 | 0 | 1 | 0.5 | 0 | 0 | 13 | 0 | 0 |
| M2944 | 0.7 | 2.5 | 0 | 73.8 | 1 | 10.5 | 0 | 2 | 0.5 | 0 | 0 | 9 | 0 | 0 |
| M2945 | 0.7 | 2.9 | 0 | 71.9 | 1 | 17 | 0 | 1.5 | 0.5 | 0 | 0 | 4.5 | 0 | 0 |
| M2946 | 2 | 1.1 | 0 | 71.4 | 1 | 20 | 0 | 1 | 0.5 | 0 | 0 | 3 | 0 | 0 |
| M2947 | 1 | 2.6 | 0 | 70.9 | 1 | 17 | 0 | 1.5 | 0.5 | 0 | 0 | 5.5 | 0 | 0 |
| M2948 | 0.8 | 2.7 | 0 | 71.5 | 1 | 16 | 0 | 2 | 0.5 | 0 | 0 | 5.5 | 0 | 0 |
| M2949 | 1 | 1 | 0 | 68 | 1 | 10.5 | 0 | 2 | 0.5 | 0 | 0 | 16 | 0 | 0 |
| M2950 | 1 | 1.5 | 0 | 76.5 | 1 | 10.5 | 0 | 1 | 0.5 | 0 | 0 | 8 | 0 | 0 |
| M2951 | 0.7 | 3 | 0 | 70.3 | 1 | 10.5 | 0 | 2 | 0.5 | 0 | 0 | 12 | 0 | 0 |

TABLE 11-continued

Compositions and thermodynamic criteria for vanadium carbides

| | | | | | | | | | | | | | | |
|---|---|---|---|---|---|---|---|---|---|---|---|---|---|---|
| M2952 | 0.8 | 1.6 | 0 | 75.6 | 1 | 9 | 0 | 1 | 0.5 | 0 | 0 | 10.5 | 0 | 0 |
| M2953 | 0.7 | 2.4 | 0 | 72.4 | 1 | 8 | 0 | 2 | 0.5 | 0 | 0 | 13 | 0 | 0 |
| M2954 | 1.2 | 1 | 0 | 66.8 | 1 | 12.5 | 0 | 1 | 0.5 | 0 | 0 | 16 | 0 | 0 |
| M2955 | 0.7 | 2.4 | 0 | 73.9 | 1 | 9.5 | 0 | 2 | 0.5 | 0 | 0 | 10 | 0 | 0 |
| M2956 | 0.6 | 3 | 0 | 71.9 | 1 | 10.5 | 0 | 1.5 | 0.5 | 0 | 0 | 11 | 0 | 0 |
| M2957 | 1.3 | 3 | 0 | 64.2 | 1 | 13.5 | 0 | 1 | 0.5 | 0 | 0 | 15.5 | 0 | 0 |
| M2958 | 2.2 | 1.6 | 0 | 68.2 | 0 | 18 | 0 | 0 | 0 | 0 | 10 | 0 | 0 | 0 |
| M2959 | 1.1 | 2.9 | 0 | 67 | 1 | 14 | 0 | 2 | 0.5 | 0 | 0 | 11.5 | 0 | 0 |
| M2960 | 1.4 | 2.2 | 0 | 68.4 | 1 | 20 | 0 | 2 | 0.5 | 0 | 0 | 4.5 | 0 | 0 |
| M2961 | 2 | 1 | 0 | 61.5 | 1 | 19 | 0 | 1 | 0.5 | 0 | 0 | 14 | 0 | 0 |
| M2962 | 0.6 | 2.5 | 0 | 72.9 | 1 | 7.5 | 0 | 1 | 0.5 | 0 | 0 | 14 | 0 | 0 |
| M2963 | 0.7 | 2.6 | 0 | 71.7 | 1 | 16.5 | 0 | 1.5 | 0.5 | 0 | 0 | 5.5 | 0 | 0 |
| M2964 | 1.5 | 2.5 | 0 | 65.5 | 1 | 17 | 0 | 2 | 0.5 | 0 | 0 | 10 | 0 | 0 |
| M2965 | 0.8 | 2.1 | 0 | 75.6 | 1 | 15 | 0 | 1 | 0.5 | 0 | 0 | 4 | 0 | 0 |
| M2966 | 0.8 | 2.6 | 0 | 69.6 | 1 | 18.5 | 0 | 2 | 0.5 | 0 | 0 | 5 | 0 | 0 |
| M2967 | 1.4 | 3.2 | 0 | 57.9 | 0.5 | 14 | 0 | 1.5 | 0.5 | 0 | 0 | 21 | 0 | 0 |
| M2968 | 1.9 | 1.6 | 0 | 67 | 1 | 18.5 | 0 | 1.5 | 0.5 | 0 | 0 | 8 | 0 | 0 |
| M2969 | 0.8 | 2.1 | 0 | 70.6 | 1 | 19 | 0 | 2 | 0.5 | 0 | 0 | 4 | 0 | 0 |
| M2970 | 1.7 | 1.4 | 0 | 66.9 | 1 | 16.5 | 0 | 1 | 0.5 | 0 | 0 | 11 | 0 | 0 |
| M2971 | 0.7 | 2.3 | 0 | 71.5 | 1 | 18 | 0 | 1.5 | 0.5 | 0 | 0 | 4.5 | 0 | 0 |
| M2972 | 0.6 | 2.5 | 0 | 73.9 | 1 | 15 | 0 | 1 | 0.5 | 0 | 0 | 5.5 | 0 | 0 |
| M2973 | 0.6 | 2.5 | 0 | 71.9 | 1 | 17 | 0 | 1.5 | 0.5 | 0 | 0 | 5 | 0 | 0 |
| M2974 | 0.9 | 2 | 0 | 75.6 | 1 | 15 | 0 | 1 | 0.5 | 0 | 0 | 4 | 0 | 0 |
| M2975 | 1 | 2.5 | 0 | 69 | 1 | 19 | 0 | 2 | 0.5 | 0 | 0 | 5 | 0 | 0 |
| M2976 | 1 | 2.5 | 0 | 68.5 | 1 | 20 | 0 | 1.5 | 0.5 | 0 | 0 | 5 | 0 | 0 |
| M2977 | 1.7 | 2.7 | 0 | 61.1 | 2 | 18 | 0 | 2 | 0.5 | 0 | 0 | 12 | 0 | 0 |
| M2978 | 0.9 | 3 | 0 | 67.6 | 1 | 18.5 | 0 | 2 | 0.5 | 0 | 0 | 6.5 | 0 | 0 |
| M2979 | 1.2 | 3 | 0 | 65.3 | 1 | 19.5 | 0 | 1.5 | 0.5 | 0 | 0 | 8 | 0 | 0 |
| M2980 | 1.2 | 2.5 | 0 | 67.8 | 1 | 19 | 0 | 2 | 0.5 | 0 | 0 | 6 | 0 | 0 |
| M2981 | 1 | 2.4 | 0 | 70.6 | 1 | 18.5 | 0 | 1.5 | 0.5 | 0 | 0 | 4.5 | 0 | 0 |
| M2982 | 0.7 | 3 | 0 | 70.3 | 1 | 11.5 | 0 | 2 | 0.5 | 0 | 0 | 11 | 0 | 0 |
| M2983 | 0.6 | 2.3 | 0 | 75.6 | 1 | 13.5 | 0 | 2 | 0.5 | 0 | 0 | 4.5 | 0 | 0 |
| M2984 | 0.8 | 2.6 | 0 | 72.1 | 1 | 16.5 | 0 | 1 | 0.5 | 0 | 0 | 5.5 | 0 | 0 |
| M2985 | 0.8 | 2.6 | 0 | 71.1 | 1 | 17 | 0 | 1.5 | 0.5 | 0 | 0 | 5.5 | 0 | 0 |
| M2986 | 1.6 | 1 | 0 | 63.4 | 1 | 16 | 0 | 1.5 | 0.5 | 0 | 0 | 15 | 0 | 0 |
| M2987 | 1 | 2.9 | 0 | 68.1 | 1 | 19.5 | 0 | 1 | 0.5 | 0 | 0 | 6 | 0 | 0 |
| M2988 | 0.8 | 2.3 | 0 | 70.9 | 1 | 18.5 | 0 | 1 | 0.5 | 0 | 0 | 5 | 0 | 0 |
| M2989 | 1.4 | 1.4 | 0 | 73.2 | 0 | 12 | 4 | 1 | 0 | 0 | 7 | 0 | 0 | 0 |
| M2990 | 0.7 | 3 | 0 | 68.3 | 1 | 19.5 | 0 | 1 | 0.5 | 0 | 0 | 6 | 0 | 0 |
| M2991 | 2.4 | 1.6 | 0 | 68 | 0 | 16 | 0 | 0 | 0 | 0 | 12 | 0 | 0 | 0 |
| M2992 | 1 | 2 | 0 | 73.5 | 1 | 16 | 0 | 1.5 | 0.5 | 0 | 0 | 4.5 | 0 | 0 |
| M2993 | 1 | 2 | 0 | 73 | 1 | 17.5 | 0 | 1 | 0.5 | 0 | 0 | 4 | 0 | 0 |
| M2994 | 1.2 | 3 | 0 | 65.8 | 1 | 18.5 | 0 | 1.5 | 0.5 | 0 | 0 | 8.5 | 0 | 0 |
| M2995 | 0.9 | 3 | 0 | 68.6 | 1 | 18.5 | 0 | 1 | 0.5 | 0 | 0 | 6.5 | 0 | 0 |
| M2996 | 1.5 | 1.1 | 0 | 62.9 | 1 | 15.5 | 0 | 2 | 0.5 | 0 | 0 | 15.5 | 0 | 0 |
| M2997 | 1 | 2.7 | 0 | 68.3 | 1 | 19.5 | 0 | 1 | 0.5 | 0 | 0 | 6 | 0 | 0 |
| M2998 | 1 | 2.3 | 0 | 69.2 | 1 | 18.5 | 0 | 2 | 0.5 | 0 | 0 | 5.5 | 0 | 0 |
| M2999 | 2 | 1.2 | 0 | 57.8 | 1 | 20 | 0 | 2 | 0.5 | 0 | 0 | 15.5 | 0 | 0 |
| M3000 | 0.6 | 3 | 0 | 71.9 | 1 | 9.5 | 0 | 1 | 0.5 | 0 | 0 | 12.5 | 0 | 0 |
| M3001 | 0.6 | 2.5 | 0 | 70.9 | 1 | 7.5 | 0 | 1 | 0.5 | 0 | 0 | 16 | 0 | 0 |
| M3002 | 0.9 | 2.5 | 0 | 67.1 | 1 | 10 | 0 | 2 | 0.5 | 0 | 0 | 16 | 0 | 0 |
| M3003 | 1.5 | 2.5 | 0 | 65.5 | 1 | 18 | 0 | 2 | 0.5 | 0 | 0 | 9 | 0 | 0 |
| M3004 | 1.4 | 3.2 | 0 | 56.9 | 0.5 | 14 | 0 | 1.5 | 0.5 | 0 | 0 | 22 | 0 | 0 |
| M3005 | 2.4 | 1.6 | 0 | 66 | 0 | 20 | 0 | 0 | 0 | 0 | 10 | 0 | 0 | 0 |
| M3006 | 1.4 | 1.6 | 0 | 68 | 0 | 12 | 0 | 1 | 0 | 0 | 8 | 8 | 0 | 0 |
| M3007 | 1.7 | 2.6 | 0 | 63.2 | 1 | 17.5 | 0 | 1 | 0.5 | 0 | 0 | 12.5 | 0 | 0 |
| M3008 | 0.6 | 2.1 | 0 | 71.8 | 1 | 19 | 0 | 1 | 0.5 | 0 | 0 | 4 | 0 | 0 |
| M3009 | 1 | 2.3 | 0 | 69.2 | 1 | 19 | 0 | 1.5 | 0.5 | 0 | 0 | 5.5 | 0 | 0 |
| M3010 | 1.6 | 1 | 0 | 64.4 | 1 | 16 | 0 | 1 | 0.5 | 0 | 0 | 14.5 | 0 | 0 |
| M3011 | 1.4 | 2 | 0 | 65.6 | 0 | 12 | 8 | 1 | 0 | 0 | 8 | 2 | 0 | 0 |
| M3012 | 0.7 | 2.9 | 0 | 70.4 | 1 | 15 | 0 | 1 | 0.5 | 0 | 0 | 8.5 | 0 | 0 |
| M3013 | 1 | 2.6 | 0 | 68.4 | 1 | 11 | 0 | 1.5 | 0.5 | 0 | 0 | 14 | 0 | 0 |
| M3014 | 1.7 | 1.7 | 0 | 69.1 | 1 | 17.5 | 0 | 1 | 0.5 | 0 | 0 | 7.5 | 0 | 0 |
| M3015 | 1 | 2.5 | 0 | 71.5 | 1 | 14 | 0 | 1 | 0.5 | 0 | 0 | 8.5 | 0 | 0 |
| M3016 | 0.7 | 2.4 | 0 | 72.4 | 1 | 15 | 0 | 1.5 | 0.5 | 0 | 0 | 6.5 | 0 | 0 |
| M3017 | 1 | 1.9 | 0 | 67.6 | 1 | 10.5 | 0 | 1.5 | 0.5 | 0 | 0 | 16 | 0 | 0 |
| M3018 | 0.6 | 2.5 | 0 | 70.9 | 1 | 16 | 0 | 2 | 0.5 | 0 | 0 | 6.5 | 0 | 0 |
| M3019 | 1.8 | 2.2 | 0 | 58 | 0 | 15 | 12 | 0 | 0 | 0 | 9.5 | 1.5 | 0 | 0 |
| M3020 | 1.5 | 1.2 | 0 | 62.8 | 1 | 15.5 | 0 | 2 | 0.5 | 0 | 0 | 15.5 | 0 | 0 |
| M3021 | 1.8 | 1.2 | 0 | 60.5 | 1 | 18.5 | 0 | 1 | 0.5 | 0 | 0 | 15.5 | 0 | 0 |
| M3022 | 0.7 | 2 | 0 | 69.8 | 1 | 20 | 0 | 2 | 0.5 | 0 | 0 | 4 | 0 | 0 |
| M3023 | 1 | 2.3 | 0 | 71.2 | 1 | 17 | 0 | 1 | 0.5 | 0 | 0 | 6 | 0 | 0 |
| M3024 | 1.3 | 2.9 | 0 | 63.8 | 1 | 14 | 0 | 2 | 0.5 | 0 | 0 | 14.5 | 0 | 0 |
| M3025 | 1 | 2 | 0 | 69.5 | 1 | 20 | 0 | 1.5 | 0.5 | 0 | 0 | 4.5 | 0 | 0 |
| M3026 | 1 | 1.8 | 0 | 72.2 | 1 | 18 | 0 | 1.5 | 0.5 | 0 | 0 | 4 | 0 | 0 |
| M3027 | 1 | 1.7 | 0 | 72.3 | 1 | 17.5 | 0 | 2 | 0.5 | 0 | 0 | 4 | 0 | 0 |
| M3028 | 0.7 | 1.1 | 0 | 70.2 | 1 | 9 | 0 | 1.5 | 0.5 | 0 | 0 | 16 | 0 | 0 |
| M3029 | 1.1 | 3 | 0 | 66.4 | 1 | 15.5 | 0 | 1.5 | 0.5 | 0 | 0 | 11 | 0 | 0 |

TABLE 11-continued

Compositions and thermodynamic criteria for vanadium carbides

| | | | | | | | | | | | | | | |
|---|---|---|---|---|---|---|---|---|---|---|---|---|---|---|
| M3030 | 1.6 | 0.5 | 0 | 74.4 | 1 | 16 | 0 | 1 | 0.5 | 0 | 0 | 5 | 0 | 0 |
| M3031 | 1.7 | 1.3 | 0 | 60.5 | 1 | 18 | 0 | 1 | 0.5 | 0 | 0 | 16 | 0 | 0 |
| M3032 | 1.4 | 4 | 0 | 57.1 | 0.5 | 16 | 0 | 1.5 | 0.5 | 0 | 0 | 19 | 0 | 0 |
| M3033 | 1.6 | 1.6 | 0 | 68.8 | 1 | 16 | 0 | 1.5 | 0.5 | 0 | 0 | 9 | 0 | 0 |
| M3034 | 1.6 | 2.5 | 0 | 64.9 | 1 | 20 | 0 | 1.5 | 0.5 | 0 | 0 | 8 | 0 | 0 |
| M3035 | 1.6 | 2.4 | 0 | 54 | 0 | 20 | 2 | 0 | 0 | 0 | 0 | 20 | 0 | 0 |
| M3036 | 1.4 | 1.3 | 0 | 63.3 | 1 | 15 | 0 | 1.5 | 0.5 | 0 | 0 | 16 | 0 | 0 |
| M3037 | 2.4 | 2 | 0 | 63.6 | 0 | 20 | 0 | 0 | 0 | 0 | 12 | 0 | 0 | 0 |
| M3038 | 1.3 | 1.6 | 0 | 72.6 | 1 | 13.5 | 0 | 1 | 0.5 | 0 | 0 | 8.5 | 0 | 0 |
| M3039 | 2.4 | 2.2 | 0 | 63.4 | 0 | 18 | 0 | 0 | 0 | 0 | 14 | 0 | 0 | 0 |
| M3040 | 1 | 1.7 | 0 | 73.8 | 1 | 17 | 0 | 1 | 0.5 | 0 | 0 | 4 | 0 | 0 |
| M3041 | 0.8 | 2.7 | 0 | 66 | 1 | 19.5 | 0 | 2 | 0.5 | 0 | 0 | 7.5 | 0 | 0 |
| M3042 | 1.2 | 1.9 | 0 | 70.9 | 1 | 17.5 | 0 | 2 | 0.5 | 0 | 0 | 5 | 0 | 0 |
| M3043 | 1.9 | 1.1 | 0 | 61 | 1 | 19 | 0 | 1 | 0.5 | 0 | 0 | 14.5 | 0 | 0 |
| M3044 | 1 | 1 | 0 | 69 | 1 | 11 | 0 | 1.5 | 0.5 | 0 | 0 | 15 | 0 | 0 |
| M3045 | 1 | 1.4 | 0 | 70.6 | 1 | 10.5 | 0 | 1 | 0.5 | 0 | 0 | 14 | 0 | 0 |
| M3046 | 0.7 | 2.5 | 0 | 69.8 | 1 | 8.5 | 0 | 1 | 0.5 | 0 | 0 | 16 | 0 | 0 |
| M3047 | 1.8 | 0.5 | 0 | 75.7 | 0 | 18 | 0 | 0 | 0 | 0 | 0 | 4 | 0 | 0 |
| M3048 | 1.2 | 1.8 | 0 | 71 | 0 | 22 | 0 | 0 | 0 | 0 | 0 | 4 | 0 | 0 |
| M3049 | 1.1 | 2.8 | 0 | 64.6 | 1 | 12 | 0 | 2 | 0.5 | 0 | 0 | 16 | 0 | 0 |
| M3050 | 1 | 2.3 | 0 | 66.7 | 1 | 11 | 0 | 2 | 0.5 | 0 | 0 | 15.5 | 0 | 0 |
| M3051 | 0.9 | 3 | 0 | 66.6 | 1 | 10.5 | 0 | 2 | 0.5 | 0 | 0 | 15.5 | 0 | 0 |
| M3052 | 0.9 | 3 | 0 | 68.1 | 1 | 11 | 0 | 1 | 0.5 | 0 | 0 | 14.5 | 0 | 0 |
| M3053 | 1.9 | 1.4 | 0 | 58.2 | 1 | 20 | 0 | 1 | 0.5 | 0 | 0 | 16 | 0 | 0 |
| M3054 | 2 | 0.9 | 0 | 71.6 | 1 | 20 | 0 | 1 | 0.5 | 0 | 0 | 3 | 0 | 0 |
| M3055 | 0.7 | 2 | 0 | 71.8 | 1 | 17 | 0 | 2 | 0.5 | 0 | 0 | 5 | 0 | 0 |
| M3056 | 1.3 | 1.6 | 0 | 69.1 | 1 | 13.5 | 0 | 1.5 | 0.5 | 0 | 0 | 11.5 | 0 | 0 |
| M3057 | 0.8 | 2.5 | 0 | 66.7 | 1 | 19.5 | 0 | 2 | 0.5 | 0 | 0 | 7 | 0 | 0 |
| M3058 | 1.2 | 1.9 | 0 | 71.9 | 1 | 16 | 0 | 2 | 0.5 | 0 | 0 | 5.5 | 0 | 0 |
| M3059 | 0.8 | 2 | 0 | 70.2 | 1 | 18.5 | 0 | 2 | 0.5 | 0 | 0 | 5 | 0 | 0 |
| M3060 | 1.2 | 1.9 | 0 | 71.9 | 1 | 16.5 | 0 | 1.5 | 0.5 | 0 | 0 | 5.5 | 0 | 0 |
| M3061 | 1.9 | 1.1 | 0 | 65.5 | 1 | 18.5 | 0 | 2 | 0.5 | 0 | 0 | 9.5 | 0 | 0 |
| M3062 | 1.7 | 2.6 | 0 | 61.7 | 1 | 17.5 | 0 | 2 | 0.5 | 0 | 0 | 13 | 0 | 0 |
| M3063 | 1 | 1.4 | 0 | 77.1 | 1 | 12 | 0 | 2 | 0.5 | 0 | 0 | 5 | 0 | 0 |
| M3064 | 0.4 | 3.2 | 0 | 67.9 | 1 | 6 | 0 | 1 | 0.5 | 0 | 0 | 20 | 0 | 0 |
| M3065 | 1 | 2.6 | 0 | 66.4 | 1 | 20 | 0 | 1 | 0.5 | 0 | 0 | 7.5 | 0 | 0 |
| M3066 | 1.9 | 1.5 | 0 | 57.6 | 1 | 20 | 0 | 1.5 | 0.5 | 0 | 0 | 16 | 0 | 0 |
| M3067 | 2 | 1 | 0 | 62 | 1 | 19.5 | 0 | 1 | 0.5 | 0 | 0 | 13 | 0 | 0 |
| M3068 | 0.7 | 2 | 0 | 75.3 | 1 | 12.5 | 0 | 2 | 0.5 | 0 | 0 | 6 | 0 | 0 |
| M3069 | 1.9 | 1.1 | 0 | 60.5 | 1 | 19.5 | 0 | 1.5 | 0.5 | 0 | 0 | 14 | 0 | 0 |
| M3070 | 1.6 | 0.6 | 0 | 75.3 | 1 | 16 | 0 | 1 | 0.5 | 0 | 0 | 4 | 0 | 0 |
| M3071 | 1.4 | 3.4 | 0 | 60.7 | 0.5 | 16 | 0 | 1.5 | 0.5 | 0 | 0 | 16 | 0 | 0 |
| M3072 | 1.8 | 1 | 0 | 71.2 | 0 | 18 | 0 | 0 | 0 | 0 | 0 | 8 | 0 | 0 |
| M3073 | 0.6 | 2.3 | 0 | 68.1 | 1 | 19.5 | 0 | 2 | 0.5 | 0 | 0 | 6 | 0 | 0 |
| M3074 | 1 | 2.6 | 0 | 67.9 | 1 | 11.5 | 0 | 1 | 0.5 | 0 | 0 | 14.5 | 0 | 0 |
| M3075 | 1.4 | 1.4 | 0 | 68.2 | 0 | 12 | 1 | 1 | 0 | 0 | 7 | 8 | 0 | 0 |
| M3076 | 1.9 | 1.1 | 0 | 71.5 | 1 | 20 | 0 | 1 | 0.5 | 0 | 0 | 3 | 0 | 0 |
| M3077 | 1 | 2.3 | 0 | 72.2 | 1 | 14.5 | 0 | 1 | 0.5 | 0 | 0 | 7.5 | 0 | 0 |
| M3078 | 1.7 | 1 | 0 | 63.3 | 1 | 17.5 | 0 | 1.5 | 0.5 | 0 | 0 | 13.5 | 0 | 0 |
| M3079 | 0.6 | 2.8 | 0 | 72.6 | 1 | 9.5 | 0 | 1 | 0.5 | 0 | 0 | 12 | 0 | 0 |
| M3080 | 1.7 | 1.9 | 0 | 63.9 | 1 | 17 | 0 | 2 | 0.5 | 0 | 0 | 12 | 0 | 0 |
| M3081 | 1 | 2.6 | 0 | 68.4 | 1 | 16 | 0 | 2 | 0.5 | 0 | 0 | 8.5 | 0 | 0 |
| M3082 | 1.4 | 1 | 0 | 66.1 | 1 | 15 | 0 | 1 | 0.5 | 0 | 0 | 14 | 0 | 0 |
| M3083 | 0.7 | 3 | 0 | 70.3 | 1 | 10.5 | 0 | 1 | 0.5 | 0 | 0 | 13 | 0 | 0 |
| M3084 | 1.1 | 2.7 | 0 | 68.2 | 1 | 16 | 0 | 1.5 | 0.5 | 0 | 0 | 9 | 0 | 0 |
| M3085 | 2 | 2.3 | 0 | 60.7 | 1 | 20 | 0 | 1 | 0.5 | 0 | 0 | 12.5 | 0 | 0 |
| M3086 | 1.6 | 1.5 | 0 | 59.9 | 1 | 17.5 | 0 | 2 | 0.5 | 0 | 0 | 16 | 0 | 0 |
| M3087 | 1.2 | 1.4 | 0 | 67.4 | 0 | 14 | 0 | 0 | 0 | 0 | 0 | 16 | 0 | 0 |
| M3088 | 1.8 | 1.4 | 0 | 70.8 | 0 | 22 | 0 | 0 | 0 | 0 | 0 | 4 | 0 | 0 |
| M3089 | 1.2 | 2.5 | 0 | 64.8 | 1 | 13 | 0 | 2 | 0.5 | 0 | 0 | 15 | 0 | 0 |
| M3090 | 1 | 1.2 | 0 | 67.8 | 0 | 6 | 0 | 2 | 0.5 | 0 | 4 | 18 | 0 | 0 |
| M3091 | 1 | 2.6 | 0 | 66.9 | 1 | 11.5 | 0 | 1 | 0.5 | 0 | 0 | 15.5 | 0 | 0 |
| M3092 | 1.9 | 1.6 | 0 | 67.5 | 1 | 19.5 | 0 | 1 | 0.5 | 0 | 0 | 7 | 0 | 0 |
| M3093 | 1 | 1.3 | 0 | 74.7 | 0 | 11 | 0 | 0 | 0 | 0 | 0 | 12 | 0 | 0 |
| M3094 | 1.2 | 1.5 | 0 | 72.8 | 1 | 18 | 0 | 1 | 0.5 | 0 | 0 | 4 | 0 | 0 |
| M3095 | 1.2 | 1.5 | 0 | 71.8 | 1 | 19 | 0 | 1 | 0.5 | 0 | 0 | 4 | 0 | 0 |
| M3096 | 1.6 | 2 | 0 | 58.4 | 0 | 20 | 2 | 0 | 0 | 0 | 0 | 16 | 0 | 0 |
| M3097 | 1.9 | 1.7 | 0 | 65.9 | 1 | 20 | 0 | 2 | 0.5 | 0 | 0 | 7 | 0 | 0 |
| M3098 | 0.7 | 2 | 0 | 71.8 | 1 | 17.5 | 0 | 1 | 0.5 | 0 | 0 | 5.5 | 0 | 0 |
| M3099 | 1 | 1.7 | 0 | 69.8 | 1 | 11 | 0 | 1.5 | 0.5 | 0 | 0 | 13.5 | 0 | 0 |
| M3100 | 0.6 | 1.6 | 0 | 81.8 | 0 | 8 | 0 | 0 | 0 | 0 | 0 | 8 | 0 | 0 |
| M3101 | 1 | 1.9 | 0 | 74.1 | 1 | 13 | 0 | 1.5 | 0.5 | 0 | 0 | 7 | 0 | 0 |
| M3102 | 0.6 | 3 | 0 | 64.9 | 1 | 18.5 | 0 | 2 | 0.5 | 0 | 0 | 9.5 | 0 | 0 |
| M3103 | 1.3 | 2.6 | 0 | 63.6 | 1 | 14 | 0 | 1.5 | 0.5 | 0 | 0 | 15.5 | 0 | 0 |
| M3104 | 1.3 | 2.1 | 0 | 68.6 | 1 | 17.5 | 0 | 2 | 0.5 | 0 | 0 | 7 | 0 | 0 |
| M3105 | 1.7 | 1.5 | 0 | 68.8 | 1 | 20 | 0 | 2 | 0.5 | 0 | 0 | 4.5 | 0 | 0 |
| M3106 | 1.7 | 2.6 | 0 | 61.7 | 1 | 17.5 | 0 | 1 | 0.5 | 0 | 0 | 14 | 0 | 0 |
| M3107 | 1.7 | 1.6 | 0 | 59.7 | 1 | 17.5 | 0 | 2 | 0.5 | 0 | 0 | 16 | 0 | 0 |

TABLE 11-continued

Compositions and thermodynamic criteria for vanadium carbides

| | | | | | | | | | | | | | | |
|---|---|---|---|---|---|---|---|---|---|---|---|---|---|---|
| M3108 | 1.5 | 2.6 | 0 | 64.9 | 1 | 19.5 | 0 | 1 | 0.5 | 0 | 0 | 9 | 0 | 0 |
| M3109 | 1 | 1.9 | 0 | 71.6 | 1 | 17 | 0 | 1.5 | 0.5 | 0 | 0 | 5.5 | 0 | 0 |
| M3110 | 0.6 | 2 | 0 | 68.9 | 1 | 19.5 | 0 | 2 | 0.5 | 0 | 0 | 5.5 | 0 | 0 |
| M3111 | 1.3 | 1 | 0 | 67.2 | 1 | 14 | 0 | 2 | 0.5 | 0 | 0 | 13 | 0 | 0 |
| M3112 | 1.3 | 1 | 0 | 66.2 | 1 | 14.5 | 0 | 2 | 0.5 | 0 | 0 | 13.5 | 0 | 0 |
| M3113 | 0.7 | 1.6 | 0 | 76.2 | 1 | 13 | 0 | 2 | 0.5 | 0 | 0 | 5 | 0 | 0 |
| M3114 | 1.3 | 1.1 | 0 | 75.1 | 1 | 14 | 0 | 2 | 0.5 | 0 | 0 | 5 | 0 | 0 |
| M3115 | 1.2 | 1.5 | 0 | 64.8 | 1 | 13.5 | 0 | 1.5 | 0.5 | 0 | 0 | 16 | 0 | 0 |
| M3116 | 0.6 | 1.9 | 0 | 71.5 | 1 | 7.5 | 0 | 1 | 0.5 | 0 | 0 | 16 | 0 | 0 |
| M3117 | 1.2 | 2.5 | 0 | 67.8 | 1 | 14.5 | 0 | 1.5 | 0.5 | 0 | 0 | 11 | 0 | 0 |
| M3118 | 2 | 1.1 | 0 | 60.9 | 1 | 20 | 0 | 1.5 | 0.5 | 0 | 0 | 13 | 0 | 0 |
| M3119 | 1.6 | 2.1 | 0 | 66.3 | 1 | 17 | 0 | 1.5 | 0.5 | 0 | 0 | 10 | 0 | 0 |
| M3120 | 1.7 | 2.2 | 0 | 65.6 | 1 | 19 | 0 | 1 | 0.5 | 0 | 0 | 9 | 0 | 0 |
| M3121 | 0.8 | 1.6 | 0 | 75.6 | 1 | 15 | 0 | 1 | 0.5 | 0 | 0 | 4.5 | 0 | 0 |
| M3122 | 1.9 | 1.4 | 0 | 59.2 | 1 | 20 | 0 | 1 | 0.5 | 0 | 0 | 15 | 0 | 0 |
| M3123 | 1 | 2.3 | 0 | 70.7 | 1 | 13.5 | 0 | 2 | 0.5 | 0 | 0 | 9 | 0 | 0 |
| M3124 | 0.6 | 2.5 | 0 | 69.9 | 1 | 16.5 | 0 | 1 | 0.5 | 0 | 0 | 8 | 0 | 0 |
| M3125 | 1 | 2.2 | 0 | 69.8 | 1 | 16 | 0 | 2 | 0.5 | 0 | 0 | 7.5 | 0 | 0 |
| M3126 | 1.9 | 2.2 | 0 | 62.9 | 1 | 20 | 0 | 1.5 | 0.5 | 0 | 0 | 10 | 0 | 0 |
| M3127 | 0.9 | 3 | 0 | 66.1 | 1 | 16.5 | 0 | 1.5 | 0.5 | 0 | 0 | 10.5 | 0 | 0 |
| M3128 | 1.4 | 1.6 | 0 | 69 | 0 | 12 | 2 | 0 | 0 | 0 | 8 | 6 | 0 | 0 |
| M3129 | 1 | 1 | 0 | 69.5 | 1 | 11.5 | 0 | 2 | 0.5 | 0 | 0 | 13.5 | 0 | 0 |
| M3130 | 0.6 | 1 | 0 | 72.4 | 1 | 8.5 | 0 | 2 | 0.5 | 0 | 0 | 14 | 0 | 0 |
| M3131 | 1.2 | 2.8 | 0 | 64 | 1 | 13.5 | 0 | 1 | 0.5 | 0 | 0 | 16 | 0 | 0 |
| M3132 | 1.2 | 1 | 0 | 68.3 | 1 | 13 | 0 | 1.5 | 0.5 | 0 | 0 | 13.5 | 0 | 0 |
| M3133 | 1 | 1 | 0 | 72 | 0 | 6 | 0 | 2 | 0 | 0 | 6 | 12 | 0 | 0 |
| M3134 | 1 | 1 | 0 | 72 | 1 | 12 | 0 | 0 | 0 | 0 | 0 | 14 | 0 | 0 |
| M3135 | 1.3 | 1 | 0 | 69.7 | 1 | 13.5 | 0 | 2 | 0.5 | 0 | 0 | 11 | 0 | 0 |
| M3136 | 0.7 | 1.9 | 0 | 75.9 | 1 | 12 | 0 | 1.5 | 0.5 | 0 | 0 | 6.5 | 0 | 0 |
| M3137 | 1.1 | 3 | 0 | 63.9 | 1 | 18 | 0 | 1.5 | 0.5 | 0 | 0 | 11 | 0 | 0 |
| M3138 | 1.5 | 0.7 | 0 | 71.5 | 0 | 18 | 0 | 0 | 0 | 0 | 0 | 8 | 0 | 0 |
| M3139 | 1.3 | 1.1 | 0 | 67.1 | 1 | 14 | 0 | 2 | 0.5 | 0 | 0 | 13 | 0 | 0 |
| M3140 | 1.3 | 1.1 | 0 | 66.1 | 1 | 14.5 | 0 | 2 | 0.5 | 0 | 0 | 13.5 | 0 | 0 |
| M3141 | 0.8 | 2.6 | 0 | 66.1 | 1 | 18 | 0 | 2 | 0.5 | 0 | 0 | 9 | 0 | 0 |
| M3142 | 1.7 | 2.2 | 0 | 63.6 | 1 | 17.5 | 0 | 2 | 0.5 | 0 | 0 | 11.5 | 0 | 0 |
| M3143 | 1.5 | 1.5 | 0 | 69.5 | 1 | 19 | 0 | 2 | 0.5 | 0 | 0 | 5 | 0 | 0 |
| M3144 | 2 | 2.8 | 0 | 55.7 | 1 | 20 | 0 | 2 | 0.5 | 0 | 0 | 16 | 0 | 0 |
| M3145 | 1.2 | 1.5 | 0 | 71.3 | 1 | 19 | 0 | 1 | 0.5 | 0 | 0 | 4.5 | 0 | 0 |
| M3146 | 0.7 | 1.9 | 0 | 69.4 | 1 | 19.5 | 0 | 1.5 | 0.5 | 0 | 0 | 5.5 | 0 | 0 |
| M3147 | 1.3 | 2.8 | 0 | 62.9 | 1 | 14.5 | 0 | 1 | 0.5 | 0 | 0 | 16 | 0 | 0 |
| M3148 | 1.2 | 1.1 | 0 | 68.2 | 1 | 13.5 | 0 | 1 | 0.5 | 0 | 0 | 13.5 | 0 | 0 |
| M3149 | 1.3 | 2.7 | 0 | 65.5 | 1 | 14.5 | 0 | 1 | 0.5 | 0 | 0 | 13.5 | 0 | 0 |
| M3150 | 1.3 | 2.7 | 0 | 64 | 1 | 14.5 | 0 | 1 | 0.5 | 0 | 0 | 15 | 0 | 0 |
| M3151 | 0.6 | 1.6 | 0 | 73.8 | 1 | 16.5 | 0 | 1.5 | 0.5 | 0 | 0 | 4.5 | 0 | 0 |
| M3152 | 0.8 | 1.3 | 0 | 78.4 | 1 | 13 | 0 | 1 | 0.5 | 0 | 0 | 4 | 0 | 0 |
| M3153 | 1.2 | 1.4 | 0 | 72.4 | 1 | 17 | 0 | 2 | 0.5 | 0 | 0 | 4.5 | 0 | 0 |
| M3154 | 1.7 | 2 | 0 | 66.3 | 1 | 19 | 0 | 1.5 | 0.5 | 0 | 0 | 8 | 0 | 0 |
| M3155 | 1.8 | 1.6 | 0 | 77.6 | 0 | 4 | 0 | 0 | 0 | 0 | 0 | 9 | 6 | 0 |
| M3156 | 1 | 2.1 | 0 | 69.9 | 1 | 16.5 | 0 | 1.5 | 0.5 | 0 | 0 | 7.5 | 0 | 0 |
| M3157 | 1 | 1.6 | 0 | 72.9 | 1 | 16 | 0 | 1.5 | 0.5 | 0 | 0 | 5.5 | 0 | 0 |
| M3158 | 1.9 | 1 | 0 | 62.1 | 1 | 20 | 0 | 1.5 | 0.5 | 0 | 0 | 12 | 0 | 0 |
| M3159 | 2 | 2 | 0 | 58 | 1 | 19.5 | 0 | 1 | 0.5 | 0 | 0 | 16 | 0 | 0 |
| M3160 | 1.6 | 1.2 | 0 | 70.2 | 1 | 19.5 | 0 | 2 | 0.5 | 0 | 0 | 4 | 0 | 0 |
| M3161 | 1 | 1.3 | 0 | 74.2 | 1 | 17 | 0 | 1 | 0.5 | 0 | 0 | 4 | 0 | 0 |
| M3162 | 1.6 | 1.2 | 0 | 70.2 | 1 | 20 | 0 | 1.5 | 0.5 | 0 | 0 | 4 | 0 | 0 |
| M3163 | 1.4 | 3.8 | 0 | 57.3 | 0.5 | 16 | 0 | 1.5 | 0.5 | 0 | 0 | 19 | 0 | 0 |
| M3164 | 0.6 | 2.5 | 0 | 72.9 | 1 | 12 | 0 | 1 | 0.5 | 0 | 0 | 9.5 | 0 | 0 |
| M3165 | 1.4 | 4 | 0 | 56.1 | 0.5 | 16 | 0 | 1.5 | 0.5 | 0 | 0 | 20 | 0 | 0 |
| M3166 | 2 | 1 | 0 | 63 | 0 | 22 | 0 | 0 | 0 | 0 | 0 | 12 | 0 | 0 |
| M3167 | 1.4 | 1.4 | 0 | 71.2 | 0 | 12 | 1 | 0 | 0 | 0 | 8 | 5 | 0 | 0 |
| M3168 | 1.3 | 1 | 0 | 74.7 | 0 | 14 | 0 | 0 | 0 | 0 | 0 | 9 | 0 | 0 |
| M3169 | 0.7 | 1.5 | 0 | 70.8 | 1 | 9 | 0 | 1 | 0.5 | 0 | 0 | 15.5 | 0 | 0 |
| M3170 | 1.6 | 2.3 | 0 | 64.6 | 1 | 19 | 0 | 2 | 0.5 | 0 | 0 | 9 | 0 | 0 |
| M3171 | 1.3 | 3 | 0 | 62.7 | 1 | 14.5 | 0 | 1.5 | 0.5 | 0 | 0 | 15.5 | 0 | 0 |
| M3172 | 1.1 | 2.9 | 0 | 65.5 | 1 | 15 | 0 | 2 | 0.5 | 0 | 0 | 12 | 0 | 0 |
| M3173 | 1.3 | 1.6 | 0 | 62.6 | 1 | 15.5 | 0 | 2 | 0.5 | 0 | 0 | 15.5 | 0 | 0 |
| M3174 | 1.4 | 1 | 0 | 67.6 | 1 | 15 | 0 | 1 | 0.5 | 0 | 0 | 12.5 | 0 | 0 |
| M3175 | 0.9 | 2.8 | 0 | 66.3 | 1 | 11 | 0 | 1.5 | 0.5 | 0 | 0 | 16 | 0 | 0 |
| M3176 | 0.6 | 1 | 0 | 72.9 | 1 | 9 | 0 | 2 | 0.5 | 0 | 0 | 13 | 0 | 0 |
| M3177 | 0.9 | 1 | 0 | 71.1 | 1 | 11.5 | 0 | 1 | 0.5 | 0 | 0 | 13 | 0 | 0 |
| M3178 | 1 | 1 | 0 | 69.5 | 1 | 12.5 | 0 | 1.5 | 0.5 | 0 | 0 | 13 | 0 | 0 |
| M3179 | 1 | 1.6 | 0 | 63.9 | 1 | 14.5 | 0 | 2 | 0.5 | 0 | 0 | 15.5 | 0 | 0 |
| M3180 | 1 | 1.3 | 0 | 74.7 | 1 | 15 | 0 | 2 | 0.5 | 0 | 0 | 4.5 | 0 | 0 |
| M3181 | 1.8 | 1 | 0 | 69.7 | 1 | 18.5 | 0 | 1 | 0.5 | 0 | 0 | 6.5 | 0 | 0 |
| M3182 | 0.7 | 2.3 | 0 | 73.5 | 1 | 11 | 0 | 1.5 | 0.5 | 0 | 0 | 9.5 | 0 | 0 |
| M3183 | 2 | 2 | 0 | 57 | 1 | 20 | 0 | 1.5 | 0.5 | 0 | 0 | 16 | 0 | 0 |
| M3184 | 0.7 | 2.8 | 0 | 67 | 1 | 15 | 0 | 2 | 0.5 | 0 | 0 | 11 | 0 | 0 |
| M3185 | 1.4 | 3.4 | 0 | 59.7 | 0.5 | 16 | 0 | 1.5 | 0.5 | 0 | 0 | 17 | 0 | 0 |

TABLE 11-continued

Compositions and thermodynamic criteria for vanadium carbides

| | | | | | | | | | | | | | | |
|---|---|---|---|---|---|---|---|---|---|---|---|---|---|---|
| M3186 | 1.6 | 1.1 | 0 | 72.8 | 1 | 18 | 0 | 1 | 0.5 | 0 | 0 | 4 | 0 | 0 |
| M3187 | 1.4 | 3.8 | 0 | 56.3 | 0.5 | 16 | 0 | 1.5 | 0.5 | 0 | 0 | 20 | 0 | 0 |
| M3188 | 1.2 | 2.5 | 0 | 67.3 | 1 | 14.5 | 0 | 1.5 | 0.5 | 0 | 0 | 11.5 | 0 | 0 |
| M3189 | 1.1 | 1.6 | 0 | 63.8 | 1 | 15 | 0 | 1 | 0.5 | 0 | 0 | 16 | 0 | 0 |
| M3190 | 0.6 | 1.5 | 0 | 76.9 | 1 | 13.5 | 0 | 1 | 0.5 | 0 | 0 | 5 | 0 | 0 |
| M3191 | 1.4 | 3.2 | 0 | 60.9 | 0.5 | 16 | 0 | 1.5 | 0.5 | 0 | 0 | 16 | 0 | 0 |
| M3192 | 2 | 2 | 0 | 56.5 | 1 | 20 | 0 | 2 | 0.5 | 0 | 0 | 16 | 0 | 0 |
| M3193 | 2 | 0.5 | 0 | 70 | 1 | 20 | 0 | 1 | 0.5 | 0 | 0 | 5 | 0 | 0 |
| M3194 | 2.2 | 1.6 | 0 | 66.2 | 0 | 20 | 0 | 0 | 0 | 0 | 10 | 0 | 0 | 0 |
| M3195 | 0.9 | 1.1 | 0 | 70.5 | 1 | 11.5 | 0 | 2 | 0.5 | 0 | 0 | 12.5 | 0 | 0 |
| M3196 | 1 | 1.7 | 0 | 65.3 | 1 | 12.5 | 0 | 2 | 0.5 | 0 | 0 | 16 | 0 | 0 |
| M3197 | 1.8 | 2.2 | 0 | 59 | 0 | 15 | 5 | 0 | 0 | 0 | 9 | 8 | 0 | 0 |
| M3198 | 1.1 | 1.5 | 0 | 66.4 | 1 | 13.5 | 0 | 1 | 0.5 | 0 | 0 | 15 | 0 | 0 |
| M3199 | 0.8 | 1.1 | 0 | 79.6 | 1 | 10 | 0 | 2 | 0.5 | 0 | 0 | 5 | 0 | 0 |
| M3200 | 0.9 | 2.9 | 0 | 67.2 | 1 | 12.5 | 0 | 2 | 0.5 | 0 | 0 | 13 | 0 | 0 |
| M3201 | 0.9 | 3 | 0 | 65.1 | 1 | 17 | 0 | 1 | 0.5 | 0 | 0 | 11.5 | 0 | 0 |
| M3202 | 1.7 | 1.7 | 0 | 58.1 | 1 | 20 | 0 | 1 | 0.5 | 0 | 0 | 16 | 0 | 0 |
| M3203 | 0.8 | 1 | 0 | 71.2 | 1 | 11.5 | 0 | 1 | 0.5 | 0 | 0 | 13 | 0 | 0 |
| M3204 | 1.2 | 1.6 | 0 | 62.7 | 1 | 15.5 | 0 | 2 | 0.5 | 0 | 0 | 15.5 | 0 | 0 |
| M3205 | 1 | 1.5 | 0 | 75.5 | 0 | 12 | 0 | 0 | 0 | 0 | 0 | 10 | 0 | 0 |
| M3206 | 1 | 2.4 | 0 | 66.6 | 1 | 18 | 0 | 1.5 | 0.5 | 0 | 0 | 9 | 0 | 0 |
| M3207 | 0.8 | 1.7 | 0 | 76 | 1 | 11 | 0 | 2 | 0.5 | 0 | 0 | 7 | 0 | 0 |
| M3208 | 1.7 | 1.8 | 0 | 57 | 1 | 20 | 0 | 2 | 0.5 | 0 | 0 | 16 | 0 | 0 |
| M3209 | 0.6 | 1.2 | 0 | 77.2 | 1 | 8 | 0 | 1 | 0.5 | 0 | 0 | 10.5 | 0 | 0 |
| M3210 | 1.7 | 1.6 | 0 | 58.7 | 1 | 20 | 0 | 1 | 0.5 | 0 | 0 | 15.5 | 0 | 0 |
| M3211 | 0.6 | 3 | 0 | 68.9 | 1 | 9 | 0 | 2 | 0.5 | 0 | 0 | 15 | 0 | 0 |
| M3212 | 1.1 | 1.2 | 0 | 73.7 | 1 | 17 | 0 | 1 | 0.5 | 0 | 0 | 4.5 | 0 | 0 |
| M3213 | 0.7 | 2 | 0 | 75.3 | 1 | 11.5 | 0 | 1 | 0.5 | 0 | 0 | 8 | 0 | 0 |
| M3214 | 1.2 | 1 | 0 | 68.3 | 1 | 14.5 | 0 | 2 | 0.5 | 0 | 0 | 11.5 | 0 | 0 |
| M3215 | 1.6 | 1 | 0 | 72.9 | 1 | 18 | 0 | 1 | 0.5 | 0 | 0 | 4 | 0 | 0 |
| M3216 | 1.6 | 1.5 | 0 | 60.9 | 1 | 19.5 | 0 | 1 | 0.5 | 0 | 0 | 14 | 0 | 0 |
| M3217 | 1.4 | 3.8 | 0 | 55.3 | 0.5 | 16 | 0 | 1.5 | 0.5 | 0 | 0 | 21 | 0 | 0 |
| M3218 | 0.6 | 1.7 | 0 | 75.2 | 1 | 13 | 0 | 1.5 | 0.5 | 0 | 0 | 6.5 | 0 | 0 |
| M3219 | 1.4 | 4 | 0 | 54.1 | 0.5 | 16 | 0 | 1.5 | 0.5 | 0 | 0 | 22 | 0 | 0 |
| M3220 | 0.8 | 1.6 | 0 | 68.1 | 1 | 11.5 | 0 | 1.5 | 0.5 | 0 | 0 | 15 | 0 | 0 |
| M3221 | 2 | 1.1 | 0 | 67.4 | 1 | 20 | 0 | 2 | 0.5 | 0 | 0 | 6 | 0 | 0 |
| M3222 | 1.2 | 2.5 | 0 | 67.8 | 1 | 15.5 | 0 | 1 | 0.5 | 0 | 0 | 10.5 | 0 | 0 |
| M3223 | 1.4 | 3.2 | 0 | 59.9 | 0.5 | 16 | 0 | 1.5 | 0.5 | 0 | 0 | 17 | 0 | 0 |
| M3224 | 1.4 | 1.6 | 0 | 61.5 | 1 | 17.5 | 0 | 2 | 0.5 | 0 | 0 | 14.5 | 0 | 0 |
| M3225 | 1 | 2.6 | 0 | 66.9 | 1 | 12 | 0 | 2 | 0.5 | 0 | 0 | 14 | 0 | 0 |
| M3226 | 0.6 | 2.9 | 0 | 70.5 | 1 | 11 | 0 | 1.5 | 0.5 | 0 | 0 | 12 | 0 | 0 |
| M3227 | 2 | 0.8 | 0 | 70.7 | 1 | 20 | 0 | 1 | 0.5 | 0 | 0 | 4 | 0 | 0 |
| M3228 | 2 | 0.9 | 0 | 69.6 | 1 | 20 | 0 | 1 | 0.5 | 0 | 0 | 5 | 0 | 0 |
| M3229 | 0.9 | 2.9 | 0 | 67.2 | 1 | 12 | 0 | 1.5 | 0.5 | 0 | 0 | 14 | 0 | 0 |
| M3230 | 1.2 | 1.7 | 0 | 69.1 | 1 | 18.5 | 0 | 1.5 | 0.5 | 0 | 0 | 6.5 | 0 | 0 |
| M3231 | 0.7 | 1.2 | 0 | 72.1 | 1 | 9.5 | 0 | 2 | 0.5 | 0 | 0 | 13 | 0 | 0 |
| M3232 | 1.7 | 1.8 | 0 | 61 | 1 | 18 | 0 | 1 | 0.5 | 0 | 0 | 15 | 0 | 0 |
| M3233 | 1.7 | 1 | 0 | 65.3 | 1 | 18 | 0 | 1.5 | 0.5 | 0 | 0 | 11 | 0 | 0 |
| M3234 | 1.1 | 3 | 0 | 63.9 | 1 | 13.5 | 0 | 1 | 0.5 | 0 | 0 | 16 | 0 | 0 |
| M3235 | 1.2 | 2.5 | 0 | 65.8 | 1 | 16.5 | 0 | 2 | 0.5 | 0 | 0 | 10.5 | 0 | 0 |
| M3236 | 1.2 | 1.5 | 0 | 69.3 | 1 | 19 | 0 | 2 | 0.5 | 0 | 0 | 5.5 | 0 | 0 |
| M3237 | 0.8 | 1.1 | 0 | 70.6 | 1 | 11.5 | 0 | 2 | 0.5 | 0 | 0 | 12.5 | 0 | 0 |
| M3238 | 1.2 | 1.2 | 0 | 71.6 | 1 | 18 | 0 | 2 | 0.5 | 0 | 0 | 4.5 | 0 | 0 |
| M3239 | 1.4 | 1.4 | 0 | 69.2 | 0 | 12 | 0 | 0 | 0 | 0 | 8 | 8 | 0 | 0 |
| M3240 | 1.8 | 1.9 | 0 | 57.8 | 1 | 20 | 0 | 1 | 0.5 | 0 | 0 | 16 | 0 | 0 |
| M3241 | 1.4 | 1.6 | 0 | 66 | 0 | 12 | 2 | 1 | 0 | 0 | 8 | 8 | 0 | 0 |
| M3242 | 0.7 | 2.4 | 0 | 64.9 | 1 | 19.5 | 0 | 2 | 0.5 | 0 | 0 | 9 | 0 | 0 |
| M3243 | 1.7 | 2.6 | 0 | 59.7 | 1 | 18 | 0 | 1 | 0.5 | 0 | 0 | 15.5 | 0 | 0 |
| M3244 | 0.2 | 3.2 | 0 | 70.1 | 1 | 6 | 0 | 1 | 0.5 | 0 | 0 | 18 | 0 | 0 |
| M3245 | 1 | 1.1 | 0 | 69.9 | 1 | 13 | 0 | 1.5 | 0.5 | 0 | 0 | 12 | 0 | 0 |
| M3246 | 0.9 | 1.3 | 0 | 75.3 | 1 | 14.5 | 0 | 1.5 | 0.5 | 0 | 0 | 5 | 0 | 0 |
| M3247 | 1 | 1 | 0 | 79 | 1 | 12.5 | 0 | 1 | 0.5 | 0 | 0 | 4 | 0 | 0 |
| M3248 | 1 | 1.4 | 0 | 75.1 | 1 | 13.5 | 0 | 1.5 | 0.5 | 0 | 0 | 6 | 0 | 0 |
| M3249 | 0.7 | 1.9 | 0 | 72.4 | 1 | 9.5 | 0 | 2 | 0.5 | 0 | 0 | 12 | 0 | 0 |
| M3250 | 0.6 | 1.5 | 0 | 70.9 | 1 | 9.5 | 0 | 2 | 0.5 | 0 | 0 | 14 | 0 | 0 |
| M3251 | 1.2 | 1 | 0 | 69.8 | 1 | 14.5 | 0 | 1 | 0.5 | 0 | 0 | 11 | 0 | 0 |
| M3252 | 1.6 | 1 | 0 | 65.9 | 1 | 18.5 | 0 | 1 | 0.5 | 0 | 0 | 10.5 | 0 | 0 |
| M3253 | 1.6 | 1.3 | 0 | 69.1 | 1 | 19 | 0 | 2 | 0.5 | 0 | 0 | 5.5 | 0 | 0 |
| M3254 | 1.2 | 1 | 0 | 69.8 | 1 | 14.5 | 0 | 1.5 | 0.5 | 0 | 0 | 10.5 | 0 | 0 |
| M3255 | 1.6 | 1.2 | 0 | 69.7 | 1 | 19 | 0 | 2 | 0.5 | 0 | 0 | 5 | 0 | 0 |
| M3256 | 1 | 1.2 | 0 | 70.8 | 1 | 12 | 0 | 1.5 | 0.5 | 0 | 0 | 12 | 0 | 0 |
| M3257 | 1.8 | 1 | 0 | 64.2 | 1 | 20 | 0 | 1 | 0.5 | 0 | 0 | 10.5 | 0 | 0 |
| M3258 | 0.6 | 2.3 | 0 | 65.6 | 1 | 19.5 | 0 | 1.5 | 0.5 | 0 | 0 | 9 | 0 | 0 |
| M3259 | 1 | 1.2 | 0 | 69.8 | 1 | 13.5 | 0 | 1.5 | 0.5 | 0 | 0 | 11.5 | 0 | 0 |
| M3260 | 1.4 | 1 | 0 | 73.1 | 1 | 18 | 0 | 1 | 0.5 | 0 | 0 | 4 | 0 | 0 |
| M3261 | 0.6 | 3 | 0 | 68.9 | 1 | 11 | 0 | 2 | 0.5 | 0 | 0 | 13 | 0 | 0 |
| M3262 | 1.4 | 3.4 | 0 | 54.7 | 0.5 | 16 | 0 | 1.5 | 0.5 | 0 | 0 | 22 | 0 | 0 |
| M3263 | 1.6 | 1.5 | 0 | 61.9 | 1 | 19 | 0 | 1 | 0.5 | 0 | 0 | 13.5 | 0 | 0 |

TABLE 11-continued

Compositions and thermodynamic criteria for vanadium carbides

| | | | | | | | | | | | | | | | |
|---|---|---|---|---|---|---|---|---|---|---|---|---|---|---|---|
| M3264 | 1.4 | 1.9 | 0 | 57.7 | 1 | 20 | 0 | 2 | 0.5 | 0 | 0 | 15.5 | 0 | 0 |
| M3265 | 1.6 | 1.5 | 0 | 60.9 | 1 | 19.5 | 0 | 2 | 0.5 | 0 | 0 | 13 | 0 | 0 |
| M3266 | 1.4 | 1 | 0 | 75.6 | 0 | 18 | 0 | 0 | 0 | 0 | 0 | 4 | 0 | 0 |
| M3267 | 1 | 1.6 | 0 | 72.4 | 1 | 12 | 0 | 2 | 0.5 | 0 | 0 | 9.5 | 0 | 0 |
| M3268 | 1.2 | 1.5 | 0 | 69.8 | 1 | 13.5 | 0 | 1.5 | 0.5 | 0 | 0 | 11 | 0 | 0 |
| M3269 | 1.2 | 1.2 | 0 | 68.1 | 1 | 14.5 | 0 | 1.5 | 0.5 | 0 | 0 | 12 | 0 | 0 |
| M3270 | 1.2 | 3 | 0 | 63.3 | 1 | 14.5 | 0 | 1 | 0.5 | 0 | 0 | 15.5 | 0 | 0 |
| M3271 | 1 | 1 | 0 | 72 | 0 | 14 | 0 | 2 | 0 | 0 | 0 | 10 | 0 | 0 |
| M3272 | 0.6 | 1.5 | 0 | 68.9 | 1 | 12 | 0 | 2 | 0.5 | 0 | 0 | 13.5 | 0 | 0 |
| M3273 | 1 | 1.5 | 0 | 66.5 | 1 | 14.5 | 0 | 1.5 | 0.5 | 0 | 0 | 13.5 | 0 | 0 |
| M3274 | 1 | 1.4 | 0 | 67.6 | 0 | 6 | 0 | 0 | 0 | 0 | 6 | 18 | 0 | 0 |
| M3275 | 1.5 | 2 | 0 | 60 | 1 | 18 | 0 | 1.5 | 0.5 | 0 | 0 | 15.5 | 0 | 0 |
| M3276 | 1.7 | 2.7 | 0 | 59.6 | 1 | 18 | 0 | 2 | 0.5 | 0 | 0 | 14.5 | 0 | 0 |
| M3277 | 1.4 | 3.2 | 0 | 58.9 | 0.5 | 16 | 0 | 1.5 | 0.5 | 0 | 0 | 18 | 0 | 0 |
| M3278 | 1.2 | 3 | 0 | 62.8 | 1 | 16 | 0 | 2 | 0.5 | 0 | 0 | 13.5 | 0 | 0 |
| M3279 | 0.8 | 1.6 | 0 | 74.6 | 1 | 14 | 0 | 1 | 0.5 | 0 | 0 | 6.5 | 0 | 0 |
| M3280 | 1 | 1.3 | 0 | 71.2 | 1 | 18.5 | 0 | 1.5 | 0.5 | 0 | 0 | 5 | 0 | 0 |
| M3281 | 1 | 1.3 | 0 | 71.2 | 1 | 19 | 0 | 1 | 0.5 | 0 | 0 | 5 | 0 | 0 |
| M3282 | 0.8 | 1.2 | 0 | 76.5 | 1 | 10.5 | 0 | 1 | 0.5 | 0 | 0 | 8.5 | 0 | 0 |
| M3283 | 0.6 | 1.9 | 0 | 68 | 1 | 10 | 0 | 2 | 0.5 | 0 | 0 | 16 | 0 | 0 |
| M3284 | 1 | 2.3 | 0 | 66.2 | 1 | 12 | 0 | 2 | 0.5 | 0 | 0 | 15 | 0 | 0 |
| M3285 | 1.7 | 2.8 | 0 | 58 | 1 | 18 | 0 | 2 | 0.5 | 0 | 0 | 16 | 0 | 0 |
| M3286 | 1.7 | 2.8 | 0 | 60 | 1 | 18.5 | 0 | 1 | 0.5 | 0 | 0 | 14.5 | 0 | 0 |
| M3287 | 1 | 1.6 | 0 | 76.4 | 0 | 13 | 0 | 0 | 0 | 0 | 0 | 8 | 0 | 0 |
| M3288 | 0.9 | 3 | 0 | 65.1 | 1 | 11.5 | 0 | 2 | 0.5 | 0 | 0 | 16 | 0 | 0 |
| M3289 | 0.9 | 3 | 0 | 65.6 | 1 | 12 | 0 | 1 | 0.5 | 0 | 0 | 16 | 0 | 0 |
| M3290 | 1.3 | 1.3 | 0 | 65.4 | 1 | 17 | 0 | 1.5 | 0.5 | 0 | 0 | 12 | 0 | 0 |
| M3291 | 0.7 | 1.9 | 0 | 68.9 | 1 | 18.5 | 0 | 1 | 0.5 | 0 | 0 | 7.5 | 0 | 0 |
| M3292 | 1.3 | 1.2 | 0 | 72.5 | 1 | 17 | 0 | 1.5 | 0.5 | 0 | 0 | 5 | 0 | 0 |
| M3293 | 0.8 | 1.4 | 0 | 68.3 | 1 | 13 | 0 | 2 | 0.5 | 0 | 0 | 13 | 0 | 0 |
| M3294 | 1.6 | 1.7 | 0 | 60.2 | 1 | 20 | 0 | 1 | 0.5 | 0 | 0 | 14 | 0 | 0 |
| M3295 | 1.7 | 1.2 | 0 | 62.6 | 1 | 20 | 0 | 2 | 0.5 | 0 | 0 | 11 | 0 | 0 |
| M3296 | 2.4 | 1.8 | 0 | 63.8 | 0 | 20 | 0 | 0 | 0 | 0 | 12 | 0 | 0 | 0 |
| M3297 | 0.6 | 3 | 0 | 62.4 | 1 | 19 | 0 | 1.5 | 0.5 | 0 | 0 | 12 | 0 | 0 |
| M3298 | 1.8 | 2.2 | 0 | 58 | 0 | 15 | 9 | 0 | 0 | 0 | 10 | 4 | 0 | 0 |
| M3299 | 1.1 | 1.1 | 0 | 69.3 | 1 | 13.5 | 0 | 2 | 0.5 | 0 | 0 | 11.5 | 0 | 0 |
| M3300 | 1.1 | 1.1 | 0 | 76.3 | 1 | 14.5 | 0 | 1 | 0.5 | 0 | 0 | 4.5 | 0 | 0 |
| M3301 | 1 | 2.5 | 0 | 66.5 | 1 | 15.5 | 0 | 2 | 0.5 | 0 | 0 | 11 | 0 | 0 |
| M3302 | 1 | 2.6 | 0 | 67.9 | 1 | 15 | 0 | 1 | 0.5 | 0 | 0 | 11 | 0 | 0 |
| M3303 | 1 | 2 | 0 | 71.5 | 1 | 14.5 | 0 | 1 | 0.5 | 0 | 0 | 8.5 | 0 | 0 |
| M3304 | 1.7 | 1 | 0 | 64.3 | 1 | 19 | 0 | 2 | 0.5 | 0 | 0 | 10.5 | 0 | 0 |
| M3305 | 1.6 | 1.4 | 0 | 62 | 1 | 19.5 | 0 | 1 | 0.5 | 0 | 0 | 13 | 0 | 0 |
| M3306 | 1 | 2.6 | 0 | 65.4 | 1 | 17.5 | 0 | 1 | 0.5 | 0 | 0 | 11 | 0 | 0 |
| M3307 | 1.6 | 1.4 | 0 | 62 | 1 | 19.5 | 0 | 1.5 | 0.5 | 0 | 0 | 12.5 | 0 | 0 |
| M3308 | 1.6 | 1.4 | 0 | 61.5 | 1 | 19.5 | 0 | 1.5 | 0.5 | 0 | 0 | 13 | 0 | 0 |
| M3309 | 1.7 | 1.5 | 0 | 63.3 | 1 | 18.5 | 0 | 1 | 0.5 | 0 | 0 | 12.5 | 0 | 0 |
| M3310 | 1.5 | 1.9 | 0 | 60.6 | 1 | 18 | 0 | 1 | 0.5 | 0 | 0 | 15.5 | 0 | 0 |
| M3311 | 1.2 | 1.9 | 0 | 60.9 | 1 | 17 | 0 | 1.5 | 0.5 | 0 | 0 | 16 | 0 | 0 |
| M3312 | 1 | 1.9 | 0 | 70.6 | 1 | 15 | 0 | 2 | 0.5 | 0 | 0 | 8 | 0 | 0 |
| M3313 | 0.8 | 1.7 | 0 | 68 | 1 | 11.5 | 0 | 2 | 0.5 | 0 | 0 | 14.5 | 0 | 0 |
| M3314 | 0.8 | 1.7 | 0 | 67.5 | 1 | 12.5 | 0 | 1.5 | 0.5 | 0 | 0 | 14.5 | 0 | 0 |
| M3315 | 1 | 1.8 | 0 | 68.7 | 1 | 18.5 | 0 | 1.5 | 0.5 | 0 | 0 | 7 | 0 | 0 |
| M3316 | 0.8 | 1.7 | 0 | 66 | 1 | 13 | 0 | 2 | 0.5 | 0 | 0 | 15 | 0 | 0 |
| M3317 | 1.4 | 1.6 | 0 | 71 | 1 | 15.5 | 0 | 1 | 0.5 | 0 | 0 | 8 | 0 | 0 |
| M3318 | 1.2 | 1.8 | 0 | 62 | 1 | 17 | 0 | 1 | 0.5 | 0 | 0 | 15.5 | 0 | 0 |
| M3319 | 1 | 2.2 | 0 | 59.8 | 1 | 18.5 | 0 | 1 | 0.5 | 0 | 0 | 16 | 0 | 0 |
| M3320 | 0.7 | 1.4 | 0 | 72.9 | 1 | 15 | 0 | 2 | 0.5 | 0 | 0 | 6.5 | 0 | 0 |
| M3321 | 0.7 | 2 | 0 | 68.8 | 1 | 10.5 | 0 | 1 | 0.5 | 0 | 0 | 15.5 | 0 | 0 |
| M3322 | 1.6 | 1 | 0 | 67.4 | 1 | 18 | 0 | 1.5 | 0.5 | 0 | 0 | 9 | 0 | 0 |
| M3323 | 1.1 | 1.8 | 0 | 62.6 | 1 | 17.5 | 0 | 1 | 0.5 | 0 | 0 | 14.5 | 0 | 0 |
| M3324 | 0.7 | 2.9 | 0 | 66.9 | 1 | 13.5 | 0 | 1 | 0.5 | 0 | 0 | 13.5 | 0 | 0 |
| M3325 | 0.7 | 1.5 | 0 | 70.8 | 1 | 18.5 | 0 | 1 | 0.5 | 0 | 0 | 6 | 0 | 0 |
| M3326 | 1.6 | 1 | 0 | 70.9 | 1 | 19.5 | 0 | 1 | 0.5 | 0 | 0 | 4.5 | 0 | 0 |
| M3327 | 1.3 | 1.9 | 0 | 60.8 | 1 | 18.5 | 0 | 1 | 0.5 | 0 | 0 | 15 | 0 | 0 |
| M3328 | 0.6 | 3 | 0 | 68.4 | 1 | 12 | 0 | 1 | 0.5 | 0 | 0 | 13.5 | 0 | 0 |
| M3329 | 1.6 | 1 | 0 | 65.4 | 1 | 19.5 | 0 | 2 | 0.5 | 0 | 0 | 9 | 0 | 0 |
| M3330 | 1.2 | 1.3 | 0 | 70 | 1 | 18.5 | 0 | 2 | 0.5 | 0 | 0 | 5.5 | 0 | 0 |
| M3331 | 1.4 | 3.8 | 0 | 54.3 | 0.5 | 16 | 0 | 1.5 | 0.5 | 0 | 0 | 22 | 0 | 0 |
| M3332 | 1.6 | 1.5 | 0 | 62.4 | 1 | 20 | 0 | 1 | 0.5 | 0 | 0 | 12 | 0 | 0 |
| M3333 | 1.6 | 1.5 | 0 | 61.9 | 1 | 20 | 0 | 1 | 0.5 | 0 | 0 | 12.5 | 0 | 0 |
| M3334 | 0.6 | 1.2 | 0 | 73.2 | 1 | 11 | 0 | 1.5 | 0.5 | 0 | 0 | 11 | 0 | 0 |
| M3335 | 1.6 | 1.6 | 0 | 66.8 | 0 | 22 | 0 | 0 | 0 | 0 | 0 | 8 | 0 | 0 |
| M3336 | 1 | 2.1 | 0 | 69.9 | 1 | 13.5 | 0 | 2 | 0.5 | 0 | 0 | 10 | 0 | 0 |
| M3337 | 0.6 | 1.4 | 0 | 74.5 | 1 | 8.5 | 0 | 2 | 0.5 | 0 | 0 | 11.5 | 0 | 0 |
| M3338 | 1.7 | 3 | 0 | 58.8 | 1 | 19 | 0 | 1 | 0.5 | 0 | 0 | 15 | 0 | 0 |
| M3339 | 0.8 | 1.7 | 0 | 65 | 1 | 16 | 0 | 1.5 | 0.5 | 0 | 0 | 13.5 | 0 | 0 |
| M3340 | 1 | 1.5 | 0 | 67 | 1 | 15.5 | 0 | 1 | 0.5 | 0 | 0 | 12.5 | 0 | 0 |
| M3341 | 1.5 | 2 | 0 | 61 | 1 | 18 | 0 | 2 | 0.5 | 0 | 0 | 14 | 0 | 0 |

TABLE 11-continued

Compositions and thermodynamic criteria for vanadium carbides

| | | | | | | | | | | | | | | |
|---|---|---|---|---|---|---|---|---|---|---|---|---|---|---|
| M3342 | 1.2 | 2.5 | 0 | 65.8 | 1 | 15 | 0 | 2 | 0.5 | 0 | 0 | 12 | 0 | 0 |
| M3343 | 1.4 | 3.2 | 0 | 56.9 | 0.5 | 16 | 0 | 1.5 | 0.5 | 0 | 0 | 20 | 0 | 0 |
| M3344 | 1.7 | 3 | 0 | 58.3 | 1 | 20 | 0 | 1.5 | 0.5 | 0 | 0 | 14 | 0 | 0 |
| M3345 | 1.4 | 1.2 | 0 | 69.9 | 1 | 15.5 | 0 | 1.5 | 0.5 | 0 | 0 | 9 | 0 | 0 |
| M3346 | 1.7 | 2.2 | 0 | 59.1 | 1 | 18.5 | 0 | 1.5 | 0.5 | 0 | 0 | 15.5 | 0 | 0 |
| M3347 | 1.2 | 1.5 | 0 | 66.3 | 1 | 16 | 0 | 1 | 0.5 | 0 | 0 | 12.5 | 0 | 0 |
| M3348 | 0.6 | 1.1 | 0 | 79.3 | 1 | 8.5 | 0 | 2 | 0.5 | 0 | 0 | 7 | 0 | 0 |
| M3349 | 0.8 | 1.2 | 0 | 78 | 1 | 10.5 | 0 | 2 | 0.5 | 0 | 0 | 6 | 0 | 0 |
| M3350 | 1.6 | 1.6 | 0 | 63.8 | 1 | 17 | 0 | 2 | 0.5 | 0 | 0 | 12.5 | 0 | 0 |
| M3351 | 0.7 | 2 | 0 | 70.3 | 1 | 14 | 0 | 2 | 0.5 | 0 | 0 | 9.5 | 0 | 0 |
| M3352 | 0.6 | 1.5 | 0 | 72.9 | 1 | 15 | 0 | 1.5 | 0.5 | 0 | 0 | 7 | 0 | 0 |
| M3353 | 1 | 1.7 | 0 | 74.3 | 0 | 13 | 0 | 0 | 0 | 0 | 0 | 10 | 0 | 0 |
| M3354 | 1.2 | 1.3 | 0 | 72.5 | 0 | 14 | 0 | 0 | 0 | 0 | 0 | 11 | 0 | 0 |
| M3355 | 1.7 | 2.8 | 0 | 59.5 | 1 | 19.5 | 0 | 2 | 0.5 | 0 | 0 | 13 | 0 | 0 |
| M3356 | 1.5 | 1.5 | 0 | 61.5 | 1 | 20 | 0 | 2 | 0.5 | 0 | 0 | 12 | 0 | 0 |
| M3357 | 0.7 | 2.3 | 0 | 61 | 1 | 16.5 | 0 | 2 | 0.5 | 0 | 0 | 16 | 0 | 0 |
| M3358 | 1.2 | 1.5 | 0 | 69.8 | 1 | 17.5 | 0 | 2 | 0.5 | 0 | 0 | 6.5 | 0 | 0 |
| M3359 | 0.9 | 3 | 0 | 65.1 | 1 | 12 | 0 | 1.5 | 0.5 | 0 | 0 | 16 | 0 | 0 |
| M3360 | 1.3 | 3 | 0 | 61.7 | 1 | 15.5 | 0 | 1 | 0.5 | 0 | 0 | 16 | 0 | 0 |
| M3361 | 0.7 | 2.2 | 0 | 69.1 | 1 | 14.5 | 0 | 2 | 0.5 | 0 | 0 | 10 | 0 | 0 |
| M3362 | 0.6 | 2.5 | 0 | 66.9 | 1 | 15 | 0 | 2 | 0.5 | 0 | 0 | 11.5 | 0 | 0 |
| M3363 | 1.3 | 2.8 | 0 | 62.4 | 1 | 15.5 | 0 | 1 | 0.5 | 0 | 0 | 15.5 | 0 | 0 |
| M3364 | 1 | 2.2 | 0 | 68.8 | 1 | 14.5 | 0 | 1.5 | 0.5 | 0 | 0 | 10.5 | 0 | 0 |
| M3365 | 1.7 | 2.3 | 0 | 58.5 | 1 | 18.5 | 0 | 1.5 | 0.5 | 0 | 0 | 16 | 0 | 0 |
| M3366 | 1 | 2.2 | 0 | 59.8 | 1 | 17.5 | 0 | 2 | 0.5 | 0 | 0 | 16 | 0 | 0 |
| M3367 | 1.7 | 2.3 | 0 | 57 | 1 | 19.5 | 0 | 2 | 0.5 | 0 | 0 | 16 | 0 | 0 |
| M3368 | 1.5 | 2 | 0 | 59.5 | 1 | 19.5 | 0 | 2 | 0.5 | 0 | 0 | 14 | 0 | 0 |
| M3369 | 1.7 | 1 | 0 | 70.3 | 1 | 19 | 0 | 2 | 0.5 | 0 | 0 | 4.5 | 0 | 0 |
| M3370 | 1.3 | 2.6 | 0 | 64.1 | 1 | 16.5 | 0 | 2 | 0.5 | 0 | 0 | 12 | 0 | 0 |
| M3371 | 1.3 | 1.8 | 0 | 60.9 | 1 | 19.5 | 0 | 1 | 0.5 | 0 | 0 | 14 | 0 | 0 |
| M3372 | 1 | 2.1 | 0 | 62.9 | 1 | 15 | 0 | 1.5 | 0.5 | 0 | 0 | 16 | 0 | 0 |
| M3373 | 1.6 | 1.4 | 0 | 63 | 1 | 19 | 0 | 2 | 0.5 | 0 | 0 | 11.5 | 0 | 0 |
| M3374 | 1.6 | 1.4 | 0 | 62 | 1 | 20 | 0 | 1.5 | 0.5 | 0 | 0 | 12 | 0 | 0 |
| M3375 | 0.8 | 1 | 0 | 74.7 | 1 | 10.5 | 0 | 1.5 | 0.5 | 0 | 0 | 10 | 0 | 0 |
| M3376 | 0.8 | 1 | 0 | 74.2 | 1 | 11 | 0 | 1.5 | 0.5 | 0 | 0 | 10 | 0 | 0 |
| M3377 | 1.5 | 2.9 | 0 | 60.6 | 1 | 19 | 0 | 1 | 0.5 | 0 | 0 | 13.5 | 0 | 0 |
| M3378 | 0.8 | 2 | 0 | 65.2 | 1 | 20 | 0 | 1.5 | 0.5 | 0 | 0 | 9 | 0 | 0 |
| M3379 | 1.2 | 1.9 | 0 | 67.9 | 1 | 17 | 0 | 2 | 0.5 | 0 | 0 | 8.5 | 0 | 0 |
| M3380 | 1.2 | 1.1 | 0 | 68.7 | 1 | 16 | 0 | 1.5 | 0.5 | 0 | 0 | 10 | 0 | 0 |
| M3381 | 1.3 | 2.2 | 0 | 59.5 | 1 | 18 | 0 | 1.5 | 0.5 | 0 | 0 | 16 | 0 | 0 |
| M3382 | 0.7 | 2.9 | 0 | 66.9 | 1 | 10 | 0 | 2 | 0.5 | 0 | 0 | 16 | 0 | 0 |
| M3383 | 0.8 | 1.3 | 0 | 70.4 | 1 | 13 | 0 | 1.5 | 0.5 | 0 | 0 | 11.5 | 0 | 0 |
| M3384 | 1 | 2.4 | 0 | 63.6 | 1 | 18.5 | 0 | 2 | 0.5 | 0 | 0 | 11 | 0 | 0 |
| M3385 | 0.8 | 1 | 0 | 76.7 | 1 | 14 | 0 | 1.5 | 0.5 | 0 | 0 | 4.5 | 0 | 0 |
| M3386 | 1.2 | 2.1 | 0 | 57.7 | 1 | 19.5 | 0 | 2 | 0.5 | 0 | 0 | 16 | 0 | 0 |
| M3387 | 1.7 | 2 | 0 | 65.8 | 1 | 19 | 0 | 1 | 0.5 | 0 | 0 | 9 | 0 | 0 |
| M3388 | 1 | 1 | 0 | 82 | 0 | 12 | 0 | 0 | 0 | 0 | 2 | 2 | 0 | 0 |
| M3389 | 1 | 1 | 0 | 78 | 1 | 12.5 | 0 | 1 | 0.5 | 0 | 0 | 5 | 0 | 0 |
| M3390 | 0.6 | 1.9 | 0 | 65.5 | 1 | 14 | 0 | 1.5 | 0.5 | 0 | 0 | 15 | 0 | 0 |
| M3391 | 1.8 | 1.8 | 0 | 60.4 | 1 | 20 | 0 | 2 | 0.5 | 0 | 0 | 12.5 | 0 | 0 |
| M3392 | 1.2 | 2.4 | 0 | 62.4 | 1 | 20 | 0 | 1.5 | 0.5 | 0 | 0 | 11 | 0 | 0 |
| M3393 | 1 | 2.1 | 0 | 66.4 | 1 | 16 | 0 | 1 | 0.5 | 0 | 0 | 12 | 0 | 0 |
| M3394 | 1.6 | 1 | 0 | 69.4 | 1 | 18.5 | 0 | 2 | 0.5 | 0 | 0 | 6 | 0 | 0 |
| M3395 | 1.8 | 1 | 0 | 67.7 | 1 | 20 | 0 | 2 | 0.5 | 0 | 0 | 6 | 0 | 0 |
| M3396 | 0.7 | 2.8 | 0 | 62.5 | 1 | 16.5 | 0 | 1 | 0.5 | 0 | 0 | 15 | 0 | 0 |
| M3397 | 0.6 | 2.5 | 0 | 66.9 | 1 | 12.5 | 0 | 1 | 0.5 | 0 | 0 | 15 | 0 | 0 |
| M3398 | 1.1 | 1.4 | 0 | 67.5 | 1 | 17.5 | 0 | 1 | 0.5 | 0 | 0 | 10 | 0 | 0 |
| M3399 | 0.6 | 1.2 | 0 | 77.2 | 1 | 10.5 | 0 | 1 | 0.5 | 0 | 0 | 8 | 0 | 0 |
| M3400 | 0.9 | 1.5 | 0 | 73.1 | 1 | 12 | 0 | 1 | 0.5 | 0 | 0 | 10 | 0 | 0 |
| M3401 | 1.5 | 2 | 0 | 65 | 1 | 17.5 | 0 | 1 | 0.5 | 0 | 0 | 11.5 | 0 | 0 |
| M3402 | 0.8 | 1.7 | 0 | 67 | 1 | 17.5 | 0 | 2 | 0.5 | 0 | 0 | 9.5 | 0 | 0 |
| M3403 | 0.8 | 1.7 | 0 | 66 | 1 | 18.5 | 0 | 1 | 0.5 | 0 | 0 | 10.5 | 0 | 0 |
| M3404 | 0.8 | 2.1 | 0 | 63.1 | 1 | 19 | 0 | 2 | 0.5 | 0 | 0 | 11.5 | 0 | 0 |
| M3405 | 0.6 | 1.5 | 0 | 70.4 | 1 | 14.5 | 0 | 1.5 | 0.5 | 0 | 0 | 10 | 0 | 0 |
| M3406 | 0.8 | 2.1 | 0 | 63.6 | 1 | 19.5 | 0 | 1 | 0.5 | 0 | 0 | 11.5 | 0 | 0 |
| M3407 | 0.7 | 2.9 | 0 | 61.9 | 1 | 15.5 | 0 | 1.5 | 0.5 | 0 | 0 | 16 | 0 | 0 |
| M3408 | 0.7 | 2.8 | 0 | 59.5 | 1 | 18.5 | 0 | 1.5 | 0.5 | 0 | 0 | 15.5 | 0 | 0 |
| M3409 | 1.5 | 1.5 | 0 | 64 | 1 | 20 | 0 | 2 | 0.5 | 0 | 0 | 9.5 | 0 | 0 |
| M3410 | 0.8 | 1.6 | 0 | 67.6 | 1 | 17 | 0 | 1.5 | 0.5 | 0 | 0 | 10 | 0 | 0 |
| M3411 | 0.7 | 2.3 | 0 | 63 | 1 | 17.5 | 0 | 1 | 0.5 | 0 | 0 | 14 | 0 | 0 |
| M3412 | 1.3 | 1.5 | 0 | 65.7 | 1 | 18.5 | 0 | 2 | 0.5 | 0 | 0 | 9.5 | 0 | 0 |
| M3413 | 0.7 | 2.4 | 0 | 64.4 | 1 | 15.5 | 0 | 1 | 0.5 | 0 | 0 | 14.5 | 0 | 0 |
| M3414 | 1.3 | 1.5 | 0 | 64.7 | 1 | 20 | 0 | 1 | 0.5 | 0 | 0 | 10 | 0 | 0 |
| M3415 | 1.1 | 2.4 | 0 | 61.5 | 1 | 17.5 | 0 | 1 | 0.5 | 0 | 0 | 15 | 0 | 0 |
| M3416 | 0.7 | 2.2 | 0 | 62.1 | 1 | 18.5 | 0 | 1 | 0.5 | 0 | 0 | 14 | 0 | 0 |
| M3417 | 1 | 2.6 | 0 | 65.9 | 1 | 13.5 | 0 | 1 | 0.5 | 0 | 0 | 14.5 | 0 | 0 |
| M3418 | 0.7 | 2.5 | 0 | 62.8 | 1 | 16.5 | 0 | 1 | 0.5 | 0 | 0 | 15 | 0 | 0 |
| M3419 | 0.8 | 1.6 | 0 | 66.6 | 1 | 17.5 | 0 | 1.5 | 0.5 | 0 | 0 | 10.5 | 0 | 0 |

TABLE 11-continued

Compositions and thermodynamic criteria for vanadium carbides

| | | | | | | | | | | | | | | |
|---|---|---|---|---|---|---|---|---|---|---|---|---|---|---|
| M3420 | 0.8 | 2.5 | 0 | 58.7 | 1 | 20 | 0 | 1 | 0.5 | 0 | 0 | 15.5 | 0 | 0 |
| M3421 | 0.8 | 2.5 | 0 | 59.2 | 1 | 20 | 0 | 1.5 | 0.5 | 0 | 0 | 14.5 | 0 | 0 |
| M3422 | 1.2 | 1.4 | 0 | 70.4 | 1 | 14.5 | 0 | 1.5 | 0.5 | 0 | 0 | 9.5 | 0 | 0 |
| M3423 | 0.6 | 2.5 | 0 | 60.9 | 1 | 18 | 0 | 1.5 | 0.5 | 0 | 0 | 15 | 0 | 0 |
| M3424 | 1.2 | 1.2 | 0 | 71.6 | 1 | 15 | 0 | 1.5 | 0.5 | 0 | 0 | 8 | 0 | 0 |
| M3425 | 1.3 | 2.6 | 0 | 62.6 | 1 | 16 | 0 | 1 | 0.5 | 0 | 0 | 15 | 0 | 0 |
| M3426 | 1.2 | 1.5 | 0 | 65.8 | 1 | 19.5 | 0 | 1 | 0.5 | 0 | 0 | 9.5 | 0 | 0 |
| M3427 | 1.2 | 1.2 | 0 | 69.1 | 1 | 17.5 | 0 | 2 | 0.5 | 0 | 0 | 7.5 | 0 | 0 |
| M3428 | 1.2 | 1.2 | 0 | 68.6 | 1 | 17.5 | 0 | 2 | 0.5 | 0 | 0 | 8 | 0 | 0 |
| M3429 | 0.9 | 2.9 | 0 | 64.2 | 1 | 13.5 | 0 | 1 | 0.5 | 0 | 0 | 16 | 0 | 0 |
| M3430 | 1 | 2 | 0 | 64 | 1 | 18 | 0 | 1 | 0.5 | 0 | 0 | 12.5 | 0 | 0 |
| M3431 | 1 | 2 | 0 | 63.5 | 1 | 18 | 0 | 1 | 0.5 | 0 | 0 | 13 | 0 | 0 |
| M3432 | 0.8 | 1.1 | 0 | 74.1 | 1 | 14 | 0 | 1 | 0.5 | 0 | 0 | 7.5 | 0 | 0 |
| M3433 | 1.2 | 2.9 | 0 | 60.9 | 1 | 16.5 | 0 | 1 | 0.5 | 0 | 0 | 16 | 0 | 0 |
| M3434 | 1 | 2.4 | 0 | 63.1 | 1 | 16 | 0 | 2 | 0.5 | 0 | 0 | 14 | 0 | 0 |
| M3435 | 1.2 | 1.1 | 0 | 71.2 | 1 | 16 | 0 | 1 | 0.5 | 0 | 0 | 8 | 0 | 0 |
| M3436 | 1 | 1.9 | 0 | 66.1 | 1 | 16 | 0 | 2 | 0.5 | 0 | 0 | 11.5 | 0 | 0 |
| M3437 | 1.3 | 2.2 | 0 | 62 | 1 | 18.5 | 0 | 1.5 | 0.5 | 0 | 0 | 13 | 0 | 0 |
| M3438 | 1 | 2.4 | 0 | 62.1 | 1 | 17.5 | 0 | 2 | 0.5 | 0 | 0 | 13.5 | 0 | 0 |
| M3439 | 1.2 | 1.6 | 0 | 67.2 | 1 | 17 | 0 | 1 | 0.5 | 0 | 0 | 10.5 | 0 | 0 |
| M3440 | 0.6 | 2.1 | 0 | 65.3 | 1 | 17 | 0 | 1 | 0.5 | 0 | 0 | 12.5 | 0 | 0 |
| M3441 | 0.8 | 2.6 | 0 | 64.6 | 1 | 13.5 | 0 | 1 | 0.5 | 0 | 0 | 16 | 0 | 0 |
| M3442 | 0.9 | 2 | 0 | 66.1 | 1 | 16.5 | 0 | 2 | 0.5 | 0 | 0 | 11 | 0 | 0 |
| M3443 | 0.7 | 3 | 0 | 64.8 | 1 | 12.5 | 0 | 1.5 | 0.5 | 0 | 0 | 16 | 0 | 0 |
| M3444 | 1 | 1.9 | 0 | 63.1 | 1 | 20 | 0 | 1 | 0.5 | 0 | 0 | 11.5 | 0 | 0 |
| M3445 | 1.1 | 2.6 | 0 | 65.3 | 1 | 14 | 0 | 1 | 0.5 | 0 | 0 | 14.5 | 0 | 0 |
| M3446 | 1.2 | 1.9 | 0 | 64.4 | 1 | 19 | 0 | 1 | 0.5 | 0 | 0 | 11 | 0 | 0 |
| M3447 | 1.5 | 1.8 | 0 | 65.7 | 1 | 18 | 0 | 1.5 | 0.5 | 0 | 0 | 10 | 0 | 0 |
| M3448 | 1.2 | 1.9 | 0 | 62.9 | 1 | 20 | 0 | 2 | 0.5 | 0 | 0 | 10.5 | 0 | 0 |
| M3449 | 1 | 2.3 | 0 | 62.7 | 1 | 20 | 0 | 1 | 0.5 | 0 | 0 | 11.5 | 0 | 0 |
| M3450 | 1.1 | 3 | 0 | 63.9 | 1 | 14 | 0 | 1.5 | 0.5 | 0 | 0 | 15 | 0 | 0 |
| M3451 | 1.7 | 2 | 0 | 60.8 | 1 | 19.5 | 0 | 1.5 | 0.5 | 0 | 0 | 13 | 0 | 0 |
| M3452 | 1.2 | 1.8 | 0 | 63 | 1 | 18 | 0 | 1.5 | 0.5 | 0 | 0 | 13 | 0 | 0 |
| M3453 | 1 | 2.2 | 0 | 60.3 | 1 | 19 | 0 | 1 | 0.5 | 0 | 0 | 15 | 0 | 0 |
| M3454 | 1 | 1.8 | 0 | 60.2 | 1 | 19 | 0 | 2 | 0.5 | 0 | 0 | 14.5 | 0 | 0 |
| M3455 | 0.8 | 1.9 | 0 | 67.8 | 1 | 13.5 | 0 | 1 | 0.5 | 0 | 0 | 13.5 | 0 | 0 |
| M3456 | 0.9 | 1 | 0 | 74.6 | 1 | 14.5 | 0 | 1 | 0.5 | 0 | 0 | 6.5 | 0 | 0 |
| M3457 | 1.2 | 1 | 0 | 71.3 | 1 | 15 | 0 | 1.5 | 0.5 | 0 | 0 | 8.5 | 0 | 0 |
| M3458 | 1.5 | 1 | 0 | 69 | 1 | 17.5 | 0 | 1 | 0.5 | 0 | 0 | 8.5 | 0 | 0 |
| M3459 | 1 | 1.3 | 0 | 69.2 | 1 | 15.5 | 0 | 1.5 | 0.5 | 0 | 0 | 10 | 0 | 0 |
| M3460 | 1.6 | 1.2 | 0 | 68.7 | 1 | 19.5 | 0 | 1 | 0.5 | 0 | 0 | 6.5 | 0 | 0 |
| M3461 | 1 | 1.2 | 0 | 74.3 | 1 | 13 | 0 | 2 | 0.5 | 0 | 0 | 7 | 0 | 0 |
| M3462 | 1 | 1.6 | 0 | 67.9 | 1 | 19 | 0 | 1 | 0.5 | 0 | 0 | 8 | 0 | 0 |
| M3463 | 1.4 | 2.5 | 0 | 59.6 | 1 | 17.5 | 0 | 2 | 0.5 | 0 | 0 | 15.5 | 0 | 0 |
| M3464 | 1 | 1 | 0 | 72 | 1 | 14 | 0 | 1.5 | 0.5 | 0 | 0 | 9 | 0 | 0 |
| M3465 | 1.6 | 1 | 0 | 68.9 | 1 | 19.5 | 0 | 2 | 0.5 | 0 | 0 | 5.5 | 0 | 0 |
| M3466 | 1.6 | 1 | 0 | 66.9 | 1 | 19.5 | 0 | 2 | 0.5 | 0 | 0 | 7.5 | 0 | 0 |
| M3467 | 0.6 | 3 | 0 | 66.4 | 1 | 12 | 0 | 2 | 0.5 | 0 | 0 | 14.5 | 0 | 0 |
| M3468 | 1.7 | 0.5 | 0 | 72.3 | 1 | 18 | 0 | 1 | 0.5 | 0 | 0 | 5 | 0 | 0 |
| M3469 | 0.7 | 1.9 | 0 | 68.9 | 1 | 14.5 | 0 | 2 | 0.5 | 0 | 0 | 10.5 | 0 | 0 |
| M3470 | 0.6 | 2.5 | 0 | 67.9 | 1 | 10 | 0 | 2 | 0.5 | 0 | 0 | 15.5 | 0 | 0 |
| M3471 | 0.6 | 3 | 0 | 65.4 | 1 | 13 | 0 | 2 | 0.5 | 0 | 0 | 14.5 | 0 | 0 |
| M3472 | 0.6 | 2.5 | 0 | 67.4 | 1 | 10.5 | 0 | 2 | 0.5 | 0 | 0 | 15.5 | 0 | 0 |
| M3473 | 0.7 | 1.9 | 0 | 66.4 | 1 | 15 | 0 | 1.5 | 0.5 | 0 | 0 | 13 | 0 | 0 |
| M3474 | 1.1 | 2 | 0 | 59.9 | 1 | 19.5 | 0 | 2 | 0.5 | 0 | 0 | 14 | 0 | 0 |
| M3475 | 1.2 | 1.4 | 0 | 71.4 | 0 | 18 | 0 | 0 | 0 | 0 | 0 | 8 | 0 | 0 |
| M3476 | 1.6 | 1.5 | 0 | 65.9 | 1 | 20 | 0 | 2 | 0.5 | 0 | 0 | 7.5 | 0 | 0 |
| M3477 | 0.6 | 1.2 | 0 | 76.7 | 1 | 11.5 | 0 | 1 | 0.5 | 0 | 0 | 7.5 | 0 | 0 |
| M3478 | 1.3 | 1.3 | 0 | 69.9 | 1 | 15 | 0 | 2 | 0.5 | 0 | 0 | 9 | 0 | 0 |
| M3479 | 2 | 0.6 | 0 | 71.4 | 0 | 22 | 0 | 0 | 0 | 0 | 0 | 4 | 0 | 0 |
| M3480 | 2 | 1 | 0 | 67 | 0 | 22 | 0 | 0 | 0 | 0 | 0 | 8 | 0 | 0 |
| M3481 | 1.3 | 1.1 | 0 | 74.1 | 1 | 15 | 0 | 1.5 | 0.5 | 0 | 0 | 5.5 | 0 | 0 |
| M3482 | 1 | 1.2 | 0 | 72.8 | 0 | 16 | 0 | 1 | 0 | 0 | 0 | 8 | 0 | 0 |
| M3483 | 1.7 | 3 | 0 | 57.8 | 1 | 19 | 0 | 1 | 0.5 | 0 | 0 | 16 | 0 | 0 |
| M3484 | 0.8 | 2.3 | 0 | 62.4 | 1 | 19.5 | 0 | 2 | 0.5 | 0 | 0 | 11.5 | 0 | 0 |
| M3485 | 1.3 | 1.1 | 0 | 71.6 | 1 | 17 | 0 | 1 | 0.5 | 0 | 0 | 6.5 | 0 | 0 |
| M3486 | 1.7 | 2.7 | 0 | 58.1 | 1 | 18.5 | 0 | 1.5 | 0.5 | 0 | 0 | 16 | 0 | 0 |
| M3487 | 1.2 | 1.5 | 0 | 68.3 | 1 | 15 | 0 | 1.5 | 0.5 | 0 | 0 | 11 | 0 | 0 |
| M3488 | 1.2 | 2 | 0 | 69.3 | 1 | 15 | 0 | 1 | 0.5 | 0 | 0 | 10 | 0 | 0 |
| M3489 | 1.4 | 3.2 | 0 | 57.9 | 0.5 | 16 | 0 | 1.5 | 0.5 | 0 | 0 | 19 | 0 | 0 |
| M3490 | 1.1 | 2.1 | 0 | 60.8 | 1 | 18.5 | 0 | 1 | 0.5 | 0 | 0 | 15 | 0 | 0 |
| M3491 | 0.6 | 1.5 | 0 | 70.9 | 1 | 13.5 | 0 | 2 | 0.5 | 0 | 0 | 10 | 0 | 0 |
| M3492 | 0.6 | 2.9 | 0 | 69.5 | 1 | 10 | 0 | 1 | 0.5 | 0 | 0 | 14.5 | 0 | 0 |
| M3493 | 1.7 | 2.7 | 0 | 56.6 | 1 | 20 | 0 | 1.5 | 0.5 | 0 | 0 | 16 | 0 | 0 |
| M3494 | 0.7 | 2.8 | 0 | 61.5 | 1 | 17.5 | 0 | 1.5 | 0.5 | 0 | 0 | 14.5 | 0 | 0 |
| M3495 | 0.7 | 2.3 | 0 | 67 | 1 | 15 | 0 | 1 | 0.5 | 0 | 0 | 12.5 | 0 | 0 |
| M3496 | 0.6 | 1.5 | 0 | 69.9 | 1 | 14.5 | 0 | 1.5 | 0.5 | 0 | 0 | 10.5 | 0 | 0 |
| M3497 | 0.7 | 1.9 | 0 | 68.9 | 1 | 16.5 | 0 | 1 | 0.5 | 0 | 0 | 9.5 | 0 | 0 |

TABLE 11-continued

Compositions and thermodynamic criteria for vanadium carbides

| ID | C1 | C2 | C3 | C4 | C5 | C6 | C7 | C8 | C9 | C10 | C11 | C12 | C13 | C14 |
|---|---|---|---|---|---|---|---|---|---|---|---|---|---|---|
| M3498 | 0.6 | 1.1 | 0 | 77.8 | 1 | 10.5 | 0 | 2 | 0.5 | 0 | 0 | 6.5 | 0 | 0 |
| M3499 | 0.6 | 2.9 | 0 | 67.5 | 1 | 10.5 | 0 | 1.5 | 0.5 | 0 | 0 | 15.5 | 0 | 0 |
| M3500 | 1.1 | 3 | 0 | 58.9 | 1 | 19.5 | 0 | 1 | 0.5 | 0 | 0 | 15 | 0 | 0 |
| M3501 | 0.6 | 2.9 | 0 | 68.5 | 1 | 11 | 0 | 1.5 | 0.5 | 0 | 0 | 14 | 0 | 0 |
| M3502 | 0.9 | 3 | 0 | 65.1 | 1 | 12.5 | 0 | 1 | 0.5 | 0 | 0 | 16 | 0 | 0 |
| M3503 | 1 | 2.3 | 0 | 65.2 | 1 | 14 | 0 | 1.5 | 0.5 | 0 | 0 | 14.5 | 0 | 0 |
| M3504 | 1.2 | 1.5 | 0 | 63.8 | 1 | 18.5 | 0 | 2 | 0.5 | 0 | 0 | 11.5 | 0 | 0 |
| M3505 | 1.8 | 1.8 | 0 | 68.4 | 0 | 16 | 0 | 0 | 0 | 0 | 12 | 0 | 0 | 0 |
| M3506 | 1.3 | 3 | 0 | 61.7 | 1 | 15.5 | 0 | 2 | 0.5 | 0 | 0 | 15 | 0 | 0 |
| M3507 | 1 | 1.8 | 0 | 70.7 | 1 | 14 | 0 | 1 | 0.5 | 0 | 0 | 10 | 0 | 0 |
| M3508 | 0.6 | 2.5 | 0 | 66.9 | 1 | 13.5 | 0 | 1.5 | 0.5 | 0 | 0 | 13.5 | 0 | 0 |
| M3509 | 0.6 | 3 | 0 | 61.9 | 1 | 16.5 | 0 | 2 | 0.5 | 0 | 0 | 14.5 | 0 | 0 |
| M3510 | 1 | 2.4 | 0 | 67.1 | 1 | 14.5 | 0 | 1.5 | 0.5 | 0 | 0 | 12 | 0 | 0 |
| M3511 | 0.6 | 2.5 | 0 | 67.4 | 1 | 14.5 | 0 | 1 | 0.5 | 0 | 0 | 12.5 | 0 | 0 |
| M3512 | 1 | 2.4 | 0 | 66.6 | 1 | 14.5 | 0 | 1.5 | 0.5 | 0 | 0 | 12.5 | 0 | 0 |
| M3513 | 1.7 | 1.2 | 0 | 64.6 | 1 | 20 | 0 | 1.5 | 0.5 | 0 | 0 | 9.5 | 0 | 0 |
| M3514 | 1.6 | 2.1 | 0 | 62.3 | 1 | 18 | 0 | 1.5 | 0.5 | 0 | 0 | 13 | 0 | 0 |
| M3515 | 1 | 2.6 | 0 | 66.4 | 1 | 13 | 0 | 1 | 0.5 | 0 | 0 | 14.5 | 0 | 0 |
| M3516 | 0.7 | 1.5 | 0 | 72.3 | 1 | 12 | 0 | 1 | 0.5 | 0 | 0 | 11 | 0 | 0 |
| M3517 | 1.6 | 2.6 | 0 | 60.8 | 1 | 18.5 | 0 | 2 | 0.5 | 0 | 0 | 13 | 0 | 0 |
| M3518 | 1.3 | 2.7 | 0 | 63 | 1 | 15.5 | 0 | 1 | 0.5 | 0 | 0 | 15 | 0 | 0 |
| M3519 | 1 | 2.2 | 0 | 63.8 | 1 | 15.5 | 0 | 1.5 | 0.5 | 0 | 0 | 14.5 | 0 | 0 |
| M3520 | 0.6 | 2.5 | 0 | 63.9 | 1 | 18 | 0 | 1.5 | 0.5 | 0 | 0 | 12 | 0 | 0 |
| M3521 | 1 | 2 | 0 | 69.5 | 1 | 14 | 0 | 1 | 0.5 | 0 | 0 | 11 | 0 | 0 |
| M3522 | 1.8 | 2.2 | 0 | 52.5 | 0 | 15 | 13 | 0 | 0 | 0 | 11.5 | 4 | 0 | 0 |
| M3523 | 0.8 | 2.5 | 0 | 57.2 | 1 | 20 | 0 | 2 | 0.5 | 0 | 0 | 16 | 0 | 0 |
| M3524 | 0.7 | 2.5 | 0 | 64.8 | 1 | 17.5 | 0 | 1 | 0.5 | 0 | 0 | 12 | 0 | 0 |
| M3525 | 1.3 | 1.6 | 0 | 67.6 | 1 | 15 | 0 | 1 | 0.5 | 0 | 0 | 12 | 0 | 0 |
| M3526 | 1.5 | 2 | 0 | 60.5 | 1 | 19.5 | 0 | 1.5 | 0.5 | 0 | 0 | 13.5 | 0 | 0 |
| M3527 | 1.7 | 2.2 | 0 | 59.6 | 1 | 20 | 0 | 1 | 0.5 | 0 | 0 | 14 | 0 | 0 |
| M3528 | 1.1 | 3 | 0 | 63.4 | 1 | 14 | 0 | 1 | 0.5 | 0 | 0 | 16 | 0 | 0 |
| M3529 | 0.7 | 2.5 | 0 | 58.3 | 1 | 19.5 | 0 | 2 | 0.5 | 0 | 0 | 15.5 | 0 | 0 |
| M3530 | 1 | 2.1 | 0 | 65.4 | 1 | 15 | 0 | 1.5 | 0.5 | 0 | 0 | 13.5 | 0 | 0 |
| M3531 | 1.2 | 1.5 | 0 | 67.8 | 1 | 19.5 | 0 | 1 | 0.5 | 0 | 0 | 7.5 | 0 | 0 |
| M3532 | 1 | 2.6 | 0 | 63.9 | 1 | 17 | 0 | 1 | 0.5 | 0 | 0 | 13 | 0 | 0 |
| M3533 | 0.9 | 3 | 0 | 60.1 | 1 | 18 | 0 | 1 | 0.5 | 0 | 0 | 15.5 | 0 | 0 |
| M3534 | 1.2 | 1.5 | 0 | 67.3 | 1 | 20 | 0 | 1 | 0.5 | 0 | 0 | 7.5 | 0 | 0 |
| M3535 | 1 | 2.5 | 0 | 61 | 1 | 19.5 | 0 | 2 | 0.5 | 0 | 0 | 12.5 | 0 | 0 |
| M3536 | 1.3 | 1.6 | 0 | 66.6 | 1 | 17 | 0 | 2 | 0.5 | 0 | 0 | 10 | 0 | 0 |
| M3537 | 1 | 2 | 0 | 62 | 1 | 19 | 0 | 2 | 0.5 | 0 | 0 | 12.5 | 0 | 0 |
| M3538 | 1.6 | 1.4 | 0 | 64 | 1 | 19.5 | 0 | 2 | 0.5 | 0 | 0 | 10 | 0 | 0 |
| M3539 | 1.6 | 1.4 | 0 | 64 | 1 | 20 | 0 | 1.5 | 0.5 | 0 | 0 | 10 | 0 | 0 |
| M3540 | 1.2 | 2.5 | 0 | 58.3 | 1 | 18.5 | 0 | 2 | 0.5 | 0 | 0 | 16 | 0 | 0 |
| M3541 | 1 | 1.4 | 0 | 71.6 | 0 | 16 | 0 | 0 | 0 | 0 | 0 | 10 | 0 | 0 |
| M3542 | 1.6 | 1.4 | 0 | 63 | 1 | 20 | 0 | 2 | 0.5 | 0 | 0 | 10.5 | 0 | 0 |
| M3543 | 0.6 | 2.4 | 0 | 63.5 | 1 | 18 | 0 | 2 | 0.5 | 0 | 0 | 12 | 0 | 0 |
| M3544 | 1 | 2.4 | 0 | 66.1 | 1 | 16 | 0 | 1 | 0.5 | 0 | 0 | 12 | 0 | 0 |
| M3545 | 0.8 | 1 | 0 | 77.2 | 1 | 11 | 0 | 2 | 0.5 | 0 | 0 | 6.5 | 0 | 0 |
| M3546 | 1.7 | 1.5 | 0 | 64.3 | 1 | 19 | 0 | 2 | 0.5 | 0 | 0 | 10 | 0 | 0 |
| M3547 | 0.7 | 1 | 0 | 78.3 | 1 | 12 | 0 | 1.5 | 0.5 | 0 | 0 | 5 | 0 | 0 |
| M3548 | 1 | 1.9 | 0 | 70.1 | 1 | 15 | 0 | 1 | 0.5 | 0 | 0 | 9.5 | 0 | 0 |
| M3549 | 1.2 | 1.1 | 0 | 73.7 | 1 | 14.5 | 0 | 2 | 0.5 | 0 | 0 | 6 | 0 | 0 |
| M3550 | 1.6 | 1.1 | 0 | 70.3 | 1 | 17.5 | 0 | 1 | 0.5 | 0 | 0 | 7 | 0 | 0 |
| M3551 | 1.2 | 1.1 | 0 | 72.7 | 1 | 16 | 0 | 1 | 0.5 | 0 | 0 | 6.5 | 0 | 0 |
| M3552 | 1.2 | 1.1 | 0 | 69.2 | 1 | 16 | 0 | 1.5 | 0.5 | 0 | 0 | 9.5 | 0 | 0 |
| M3553 | 1.2 | 1.1 | 0 | 69.2 | 1 | 16.5 | 0 | 1.5 | 0.5 | 0 | 0 | 9 | 0 | 0 |
| M3554 | 0.9 | 2.4 | 0 | 61.2 | 1 | 17 | 0 | 2 | 0.5 | 0 | 0 | 15 | 0 | 0 |
| M3555 | 1.2 | 2.6 | 0 | 60.2 | 1 | 17 | 0 | 1.5 | 0.5 | 0 | 0 | 16 | 0 | 0 |
| M3556 | 0.6 | 1.3 | 0 | 76.1 | 1 | 9.5 | 0 | 2 | 0.5 | 0 | 0 | 9 | 0 | 0 |
| M3557 | 1.2 | 1.6 | 0 | 64.2 | 1 | 18.5 | 0 | 2 | 0.5 | 0 | 0 | 11 | 0 | 0 |
| M3558 | 0.6 | 2 | 0 | 72.4 | 1 | 11.5 | 0 | 2 | 0.5 | 0 | 0 | 10 | 0 | 0 |
| M3559 | 0.8 | 1.3 | 0 | 74.4 | 1 | 13.5 | 0 | 1.5 | 0.5 | 0 | 0 | 7 | 0 | 0 |
| M3560 | 0.8 | 1.3 | 0 | 70.9 | 1 | 13.5 | 0 | 2 | 0.5 | 0 | 0 | 10 | 0 | 0 |
| M3561 | 1.5 | 1.4 | 0 | 64.6 | 1 | 19.5 | 0 | 2 | 0.5 | 0 | 0 | 9.5 | 0 | 0 |
| M3562 | 0.7 | 1.5 | 0 | 65.8 | 1 | 14.5 | 0 | 1.5 | 0.5 | 0 | 0 | 14.5 | 0 | 0 |
| M3563 | 1 | 2.4 | 0 | 63.1 | 1 | 19 | 0 | 1.5 | 0.5 | 0 | 0 | 11.5 | 0 | 0 |
| M3564 | 1 | 2.4 | 0 | 59.1 | 1 | 19.5 | 0 | 1 | 0.5 | 0 | 0 | 15.5 | 0 | 0 |
| M3565 | 0.6 | 1 | 0 | 78.9 | 1 | 9 | 0 | 2 | 0.5 | 0 | 0 | 7 | 0 | 0 |
| M3566 | 0.6 | 1 | 0 | 76.4 | 1 | 10 | 0 | 1 | 0.5 | 0 | 0 | 9.5 | 0 | 0 |
| M3567 | 0.9 | 1 | 0 | 72.6 | 1 | 13.5 | 0 | 1.5 | 0.5 | 0 | 0 | 9 | 0 | 0 |
| M3568 | 0.8 | 1.5 | 0 | 71.2 | 1 | 16.5 | 0 | 1 | 0.5 | 0 | 0 | 7.5 | 0 | 0 |
| M3569 | 1.4 | 1.3 | 0 | 67.8 | 1 | 20 | 0 | 1.5 | 0.5 | 0 | 0 | 6.5 | 0 | 0 |
| M3570 | 1.5 | 1.1 | 0 | 68.9 | 1 | 19.5 | 0 | 1.5 | 0.5 | 0 | 0 | 6 | 0 | 0 |
| M3571 | 0.7 | 1.5 | 0 | 70.3 | 1 | 15.5 | 0 | 2 | 0.5 | 0 | 0 | 8.5 | 0 | 0 |
| M3572 | 1 | 1.1 | 0 | 75.4 | 1 | 14 | 0 | 1.5 | 0.5 | 0 | 0 | 5.5 | 0 | 0 |
| M3573 | 0.9 | 1.3 | 0 | 69.8 | 1 | 15 | 0 | 1 | 0.5 | 0 | 0 | 10.5 | 0 | 0 |
| M3574 | 1.1 | 2.6 | 0 | 64.3 | 1 | 13.5 | 0 | 1.5 | 0.5 | 0 | 0 | 15.5 | 0 | 0 |
| M3575 | 1.4 | 1 | 0 | 71.6 | 1 | 18 | 0 | 1.5 | 0.5 | 0 | 0 | 5 | 0 | 0 |

TABLE 11-continued

Compositions and thermodynamic criteria for vanadium carbides

| M3576 | 1 | 2.6 | 0 | 62.4 | 1 | 19.5 | 0 | 1 | 0.5 | 0 | 0 | 12 | 0 | 0 |
|---|---|---|---|---|---|---|---|---|---|---|---|---|---|---|
| M3577 | 1.8 | 2.8 | 0 | 57.4 | 1 | 19.5 | 0 | 1 | 0.5 | 0 | 0 | 16 | 0 | 0 |
| M3578 | 0.6 | 1.9 | 0 | 66 | 1 | 15.5 | 0 | 2 | 0.5 | 0 | 0 | 12.5 | 0 | 0 |
| M3579 | 0.6 | 1.9 | 0 | 69.5 | 1 | 16.5 | 0 | 1 | 0.5 | 0 | 0 | 9 | 0 | 0 |
| M3580 | 1.6 | 1 | 0 | 69.4 | 1 | 17.5 | 0 | 1 | 0.5 | 0 | 0 | 8 | 0 | 0 |
| M3581 | 1.8 | 2.2 | 0 | 53.5 | 0 | 15 | 11.5 | 0 | 0 | 0 | 10.5 | 5.5 | 0 | 0 |
| M3582 | 1.4 | 1.8 | 0 | 62.8 | 0 | 12 | 5 | 1 | 0 | 0 | 8 | 8 | 0 | 0 |
| M3583 | 1.3 | 1 | 0 | 66.2 | 1 | 20 | 0 | 2 | 0.5 | 0 | 0 | 8 | 0 | 0 |
| M3584 | 2.2 | 1.8 | 0 | 64 | 0 | 20 | 0 | 0 | 0 | 0 | 12 | 0 | 0 | 0 |
| M3585 | 1.3 | 1.1 | 0 | 64.6 | 1 | 19 | 0 | 1 | 0.5 | 0 | 0 | 11.5 | 0 | 0 |
| M3586 | 1.8 | 2.2 | 0 | 57 | 0 | 15 | 7 | 0 | 0 | 0 | 12 | 5 | 0 | 0 |
| M3587 | 0.7 | 1.5 | 0 | 65.8 | 1 | 17 | 0 | 1 | 0.5 | 0 | 0 | 12.5 | 0 | 0 |
| M3588 | 1.3 | 1.1 | 0 | 63.1 | 1 | 19 | 0 | 1.5 | 0.5 | 0 | 0 | 12.5 | 0 | 0 |
| M3589 | 1 | 1 | 0 | 76 | 0 | 16 | 0 | 2 | 0 | 0 | 2 | 2 | 0 | 0 |
| M3590 | 1.3 | 1.1 | 0 | 62.6 | 1 | 19.5 | 0 | 1.5 | 0.5 | 0 | 0 | 12.5 | 0 | 0 |
| M3591 | 1 | 1.2 | 0 | 67.8 | 0 | 10 | 0 | 2 | 0 | 0 | 12 | 6 | 0 | 0 |
| M3592 | 1 | 1.2 | 0 | 75.8 | 0 | 14 | 0 | 2 | 0 | 0 | 4 | 2 | 0 | 0 |
| M3593 | 1 | 1.4 | 0 | 61.1 | 1 | 20 | 0 | 2 | 0.5 | 0 | 0 | 13 | 0 | 0 |
| M3594 | 1 | 1.2 | 0 | 61.8 | 0 | 16 | 0 | 0 | 0 | 0 | 2 | 18 | 0 | 0 |
| M3595 | 1 | 1.4 | 0 | 62.6 | 0 | 12 | 0 | 1 | 0 | 0 | 12 | 10 | 0 | 0 |
| M3596 | 1 | 1.4 | 0 | 63.6 | 0 | 16 | 0 | 2 | 0 | 0 | 4 | 12 | 0 | 0 |
| M3597 | 1 | 1 | 0 | 62 | 0 | 16 | 0 | 0 | 0 | 0 | 10 | 10 | 0 | 0 |
| M3598 | 1 | 1 | 0 | 62 | 0 | 12 | 0 | 0 | 0 | 0 | 8 | 16 | 0 | 0 |
| M3599 | 1.6 | 1.4 | 0 | 78 | 0 | 4 | 0 | 0 | 0 | 0 | 0 | 9 | 6 | 0 |
| M3600 | 2 | 1.8 | 0 | 76.2 | 0 | 4 | 0 | 0 | 0 | 0 | 0 | 8 | 8 | 0 |
| M3601 | 2 | 2.4 | 0 | 76.6 | 0 | 2 | 0 | 0 | 0 | 0 | 0 | 11 | 6 | 0 |
| M3602 | 1.6 | 2.4 | 0 | 78 | 0 | 4 | 0 | 0 | 0 | 0 | 0 | 6 | 8 | 0 |
| M3603 | 1.6 | 1.4 | 0 | 80 | 0 | 2 | 0 | 0 | 0 | 0 | 0 | 9 | 6 | 0 |
| M3604 | 2 | 1.4 | 0 | 79.6 | 0 | 2 | 0 | 0 | 0 | 0 | 0 | 7 | 8 | 0 |
| M3605 | 1.6 | 2.2 | 0 | 72.2 | 0 | 2 | 0 | 0 | 0 | 0 | 0 | 12 | 10 | 0 |
| M3606 | 1 | 1.4 | 0 | 75.6 | 0 | 6 | 0 | 0 | 0 | 0 | 0 | 10 | 6 | 0 |
| M3607 | 1.2 | 2.2 | 0 | 74.6 | 0 | 2 | 0 | 0 | 0 | 0 | 0 | 8 | 12 | 0 |
| M3608 | 1 | 2.2 | 0 | 73.8 | 0 | 2 | 0 | 0 | 0 | 0 | 0 | 9 | 12 | 0 |
| M3609 | 1.2 | 2.4 | 0 | 77.4 | 0 | 2 | 0 | 0 | 0 | 0 | 0 | 7 | 10 | 0 |
| M3610 | 1.8 | 1.6 | 0 | 72.6 | 0 | 2 | 0 | 0 | 0 | 0 | 0 | 12 | 10 | 0 |
| M3611 | 1 | 1.6 | 0 | 75.4 | 0 | 6 | 0 | 0 | 0 | 0 | 0 | 8 | 8 | 0 |
| M3612 | 1 | 2.2 | 0 | 70.8 | 0 | 6 | 0 | 0 | 0 | 0 | 0 | 10 | 10 | 0 |
| M3613 | 1 | 2.2 | 0 | 68.8 | 0 | 6 | 0 | 0 | 0 | 0 | 0 | 12 | 10 | 0 |
| M3614 | 2 | 1.8 | 0 | 78.2 | 0 | 0 | 0 | 0 | 0 | 0 | 0 | 8 | 10 | 0 |
| M3615 | 1.2 | 1.6 | 0 | 80.2 | 0 | 0 | 0 | 0 | 0 | 0 | 0 | 11 | 6 | 0 |
| M3616 | 1.8 | 1.4 | 0 | 81.8 | 0 | 0 | 0 | 0 | 0 | 0 | 0 | 9 | 6 | 0 |
| M3617 | 1.8 | 1.4 | 0 | 80.8 | 0 | 0 | 0 | 0 | 0 | 0 | 0 | 10 | 6 | 0 |
| M3618 | 1.8 | 2.2 | 0 | 80 | 0 | 0 | 0 | 0 | 0 | 0 | 0 | 10 | 6 | 0 |
| M3619 | 2 | 1.4 | 0 | 81.6 | 0 | 0 | 0 | 0 | 0 | 0 | 0 | 7 | 8 | 0 |
| M3620 | 2 | 1.4 | 0 | 82.6 | 0 | 0 | 0 | 0 | 0 | 0 | 0 | 8 | 6 | 0 |
| M3621 | 2 | 1.4 | 0 | 76.6 | 0 | 0 | 0 | 0 | 0 | 0 | 0 | 12 | 8 | 0 |
| M3622 | 2 | 2.4 | 0 | 76.6 | 0 | 0 | 0 | 0 | 0 | 0 | 0 | 11 | 8 | 0 |
| M3623 | 1.4 | 2 | 0 | 78.6 | 0 | 0 | 0 | 0 | 0 | 0 | 0 | 6 | 12 | 0 |
| M3624 | 1 | 2.4 | 0 | 73.6 | 0 | 4 | 0 | 0 | 0 | 0 | 0 | 7 | 12 | 0 |
| M3625 | 1.2 | 2.2 | 0 | 68.6 | 0 | 6 | 0 | 0 | 0 | 0 | 0 | 10 | 12 | 0 |
| M3626 | 1 | 2.4 | 0 | 71.6 | 0 | 4 | 0 | 0 | 0 | 0 | 0 | 9 | 12 | 0 |
| M3627 | 1 | 2.2 | 0 | 82.8 | 0 | 0 | 0 | 0 | 0 | 0 | 0 | 6 | 8 | 0 |
| M3628 | 1 | 1.6 | 0 | 77.4 | 0 | 0 | 0 | 0 | 0 | 0 | 0 | 10 | 10 | 0 |
| M3629 | 1.2 | 1.6 | 0 | 75.2 | 0 | 0 | 0 | 0 | 0 | 0 | 0 | 12 | 10 | 0 |
| M3630 | 1.4 | 1.4 | 0 | 75.2 | 0 | 0 | 0 | 0 | 0 | 0 | 0 | 12 | 10 | 0 |
| M3631 | 3 | 0 | 0 | 77 | 0 | 0 | 0 | 0 | 0 | 0 | 5 | 0 | 10 | 5 |

| No | 1 | 2 | 3 | 4 | 5 | 6 | 7 | 8 | 9 |
|---|---|---|---|---|---|---|---|---|---|
| M686 | 7.5% | 7.5% | 7.5% | 70.1% | 21.8% | 21.8% | 51.3% | 1000 | 200 |
| M687 | 8.9% | 8.9% | 8.9% | 70.1% | 20.2% | 20.2% | 47.0% | 1000 | 150 |
| M688 | 9.7% | 9.7% | 9.7% | 70.1% | 20.2% | 20.2% | 47.0% | 1000 | 150 |
| M689 | 10.2% | 10.2% | 10.2% | 70.1% | 18.4% | 18.4% | 48.8% | 1000 | 150 |
| M690 | 14.5% | 14.5% | 14.5% | 70.1% | 20.4% | 20.4% | 44.5% | 1050 | 200 |
| M691 | 12.4% | 12.4% | 12.4% | 70.1% | 18.6% | 18.6% | 45.5% | 1000 | 150 |
| M692 | 8.3% | 8.3% | 8.3% | 70.1% | 22.9% | 22.9% | 44.8% | 1050 | 200 |
| M693 | 7.3% | 7.3% | 7.3% | 70.1% | 19.2% | 19.2% | 46.6% | 1000 | 150 |
| M694 | 7.5% | 7.5% | 7.5% | 70.1% | 16.6% | 16.6% | 44.8% | 1000 | 100 |
| M695 | 8.6% | 8.6% | 8.6% | 70.1% | 21.8% | 21.8% | 46.5% | 1050 | 200 |
| M696 | 7.0% | 7.0% | 7.0% | 70.1% | 22.6% | 22.6% | 47.4% | 1050 | 200 |
| M697 | 7.1% | 7.1% | 7.1% | 70.1% | 20.0% | 20.0% | 45.2% | 1050 | 150 |
| M698 | 8.4% | 8.4% | 8.4% | 70.1% | 9.3% | 9.3% | 43.0% | 1000 | 100 |
| M699 | 12.7% | 12.7% | 12.7% | 70.1% | 23.4% | 23.4% | 47.4% | 1050 | 250 |
| M700 | 10.6% | 10.6% | 10.6% | 70.1% | 19.4% | 19.4% | 42.9% | 1050 | 150 |
| M701 | 13.2% | 13.2% | 13.2% | 70.1% | 11.3% | 11.3% | 39.2% | 1000 | 150 |
| M702 | 15.2% | 15.2% | 15.2% | 70.1% | 21.5% | 21.5% | 40.2% | 1050 | 150 |
| M703 | 12.3% | 12.3% | 12.3% | 70.1% | 21.2% | 21.2% | 43.0% | 1050 | 200 |
| M704 | 10.6% | 10.6% | 10.6% | 70.1% | 18.7% | 18.7% | 38.9% | 1000 | 150 |

TABLE 11-continued

Compositions and thermodynamic criteria for vanadium carbides

| | | | | | | | | | |
|---|---|---|---|---|---|---|---|---|---|
| M705 | 9.8% | 9.8% | 9.8% | 70.1% | 23.3% | 23.3% | 37.9% | 1050 | 200 |
| M706 | 13.8% | 13.8% | 13.8% | 70.1% | 24.4% | 24.4% | 45.7% | 1050 | 250 |
| M707 | 10.4% | 10.4% | 10.4% | 70.1% | 20.0% | 20.0% | 44.7% | 1050 | 150 |
| M708 | 11.3% | 11.3% | 11.3% | 70.1% | 20.0% | 20.0% | 44.6% | 1050 | 150 |
| M709 | 11.2% | 11.2% | 11.2% | 70.1% | 7.5% | 7.5% | 35.0% | 1000 | 100 |
| M710 | 17.4% | 17.4% | 17.4% | 70.1% | 7.6% | 7.6% | 34.3% | 1000 | 200 |
| M711 | 12.0% | 12.0% | 12.0% | 70.1% | 10.4% | 10.4% | 35.4% | 1000 | 100 |
| M712 | 14.4% | 14.4% | 14.4% | 70.1% | 24.8% | 24.8% | 48.5% | 1050 | 300 |
| M713 | 9.2% | 9.2% | 9.2% | 70.1% | 9.4% | 9.4% | 36.9% | 1000 | 50 |
| M714 | 8.2% | 8.2% | 8.2% | 70.1% | 7.4% | 7.4% | 38.6% | 1000 | 50 |
| M715 | 10.7% | 10.7% | 10.7% | 70.1% | 7.5% | 7.5% | 38.3% | 1000 | 100 |
| M716 | 12.5% | 12.5% | 12.5% | 70.1% | 7.5% | 7.5% | 38.1% | 1000 | 100 |
| M717 | 9.8% | 9.8% | 9.8% | 70.1% | 19.1% | 19.1% | 42.8% | 1050 | 100 |
| M718 | 7.9% | 7.9% | 7.9% | 70.1% | 7.4% | 7.4% | 33.9% | 1000 | 50 |
| M719 | 16.7% | 16.7% | 16.7% | 70.1% | 19.5% | 19.5% | 40.8% | 1050 | 150 |
| M720 | 7.1% | 7.1% | 7.1% | 70.1% | 19.8% | 19.8% | 45.0% | 1050 | 150 |
| M721 | 10.3% | 10.3% | 10.3% | 70.1% | 21.0% | 21.0% | 53.3% | 1050 | 200 |
| M722 | 9.0% | 9.0% | 9.0% | 70.1% | 14.7% | 14.7% | 40.2% | 1050 | 100 |
| M723 | 12.4% | 12.4% | 12.4% | 70.1% | 22.7% | 22.7% | 43.1% | 1050 | 200 |
| M724 | 14.3% | 14.3% | 14.3% | 70.1% | 22.9% | 22.9% | 41.7% | 1050 | 200 |
| M725 | 9.1% | 9.1% | 9.1% | 70.1% | 18.4% | 18.4% | 50.5% | 1050 | 150 |
| M726 | 9.8% | 9.8% | 9.8% | 70.1% | 18.5% | 18.5% | 50.0% | 1000 | 150 |
| M727 | 10.9% | 10.9% | 10.9% | 70.1% | 9.5% | 9.5% | 29.0% | 1000 | 50 |
| M728 | 8.0% | 8.0% | 8.0% | 70.1% | 20.4% | 20.4% | 45.5% | 1050 | 150 |
| M729 | 8.9% | 8.9% | 8.6% | 70.1% | 24.9% | 24.9% | 49.3% | 1100 | 250 |
| M730 | 12.9% | 12.9% | 7.9% | 70.1% | 24.9% | 24.9% | 47.0% | 1100 | 300 |
| M731 | 9.7% | 9.7% | 9.5% | 70.1% | 25.0% | 25.0% | 49.3% | 1100 | 250 |
| M732 | 11.0% | 11.0% | 9.2% | 70.1% | 25.0% | 25.0% | 48.5% | 1100 | 250 |
| M733 | 13.7% | 13.7% | 8.7% | 70.1% | 24.9% | 24.9% | 46.9% | 1100 | 300 |
| M734 | 13.2% | 13.2% | 9.8% | 70.1% | 25.0% | 25.0% | 47.6% | 1100 | 300 |
| M735 | 14.6% | 14.6% | 9.5% | 70.1% | 24.9% | 24.9% | 46.8% | 1100 | 300 |
| M736 | 16.2% | 16.2% | 11.1% | 70.1% | 25.0% | 25.0% | 46.7% | 1100 | 300 |
| M737 | 12.1% | 12.1% | 12.1% | 70.1% | 21.2% | 21.2% | 47.2% | 1050 | 200 |
| M738 | 9.2% | 9.2% | 9.2% | 70.1% | 14.7% | 14.7% | 38.9% | 1050 | 100 |
| M739 | 15.5% | 15.5% | 15.5% | 70.1% | 20.5% | 20.5% | 46.3% | 1050 | 200 |
| M740 | 17.8% | 17.8% | 12.8% | 70.1% | 25.1% | 25.1% | 46.5% | 1100 | 300 |
| M741 | 17.3% | 17.3% | 13.8% | 70.1% | 25.2% | 25.2% | 47.2% | 1100 | 300 |
| M742 | 12.6% | 12.6% | 12.6% | 70.1% | 25.0% | 25.0% | 43.9% | 1050 | 300 |
| M743 | 13.4% | 13.4% | 13.4% | 70.1% | 25.0% | 25.0% | 43.8% | 1050 | 250 |
| M744 | 11.4% | 11.4% | 11.4% | 70.1% | 7.4% | 7.4% | 30.7% | 1000 | 100 |
| M745 | 14.1% | 14.1% | 14.1% | 70.1% | 7.5% | 7.5% | 30.4% | 1000 | 150 |
| M746 | 8.6% | 8.6% | 6.9% | 70.1% | 23.2% | 23.2% | 47.3% | 1100 | 200 |
| M747 | 8.5% | 8.5% | 8.5% | 70.1% | 7.4% | 7.4% | 33.7% | 1000 | 50 |
| M748 | 7.5% | 7.5% | 7.5% | 70.1% | 23.0% | 23.0% | 44.1% | 1050 | 200 |
| M749 | 13.9% | 13.9% | 13.9% | 70.1% | 7.5% | 7.5% | 31.8% | 1000 | 150 |
| M750 | 13.6% | 13.6% | 13.4% | 70.1% | 24.6% | 24.6% | 43.4% | 1100 | 200 |
| M751 | 10.0% | 10.0% | 10.0% | 70.1% | 23.2% | 23.2% | 43.9% | 1050 | 200 |
| M752 | 10.2% | 10.2% | 10.0% | 70.1% | 23.6% | 23.6% | 44.2% | 1100 | 250 |
| M753 | 11.8% | 11.8% | 11.7% | 70.1% | 23.7% | 23.7% | 44.1% | 1100 | 250 |
| M754 | 9.6% | 9.6% | 9.6% | 70.1% | 21.8% | 21.8% | 46.5% | 1100 | 200 |
| M755 | 10.5% | 10.5% | 10.5% | 70.1% | 8.4% | 8.4% | 31.7% | 1050 | 100 |
| M756 | 14.4% | 14.4% | 14.4% | 70.1% | 22.6% | 22.6% | 41.5% | 1050 | 150 |
| M757 | 7.4% | 7.4% | 7.4% | 70.1% | 19.6% | 19.6% | 43.6% | 1050 | 100 |
| M758 | 7.5% | 7.5% | 7.4% | 70.1% | 24.2% | 24.2% | 46.4% | 1100 | 250 |
| M759 | 8.2% | 8.2% | 8.2% | 70.1% | 24.5% | 24.5% | 39.0% | 1050 | 200 |
| M760 | 10.7% | 10.7% | 10.7% | 70.2% | 25.1% | 25.1% | 39.2% | 1050 | 200 |
| M761 | 14.2% | 14.2% | 6.0% | 70.2% | 22.4% | 22.4% | 42.2% | 1100 | 250 |
| M762 | 13.2% | 13.2% | 6.5% | 70.2% | 24.2% | 24.2% | 42.0% | 1100 | 250 |
| M763 | 12.8% | 12.8% | 6.2% | 70.2% | 24.0% | 24.0% | 44.4% | 1100 | 250 |
| M764 | 20.4% | 20.4% | 20.4% | 70.2% | 14.5% | 14.5% | 38.6% | 1050 | 200 |
| M765 | 13.3% | 13.3% | 10.0% | 70.2% | 20.2% | 20.2% | 43.4% | 1100 | 150 |
| M766 | 10.3% | 10.3% | 10.3% | 70.2% | 21.0% | 21.0% | 45.6% | 1050 | 150 |
| M767 | 7.7% | 7.7% | 7.7% | 70.2% | 15.8% | 15.8% | 42.7% | 1050 | 100 |
| M768 | 12.9% | 12.9% | 6.2% | 70.2% | 23.2% | 23.2% | 43.7% | 1100 | 250 |
| M769 | 14.7% | 14.7% | 14.7% | 70.2% | 17.4% | 17.4% | 36.7% | 1050 | 100 |
| M770 | 15.2% | 15.2% | 15.2% | 70.2% | 14.7% | 14.7% | 38.1% | 1050 | 200 |
| M771 | 13.7% | 13.7% | 13.5% | 70.2% | 23.8% | 23.8% | 42.7% | 1100 | 200 |
| M772 | 13.7% | 13.7% | 7.2% | 70.2% | 16.7% | 16.7% | 39.1% | 1100 | 100 |
| M773 | 9.0% | 9.0% | 8.8% | 70.2% | 24.5% | 24.5% | 41.4% | 1100 | 250 |
| M774 | 8.4% | 8.4% | 8.4% | 70.2% | 7.4% | 7.4% | 27.1% | 1050 | 0 |
| M775 | 11.6% | 11.6% | 11.6% | 70.2% | 7.5% | 7.5% | 22.6% | 1050 | −50 |
| M776 | 7.8% | 7.8% | 7.8% | 70.2% | 7.2% | 7.2% | 32.4% | 1050 | 50 |
| M777 | 7.7% | 7.7% | 7.7% | 70.2% | 13.0% | 13.0% | 42.3% | 1050 | 100 |
| M778 | 9.8% | 9.8% | 9.8% | 70.2% | 14.0% | 14.0% | 39.5% | 1050 | 150 |
| M779 | 8.4% | 8.4% | 8.4% | 70.2% | 15.0% | 15.0% | 39.4% | 1050 | 100 |
| M780 | 13.7% | 13.7% | 8.6% | 70.2% | 23.5% | 23.5% | 40.7% | 1100 | 250 |
| M781 | 7.8% | 7.8% | 7.8% | 70.2% | 19.5% | 19.5% | 41.1% | 1050 | 150 |
| M782 | 15.5% | 15.5% | 8.9% | 70.2% | 19.3% | 19.3% | 39.9% | 1100 | 150 |

TABLE 11-continued

Compositions and thermodynamic criteria for vanadium carbides

| | | | | | | | | | |
|---|---|---|---|---|---|---|---|---|---|
| M783 | 9.8% | 9.8% | 9.8% | 70.2% | 16.0% | 16.0% | 38.4% | 1050 | 100 |
| M784 | 9.2% | 9.2% | 8.9% | 70.2% | 24.6% | 24.6% | 40.2% | 1100 | 200 |
| M785 | 10.0% | 10.0% | 9.7% | 70.2% | 24.6% | 24.6% | 40.1% | 1100 | 200 |
| M786 | 7.7% | 7.7% | 7.7% | 70.2% | 19.4% | 19.4% | 40.9% | 1100 | 100 |
| M787 | 17.0% | 17.0% | 17.0% | 70.2% | 12.4% | 12.4% | 36.0% | 1050 | 200 |
| M788 | 12.2% | 12.2% | 8.9% | 70.2% | 19.4% | 19.4% | 39.0% | 1100 | 150 |
| M789 | 8.9% | 8.9% | 8.9% | 70.2% | 14.6% | 14.6% | 35.0% | 1050 | 100 |
| M790 | 16.2% | 16.2% | 13.0% | 70.2% | 15.2% | 15.2% | 37.4% | 1100 | 200 |
| M791 | 13.0% | 13.0% | 11.5% | 70.2% | 16.9% | 16.9% | 39.9% | 1100 | 150 |
| M792 | 19.5% | 19.5% | 19.5% | 70.2% | 22.9% | 22.9% | 46.1% | 1050 | 200 |
| M793 | 13.5% | 13.5% | 10.3% | 70.2% | 18.5% | 18.5% | 40.7% | 1100 | 150 |
| M794 | 14.7% | 14.7% | 13.2% | 70.2% | 17.0% | 17.0% | 39.7% | 1100 | 150 |
| M795 | 16.3% | 16.3% | 14.9% | 70.2% | 14.4% | 14.4% | 38.5% | 1100 | 200 |
| M796 | 14.0% | 14.0% | 14.0% | 70.2% | 12.6% | 12.6% | 33.8% | 1050 | 100 |
| M797 | 7.7% | 7.7% | 7.7% | 70.2% | 14.9% | 14.9% | 36.7% | 1050 | 50 |
| M798 | 8.7% | 8.7% | 8.7% | 70.2% | 7.5% | 7.5% | 33.7% | 1050 | 50 |
| M799 | 11.6% | 11.6% | 11.6% | 70.2% | 7.3% | 7.3% | 29.3% | 1050 | 50 |
| M800 | 17.2% | 17.2% | 17.2% | 70.2% | 21.1% | 21.1% | 43.5% | 1050 | 200 |
| M801 | 7.7% | 7.7% | 7.7% | 70.2% | 7.4% | 7.4% | 35.2% | 1050 | 50 |
| M802 | 20.0% | 20.0% | 18.7% | 70.2% | 11.0% | 11.0% | 35.0% | 1100 | 200 |
| M803 | 10.7% | 10.7% | 10.7% | 70.2% | 7.5% | 7.5% | 22.7% | 1050 | −50 |
| M804 | 17.4% | 17.4% | 16.1% | 70.2% | 10.0% | 10.0% | 34.5% | 1100 | 150 |
| M805 | 8.6% | 8.6% | 8.6% | 70.2% | 11.2% | 11.2% | 45.3% | 1000 | 100 |
| M806 | 16.0% | 16.0% | 11.2% | 70.2% | 12.5% | 12.5% | 34.4% | 1100 | 150 |
| M807 | 9.3% | 9.3% | 7.6% | 70.2% | 19.4% | 19.4% | 38.8% | 1100 | 100 |
| M808 | 16.3% | 16.3% | 16.3% | 70.2% | 13.3% | 13.3% | 39.6% | 1000 | 200 |
| M809 | 15.0% | 15.0% | 10.2% | 70.2% | 11.6% | 11.6% | 35.0% | 1100 | 150 |
| M810 | 15.1% | 15.1% | 10.2% | 70.2% | 14.3% | 14.3% | 36.0% | 1100 | 150 |
| M811 | 8.4% | 8.4% | 8.4% | 70.2% | 7.5% | 7.5% | 35.5% | 1050 | 50 |
| M812 | 13.8% | 13.8% | 13.8% | 70.2% | 10.7% | 10.7% | 34.8% | 1050 | 150 |
| M813 | 10.3% | 10.3% | 7.3% | 70.2% | 8.9% | 8.9% | 32.6% | 1100 | 50 |
| M814 | 11.3% | 11.3% | 10.1% | 70.2% | 8.0% | 8.0% | 33.7% | 1100 | 100 |
| M815 | 7.9% | 7.9% | 7.9% | 70.2% | 7.4% | 7.4% | 33.8% | 1050 | 50 |
| M816 | 8.6% | 8.6% | 8.6% | 70.2% | 9.7% | 9.7% | 34.6% | 1050 | 50 |
| M817 | 13.9% | 13.9% | 7.5% | 70.2% | 9.7% | 9.7% | 32.9% | 1100 | 50 |
| M818 | 10.4% | 10.4% | 10.4% | 70.2% | 19.1% | 19.1% | 43.9% | 1050 | 150 |
| M819 | 7.5% | 7.5% | 7.5% | 70.2% | 22.5% | 22.5% | 43.6% | 1050 | 200 |
| M820 | 19.5% | 19.5% | 14.8% | 70.2% | 8.1% | 8.1% | 31.3% | 1100 | 150 |
| M821 | 9.0% | 9.0% | 9.0% | 70.2% | 24.2% | 24.2% | 44.9% | 1050 | 250 |
| M822 | 17.1% | 17.1% | 14.1% | 70.2% | 9.0% | 9.0% | 33.1% | 1100 | 150 |
| M823 | 11.5% | 11.5% | 11.5% | 70.2% | 24.3% | 24.3% | 44.7% | 1050 | 250 |
| M824 | 15.7% | 15.7% | 15.7% | 70.2% | 22.4% | 22.4% | 43.2% | 1050 | 250 |
| M825 | 10.7% | 10.7% | 10.7% | 70.2% | 16.5% | 16.5% | 40.3% | 1050 | 150 |
| M826 | 15.2% | 15.2% | 15.2% | 70.2% | 7.6% | 7.6% | 29.9% | 1050 | 150 |
| M827 | 19.2% | 19.2% | 16.2% | 70.2% | 8.1% | 8.1% | 30.7% | 1100 | 150 |
| M828 | 12.7% | 12.7% | 7.9% | 70.2% | 12.5% | 12.5% | 33.5% | 1100 | 100 |
| M829 | 12.6% | 12.6% | 11.2% | 70.2% | 12.6% | 12.6% | 33.5% | 1100 | 100 |
| M830 | 9.6% | 9.6% | 9.6% | 70.2% | 9.7% | 9.7% | 33.2% | 1050 | 50 |
| M831 | 8.6% | 8.6% | 8.6% | 70.2% | 11.9% | 11.9% | 28.6% | 1050 | 0 |
| M832 | 7.3% | 7.3% | 7.3% | 70.2% | 24.0% | 24.0% | 46.3% | 1050 | 250 |
| M833 | 16.6% | 16.6% | 16.4% | 70.2% | 24.7% | 24.7% | 45.5% | 1100 | 250 |
| M834 | 7.5% | 7.5% | 7.5% | 70.2% | 20.9% | 20.9% | 50.5% | 1050 | 150 |
| M835 | 17.0% | 17.0% | 11.9% | 70.2% | 25.1% | 25.1% | 46.6% | 1100 | 300 |
| M836 | 20.0% | 20.0% | 20.0% | 70.2% | 7.6% | 7.6% | 33.6% | 1050 | 200 |
| M837 | 10.5% | 10.5% | 10.5% | 70.2% | 8.9% | 8.9% | 25.5% | 1050 | −50 |
| M838 | 9.8% | 9.8% | 9.8% | 70.2% | 17.5% | 17.5% | 51.0% | 1050 | 100 |
| M839 | 17.2% | 17.2% | 17.2% | 70.2% | 11.5% | 11.5% | 39.5% | 1000 | 200 |
| M840 | 14.5% | 14.5% | 12.8% | 70.2% | 22.0% | 22.0% | 44.1% | 1100 | 200 |
| M841 | 11.5% | 11.5% | 11.5% | 70.2% | 21.2% | 21.2% | 36.7% | 1050 | 100 |
| M842 | 8.5% | 8.5% | 8.5% | 70.2% | 24.6% | 24.6% | 36.4% | 1050 | 200 |
| M843 | 10.6% | 10.6% | 10.6% | 70.2% | 20.3% | 20.3% | 45.3% | 1050 | 150 |
| M844 | 7.8% | 7.8% | 7.8% | 70.2% | 17.4% | 17.4% | 48.2% | 1050 | 100 |
| M845 | 13.0% | 13.0% | 9.9% | 70.2% | 9.0% | 9.0% | 25.5% | 1100 | 50 |
| M846 | 9.7% | 9.7% | 9.7% | 70.2% | 13.9% | 13.9% | 45.7% | 1050 | 100 |
| M847 | 12.3% | 12.3% | 12.3% | 70.2% | 7.4% | 7.4% | 30.6% | 1050 | 100 |
| M848 | 8.9% | 8.9% | 8.9% | 70.2% | 20.1% | 20.1% | 54.7% | 1000 | 200 |
| M849 | 13.2% | 13.2% | 13.2% | 70.2% | 17.7% | 17.7% | 44.6% | 1050 | 150 |
| M850 | 14.7% | 14.7% | 14.7% | 70.2% | 20.4% | 20.4% | 44.6% | 1100 | 200 |
| M851 | 8.0% | 8.0% | 8.0% | 70.2% | 20.1% | 20.1% | 46.9% | 1050 | 150 |
| M852 | 9.7% | 9.7% | 9.7% | 70.2% | 20.2% | 20.2% | 46.7% | 1050 | 150 |
| M853 | 7.7% | 7.7% | 7.7% | 70.2% | 18.3% | 18.3% | 48.8% | 1050 | 100 |
| M854 | 8.1% | 8.1% | 8.1% | 70.2% | 19.2% | 19.2% | 46.3% | 1050 | 100 |
| M855 | 12.7% | 12.7% | 11.0% | 70.2% | 21.8% | 21.8% | 45.5% | 1100 | 200 |
| M856 | 9.0% | 9.0% | 9.0% | 70.2% | 13.0% | 13.0% | 32.2% | 1050 | 50 |
| M857 | 10.3% | 10.3% | 6.8% | 70.2% | 24.1% | 24.1% | 44.8% | 1100 | 250 |
| M858 | 17.0% | 17.0% | 17.0% | 70.2% | 20.4% | 20.4% | 44.2% | 1050 | 200 |
| M859 | 13.1% | 13.1% | 13.1% | 70.2% | 14.0% | 14.0% | 45.3% | 1050 | 150 |
| M860 | 10.7% | 10.7% | 10.7% | 70.2% | 24.3% | 24.3% | 38.4% | 1100 | 200 |

TABLE 11-continued

Compositions and thermodynamic criteria for vanadium carbides

| | | | | | | | | |
|---|---|---|---|---|---|---|---|---|
| M861 | 8.4% | 8.4% | 8.4% | 70.2% | 9.3% | 9.3% | 42.8% | 1050 | 100 |
| M862 | 19.5% | 19.5% | 19.5% | 70.2% | 14.5% | 14.5% | 38.7% | 1100 | 200 |
| M863 | 9.8% | 9.8% | 9.8% | 70.2% | 14.0% | 14.0% | 44.3% | 1050 | 100 |
| M864 | 8.0% | 8.0% | 8.0% | 70.2% | 13.9% | 13.9% | 45.8% | 1050 | 100 |
| M865 | 7.8% | 7.8% | 7.8% | 70.2% | 21.7% | 21.7% | 46.6% | 1050 | 150 |
| M866 | 7.6% | 7.6% | 7.6% | 70.2% | 21.1% | 21.1% | 43.5% | 1050 | 150 |
| M867 | 7.7% | 7.7% | 7.7% | 70.2% | 23.4% | 23.4% | 48.0% | 1050 | 200 |
| M868 | 9.4% | 9.4% | 9.4% | 70.2% | 22.6% | 22.6% | 47.2% | 1050 | 200 |
| M869 | 13.4% | 13.4% | 13.4% | 70.2% | 16.1% | 16.1% | 39.6% | 1100 | 150 |
| M870 | 9.1% | 9.1% | 9.1% | 70.2% | 18.5% | 18.5% | 42.4% | 1100 | 100 |
| M871 | 12.6% | 12.6% | 10.8% | 70.2% | 22.0% | 22.0% | 40.6% | 1100 | 200 |
| M872 | 14.2% | 14.2% | 6.0% | 70.2% | 23.2% | 23.2% | 42.9% | 1100 | 250 |
| M873 | 12.5% | 12.5% | 12.5% | 70.2% | 21.3% | 21.3% | 43.1% | 1050 | 200 |
| M874 | 7.8% | 7.8% | 7.8% | 70.2% | 11.8% | 11.8% | 35.2% | 1050 | 100 |
| M875 | 8.8% | 8.8% | 8.5% | 70.2% | 24.7% | 24.7% | 36.4% | 1100 | 200 |
| M876 | 15.0% | 15.0% | 15.0% | 70.2% | 14.8% | 14.8% | 31.7% | 1050 | 50 |
| M877 | 7.1% | 7.1% | 7.1% | 70.2% | 22.6% | 22.6% | 46.2% | 1050 | 200 |
| M878 | 8.1% | 8.1% | 8.1% | 70.2% | 7.2% | 7.2% | 29.7% | 1050 | 50 |
| M879 | 10.2% | 10.2% | 9.9% | 70.2% | 24.7% | 24.7% | 38.8% | 1100 | 200 |
| M880 | 10.2% | 10.2% | 10.2% | 70.2% | 9.4% | 9.4% | 41.2% | 1050 | 100 |
| M881 | 11.4% | 11.4% | 6.6% | 70.2% | 17.5% | 17.5% | 40.7% | 1100 | 100 |
| M882 | 11.0% | 11.0% | 11.0% | 70.2% | 9.4% | 9.4% | 41.1% | 1050 | 100 |
| M883 | 7.4% | 7.4% | 7.4% | 70.2% | 21.8% | 21.8% | 43.0% | 1050 | 150 |
| M884 | 13.4% | 13.4% | 13.4% | 70.2% | 7.3% | 7.3% | 29.0% | 1050 | 50 |
| M885 | 15.5% | 15.5% | 15.5% | 70.2% | 7.5% | 7.5% | 34.2% | 1050 | 150 |
| M886 | 14.3% | 14.3% | 14.3% | 70.2% | 7.3% | 7.3% | 28.9% | 1050 | 50 |
| M887 | 18.3% | 18.3% | 17.0% | 70.2% | 10.0% | 10.0% | 34.4% | 1100 | 200 |
| M888 | 10.4% | 10.4% | 10.4% | 70.2% | 12.2% | 12.2% | 39.8% | 1050 | 100 |
| M889 | 13.0% | 13.0% | 13.0% | 70.2% | 12.3% | 12.3% | 39.6% | 1050 | 150 |
| M890 | 19.1% | 19.1% | 19.1% | 70.2% | 7.6% | 7.6% | 33.8% | 1050 | 200 |
| M891 | 10.1% | 10.1% | 10.1% | 70.2% | 19.2% | 19.2% | 33.7% | 1100 | 50 |
| M892 | 10.2% | 10.2% | 10.2% | 70.2% | 7.4% | 7.4% | 41.3% | 1050 | 50 |
| M893 | 16.6% | 16.6% | 15.1% | 70.2% | 13.5% | 13.5% | 36.4% | 1100 | 150 |
| M894 | 14.7% | 14.7% | 14.7% | 70.2% | 12.3% | 12.3% | 39.4% | 1050 | 200 |
| M895 | 14.3% | 14.3% | 14.3% | 70.2% | 13.2% | 13.2% | 36.8% | 1050 | 200 |
| M896 | 14.2% | 14.2% | 14.2% | 70.2% | 22.2% | 22.2% | 41.1% | 1050 | 200 |
| M897 | 8.9% | 8.9% | 8.9% | 70.2% | 7.4% | 7.4% | 38.2% | 1050 | 50 |
| M898 | 11.8% | 11.8% | 11.8% | 70.2% | 18.0% | 18.0% | 33.7% | 1100 | 50 |
| M899 | 11.2% | 11.2% | 11.2% | 70.2% | 20.0% | 20.0% | 44.6% | 1100 | 150 |
| M900 | 12.9% | 12.9% | 12.9% | 70.2% | 20.0% | 20.0% | 44.4% | 1100 | 150 |
| M901 | 14.1% | 14.1% | 12.8% | 70.2% | 9.0% | 9.0% | 32.8% | 1100 | 100 |
| M902 | 11.9% | 11.9% | 11.9% | 70.2% | 22.5% | 22.5% | 46.7% | 1100 | 200 |
| M903 | 5.3% | 5.3% | 5.3% | 70.2% | 25.8% | 25.8% | 35.5% | 1050 | 200 |
| M904 | 15.8% | 15.8% | 14.6% | 70.2% | 9.0% | 9.0% | 32.5% | 1100 | 150 |
| M905 | 9.4% | 9.4% | 9.4% | 70.2% | 11.3% | 11.3% | 44.8% | 1000 | 100 |
| M906 | 5.2% | 5.2% | 5.2% | 70.2% | 29.1% | 29.1% | 38.6% | 1050 | 300 |
| M907 | 20.0% | 20.0% | 20.0% | 70.2% | 7.6% | 7.6% | 33.6% | 1050 | 200 |
| M908 | 10.4% | 10.4% | 10.4% | 70.2% | 21.1% | 21.1% | 51.6% | 1050 | 200 |
| M909 | 11.3% | 11.3% | 11.3% | 70.2% | 9.2% | 9.2% | 25.6% | 1050 | 0 |
| M910 | 15.9% | 15.9% | 14.6% | 70.2% | 8.1% | 8.1% | 31.7% | 1100 | 150 |
| M911 | 12.0% | 12.0% | 7.1% | 70.2% | 15.1% | 15.1% | 34.6% | 1100 | 50 |
| M912 | 10.3% | 10.3% | 10.3% | 70.2% | 19.5% | 19.5% | 37.9% | 1050 | 150 |
| M913 | 7.7% | 7.7% | 7.7% | 70.2% | 7.4% | 7.4% | 35.1% | 1050 | 50 |
| M914 | 10.3% | 10.3% | 10.3% | 70.2% | 7.5% | 7.5% | 34.8% | 1050 | 100 |
| M915 | 8.5% | 8.5% | 8.5% | 70.2% | 10.3% | 10.3% | 34.5% | 1050 | 0 |
| M916 | 7.8% | 7.8% | 7.8% | 70.2% | 13.1% | 13.1% | 35.0% | 1050 | 50 |
| M917 | 12.6% | 12.6% | 12.6% | 70.2% | 17.8% | 17.8% | 38.5% | 1050 | 150 |
| M918 | 7.8% | 7.8% | 7.8% | 70.2% | 10.3% | 10.3% | 34.2% | 1050 | 50 |
| M919 | 10.4% | 10.4% | 10.4% | 70.2% | 10.4% | 10.4% | 33.9% | 1050 | 50 |
| M920 | 10.0% | 10.0% | 10.0% | 70.2% | 14.2% | 14.2% | 35.5% | 1050 | 50 |
| M921 | 18.0% | 18.0% | 9.9% | 70.2% | 8.0% | 8.0% | 30.1% | 1100 | 100 |
| M922 | 9.1% | 9.1% | 9.1% | 70.2% | 9.4% | 9.4% | 29.0% | 1050 | 0 |
| M923 | 8.2% | 8.2% | 8.2% | 70.2% | 9.7% | 9.7% | 30.7% | 1100 | 0 |
| M924 | 13.2% | 13.2% | 13.2% | 70.2% | 23.6% | 23.6% | 43.8% | 1100 | 250 |
| M925 | 12.6% | 12.6% | 12.6% | 70.2% | 9.4% | 9.4% | 42.1% | 1050 | 150 |
| M926 | 18.8% | 18.8% | 10.7% | 70.2% | 8.9% | 8.9% | 30.8% | 1100 | 100 |
| M927 | 10.0% | 10.0% | 10.0% | 70.2% | 14.7% | 14.7% | 38.8% | 1050 | 100 |
| M928 | 17.5% | 17.5% | 17.5% | 70.2% | 14.9% | 14.9% | 39.2% | 1050 | 200 |
| M929 | 5.2% | 5.2% | 5.2% | 70.2% | 32.0% | 32.0% | 41.5% | 1100 | 350 |
| M930 | 13.4% | 13.4% | 13.4% | 70.2% | 13.9% | 13.9% | 37.6% | 1050 | 150 |
| M931 | 12.1% | 12.1% | 12.1% | 70.2% | 9.5% | 9.5% | 25.8% | 1050 | 50 |
| M932 | 14.6% | 14.6% | 14.6% | 70.2% | 9.4% | 9.4% | 33.3% | 1050 | 150 |
| M933 | 11.8% | 11.8% | 11.8% | 70.2% | 8.5% | 8.5% | 27.9% | 1050 | 50 |
| M934 | 15.9% | 15.9% | 12.9% | 70.2% | 9.0% | 9.0% | 29.2% | 1100 | 100 |
| M935 | 14.9% | 14.9% | 13.6% | 70.2% | 8.1% | 8.1% | 26.4% | 1100 | 50 |
| M936 | 10.6% | 10.6% | 10.6% | 70.2% | 24.0% | 24.0% | 38.1% | 1050 | 200 |
| M937 | 9.3% | 9.3% | 9.3% | 70.3% | 10.2% | 10.2% | 34.8% | 1050 | 50 |
| M938 | 5.3% | 5.3% | 5.3% | 70.3% | 32.1% | 32.1% | 40.2% | 1100 | 350 |

TABLE 11-continued

Compositions and thermodynamic criteria for vanadium carbides

| | | | | | | | | |
|---|---|---|---|---|---|---|---|---|
| M939 | 8.9% | 8.9% | 8.9% | 70.3% | 22.1% | 22.1% | 45.6% | 1100 | 200 |
| M940 | 8.8% | 8.8% | 8.8% | 70.3% | 20.4% | 20.4% | 45.4% | 1100 | 150 |
| M941 | 8.4% | 8.4% | 8.4% | 70.3% | 12.0% | 12.0% | 36.6% | 1050 | 100 |
| M942 | 13.8% | 13.8% | 13.8% | 70.3% | 8.4% | 8.4% | 32.6% | 1050 | 150 |
| M943 | 10.3% | 10.3% | 10.3% | 70.3% | 7.4% | 7.4% | 32.2% | 1050 | 100 |
| M944 | 7.2% | 7.2% | 7.0% | 70.3% | 24.8% | 24.8% | 49.4% | 1150 | 250 |
| M945 | 16.7% | 16.7% | 16.7% | 70.3% | 7.5% | 7.5% | 30.0% | 1050 | 100 |
| M946 | 17.6% | 17.6% | 17.6% | 70.3% | 7.5% | 7.5% | 29.9% | 1050 | 100 |
| M947 | 8.0% | 8.0% | 7.8% | 70.3% | 24.9% | 24.9% | 49.4% | 1150 | 250 |
| M948 | 8.8% | 8.8% | 8.6% | 70.3% | 24.9% | 24.9% | 49.3% | 1150 | 250 |
| M949 | 12.3% | 12.3% | 8.9% | 70.3% | 24.9% | 24.9% | 47.6% | 1150 | 250 |
| M950 | 10.4% | 10.4% | 10.2% | 70.3% | 25.0% | 25.0% | 49.2% | 1150 | 250 |
| M951 | 5.4% | 5.4% | 5.4% | 70.3% | 25.6% | 25.6% | 35.3% | 1100 | 200 |
| M952 | 8.5% | 8.5% | 8.5% | 70.3% | 18.3% | 18.3% | 39.6% | 1100 | 100 |
| M953 | 16.7% | 16.7% | 16.7% | 70.3% | 7.6% | 7.6% | 36.9% | 1050 | 150 |
| M954 | 7.3% | 7.3% | 7.3% | 70.3% | 23.7% | 23.7% | 46.0% | 1100 | 200 |
| M955 | 15.7% | 15.7% | 10.6% | 70.3% | 24.3% | 24.3% | 43.6% | 1150 | 250 |
| M956 | 13.0% | 13.0% | 13.0% | 70.3% | 20.0% | 20.0% | 38.0% | 1100 | 100 |
| M957 | 10.9% | 10.9% | 7.6% | 70.3% | 22.5% | 22.5% | 44.5% | 1150 | 200 |
| M958 | 9.0% | 9.0% | 8.9% | 70.3% | 22.6% | 22.6% | 46.0% | 1150 | 200 |
| M959 | 13.6% | 13.6% | 11.8% | 70.3% | 24.3% | 24.3% | 46.3% | 1150 | 250 |
| M960 | 20.6% | 20.6% | 19.2% | 70.3% | 14.6% | 14.6% | 38.1% | 1100 | 200 |
| M961 | 7.3% | 7.3% | 7.3% | 70.3% | 17.0% | 17.0% | 42.5% | 1100 | 100 |
| M962 | 14.2% | 14.2% | 12.8% | 70.3% | 9.0% | 9.0% | 26.0% | 1100 | 0 |
| M963 | 9.1% | 9.1% | 9.1% | 70.3% | 7.4% | 7.4% | 28.3% | 1050 | 50 |
| M964 | 15.5% | 15.5% | 15.5% | 70.3% | 7.5% | 7.5% | 26.1% | 1050 | 50 |
| M965 | 9.9% | 9.9% | 6.5% | 70.3% | 24.8% | 24.8% | 47.9% | 1150 | 250 |
| M966 | 11.8% | 11.8% | 11.6% | 70.3% | 24.4% | 24.4% | 44.8% | 1150 | 250 |
| M967 | 21.5% | 21.5% | 21.5% | 70.3% | 5.4% | 5.4% | 33.0% | 1050 | 200 |
| M968 | 7.5% | 7.5% | 7.5% | 70.3% | 14.4% | 14.4% | 38.9% | 1100 | 100 |
| M969 | 5.3% | 5.3% | 5.3% | 70.3% | 28.6% | 28.6% | 38.2% | 1100 | 250 |
| M970 | 12.4% | 12.4% | 9.0% | 70.3% | 22.5% | 22.5% | 45.5% | 1150 | 200 |
| M971 | 10.1% | 10.1% | 10.0% | 70.3% | 23.6% | 23.6% | 44.2% | 1150 | 200 |
| M972 | 12.3% | 12.3% | 10.5% | 70.3% | 23.6% | 23.6% | 43.3% | 1150 | 250 |
| M973 | 12.1% | 12.1% | 7.2% | 70.3% | 21.6% | 21.6% | 44.2% | 1150 | 200 |
| M974 | 12.6% | 12.6% | 12.4% | 70.3% | 23.7% | 23.7% | 44.0% | 1150 | 250 |
| M975 | 7.6% | 7.6% | 7.6% | 70.3% | 24.7% | 24.7% | 44.4% | 1100 | 250 |
| M976 | 8.4% | 8.4% | 8.4% | 70.3% | 24.7% | 24.7% | 44.3% | 1100 | 250 |
| M977 | 12.7% | 12.7% | 12.7% | 70.3% | 19.0% | 19.0% | 39.8% | 1100 | 150 |
| M978 | 18.7% | 18.7% | 18.7% | 70.3% | 14.8% | 14.8% | 37.7% | 1100 | 200 |
| M979 | 7.5% | 7.5% | 7.5% | 70.3% | 9.9% | 9.9% | 36.2% | 1100 | 50 |
| M980 | 13.0% | 13.0% | 13.0% | 70.3% | 15.0% | 15.0% | 44.1% | 1050 | 150 |
| M981 | 14.1% | 14.1% | 10.9% | 70.3% | 19.3% | 19.3% | 42.5% | 1150 | 150 |
| M982 | 12.3% | 12.3% | 7.3% | 70.3% | 22.5% | 22.5% | 43.7% | 1150 | 200 |
| M983 | 10.7% | 10.7% | 10.7% | 70.3% | 7.2% | 7.2% | 29.4% | 1100 | 0 |
| M984 | 10.8% | 10.8% | 10.8% | 70.3% | 7.5% | 7.5% | 21.3% | 1050 | −50 |
| M985 | 17.0% | 17.0% | 17.0% | 70.3% | 7.3% | 7.3% | 28.5% | 1100 | 100 |
| M986 | 9.2% | 9.2% | 7.4% | 70.3% | 24.3% | 24.3% | 43.1% | 1150 | 250 |
| M987 | 10.0% | 10.0% | 8.2% | 70.3% | 24.3% | 24.3% | 43.0% | 1150 | 250 |
| M988 | 19.7% | 19.7% | 18.1% | 70.3% | 17.1% | 17.1% | 40.4% | 1150 | 200 |
| M989 | 8.4% | 8.4% | 8.4% | 70.3% | 15.0% | 15.0% | 39.4% | 1100 | 100 |
| M990 | 5.3% | 5.3% | 5.3% | 70.3% | 31.5% | 31.5% | 40.9% | 1100 | 350 |
| M991 | 5.4% | 5.4% | 1.6% | 70.3% | 32.2% | 32.2% | 40.4% | 1150 | 350 |
| M992 | 12.7% | 12.7% | 12.7% | 70.3% | 7.5% | 7.5% | 40.6% | 1050 | 100 |
| M993 | 14.8% | 14.8% | 14.8% | 70.3% | 7.3% | 7.3% | 31.5% | 1050 | 100 |
| M994 | 16.6% | 16.6% | 16.6% | 70.3% | 7.3% | 7.3% | 31.3% | 1050 | 100 |
| M995 | 20.2% | 20.2% | 20.2% | 70.3% | 7.4% | 7.4% | 30.8% | 1050 | 150 |
| M996 | 10.2% | 10.2% | 10.2% | 70.3% | 19.5% | 19.5% | 40.6% | 1100 | 100 |
| M997 | 17.0% | 17.0% | 10.4% | 70.3% | 21.8% | 21.8% | 41.8% | 1150 | 200 |
| M998 | 12.6% | 12.6% | 10.9% | 70.3% | 19.5% | 19.5% | 38.4% | 1150 | 100 |
| M999 | 12.4% | 12.4% | 10.8% | 70.3% | 19.5% | 19.5% | 39.6% | 1150 | 150 |
| M1000 | 15.2% | 15.2% | 8.6% | 70.3% | 21.7% | 21.7% | 43.2% | 1150 | 200 |
| M1001 | 16.6% | 16.6% | 8.4% | 70.3% | 23.3% | 23.3% | 42.7% | 1100 | 250 |
| M1002 | 10.4% | 10.4% | 10.4% | 70.3% | 14.6% | 14.6% | 36.1% | 1100 | 100 |
| M1003 | 12.1% | 12.1% | 10.5% | 70.3% | 18.5% | 18.5% | 41.4% | 1150 | 150 |
| M1004 | 16.3% | 16.3% | 6.6% | 70.3% | 22.5% | 22.5% | 41.5% | 1100 | 250 |
| M1005 | 13.3% | 13.3% | 13.3% | 70.3% | 9.8% | 9.8% | 31.4% | 1100 | 100 |
| M1006 | 7.7% | 7.7% | 7.7% | 70.3% | 10.6% | 10.6% | 35.5% | 1100 | 50 |
| M1007 | 19.0% | 19.0% | 17.9% | 70.3% | 4.4% | 4.4% | 32.1% | 1150 | 150 |
| M1008 | 16.2% | 16.2% | 8.0% | 70.3% | 14.1% | 14.1% | 34.5% | 1150 | 100 |
| M1009 | 20.8% | 20.8% | 20.8% | 70.3% | 7.7% | 7.7% | 33.0% | 1050 | 200 |
| M1010 | 13.9% | 13.9% | 13.9% | 70.3% | 7.9% | 7.9% | 32.3% | 1100 | 150 |
| M1011 | 12.3% | 12.3% | 9.0% | 70.3% | 15.1% | 15.1% | 35.2% | 1150 | 100 |
| M1012 | 10.1% | 10.1% | 6.9% | 70.3% | 14.1% | 14.1% | 38.5% | 1150 | 100 |
| M1013 | 9.6% | 9.6% | 9.6% | 70.3% | 14.7% | 14.7% | 28.3% | 1100 | −50 |
| M1014 | 8.2% | 8.2% | 8.2% | 70.3% | 14.2% | 14.2% | 33.5% | 1100 | 50 |
| M1015 | 12.2% | 12.2% | 12.2% | 70.3% | 9.8% | 9.8% | 32.8% | 1100 | 100 |
| M1016 | 13.5% | 13.5% | 8.8% | 70.3% | 8.9% | 8.9% | 31.5% | 1150 | 50 |

TABLE 11-continued

Compositions and thermodynamic criteria for vanadium carbides

| | | | | | | | | | |
|---|---|---|---|---|---|---|---|---|---|
| M1017 | 11.7% | 11.7% | 7.0% | 70.3% | 9.7% | 9.7% | 32.5% | 1150 | 50 |
| M1018 | 13.5% | 13.5% | 8.7% | 70.3% | 9.8% | 9.8% | 32.3% | 1150 | 50 |
| M1019 | 9.3% | 9.3% | 9.3% | 70.3% | 7.2% | 7.2% | 20.0% | 1100 | −50 |
| M1020 | 11.2% | 11.2% | 8.0% | 70.3% | 11.6% | 11.6% | 28.2% | 1150 | 0 |
| M1021 | 5.3% | 5.3% | 1.8% | 70.3% | 19.4% | 19.4% | 28.4% | 1150 | 50 |
| M1022 | 9.6% | 9.6% | 9.6% | 70.3% | 7.5% | 7.5% | 41.8% | 1000 | 100 |
| M1023 | 11.7% | 11.7% | 10.2% | 70.3% | 9.9% | 9.9% | 25.8% | 1150 | 0 |
| M1024 | 16.2% | 16.2% | 6.4% | 70.3% | 9.7% | 9.7% | 28.7% | 1150 | 50 |
| M1025 | 17.5% | 17.5% | 17.5% | 70.3% | 15.0% | 15.0% | 48.6% | 1000 | 200 |
| M1026 | 19.5% | 19.5% | 19.5% | 70.3% | 25.0% | 25.0% | 50.5% | 1100 | 300 |
| M1027 | 17.0% | 17.0% | 17.0% | 70.3% | 14.3% | 14.3% | 39.7% | 1050 | 200 |
| M1028 | 18.8% | 18.8% | 18.7% | 70.3% | 24.7% | 24.7% | 46.5% | 1150 | 250 |
| M1029 | 20.8% | 20.8% | 20.8% | 70.3% | 7.7% | 7.7% | 33.0% | 1050 | 200 |
| M1030 | 16.2% | 16.2% | 6.3% | 70.3% | 10.6% | 10.6% | 29.5% | 1150 | 50 |
| M1031 | 8.6% | 8.6% | 8.6% | 70.3% | 12.2% | 12.2% | 44.0% | 1050 | 50 |
| M1032 | 16.6% | 16.6% | 8.4% | 70.3% | 23.3% | 23.3% | 42.7% | 1150 | 250 |
| M1033 | 13.6% | 13.6% | 13.6% | 70.3% | 24.9% | 24.9% | 46.3% | 1100 | 250 |
| M1034 | 5.3% | 5.3% | 5.3% | 70.4% | 29.4% | 29.4% | 37.9% | 1050 | 300 |
| M1035 | 13.3% | 13.3% | 13.3% | 70.4% | 9.5% | 9.5% | 39.6% | 1050 | 150 |
| M1036 | 20.0% | 20.0% | 20.0% | 70.4% | 24.0% | 24.0% | 46.9% | 1050 | 300 |
| M1037 | 12.0% | 12.0% | 12.0% | 70.4% | 18.6% | 18.6% | 48.5% | 1050 | 150 |
| M1038 | 9.9% | 9.9% | 9.9% | 70.4% | 10.5% | 10.5% | 22.9% | 1050 | −50 |
| M1039 | 8.7% | 8.7% | 8.7% | 70.4% | 8.4% | 8.4% | 46.2% | 1000 | 100 |
| M1040 | 9.0% | 9.0% | 9.0% | 70.4% | 18.6% | 18.6% | 49.7% | 1000 | 150 |
| M1041 | 12.4% | 12.4% | 12.4% | 70.4% | 7.3% | 7.3% | 22.3% | 1050 | 0 |
| M1042 | 11.8% | 11.8% | 11.8% | 70.4% | 17.8% | 17.8% | 32.1% | 1050 | 50 |
| M1043 | 17.0% | 17.0% | 17.0% | 70.4% | 9.0% | 9.0% | 28.8% | 1050 | 100 |
| M1044 | 13.7% | 13.7% | 10.5% | 70.4% | 24.6% | 24.6% | 41.0% | 1100 | 200 |
| M1045 | 15.0% | 15.0% | 15.0% | 70.5% | 15.2% | 15.2% | 30.6% | 1050 | 50 |
| M1046 | 11.3% | 11.3% | 11.3% | 70.5% | 15.0% | 15.0% | 32.4% | 1050 | 0 |
| M1047 | 17.2% | 17.2% | 17.2% | 70.5% | 15.0% | 15.0% | 39.9% | 1050 | 200 |
| M1048 | 21.6% | 21.6% | 21.6% | 70.5% | 7.5% | 7.5% | 34.1% | 1050 | 150 |
| M1049 | 5.4% | 5.4% | 5.4% | 70.5% | 7.4% | 7.4% | 21.0% | 1050 | −50 |
| M1050 | 12.4% | 12.4% | 12.4% | 70.5% | 7.5% | 7.5% | 22.4% | 1050 | 0 |
| M1051 | 11.2% | 11.2% | 11.2% | 70.5% | 20.5% | 20.5% | 46.6% | 1050 | 200 |
| M1052 | 5.1% | 5.1% | 5.1% | 70.5% | 14.9% | 14.9% | 27.9% | 1050 | −50 |
| M1053 | 19.3% | 19.3% | 19.3% | 70.5% | 15.2% | 15.2% | 36.8% | 1050 | 150 |
| M1054 | 10.1% | 10.1% | 10.1% | 70.5% | 7.3% | 7.3% | 19.9% | 1050 | −50 |
| M1055 | 5.3% | 5.3% | 5.3% | 70.5% | 20.4% | 20.4% | 30.4% | 1100 | 50 |
| M1056 | 15.1% | 15.1% | 15.1% | 70.5% | 7.2% | 7.2% | 27.4% | 1100 | 50 |
| M1057 | 9.6% | 9.6% | 9.6% | 70.5% | 14.4% | 14.4% | 26.7% | 1050 | −50 |
| M1058 | 26.6% | 26.6% | 26.6% | 70.5% | 16.3% | 16.3% | 44.9% | 1050 | 350 |
| M1059 | 14.2% | 14.2% | 14.2% | 70.5% | 25.1% | 25.1% | 41.3% | 1100 | 200 |
| M1060 | 5.4% | 5.4% | 5.4% | 70.5% | 19.9% | 19.9% | 29.9% | 1100 | 50 |
| M1061 | 5.2% | 5.2% | 5.2% | 70.5% | 14.5% | 14.5% | 27.6% | 1100 | −50 |
| M1062 | 19.2% | 19.2% | 19.2% | 70.5% | 15.4% | 15.4% | 38.7% | 1000 | 200 |
| M1063 | 5.4% | 5.4% | 5.4% | 70.5% | 7.0% | 7.0% | 20.5% | 1100 | −50 |
| M1064 | 12.4% | 12.4% | 11.1% | 70.5% | 15.2% | 15.2% | 33.4% | 1050 | 50 |
| M1065 | 19.8% | 19.8% | 12.0% | 70.5% | 20.1% | 20.1% | 43.4% | 1150 | 200 |
| M1066 | 17.7% | 17.7% | 16.3% | 70.5% | 20.3% | 20.3% | 46.3% | 1150 | 200 |
| M1067 | 6.8% | 6.8% | 5.3% | 70.5% | 15.2% | 15.2% | 24.8% | 1150 | −50 |
| M1068 | 6.1% | 6.1% | 4.6% | 70.5% | 20.3% | 20.3% | 35.0% | 1150 | 50 |
| M1069 | 5.3% | 5.3% | 0.6% | 70.5% | 16.6% | 16.6% | 33.3% | 1150 | −50 |
| M1070 | 5.2% | 5.2% | 0.6% | 70.5% | 18.3% | 18.3% | 34.8% | 1150 | 0 |
| M1071 | 5.2% | 5.2% | 0.5% | 70.5% | 21.6% | 21.6% | 37.9% | 1150 | 50 |
| M1072 | 15.0% | 15.0% | 12.1% | 70.5% | 14.3% | 14.3% | 35.6% | 1150 | 100 |
| M1073 | 9.6% | 9.6% | 9.6% | 70.5% | 7.6% | 7.6% | 37.8% | 1000 | 50 |
| M1074 | 27.2% | 27.2% | 27.2% | 70.5% | 12.5% | 12.5% | 41.0% | 1050 | 200 |
| M1075 | 16.7% | 16.7% | 16.7% | 70.5% | 15.2% | 15.2% | 43.4% | 1050 | 200 |
| M1076 | 5.4% | 5.4% | 5.4% | 70.5% | 7.5% | 7.5% | 21.0% | 1100 | 0 |
| M1077 | 10.0% | 10.0% | 10.0% | 70.5% | 11.3% | 11.3% | 47.3% | 1050 | 100 |
| M1078 | 26.8% | 26.8% | 26.8% | 70.5% | 16.3% | 16.3% | 44.4% | 1100 | 300 |
| M1079 | 4.0% | 4.0% | 2.1% | 70.5% | 30.2% | 30.2% | 36.8% | 1150 | 300 |
| M1080 | 9.2% | 9.2% | 9.2% | 70.5% | 19.1% | 19.1% | 33.7% | 1000 | 100 |
| M1081 | 26.3% | 26.3% | 26.3% | 70.5% | 19.9% | 19.9% | 47.6% | 1150 | 350 |
| M1082 | 8.8% | 8.8% | 8.8% | 70.5% | 8.5% | 8.5% | 37.0% | 1000 | 0 |
| M1083 | 10.1% | 10.1% | 10.1% | 70.6% | 7.3% | 7.3% | 19.9% | 1100 | −50 |
| M1084 | 27.0% | 27.0% | 27.0% | 70.6% | 16.0% | 0.0% | 44.3% | 1150 | 300 |
| M1085 | 27.1% | 27.1% | 26.2% | 70.6% | 19.2% | 0.0% | 46.7% | 1150 | 350 |
| M1086 | 15.0% | 15.0% | 15.0% | 70.6% | 19.0% | 19.0% | 41.4% | 1050 | 150 |
| M1087 | 11.4% | 11.4% | 11.4% | 70.6% | 15.2% | 15.2% | 42.2% | 1050 | 100 |
| M1088 | 13.0% | 13.0% | 6.8% | 70.6% | 24.4% | 24.4% | 39.9% | 1100 | 250 |
| M1089 | 17.3% | 17.3% | 9.4% | 70.6% | 18.5% | 18.5% | 38.4% | 1050 | 150 |
| M1090 | 10.3% | 10.3% | 10.3% | 70.6% | 20.5% | 20.5% | 48.1% | 1000 | 200 |
| M1091 | 8.5% | 8.5% | 8.5% | 70.6% | 11.3% | 11.3% | 44.4% | 1050 | 50 |
| M1092 | 8.2% | 8.2% | 8.2% | 70.7% | 16.7% | 16.7% | 51.7% | 1050 | 100 |
| M1093 | 21.7% | 21.7% | 21.7% | 70.7% | 7.6% | 7.6% | 29.6% | 1050 | 150 |
| M1094 | 8.4% | 8.4% | 8.4% | 70.7% | 11.2% | 11.2% | 49.4% | 1050 | 100 |

TABLE 11-continued

Compositions and thermodynamic criteria for vanadium carbides

| | | | | | | | | |
|---|---|---|---|---|---|---|---|---|
| M1095 | 5.2% | 5.2% | 5.2% | 70.7% | 26.1% | 26.1% | 37.5% | 1050 | 250 |
| M1096 | 11.6% | 11.6% | 11.6% | 70.7% | 22.3% | 22.3% | 36.5% | 1100 | 150 |
| M1097 | 17.0% | 17.0% | 17.0% | 70.7% | 11.6% | 11.6% | 38.2% | 1000 | 200 |
| M1098 | 11.5% | 11.5% | 11.5% | 70.7% | 24.0% | 24.0% | 38.1% | 1100 | 200 |
| M1099 | 10.7% | 10.7% | 10.7% | 70.7% | 18.2% | 18.2% | 33.7% | 1050 | 50 |
| M1100 | 8.4% | 8.4% | 8.4% | 70.7% | 13.2% | 13.2% | 47.0% | 1000 | 50 |
| M1101 | 15.0% | 15.0% | 12.0% | 70.7% | 23.8% | 23.8% | 41.5% | 1150 | 200 |
| M1102 | 18.4% | 18.4% | 14.1% | 70.7% | 18.8% | 18.8% | 39.9% | 1100 | 150 |
| M1103 | 9.4% | 9.4% | 9.4% | 70.7% | 7.6% | 7.6% | 40.8% | 1050 | 100 |
| M1104 | 14.9% | 14.9% | 11.9% | 70.7% | 25.4% | 25.4% | 43.0% | 1150 | 250 |
| M1105 | 11.5% | 11.5% | 11.5% | 70.8% | 14.3% | 14.3% | 39.3% | 1050 | 100 |
| M1106 | 5.3% | 5.3% | 5.3% | 70.8% | 22.6% | 22.6% | 34.3% | 1050 | 150 |
| M1107 | 20.9% | 20.9% | 18.3% | 70.8% | 10.1% | 10.1% | 33.7% | 1150 | 200 |
| M1108 | 18.5% | 18.5% | 12.5% | 70.8% | 12.7% | 12.7% | 33.7% | 1150 | 150 |
| M1109 | 26.9% | 26.9% | 26.9% | 70.8% | 12.5% | 12.5% | 42.1% | 1050 | 250 |
| M1110 | 10.2% | 10.2% | 10.2% | 70.8% | 19.5% | 19.5% | 52.3% | 1050 | 150 |
| M1111 | 5.2% | 5.2% | 5.2% | 70.8% | 26.2% | 26.2% | 35.3% | 1050 | 250 |
| M1112 | 18.1% | 18.1% | 7.3% | 70.8% | 13.3% | 13.3% | 33.9% | 1150 | 150 |
| M1113 | 19.6% | 19.6% | 19.6% | 70.8% | 19.5% | 19.5% | 41.8% | 1100 | 200 |
| M1114 | 9.8% | 9.8% | 9.8% | 70.8% | 19.0% | 19.0% | 38.1% | 1050 | 150 |
| M1115 | 18.4% | 18.4% | 14.1% | 70.8% | 18.8% | 18.8% | 39.8% | 1150 | 150 |
| M1116 | 14.0% | 14.0% | 14.0% | 70.8% | 7.7% | 7.7% | 38.4% | 1050 | 100 |
| M1117 | 9.8% | 9.8% | 9.8% | 70.8% | 14.1% | 14.1% | 48.6% | 1050 | 100 |
| M1118 | 8.3% | 8.3% | 8.3% | 70.9% | 13.1% | 13.1% | 52.0% | 1050 | 100 |
| M1119 | 18.0% | 18.0% | 12.1% | 70.9% | 18.8% | 18.8% | 39.3% | 1100 | 150 |
| M1120 | 14.6% | 14.6% | 14.6% | 70.9% | 11.6% | 11.6% | 38.9% | 1000 | 150 |
| M1121 | 9.5% | 9.5% | 9.5% | 70.9% | 12.7% | 12.7% | 25.6% | 1000 | −50 |
| M1122 | 12.7% | 12.7% | 12.7% | 70.9% | 15.2% | 15.2% | 46.1% | 1050 | 150 |
| M1123 | 9.2% | 9.2% | 9.2% | 70.9% | 7.5% | 7.5% | 18.8% | 1050 | −50 |
| M1124 | 8.5% | 8.5% | 8.5% | 70.9% | 10.4% | 10.4% | 44.8% | 1050 | 50 |
| M1125 | 9.1% | 9.1% | 9.1% | 70.9% | 10.4% | 10.4% | 49.5% | 1000 | 100 |
| M1126 | 15.9% | 15.9% | 8.3% | 70.9% | 12.6% | 12.6% | 30.9% | 1150 | 50 |
| M1127 | 13.6% | 13.6% | 13.6% | 70.9% | 13.4% | 13.4% | 44.2% | 1000 | 150 |
| M1128 | 8.4% | 8.4% | 8.4% | 70.9% | 24.1% | 24.1% | 34.6% | 1050 | 200 |
| M1129 | 10.5% | 10.5% | 10.5% | 70.9% | 19.1% | 19.1% | 37.4% | 1050 | 150 |
| M1130 | 5.0% | 5.0% | 5.0% | 70.9% | 29.5% | 29.5% | 41.2% | 1050 | 300 |
| M1131 | 19.9% | 19.9% | 18.8% | 70.9% | 25.7% | 25.7% | 48.2% | 1100 | 300 |
| M1132 | 20.2% | 20.2% | 12.8% | 70.9% | 15.3% | 15.3% | 35.4% | 1150 | 100 |
| M1133 | 13.8% | 13.8% | 9.5% | 70.9% | 23.0% | 23.0% | 39.2% | 1100 | 200 |
| M1134 | 12.5% | 12.5% | 12.5% | 70.9% | 19.9% | 19.9% | 45.7% | 1000 | 200 |
| M1135 | 21.0% | 21.0% | 21.0% | 70.9% | 18.2% | 18.2% | 41.6% | 1050 | 200 |
| M1136 | 16.1% | 16.1% | 16.1% | 71.0% | 10.7% | 10.7% | 39.0% | 1000 | 200 |
| M1137 | 11.2% | 11.2% | 11.2% | 71.0% | 12.3% | 12.3% | 25.7% | 1050 | 0 |
| M1138 | 15.1% | 15.1% | 15.1% | 71.0% | 7.6% | 7.6% | 31.7% | 1050 | 100 |
| M1139 | 9.6% | 9.6% | 9.6% | 71.0% | 17.9% | 17.9% | 47.5% | 1050 | 150 |
| M1140 | 13.6% | 13.6% | 13.6% | 71.0% | 12.5% | 12.5% | 43.4% | 1000 | 150 |
| M1141 | 17.6% | 17.6% | 11.8% | 71.0% | 23.7% | 23.7% | 43.8% | 1150 | 250 |
| M1142 | 11.5% | 11.5% | 10.4% | 71.0% | 23.3% | 23.3% | 37.1% | 1100 | 150 |
| M1143 | 10.4% | 10.4% | 10.4% | 71.0% | 21.0% | 21.0% | 36.8% | 1050 | 200 |
| M1144 | 15.4% | 15.4% | 11.2% | 71.0% | 18.0% | 18.0% | 35.8% | 1100 | 100 |
| M1145 | 13.3% | 13.3% | 7.5% | 71.0% | 24.5% | 24.5% | 40.2% | 1100 | 250 |
| M1146 | 11.7% | 11.7% | 11.7% | 71.0% | 17.0% | 17.0% | 49.2% | 1050 | 150 |
| M1147 | 11.5% | 11.5% | 7.3% | 71.0% | 23.8% | 23.8% | 37.7% | 1150 | 200 |
| M1148 | 17.2% | 17.2% | 8.3% | 71.0% | 18.6% | 18.6% | 38.2% | 1150 | 150 |
| M1149 | 9.0% | 9.0% | 9.0% | 71.0% | 13.2% | 13.2% | 49.6% | 1050 | 100 |
| M1150 | 9.2% | 9.2% | 9.2% | 71.0% | 8.6% | 8.6% | 46.1% | 1000 | 100 |
| M1151 | 8.4% | 8.4% | 8.4% | 71.0% | 9.6% | 9.6% | 45.3% | 1000 | 50 |
| M1152 | 17.1% | 17.1% | 8.2% | 71.1% | 20.3% | 20.3% | 39.7% | 1150 | 200 |
| M1153 | 10.1% | 10.1% | 10.1% | 71.1% | 10.6% | 10.6% | 36.3% | 1000 | 50 |
| M1154 | 17.1% | 17.1% | 13.0% | 71.1% | 24.7% | 24.7% | 44.2% | 1100 | 250 |
| M1155 | 5.7% | 5.7% | 1.4% | 71.1% | 31.7% | 31.7% | 39.7% | 1150 | 350 |
| M1156 | 18.9% | 18.9% | 8.4% | 71.1% | 8.1% | 8.1% | 29.3% | 1150 | 100 |
| M1157 | 13.1% | 13.1% | 13.1% | 71.1% | 19.8% | 19.8% | 35.2% | 1100 | 100 |
| M1158 | 11.5% | 11.5% | 11.5% | 71.1% | 8.6% | 8.6% | 43.2% | 1000 | 150 |
| M1159 | 14.9% | 14.9% | 10.8% | 71.1% | 25.5% | 25.5% | 42.7% | 1100 | 250 |
| M1160 | 21.6% | 21.6% | 21.6% | 71.1% | 14.0% | 14.0% | 37.9% | 1050 | 200 |
| M1161 | 8.0% | 8.0% | 8.0% | 71.1% | 15.9% | 15.9% | 56.5% | 1000 | 150 |
| M1162 | 18.5% | 18.5% | 6.4% | 71.1% | 8.1% | 8.1% | 28.8% | 1150 | 50 |
| M1163 | 15.4% | 15.4% | 14.5% | 71.1% | 16.5% | 16.5% | 34.2% | 1150 | 100 |
| M1164 | 10.2% | 10.2% | 10.2% | 71.1% | 14.5% | 14.5% | 26.6% | 1000 | −50 |
| M1165 | 24.8% | 24.8% | 24.8% | 71.1% | 5.2% | 5.2% | 32.5% | 1100 | 250 |
| M1166 | 9.0% | 9.0% | 9.0% | 71.1% | 10.4% | 10.4% | 50.7% | 1000 | 150 |
| M1167 | 14.4% | 14.4% | 14.4% | 71.1% | 10.6% | 10.6% | 41.2% | 1000 | 200 |
| M1168 | 8.6% | 8.6% | 8.6% | 71.2% | 20.1% | 20.1% | 30.9% | 1100 | 100 |
| M1169 | 26.8% | 26.8% | 25.1% | 71.2% | 22.4% | 0.0% | 49.2% | 1150 | 350 |
| M1170 | 10.7% | 10.7% | 10.7% | 71.2% | 8.7% | 8.7% | 45.0% | 1000 | 100 |
| M1171 | 17.5% | 17.5% | 17.5% | 71.2% | 8.3% | 8.3% | 28.0% | 1050 | 100 |
| M1172 | 14.8% | 14.8% | 14.8% | 71.2% | 14.5% | 14.5% | 47.0% | 1000 | 200 |

TABLE 11-continued

Compositions and thermodynamic criteria for vanadium carbides

| | | | | | | | | | |
|---|---|---|---|---|---|---|---|---|---|
| M1173 | 9.1% | 9.1% | 9.1% | 71.2% | 13.4% | 13.4% | 40.3% | 1000 | 50 |
| M1174 | 15.1% | 15.1% | 15.1% | 71.2% | 19.9% | 19.9% | 50.6% | 1000 | 200 |
| M1175 | 15.5% | 15.5% | 15.5% | 71.2% | 19.3% | 19.3% | 39.4% | 1000 | 200 |
| M1176 | 9.9% | 9.9% | 9.9% | 71.2% | 8.7% | 8.7% | 43.5% | 1000 | 100 |
| M1177 | 11.6% | 11.6% | 11.6% | 71.2% | 17.9% | 17.9% | 51.0% | 1050 | 150 |
| M1178 | 5.3% | 5.3% | 5.3% | 71.2% | 22.9% | 22.9% | 30.0% | 1050 | 150 |
| M1179 | 21.1% | 21.1% | 21.1% | 71.2% | 7.7% | 7.7% | 35.4% | 1050 | 200 |
| M1180 | 16.5% | 16.5% | 16.5% | 71.3% | 11.7% | 11.7% | 42.4% | 1000 | 200 |
| M1181 | 10.4% | 10.4% | 10.4% | 71.3% | 17.4% | 17.4% | 36.8% | 1000 | 100 |
| M1182 | 5.8% | 5.8% | 5.8% | 71.3% | 7.6% | 7.6% | 27.7% | 1050 | −50 |
| M1183 | 8.4% | 8.4% | 8.4% | 71.3% | 8.6% | 8.6% | 47.8% | 1000 | 50 |
| M1184 | 12.2% | 12.2% | 12.2% | 71.3% | 19.6% | 19.6% | 33.8% | 1050 | 100 |
| M1185 | 9.8% | 9.8% | 9.8% | 71.3% | 23.3% | 23.3% | 35.0% | 1050 | 200 |
| M1186 | 9.7% | 9.7% | 9.7% | 71.3% | 24.1% | 24.1% | 35.8% | 1050 | 200 |
| M1187 | 20.0% | 20.0% | 13.0% | 71.3% | 10.1% | 10.1% | 32.3% | 1100 | 150 |
| M1188 | 20.4% | 20.4% | 15.0% | 71.3% | 10.2% | 10.2% | 32.8% | 1150 | 150 |
| M1189 | 16.5% | 16.5% | 14.1% | 71.3% | 24.9% | 24.9% | 43.7% | 1150 | 250 |
| M1190 | 8.9% | 8.9% | 8.9% | 71.3% | 11.4% | 11.4% | 52.7% | 1000 | 150 |
| M1191 | 22.9% | 22.9% | 20.8% | 71.3% | 7.5% | 7.5% | 32.7% | 1150 | 200 |
| M1192 | 5.0% | 5.0% | 5.0% | 71.3% | 26.3% | 26.3% | 39.0% | 1000 | 250 |
| M1193 | 8.5% | 8.5% | 8.5% | 71.3% | 8.7% | 8.7% | 40.4% | 1000 | 50 |
| M1194 | 14.1% | 14.1% | 14.1% | 71.3% | 13.5% | 13.5% | 44.7% | 1000 | 150 |
| M1195 | 15.2% | 15.2% | 6.6% | 71.3% | 9.2% | 9.2% | 26.2% | 1100 | 0 |
| M1196 | 12.3% | 12.3% | 12.3% | 71.3% | 17.8% | 17.8% | 32.1% | 1050 | 50 |
| M1197 | 10.5% | 10.5% | 10.5% | 71.3% | 10.2% | 10.2% | 22.6% | 1050 | 0 |
| M1198 | 17.3% | 17.3% | 5.6% | 71.3% | 10.8% | 10.8% | 30.2% | 1150 | 100 |
| M1199 | 4.3% | 4.3% | 1.9% | 71.4% | 29.7% | 29.7% | 36.1% | 1150 | 300 |
| M1200 | 8.3% | 8.3% | 8.3% | 71.4% | 8.6% | 8.6% | 51.1% | 1000 | 100 |
| M1201 | 11.4% | 11.4% | 11.4% | 71.4% | 8.7% | 8.7% | 44.4% | 1000 | 150 |
| M1202 | 9.9% | 9.9% | 9.9% | 71.4% | 13.7% | 13.7% | 38.8% | 1000 | 50 |
| M1203 | 8.4% | 8.4% | 8.4% | 71.4% | 8.6% | 8.6% | 45.7% | 1000 | 50 |
| M1204 | 8.2% | 8.2% | 8.2% | 71.4% | 10.5% | 10.5% | 50.5% | 1000 | 100 |
| M1205 | 19.1% | 19.1% | 9.1% | 71.4% | 10.0% | 10.0% | 31.2% | 1100 | 100 |
| M1206 | 12.3% | 12.3% | 12.3% | 71.4% | 9.8% | 9.8% | 43.2% | 1000 | 50 |
| M1207 | 9.0% | 9.0% | 9.0% | 71.4% | 19.5% | 19.5% | 30.1% | 1000 | 100 |
| M1208 | 10.7% | 10.7% | 10.7% | 71.4% | 8.0% | 8.0% | 20.5% | 1050 | −50 |
| M1209 | 14.1% | 14.1% | 14.1% | 71.4% | 24.4% | 24.4% | 40.6% | 1100 | 200 |
| M1210 | 9.7% | 9.7% | 9.7% | 71.4% | 23.2% | 23.2% | 34.9% | 1050 | 150 |
| M1211 | 5.1% | 5.1% | 5.1% | 71.4% | 22.9% | 22.9% | 42.1% | 1000 | 150 |
| M1212 | 22.1% | 22.1% | 22.1% | 71.5% | 11.0% | 11.0% | 34.9% | 1000 | 250 |
| M1213 | 15.2% | 15.2% | 11.5% | 71.5% | 25.7% | 25.7% | 43.0% | 1100 | 250 |
| M1214 | 17.4% | 17.4% | 13.8% | 71.5% | 13.0% | 13.0% | 32.4% | 1100 | 100 |
| M1215 | 11.5% | 11.5% | 9.3% | 71.5% | 22.5% | 22.5% | 36.0% | 1100 | 150 |
| M1216 | 11.9% | 11.9% | 11.9% | 71.5% | 13.6% | 13.6% | 52.6% | 1000 | 100 |
| M1217 | 18.5% | 18.5% | 8.7% | 71.5% | 17.0% | 17.0% | 37.6% | 1100 | 150 |
| M1218 | 12.1% | 12.1% | 12.1% | 71.5% | 21.8% | 21.8% | 35.9% | 1100 | 150 |
| M1219 | 12.8% | 12.8% | 12.8% | 71.5% | 8.7% | 8.7% | 63.1% | 1000 | 150 |
| M1220 | 9.5% | 9.5% | 9.0% | 71.5% | 25.1% | 25.1% | 36.6% | 1150 | 200 |
| M1221 | 11.7% | 11.7% | 11.7% | 71.6% | 20.5% | 20.5% | 37.4% | 1000 | 200 |
| M1222 | 11.0% | 11.0% | 7.4% | 71.6% | 24.9% | 24.9% | 37.8% | 1100 | 200 |
| M1223 | 8.0% | 8.0% | 8.0% | 71.6% | 13.3% | 13.3% | 53.9% | 1000 | 100 |
| M1224 | 9.2% | 9.2% | 8.9% | 71.6% | 12.1% | 12.1% | 23.2% | 1150 | −50 |
| M1225 | 13.8% | 13.8% | 13.8% | 71.6% | 14.5% | 14.5% | 30.1% | 1050 | 50 |
| M1226 | 15.1% | 15.1% | 15.1% | 71.6% | 17.3% | 17.3% | 49.7% | 1000 | 200 |
| M1227 | 19.1% | 19.1% | 14.0% | 71.6% | 13.8% | 13.8% | 35.0% | 1150 | 150 |
| M1228 | 15.2% | 15.2% | 11.5% | 71.6% | 25.7% | 25.7% | 42.9% | 1150 | 250 |
| M1229 | 8.2% | 8.2% | 8.2% | 71.6% | 7.6% | 7.6% | 51.7% | 1000 | 100 |
| M1230 | 12.6% | 12.6% | 9.1% | 71.6% | 19.1% | 19.1% | 33.5% | 1100 | 100 |
| M1231 | 14.1% | 14.1% | 14.1% | 71.6% | 12.3% | 12.3% | 28.1% | 1050 | 50 |
| M1232 | 19.6% | 19.6% | 17.7% | 71.6% | 7.6% | 7.6% | 29.2% | 1150 | 150 |
| M1233 | 24.8% | 24.8% | 22.5% | 71.6% | 21.0% | 21.0% | 45.8% | 1150 | 350 |
| M1234 | 11.3% | 11.3% | 9.2% | 71.6% | 25.8% | 25.8% | 39.1% | 1150 | 250 |
| M1235 | 22.1% | 22.1% | 22.1% | 71.6% | 11.8% | 11.8% | 35.7% | 1000 | 200 |
| M1236 | 19.0% | 19.0% | 19.0% | 71.6% | 7.4% | 7.4% | 28.3% | 1050 | 150 |
| M1237 | 15.9% | 15.9% | 15.9% | 71.6% | 8.9% | 8.9% | 53.2% | 1000 | 200 |
| M1238 | 5.2% | 5.2% | 5.2% | 71.6% | 29.0% | 29.0% | 36.0% | 1050 | 300 |
| M1239 | 14.6% | 14.6% | 14.6% | 71.6% | 14.6% | 14.6% | 61.3% | 1000 | 200 |
| M1240 | 8.7% | 8.7% | 8.3% | 71.6% | 24.4% | 24.4% | 34.9% | 1100 | 200 |
| M1241 | 15.1% | 15.1% | 15.1% | 71.6% | 7.8% | 7.8% | 61.6% | 1000 | 200 |
| M1242 | 17.0% | 17.0% | 17.0% | 71.7% | 18.4% | 18.4% | 37.2% | 1000 | 150 |
| M1243 | 19.1% | 19.1% | 19.1% | 71.7% | 14.8% | 14.8% | 48.7% | 1000 | 250 |
| M1244 | 12.3% | 12.3% | 12.3% | 71.7% | 13.5% | 13.5% | 75.8% | 1000 | 150 |
| M1245 | 18.6% | 18.6% | 15.1% | 71.7% | 24.1% | 24.1% | 44.9% | 1150 | 250 |
| M1246 | 10.8% | 10.8% | 10.4% | 71.7% | 25.2% | 25.2% | 37.9% | 1100 | 200 |
| M1247 | 9.0% | 9.0% | 9.0% | 71.7% | 9.7% | 9.7% | 63.1% | 1000 | 50 |
| M1248 | 9.9% | 9.9% | 9.9% | 71.7% | 23.2% | 23.2% | 35.0% | 1100 | 150 |
| M1249 | 8.0% | 8.0% | 8.0% | 71.7% | 10.5% | 10.5% | 89.9% | 1000 | 100 |
| M1250 | 11.6% | 11.6% | 11.6% | 71.7% | 12.5% | 12.5% | 76.7% | 1000 | 150 |

TABLE 11-continued

Compositions and thermodynamic criteria for vanadium carbides

| | | | | | | | | | |
|---|---|---|---|---|---|---|---|---|---|
| M1251 | 16.4% | 16.4% | 14.6% | 71.7% | 19.3% | 19.3% | 37.6% | 1100 | 100 |
| M1252 | 12.5% | 12.5% | 12.3% | 71.7% | 18.5% | 18.5% | 32.8% | 1100 | 50 |
| M1253 | 17.8% | 17.8% | 11.3% | 71.7% | 13.8% | 13.8% | 33.5% | 1100 | 100 |
| M1254 | 9.4% | 9.4% | 9.4% | 71.7% | 12.5% | 12.5% | 80.9% | 1000 | 150 |
| M1255 | 17.5% | 17.5% | 17.5% | 71.7% | 11.9% | 11.9% | 31.0% | 1000 | 150 |
| M1256 | 16.2% | 16.2% | 14.4% | 71.7% | 21.8% | 21.8% | 40.0% | 1100 | 150 |
| M1257 | 14.6% | 14.6% | 14.6% | 71.7% | 14.6% | 14.6% | 61.0% | 1000 | 150 |
| M1258 | 16.0% | 16.0% | 12.7% | 71.7% | 19.2% | 19.2% | 37.1% | 1100 | 100 |
| M1259 | 9.9% | 9.9% | 9.9% | 71.7% | 15.2% | 15.2% | 87.4% | 1000 | 150 |
| M1260 | 16.1% | 16.1% | 16.1% | 71.7% | 17.7% | 17.7% | 41.0% | 1000 | 150 |
| M1261 | 10.4% | 10.4% | 10.4% | 71.7% | 13.7% | 13.7% | 50.7% | 1000 | 50 |
| M1262 | 12.8% | 12.8% | 12.8% | 71.8% | 15.4% | 15.4% | 74.9% | 1000 | 150 |
| M1263 | 9.9% | 9.9% | 8.2% | 71.8% | 18.4% | 18.4% | 29.9% | 1100 | 50 |
| M1264 | 9.3% | 9.3% | 9.3% | 71.8% | 9.9% | 9.9% | 24.4% | 1000 | −50 |
| M1265 | 7.8% | 7.8% | 7.8% | 71.8% | 14.2% | 14.2% | 94.5% | 1000 | 150 |
| M1266 | 13.1% | 13.1% | 13.1% | 71.8% | 11.0% | 11.0% | 25.4% | 1000 | 50 |
| M1267 | 12.4% | 12.4% | 12.4% | 71.8% | 7.9% | 7.9% | 27.1% | 1000 | 50 |
| M1268 | 10.0% | 10.0% | 10.0% | 71.8% | 12.5% | 12.5% | 86.2% | 1000 | 150 |
| M1269 | 15.6% | 15.6% | 12.3% | 71.8% | 25.0% | 25.0% | 42.5% | 1100 | 250 |
| M1270 | 17.4% | 17.4% | 17.4% | 71.8% | 18.7% | 18.7% | 39.8% | 1000 | 200 |
| M1271 | 9.0% | 9.0% | 9.0% | 71.8% | 9.8% | 9.8% | 66.3% | 1000 | 50 |
| M1272 | 9.7% | 9.7% | 8.0% | 71.8% | 21.9% | 21.9% | 33.2% | 1100 | 150 |
| M1273 | 9.1% | 9.1% | 9.1% | 71.8% | 14.9% | 14.9% | 26.2% | 1000 | 0 |
| M1274 | 8.2% | 8.2% | 8.2% | 71.8% | 9.7% | 9.7% | 74.9% | 1000 | 50 |
| M1275 | 7.6% | 7.6% | 7.6% | 71.8% | 26.8% | 26.8% | 36.1% | 1000 | 300 |
| M1276 | 2.2% | 2.2% | 2.2% | 71.8% | 29.8% | 29.8% | 33.3% | 1050 | 300 |
| M1277 | 20.1% | 20.1% | 20.1% | 71.8% | 19.5% | 19.5% | 44.6% | 1000 | 250 |
| M1278 | 15.1% | 15.1% | 15.1% | 71.9% | 11.0% | 11.0% | 31.6% | 1000 | 150 |
| M1279 | 7.8% | 7.8% | 7.8% | 71.9% | 12.4% | 12.4% | 97.0% | 1000 | 100 |
| M1280 | 10.4% | 10.4% | 10.4% | 71.9% | 7.8% | 7.8% | 76.9% | 1000 | 100 |
| M1281 | 15.2% | 15.2% | 15.2% | 71.9% | 12.7% | 12.7% | 65.5% | 1000 | 200 |
| M1282 | 7.6% | 7.6% | 7.6% | 71.9% | 30.0% | 30.0% | 39.0% | 1050 | 350 |
| M1283 | 15.0% | 15.0% | 15.0% | 71.9% | 7.9% | 7.9% | 40.7% | 1000 | 200 |
| M1284 | 17.9% | 17.9% | 14.7% | 71.9% | 11.3% | 11.3% | 31.0% | 1150 | 150 |
| M1285 | 10.0% | 10.0% | 10.0% | 71.9% | 12.5% | 12.5% | 85.9% | 1000 | 150 |
| M1286 | 4.7% | 4.7% | 4.7% | 71.9% | 26.5% | 26.5% | 40.8% | 1000 | 300 |
| M1287 | 15.6% | 15.6% | 15.6% | 71.9% | 17.4% | 17.4% | 66.1% | 1000 | 200 |
| M1288 | 8.1% | 8.1% | 8.1% | 71.9% | 22.9% | 22.9% | 32.2% | 1000 | 150 |
| M1289 | 21.5% | 21.5% | 21.5% | 71.9% | 8.0% | 8.0% | 31.0% | 1000 | 200 |
| M1290 | 21.1% | 21.1% | 21.1% | 71.9% | 11.9% | 11.9% | 34.6% | 1000 | 200 |
| M1291 | 13.9% | 13.9% | 13.9% | 71.9% | 18.6% | 18.6% | 33.8% | 1000 | 100 |
| M1292 | 12.9% | 12.9% | 9.9% | 71.9% | 19.3% | 19.3% | 33.8% | 1100 | 100 |
| M1293 | 7.9% | 7.9% | 7.9% | 71.9% | 18.4% | 18.4% | 40.4% | 1000 | 150 |
| M1294 | 7.7% | 7.7% | 7.7% | 72.0% | 13.3% | 13.3% | 97.1% | 1000 | 100 |
| M1295 | 16.5% | 16.5% | 16.5% | 72.0% | 7.9% | 7.9% | 41.7% | 1000 | 200 |
| M1296 | 5.3% | 5.3% | 5.3% | 72.0% | 31.3% | 31.3% | 38.3% | 1100 | 350 |
| M1297 | 7.8% | 7.8% | 7.8% | 72.0% | 23.3% | 23.3% | 32.9% | 1000 | 200 |
| M1298 | 9.4% | 9.4% | 9.4% | 72.0% | 10.6% | 10.6% | 82.8% | 1000 | 150 |
| M1299 | 14.2% | 14.2% | 14.2% | 72.0% | 15.5% | 15.5% | 71.5% | 1000 | 200 |
| M1300 | 13.0% | 13.0% | 11.5% | 72.0% | 24.4% | 24.4% | 39.0% | 1100 | 200 |
| M1301 | 13.4% | 13.4% | 13.4% | 72.0% | 22.9% | 22.9% | 38.0% | 1100 | 150 |
| M1302 | 21.6% | 21.6% | 20.0% | 72.0% | 15.0% | 15.0% | 38.4% | 1100 | 200 |
| M1303 | 10.2% | 10.2% | 10.2% | 72.0% | 22.0% | 22.0% | 33.6% | 1050 | 150 |
| M1304 | 10.8% | 10.8% | 10.8% | 72.0% | 15.3% | 15.3% | 27.3% | 1000 | 0 |
| M1305 | 5.3% | 5.3% | 5.3% | 72.0% | 15.5% | 15.5% | 42.0% | 1000 | 0 |
| M1306 | 14.9% | 14.9% | 14.9% | 72.0% | 14.0% | 14.0% | 31.6% | 1000 | 100 |
| M1307 | 9.8% | 9.8% | 9.8% | 72.0% | 14.0% | 14.0% | 24.7% | 950 | 0 |
| M1308 | 4.9% | 4.9% | 4.9% | 72.0% | 23.1% | 23.1% | 37.8% | 1000 | 250 |
| M1309 | 8.2% | 8.2% | 8.2% | 72.0% | 14.9% | 14.9% | 28.0% | 1000 | 50 |
| M1310 | 7.9% | 7.9% | 7.9% | 72.0% | 13.6% | 13.6% | 76.0% | 1000 | 50 |
| M1311 | 8.7% | 8.7% | 8.7% | 72.0% | 18.8% | 18.8% | 30.6% | 1000 | 150 |
| M1312 | 12.8% | 12.8% | 8.2% | 72.0% | 13.9% | 13.9% | 28.3% | 1150 | 0 |
| M1313 | 18.0% | 18.0% | 18.0% | 72.0% | 9.0% | 9.0% | 37.8% | 1000 | 250 |
| M1314 | 17.6% | 17.6% | 17.6% | 72.0% | 14.6% | 14.6% | 33.8% | 1100 | 150 |
| M1315 | 13.4% | 13.4% | 13.4% | 72.0% | 14.6% | 14.6% | 75.9% | 1000 | 150 |
| M1316 | 21.9% | 21.9% | 14.3% | 72.0% | 9.3% | 9.3% | 31.2% | 1150 | 150 |
| M1317 | 18.8% | 18.8% | 18.8% | 72.0% | 24.4% | 24.4% | 45.1% | 1100 | 250 |
| M1318 | 19.2% | 19.2% | 19.2% | 72.0% | 11.0% | 11.0% | 40.4% | 1000 | 250 |
| M1319 | 15.8% | 15.8% | 15.8% | 72.0% | 7.3% | 7.3% | 24.6% | 1050 | 50 |
| M1320 | 10.4% | 10.4% | 10.4% | 72.0% | 14.0% | 14.0% | 29.8% | 1000 | 50 |
| M1321 | 16.3% | 16.3% | 16.3% | 72.1% | 16.6% | 16.6% | 49.1% | 1000 | 200 |
| M1322 | 8.8% | 8.8% | 8.8% | 72.1% | 9.8% | 9.8% | 48.1% | 1000 | 50 |
| M1323 | 17.4% | 17.4% | 17.4% | 72.1% | 17.3% | 17.3% | 36.3% | 1100 | 150 |
| M1324 | 10.3% | 10.3% | 10.3% | 72.1% | 21.8% | 21.8% | 33.4% | 1050 | 150 |
| M1325 | 10.7% | 10.7% | 7.7% | 72.1% | 19.3% | 19.3% | 31.5% | 1150 | 50 |
| M1326 | 14.7% | 14.7% | 11.7% | 72.1% | 24.3% | 24.3% | 40.7% | 1150 | 200 |
| M1327 | 17.0% | 17.0% | 17.0% | 72.1% | 14.0% | 14.0% | 34.1% | 1000 | 200 |
| M1328 | 10.0% | 10.0% | 10.0% | 72.1% | 12.0% | 12.0% | 22.8% | 1000 | −50 |

TABLE 11-continued

Compositions and thermodynamic criteria for vanadium carbides

| M1329 | 17.2% | 17.2% | 5.2% | 72.1% | 16.2% | 16.2% | 35.0% | 1150 | 100 |
|---|---|---|---|---|---|---|---|---|---|
| M1330 | 7.9% | 7.9% | 7.9% | 72.1% | 26.3% | 26.3% | 35.4% | 1050 | 250 |
| M1331 | 19.7% | 19.7% | 10.5% | 72.1% | 12.0% | 12.0% | 33.3% | 1100 | 200 |
| M1332 | 5.0% | 5.0% | 5.0% | 72.1% | 19.5% | 19.5% | 34.8% | 1000 | 100 |
| M1333 | 8.8% | 8.8% | 8.8% | 72.1% | 13.8% | 13.8% | 36.1% | 1000 | 50 |
| M1334 | 5.2% | 5.2% | 5.2% | 72.1% | 34.1% | 34.1% | 40.9% | 1150 | 400 |
| M1335 | 19.7% | 19.7% | 12.2% | 72.1% | 16.5% | 16.5% | 37.8% | 1100 | 150 |
| M1336 | 14.8% | 14.8% | 14.8% | 72.1% | 10.9% | 10.9% | 38.6% | 1000 | 150 |
| M1337 | 7.7% | 7.7% | 7.7% | 72.1% | 29.6% | 29.6% | 38.7% | 1050 | 350 |
| M1338 | 17.6% | 17.6% | 17.6% | 72.1% | 16.8% | 16.8% | 35.6% | 1000 | 150 |
| M1339 | 12.6% | 12.6% | 9.6% | 72.1% | 9.5% | 9.5% | 23.4% | 1150 | −50 |
| M1340 | 8.1% | 8.1% | 8.1% | 72.1% | 24.2% | 24.2% | 33.5% | 1050 | 200 |
| M1341 | 19.4% | 19.4% | 19.4% | 72.1% | 7.7% | 7.7% | 28.5% | 1050 | 150 |
| M1342 | 22.8% | 22.8% | 22.8% | 72.1% | 9.9% | 9.9% | 34.0% | 1000 | 250 |
| M1343 | 13.8% | 13.8% | 13.8% | 72.1% | 12.9% | 12.9% | 42.1% | 1000 | 150 |
| M1344 | 12.4% | 12.4% | 12.4% | 72.2% | 8.8% | 8.8% | 47.4% | 1000 | 150 |
| M1345 | 11.8% | 11.8% | 11.8% | 72.2% | 14.9% | 14.9% | 31.5% | 1000 | 50 |
| M1346 | 17.9% | 17.9% | 4.7% | 72.2% | 17.9% | 17.9% | 37.2% | 1100 | 150 |
| M1347 | 19.5% | 19.5% | 11.9% | 72.2% | 9.5% | 9.5% | 30.3% | 1100 | 150 |
| M1348 | 8.1% | 8.1% | 8.1% | 72.2% | 22.6% | 22.6% | 32.0% | 1050 | 150 |
| M1349 | 7.7% | 7.7% | 7.7% | 72.2% | 11.5% | 11.5% | 61.7% | 1000 | 100 |
| M1350 | 12.8% | 12.8% | 12.8% | 72.2% | 15.7% | 15.7% | 46.3% | 1000 | 150 |
| M1351 | 18.4% | 18.4% | 18.4% | 72.2% | 14.1% | 14.1% | 35.0% | 1000 | 200 |
| M1352 | 8.1% | 8.1% | 8.1% | 72.2% | 7.8% | 7.8% | 48.7% | 1000 | 100 |
| M1353 | 14.0% | 14.0% | 14.0% | 72.2% | 17.6% | 17.6% | 48.7% | 1000 | 200 |
| M1354 | 8.3% | 8.3% | 8.3% | 72.2% | 20.5% | 20.5% | 29.9% | 1050 | 100 |
| M1355 | 8.2% | 8.2% | 8.2% | 72.2% | 14.1% | 14.1% | 24.7% | 950 | 0 |
| M1356 | 9.9% | 9.9% | 8.6% | 72.2% | 26.2% | 26.2% | 37.4% | 1100 | 250 |
| M1357 | 11.2% | 11.2% | 11.2% | 72.2% | 11.0% | 11.0% | 32.5% | 1000 | 50 |
| M1358 | 18.9% | 18.9% | 10.1% | 72.2% | 19.8% | 19.8% | 40.3% | 1150 | 200 |
| M1359 | 8.8% | 8.8% | 8.8% | 72.2% | 8.8% | 8.8% | 45.3% | 1000 | 50 |
| M1360 | 12.5% | 12.5% | 12.5% | 72.2% | 25.0% | 25.0% | 38.8% | 1050 | 200 |
| M1361 | 20.3% | 20.3% | 17.4% | 72.2% | 14.1% | 14.1% | 36.0% | 1150 | 200 |
| M1362 | 13.2% | 13.2% | 13.2% | 72.2% | 11.0% | 11.0% | 39.0% | 1000 | 150 |
| M1363 | 9.9% | 9.9% | 8.7% | 72.2% | 23.7% | 23.7% | 35.0% | 1100 | 150 |
| M1364 | 19.8% | 19.8% | 13.8% | 72.2% | 9.5% | 9.5% | 30.8% | 1150 | 150 |
| M1365 | 11.9% | 11.9% | 9.1% | 72.2% | 20.2% | 20.2% | 33.5% | 1150 | 100 |
| M1366 | 10.3% | 10.3% | 10.3% | 72.2% | 8.9% | 8.9% | 42.7% | 1000 | 100 |
| M1367 | 15.5% | 15.5% | 11.3% | 72.2% | 24.2% | 24.2% | 41.4% | 1150 | 200 |
| M1368 | 10.8% | 10.8% | 10.8% | 72.3% | 18.9% | 18.9% | 30.7% | 950 | 100 |
| M1369 | 25.1% | 25.1% | 23.9% | 72.3% | 5.9% | 5.9% | 32.7% | 1150 | 250 |
| M1370 | 20.4% | 20.4% | 20.4% | 72.3% | 22.5% | 22.5% | 44.5% | 1050 | 200 |
| M1371 | 25.2% | 25.2% | 22.6% | 72.3% | 16.0% | 16.0% | 41.1% | 1200 | 250 |
| M1372 | 8.4% | 8.4% | 8.4% | 72.3% | 19.3% | 19.3% | 28.8% | 1050 | 50 |
| M1373 | 11.3% | 11.3% | 7.1% | 72.3% | 25.1% | 25.1% | 37.8% | 1100 | 200 |
| M1374 | 19.3% | 19.3% | 11.8% | 72.3% | 10.3% | 10.3% | 31.1% | 1150 | 150 |
| M1375 | 7.6% | 7.6% | 7.6% | 72.3% | 23.4% | 23.4% | 33.8% | 1000 | 250 |
| M1376 | 13.2% | 13.2% | 13.2% | 72.3% | 14.0% | 14.0% | 31.6% | 1000 | 100 |
| M1377 | 12.3% | 12.3% | 12.3% | 72.3% | 16.0% | 16.0% | 35.3% | 950 | 100 |
| M1378 | 10.2% | 10.2% | 10.2% | 72.3% | 24.7% | 24.7% | 36.3% | 1100 | 200 |
| M1379 | 11.4% | 11.4% | 11.4% | 72.3% | 9.7% | 9.7% | 53.5% | 1000 | 200 |
| M1380 | 18.2% | 18.2% | 11.1% | 72.3% | 23.3% | 23.3% | 42.9% | 1100 | 250 |
| M1381 | 9.6% | 9.6% | 9.6% | 72.3% | 14.1% | 14.1% | 25.6% | 950 | 0 |
| M1382 | 12.9% | 12.9% | 12.9% | 72.3% | 16.8% | 16.8% | 37.6% | 1000 | 150 |
| M1383 | 14.6% | 14.6% | 14.6% | 72.3% | 12.4% | 12.4% | 28.1% | 1050 | 100 |
| M1384 | 13.4% | 13.4% | 13.4% | 72.3% | 16.7% | 16.7% | 46.3% | 1000 | 150 |
| M1385 | 23.0% | 23.0% | 23.0% | 72.3% | 7.8% | 7.8% | 32.1% | 1000 | 250 |
| M1386 | 10.3% | 10.3% | 10.3% | 72.3% | 8.7% | 8.7% | 19.7% | 1000 | −50 |
| M1387 | 25.0% | 25.0% | 25.0% | 72.3% | 20.3% | 20.3% | 45.3% | 1000 | 350 |
| M1388 | 16.9% | 16.9% | 9.5% | 72.3% | 13.0% | 13.0% | 31.3% | 1150 | 100 |
| M1389 | 11.5% | 11.5% | 11.5% | 72.3% | 17.0% | 17.0% | 34.4% | 950 | 150 |
| M1390 | 22.5% | 22.5% | 22.5% | 72.3% | 12.6% | 12.6% | 36.5% | 1050 | 250 |
| M1391 | 14.7% | 14.7% | 14.7% | 72.3% | 18.6% | 18.6% | 45.2% | 1000 | 200 |
| M1392 | 9.6% | 9.6% | 9.6% | 72.3% | 7.9% | 7.9% | 44.0% | 1000 | 50 |
| M1393 | 18.0% | 18.0% | 18.0% | 72.3% | 11.9% | 11.9% | 31.0% | 1000 | 150 |
| M1394 | 18.5% | 18.5% | 18.5% | 72.4% | 19.8% | 19.8% | 39.4% | 1000 | 200 |
| M1395 | 13.8% | 13.8% | 13.8% | 72.4% | 9.0% | 9.0% | 23.5% | 1000 | 50 |
| M1396 | 14.0% | 14.0% | 14.0% | 72.4% | 11.0% | 11.0% | 34.6% | 1000 | 150 |
| M1397 | 18.1% | 18.1% | 18.1% | 72.4% | 13.5% | 13.5% | 32.6% | 1000 | 150 |
| M1398 | 18.1% | 18.1% | 18.1% | 72.4% | 12.6% | 12.6% | 31.8% | 1000 | 150 |
| M1399 | 7.7% | 7.7% | 7.7% | 72.4% | 32.3% | 32.3% | 41.3% | 1050 | 400 |
| M1400 | 15.2% | 15.2% | 15.2% | 72.4% | 12.6% | 12.6% | 28.7% | 1100 | 100 |
| M1401 | 8.6% | 8.6% | 8.6% | 72.4% | 17.7% | 17.7% | 27.3% | 1100 | 0 |
| M1402 | 8.1% | 8.1% | 8.1% | 72.4% | 25.6% | 25.6% | 34.8% | 1100 | 200 |
| M1403 | 7.1% | 7.1% | 4.6% | 72.4% | 29.3% | 29.3% | 37.7% | 1150 | 300 |
| M1404 | 18.2% | 18.2% | 18.2% | 72.4% | 23.8% | 23.8% | 43.4% | 1100 | 200 |
| M1405 | 25.1% | 25.1% | 25.1% | 72.4% | 22.5% | 22.5% | 47.6% | 1100 | 250 |
| M1406 | 22.5% | 22.5% | 22.5% | 72.4% | 13.3% | 13.3% | 37.2% | 1050 | 250 |

TABLE 11-continued

Compositions and thermodynamic criteria for vanadium carbides

| | | | | | | | | | |
|---|---|---|---|---|---|---|---|---|---|
| M1407 | 19.9% | 19.9% | 19.9% | 72.4% | 11.2% | 11.2% | 37.3% | 950 | 250 |
| M1408 | 19.1% | 19.1% | 19.1% | 72.4% | 13.3% | 13.3% | 33.8% | 1150 | 150 |
| M1409 | 7.0% | 7.0% | 4.5% | 72.4% | 32.4% | 32.4% | 40.8% | 1150 | 350 |
| M1410 | 8.5% | 8.5% | 8.5% | 72.4% | 21.5% | 21.5% | 30.7% | 1000 | 150 |
| M1411 | 7.8% | 7.8% | 7.8% | 72.5% | 9.7% | 9.7% | 56.5% | 1000 | 100 |
| M1412 | 6.4% | 6.4% | 1.1% | 72.5% | 30.6% | 30.6% | 38.2% | 1150 | 300 |
| M1413 | 9.2% | 9.2% | 8.2% | 72.5% | 20.4% | 20.4% | 30.8% | 1150 | 100 |
| M1414 | 19.3% | 19.3% | 19.3% | 72.5% | 15.0% | 15.0% | 43.9% | 1000 | 250 |
| M1415 | 8.6% | 8.6% | 8.6% | 72.5% | 16.3% | 16.3% | 26.0% | 1100 | 0 |
| M1416 | 15.7% | 15.7% | 7.0% | 72.5% | 11.3% | 11.3% | 28.0% | 1150 | 50 |
| M1417 | 20.9% | 20.9% | 20.9% | 72.5% | 8.1% | 8.1% | 36.7% | 950 | 200 |
| M1418 | 21.9% | 21.9% | 21.9% | 72.5% | 18.8% | 18.8% | 42.1% | 1050 | 200 |
| M1419 | 9.1% | 9.1% | 9.1% | 72.5% | 14.6% | 14.6% | 50.2% | 1000 | 150 |
| M1420 | 17.4% | 17.4% | 16.3% | 72.5% | 16.0% | 16.0% | 34.8% | 1150 | 150 |
| M1421 | 14.5% | 14.5% | 14.5% | 72.5% | 14.0% | 14.0% | 36.1% | 1000 | 150 |
| M1422 | 7.3% | 7.3% | 7.3% | 72.5% | 27.1% | 27.1% | 38.0% | 1000 | 350 |
| M1423 | 7.8% | 7.8% | 7.8% | 72.5% | 32.0% | 32.0% | 41.0% | 1100 | 350 |
| M1424 | 10.2% | 10.2% | 10.2% | 72.5% | 8.9% | 8.9% | 44.1% | 1000 | 100 |
| M1425 | 8.2% | 8.2% | 8.2% | 72.5% | 25.0% | 25.0% | 34.3% | 1100 | 200 |
| M1426 | 13.2% | 13.2% | 13.2% | 72.5% | 16.7% | 16.7% | 47.8% | 950 | 150 |
| M1427 | 15.3% | 15.3% | 8.4% | 72.5% | 22.6% | 22.6% | 39.0% | 1100 | 200 |
| M1428 | 15.6% | 15.6% | 10.2% | 72.5% | 24.3% | 24.3% | 41.1% | 1100 | 250 |
| M1429 | 17.9% | 17.9% | 17.9% | 72.5% | 9.1% | 9.1% | 32.9% | 1000 | 150 |
| M1430 | 14.0% | 14.0% | 14.0% | 72.5% | 16.7% | 16.7% | 45.6% | 1000 | 150 |
| M1431 | 13.0% | 13.0% | 13.0% | 72.5% | 11.0% | 11.0% | 44.1% | 950 | 150 |
| M1432 | 14.2% | 14.2% | 14.2% | 72.5% | 19.0% | 19.0% | 34.0% | 1000 | 150 |
| M1433 | 21.3% | 21.3% | 21.3% | 72.5% | 24.8% | 24.8% | 47.6% | 1050 | 250 |
| M1434 | 8.6% | 8.6% | 8.6% | 72.5% | 19.7% | 19.7% | 29.0% | 1000 | 100 |
| M1435 | 10.4% | 10.4% | 10.4% | 72.5% | 7.5% | 7.5% | 18.6% | 1050 | −50 |
| M1436 | 18.1% | 18.1% | 18.1% | 72.6% | 23.7% | 23.7% | 43.3% | 1150 | 200 |
| M1437 | 10.3% | 10.3% | 9.4% | 72.6% | 9.4% | 9.4% | 20.5% | 1050 | −50 |
| M1438 | 17.8% | 17.8% | 17.8% | 72.6% | 17.6% | 17.6% | 36.5% | 1050 | 150 |
| M1439 | 8.4% | 8.4% | 8.4% | 72.6% | 11.7% | 11.7% | 53.8% | 1000 | 100 |
| M1440 | 12.5% | 12.5% | 10.1% | 72.6% | 16.9% | 16.9% | 30.5% | 1150 | 0 |
| M1441 | 7.6% | 7.6% | 7.6% | 72.6% | 9.6% | 9.6% | 63.3% | 1000 | 150 |
| M1442 | 12.2% | 12.2% | 12.2% | 72.6% | 12.9% | 12.9% | 40.1% | 1000 | 100 |
| M1443 | 10.1% | 10.1% | 10.1% | 72.6% | 16.0% | 16.0% | 30.0% | 1000 | 100 |
| M1444 | 9.8% | 9.8% | 7.5% | 72.6% | 26.2% | 26.2% | 37.1% | 1100 | 250 |
| M1445 | 10.1% | 10.1% | 10.1% | 72.6% | 12.3% | 12.3% | 23.2% | 1050 | −50 |
| M1446 | 14.2% | 14.2% | 14.2% | 72.6% | 12.9% | 12.9% | 46.5% | 1000 | 150 |
| M1447 | 8.7% | 8.7% | 8.7% | 72.6% | 21.2% | 21.2% | 30.5% | 1000 | 150 |
| M1448 | 16.7% | 16.7% | 16.7% | 72.6% | 17.8% | 17.8% | 48.5% | 1000 | 200 |
| M1449 | 11.7% | 11.7% | 7.8% | 72.6% | 9.6% | 9.6% | 22.0% | 1100 | −50 |
| M1450 | 4.8% | 4.8% | 4.8% | 72.6% | 19.6% | 19.6% | 37.1% | 1000 | 200 |
| M1451 | 9.4% | 9.4% | 9.4% | 72.6% | 24.2% | 24.2% | 34.6% | 1050 | 200 |
| M1452 | 9.9% | 9.9% | 7.6% | 72.6% | 23.7% | 23.7% | 34.7% | 1100 | 200 |
| M1453 | 17.8% | 17.8% | 6.6% | 72.6% | 18.2% | 18.2% | 37.0% | 1100 | 150 |
| M1454 | 4.9% | 4.9% | 4.9% | 72.6% | 29.6% | 29.6% | 35.3% | 1050 | 300 |
| M1455 | 8.0% | 8.0% | 8.0% | 72.6% | 7.9% | 7.9% | 46.0% | 950 | 100 |
| M1456 | 8.0% | 8.0% | 8.0% | 72.6% | 13.1% | 13.1% | 28.7% | 1000 | 50 |
| M1457 | 12.2% | 12.2% | 12.2% | 72.6% | 15.0% | 15.0% | 35.7% | 1000 | 100 |
| M1458 | 14.4% | 14.4% | 14.4% | 72.6% | 19.4% | 19.4% | 34.5% | 1000 | 100 |
| M1459 | 11.3% | 11.3% | 11.3% | 72.6% | 15.4% | 15.4% | 27.3% | 1000 | 0 |
| M1460 | 11.3% | 11.3% | 11.3% | 72.6% | 10.2% | 10.2% | 22.8% | 1000 | 0 |
| M1461 | 7.7% | 7.7% | 7.7% | 72.6% | 9.8% | 9.8% | 54.5% | 1000 | 100 |
| M1462 | 26.0% | 26.0% | 26.0% | 72.6% | 12.6% | 12.6% | 38.6% | 1050 | 250 |
| M1463 | 11.6% | 11.6% | 7.9% | 72.6% | 24.4% | 24.4% | 37.2% | 1150 | 200 |
| M1464 | 9.0% | 9.0% | 9.0% | 72.6% | 16.5% | 16.5% | 25.9% | 1000 | 0 |
| M1465 | 8.8% | 8.8% | 8.8% | 72.6% | 18.4% | 18.4% | 27.8% | 1000 | 50 |
| M1466 | 22.4% | 22.4% | 22.4% | 72.7% | 7.5% | 7.5% | 30.7% | 1050 | 200 |
| M1467 | 12.9% | 12.9% | 12.9% | 72.7% | 21.8% | 21.8% | 35.7% | 1050 | 150 |
| M1468 | 19.9% | 19.9% | 19.9% | 72.7% | 8.1% | 8.1% | 38.5% | 1000 | 250 |
| M1469 | 18.0% | 18.0% | 5.1% | 72.7% | 10.2% | 10.2% | 29.2% | 1150 | 50 |
| M1470 | 20.4% | 20.4% | 20.4% | 72.7% | 14.2% | 14.2% | 35.3% | 1000 | 250 |
| M1471 | 25.3% | 25.3% | 25.3% | 72.7% | 24.1% | 0.5% | 49.4% | 1150 | 450 |
| M1472 | 7.3% | 7.3% | 7.3% | 72.7% | 27.1% | 27.1% | 35.0% | 1000 | 300 |
| M1473 | 9.8% | 9.8% | 7.6% | 72.7% | 25.4% | 25.4% | 36.3% | 1150 | 200 |
| M1474 | 20.0% | 20.0% | 10.2% | 72.7% | 12.2% | 12.2% | 33.1% | 1100 | 150 |
| M1475 | 22.0% | 22.0% | 22.0% | 72.7% | 19.5% | 19.5% | 42.9% | 1150 | 200 |
| M1476 | 18.0% | 18.0% | 18.0% | 72.7% | 16.4% | 16.4% | 35.4% | 1100 | 150 |
| M1477 | 20.0% | 20.0% | 17.7% | 72.7% | 11.6% | 11.6% | 32.7% | 1100 | 200 |
| M1478 | 25.0% | 25.0% | 25.0% | 72.7% | 26.0% | 26.0% | 51.0% | 1150 | 450 |
| M1479 | 14.0% | 14.0% | 14.0% | 72.7% | 14.9% | 14.9% | 45.7% | 1000 | 150 |
| M1480 | 8.8% | 8.8% | 8.8% | 72.7% | 8.0% | 8.0% | 37.9% | 950 | 50 |
| M1481 | 13.5% | 13.5% | 13.5% | 72.7% | 16.7% | 16.7% | 31.0% | 1050 | 50 |
| M1482 | 8.8% | 8.8% | 8.8% | 72.7% | 19.3% | 19.3% | 28.7% | 1000 | 100 |
| M1483 | 9.7% | 9.7% | 9.7% | 72.7% | 20.2% | 20.2% | 30.8% | 1100 | 100 |
| M1484 | 7.5% | 7.5% | 7.5% | 72.7% | 19.8% | 19.8% | 35.4% | 1000 | 200 |

TABLE 11-continued

Compositions and thermodynamic criteria for vanadium carbides

| | | | | | | | | |
|---|---|---|---|---|---|---|---|---|
| M1485 | 8.0% | 8.0% | 8.0% | 72.7% | 31.0% | 31.0% | 40.1% | 1150 | 350 |
| M1486 | 13.9% | 13.9% | 13.9% | 72.7% | 11.9% | 11.9% | 54.6% | 950 | 200 |
| M1487 | 21.0% | 21.0% | 14.3% | 72.7% | 9.6% | 9.6% | 30.6% | 1200 | 150 |
| M1488 | 18.2% | 18.2% | 18.2% | 72.7% | 14.1% | 14.1% | 33.0% | 1000 | 150 |
| M1489 | 12.0% | 12.0% | 12.0% | 72.7% | 11.0% | 11.0% | 47.6% | 950 | 100 |
| M1490 | 7.7% | 7.7% | 7.7% | 72.7% | 7.8% | 7.8% | 58.4% | 950 | 100 |
| M1491 | 16.7% | 16.7% | 16.7% | 72.8% | 8.0% | 8.0% | 45.4% | 1000 | 200 |
| M1492 | 11.8% | 11.8% | 11.8% | 72.8% | 19.0% | 19.0% | 36.4% | 1000 | 200 |
| M1493 | 13.6% | 13.6% | 13.6% | 72.8% | 18.0% | 18.0% | 31.9% | 950 | 100 |
| M1494 | 8.3% | 8.3% | 8.3% | 72.8% | 13.8% | 13.8% | 47.5% | 950 | 100 |
| M1495 | 13.5% | 13.5% | 13.5% | 72.8% | 18.9% | 18.9% | 32.8% | 950 | 100 |
| M1496 | 7.8% | 7.8% | 7.8% | 72.8% | 34.1% | 34.1% | 43.1% | 1150 | 400 |
| M1497 | 25.1% | 25.1% | 25.1% | 72.8% | 24.6% | 24.6% | 49.7% | 1150 | 250 |
| M1498 | 9.0% | 9.0% | 9.0% | 72.8% | 19.0% | 19.0% | 32.0% | 950 | 150 |
| M1499 | 11.7% | 11.7% | 11.7% | 72.8% | 12.7% | 12.7% | 56.0% | 1000 | 200 |
| M1500 | 11.9% | 11.9% | 11.9% | 72.8% | 12.9% | 12.9% | 48.8% | 1000 | 100 |
| M1501 | 19.6% | 19.6% | 19.6% | 72.8% | 14.2% | 14.2% | 34.2% | 950 | 150 |
| M1502 | 21.1% | 21.1% | 21.1% | 72.8% | 13.9% | 13.9% | 35.0% | 1000 | 150 |
| M1503 | 13.2% | 13.2% | 13.2% | 72.8% | 19.6% | 19.6% | 33.7% | 1050 | 100 |
| M1504 | 10.5% | 10.5% | 10.5% | 72.8% | 7.8% | 7.8% | 58.8% | 1000 | 150 |
| M1505 | 23.2% | 23.2% | 23.2% | 72.8% | 9.9% | 9.9% | 33.9% | 1000 | 250 |
| M1506 | 9.3% | 9.3% | 9.3% | 72.8% | 9.0% | 9.0% | 45.6% | 950 | 50 |
| M1507 | 18.9% | 18.9% | 18.9% | 72.8% | 20.3% | 20.3% | 40.1% | 1050 | 150 |
| M1508 | 13.8% | 13.8% | 13.8% | 72.8% | 15.1% | 15.1% | 29.2% | 950 | 50 |
| M1509 | 11.8% | 11.8% | 11.8% | 72.9% | 9.2% | 9.2% | 29.1% | 950 | 50 |
| M1510 | 18.1% | 18.1% | 18.1% | 72.9% | 19.1% | 19.1% | 40.6% | 950 | 200 |
| M1511 | 12.3% | 12.3% | 10.4% | 72.9% | 26.3% | 26.3% | 39.5% | 1100 | 250 |
| M1512 | 7.6% | 7.6% | 7.6% | 72.9% | 8.8% | 8.8% | 57.0% | 950 | 100 |
| M1513 | 7.3% | 7.3% | 7.3% | 72.9% | 23.6% | 23.6% | 36.1% | 1000 | 300 |
| M1514 | 11.2% | 11.2% | 11.2% | 72.9% | 19.1% | 19.1% | 30.7% | 1000 | 150 |
| M1515 | 1.9% | 1.9% | 1.9% | 72.9% | 30.1% | 30.1% | 32.4% | 1000 | 250 |
| M1516 | 11.9% | 11.9% | 11.9% | 72.9% | 7.3% | 7.3% | 19.6% | 1050 | −50 |
| M1517 | 20.0% | 20.0% | 13.3% | 72.9% | 11.5% | 11.5% | 32.3% | 1150 | 150 |
| M1518 | 19.7% | 19.7% | 19.7% | 72.9% | 15.1% | 15.1% | 44.6% | 1000 | 250 |
| M1519 | 19.7% | 19.7% | 17.4% | 72.9% | 5.0% | 5.0% | 25.5% | 1150 | 150 |
| M1520 | 10.2% | 10.2% | 8.3% | 72.9% | 26.4% | 26.4% | 37.3% | 1100 | 250 |
| M1521 | 10.4% | 10.4% | 10.4% | 72.9% | 16.5% | 16.5% | 27.1% | 1000 | 0 |
| M1522 | 19.5% | 19.5% | 17.3% | 72.9% | 6.9% | 6.9% | 27.2% | 1150 | 100 |
| M1523 | 21.8% | 21.8% | 21.8% | 72.9% | 14.9% | 14.9% | 37.3% | 1000 | 200 |
| M1524 | 12.3% | 12.3% | 10.4% | 72.9% | 25.5% | 25.5% | 38.8% | 1100 | 250 |
| M1525 | 21.0% | 21.0% | 21.0% | 72.9% | 9.9% | 9.9% | 31.5% | 1000 | 200 |
| M1526 | 7.3% | 7.3% | 7.3% | 72.9% | 30.1% | 30.1% | 37.9% | 1000 | 350 |
| M1527 | 11.3% | 11.3% | 11.3% | 72.9% | 19.0% | 19.0% | 30.5% | 1000 | 100 |
| M1528 | 20.4% | 20.4% | 20.4% | 72.9% | 18.3% | 18.3% | 39.0% | 950 | 250 |
| M1529 | 14.2% | 14.2% | 14.2% | 72.9% | 16.2% | 16.2% | 32.8% | 1000 | 100 |
| M1530 | 9.8% | 9.8% | 9.8% | 72.9% | 8.1% | 8.1% | 21.2% | 1000 | −50 |
| M1531 | 8.8% | 8.8% | 8.3% | 72.9% | 18.9% | 18.9% | 28.3% | 1150 | 50 |
| M1532 | 8.4% | 8.4% | 8.0% | 72.9% | 26.5% | 26.5% | 35.6% | 1100 | 250 |
| M1533 | 21.4% | 21.4% | 21.4% | 72.9% | 20.1% | 20.1% | 45.1% | 950 | 250 |
| M1534 | 13.7% | 13.7% | 13.7% | 72.9% | 15.1% | 15.1% | 29.5% | 1100 | 50 |
| M1535 | 21.4% | 21.4% | 21.4% | 72.9% | 9.2% | 9.2% | 34.1% | 950 | 250 |
| M1536 | 13.3% | 13.3% | 13.3% | 72.9% | 21.6% | 21.6% | 35.3% | 1000 | 200 |
| M1537 | 8.8% | 8.8% | 8.8% | 72.9% | 20.7% | 20.7% | 30.1% | 1050 | 100 |
| M1538 | 10.7% | 10.7% | 10.7% | 72.9% | 9.0% | 9.0% | 42.8% | 1000 | 100 |
| M1539 | 10.3% | 10.3% | 10.3% | 72.9% | 9.8% | 9.8% | 59.9% | 950 | 150 |
| M1540 | 9.2% | 9.2% | 9.2% | 72.9% | 13.3% | 13.3% | 22.9% | 1050 | −50 |
| M1541 | 8.3% | 8.3% | 8.3% | 72.9% | 11.9% | 11.9% | 51.3% | 950 | 100 |
| M1542 | 7.6% | 7.6% | 7.6% | 73.0% | 7.8% | 7.8% | 59.8% | 1000 | 100 |
| M1543 | 21.3% | 21.3% | 21.3% | 73.0% | 9.2% | 9.2% | 34.0% | 1000 | 250 |
| M1544 | 11.2% | 11.2% | 11.2% | 73.0% | 16.1% | 16.1% | 36.0% | 1000 | 100 |
| M1545 | 2.7% | 2.7% | 2.4% | 73.0% | 30.5% | 30.5% | 33.9% | 1150 | 250 |
| M1546 | 9.1% | 9.1% | 9.1% | 73.0% | 12.0% | 12.0% | 41.7% | 1000 | 50 |
| M1547 | 7.7% | 7.7% | 7.7% | 73.0% | 7.8% | 7.8% | 56.2% | 1000 | 100 |
| M1548 | 9.7% | 9.7% | 9.7% | 73.0% | 9.9% | 9.9% | 52.9% | 1000 | 150 |
| M1549 | 10.2% | 10.2% | 8.3% | 73.0% | 25.5% | 25.5% | 36.5% | 1150 | 200 |
| M1550 | 10.1% | 10.1% | 10.1% | 73.0% | 9.1% | 9.1% | 37.4% | 950 | 50 |
| M1551 | 15.3% | 15.3% | 15.3% | 73.0% | 14.2% | 14.2% | 29.4% | 950 | 100 |
| M1552 | 8.5% | 8.5% | 8.2% | 73.0% | 23.2% | 23.2% | 32.4% | 1150 | 150 |
| M1553 | 19.0% | 19.0% | 19.0% | 73.0% | 9.6% | 9.6% | 29.0% | 1000 | 150 |
| M1554 | 7.6% | 7.6% | 7.6% | 73.0% | 18.1% | 18.1% | 31.4% | 950 | 150 |
| M1555 | 17.3% | 17.3% | 17.3% | 73.0% | 15.1% | 15.1% | 33.1% | 1100 | 150 |
| M1556 | 8.5% | 8.5% | 8.1% | 73.0% | 24.0% | 24.0% | 33.2% | 1150 | 150 |
| M1557 | 14.4% | 14.4% | 14.0% | 73.0% | 19.8% | 19.8% | 34.9% | 1150 | 100 |
| M1558 | 17.4% | 17.4% | 17.4% | 73.0% | 16.1% | 16.1% | 44.2% | 950 | 200 |
| M1559 | 11.8% | 11.8% | 8.4% | 73.0% | 14.3% | 14.3% | 26.6% | 1150 | −50 |
| M1560 | 17.9% | 17.9% | 16.0% | 73.0% | 23.9% | 23.9% | 42.9% | 1150 | 200 |
| M1561 | 8.3% | 8.3% | 8.3% | 73.0% | 14.6% | 14.6% | 22.9% | 1000 | −50 |
| M1562 | 8.8% | 8.8% | 8.8% | 73.0% | 21.4% | 21.4% | 30.7% | 1050 | 100 |

TABLE 11-continued

Compositions and thermodynamic criteria for vanadium carbides

| | | | | | | | | | |
|---|---|---|---|---|---|---|---|---|---|
| M1563 | 7.4% | 7.4% | 7.4% | 73.0% | 29.9% | 29.9% | 37.7% | 1050 | 350 |
| M1564 | 14.6% | 14.6% | 6.9% | 73.0% | 18.5% | 18.5% | 33.8% | 1150 | 50 |
| M1565 | 11.3% | 11.3% | 11.3% | 73.0% | 17.8% | 17.8% | 29.6% | 1100 | 50 |
| M1566 | 8.8% | 8.8% | 8.8% | 73.0% | 22.2% | 22.2% | 31.5% | 1050 | 150 |
| M1567 | 10.6% | 10.6% | 10.6% | 73.0% | 9.0% | 9.0% | 48.3% | 950 | 150 |
| M1568 | 21.3% | 21.3% | 21.3% | 73.0% | 10.6% | 10.6% | 36.1% | 1000 | 450 |
| M1569 | 13.9% | 13.9% | 13.6% | 73.0% | 26.5% | 26.5% | 41.3% | 1100 | 250 |
| M1570 | 10.2% | 10.2% | 9.9% | 73.0% | 17.2% | 17.2% | 27.8% | 1150 | 0 |
| M1571 | 7.5% | 7.5% | 4.4% | 73.0% | 28.7% | 28.7% | 36.9% | 1150 | 300 |
| M1572 | 12.5% | 12.5% | 12.5% | 73.0% | 19.2% | 19.2% | 31.8% | 950 | 200 |
| M1573 | 9.9% | 9.9% | 8.1% | 73.0% | 15.3% | 15.3% | 25.6% | 1150 | −50 |
| M1574 | 18.6% | 18.6% | 18.6% | 73.1% | 8.2% | 8.2% | 28.5% | 1000 | 150 |
| M1575 | 6.7% | 6.7% | 0.9% | 73.1% | 30.0% | 30.0% | 37.5% | 1150 | 300 |
| M1576 | 11.7% | 11.7% | 11.7% | 73.1% | 8.9% | 8.9% | 60.3% | 1000 | 200 |
| M1577 | 7.4% | 7.4% | 4.3% | 73.1% | 31.8% | 31.8% | 40.0% | 1150 | 350 |
| M1578 | 8.0% | 8.0% | 7.8% | 73.1% | 33.7% | 33.7% | 42.5% | 1150 | 400 |
| M1579 | 14.5% | 14.5% | 14.5% | 73.1% | 12.0% | 12.0% | 51.9% | 1000 | 200 |
| M1580 | 5.3% | 5.3% | 5.3% | 73.1% | 25.0% | 25.0% | 30.8% | 1100 | 200 |
| M1581 | 18.8% | 18.8% | 18.8% | 73.1% | 21.6% | 21.6% | 41.4% | 1100 | 150 |
| M1582 | 17.9% | 17.9% | 16.0% | 73.1% | 15.3% | 15.3% | 33.9% | 1150 | 150 |
| M1583 | 10.3% | 10.3% | 10.3% | 73.1% | 19.7% | 19.7% | 30.2% | 1050 | 100 |
| M1584 | 15.5% | 15.5% | 15.5% | 73.1% | 13.1% | 13.1% | 42.9% | 1000 | 150 |
| M1585 | 3.6% | 3.6% | 2.1% | 73.1% | 29.7% | 29.7% | 33.9% | 1150 | 250 |
| M1586 | 5.2% | 5.2% | 5.2% | 73.1% | 28.3% | 28.3% | 34.0% | 1100 | 250 |
| M1587 | 27.5% | 27.5% | 27.5% | 73.1% | 14.4% | 14.4% | 41.9% | 1150 | 250 |
| M1588 | 13.8% | 13.8% | 13.8% | 73.1% | 18.1% | 18.1% | 39.5% | 1000 | 200 |
| M1589 | 9.9% | 9.9% | 9.7% | 73.1% | 20.7% | 20.7% | 31.2% | 1150 | 100 |
| M1590 | 21.9% | 21.9% | 21.9% | 73.1% | 25.0% | 25.0% | 47.8% | 1050 | 300 |
| M1591 | 22.3% | 22.3% | 22.3% | 73.1% | 11.7% | 11.7% | 34.4% | 1000 | 250 |
| M1592 | 11.5% | 11.5% | 11.5% | 73.1% | 19.4% | 19.4% | 31.0% | 1000 | 100 |
| M1593 | 13.7% | 13.7% | 13.7% | 73.1% | 15.0% | 15.0% | 48.6% | 1000 | 150 |
| M1594 | 8.9% | 8.9% | 8.9% | 73.1% | 19.3% | 19.3% | 29.2% | 950 | 200 |
| M1595 | 9.4% | 9.4% | 9.4% | 73.1% | 15.2% | 15.2% | 24.5% | 1000 | 0 |
| M1596 | 21.6% | 21.6% | 21.6% | 73.1% | 6.4% | 6.4% | 35.5% | 1000 | 450 |
| M1597 | 11.5% | 11.5% | 11.5% | 73.1% | 20.2% | 20.2% | 31.7% | 1000 | 100 |
| M1598 | 13.7% | 13.7% | 13.7% | 73.1% | 11.3% | 11.3% | 30.8% | 950 | 100 |
| M1599 | 16.0% | 16.0% | 16.0% | 73.1% | 16.2% | 16.2% | 40.8% | 950 | 150 |
| M1600 | 18.7% | 18.7% | 15.5% | 73.2% | 24.6% | 24.6% | 44.3% | 1150 | 250 |
| M1601 | 9.2% | 9.2% | 9.2% | 73.2% | 8.0% | 8.0% | 48.0% | 950 | 100 |
| M1602 | 27.3% | 27.3% | 27.3% | 73.2% | 20.4% | 20.4% | 47.7% | 1000 | 350 |
| M1603 | 10.4% | 10.4% | 7.4% | 73.2% | 23.1% | 23.1% | 33.8% | 1100 | 150 |
| M1604 | 8.3% | 8.3% | 8.3% | 73.2% | 7.9% | 7.9% | 57.4% | 1000 | 100 |
| M1605 | 18.9% | 18.9% | 18.9% | 73.2% | 11.4% | 11.4% | 30.3% | 950 | 150 |
| M1606 | 20.0% | 20.0% | 20.0% | 73.2% | 10.2% | 10.2% | 42.5% | 950 | 250 |
| M1607 | 5.2% | 5.2% | 5.2% | 73.2% | 27.9% | 27.9% | 33.6% | 1100 | 250 |
| M1608 | 21.4% | 21.4% | 19.6% | 73.2% | 14.5% | 14.5% | 36.6% | 1150 | 200 |
| M1609 | 19.3% | 19.3% | 13.3% | 73.2% | 23.7% | 23.7% | 43.6% | 1100 | 250 |
| M1610 | 8.3% | 8.3% | 8.3% | 73.2% | 9.9% | 9.9% | 51.4% | 1000 | 100 |
| M1611 | 27.7% | 27.7% | 27.7% | 73.2% | 16.6% | 16.6% | 44.3% | 1000 | 400 |
| M1612 | 17.7% | 17.7% | 17.7% | 73.2% | 24.6% | 24.6% | 42.9% | 1050 | 250 |
| M1613 | 10.2% | 10.2% | 10.2% | 73.2% | 11.9% | 11.9% | 51.7% | 1000 | 150 |
| M1614 | 17.2% | 17.2% | 17.2% | 73.2% | 17.2% | 17.2% | 42.6% | 950 | 200 |
| M1615 | 14.3% | 14.3% | 14.3% | 73.2% | 26.3% | 26.3% | 41.1% | 1050 | 250 |
| M1616 | 18.6% | 18.6% | 18.4% | 73.2% | 25.8% | 25.8% | 45.1% | 1100 | 300 |
| M1617 | 12.7% | 12.7% | 9.6% | 73.2% | 19.7% | 19.7% | 32.9% | 1150 | 100 |
| M1618 | 15.2% | 15.2% | 6.0% | 73.2% | 11.5% | 11.5% | 26.8% | 1150 | 0 |
| M1619 | 16.1% | 16.1% | 16.1% | 73.2% | 13.2% | 13.2% | 42.3% | 1000 | 200 |
| M1620 | 18.9% | 18.9% | 18.9% | 73.3% | 12.3% | 12.3% | 31.2% | 950 | 150 |
| M1621 | 9.2% | 9.2% | 9.2% | 73.3% | 9.1% | 9.1% | 40.9% | 950 | 50 |
| M1622 | 15.2% | 15.2% | 15.2% | 73.3% | 12.0% | 12.0% | 27.7% | 1100 | 100 |
| M1623 | 15.3% | 15.3% | 7.8% | 73.3% | 15.1% | 15.1% | 30.7% | 1150 | 50 |
| M1624 | 15.0% | 15.0% | 7.7% | 73.3% | 18.6% | 18.6% | 34.0% | 1150 | 100 |
| M1625 | 5.0% | 5.0% | 5.0% | 73.3% | 34.2% | 34.2% | 39.8% | 1100 | 400 |
| M1626 | 15.4% | 15.4% | 15.4% | 73.3% | 8.0% | 8.0% | 52.3% | 1000 | 250 |
| M1627 | 28.2% | 28.2% | 28.2% | 73.3% | 12.7% | 12.7% | 40.9% | 1000 | 300 |
| M1628 | 13.8% | 13.8% | 13.8% | 73.3% | 9.0% | 9.0% | 57.2% | 1000 | 200 |
| M1629 | 14.4% | 14.4% | 5.8% | 73.3% | 21.9% | 21.9% | 36.6% | 1150 | 150 |
| M1630 | 14.6% | 14.6% | 14.6% | 73.3% | 8.0% | 8.0% | 54.5% | 1000 | 250 |
| M1631 | 27.3% | 27.3% | 27.3% | 73.3% | 16.7% | 16.7% | 44.9% | 1000 | 400 |
| M1632 | 22.7% | 22.7% | 22.7% | 73.3% | 20.0% | 20.0% | 43.2% | 1000 | 250 |
| M1633 | 15.1% | 15.1% | 13.4% | 73.3% | 9.9% | 9.9% | 25.3% | 1150 | 0 |
| M1634 | 19.0% | 19.0% | 19.0% | 73.3% | 10.5% | 10.5% | 30.0% | 1100 | 150 |
| M1635 | 23.7% | 23.7% | 23.7% | 73.3% | 9.9% | 9.9% | 33.9% | 1000 | 250 |
| M1636 | 25.0% | 25.0% | 25.0% | 73.3% | 12.7% | 12.7% | 40.1% | 1000 | 350 |
| M1637 | 5.1% | 5.1% | 5.1% | 73.3% | 33.8% | 33.8% | 39.4% | 1150 | 400 |
| M1638 | 24.1% | 24.1% | 24.1% | 73.3% | 20.0% | 20.0% | 47.5% | 1000 | 300 |
| M1639 | 19.4% | 19.4% | 6.2% | 73.3% | 12.2% | 12.2% | 32.0% | 1150 | 150 |
| M1640 | 8.5% | 8.5% | 8.5% | 73.3% | 9.1% | 9.1% | 39.1% | 950 | 0 |

TABLE 11-continued

Compositions and thermodynamic criteria for vanadium carbides

| | | | | | | | | | |
|---|---|---|---|---|---|---|---|---|---|
| M1641 | 25.1% | 25.1% | 25.1% | 73.4% | 14.2% | 14.2% | 39.3% | 1150 | 300 |
| M1642 | 15.0% | 15.0% | 15.0% | 73.4% | 12.1% | 12.1% | 29.1% | 1150 | 100 |
| M1643 | 22.4% | 22.4% | 22.4% | 73.4% | 11.4% | 11.4% | 33.9% | 950 | 250 |
| M1644 | 9.5% | 9.5% | 9.5% | 73.4% | 10.4% | 10.4% | 19.9% | 950 | −50 |
| M1645 | 11.8% | 11.8% | 11.8% | 73.4% | 15.4% | 15.4% | 27.2% | 1000 | 0 |
| M1646 | 19.1% | 19.1% | 19.1% | 73.4% | 22.3% | 22.3% | 41.9% | 1050 | 200 |
| M1647 | 11.8% | 11.8% | 11.8% | 73.4% | 9.3% | 9.3% | 21.6% | 950 | 0 |
| M1648 | 9.7% | 9.7% | 8.5% | 73.4% | 25.0% | 25.0% | 35.0% | 1150 | 200 |
| M1649 | 8.9% | 8.9% | 8.9% | 73.4% | 12.1% | 12.1% | 44.6% | 950 | 50 |
| M1650 | 7.5% | 7.5% | 7.5% | 73.4% | 32.4% | 32.4% | 40.2% | 1050 | 400 |
| M1651 | 20.6% | 20.6% | 20.6% | 73.4% | 7.4% | 7.4% | 28.2% | 1050 | 150 |
| M1652 | 13.0% | 13.0% | 13.0% | 73.4% | 10.3% | 10.3% | 27.8% | 1000 | 100 |
| M1653 | 19.2% | 19.2% | 13.2% | 73.4% | 14.3% | 14.3% | 33.9% | 1150 | 150 |
| M1654 | 25.1% | 25.1% | 22.0% | 73.4% | 16.3% | 16.3% | 41.4% | 1200 | 250 |
| M1655 | 21.8% | 21.8% | 21.8% | 73.4% | 16.3% | 11.0% | 38.1% | 1050 | 400 |
| M1656 | 10.4% | 10.4% | 10.4% | 73.4% | 19.0% | 19.0% | 29.6% | 1100 | 50 |
| M1657 | 22.0% | 22.0% | 20.6% | 73.4% | 5.1% | 5.1% | 27.1% | 1200 | 100 |
| M1658 | 21.0% | 21.0% | 21.0% | 73.4% | 25.9% | 25.9% | 47.5% | 1050 | 300 |
| M1659 | 11.2% | 11.2% | 11.2% | 73.4% | 8.1% | 8.1% | 48.4% | 950 | 150 |
| M1660 | 12.2% | 12.2% | 12.2% | 73.4% | 7.9% | 7.9% | 62.4% | 1000 | 250 |
| M1661 | 11.8% | 11.8% | 11.8% | 73.4% | 11.2% | 11.2% | 40.6% | 950 | 100 |
| M1662 | 9.1% | 9.1% | 9.1% | 73.4% | 9.1% | 9.1% | 42.4% | 950 | 50 |
| M1663 | 24.2% | 24.2% | 24.2% | 73.4% | 8.5% | 8.5% | 32.8% | 1050 | 200 |
| M1664 | 22.3% | 22.3% | 22.3% | 73.4% | 24.9% | 24.9% | 47.7% | 1000 | 300 |
| M1665 | 21.6% | 21.6% | 21.6% | 73.5% | 13.1% | 3.7% | 35.2% | 1000 | 400 |
| M1666 | 13.8% | 13.8% | 13.8% | 73.5% | 20.0% | 20.0% | 33.8% | 950 | 150 |
| M1667 | 26.8% | 26.8% | 26.8% | 73.5% | 5.3% | 5.3% | 32.4% | 1100 | 250 |
| M1668 | 12.9% | 12.9% | 10.2% | 73.5% | 23.2% | 23.2% | 36.3% | 1150 | 200 |
| M1669 | 27.9% | 27.9% | 27.9% | 73.5% | 16.6% | 16.6% | 44.5% | 1050 | 350 |
| M1670 | 7.9% | 7.9% | 7.9% | 73.5% | 11.4% | 11.4% | 20.8% | 950 | −50 |
| M1671 | 7.9% | 7.9% | 7.9% | 73.5% | 25.4% | 25.4% | 33.4% | 1100 | 200 |
| M1672 | 10.3% | 10.3% | 10.3% | 73.5% | 21.2% | 21.2% | 31.7% | 1100 | 100 |
| M1673 | 8.8% | 8.8% | 7.8% | 73.5% | 25.9% | 25.9% | 34.7% | 1100 | 250 |
| M1674 | 26.5% | 26.5% | 26.5% | 73.5% | 7.2% | 7.2% | 34.2% | 1100 | 250 |
| M1675 | 11.1% | 11.1% | 8.4% | 73.5% | 16.3% | 16.3% | 27.4% | 1150 | 0 |
| M1676 | 19.2% | 19.2% | 19.2% | 73.5% | 8.3% | 8.3% | 27.4% | 950 | 150 |
| M1677 | 8.9% | 8.9% | 7.9% | 73.5% | 23.4% | 23.4% | 32.3% | 1100 | 150 |
| M1678 | 27.5% | 27.5% | 27.5% | 73.5% | 20.3% | 20.3% | 47.8% | 1050 | 350 |
| M1679 | 13.1% | 13.1% | 13.1% | 73.5% | 11.1% | 11.1% | 45.5% | 1000 | 150 |
| M1680 | 8.8% | 8.8% | 7.8% | 73.5% | 26.7% | 26.7% | 35.5% | 1100 | 250 |
| M1681 | 10.6% | 10.6% | 8.1% | 73.5% | 24.9% | 24.9% | 35.7% | 1150 | 200 |
| M1682 | 28.4% | 28.4% | 28.4% | 73.5% | 12.7% | 12.7% | 41.0% | 1000 | 250 |
| M1683 | 20.9% | 20.9% | 16.5% | 73.5% | 14.4% | 14.4% | 35.7% | 1150 | 200 |
| M1684 | 3.1% | 3.1% | 2.2% | 73.5% | 30.0% | 30.0% | 33.1% | 1150 | 250 |
| M1685 | 20.7% | 20.7% | 20.7% | 73.5% | 19.8% | 19.8% | 40.7% | 1050 | 200 |
| M1686 | 19.5% | 19.5% | 14.0% | 73.5% | 23.8% | 23.8% | 43.8% | 1150 | 250 |
| M1687 | 9.2% | 9.2% | 8.1% | 73.5% | 17.3% | 17.3% | 26.5% | 1100 | 0 |
| M1688 | 13.9% | 13.9% | 13.9% | 73.6% | 13.4% | 13.4% | 36.9% | 950 | 100 |
| M1689 | 7.1% | 7.1% | 0.7% | 73.6% | 29.4% | 29.4% | 36.6% | 1150 | 300 |
| M1690 | 10.5% | 10.5% | 10.5% | 73.6% | 17.2% | 17.2% | 27.7% | 950 | 50 |
| M1691 | 7.7% | 7.7% | 4.1% | 73.6% | 31.2% | 31.2% | 39.2% | 1150 | 350 |
| M1692 | 11.0% | 11.0% | 11.0% | 73.6% | 13.3% | 13.3% | 36.2% | 950 | 50 |
| M1693 | 8.5% | 8.5% | 7.6% | 73.6% | 29.9% | 29.9% | 38.7% | 1150 | 300 |
| M1694 | 8.5% | 8.5% | 8.5% | 73.6% | 10.3% | 10.3% | 27.4% | 950 | 0 |
| M1695 | 15.0% | 15.0% | 15.0% | 73.6% | 12.3% | 12.3% | 27.2% | 1200 | 100 |
| M1696 | 22.4% | 22.4% | 22.4% | 73.6% | 25.1% | 25.1% | 47.9% | 1050 | 300 |
| M1697 | 11.5% | 11.5% | 11.5% | 73.6% | 11.1% | 11.1% | 51.6% | 950 | 150 |
| M1698 | 16.1% | 16.1% | 13.6% | 73.6% | 24.1% | 24.1% | 40.5% | 1150 | 200 |
| M1699 | 22.0% | 22.0% | 22.0% | 73.6% | 7.5% | 7.5% | 29.5% | 1000 | 200 |
| M1700 | 18.0% | 18.0% | 15.4% | 73.6% | 18.1% | 18.1% | 36.1% | 1100 | 150 |
| M1701 | 15.0% | 15.0% | 15.0% | 73.6% | 12.3% | 12.3% | 27.2% | 1150 | 100 |
| M1702 | 7.5% | 7.5% | 7.5% | 73.6% | 12.2% | 12.2% | 37.1% | 950 | 50 |
| M1703 | 21.8% | 21.8% | 21.8% | 73.6% | 19.1% | 10.1% | 40.9% | 1150 | 400 |
| M1704 | 10.5% | 10.5% | 10.5% | 73.6% | 9.2% | 9.2% | 39.5% | 950 | 50 |
| M1705 | 14.5% | 14.5% | 10.3% | 73.6% | 11.7% | 11.7% | 26.2% | 1200 | 50 |
| M1706 | 10.9% | 10.9% | 10.9% | 73.6% | 11.2% | 11.2% | 44.3% | 950 | 100 |
| M1707 | 12.9% | 12.9% | 12.9% | 73.6% | 13.3% | 13.3% | 44.7% | 950 | 100 |
| M1708 | 21.4% | 21.4% | 21.4% | 73.7% | 12.9% | 7.7% | 35.4% | 1000 | 450 |
| M1709 | 22.0% | 22.0% | 22.0% | 73.7% | 18.7% | 13.3% | 40.7% | 1100 | 400 |
| M1710 | 14.2% | 14.2% | 14.2% | 73.7% | 13.2% | 13.2% | 49.7% | 950 | 150 |
| M1711 | 27.6% | 27.6% | 27.6% | 73.7% | 12.8% | 12.8% | 42.0% | 1000 | 350 |
| M1712 | 12.8% | 12.8% | 12.8% | 73.7% | 11.1% | 11.1% | 52.7% | 950 | 200 |
| M1713 | 13.0% | 13.0% | 13.0% | 73.7% | 8.1% | 8.1% | 54.5% | 950 | 200 |
| M1714 | 21.9% | 21.9% | 21.9% | 73.7% | 19.2% | 11.6% | 41.1% | 1150 | 400 |
| M1715 | 12.9% | 12.9% | 12.9% | 73.7% | 13.2% | 13.2% | 44.6% | 950 | 100 |
| M1716 | 8.0% | 8.0% | 8.0% | 73.7% | 24.6% | 24.6% | 32.7% | 1100 | 200 |
| M1717 | 23.9% | 23.9% | 23.9% | 73.7% | 21.0% | 21.0% | 44.9% | 1000 | 300 |
| M1718 | 9.9% | 9.9% | 7.6% | 73.7% | 19.9% | 19.9% | 29.8% | 1100 | 100 |

TABLE 11-continued

Compositions and thermodynamic criteria for vanadium carbides

| | | | | | | | | |
|---|---|---|---|---|---|---|---|---|
| M1719 | 15.0% | 15.0% | 15.0% | 73.7% | 12.2% | 12.2% | 46.8% | 950 | 150 |
| M1720 | 11.5% | 11.5% | 11.5% | 73.7% | 8.0% | 8.0% | 58.6% | 1000 | 150 |
| M1721 | 19.5% | 19.5% | 17.0% | 73.7% | 24.1% | 24.1% | 44.0% | 1150 | 250 |
| M1722 | 22.4% | 22.4% | 22.4% | 73.7% | 14.6% | 14.6% | 37.0% | 1000 | 200 |
| M1723 | 17.0% | 17.0% | 17.0% | 73.7% | 10.4% | 10.4% | 34.9% | 1000 | 200 |
| M1724 | 17.1% | 17.1% | 17.1% | 73.7% | 11.3% | 11.3% | 48.9% | 950 | 200 |
| M1725 | 10.1% | 10.1% | 10.1% | 73.7% | 10.1% | 10.1% | 51.4% | 950 | 100 |
| M1726 | 13.9% | 13.9% | 13.9% | 73.7% | 9.2% | 9.2% | 43.4% | 950 | 150 |
| M1727 | 12.3% | 12.3% | 12.3% | 73.7% | 13.3% | 13.3% | 37.1% | 1000 | 100 |
| M1728 | 28.6% | 28.6% | 28.6% | 73.7% | 12.6% | 12.6% | 41.2% | 1050 | 200 |
| M1729 | 10.3% | 10.3% | 9.4% | 73.7% | 20.9% | 20.9% | 31.1% | 1200 | 100 |
| M1730 | 18.6% | 18.6% | 6.2% | 73.7% | 15.0% | 15.0% | 33.6% | 1100 | 100 |
| M1731 | 11.8% | 11.8% | 11.8% | 73.7% | 9.2% | 9.2% | 40.4% | 950 | 100 |
| M1732 | 28.1% | 28.1% | 28.1% | 73.7% | 16.5% | 16.5% | 44.6% | 1100 | 350 |
| M1733 | 7.6% | 7.6% | 7.6% | 73.8% | 34.2% | 34.2% | 42.0% | 1100 | 400 |
| M1734 | 12.3% | 12.3% | 7.3% | 73.8% | 24.0% | 24.0% | 36.3% | 1150 | 200 |
| M1735 | 16.6% | 16.6% | 15.6% | 73.8% | 12.0% | 12.0% | 28.6% | 1100 | 100 |
| M1736 | 15.9% | 15.9% | 15.9% | 73.8% | 24.4% | 24.4% | 40.3% | 1050 | 250 |
| M1737 | 14.5% | 14.5% | 14.5% | 73.8% | 9.2% | 9.2% | 46.9% | 950 | 150 |
| M1738 | 21.4% | 21.4% | 21.4% | 73.8% | 19.2% | 12.0% | 40.7% | 1200 | 400 |
| M1739 | 9.4% | 9.4% | 9.4% | 73.8% | 14.4% | 14.4% | 33.2% | 950 | 100 |
| M1740 | 4.1% | 4.1% | 4.1% | 73.8% | 19.9% | 19.9% | 45.3% | 1000 | 250 |
| M1741 | 22.2% | 22.2% | 19.5% | 73.8% | 10.0% | 10.0% | 32.2% | 1150 | 200 |
| M1742 | 8.6% | 8.6% | 8.6% | 73.8% | 7.5% | 7.5% | 16.1% | 1050 | -50 |
| M1743 | 27.7% | 27.7% | 27.7% | 73.8% | 20.1% | 20.1% | 47.8% | 1150 | 350 |
| M1744 | 7.7% | 7.7% | 7.7% | 73.8% | 33.8% | 33.8% | 41.6% | 1150 | 400 |
| M1745 | 17.5% | 17.5% | 17.5% | 73.8% | 10.4% | 10.4% | 38.4% | 950 | 200 |
| M1746 | 26.9% | 26.9% | 26.9% | 73.8% | 17.8% | 17.8% | 44.7% | 1150 | 350 |
| M1747 | 11.6% | 11.6% | 11.6% | 73.8% | 9.2% | 9.2% | 46.0% | 1000 | 150 |
| M1748 | 18.5% | 18.5% | 16.3% | 73.8% | 25.0% | 25.0% | 43.7% | 1200 | 250 |
| M1749 | 22.0% | 22.0% | 22.0% | 73.8% | 19.0% | 19.0% | 41.0% | 1150 | 350 |
| M1750 | 12.0% | 12.0% | 12.0% | 73.8% | 15.4% | 15.4% | 40.3% | 950 | 150 |
| M1751 | 9.6% | 9.6% | 9.6% | 73.8% | 9.2% | 9.2% | 43.1% | 1000 | 50 |
| M1752 | 18.0% | 18.0% | 9.7% | 73.8% | 11.7% | 11.7% | 29.6% | 1150 | 100 |
| M1753 | 6.6% | 6.6% | 6.6% | 73.9% | 24.0% | 24.0% | 41.1% | 950 | 300 |
| M1754 | 11.2% | 11.2% | 9.1% | 73.9% | 19.1% | 19.1% | 30.3% | 1100 | 50 |
| M1755 | 18.0% | 18.0% | 18.0% | 73.9% | 11.4% | 11.4% | 42.6% | 950 | 200 |
| M1756 | 27.2% | 27.2% | 27.2% | 73.9% | 23.6% | 23.6% | 50.8% | 1150 | 350 |
| M1757 | 9.5% | 9.5% | 9.5% | 73.9% | 13.4% | 13.4% | 32.2% | 950 | 50 |
| M1758 | 25.5% | 25.5% | 25.0% | 73.9% | 20.1% | 20.1% | 45.6% | 1250 | 250 |
| M1759 | 12.1% | 12.1% | 12.1% | 73.9% | 10.3% | 10.3% | 22.4% | 1050 | -50 |
| M1760 | 18.4% | 18.4% | 18.4% | 73.9% | 19.3% | 19.3% | 37.7% | 950 | 200 |
| M1761 | 12.5% | 12.5% | 12.5% | 73.9% | 24.9% | 24.9% | 37.4% | 1050 | 250 |
| M1762 | 13.2% | 13.2% | 10.2% | 73.9% | 20.0% | 20.0% | 33.2% | 1250 | 50 |
| M1763 | 16.7% | 16.7% | 16.7% | 73.9% | 10.3% | 10.3% | 32.0% | 1000 | 450 |
| M1764 | 21.8% | 21.8% | 19.6% | 73.9% | 25.0% | 25.0% | 47.1% | 1200 | 300 |
| M1765 | 9.9% | 9.9% | 9.9% | 73.9% | 10.4% | 10.4% | 23.7% | 950 | 0 |
| M1766 | 22.2% | 22.2% | 15.3% | 73.9% | 9.0% | 9.0% | 31.2% | 1150 | 200 |
| M1767 | 18.2% | 18.2% | 18.2% | 73.9% | 9.4% | 9.4% | 41.1% | 950 | 200 |
| M1768 | 15.1% | 15.1% | 14.4% | 74.0% | 19.2% | 19.2% | 34.3% | 1150 | 100 |
| M1769 | 28.3% | 28.3% | 28.3% | 74.0% | 16.1% | 0.0% | 44.4% | 1150 | 300 |
| M1770 | 20.9% | 20.9% | 20.9% | 74.0% | 11.9% | 11.9% | 34.5% | 1000 | 400 |
| M1771 | 11.5% | 11.5% | 11.5% | 74.0% | 19.1% | 19.1% | 30.7% | 950 | 100 |
| M1772 | 21.3% | 21.3% | 21.2% | 74.0% | 19.6% | 19.6% | 41.0% | 0 | 350 |
| M1773 | 11.6% | 11.6% | 11.6% | 74.0% | 13.6% | 13.6% | 31.0% | 950 | 50 |
| M1774 | 22.7% | 22.7% | 22.7% | 74.0% | 25.0% | 25.0% | 47.6% | 1050 | 300 |
| M1775 | 15.1% | 15.1% | 15.1% | 74.0% | 11.5% | 11.5% | 37.7% | 950 | 150 |
| M1776 | 9.6% | 9.6% | 9.2% | 74.0% | 11.1% | 11.1% | 20.7% | 1150 | -50 |
| M1777 | 6.4% | 6.4% | 0.9% | 74.1% | 29.7% | 29.7% | 36.1% | 1200 | 300 |
| M1778 | 18.3% | 18.3% | 5.2% | 74.1% | 16.8% | 16.8% | 35.0% | 1150 | 100 |
| M1779 | 27.8% | 27.8% | 27.8% | 74.1% | 19.6% | 0.0% | 47.4% | 1150 | 350 |
| M1780 | 7.8% | 7.8% | 7.8% | 74.1% | 30.2% | 30.2% | 38.1% | 1200 | 300 |
| M1781 | 19.6% | 19.6% | 19.6% | 74.1% | 7.5% | 7.5% | 27.0% | 1000 | 150 |
| M1782 | 14.9% | 14.9% | 14.8% | 74.1% | 5.3% | 5.3% | 20.2% | 1250 | -50 |
| M1783 | 11.2% | 11.2% | 11.2% | 74.1% | 10.5% | 10.5% | 24.8% | 950 | 50 |
| M1784 | 14.1% | 14.1% | 14.1% | 74.1% | 15.1% | 15.1% | 29.2% | 1000 | 50 |
| M1785 | 12.9% | 12.9% | 9.8% | 74.1% | 25.1% | 25.1% | 37.9% | 1200 | 200 |
| M1786 | 20.0% | 20.0% | 20.0% | 74.1% | 9.4% | 9.4% | 45.7% | 950 | 250 |
| M1787 | 12.5% | 12.5% | 10.5% | 74.1% | 17.9% | 17.9% | 30.4% | 0 | 0 |
| M1788 | 19.8% | 19.8% | 17.9% | 74.1% | 15.0% | 15.0% | 34.8% | 1350 | 150 |
| M1789 | 20.0% | 20.0% | 18.4% | 74.1% | 27.0% | 27.0% | 47.0% | 1250 | 400 |
| M1790 | 7.3% | 7.3% | 7.3% | 74.1% | 10.3% | 10.3% | 38.3% | 1000 | 0 |
| M1791 | 13.4% | 13.4% | 11.8% | 74.1% | 22.7% | 22.7% | 36.1% | 1200 | 150 |
| M1792 | 9.2% | 9.2% | 9.2% | 74.1% | 13.4% | 13.4% | 39.5% | 1000 | 100 |
| M1793 | 9.5% | 9.5% | 9.5% | 74.1% | 9.3% | 9.3% | 40.5% | 1000 | 50 |
| M1794 | 19.3% | 19.3% | 19.3% | 74.2% | 12.4% | 12.4% | 31.7% | 1100 | 150 |
| M1795 | 7.4% | 7.4% | 4.5% | 74.2% | 21.8% | 21.8% | 29.1% | 1200 | 100 |
| M1796 | 19.3% | 19.3% | 6.5% | 74.2% | 18.5% | 18.5% | 37.8% | 1150 | 150 |

TABLE 11-continued

Compositions and thermodynamic criteria for vanadium carbides

| | | | | | | | | | |
|---|---|---|---|---|---|---|---|---|---|
| M1797 | 20.5% | 20.5% | 11.8% | 74.2% | 19.7% | 19.7% | 40.2% | 1100 | 150 |
| M1798 | 20.1% | 20.1% | 18.4% | 74.2% | 27.4% | 27.2% | 47.5% | 0 | 450 |
| M1799 | 25.1% | 25.1% | 21.6% | 74.2% | 16.6% | 15.4% | 41.7% | 1300 | 400 |
| M1800 | 24.8% | 24.8% | 21.3% | 74.2% | 18.6% | 18.6% | 43.4% | 1350 | 250 |
| M1801 | 25.5% | 25.5% | 24.8% | 74.2% | 22.0% | 21.3% | 47.5% | 1300 | 450 |
| M1802 | 21.4% | 21.4% | 16.4% | 74.2% | 11.0% | 11.0% | 32.4% | 1200 | 200 |
| M1803 | 7.2% | 7.2% | 0.6% | 74.2% | 28.9% | 28.9% | 36.0% | 1200 | 300 |
| M1804 | 24.5% | 24.5% | 21.0% | 74.2% | 20.5% | 20.5% | 45.0% | 0 | 250 |
| M1805 | 7.3% | 7.3% | 7.3% | 74.2% | 8.1% | 8.1% | 48.5% | 950 | 50 |
| M1806 | 10.7% | 10.7% | 7.9% | 74.2% | 24.3% | 24.3% | 35.0% | 1200 | 200 |
| M1807 | 21.3% | 21.3% | 15.3% | 74.2% | 20.7% | 20.7% | 41.9% | 1200 | 200 |
| M1808 | 9.6% | 9.6% | 9.6% | 74.2% | 12.6% | 12.6% | 22.2% | 1050 | −50 |
| M1809 | 19.2% | 19.2% | 10.3% | 74.2% | 9.6% | 9.6% | 28.8% | 0 | 100 |
| M1810 | 12.1% | 12.1% | 12.1% | 74.2% | 11.5% | 11.5% | 38.7% | 950 | 100 |
| M1811 | 7.3% | 7.3% | 0.7% | 74.2% | 25.7% | 25.7% | 32.9% | 1250 | 200 |
| M1812 | 21.6% | 21.6% | 21.4% | 74.2% | 20.1% | 4.7% | 41.7% | 0 | 400 |
| M1813 | 14.0% | 14.0% | 14.0% | 74.2% | 8.2% | 8.2% | 56.8% | 950 | 200 |
| M1814 | 9.3% | 9.3% | 9.3% | 74.2% | 15.7% | 15.7% | 25.0% | 950 | 100 |
| M1815 | 14.1% | 14.1% | 11.3% | 74.2% | 23.5% | 23.5% | 37.6% | 1100 | 200 |
| M1816 | 12.9% | 12.9% | 12.9% | 74.2% | 12.6% | 12.6% | 31.0% | 950 | 100 |
| M1817 | 14.3% | 14.3% | 14.1% | 74.3% | 14.0% | 14.0% | 28.3% | 1250 | 50 |
| M1818 | 18.6% | 18.6% | 18.6% | 74.3% | 12.4% | 12.4% | 53.4% | 950 | 300 |
| M1819 | 11.8% | 11.8% | 9.2% | 74.3% | 25.2% | 25.2% | 37.0% | 1250 | 200 |
| M1820 | 17.0% | 17.0% | 17.0% | 74.3% | 12.2% | 12.2% | 29.2% | 950 | 400 |
| M1821 | 12.6% | 12.6% | 12.6% | 74.3% | 24.3% | 24.3% | 36.9% | 1050 | 200 |
| M1822 | 8.6% | 8.6% | 8.6% | 74.3% | 12.6% | 12.6% | 30.8% | 950 | 50 |
| M1823 | 9.7% | 9.7% | 9.7% | 74.3% | 13.5% | 13.5% | 38.8% | 950 | 100 |
| M1824 | 22.0% | 22.0% | 22.0% | 74.3% | 29.6% | 29.6% | 51.7% | 1000 | 500 |
| M1825 | 26.8% | 26.8% | 26.8% | 74.3% | 12.8% | 12.8% | 44.6% | 1000 | 350 |
| M1826 | 7.4% | 7.4% | 7.4% | 74.4% | 9.3% | 9.3% | 33.2% | 1000 | 0 |
| M1827 | 17.0% | 17.0% | 17.0% | 74.4% | 5.1% | 5.1% | 29.5% | 1000 | 400 |
| M1828 | 19.1% | 19.1% | 19.1% | 74.4% | 18.8% | 18.8% | 39.7% | 950 | 200 |
| M1829 | 15.6% | 15.6% | 14.4% | 74.4% | 25.3% | 25.3% | 40.9% | 1150 | 250 |
| M1830 | 17.2% | 17.2% | 17.2% | 74.4% | 18.7% | 18.7% | 35.9% | 950 | 200 |
| M1831 | 15.7% | 15.7% | 14.4% | 74.4% | 24.5% | 24.5% | 40.2% | 1100 | 250 |
| M1832 | 9.3% | 9.3% | 9.3% | 74.4% | 17.4% | 17.4% | 26.7% | 950 | 100 |
| M1833 | 18.5% | 18.5% | 6.0% | 74.4% | 16.1% | 16.1% | 34.6% | 1250 | 50 |
| M1834 | 18.1% | 18.1% | 15.1% | 74.4% | 16.6% | 16.6% | 34.7% | 1150 | 150 |
| M1835 | 20.5% | 20.5% | 20.5% | 74.4% | 24.2% | 24.2% | 44.7% | 1050 | 250 |
| M1836 | 11.1% | 11.1% | 11.1% | 74.4% | 16.8% | 16.8% | 30.2% | 950 | 150 |
| M1837 | 20.5% | 20.5% | 20.5% | 74.4% | 10.5% | 5.4% | 35.3% | 1000 | 450 |
| M1838 | 13.0% | 13.0% | 10.6% | 74.4% | 25.3% | 25.3% | 38.3% | 1150 | 250 |
| M1839 | 16.0% | 16.0% | 14.7% | 74.4% | 20.3% | 20.3% | 36.2% | 1150 | 100 |
| M1840 | 17.3% | 17.3% | 17.3% | 74.4% | 8.3% | 8.3% | 56.9% | 950 | 250 |
| M1841 | 19.0% | 19.0% | 17.7% | 74.4% | 25.3% | 25.3% | 44.3% | 1250 | 250 |
| M1842 | 19.3% | 19.3% | 7.9% | 74.4% | 11.7% | 11.7% | 31.0% | 1200 | 100 |
| M1843 | 16.4% | 16.4% | 16.4% | 74.4% | 18.5% | 18.5% | 34.9% | 1150 | 250 |
| M1844 | 9.9% | 9.9% | 9.9% | 74.5% | 11.5% | 11.5% | 37.0% | 950 | 50 |
| M1845 | 12.0% | 12.0% | 12.0% | 74.5% | 9.3% | 9.3% | 44.5% | 950 | 150 |
| M1846 | 23.8% | 23.8% | 23.8% | 74.5% | 14.8% | 14.8% | 38.5% | 1050 | 250 |
| M1847 | 19.5% | 19.5% | 7.3% | 74.5% | 18.7% | 18.7% | 38.1% | 1250 | 150 |
| M1848 | 10.0% | 10.0% | 7.6% | 74.5% | 15.7% | 15.7% | 25.8% | 1300 | 0 |
| M1849 | 14.9% | 14.9% | 14.9% | 74.5% | 11.7% | 11.7% | 34.8% | 950 | 150 |
| M1850 | 18.1% | 18.1% | 13.7% | 74.5% | 10.1% | 10.1% | 28.2% | 1300 | 100 |
| M1851 | 16.4% | 16.4% | 16.4% | 74.5% | 14.6% | 14.6% | 31.0% | 950 | 150 |
| M1852 | 14.8% | 14.8% | 14.8% | 74.5% | 9.4% | 9.4% | 45.1% | 950 | 150 |
| M1853 | 5.6% | 5.6% | 1.2% | 74.5% | 30.0% | 30.0% | 35.6% | 1300 | 300 |
| M1854 | 17.0% | 17.0% | 5.9% | 74.5% | 11.8% | 11.8% | 28.8% | 1200 | 50 |
| M1855 | 20.2% | 20.2% | 20.2% | 74.5% | 10.5% | 10.5% | 47.2% | 950 | 250 |
| M1856 | 10.9% | 10.9% | 10.9% | 74.5% | 5.1% | 5.1% | 28.8% | 1050 | 50 |
| M1857 | 10.6% | 10.6% | 10.6% | 74.5% | 4.6% | 4.6% | 29.0% | 1000 | 50 |
| M1858 | 13.8% | 13.8% | 8.7% | 74.5% | 19.2% | 19.2% | 32.9% | 1350 | 100 |
| M1859 | 24.8% | 24.8% | 23.9% | 74.5% | 27.6% | 0.2% | 52.4% | 0 | 450 |
| M1860 | 19.4% | 19.4% | 4.0% | 74.5% | 8.9% | 8.9% | 28.3% | 1150 | 50 |
| M1861 | 10.8% | 10.8% | 10.8% | 74.6% | 10.4% | 10.4% | 27.0% | 1150 | 0 |
| M1862 | 8.6% | 8.6% | 8.6% | 74.6% | 8.3% | 8.3% | 41.4% | 950 | 50 |
| M1863 | 10.0% | 10.0% | 10.0% | 74.6% | 9.4% | 9.4% | 35.4% | 950 | 50 |
| M1864 | 13.9% | 13.9% | 13.9% | 74.6% | 13.8% | 13.8% | 34.4% | 950 | 100 |
| M1865 | 10.3% | 10.3% | 10.3% | 74.6% | 13.6% | 13.6% | 38.0% | 950 | 100 |
| M1866 | 17.1% | 17.1% | 12.1% | 74.6% | 20.9% | 20.9% | 38.0% | 1350 | 150 |
| M1867 | 13.7% | 13.7% | 11.2% | 74.6% | 14.0% | 14.0% | 27.7% | 1150 | 50 |
| M1868 | 7.8% | 7.8% | 7.7% | 74.6% | 29.7% | 29.7% | 37.5% | 1350 | 300 |
| M1869 | 22.8% | 22.8% | 20.1% | 74.6% | 15.8% | 15.8% | 38.6% | 1150 | 250 |
| M1870 | 17.4% | 17.4% | 17.4% | 74.6% | 7.7% | 0.2% | 25.1% | 1000 | 400 |
| M1871 | 7.9% | 7.9% | 3.9% | 74.6% | 30.1% | 30.1% | 38.0% | 0 | 300 |
| M1872 | 16.6% | 16.6% | 16.6% | 74.6% | 18.1% | 18.1% | 34.7% | 1050 | 350 |
| M1873 | 11.9% | 11.9% | 11.9% | 74.6% | 12.3% | 12.3% | 24.2% | 950 | 0 |
| M1874 | 15.2% | 15.2% | 15.2% | 74.6% | 10.5% | 10.5% | 45.4% | 950 | 150 |

TABLE 11-continued

Compositions and thermodynamic criteria for vanadium carbides

| | | | | | | | | | |
|---|---|---|---|---|---|---|---|---|---|
| M1875 | 14.0% | 14.0% | 14.0% | 74.6% | 9.4% | 9.4% | 43.3% | 950 | 150 |
| M1876 | 11.7% | 11.7% | 10.1% | 74.6% | 12.3% | 12.3% | 23.9% | 0 | 0 |
| M1877 | 7.4% | 7.4% | 7.4% | 74.6% | 9.6% | 9.6% | 22.4% | 950 | −50 |
| M1878 | 20.5% | 20.5% | 11.6% | 74.6% | 19.0% | 19.0% | 39.5% | 0 | 150 |
| M1879 | 19.9% | 19.9% | 19.9% | 74.7% | 15.4% | 15.4% | 35.3% | 950 | 200 |
| M1880 | 12.5% | 12.5% | 12.5% | 74.7% | 9.4% | 9.4% | 43.8% | 950 | 100 |
| M1881 | 22.0% | 22.0% | 22.0% | 74.7% | 30.8% | 30.8% | 52.8% | 1000 | 450 |
| M1882 | 17.2% | 17.2% | 17.2% | 74.7% | 10.9% | 5.9% | 28.1% | 1100 | 400 |
| M1883 | 9.2% | 9.2% | 9.2% | 74.7% | 25.1% | 25.1% | 34.2% | 1150 | 200 |
| M1884 | 22.8% | 22.8% | 22.8% | 74.7% | 20.0% | 20.0% | 42.8% | 950 | 300 |
| M1885 | 6.0% | 6.0% | 6.0% | 74.7% | 20.5% | 20.5% | 44.1% | 950 | 250 |
| M1886 | 9.2% | 9.2% | 9.2% | 74.7% | 11.7% | 11.7% | 28.9% | 950 | 50 |
| M1887 | 27.3% | 27.3% | 27.3% | 74.7% | 22.9% | 0.0% | 50.1% | 1150 | 350 |
| M1888 | 16.7% | 16.7% | 16.7% | 74.7% | 16.6% | 16.6% | 33.4% | 0 | 300 |
| M1889 | 10.9% | 10.9% | 10.9% | 74.7% | 15.9% | 15.9% | 30.9% | 950 | 150 |
| M1890 | 18.0% | 18.0% | 17.6% | 74.7% | 12.3% | 12.3% | 30.3% | 0 | 150 |
| M1891 | 9.4% | 9.4% | 8.7% | 74.7% | 16.9% | 16.9% | 26.2% | 1200 | 0 |
| M1892 | 18.7% | 18.7% | 5.2% | 74.7% | 10.8% | 10.8% | 29.5% | 1200 | 100 |
| M1893 | 15.3% | 15.3% | 7.2% | 74.7% | 17.4% | 17.4% | 32.6% | 0 | 50 |
| M1894 | 11.0% | 11.0% | 11.0% | 74.7% | 11.5% | 11.5% | 39.8% | 950 | 50 |
| M1895 | 7.8% | 7.8% | 7.8% | 74.7% | 8.3% | 8.3% | 39.3% | 1000 | −50 |
| M1896 | 19.7% | 19.7% | 8.1% | 74.7% | 18.8% | 18.8% | 38.5% | 1150 | 200 |
| M1897 | 22.2% | 22.2% | 22.2% | 74.7% | 29.1% | 29.1% | 51.3% | 1000 | 450 |
| M1898 | 19.8% | 19.8% | 17.9% | 74.7% | 27.5% | 27.5% | 47.3% | 0 | 300 |
| M1899 | 9.0% | 9.0% | 9.0% | 74.7% | 9.4% | 9.4% | 41.4% | 950 | 0 |
| M1900 | 12.5% | 12.5% | 12.5% | 74.7% | 26.5% | 26.5% | 39.0% | 0 | 250 |
| M1901 | 7.9% | 7.9% | 7.9% | 74.7% | 6.4% | 6.4% | 28.2% | 1050 | 100 |
| M1902 | 9.2% | 9.2% | 9.2% | 74.8% | 10.6% | 10.6% | 27.9% | 950 | 0 |
| M1903 | 17.7% | 17.7% | 17.7% | 74.8% | 11.6% | 11.6% | 48.6% | 950 | 200 |
| M1904 | 20.7% | 20.7% | 17.3% | 74.8% | 12.6% | 12.6% | 33.3% | 0 | 150 |
| M1905 | 6.7% | 6.7% | 6.7% | 74.8% | 30.2% | 30.2% | 36.9% | 1050 | 350 |
| M1906 | 22.1% | 22.1% | 20.4% | 74.8% | 15.1% | 15.1% | 37.2% | 0 | 200 |
| M1907 | 22.0% | 22.0% | 14.8% | 74.8% | 9.3% | 9.3% | 31.4% | 0 | 200 |
| M1908 | 12.5% | 12.5% | 8.9% | 74.8% | 9.3% | 9.3% | 21.8% | 1300 | −50 |
| M1909 | 19.5% | 19.5% | 6.4% | 74.8% | 15.3% | 15.3% | 34.8% | 1250 | 150 |
| M1910 | 20.8% | 20.8% | 20.8% | 74.8% | 14.9% | 14.9% | 49.1% | 950 | 250 |
| M1911 | 7.1% | 7.1% | 7.1% | 74.8% | 4.9% | 4.9% | 28.6% | 1000 | 50 |
| M1912 | 6.8% | 6.8% | 6.8% | 74.8% | 13.8% | 13.8% | 29.2% | 950 | 100 |
| M1913 | 22.1% | 22.1% | 17.8% | 74.8% | 18.5% | 18.5% | 40.6% | 0 | 200 |
| M1914 | 16.6% | 16.6% | 16.6% | 74.8% | 17.5% | 17.5% | 34.1% | 1150 | 400 |
| M1915 | 7.5% | 7.5% | 7.5% | 74.8% | 11.6% | 11.6% | 37.4% | 950 | 50 |
| M1916 | 19.2% | 19.2% | 17.0% | 74.8% | 20.3% | 20.3% | 39.5% | 1250 | 150 |
| M1917 | 13.1% | 13.1% | 9.9% | 74.8% | 19.4% | 19.4% | 32.5% | 1200 | 100 |
| M1918 | 6.9% | 6.9% | 6.9% | 74.8% | 20.2% | 20.2% | 27.1% | 950 | 150 |
| M1919 | 13.2% | 13.2% | 13.2% | 74.8% | 10.6% | 10.6% | 36.1% | 950 | 100 |
| M1920 | 22.2% | 22.2% | 19.4% | 74.8% | 22.0% | 22.0% | 44.2% | 0 | 200 |
| M1921 | 19.0% | 19.0% | 18.1% | 74.8% | 12.3% | 12.3% | 31.3% | 1200 | 150 |
| M1922 | 7.0% | 7.0% | 7.0% | 74.8% | 12.9% | 12.9% | 20.1% | 950 | 0 |
| M1923 | 6.7% | 6.7% | 6.7% | 74.8% | 4.4% | 4.4% | 28.6% | 1100 | 0 |
| M1924 | 14.0% | 14.0% | 11.0% | 74.8% | 24.6% | 24.6% | 38.6% | 1200 | 250 |
| M1925 | 9.8% | 9.8% | 9.8% | 74.8% | 11.8% | 11.8% | 26.1% | 950 | 0 |
| M1926 | 17.3% | 17.3% | 17.3% | 74.8% | 10.1% | 10.1% | 27.5% | 1000 | 350 |
| M1927 | 20.1% | 20.1% | 20.1% | 74.8% | 8.5% | 8.5% | 49.4% | 950 | 300 |
| M1928 | 8.6% | 8.6% | 7.2% | 74.8% | 31.4% | 31.4% | 39.9% | 0 | 350 |
| M1929 | 16.0% | 16.0% | 6.0% | 74.8% | 15.5% | 15.5% | 31.5% | 0 | 50 |
| M1930 | 15.0% | 15.0% | 15.0% | 74.8% | 11.7% | 11.7% | 41.7% | 950 | 150 |
| M1931 | 19.7% | 19.7% | 19.7% | 74.8% | 9.6% | 9.6% | 38.3% | 950 | 250 |
| M1932 | 16.9% | 16.9% | 16.9% | 74.8% | 18.2% | 18.2% | 35.1% | 0 | 350 |
| M1933 | 18.8% | 18.8% | 18.8% | 74.9% | 16.5% | 16.5% | 35.4% | 1000 | 150 |
| M1934 | 23.5% | 23.5% | 23.5% | 74.9% | 15.1% | 15.1% | 38.6% | 1000 | 250 |
| M1935 | 10.7% | 10.7% | 10.7% | 74.9% | 13.7% | 13.7% | 37.0% | 950 | 100 |
| M1936 | 14.6% | 14.6% | 11.5% | 74.9% | 15.1% | 15.1% | 29.7% | 0 | 50 |
| M1937 | 14.4% | 14.4% | 12.8% | 74.9% | 24.8% | 24.8% | 39.2% | 0 | 250 |
| M1938 | 7.0% | 7.0% | 7.0% | 74.9% | 9.6% | 9.6% | 32.1% | 950 | 0 |
| M1939 | 19.2% | 19.2% | 7.7% | 74.9% | 12.0% | 12.0% | 31.2% | 0 | 100 |
| M1940 | 7.2% | 7.2% | 7.2% | 74.9% | 9.6% | 9.6% | 23.8% | 950 | −50 |
| M1941 | 10.1% | 10.1% | 9.0% | 74.9% | 22.3% | 22.3% | 32.5% | 0 | 150 |
| M1942 | 17.4% | 17.4% | 17.4% | 74.9% | 12.7% | 5.1% | 30.1% | 1150 | 400 |
| M1943 | 23.3% | 23.3% | 22.5% | 74.9% | 17.8% | 17.8% | 41.1% | 1250 | 250 |
| M1944 | 14.7% | 14.7% | 5.3% | 74.9% | 19.2% | 19.2% | 33.9% | 0 | 100 |
| M1945 | 17.2% | 17.2% | 17.2% | 74.9% | 13.0% | 13.0% | 30.2% | 0 | 350 |
| M1946 | 14.8% | 14.8% | 14.5% | 74.9% | 24.9% | 24.9% | 39.7% | 0 | 250 |
| M1947 | 7.7% | 7.7% | 7.7% | 74.9% | 9.5% | 9.5% | 35.7% | 950 | 0 |
| M1948 | 8.9% | 8.9% | 8.9% | 74.9% | 10.6% | 10.6% | 37.9% | 950 | 50 |
| M1949 | 16.9% | 16.9% | 16.9% | 74.9% | 16.4% | 16.4% | 33.3% | 0 | 350 |
| M1950 | 11.0% | 11.0% | 11.0% | 74.9% | 7.6% | 7.6% | 27.4% | 950 | 50 |
| M1951 | 7.0% | 7.0% | 7.0% | 74.9% | 9.5% | 9.5% | 31.9% | 950 | 0 |
| M1952 | 12.5% | 12.5% | 10.3% | 74.9% | 16.4% | 16.4% | 28.9% | 0 | 0 |

TABLE 11-continued

| | Compositions and thermodynamic criteria for vanadium carbides | | | | | | | | |
|---|---|---|---|---|---|---|---|---|---|
| M1953 | 20.2% | 20.2% | 9.0% | 74.9% | 15.5% | 15.5% | 35.6% | 0 | 150 |
| M1954 | 13.8% | 13.8% | 12.6% | 74.9% | 17.8% | 17.8% | 31.7% | 0 | 50 |
| M1955 | 20.6% | 20.6% | 13.2% | 74.9% | 11.3% | 11.3% | 31.9% | 0 | 150 |
| M1956 | 23.6% | 23.6% | 21.3% | 74.9% | 9.6% | 9.6% | 33.2% | 0 | 200 |
| M1957 | 21.0% | 21.0% | 21.0% | 74.9% | 9.7% | 9.7% | 39.7% | 950 | 250 |
| M1958 | 11.2% | 11.2% | 10.3% | 74.9% | 24.8% | 24.8% | 36.0% | 0 | 200 |
| M1959 | 9.0% | 9.0% | 8.3% | 74.9% | 24.9% | 24.9% | 33.9% | 0 | 200 |
| M1960 | 13.9% | 13.9% | 5.6% | 74.9% | 19.1% | 19.1% | 33.1% | 1200 | 100 |
| M1961 | 13.4% | 13.4% | 12.2% | 74.9% | 24.9% | 24.9% | 38.3% | 0 | 250 |
| M1962 | 11.9% | 11.9% | 8.3% | 75.0% | 19.6% | 19.6% | 31.5% | 0 | 100 |
| M1963 | 17.7% | 17.7% | 17.7% | 75.0% | 13.9% | 13.9% | 37.6% | 950 | 200 |
| M1964 | 25.5% | 25.5% | 25.5% | 75.0% | 9.2% | 9.2% | 34.7% | 1050 | 300 |
| M1965 | 6.9% | 6.9% | 6.9% | 75.0% | 21.8% | 21.8% | 28.7% | 1000 | 150 |
| M1966 | 7.2% | 7.2% | 0.5% | 75.0% | 27.0% | 27.0% | 34.2% | 0 | 250 |
| M1967 | 13.5% | 13.5% | 13.5% | 75.0% | 12.8% | 12.8% | 36.9% | 950 | 100 |
| M1968 | 15.6% | 15.6% | 15.6% | 75.0% | 10.1% | 10.1% | 25.8% | 1000 | 100 |
| M1969 | 18.6% | 18.6% | 15.7% | 75.0% | 24.6% | 24.6% | 43.2% | 1200 | 250 |
| M1970 | 14.8% | 14.8% | 14.8% | 75.0% | 9.8% | 9.8% | 28.2% | 950 | 150 |
| M1971 | 8.3% | 8.3% | 8.3% | 75.0% | 9.6% | 9.6% | 33.3% | 950 | 0 |
| M1972 | 15.6% | 15.6% | 15.6% | 75.0% | 8.8% | 0.0% | 29.9% | 1000 | 250 |
| M1973 | 8.0% | 8.0% | 7.7% | 75.0% | 25.1% | 25.1% | 33.0% | 0 | 200 |
| M1974 | 18.7% | 18.7% | 18.3% | 75.0% | 19.6% | 19.6% | 38.3% | 1200 | 150 |
| M1975 | 17.5% | 17.5% | 8.3% | 75.0% | 14.0% | 14.0% | 31.5% | 0 | 100 |
| M1976 | 19.7% | 19.7% | 9.5% | 75.0% | 12.0% | 12.0% | 31.6% | 1250 | 100 |
| M1977 | 16.9% | 16.9% | 5.6% | 75.0% | 13.7% | 13.7% | 30.6% | 1250 | 50 |
| M1978 | 10.9% | 10.9% | 7.8% | 75.0% | 19.7% | 19.7% | 30.6% | 0 | 100 |
| M1979 | 3.9% | 3.9% | 1.6% | 75.0% | 29.9% | 29.9% | 33.8% | 0 | 250 |
| M1980 | 13.7% | 13.7% | 11.7% | 75.0% | 16.2% | 16.2% | 29.9% | 0 | 50 |
| M1981 | 10.7% | 10.7% | 10.7% | 75.0% | 13.9% | 13.9% | 30.6% | 950 | 100 |
| M1982 | 8.8% | 8.8% | 7.4% | 75.0% | 24.9% | 24.9% | 33.7% | 0 | 200 |
| M1983 | 9.6% | 9.6% | 9.6% | 75.0% | 11.8% | 11.8% | 27.7% | 950 | 50 |
| M1984 | 9.0% | 9.0% | 7.6% | 75.0% | 19.8% | 19.8% | 28.8% | 0 | 100 |
| M1985 | 22.3% | 22.3% | 20.7% | 75.0% | 25.6% | 25.6% | 47.8% | 1150 | 300 |
| M1986 | 20.4% | 20.4% | 20.4% | 75.0% | 14.1% | 14.1% | 38.3% | 950 | 250 |
| M1987 | 14.6% | 14.6% | 14.0% | 75.0% | 9.9% | 9.9% | 24.5% | 0 | 0 |
| M1988 | 13.6% | 13.6% | 13.6% | 75.0% | 11.8% | 11.8% | 35.9% | 950 | 100 |
| M1989 | 9.7% | 9.7% | 7.1% | 75.1% | 22.4% | 22.4% | 32.1% | 0 | 150 |
| M1990 | 18.2% | 18.2% | 18.2% | 75.1% | 9.8% | 9.8% | 32.5% | 950 | 200 |
| M1991 | 11.6% | 11.6% | 11.6% | 75.1% | 16.7% | 16.7% | 28.3% | 950 | 50 |
| M1992 | 15.4% | 15.4% | 13.6% | 75.1% | 9.7% | 9.7% | 25.1% | 0 | 50 |
| M1993 | 12.1% | 12.1% | 9.2% | 75.1% | 19.7% | 19.7% | 31.8% | 0 | 100 |
| M1994 | 20.9% | 20.9% | 20.0% | 75.1% | 4.9% | 4.9% | 25.8% | 0 | 100 |
| M1995 | 10.7% | 10.7% | 10.7% | 75.1% | 11.8% | 11.8% | 37.3% | 950 | 50 |
| M1996 | 11.0% | 11.0% | 11.0% | 75.1% | 9.6% | 9.6% | 33.8% | 950 | 50 |
| M1997 | 7.0% | 7.0% | 7.0% | 75.1% | 16.4% | 16.4% | 23.5% | 950 | 50 |
| M1998 | 9.6% | 9.6% | 9.6% | 75.1% | 9.6% | 9.6% | 34.5% | 950 | 0 |
| M1999 | 22.1% | 22.1% | 22.1% | 75.1% | 30.3% | 30.3% | 52.4% | 1050 | 450 |
| M2000 | 14.9% | 14.9% | 14.5% | 75.1% | 24.1% | 24.1% | 38.9% | 0 | 200 |
| M2001 | 18.5% | 18.5% | 18.5% | 75.1% | 10.8% | 10.8% | 39.1% | 950 | 200 |
| M2002 | 18.4% | 18.4% | 18.4% | 75.1% | 7.5% | 7.5% | 25.9% | 1000 | 100 |
| M2003 | 12.8% | 12.8% | 12.8% | 75.1% | 9.5% | 9.5% | 46.7% | 950 | 150 |
| M2004 | 12.9% | 12.9% | 12.8% | 75.1% | 19.9% | 19.9% | 32.8% | 0 | 100 |
| M2005 | 11.3% | 11.3% | 11.3% | 75.1% | 15.2% | 15.2% | 29.0% | 950 | 100 |
| M2006 | 14.4% | 14.4% | 14.4% | 75.1% | 9.7% | 9.7% | 38.2% | 950 | 150 |
| M2007 | 13.1% | 13.1% | 10.4% | 75.1% | 23.2% | 23.2% | 36.3% | 0 | 200 |
| M2008 | 20.3% | 20.3% | 14.4% | 75.1% | 19.4% | 19.4% | 39.7% | 0 | 150 |
| M2009 | 5.3% | 5.3% | 5.3% | 75.1% | 25.2% | 25.2% | 32.4% | 950 | 300 |
| M2010 | 22.6% | 22.6% | 21.6% | 75.1% | 24.8% | 24.8% | 47.4% | 0 | 300 |
| M2011 | 7.4% | 7.4% | 0.5% | 75.1% | 23.0% | 23.0% | 30.4% | 0 | 150 |
| M2012 | 8.6% | 8.6% | 8.6% | 75.1% | 11.8% | 11.8% | 34.1% | 950 | 50 |
| M2013 | 22.3% | 22.3% | 17.9% | 75.1% | 15.9% | 15.9% | 38.2% | 1250 | 200 |
| M2014 | 7.1% | 7.1% | 7.1% | 75.1% | 8.6% | 8.6% | 24.6% | 950 | −50 |
| M2015 | 25.8% | 25.8% | 25.8% | 75.1% | 7.5% | 7.5% | 33.3% | 0 | 250 |
| M2016 | 18.8% | 18.8% | 6.6% | 75.1% | 14.8% | 14.8% | 33.6% | 0 | 100 |
| M2017 | 17.1% | 17.1% | 11.9% | 75.1% | 20.3% | 20.3% | 37.3% | 1300 | 150 |
| M2018 | 18.0% | 18.0% | 16.9% | 75.1% | 24.8% | 24.8% | 42.8% | 1250 | 250 |
| M2019 | 12.3% | 12.3% | 10.1% | 75.1% | 19.7% | 19.7% | 32.0% | 0 | 100 |
| M2020 | 10.2% | 10.2% | 8.2% | 75.1% | 16.2% | 16.2% | 26.4% | 0 | 0 |
| M2021 | 6.8% | 6.8% | 6.8% | 75.1% | 11.9% | 11.9% | 20.5% | 950 | −50 |
| M2022 | 9.7% | 9.7% | 9.7% | 75.2% | 8.5% | 8.5% | 33.4% | 950 | 0 |
| M2023 | 20.2% | 20.2% | 18.5% | 75.2% | 9.8% | 9.8% | 30.0% | 0 | 150 |
| M2024 | 12.9% | 12.9% | 9.5% | 75.2% | 23.9% | 23.9% | 36.7% | 0 | 200 |
| M2025 | 7.9% | 7.9% | 3.8% | 75.2% | 28.2% | 28.2% | 36.1% | 0 | 300 |
| M2026 | 19.4% | 19.4% | 19.1% | 75.2% | 25.0% | 25.0% | 44.4% | 0 | 250 |
| M2027 | 20.5% | 20.5% | 12.2% | 75.2% | 9.6% | 9.6% | 30.1% | 0 | 150 |
| M2028 | 9.4% | 9.4% | 9.4% | 75.2% | 11.9% | 11.9% | 29.4% | 950 | 50 |
| M2029 | 13.4% | 13.4% | 9.9% | 75.2% | 14.3% | 14.3% | 27.7% | 0 | 0 |
| M2030 | 13.8% | 13.8% | 7.7% | 75.2% | 15.1% | 15.1% | 28.9% | 0 | 0 |

TABLE 11-continued

Compositions and thermodynamic criteria for vanadium carbides

| | | | | | | | | | |
|---|---|---|---|---|---|---|---|---|---|
| M2031 | 9.0% | 9.0% | 7.5% | 75.2% | 20.0% | 20.0% | 28.9% | 0 | 100 |
| M2032 | 17.5% | 17.5% | 17.5% | 75.2% | 8.5% | 8.5% | 51.7% | 950 | 250 |
| M2033 | 9.9% | 9.9% | 9.9% | 75.2% | 14.1% | 14.1% | 28.7% | 950 | 100 |
| M2034 | 6.8% | 6.8% | 6.8% | 75.2% | 9.7% | 9.7% | 27.2% | 950 | 0 |
| M2035 | 19.0% | 19.0% | 16.7% | 75.2% | 22.2% | 22.2% | 41.2% | 0 | 200 |
| M2036 | 19.9% | 19.9% | 17.7% | 75.2% | 27.7% | 27.7% | 47.5% | 0 | 400 |
| M2037 | 17.7% | 17.7% | 11.5% | 75.2% | 9.5% | 9.5% | 27.1% | 0 | 100 |
| M2038 | 17.1% | 17.1% | 16.9% | 75.2% | 18.5% | 3.5% | 35.5% | 0 | 400 |
| M2039 | 20.2% | 20.2% | 11.2% | 75.2% | 11.2% | 11.2% | 31.4% | 0 | 150 |
| M2040 | 21.6% | 21.6% | 16.5% | 75.2% | 21.2% | 21.2% | 42.8% | 0 | 200 |
| M2041 | 7.0% | 7.0% | 7.0% | 75.2% | 14.0% | 14.0% | 29.9% | 950 | 100 |
| M2042 | 23.2% | 23.2% | 23.2% | 75.2% | 7.8% | 7.8% | 30.9% | 1000 | 200 |
| M2043 | 14.2% | 14.2% | 14.2% | 75.2% | 12.5% | 12.5% | 26.9% | 1050 | 100 |
| M2044 | 18.0% | 18.0% | 18.0% | 75.2% | 14.2% | 14.2% | 36.9% | 950 | 200 |
| M2045 | 10.2% | 10.2% | 8.9% | 75.2% | 20.9% | 20.9% | 31.0% | 0 | 100 |
| M2046 | 19.5% | 19.5% | 19.5% | 75.3% | 11.9% | 11.9% | 42.9% | 950 | 250 |
| M2047 | 20.1% | 20.1% | 20.1% | 75.3% | 7.9% | 4.1% | 37.9% | 1000 | 450 |
| M2048 | 19.0% | 19.0% | 19.0% | 75.3% | 14.0% | 14.0% | 46.1% | 950 | 200 |
| M2049 | 9.2% | 9.2% | 9.2% | 75.3% | 14.2% | 14.2% | 24.7% | 950 | 100 |
| M2050 | 7.3% | 7.3% | 7.3% | 75.3% | 11.9% | 11.9% | 26.2% | 950 | 50 |
| M2051 | 18.8% | 18.8% | 18.8% | 75.3% | 18.4% | 18.4% | 37.2% | 1050 | 150 |
| M2052 | 9.3% | 9.3% | 8.5% | 75.3% | 15.6% | 15.6% | 24.9% | 0 | 0 |
| M2053 | 8.5% | 8.5% | 8.5% | 75.3% | 10.8% | 10.8% | 35.1% | 950 | 50 |
| M2054 | 21.6% | 21.6% | 16.7% | 75.3% | 10.5% | 10.5% | 32.0% | 0 | 200 |
| M2055 | 11.4% | 11.4% | 10.3% | 75.3% | 20.9% | 20.9% | 32.3% | 0 | 100 |
| M2056 | 7.4% | 7.4% | 0.4% | 75.3% | 22.3% | 22.3% | 29.6% | 0 | 150 |
| M2057 | 10.3% | 10.3% | 10.3% | 75.3% | 10.9% | 10.9% | 23.9% | 950 | 0 |
| M2058 | 12.2% | 12.2% | 12.2% | 75.3% | 9.7% | 9.7% | 36.7% | 950 | 100 |
| M2059 | 17.4% | 17.4% | 17.4% | 75.3% | 12.0% | 12.0% | 39.8% | 950 | 200 |
| M2060 | 19.0% | 19.0% | 17.3% | 75.3% | 24.9% | 24.9% | 43.9% | 0 | 250 |
| M2061 | 19.7% | 19.7% | 12.5% | 75.3% | 9.6% | 9.6% | 29.3% | 0 | 150 |
| M2062 | 11.2% | 11.2% | 11.2% | 75.3% | 9.6% | 9.6% | 43.1% | 950 | 100 |
| M2063 | 7.9% | 7.9% | 3.7% | 75.3% | 27.5% | 27.5% | 35.4% | 0 | 250 |
| M2064 | 11.2% | 11.2% | 7.9% | 75.3% | 12.5% | 12.5% | 23.7% | 0 | −50 |
| M2065 | 16.0% | 16.0% | 12.2% | 75.3% | 9.6% | 9.6% | 25.6% | 0 | 50 |
| M2066 | 7.8% | 7.8% | 7.4% | 75.3% | 30.3% | 30.3% | 38.0% | 0 | 350 |
| M2067 | 19.5% | 19.5% | 19.5% | 75.3% | 15.2% | 15.2% | 44.5% | 950 | 250 |
| M2068 | 23.3% | 23.3% | 23.3% | 75.3% | 7.5% | 7.5% | 30.8% | 1050 | 200 |
| M2069 | 17.4% | 17.4% | 17.4% | 75.3% | 12.0% | 12.0% | 39.6% | 950 | 200 |
| M2070 | 5.3% | 5.3% | 5.3% | 75.3% | 21.1% | 21.1% | 38.9% | 950 | 250 |
| M2071 | 21.8% | 21.8% | 15.8% | 75.3% | 16.1% | 16.1% | 37.9% | 0 | 200 |
| M2072 | 14.5% | 14.5% | 5.7% | 75.3% | 9.5% | 9.5% | 24.0% | 0 | 0 |
| M2073 | 15.5% | 15.5% | 7.8% | 75.3% | 16.0% | 16.0% | 31.5% | 0 | 50 |
| M2074 | 11.6% | 11.6% | 11.2% | 75.4% | 19.9% | 19.9% | 31.6% | 0 | 100 |
| M2075 | 10.7% | 10.7% | 10.7% | 75.4% | 10.9% | 10.9% | 29.7% | 950 | 50 |
| M2076 | 8.5% | 8.5% | 8.5% | 75.4% | 12.0% | 12.0% | 27.4% | 950 | 50 |
| M2077 | 13.0% | 13.0% | 13.0% | 75.4% | 14.2% | 14.2% | 34.8% | 950 | 100 |
| M2078 | 11.4% | 11.4% | 9.6% | 75.4% | 16.3% | 16.3% | 27.7% | 0 | 0 |
| M2079 | 20.8% | 20.8% | 11.5% | 75.4% | 14.9% | 14.9% | 35.7% | 0 | 150 |
| M2080 | 9.4% | 9.4% | 9.3% | 75.4% | 20.0% | 20.0% | 29.3% | 0 | 100 |
| M2081 | 17.5% | 17.5% | 13.5% | 75.4% | 19.8% | 19.8% | 37.3% | 0 | 150 |
| M2082 | 18.2% | 18.2% | 10.0% | 75.4% | 9.7% | 9.7% | 27.9% | 0 | 100 |
| M2083 | 19.5% | 19.5% | 19.2% | 75.4% | 23.4% | 23.4% | 42.9% | 0 | 250 |
| M2084 | 9.9% | 9.9% | 7.2% | 75.4% | 17.1% | 17.1% | 27.1% | 0 | 50 |
| M2085 | 8.1% | 8.1% | 8.1% | 75.4% | 19.2% | 19.2% | 27.3% | 1000 | 100 |
| M2086 | 8.5% | 8.5% | 8.5% | 75.4% | 12.0% | 12.0% | 27.3% | 950 | 50 |
| M2087 | 19.7% | 19.7% | 5.4% | 75.4% | 10.2% | 10.2% | 29.9% | 0 | 150 |
| M2088 | 7.4% | 7.4% | 7.4% | 75.4% | 9.8% | 9.8% | 24.4% | 950 | 0 |
| M2089 | 20.2% | 20.2% | 20.2% | 75.4% | 14.5% | 14.5% | 34.7% | 1050 | 200 |
| M2090 | 10.1% | 10.1% | 8.8% | 75.4% | 21.7% | 21.7% | 31.8% | 0 | 150 |
| M2091 | 7.4% | 7.4% | 7.4% | 75.4% | 9.8% | 9.8% | 24.3% | 950 | 0 |
| M2092 | 10.4% | 10.4% | 10.4% | 75.4% | 24.6% | 24.6% | 34.9% | 1250 | 200 |
| M2093 | 7.9% | 7.9% | 7.9% | 75.4% | 9.8% | 9.8% | 30.4% | 950 | 0 |
| M2094 | 15.2% | 15.2% | 15.2% | 75.4% | 12.0% | 12.0% | 36.4% | 950 | 150 |
| M2095 | 6.7% | 6.7% | 6.7% | 75.4% | 15.4% | 15.4% | 24.1% | 950 | 100 |
| M2096 | 8.9% | 8.9% | 8.9% | 75.4% | 14.2% | 14.2% | 26.4% | 950 | 100 |
| M2097 | 7.8% | 7.8% | 7.8% | 75.4% | 12.1% | 12.1% | 23.5% | 950 | 50 |
| M2098 | 16.6% | 16.6% | 4.6% | 75.4% | 14.0% | 14.0% | 30.6% | 0 | 50 |
| M2099 | 19.3% | 19.3% | 19.3% | 75.4% | 26.1% | 26.1% | 45.4% | 1050 | 300 |
| M2100 | 8.7% | 8.7% | 8.7% | 75.4% | 8.6% | 8.6% | 33.3% | 950 | 0 |
| M2101 | 16.4% | 16.4% | 16.1% | 75.4% | 19.8% | 19.8% | 36.2% | 0 | 350 |
| M2102 | 16.8% | 16.8% | 8.5% | 75.5% | 11.5% | 11.5% | 28.3% | 0 | 50 |
| M2103 | 11.3% | 11.3% | 11.3% | 75.5% | 9.8% | 9.8% | 34.7% | 950 | 50 |
| M2104 | 19.4% | 19.4% | 19.4% | 75.5% | 14.2% | 14.2% | 45.6% | 950 | 250 |
| M2105 | 21.8% | 21.8% | 21.8% | 75.5% | 24.0% | 24.0% | 45.9% | 0 | 250 |
| M2106 | 8.0% | 8.0% | 8.0% | 75.5% | 8.7% | 8.7% | 29.5% | 950 | −50 |
| M2107 | 22.3% | 22.3% | 22.3% | 75.5% | 19.5% | 19.5% | 41.7% | 1300 | 250 |
| M2108 | 22.3% | 22.3% | 22.3% | 75.5% | 29.7% | 29.7% | 52.0% | 1050 | 450 |

TABLE 11-continued

Compositions and thermodynamic criteria for vanadium carbides

| | | | | | | | | | |
|---|---|---|---|---|---|---|---|---|---|
| M2109 | 19.6% | 19.6% | 19.6% | 75.5% | 5.8% | 5.8% | 39.2% | 1000 | 300 |
| M2110 | 18.0% | 18.0% | 9.1% | 75.5% | 9.7% | 9.7% | 27.6% | 0 | 100 |
| M2111 | 16.6% | 16.6% | 13.7% | 75.5% | 21.6% | 21.6% | 38.2% | 0 | 200 |
| M2112 | 6.4% | 6.4% | 4.4% | 75.5% | 25.3% | 25.3% | 31.6% | 0 | 150 |
| M2113 | 11.7% | 11.7% | 11.7% | 75.5% | 9.8% | 9.8% | 42.6% | 950 | 100 |
| M2114 | 10.9% | 10.9% | 6.9% | 75.5% | 13.6% | 13.6% | 24.5% | 0 | −50 |
| M2115 | 12.8% | 12.8% | 12.8% | 75.5% | 13.2% | 13.2% | 36.0% | 950 | 100 |
| M2116 | 9.7% | 9.7% | 9.7% | 75.5% | 9.8% | 9.8% | 37.5% | 950 | 50 |
| M2117 | 19.2% | 19.2% | 7.4% | 75.5% | 12.2% | 12.2% | 31.4% | 0 | 100 |
| M2118 | 24.6% | 24.6% | 20.3% | 75.5% | 19.1% | 19.1% | 43.6% | 0 | 250 |
| M2119 | 22.2% | 22.2% | 22.2% | 75.5% | 19.9% | 19.9% | 42.1% | 0 | 250 |
| M2120 | 22.2% | 22.2% | 19.0% | 75.5% | 21.5% | 21.5% | 43.7% | 0 | 200 |
| M2121 | 7.8% | 7.8% | 7.8% | 75.5% | 9.8% | 9.8% | 32.1% | 950 | 0 |
| M2122 | 7.3% | 7.3% | 0.3% | 75.5% | 24.9% | 24.9% | 32.1% | 0 | 200 |
| M2123 | 15.4% | 15.4% | 15.4% | 75.5% | 14.3% | 14.3% | 37.4% | 950 | 150 |
| M2124 | 18.9% | 18.9% | 7.3% | 75.5% | 15.0% | 15.0% | 33.9% | 0 | 100 |
| M2125 | 13.8% | 13.8% | 10.9% | 75.5% | 9.9% | 9.9% | 23.7% | 0 | 0 |
| M2126 | 17.0% | 17.0% | 16.7% | 75.5% | 13.2% | 5.1% | 30.2% | 0 | 400 |
| M2127 | 9.0% | 9.0% | 9.0% | 75.6% | 12.2% | 12.2% | 24.7% | 950 | 50 |
| M2128 | 17.2% | 17.2% | 10.9% | 75.6% | 15.3% | 15.3% | 32.5% | 0 | 100 |
| M2129 | 13.6% | 13.6% | 10.7% | 75.6% | 14.5% | 14.5% | 28.0% | 0 | 50 |
| M2130 | 7.4% | 7.4% | 4.2% | 75.6% | 17.3% | 17.3% | 24.8% | 0 | 50 |
| M2131 | 14.2% | 14.2% | 8.6% | 75.6% | 10.7% | 10.7% | 24.9% | 0 | 50 |
| M2132 | 6.0% | 6.0% | 6.0% | 75.6% | 13.2% | 13.2% | 28.9% | 950 | 100 |
| M2133 | 14.1% | 14.1% | 8.6% | 75.6% | 11.7% | 11.7% | 25.8% | 0 | 0 |
| M2134 | 7.3% | 7.3% | 7.3% | 75.6% | 8.8% | 8.8% | 25.4% | 950 | −50 |
| M2135 | 17.7% | 17.7% | 17.7% | 75.6% | 12.2% | 12.2% | 39.0% | 950 | 200 |
| M2136 | 7.4% | 7.4% | 7.4% | 75.6% | 13.2% | 13.2% | 28.1% | 950 | 50 |
| M2137 | 22.1% | 22.1% | 16.6% | 75.6% | 15.3% | 15.3% | 37.4% | 0 | 200 |
| M2138 | 7.1% | 7.1% | 7.1% | 75.6% | 12.2% | 12.2% | 19.2% | 950 | −50 |
| M2139 | 5.3% | 5.3% | 5.3% | 75.6% | 17.2% | 17.2% | 37.6% | 950 | 200 |
| M2140 | 10.1% | 10.1% | 7.9% | 75.6% | 18.3% | 18.3% | 28.3% | 0 | 50 |
| M2141 | 9.9% | 9.9% | 9.9% | 75.6% | 10.0% | 10.0% | 26.9% | 950 | 0 |
| M2142 | 7.4% | 7.4% | 7.4% | 75.6% | 13.2% | 13.2% | 28.0% | 950 | 50 |
| M2143 | 14.3% | 14.3% | 14.3% | 75.6% | 9.8% | 9.8% | 43.2% | 950 | 150 |
| M2144 | 9.0% | 9.0% | 9.0% | 75.6% | 9.8% | 9.8% | 33.5% | 950 | 0 |
| M2145 | 19.9% | 19.9% | 17.5% | 75.6% | 27.9% | 27.9% | 47.8% | 0 | 450 |
| M2146 | 10.8% | 10.8% | 10.1% | 75.6% | 9.9% | 9.9% | 20.7% | 0 | −50 |
| M2147 | 9.6% | 9.6% | 9.6% | 75.6% | 9.7% | 9.7% | 39.2% | 950 | 50 |
| M2148 | 12.9% | 12.9% | 7.9% | 75.6% | 14.5% | 14.5% | 27.4% | 0 | 0 |
| M2149 | 19.8% | 19.8% | 19.8% | 75.6% | 5.2% | 5.2% | 25.1% | 1050 | 100 |
| M2150 | 13.2% | 13.2% | 9.6% | 75.6% | 16.4% | 16.4% | 29.6% | 0 | 50 |
| M2151 | 22.0% | 22.0% | 18.3% | 75.6% | 9.8% | 9.8% | 31.8% | 0 | 200 |
| M2152 | 7.4% | 7.4% | 7.4% | 75.6% | 12.2% | 12.2% | 27.3% | 950 | 50 |
| M2153 | 21.9% | 21.9% | 15.7% | 75.6% | 15.2% | 15.2% | 37.1% | 0 | 200 |
| M2154 | 19.5% | 19.5% | 19.5% | 75.6% | 11.0% | 11.0% | 30.5% | 0 | 100 |
| M2155 | 14.7% | 14.7% | 14.7% | 75.6% | 10.0% | 10.0% | 30.7% | 950 | 150 |
| M2156 | 9.9% | 9.9% | 7.0% | 75.7% | 18.2% | 18.2% | 28.1% | 0 | 50 |
| M2157 | 15.5% | 15.5% | 15.5% | 75.7% | 30.0% | 30.0% | 45.5% | 1000 | 400 |
| M2158 | 8.8% | 8.8% | 8.8% | 75.7% | 12.2% | 12.2% | 26.6% | 950 | 50 |
| M2159 | 13.9% | 13.9% | 7.6% | 75.7% | 11.7% | 11.7% | 25.6% | 0 | 0 |
| M2160 | 10.3% | 10.3% | 10.3% | 75.7% | 9.9% | 9.9% | 34.9% | 950 | 50 |
| M2161 | 14.2% | 14.2% | 14.2% | 75.7% | 9.8% | 9.8% | 45.1% | 950 | 200 |
| M2162 | 11.6% | 11.6% | 9.6% | 75.7% | 10.9% | 10.9% | 22.5% | 0 | −50 |
| M2163 | 22.7% | 22.7% | 17.8% | 75.7% | 10.8% | 10.8% | 33.5% | 0 | 200 |
| M2164 | 19.8% | 19.8% | 19.8% | 75.7% | 21.5% | 21.5% | 41.2% | 1050 | 200 |
| M2165 | 8.3% | 8.3% | 8.3% | 75.7% | 9.9% | 9.9% | 29.6% | 950 | 0 |
| M2166 | 14.4% | 14.4% | 5.5% | 75.7% | 9.7% | 9.7% | 24.2% | 0 | 0 |
| M2167 | 8.9% | 8.9% | 8.9% | 75.7% | 9.8% | 9.8% | 35.3% | 950 | 0 |
| M2168 | 19.2% | 19.2% | 19.2% | 75.7% | 11.1% | 11.1% | 37.4% | 950 | 250 |
| M2169 | 25.2% | 25.2% | 25.2% | 75.7% | 23.5% | 23.5% | 48.7% | 1050 | 250 |
| M2170 | 10.3% | 10.3% | 10.3% | 75.7% | 25.2% | 25.2% | 35.4% | 1050 | 250 |
| M2171 | 11.7% | 11.7% | 11.7% | 75.7% | 9.9% | 9.9% | 34.1% | 950 | 50 |
| M2172 | 6.3% | 6.3% | 6.3% | 75.7% | 10.0% | 10.0% | 24.1% | 950 | 0 |
| M2173 | 6.2% | 6.2% | 6.2% | 75.7% | 8.7% | 8.7% | 35.9% | 950 | 0 |
| M2174 | 9.8% | 9.8% | 9.8% | 75.7% | 14.4% | 14.4% | 31.3% | 950 | 100 |
| M2175 | 19.7% | 19.7% | 19.7% | 75.7% | 14.4% | 14.4% | 44.9% | 950 | 250 |
| M2176 | 17.2% | 17.2% | 16.8% | 75.7% | 13.2% | 13.2% | 30.4% | 0 | 350 |
| M2177 | 11.3% | 11.3% | 7.8% | 75.7% | 9.9% | 9.9% | 21.2% | 0 | −50 |
| M2178 | 9.9% | 9.9% | 7.7% | 75.7% | 21.8% | 21.8% | 31.7% | 0 | 150 |
| M2179 | 8.8% | 8.8% | 8.8% | 75.8% | 9.8% | 9.8% | 37.2% | 950 | 0 |
| M2180 | 15.4% | 15.4% | 15.4% | 75.8% | 12.2% | 12.2% | 37.7% | 950 | 150 |
| M2181 | 7.3% | 7.3% | 0.3% | 75.8% | 24.1% | 24.1% | 31.4% | 0 | 200 |
| M2182 | 8.8% | 8.8% | 8.8% | 75.8% | 8.8% | 8.8% | 36.7% | 950 | 0 |
| M2183 | 16.5% | 16.5% | 8.1% | 75.8% | 15.3% | 15.3% | 31.8% | 0 | 50 |
| M2184 | 18.5% | 18.5% | 16.3% | 75.8% | 14.7% | 14.7% | 33.1% | 0 | 150 |
| M2185 | 16.3% | 16.3% | 16.3% | 75.8% | 10.0% | 10.0% | 39.9% | 950 | 150 |
| M2186 | 19.6% | 19.6% | 19.6% | 75.8% | 13.4% | 13.4% | 46.4% | 950 | 250 |

TABLE 11-continued

Compositions and thermodynamic criteria for vanadium carbides

| M2187 | 17.1% | 17.1% | 17.1% | 75.8% | 7.7% | 7.7% | 24.9% | 1050 | 100 |
|---|---|---|---|---|---|---|---|---|---|
| M2188 | 15.4% | 15.4% | 15.4% | 75.8% | 8.8% | 8.8% | 47.8% | 950 | 200 |
| M2189 | 7.0% | 7.0% | 7.0% | 75.8% | 20.2% | 20.2% | 27.2% | 1050 | 100 |
| M2190 | 12.0% | 12.0% | 12.0% | 75.8% | 8.8% | 8.8% | 43.3% | 950 | 150 |
| M2191 | 18.6% | 18.6% | 15.6% | 75.8% | 13.1% | 7.8% | 31.7% | 0 | 350 |
| M2192 | 24.5% | 24.5% | 24.5% | 75.8% | 13.5% | 0.0% | 45.8% | 1000 | 450 |
| M2193 | 15.7% | 15.7% | 15.7% | 75.8% | 14.5% | 14.5% | 36.5% | 950 | 150 |
| M2194 | 19.9% | 19.9% | 10.7% | 75.8% | 13.4% | 13.4% | 33.3% | 0 | 150 |
| M2195 | 22.1% | 22.1% | 21.1% | 75.8% | 20.7% | 20.7% | 42.8% | 0 | 350 |
| M2196 | 22.3% | 22.3% | 22.3% | 75.8% | 30.6% | 30.6% | 52.9% | 1050 | 450 |
| M2197 | 18.1% | 18.1% | 9.8% | 75.8% | 9.8% | 9.8% | 27.9% | 0 | 100 |
| M2198 | 7.2% | 7.2% | 7.2% | 75.8% | 11.1% | 11.1% | 30.4% | 950 | 50 |
| M2199 | 7.9% | 7.9% | 7.9% | 75.9% | 12.4% | 12.4% | 24.4% | 950 | 50 |
| M2200 | 13.5% | 13.5% | 11.2% | 75.9% | 18.4% | 18.4% | 31.9% | 0 | 100 |
| M2201 | 9.4% | 9.4% | 9.4% | 75.9% | 10.0% | 10.0% | 32.6% | 950 | 0 |
| M2202 | 22.6% | 22.6% | 22.6% | 75.9% | 9.0% | 9.0% | 42.7% | 950 | 300 |
| M2203 | 11.7% | 11.7% | 11.7% | 75.9% | 21.9% | 21.9% | 33.6% | 0 | 150 |
| M2204 | 16.9% | 16.9% | 9.9% | 75.9% | 15.4% | 15.4% | 32.3% | 0 | 100 |
| M2205 | 9.1% | 9.1% | 7.3% | 75.9% | 15.7% | 15.7% | 24.8% | 0 | 0 |
| M2206 | 22.4% | 22.4% | 22.4% | 75.9% | 29.0% | 29.0% | 51.5% | 1050 | 400 |
| M2207 | 19.7% | 19.7% | 17.2% | 75.9% | 27.9% | 27.9% | 47.6% | 0 | 350 |
| M2208 | 9.9% | 9.9% | 9.9% | 75.9% | 8.8% | 8.8% | 40.0% | 950 | 50 |
| M2209 | 11.5% | 11.5% | 11.5% | 75.9% | 8.8% | 8.8% | 37.1% | 950 | 50 |
| M2210 | 9.3% | 9.3% | 9.3% | 75.9% | 10.0% | 10.0% | 34.8% | 950 | 0 |
| M2211 | 8.3% | 8.3% | 8.3% | 75.9% | 12.2% | 12.2% | 32.3% | 950 | 50 |
| M2212 | 21.0% | 21.0% | 15.9% | 75.9% | 15.4% | 15.4% | 36.4% | 0 | 200 |
| M2213 | 20.3% | 20.3% | 17.7% | 75.9% | 21.1% | 21.1% | 41.3% | 0 | 150 |
| M2214 | 17.0% | 17.0% | 9.1% | 75.9% | 11.7% | 11.7% | 28.6% | 0 | 100 |
| M2215 | 19.0% | 19.0% | 16.3% | 75.9% | 21.0% | 21.0% | 39.9% | 0 | 200 |
| M2216 | 7.2% | 7.2% | 7.2% | 75.9% | 10.1% | 10.1% | 29.6% | 950 | 0 |
| M2217 | 21.1% | 21.1% | 21.1% | 75.9% | 11.5% | 11.5% | 34.1% | 950 | 250 |
| M2218 | 19.7% | 19.7% | 12.9% | 75.9% | 10.8% | 10.8% | 30.5% | 0 | 150 |
| M2219 | 11.9% | 11.9% | 11.9% | 75.9% | 17.9% | 17.9% | 29.7% | 0 | 50 |
| M2220 | 14.9% | 14.9% | 14.9% | 75.9% | 14.7% | 14.7% | 32.5% | 950 | 150 |
| M2221 | 14.3% | 14.3% | 14.3% | 75.9% | 11.8% | 11.8% | 26.1% | 950 | 100 |
| M2222 | 10.4% | 10.4% | 10.4% | 75.9% | 9.1% | 9.1% | 23.2% | 950 | 50 |
| M2223 | 6.7% | 6.7% | 6.7% | 75.9% | 10.2% | 10.2% | 21.3% | 950 | 0 |
| M2224 | 11.5% | 11.5% | 11.5% | 75.9% | 14.7% | 14.7% | 27.9% | 950 | 100 |
| M2225 | 8.4% | 8.4% | 8.4% | 75.9% | 11.2% | 11.2% | 31.6% | 950 | 50 |
| M2226 | 11.8% | 11.8% | 11.8% | 75.9% | 18.5% | 18.5% | 30.3% | 0 | 50 |
| M2227 | 21.6% | 21.6% | 13.1% | 75.9% | 9.8% | 9.8% | 31.4% | 0 | 200 |
| M2228 | 8.6% | 8.6% | 8.6% | 75.9% | 10.1% | 10.1% | 28.7% | 950 | 0 |
| M2229 | 3.4% | 3.4% | 3.4% | 75.9% | 30.3% | 30.3% | 33.6% | 1050 | 300 |
| M2230 | 7.4% | 7.4% | 0.2% | 76.0% | 19.9% | 19.9% | 27.3% | 0 | 100 |
| M2231 | 7.5% | 7.5% | 7.5% | 76.0% | 12.4% | 12.4% | 28.5% | 950 | 50 |
| M2232 | 17.9% | 17.9% | 10.3% | 76.0% | 15.4% | 15.4% | 33.3% | 0 | 100 |
| M2233 | 23.0% | 23.0% | 23.0% | 76.0% | 20.0% | 20.0% | 42.9% | 950 | 300 |
| M2234 | 11.7% | 11.7% | 11.7% | 76.0% | 21.6% | 21.6% | 33.3% | 0 | 150 |
| M2235 | 7.5% | 7.5% | 7.5% | 76.0% | 12.4% | 12.4% | 28.4% | 950 | 50 |
| M2236 | 15.6% | 15.6% | 15.6% | 76.0% | 29.6% | 29.6% | 45.2% | 1000 | 400 |
| M2237 | 14.8% | 14.8% | 14.8% | 76.0% | 10.2% | 10.2% | 32.0% | 950 | 150 |
| M2238 | 7.5% | 7.5% | 7.5% | 76.0% | 12.4% | 12.4% | 28.3% | 950 | 50 |
| M2239 | 12.0% | 12.0% | 12.0% | 76.0% | 14.4% | 14.4% | 26.5% | 0 | 0 |
| M2240 | 21.5% | 21.5% | 21.5% | 76.0% | 10.1% | 10.1% | 53.4% | 950 | 300 |
| M2241 | 24.0% | 24.0% | 24.0% | 76.0% | 12.1% | 12.1% | 36.1% | 1000 | 250 |
| M2242 | 8.5% | 8.5% | 8.5% | 76.0% | 10.1% | 10.1% | 30.8% | 950 | 0 |
| M2243 | 23.0% | 23.0% | 23.0% | 76.0% | 23.2% | 23.2% | 46.2% | 1050 | 250 |
| M2244 | 11.7% | 11.7% | 11.7% | 76.0% | 16.7% | 16.7% | 28.4% | 950 | 50 |
| M2245 | 8.1% | 8.1% | 7.5% | 76.0% | 19.5% | 19.5% | 27.5% | 0 | 100 |
| M2246 | 7.0% | 7.0% | 7.0% | 76.0% | 10.0% | 10.0% | 33.5% | 950 | 0 |
| M2247 | 25.3% | 25.3% | 25.3% | 76.0% | 23.0% | 23.0% | 48.3% | 1100 | 250 |
| M2248 | 6.9% | 6.9% | 6.9% | 76.0% | 24.8% | 24.8% | 31.7% | 1050 | 200 |
| M2249 | 14.9% | 14.9% | 14.9% | 76.0% | 24.0% | 24.0% | 39.0% | 1100 | 200 |
| M2250 | 21.9% | 21.9% | 18.0% | 76.0% | 9.9% | 9.9% | 31.9% | 0 | 200 |
| M2251 | 23.2% | 23.2% | 23.2% | 76.0% | 19.1% | 19.1% | 42.3% | 1000 | 250 |
| M2252 | 14.9% | 14.9% | 14.9% | 76.0% | 10.1% | 10.1% | 44.1% | 950 | 200 |
| M2253 | 20.5% | 20.5% | 20.5% | 76.0% | 27.9% | 27.9% | 48.4% | 0 | 350 |
| M2254 | 7.6% | 7.6% | 7.6% | 76.0% | 11.3% | 11.3% | 27.5% | 950 | 50 |
| M2255 | 13.8% | 13.8% | 13.8% | 76.1% | 15.0% | 15.0% | 30.6% | 950 | 150 |
| M2256 | 16.4% | 16.4% | 15.8% | 76.1% | 16.5% | 16.5% | 32.9% | 0 | 350 |
| M2257 | 8.2% | 8.2% | 8.2% | 76.1% | 15.8% | 15.8% | 24.0% | 1000 | 0 |
| M2258 | 16.7% | 16.7% | 11.2% | 76.1% | 9.9% | 9.9% | 26.6% | 0 | 100 |
| M2259 | 15.0% | 15.0% | 8.8% | 76.1% | 12.7% | 12.7% | 27.7% | 0 | 50 |
| M2260 | 9.5% | 9.5% | 9.5% | 76.1% | 10.2% | 10.2% | 34.2% | 950 | 50 |
| M2261 | 23.3% | 23.3% | 23.3% | 76.1% | 19.8% | 19.8% | 43.1% | 1050 | 250 |
| M2262 | 13.6% | 13.6% | 6.4% | 76.1% | 12.7% | 12.7% | 26.3% | 0 | 0 |
| M2263 | 8.3% | 8.3% | 8.3% | 76.1% | 10.1% | 10.1% | 18.4% | 950 | −50 |
| M2264 | 21.6% | 21.6% | 18.8% | 76.1% | 5.1% | 5.1% | 26.7% | 0 | 100 |

TABLE 11-continued

Compositions and thermodynamic criteria for vanadium carbides

| | | | | | | | | | |
|---|---|---|---|---|---|---|---|---|---|
| M2265 | 21.9% | 21.9% | 21.9% | 76.1% | 34.5% | 34.5% | 56.5% | 1100 | 450 |
| M2266 | 20.2% | 20.2% | 12.2% | 76.1% | 14.5% | 14.5% | 34.7% | 0 | 150 |
| M2267 | 11.3% | 11.3% | 8.4% | 76.1% | 12.9% | 12.9% | 24.2% | 0 | -50 |
| M2268 | 18.5% | 18.5% | 18.5% | 76.1% | 19.6% | 19.6% | 38.1% | 950 | 250 |
| M2269 | 11.6% | 11.6% | 6.1% | 76.1% | 15.6% | 15.6% | 27.1% | 0 | 50 |
| M2270 | 19.8% | 19.8% | 14.4% | 76.1% | 14.6% | 14.6% | 34.4% | 0 | 150 |
| M2271 | 13.6% | 13.6% | 11.8% | 76.1% | 19.4% | 19.4% | 33.0% | 0 | 100 |
| M2272 | 28.0% | 28.0% | 28.0% | 76.1% | 14.8% | 14.8% | 42.8% | 1200 | 300 |
| M2273 | 21.9% | 21.9% | 21.9% | 76.1% | 23.3% | 23.3% | 45.2% | 1050 | 250 |
| M2274 | 19.7% | 19.7% | 17.1% | 76.1% | 28.1% | 28.1% | 47.8% | 0 | 400 |
| M2275 | 19.4% | 19.4% | 19.4% | 76.1% | 9.0% | 9.0% | 51.6% | 950 | 300 |
| M2276 | 14.7% | 14.7% | 14.7% | 76.1% | 12.6% | 12.6% | 35.0% | 950 | 150 |
| M2277 | 14.2% | 14.2% | 8.3% | 76.1% | 9.9% | 9.9% | 24.1% | 0 | 0 |
| M2278 | 6.4% | 6.4% | 6.4% | 76.1% | 12.6% | 12.6% | 28.6% | 950 | 50 |
| M2279 | 7.8% | 7.8% | 7.8% | 76.1% | 9.2% | 9.2% | 23.8% | 950 | -50 |
| M2280 | 18.5% | 18.5% | 16.1% | 76.1% | 13.8% | 13.8% | 32.3% | 0 | 150 |
| M2281 | 21.3% | 21.3% | 12.0% | 76.2% | 9.8% | 9.8% | 31.1% | 0 | 150 |
| M2282 | 7.5% | 7.5% | 7.5% | 76.2% | 10.2% | 10.2% | 28.7% | 950 | 0 |
| M2283 | 23.2% | 23.2% | 23.2% | 76.2% | 19.9% | 19.9% | 43.2% | 1000 | 250 |
| M2284 | 7.0% | 7.0% | 7.0% | 76.2% | 19.9% | 19.9% | 26.9% | 1050 | 100 |
| M2285 | 7.0% | 7.0% | 7.0% | 76.2% | 20.5% | 20.5% | 27.5% | 1100 | 100 |
| M2286 | 7.7% | 7.7% | 7.7% | 76.2% | 12.7% | 12.7% | 27.9% | 950 | 50 |
| M2287 | 9.2% | 9.2% | 9.2% | 76.2% | 12.8% | 12.8% | 25.0% | 950 | 50 |
| M2288 | 17.9% | 17.9% | 17.9% | 76.2% | 10.2% | 10.2% | 28.1% | 950 | 200 |
| M2289 | 22.4% | 22.4% | 22.4% | 76.2% | 29.8% | 29.8% | 52.2% | 1100 | 400 |
| M2290 | 12.8% | 12.8% | 12.8% | 76.2% | 15.2% | 15.2% | 28.8% | 950 | 100 |
| M2291 | 9.2% | 9.2% | 7.2% | 76.2% | 13.0% | 13.0% | 22.1% | 0 | -50 |
| M2292 | 24.0% | 24.0% | 19.4% | 76.2% | 24.6% | 0.2% | 48.6% | 0 | 450 |
| M2293 | 14.1% | 14.1% | 9.0% | 76.2% | 13.8% | 13.8% | 27.9% | 0 | 50 |
| M2294 | 11.5% | 11.5% | 9.3% | 76.2% | 12.0% | 12.0% | 23.5% | 0 | 0 |
| M2295 | 19.7% | 19.7% | 19.7% | 76.2% | 19.9% | 19.9% | 39.6% | 950 | 200 |
| M2296 | 14.3% | 14.3% | 5.2% | 76.2% | 9.8% | 9.8% | 24.2% | 0 | 0 |
| M2297 | 21.4% | 21.4% | 20.1% | 76.2% | 20.2% | 20.2% | 41.6% | 0 | 350 |
| M2298 | 8.1% | 8.1% | 8.1% | 76.2% | 21.8% | 21.8% | 29.8% | 1000 | 150 |
| M2299 | 10.1% | 10.1% | 8.4% | 76.2% | 19.5% | 19.5% | 29.6% | 0 | 100 |
| M2300 | 7.9% | 7.9% | 7.9% | 76.2% | 15.1% | 15.1% | 26.8% | 950 | 100 |
| M2301 | 23.4% | 23.4% | 23.4% | 76.2% | 15.0% | 15.0% | 38.4% | 950 | 300 |
| M2302 | 18.0% | 18.0% | 18.0% | 76.2% | 10.5% | 10.5% | 40.4% | 950 | 200 |
| M2303 | 12.0% | 12.0% | 12.0% | 76.2% | 8.9% | 8.9% | 20.9% | 950 | 50 |
| M2304 | 12.3% | 12.3% | 12.3% | 76.2% | 12.7% | 12.7% | 33.7% | 950 | 100 |
| M2305 | 10.0% | 10.0% | 10.0% | 76.2% | 10.4% | 10.4% | 29.5% | 950 | 50 |
| M2306 | 15.5% | 15.5% | 15.5% | 76.2% | 32.3% | 32.3% | 47.8% | 1050 | 450 |
| M2307 | 17.1% | 17.1% | 17.1% | 76.2% | 9.3% | 9.3% | 35.9% | 950 | 200 |
| M2308 | 15.5% | 15.5% | 15.5% | 76.2% | 9.4% | 9.4% | 24.9% | 950 | 150 |
| M2309 | 16.7% | 16.7% | 15.8% | 76.2% | 15.0% | 15.0% | 31.7% | 0 | 350 |
| M2310 | 19.5% | 19.5% | 19.5% | 76.2% | 24.5% | 24.5% | 44.0% | 1100 | 250 |
| M2311 | 17.5% | 17.5% | 12.2% | 76.2% | 15.6% | 15.6% | 33.1% | 0 | 100 |
| M2312 | 20.4% | 20.4% | 20.4% | 76.2% | 28.4% | 28.4% | 48.8% | 0 | 350 |
| M2313 | 21.0% | 21.0% | 21.0% | 76.3% | 14.2% | 14.2% | 36.6% | 950 | 250 |
| M2314 | 15.6% | 15.6% | 15.6% | 76.3% | 30.7% | 30.7% | 46.3% | 1050 | 400 |
| M2315 | 26.6% | 26.6% | 26.6% | 76.3% | 16.4% | 16.4% | 43.0% | 1200 | 350 |
| M2316 | 7.7% | 7.7% | 7.7% | 76.3% | 11.5% | 11.5% | 28.9% | 950 | 50 |
| M2317 | 12.7% | 12.7% | 5.8% | 76.3% | 9.9% | 9.9% | 22.6% | 0 | -50 |
| M2318 | 8.6% | 8.6% | 8.6% | 76.3% | 9.2% | 9.2% | 31.6% | 950 | 0 |
| M2319 | 22.8% | 22.8% | 22.8% | 76.3% | 12.3% | 12.3% | 35.1% | 1000 | 250 |
| M2320 | 8.1% | 8.1% | 7.3% | 76.3% | 19.6% | 19.6% | 27.6% | 0 | 100 |
| M2321 | 16.7% | 16.7% | 15.9% | 76.3% | 20.4% | 4.7% | 37.0% | 0 | 400 |
| M2322 | 24.4% | 24.4% | 24.4% | 76.3% | 7.9% | 7.9% | 32.3% | 1050 | 250 |
| M2323 | 9.9% | 9.9% | 9.9% | 76.3% | 8.1% | 8.1% | 18.0% | 1050 | -50 |
| M2324 | 13.5% | 13.5% | 5.5% | 76.3% | 9.9% | 9.9% | 23.4% | 0 | 0 |
| M2325 | 15.7% | 15.7% | 15.7% | 76.3% | 29.1% | 29.1% | 44.8% | 1050 | 350 |
| M2326 | 7.0% | 7.0% | 7.0% | 76.3% | 21.0% | 21.0% | 28.0% | 1100 | 100 |
| M2327 | 21.0% | 21.0% | 15.6% | 76.3% | 14.7% | 14.7% | 35.7% | 0 | 200 |
| M2328 | 14.9% | 14.9% | 11.8% | 76.3% | 11.0% | 11.0% | 25.9% | 0 | 50 |
| M2329 | 8.3% | 8.3% | 8.3% | 76.3% | 14.4% | 14.4% | 22.7% | 950 | 0 |
| M2330 | 8.1% | 8.1% | 8.1% | 76.3% | 20.5% | 20.5% | 28.6% | 950 | 150 |
| M2331 | 19.8% | 19.8% | 17.0% | 76.3% | 28.3% | 28.3% | 48.0% | 0 | 450 |
| M2332 | 8.1% | 8.1% | 8.1% | 76.3% | 9.5% | 9.5% | 21.1% | 950 | -50 |
| M2333 | 14.5% | 14.5% | 6.8% | 76.3% | 13.7% | 13.7% | 28.2% | 0 | 0 |
| M2334 | 12.7% | 12.7% | 6.6% | 76.3% | 13.8% | 13.8% | 26.4% | 0 | 0 |
| M2335 | 14.7% | 14.7% | 6.9% | 76.3% | 10.9% | 10.9% | 25.5% | 0 | 0 |
| M2336 | 13.8% | 13.8% | 12.6% | 76.3% | 19.5% | 19.5% | 33.3% | 0 | 150 |
| M2337 | 20.0% | 20.0% | 17.2% | 76.3% | 24.9% | 0.2% | 44.9% | 0 | 450 |
| M2338 | 25.5% | 25.5% | 25.5% | 76.3% | 24.5% | 0.4% | 50.0% | 1150 | 450 |
| M2339 | 13.8% | 13.8% | 13.8% | 76.3% | 14.3% | 14.3% | 31.3% | 950 | 150 |
| M2340 | 21.9% | 21.9% | 21.9% | 76.3% | 35.2% | 35.2% | 57.1% | 1200 | 450 |
| M2341 | 10.3% | 10.3% | 10.3% | 76.3% | 25.3% | 25.3% | 35.6% | 1050 | 250 |
| M2342 | 8.4% | 8.4% | 8.4% | 76.3% | 12.1% | 12.1% | 20.6% | 0 | -50 |

TABLE 11-continued

Compositions and thermodynamic criteria for vanadium carbides

| | | | | | | | | |
|---|---|---|---|---|---|---|---|---|
| M2343 | 10.4% | 10.4% | 10.4% | 76.3% | 20.0% | 20.0% | 30.4% | 950 | 200 |
| M2344 | 6.9% | 6.9% | 6.9% | 76.3% | 24.9% | 24.9% | 31.8% | 1150 | 200 |
| M2345 | 21.8% | 21.8% | 21.8% | 76.3% | 25.1% | 25.1% | 46.9% | 0 | 300 |
| M2346 | 18.0% | 18.0% | 18.0% | 76.3% | 11.8% | 11.8% | 42.7% | 950 | 200 |
| M2347 | 8.3% | 8.3% | 8.3% | 76.3% | 12.0% | 12.0% | 20.3% | 950 | 0 |
| M2348 | 9.6% | 9.6% | 9.6% | 76.4% | 9.2% | 9.2% | 37.1% | 950 | 0 |
| M2349 | 11.0% | 11.0% | 11.0% | 76.4% | 9.4% | 9.4% | 34.4% | 950 | 50 |
| M2350 | 13.3% | 13.3% | 13.3% | 76.4% | 11.6% | 11.6% | 38.6% | 950 | 100 |
| M2351 | 8.0% | 8.0% | 8.0% | 76.4% | 15.5% | 15.5% | 26.2% | 950 | 100 |
| M2352 | 16.5% | 16.5% | 15.7% | 76.4% | 18.4% | 2.0% | 34.9% | 0 | 400 |
| M2353 | 15.0% | 15.0% | 12.6% | 76.4% | 12.0% | 12.0% | 27.1% | 0 | 50 |
| M2354 | 10.4% | 10.4% | 10.4% | 76.4% | 24.4% | 24.4% | 34.8% | 1100 | 200 |
| M2355 | 24.6% | 24.6% | 24.6% | 76.4% | 7.5% | 7.5% | 32.2% | 1100 | 200 |
| M2356 | 10.4% | 10.4% | 10.4% | 76.4% | 24.5% | 24.5% | 34.8% | 1050 | 200 |
| M2357 | 23.0% | 23.0% | 23.0% | 76.4% | 14.4% | 14.4% | 43.6% | 950 | 300 |
| M2358 | 15.1% | 15.1% | 15.1% | 76.4% | 20.3% | 20.3% | 35.3% | 950 | 150 |
| M2359 | 15.1% | 15.1% | 15.1% | 76.4% | 17.2% | 17.2% | 32.4% | 950 | 150 |
| M2360 | 20.6% | 20.6% | 20.6% | 76.4% | 25.4% | 25.4% | 46.0% | 1100 | 300 |
| M2361 | 9.8% | 9.8% | 9.8% | 76.4% | 11.9% | 11.9% | 21.6% | 0 | −50 |
| M2362 | 10.5% | 10.5% | 10.5% | 76.4% | 19.0% | 19.0% | 29.5% | 950 | 200 |
| M2363 | 27.5% | 27.5% | 27.5% | 76.4% | 18.2% | 18.2% | 45.7% | 1200 | 350 |
| M2364 | 12.8% | 12.8% | 12.8% | 76.4% | 17.5% | 17.5% | 30.3% | 950 | 150 |
| M2365 | 25.2% | 25.2% | 23.1% | 76.4% | 19.5% | 19.5% | 44.7% | 0 | 250 |
| M2366 | 10.6% | 10.6% | 10.6% | 76.4% | 15.6% | 15.6% | 26.2% | 950 | 50 |
| M2367 | 22.4% | 22.4% | 22.4% | 76.4% | 30.5% | 30.5% | 52.9% | 1250 | 450 |
| M2368 | 21.9% | 21.9% | 21.9% | 76.4% | 35.6% | 35.6% | 57.4% | 0 | 450 |
| M2369 | 24.6% | 24.6% | 24.6% | 76.4% | 21.5% | 21.5% | 46.2% | 1200 | 350 |
| M2370 | 19.7% | 19.7% | 18.1% | 76.4% | 15.8% | 15.8% | 35.6% | 0 | 200 |
| M2371 | 22.1% | 22.1% | 22.1% | 76.4% | 34.0% | 34.0% | 56.1% | 0 | 450 |
| M2372 | 15.1% | 15.1% | 15.1% | 76.4% | 21.2% | 21.2% | 36.3% | 1000 | 150 |
| M2373 | 15.6% | 15.6% | 7.3% | 76.4% | 12.8% | 12.8% | 28.3% | 0 | 50 |
| M2374 | 15.5% | 15.5% | 15.5% | 76.4% | 12.2% | 12.2% | 27.7% | 950 | 100 |
| M2375 | 8.2% | 8.2% | 8.2% | 76.4% | 15.4% | 15.4% | 23.6% | 950 | 100 |
| M2376 | 7.9% | 7.9% | 7.9% | 76.4% | 14.4% | 14.4% | 27.6% | 950 | 100 |
| M2377 | 18.4% | 18.4% | 18.4% | 76.4% | 24.9% | 24.9% | 43.3% | 0 | 250 |
| M2378 | 11.5% | 11.5% | 11.5% | 76.4% | 24.9% | 24.9% | 36.4% | 1150 | 200 |
| M2379 | 14.3% | 14.3% | 5.0% | 76.4% | 9.9% | 9.9% | 24.2% | 0 | 0 |
| M2380 | 7.7% | 7.7% | 7.7% | 76.4% | 11.9% | 11.9% | 30.8% | 950 | 50 |
| M2381 | 22.4% | 22.4% | 22.4% | 76.4% | 30.9% | 30.9% | 53.2% | 0 | 450 |
| M2382 | 22.8% | 22.8% | 22.8% | 76.4% | 10.1% | 10.1% | 32.9% | 950 | 250 |
| M2383 | 12.6% | 12.6% | 12.6% | 76.4% | 25.4% | 25.4% | 38.0% | 1100 | 250 |
| M2384 | 19.8% | 19.8% | 19.8% | 76.4% | 20.4% | 20.4% | 40.2% | 1000 | 200 |
| M2385 | 9.4% | 9.4% | 8.7% | 76.4% | 16.0% | 16.0% | 25.3% | 0 | 50 |
| M2386 | 20.5% | 20.5% | 20.3% | 76.4% | 28.6% | 28.6% | 49.0% | 0 | 450 |
| M2387 | 22.5% | 22.5% | 22.5% | 76.4% | 29.2% | 29.2% | 51.8% | 0 | 400 |
| M2388 | 22.0% | 22.0% | 22.0% | 76.4% | 34.3% | 34.3% | 56.3% | 0 | 450 |
| M2389 | 9.4% | 9.4% | 9.4% | 76.4% | 15.0% | 15.0% | 24.4% | 950 | 100 |
| M2390 | 12.7% | 12.7% | 6.5% | 76.4% | 12.9% | 12.9% | 25.6% | 0 | 0 |
| M2391 | 8.2% | 8.2% | 8.2% | 76.4% | 10.9% | 10.9% | 21.2% | 950 | 0 |
| M2392 | 19.7% | 19.7% | 17.3% | 76.4% | 13.0% | 13.0% | 32.7% | 0 | 150 |
| M2393 | 10.4% | 10.4% | 10.4% | 76.4% | 25.2% | 25.2% | 35.6% | 0 | 200 |
| M2394 | 8.7% | 8.7% | 8.7% | 76.4% | 9.4% | 9.4% | 33.2% | 950 | 0 |
| M2395 | 8.6% | 8.6% | 8.6% | 76.4% | 9.4% | 9.4% | 35.4% | 950 | 0 |
| M2396 | 7.9% | 7.9% | 7.9% | 76.4% | 14.3% | 14.3% | 27.4% | 950 | 100 |
| M2397 | 15.7% | 15.7% | 15.7% | 76.4% | 29.9% | 29.9% | 45.6% | 1000 | 450 |
| M2398 | 22.5% | 22.5% | 22.5% | 76.4% | 29.5% | 29.5% | 52.0% | 0 | 450 |
| M2399 | 17.3% | 17.3% | 10.5% | 76.4% | 10.9% | 10.9% | 28.3% | 0 | 100 |
| M2400 | 8.7% | 8.7% | 8.7% | 76.4% | 9.4% | 9.4% | 33.0% | 950 | 0 |
| M2401 | 9.0% | 9.0% | 9.0% | 76.4% | 12.0% | 12.0% | 30.0% | 950 | 50 |
| M2402 | 20.1% | 20.1% | 19.0% | 76.4% | 14.0% | 14.0% | 34.1% | 0 | 200 |
| M2403 | 10.5% | 10.5% | 10.5% | 76.4% | 16.7% | 16.7% | 27.1% | 950 | 150 |
| M2404 | 15.4% | 15.4% | 15.4% | 76.4% | 9.7% | 9.7% | 25.6% | 950 | 150 |
| M2405 | 16.9% | 16.9% | 16.0% | 76.4% | 3.6% | 3.6% | 30.2% | 0 | 400 |
| M2406 | 13.4% | 13.4% | 13.4% | 76.4% | 9.5% | 9.5% | 37.2% | 950 | 100 |
| M2407 | 16.1% | 16.1% | 16.1% | 76.5% | 25.0% | 25.0% | 41.0% | 1100 | 250 |
| M2408 | 10.4% | 10.4% | 10.4% | 76.5% | 18.5% | 18.5% | 29.0% | 950 | 150 |
| M2409 | 13.3% | 13.3% | 13.3% | 76.5% | 9.4% | 9.4% | 39.3% | 950 | 100 |
| M2410 | 6.4% | 6.4% | 6.4% | 76.5% | 10.6% | 10.6% | 30.5% | 950 | 50 |
| M2411 | 24.2% | 24.2% | 23.7% | 76.5% | 10.2% | 10.2% | 34.4% | 0 | 250 |
| M2412 | 15.0% | 15.0% | 12.5% | 76.5% | 12.1% | 12.1% | 27.1% | 0 | 50 |
| M2413 | 11.8% | 11.8% | 11.8% | 76.5% | 9.8% | 9.8% | 23.0% | 950 | 100 |
| M2414 | 10.4% | 10.4% | 10.4% | 76.5% | 19.5% | 19.5% | 29.9% | 950 | 200 |
| M2415 | 22.3% | 22.3% | 22.3% | 76.5% | 15.0% | 15.0% | 37.4% | 950 | 300 |
| M2416 | 21.3% | 21.3% | 21.3% | 76.5% | 9.4% | 9.4% | 50.0% | 950 | 300 |
| M2417 | 14.2% | 14.2% | 14.2% | 76.5% | 12.1% | 12.1% | 26.3% | 950 | 150 |
| M2418 | 12.7% | 12.7% | 12.7% | 76.5% | 24.0% | 24.0% | 36.7% | 1000 | 250 |
| M2419 | 16.0% | 16.0% | 16.0% | 76.5% | 25.5% | 25.5% | 41.5% | 1050 | 250 |
| M2420 | 19.6% | 19.6% | 19.6% | 76.5% | 24.5% | 24.5% | 44.0% | 1150 | 250 |

TABLE 11-continued

Compositions and thermodynamic criteria for vanadium carbides

| M2421 | 13.2% | 13.2% | 13.2% | 76.5% | 9.3% | 9.3% | 41.3% | 950 | 150 |
|---|---|---|---|---|---|---|---|---|---|
| M2422 | 12.3% | 12.3% | 9.4% | 76.5% | 14.9% | 14.9% | 27.3% | 0 | 0 |
| M2423 | 13.8% | 13.8% | 13.8% | 76.5% | 14.5% | 14.5% | 32.8% | 950 | 150 |
| M2424 | 19.4% | 19.4% | 19.4% | 76.5% | 11.9% | 11.9% | 31.3% | 0 | 200 |
| M2425 | 19.5% | 19.5% | 16.3% | 76.5% | 13.0% | 13.0% | 32.5% | 0 | 150 |
| M2426 | 20.0% | 20.0% | 18.2% | 76.5% | 12.1% | 12.1% | 32.1% | 0 | 200 |
| M2427 | 10.4% | 10.4% | 10.4% | 76.5% | 21.5% | 21.5% | 31.9% | 1000 | 150 |
| M2428 | 15.0% | 15.0% | 9.2% | 76.5% | 14.8% | 14.8% | 29.8% | 0 | 50 |
| M2429 | 9.2% | 9.2% | 9.2% | 76.5% | 25.0% | 25.0% | 34.2% | 1050 | 200 |
| M2430 | 6.8% | 6.8% | 6.8% | 76.5% | 14.7% | 14.7% | 25.7% | 950 | 100 |
| M2431 | 11.0% | 11.0% | 11.0% | 76.5% | 12.5% | 12.5% | 26.1% | 1000 | 50 |
| M2432 | 6.8% | 6.8% | 6.8% | 76.5% | 29.9% | 29.9% | 36.6% | 0 | 300 |
| M2433 | 22.8% | 22.8% | 22.8% | 76.5% | 12.1% | 12.1% | 46.2% | 950 | 300 |
| M2434 | 19.6% | 19.6% | 19.6% | 76.5% | 9.7% | 9.7% | 38.4% | 950 | 250 |
| M2435 | 8.1% | 8.1% | 8.1% | 76.5% | 24.9% | 24.9% | 33.0% | 1150 | 200 |
| M2436 | 13.9% | 13.9% | 13.9% | 76.5% | 11.0% | 11.0% | 31.1% | 950 | 150 |
| M2437 | 15.5% | 15.5% | 15.5% | 76.5% | 33.4% | 33.4% | 48.8% | 1050 | 450 |
| M2438 | 22.5% | 22.5% | 22.5% | 76.5% | 29.8% | 29.8% | 52.2% | 0 | 450 |
| M2439 | 18.8% | 18.8% | 18.8% | 76.5% | 15.7% | 15.7% | 34.4% | 950 | 250 |
| M2440 | 21.6% | 21.6% | 13.4% | 76.5% | 10.9% | 10.9% | 32.5% | 0 | 200 |
| M2441 | 8.1% | 8.1% | 8.1% | 76.5% | 23.0% | 23.0% | 31.1% | 1050 | 150 |
| M2442 | 8.3% | 8.3% | 8.3% | 76.5% | 17.6% | 17.6% | 25.9% | 1100 | 0 |
| M2443 | 9.4% | 9.4% | 8.7% | 76.5% | 16.0% | 16.0% | 25.4% | 0 | 50 |
| M2444 | 9.7% | 9.7% | 9.7% | 76.5% | 12.8% | 12.8% | 22.4% | 1050 | −50 |
| M2445 | 18.3% | 18.3% | 18.3% | 76.5% | 25.1% | 25.1% | 43.4% | 1050 | 250 |
| M2446 | 12.8% | 12.8% | 12.8% | 76.5% | 20.3% | 20.3% | 33.1% | 1000 | 150 |
| M2447 | 16.8% | 16.8% | 16.8% | 76.5% | 10.7% | 10.7% | 44.2% | 950 | 250 |
| M2448 | 21.0% | 21.0% | 21.0% | 76.5% | 19.6% | 19.6% | 40.6% | 1000 | 200 |
| M2449 | 23.0% | 23.0% | 23.0% | 76.5% | 24.5% | 24.5% | 47.5% | 0 | 300 |
| M2450 | 13.5% | 13.5% | 13.5% | 76.5% | 10.9% | 10.9% | 37.5% | 950 | 100 |
| M2451 | 19.8% | 19.8% | 19.8% | 76.5% | 21.1% | 21.1% | 40.9% | 1000 | 200 |
| M2452 | 20.5% | 20.5% | 20.5% | 76.5% | 12.3% | 12.3% | 45.3% | 950 | 250 |
| M2453 | 13.3% | 13.3% | 13.3% | 76.5% | 9.7% | 9.7% | 23.1% | 950 | 50 |
| M2454 | 19.5% | 19.5% | 19.5% | 76.5% | 25.1% | 25.1% | 44.6% | 1050 | 300 |
| M2455 | 24.8% | 24.8% | 24.8% | 76.5% | 6.8% | 6.8% | 31.6% | 1200 | 200 |
| M2456 | 12.7% | 12.7% | 12.7% | 76.5% | 25.0% | 25.0% | 37.7% | 1100 | 250 |
| M2457 | 24.8% | 24.8% | 24.8% | 76.5% | 5.4% | 5.4% | 30.2% | 1050 | 250 |
| M2458 | 15.1% | 15.1% | 15.1% | 76.5% | 21.9% | 21.9% | 36.9% | 1050 | 150 |
| M2459 | 17.1% | 17.1% | 17.1% | 76.5% | 9.8% | 9.8% | 39.6% | 950 | 200 |
| M2460 | 15.0% | 15.0% | 15.0% | 76.5% | 22.4% | 22.4% | 37.4% | 1000 | 200 |
| M2461 | 7.6% | 7.6% | 7.6% | 76.5% | 9.5% | 9.5% | 33.4% | 950 | 0 |
| M2462 | 8.1% | 8.1% | 8.1% | 76.5% | 14.8% | 14.8% | 24.7% | 950 | 100 |
| M2463 | 6.8% | 6.8% | 6.8% | 76.5% | 13.6% | 13.6% | 27.0% | 950 | 100 |
| M2464 | 15.7% | 15.7% | 15.7% | 76.6% | 30.2% | 30.2% | 45.9% | 1050 | 400 |
| M2465 | 15.2% | 15.2% | 14.0% | 76.6% | 15.0% | 15.0% | 30.2% | 0 | 100 |
| M2466 | 16.9% | 16.9% | 16.9% | 76.6% | 13.4% | 0.0% | 30.3% | 1250 | 350 |
| M2467 | 8.2% | 8.2% | 8.2% | 76.6% | 21.5% | 21.5% | 29.7% | 1100 | 100 |
| M2468 | 25.0% | 25.0% | 25.0% | 76.6% | 5.6% | 5.6% | 30.5% | 1350 | 150 |
| M2469 | 12.8% | 12.8% | 7.2% | 76.6% | 13.9% | 13.9% | 26.7% | 0 | 0 |
| M2470 | 24.7% | 24.7% | 24.7% | 76.6% | 8.2% | 8.2% | 32.9% | 0 | 200 |
| M2471 | 10.5% | 10.5% | 10.5% | 76.6% | 18.0% | 18.0% | 28.5% | 950 | 150 |
| M2472 | 27.0% | 27.0% | 27.0% | 76.6% | 21.6% | 21.6% | 48.6% | 1250 | 350 |
| M2473 | 12.5% | 12.5% | 9.4% | 76.6% | 12.1% | 12.1% | 24.6% | 0 | 0 |
| M2474 | 6.8% | 6.8% | 6.8% | 76.6% | 13.5% | 13.5% | 26.9% | 950 | 100 |
| M2475 | 15.7% | 15.7% | 15.7% | 76.6% | 9.1% | 9.1% | 43.9% | 950 | 200 |
| M2476 | 18.3% | 18.3% | 18.3% | 76.6% | 8.6% | 8.6% | 42.4% | 950 | 200 |
| M2477 | 22.5% | 22.5% | 22.5% | 76.6% | 30.0% | 30.0% | 52.5% | 0 | 450 |
| M2478 | 20.5% | 20.5% | 20.5% | 76.6% | 10.1% | 10.1% | 30.6% | 950 | 200 |
| M2479 | 19.5% | 19.5% | 19.5% | 76.6% | 7.0% | 7.0% | 43.0% | 950 | 250 |
| M2480 | 24.7% | 24.7% | 24.7% | 76.6% | 6.9% | 6.9% | 31.6% | 1100 | 250 |
| M2481 | 13.5% | 13.5% | 13.5% | 76.6% | 9.7% | 9.7% | 38.9% | 950 | 100 |
| M2482 | 20.4% | 20.4% | 20.4% | 76.6% | 12.1% | 12.1% | 32.4% | 950 | 200 |
| M2483 | 8.0% | 8.0% | 8.0% | 76.6% | 27.0% | 27.0% | 35.0% | 1150 | 250 |
| M2484 | 8.0% | 8.0% | 8.0% | 76.6% | 13.7% | 13.7% | 26.3% | 950 | 100 |
| M2485 | 24.6% | 24.6% | 22.3% | 76.6% | 25.0% | 25.0% | 49.5% | 0 | 350 |
| M2486 | 10.6% | 10.6% | 9.3% | 76.6% | 12.2% | 12.2% | 22.8% | 0 | −50 |
| M2487 | 20.7% | 20.7% | 20.7% | 76.6% | 7.3% | 7.3% | 44.5% | 950 | 300 |
| M2488 | 22.1% | 22.1% | 22.1% | 76.6% | 7.8% | 7.8% | 42.3% | 950 | 300 |
| M2489 | 10.3% | 10.3% | 10.3% | 76.6% | 25.0% | 25.0% | 35.3% | 1050 | 200 |
| M2490 | 24.9% | 24.9% | 24.9% | 76.6% | 5.9% | 5.9% | 30.8% | 0 | 250 |
| M2491 | 18.3% | 18.3% | 18.3% | 76.6% | 9.8% | 9.8% | 40.9% | 950 | 200 |
| M2492 | 15.1% | 15.1% | 15.1% | 76.6% | 19.9% | 19.9% | 35.0% | 950 | 200 |
| M2493 | 13.4% | 13.4% | 13.4% | 76.6% | 8.6% | 8.6% | 40.5% | 950 | 150 |
| M2494 | 15.1% | 15.1% | 15.1% | 76.6% | 20.8% | 20.8% | 35.9% | 1000 | 150 |
| M2495 | 15.9% | 15.9% | 15.9% | 76.6% | 10.1% | 10.1% | 39.8% | 950 | 200 |
| M2496 | 17.3% | 17.3% | 17.3% | 76.6% | 9.3% | 9.3% | 38.4% | 950 | 200 |
| M2497 | 12.9% | 12.9% | 11.3% | 76.6% | 12.2% | 12.2% | 25.0% | 0 | 0 |
| M2498 | 21.0% | 21.0% | 21.0% | 76.6% | 6.9% | 6.9% | 40.1% | 950 | 300 |

TABLE 11-continued

Compositions and thermodynamic criteria for vanadium carbides

| | | | | | | | | | |
|---|---|---|---|---|---|---|---|---|---|
| M2499 | 21.0% | 21.0% | 21.0% | 76.6% | 5.7% | 5.7% | 39.4% | 950 | 300 |
| M2500 | 17.3% | 17.3% | 17.3% | 76.6% | 8.6% | 8.6% | 38.3% | 950 | 200 |
| M2501 | 12.5% | 12.5% | 12.5% | 76.6% | 7.4% | 7.4% | 35.6% | 950 | 100 |
| M2502 | 15.0% | 15.0% | 13.1% | 76.6% | 15.0% | 15.0% | 30.0% | 0 | 100 |
| M2503 | 13.9% | 13.9% | 13.9% | 76.6% | 6.6% | 6.6% | 32.6% | 950 | 150 |
| M2504 | 12.5% | 12.5% | 12.5% | 76.6% | 13.7% | 13.7% | 34.6% | 950 | 100 |
| M2505 | 17.4% | 17.4% | 17.4% | 76.6% | 8.7% | 8.7% | 36.2% | 950 | 200 |
| M2506 | 22.5% | 22.5% | 22.5% | 76.6% | 17.1% | 17.1% | 39.6% | 1000 | 250 |
| M2507 | 9.0% | 9.0% | 9.0% | 76.6% | 7.8% | 7.8% | 31.4% | 950 | 50 |
| M2508 | 10.5% | 10.5% | 10.5% | 76.6% | 17.0% | 17.0% | 27.5% | 950 | 150 |
| M2509 | 18.9% | 18.9% | 18.9% | 76.6% | 5.3% | 5.3% | 35.3% | 950 | 250 |
| M2510 | 11.5% | 11.5% | 11.5% | 76.6% | 7.2% | 7.2% | 32.0% | 950 | 100 |
| M2511 | 15.1% | 15.1% | 15.1% | 76.6% | 17.6% | 17.6% | 32.8% | 950 | 200 |
| M2512 | 26.4% | 26.4% | 26.4% | 76.6% | 13.0% | 13.0% | 39.4% | 1100 | 200 |
| M2513 | 18.8% | 18.8% | 18.8% | 76.6% | 5.9% | 5.9% | 36.0% | 950 | 250 |
| M2514 | 18.8% | 18.8% | 18.8% | 76.6% | 7.9% | 7.9% | 34.7% | 950 | 250 |
| M2515 | 14.9% | 14.9% | 14.9% | 76.6% | 10.6% | 10.6% | 36.4% | 950 | 150 |
| M2516 | 12.7% | 12.7% | 12.7% | 76.6% | 6.2% | 6.2% | 32.7% | 950 | 150 |
| M2517 | 11.7% | 11.7% | 10.6% | 76.6% | 15.1% | 15.1% | 26.8% | 0 | 0 |
| M2518 | 16.5% | 16.5% | 15.4% | 76.6% | 16.6% | 16.6% | 33.1% | 0 | 350 |
| M2519 | 7.9% | 7.9% | 7.9% | 76.6% | 13.6% | 13.6% | 28.3% | 950 | 100 |
| M2520 | 7.8% | 7.8% | 7.8% | 76.6% | 10.1% | 10.1% | 31.0% | 950 | 50 |
| M2521 | 16.2% | 16.2% | 16.2% | 76.6% | 7.1% | 7.1% | 36.1% | 950 | 200 |
| M2522 | 7.9% | 7.9% | 7.9% | 76.6% | 4.3% | 4.3% | 29.9% | 950 | 50 |
| M2523 | 16.5% | 16.5% | 16.5% | 76.6% | 5.4% | 5.4% | 32.5% | 950 | 200 |
| M2524 | 8.9% | 8.9% | 8.9% | 76.6% | 7.7% | 7.7% | 33.6% | 950 | 50 |
| M2525 | 13.8% | 13.8% | 13.8% | 76.6% | 9.7% | 9.7% | 34.3% | 950 | 150 |
| M2526 | 15.0% | 15.0% | 15.0% | 76.6% | 6.7% | 6.7% | 36.2% | 950 | 150 |
| M2527 | 8.2% | 8.2% | 8.2% | 76.6% | 5.4% | 5.4% | 23.5% | 950 | 50 |
| M2528 | 6.8% | 6.8% | 6.8% | 76.6% | 6.7% | 6.7% | 27.3% | 950 | 50 |
| M2529 | 18.3% | 18.3% | 18.3% | 76.6% | 8.8% | 8.8% | 42.3% | 950 | 200 |
| M2530 | 10.6% | 10.6% | 10.6% | 76.6% | 7.2% | 7.2% | 25.6% | 950 | 100 |
| M2531 | 12.6% | 12.6% | 12.6% | 76.6% | 27.0% | 27.0% | 39.6% | 1100 | 300 |
| M2532 | 18.3% | 18.3% | 18.3% | 76.6% | 7.5% | 7.5% | 41.6% | 950 | 250 |
| M2533 | 10.4% | 10.4% | 10.4% | 76.6% | 7.7% | 7.7% | 30.1% | 950 | 100 |
| M2534 | 24.9% | 24.9% | 24.9% | 76.6% | 6.2% | 6.2% | 31.1% | 0 | 150 |
| M2535 | 9.3% | 9.3% | 9.3% | 76.6% | 8.2% | 8.2% | 26.6% | 950 | 100 |
| M2536 | 14.6% | 14.6% | 14.6% | 76.6% | 8.4% | 8.4% | 41.7% | 950 | 200 |
| M2537 | 10.5% | 10.5% | 10.5% | 76.6% | 16.2% | 16.2% | 28.1% | 950 | 150 |
| M2538 | 14.9% | 14.9% | 14.9% | 76.6% | 6.7% | 6.7% | 38.2% | 950 | 150 |
| M2539 | 9.1% | 9.1% | 9.1% | 76.6% | 9.3% | 9.3% | 27.9% | 950 | 0 |
| M2540 | 7.9% | 7.9% | 7.9% | 76.6% | 9.5% | 9.5% | 28.7% | 950 | 0 |
| M2541 | 8.1% | 8.1% | 8.1% | 76.6% | 9.1% | 9.1% | 25.9% | 950 | 50 |
| M2542 | 13.6% | 13.6% | 13.6% | 76.6% | 8.9% | 8.9% | 38.3% | 950 | 150 |
| M2543 | 10.4% | 10.4% | 10.4% | 76.6% | 5.7% | 5.7% | 29.2% | 950 | 100 |
| M2544 | 9.3% | 9.3% | 9.3% | 76.6% | 9.4% | 9.4% | 25.7% | 950 | 0 |
| M2545 | 10.6% | 10.6% | 10.6% | 76.6% | 6.6% | 6.6% | 25.5% | 950 | 50 |
| M2546 | 12.9% | 12.9% | 12.9% | 76.6% | 5.1% | 5.1% | 29.7% | 950 | 150 |
| M2547 | 15.4% | 15.4% | 15.4% | 76.6% | 7.8% | 7.8% | 30.0% | 950 | 200 |
| M2548 | 11.5% | 11.5% | 11.5% | 76.6% | 13.2% | 13.2% | 30.5% | 950 | 100 |
| M2549 | 9.2% | 9.2% | 9.2% | 76.6% | 8.7% | 8.7% | 27.3% | 950 | 50 |
| M2550 | 8.0% | 8.0% | 8.0% | 76.6% | 5.7% | 5.7% | 28.5% | 950 | 50 |
| M2551 | 7.9% | 7.9% | 7.9% | 76.6% | 7.6% | 7.6% | 29.4% | 950 | 50 |
| M2552 | 12.9% | 12.9% | 12.9% | 76.6% | 7.8% | 7.8% | 29.2% | 950 | 150 |
| M2553 | 18.8% | 18.8% | 8.7% | 76.6% | 9.9% | 9.9% | 28.7% | 0 | 100 |
| M2554 | 10.3% | 10.3% | 10.3% | 76.6% | 6.3% | 6.3% | 29.8% | 950 | 50 |
| M2555 | 8.2% | 8.2% | 8.2% | 76.6% | 5.9% | 5.9% | 25.8% | 950 | 100 |
| M2556 | 10.5% | 10.5% | 10.5% | 76.6% | 5.9% | 5.9% | 27.0% | 950 | 100 |
| M2557 | 8.1% | 8.1% | 8.1% | 76.6% | 5.2% | 5.2% | 25.7% | 950 | 50 |
| M2558 | 6.8% | 6.8% | 6.8% | 76.6% | 13.3% | 13.3% | 26.5% | 950 | 100 |
| M2559 | 7.1% | 7.1% | 7.1% | 76.6% | 15.0% | 15.0% | 22.1% | 950 | 0 |
| M2560 | 18.0% | 18.0% | 14.5% | 76.6% | 15.9% | 15.9% | 33.9% | 0 | 150 |
| M2561 | 7.0% | 7.0% | 7.0% | 76.6% | 15.1% | 15.1% | 22.8% | 950 | 100 |
| M2562 | 12.6% | 12.6% | 12.6% | 76.6% | 6.9% | 6.9% | 33.2% | 950 | 100 |
| M2563 | 11.9% | 11.9% | 11.9% | 76.6% | 5.1% | 5.1% | 24.1% | 950 | 100 |
| M2564 | 10.2% | 10.2% | 10.2% | 76.6% | 9.6% | 9.6% | 31.5% | 950 | 50 |
| M2565 | 10.5% | 10.5% | 10.5% | 76.6% | 15.1% | 15.1% | 27.6% | 950 | 150 |
| M2566 | 11.4% | 11.4% | 11.4% | 76.6% | 6.6% | 6.6% | 33.4% | 950 | 100 |
| M2567 | 19.8% | 19.8% | 19.8% | 76.6% | 22.0% | 22.0% | 41.8% | 0 | 200 |
| M2568 | 8.8% | 8.8% | 8.8% | 76.6% | 9.0% | 9.0% | 34.2% | 950 | 50 |
| M2569 | 14.0% | 14.0% | 14.0% | 76.6% | 6.8% | 6.8% | 30.3% | 950 | 150 |
| M2570 | 7.7% | 7.7% | 7.7% | 76.6% | 8.1% | 8.1% | 32.1% | 950 | 0 |
| M2571 | 7.8% | 7.8% | 7.8% | 76.6% | 10.2% | 10.2% | 30.9% | 950 | 50 |
| M2572 | 17.4% | 17.4% | 17.4% | 76.6% | 9.4% | 9.4% | 36.7% | 950 | 200 |
| M2573 | 14.8% | 14.8% | 14.8% | 76.6% | 12.4% | 12.4% | 37.0% | 950 | 150 |
| M2574 | 17.4% | 17.4% | 17.4% | 76.6% | 8.2% | 8.2% | 36.0% | 950 | 200 |
| M2575 | 12.6% | 12.6% | 12.6% | 76.6% | 9.5% | 9.5% | 32.7% | 950 | 100 |
| M2576 | 16.5% | 16.5% | 16.5% | 76.6% | 5.5% | 5.5% | 32.4% | 950 | 200 |

TABLE 11-continued

Compositions and thermodynamic criteria for vanadium carbides

| | | | | | | | | |
|---|---|---|---|---|---|---|---|---|
| M2577 | 8.9% | 8.9% | 8.9% | 76.6% | 7.8% | 7.8% | 33.5% | 950 | 50 |
| M2578 | 9.0% | 9.0% | 9.0% | 76.6% | 9.8% | 9.8% | 32.3% | 950 | 50 |
| M2579 | 12.5% | 12.5% | 10.1% | 76.6% | 16.0% | 16.0% | 28.4% | 0 | 50 |
| M2580 | 9.0% | 9.0% | 9.0% | 76.6% | 11.9% | 11.9% | 31.1% | 950 | 50 |
| M2581 | 8.3% | 8.3% | 8.3% | 76.6% | 12.7% | 12.7% | 21.1% | 950 | 50 |
| M2582 | 16.4% | 16.4% | 16.4% | 76.6% | 6.1% | 6.1% | 34.7% | 950 | 200 |
| M2583 | 14.9% | 14.9% | 14.9% | 76.6% | 8.1% | 8.1% | 36.9% | 950 | 150 |
| M2584 | 6.9% | 6.9% | 6.9% | 76.6% | 15.0% | 15.0% | 25.0% | 950 | 100 |
| M2585 | 14.0% | 14.0% | 14.0% | 76.6% | 6.1% | 6.1% | 31.8% | 950 | 150 |
| M2586 | 17.5% | 17.5% | 17.5% | 76.6% | 6.2% | 6.2% | 36.7% | 950 | 200 |
| M2587 | 16.4% | 16.4% | 16.4% | 76.6% | 6.1% | 6.1% | 33.0% | 950 | 200 |
| M2588 | 15.9% | 15.9% | 15.9% | 76.6% | 9.0% | 9.0% | 41.0% | 950 | 200 |
| M2589 | 19.6% | 19.6% | 19.6% | 76.6% | 6.1% | 6.1% | 42.1% | 950 | 250 |
| M2590 | 17.1% | 17.1% | 17.1% | 76.6% | 7.4% | 7.4% | 41.6% | 950 | 250 |
| M2591 | 10.6% | 10.6% | 10.6% | 76.6% | 11.4% | 11.4% | 23.6% | 950 | 50 |
| M2592 | 8.2% | 8.2% | 8.2% | 76.6% | 8.1% | 8.1% | 24.5% | 950 | 100 |
| M2593 | 8.2% | 8.2% | 8.2% | 76.6% | 4.8% | 4.8% | 24.9% | 950 | 100 |
| M2594 | 8.3% | 8.3% | 8.3% | 76.6% | 4.9% | 4.9% | 21.0% | 950 | 0 |
| M2595 | 18.5% | 18.5% | 16.4% | 76.6% | 15.0% | 15.0% | 33.5% | 0 | 150 |
| M2596 | 10.3% | 10.3% | 10.3% | 76.6% | 9.0% | 9.0% | 29.2% | 950 | 50 |
| M2597 | 23.0% | 23.0% | 23.0% | 76.6% | 9.7% | 9.7% | 32.7% | 1000 | 250 |
| M2598 | 15.8% | 15.8% | 15.8% | 76.6% | 8.2% | 8.2% | 43.0% | 950 | 200 |
| M2599 | 14.2% | 14.2% | 14.2% | 76.6% | 5.0% | 5.0% | 28.8% | 950 | 150 |
| M2600 | 10.6% | 10.6% | 10.6% | 76.6% | 4.0% | 4.0% | 27.7% | 950 | 100 |
| M2601 | 9.3% | 9.3% | 9.3% | 76.6% | 6.2% | 6.2% | 27.7% | 950 | 50 |
| M2602 | 10.5% | 10.5% | 10.5% | 76.6% | 9.3% | 9.3% | 24.8% | 950 | 50 |
| M2603 | 11.7% | 11.7% | 11.7% | 76.6% | 5.6% | 5.6% | 28.3% | 950 | 100 |
| M2604 | 8.1% | 8.1% | 8.1% | 76.6% | 8.0% | 8.0% | 25.0% | 950 | 50 |
| M2605 | 10.6% | 10.6% | 10.6% | 76.6% | 5.4% | 5.4% | 24.6% | 950 | 100 |
| M2606 | 20.5% | 20.5% | 20.5% | 76.6% | 10.1% | 10.1% | 45.8% | 950 | 300 |
| M2607 | 8.0% | 8.0% | 8.0% | 76.6% | 7.8% | 7.8% | 27.2% | 950 | 50 |
| M2608 | 15.4% | 15.4% | 15.4% | 76.6% | 11.3% | 11.3% | 27.7% | 950 | 150 |
| M2609 | 15.2% | 15.2% | 15.2% | 76.6% | 16.3% | 16.3% | 32.0% | 950 | 150 |
| M2610 | 6.8% | 6.8% | 6.8% | 76.6% | 10.1% | 10.1% | 26.8% | 950 | 50 |
| M2611 | 21.8% | 21.8% | 20.1% | 76.6% | 20.6% | 20.6% | 42.4% | 0 | 400 |
| M2612 | 10.3% | 10.3% | 10.3% | 76.6% | 2.5% | 2.5% | 31.6% | 950 | 100 |
| M2613 | 17.4% | 17.4% | 17.4% | 76.6% | 6.9% | 6.9% | 37.2% | 950 | 200 |
| M2614 | 21.4% | 21.4% | 21.4% | 76.6% | 12.3% | 12.3% | 33.7% | 950 | 300 |
| M2615 | 22.5% | 22.5% | 22.5% | 76.6% | 30.2% | 30.2% | 52.6% | 0 | 450 |
| M2616 | 9.1% | 9.1% | 9.1% | 76.6% | 6.8% | 6.8% | 30.5% | 950 | 50 |
| M2617 | 15.1% | 15.1% | 13.9% | 76.6% | 16.0% | 16.0% | 31.1% | 0 | 100 |
| M2618 | 10.4% | 10.4% | 10.4% | 76.6% | 23.0% | 23.0% | 33.4% | 1000 | 200 |
| M2619 | 12.6% | 12.6% | 12.6% | 76.6% | 8.3% | 8.3% | 33.9% | 950 | 100 |
| M2620 | 10.5% | 10.5% | 10.5% | 76.6% | 17.5% | 17.5% | 28.0% | 950 | 150 |
| M2621 | 27.0% | 27.0% | 27.0% | 76.6% | 7.8% | 7.8% | 34.8% | 1050 | 250 |
| M2622 | 14.9% | 14.9% | 14.9% | 76.6% | 7.5% | 7.5% | 36.7% | 950 | 150 |
| M2623 | 15.2% | 15.2% | 15.2% | 76.6% | 5.9% | 5.9% | 33.1% | 950 | 200 |
| M2624 | 16.0% | 16.0% | 16.0% | 76.6% | 9.1% | 9.1% | 38.9% | 950 | 200 |
| M2625 | 15.0% | 15.0% | 15.0% | 76.6% | 23.2% | 23.2% | 38.2% | 1050 | 200 |
| M2626 | 11.4% | 11.4% | 11.4% | 76.6% | 7.3% | 7.3% | 34.0% | 950 | 100 |
| M2627 | 7.9% | 7.9% | 7.9% | 76.6% | 12.3% | 12.3% | 29.6% | 950 | 50 |
| M2628 | 7.8% | 7.8% | 7.8% | 76.6% | 7.0% | 7.0% | 31.3% | 950 | 0 |
| M2629 | 7.9% | 7.9% | 7.9% | 76.6% | 9.1% | 9.1% | 30.0% | 950 | 50 |
| M2630 | 7.9% | 7.9% | 7.9% | 76.6% | 11.1% | 11.1% | 28.8% | 950 | 50 |
| M2631 | 21.1% | 21.1% | 21.1% | 76.6% | 5.9% | 5.9% | 39.2% | 950 | 300 |
| M2632 | 16.3% | 16.3% | 16.3% | 76.6% | 19.8% | 19.8% | 36.1% | 1000 | 150 |
| M2633 | 10.2% | 10.2% | 10.2% | 76.6% | 9.0% | 9.0% | 31.2% | 950 | 50 |
| M2634 | 17.3% | 17.3% | 17.3% | 76.6% | 8.9% | 8.9% | 38.1% | 950 | 200 |
| M2635 | 8.3% | 8.3% | 8.3% | 76.6% | 9.0% | 9.0% | 19.0% | 950 | 0 |
| M2636 | 6.9% | 6.9% | 6.9% | 76.6% | 7.8% | 7.8% | 25.1% | 950 | 100 |
| M2637 | 10.5% | 10.5% | 10.5% | 76.6% | 5.4% | 5.4% | 26.7% | 950 | 50 |
| M2638 | 10.6% | 10.6% | 10.6% | 76.6% | 6.2% | 6.2% | 24.6% | 950 | 100 |
| M2639 | 12.6% | 12.6% | 12.6% | 76.6% | 26.0% | 26.0% | 38.6% | 1050 | 250 |
| M2640 | 11.5% | 11.5% | 11.5% | 76.6% | 25.1% | 25.1% | 36.6% | 1050 | 250 |
| M2641 | 7.0% | 7.0% | 7.0% | 76.6% | 4.6% | 4.6% | 23.3% | 950 | 0 |
| M2642 | 9.2% | 9.2% | 6.9% | 76.6% | 10.2% | 10.2% | 19.4% | 0 | −50 |
| M2643 | 11.9% | 11.9% | 11.9% | 76.6% | 15.7% | 15.7% | 27.6% | 1050 | 50 |
| M2644 | 13.1% | 13.1% | 13.1% | 76.6% | 7.5% | 7.5% | 24.4% | 950 | 150 |
| M2645 | 12.8% | 12.8% | 12.8% | 76.6% | 19.5% | 19.5% | 32.3% | 950 | 200 |
| M2646 | 6.8% | 6.8% | 6.8% | 76.6% | 7.6% | 7.6% | 25.6% | 950 | 0 |
| M2647 | 8.1% | 8.1% | 8.1% | 76.6% | 6.0% | 6.0% | 26.1% | 950 | 0 |
| M2648 | 7.1% | 7.1% | 7.1% | 76.6% | 12.5% | 12.5% | 21.6% | 950 | 50 |
| M2649 | 10.6% | 10.6% | 10.6% | 76.6% | 6.8% | 6.8% | 27.0% | 950 | 100 |
| M2650 | 12.9% | 12.9% | 12.9% | 76.6% | 5.3% | 5.3% | 29.6% | 950 | 150 |
| M2651 | 13.0% | 13.0% | 13.0% | 76.6% | 7.4% | 7.4% | 28.3% | 950 | 150 |
| M2652 | 10.6% | 10.6% | 10.6% | 76.6% | 5.5% | 5.5% | 26.2% | 950 | 100 |
| M2653 | 10.6% | 10.6% | 10.6% | 76.6% | 5.5% | 5.5% | 24.5% | 950 | 100 |
| M2654 | 9.0% | 9.0% | 6.8% | 76.6% | 15.1% | 15.1% | 24.0% | 0 | 0 |

TABLE 11-continued

Compositions and thermodynamic criteria for vanadium carbides

| | | | | | | | | |
|---|---|---|---|---|---|---|---|---|
| M2655 | 15.4% | 15.4% | 15.4% | 76.6% | 4.7% | 4.7% | 30.1% | 950 | 200 |
| M2656 | 16.6% | 16.6% | 16.6% | 76.6% | 5.0% | 5.0% | 32.3% | 950 | 200 |
| M2657 | 14.1% | 14.1% | 14.1% | 76.6% | 5.6% | 5.6% | 29.4% | 950 | 150 |
| M2658 | 17.7% | 17.7% | 17.7% | 76.6% | 9.9% | 9.9% | 31.8% | 950 | 250 |
| M2659 | 8.0% | 8.0% | 8.0% | 76.6% | 9.2% | 9.2% | 27.9% | 950 | 50 |
| M2660 | 8.1% | 8.1% | 8.1% | 76.6% | 10.0% | 10.0% | 25.9% | 950 | 50 |
| M2661 | 7.1% | 7.1% | 7.1% | 76.6% | 4.7% | 4.7% | 21.1% | 950 | 50 |
| M2662 | 9.2% | 9.2% | 9.2% | 76.6% | 10.2% | 10.2% | 27.9% | 950 | 50 |
| M2663 | 9.4% | 9.4% | 9.4% | 76.6% | 5.2% | 5.2% | 24.6% | 950 | 50 |
| M2664 | 23.9% | 23.9% | 23.9% | 76.6% | 15.0% | 15.0% | 38.9% | 0 | 250 |
| M2665 | 8.0% | 8.0% | 8.0% | 76.6% | 2.0% | 2.0% | 28.1% | 950 | 50 |
| M2666 | 10.5% | 10.5% | 10.5% | 76.6% | 6.1% | 6.1% | 26.8% | 950 | 100 |
| M2667 | 8.3% | 8.3% | 8.3% | 76.6% | 16.4% | 16.4% | 24.7% | 1000 | 50 |
| M2668 | 8.3% | 8.3% | 8.3% | 76.6% | 7.6% | 7.6% | 20.3% | 950 | 0 |
| M2669 | 6.8% | 6.8% | 6.8% | 76.6% | 13.5% | 13.5% | 26.3% | 950 | 100 |
| M2670 | 12.9% | 12.9% | 12.9% | 76.6% | 12.6% | 12.6% | 27.2% | 950 | 100 |
| M2671 | 6.8% | 6.8% | 6.8% | 76.6% | 6.9% | 6.9% | 27.1% | 950 | 50 |
| M2672 | 15.8% | 15.8% | 15.8% | 76.7% | 29.5% | 29.5% | 45.2% | 1000 | 400 |
| M2673 | 14.0% | 14.0% | 14.0% | 76.7% | 14.2% | 14.2% | 31.4% | 950 | 150 |
| M2674 | 11.9% | 11.9% | 11.9% | 76.7% | 17.5% | 17.5% | 29.4% | 0 | 50 |
| M2675 | 18.9% | 18.9% | 18.9% | 76.7% | 7.6% | 7.6% | 35.4% | 950 | 250 |
| M2676 | 20.6% | 20.6% | 20.6% | 76.7% | 26.0% | 26.0% | 46.6% | 0 | 300 |
| M2677 | 16.3% | 16.3% | 16.3% | 76.7% | 19.9% | 19.9% | 36.3% | 1000 | 150 |
| M2678 | 8.2% | 8.2% | 8.2% | 76.7% | 0.0% | 0.0% | 24.3% | 950 | 50 |
| M2679 | 16.5% | 16.5% | 16.5% | 76.7% | 14.7% | 14.7% | 31.2% | 950 | 200 |
| M2680 | 11.8% | 11.8% | 11.8% | 76.7% | 18.3% | 18.3% | 30.0% | 1050 | 50 |
| M2681 | 25.0% | 25.0% | 25.0% | 76.7% | 4.4% | 4.4% | 29.3% | 1200 | 200 |
| M2682 | 16.6% | 16.6% | 16.6% | 76.7% | 5.1% | 5.1% | 32.3% | 950 | 200 |
| M2683 | 8.2% | 8.2% | 8.2% | 76.7% | 16.1% | 16.1% | 24.8% | 950 | 150 |
| M2684 | 25.0% | 25.0% | 25.0% | 76.7% | 28.0% | 28.0% | 53.0% | 0 | 400 |
| M2685 | 17.6% | 17.6% | 17.6% | 76.7% | 12.6% | 12.6% | 34.0% | 950 | 250 |
| M2686 | 26.9% | 26.9% | 26.9% | 76.7% | 9.4% | 9.4% | 36.3% | 1100 | 300 |
| M2687 | 20.0% | 20.0% | 20.0% | 76.7% | 19.0% | 19.0% | 39.0% | 1000 | 200 |
| M2688 | 7.0% | 7.0% | 7.0% | 76.7% | 12.0% | 12.0% | 23.5% | 950 | 100 |
| M2689 | 12.6% | 12.6% | 12.6% | 76.7% | 26.0% | 26.0% | 38.6% | 0 | 250 |
| M2690 | 20.6% | 20.6% | 20.6% | 76.7% | 9.0% | 9.0% | 29.6% | 950 | 200 |
| M2691 | 12.9% | 12.9% | 11.8% | 76.7% | 16.1% | 16.1% | 28.9% | 0 | 50 |
| M2692 | 11.9% | 11.9% | 11.9% | 76.7% | 8.1% | 8.1% | 23.0% | 950 | 100 |
| M2693 | 20.8% | 20.8% | 20.8% | 76.7% | 9.9% | 9.9% | 30.7% | 0 | 150 |
| M2694 | 26.5% | 26.5% | 26.5% | 76.7% | 24.8% | 24.8% | 51.4% | 1250 | 350 |
| M2695 | 12.7% | 12.7% | 12.7% | 76.7% | 24.3% | 24.3% | 37.0% | 0 | 200 |
| M2696 | 9.5% | 9.5% | 9.3% | 76.7% | 16.2% | 16.2% | 25.7% | 0 | 50 |
| M2697 | 25.4% | 25.4% | 25.4% | 76.7% | 26.5% | 0.2% | 51.9% | 0 | 450 |
| M2698 | 8.3% | 8.3% | 8.3% | 76.7% | 9.9% | 9.9% | 20.4% | 950 | 0 |
| M2699 | 19.6% | 19.6% | 19.6% | 76.7% | 24.0% | 24.0% | 43.6% | 1050 | 250 |
| M2700 | 21.5% | 21.5% | 21.5% | 76.7% | 7.9% | 7.9% | 32.7% | 950 | 300 |
| M2701 | 18.1% | 18.1% | 18.1% | 76.7% | 13.2% | 13.2% | 31.3% | 1250 | 350 |
| M2702 | 12.1% | 12.1% | 12.1% | 76.7% | 14.1% | 14.1% | 26.2% | 1350 | 0 |
| M2703 | 8.4% | 8.4% | 8.4% | 76.7% | 10.6% | 10.6% | 19.0% | 950 | −50 |
| M2704 | 19.9% | 19.9% | 19.9% | 76.7% | 17.9% | 17.9% | 37.8% | 950 | 250 |
| M2705 | 27.1% | 27.1% | 27.1% | 76.7% | 7.5% | 7.5% | 34.5% | 1100 | 300 |
| M2706 | 20.3% | 20.3% | 20.3% | 76.7% | 9.0% | 9.0% | 32.9% | 950 | 300 |
| M2707 | 10.0% | 10.0% | 6.4% | 76.7% | 10.2% | 10.2% | 20.2% | 0 | −50 |
| M2708 | 16.4% | 16.4% | 15.0% | 76.7% | 16.8% | 16.8% | 33.2% | 0 | 350 |
| M2709 | 22.5% | 22.5% | 20.8% | 76.7% | 12.2% | 12.2% | 34.6% | 0 | 250 |
| M2710 | 7.1% | 7.1% | 7.1% | 76.7% | 11.0% | 11.0% | 24.0% | 950 | 100 |
| M2711 | 10.6% | 10.6% | 10.6% | 76.7% | 9.9% | 9.9% | 28.0% | 950 | 150 |
| M2712 | 11.9% | 11.9% | 11.9% | 76.7% | 7.6% | 7.6% | 25.0% | 950 | 100 |
| M2713 | 15.1% | 15.1% | 15.1% | 76.7% | 23.0% | 23.0% | 38.1% | 1050 | 200 |
| M2714 | 13.1% | 13.1% | 13.1% | 76.7% | 9.9% | 9.9% | 25.2% | 950 | 150 |
| M2715 | 15.4% | 15.4% | 15.4% | 76.7% | 5.8% | 5.8% | 31.0% | 950 | 200 |
| M2716 | 6.9% | 6.9% | 6.9% | 76.7% | 25.2% | 25.2% | 32.1% | 0 | 200 |
| M2717 | 8.4% | 8.4% | 8.4% | 76.7% | 15.2% | 15.2% | 23.7% | 0 | −50 |
| M2718 | 15.5% | 15.5% | 15.5% | 76.7% | 34.2% | 34.2% | 49.7% | 1100 | 450 |
| M2719 | 20.0% | 20.0% | 20.0% | 76.7% | 15.0% | 15.0% | 35.6% | 950 | 250 |
| M2720 | 14.5% | 14.5% | 14.5% | 76.8% | 10.2% | 10.2% | 24.7% | 1000 | 100 |
| M2721 | 11.8% | 11.8% | 11.8% | 76.8% | 5.0% | 5.0% | 29.4% | 950 | 150 |
| M2722 | 12.0% | 12.0% | 12.0% | 76.8% | 15.0% | 15.0% | 27.0% | 0 | 0 |
| M2723 | 19.1% | 19.1% | 19.1% | 76.8% | 4.9% | 4.9% | 31.5% | 950 | 250 |
| M2724 | 11.8% | 11.8% | 11.8% | 76.8% | 15.0% | 15.0% | 27.3% | 950 | 100 |
| M2725 | 13.0% | 13.0% | 13.0% | 76.8% | 14.7% | 14.7% | 28.6% | 950 | 150 |
| M2726 | 23.1% | 23.1% | 23.1% | 76.8% | 23.7% | 23.7% | 46.8% | 1000 | 250 |
| M2727 | 14.2% | 14.2% | 14.2% | 76.8% | 15.2% | 15.2% | 29.4% | 950 | 100 |
| M2728 | 16.6% | 16.6% | 16.6% | 76.8% | 5.0% | 5.0% | 34.2% | 950 | 250 |
| M2729 | 23.6% | 23.6% | 23.6% | 76.8% | 17.7% | 17.7% | 41.3% | 1050 | 250 |
| M2730 | 19.1% | 19.1% | 19.1% | 76.8% | 5.1% | 5.1% | 31.5% | 950 | 250 |
| M2731 | 14.3% | 14.3% | 14.3% | 76.8% | 5.2% | 5.2% | 30.1% | 950 | 200 |
| M2732 | 22.4% | 22.4% | 16.6% | 76.8% | 12.1% | 12.1% | 34.5% | 0 | 200 |

TABLE 11-continued

Compositions and thermodynamic criteria for vanadium carbides

| | | | | | | | | | |
|---|---|---|---|---|---|---|---|---|---|
| M2733 | 7.0% | 7.0% | 7.0% | 76.8% | 20.5% | 20.5% | 27.5% | 1000 | 150 |
| M2734 | 23.4% | 23.4% | 23.4% | 76.8% | 4.5% | 4.5% | 27.9% | 950 | 200 |
| M2735 | 16.4% | 16.4% | 16.4% | 76.8% | 20.1% | 20.1% | 36.4% | 1000 | 150 |
| M2736 | 13.0% | 13.0% | 13.0% | 76.8% | 20.4% | 20.4% | 33.3% | 0 | 150 |
| M2737 | 8.3% | 8.3% | 8.3% | 76.8% | 3.0% | 3.0% | 25.0% | 950 | 100 |
| M2738 | 15.8% | 15.8% | 15.8% | 76.8% | 29.5% | 29.5% | 45.3% | 1100 | 350 |
| M2739 | 19.7% | 19.7% | 17.6% | 76.8% | 15.1% | 15.1% | 34.8% | 0 | 200 |
| M2740 | 25.4% | 25.4% | 25.4% | 76.8% | 25.0% | 25.0% | 50.4% | 0 | 350 |
| M2741 | 25.0% | 25.0% | 25.0% | 76.8% | 28.5% | 28.5% | 53.5% | 0 | 450 |
| M2742 | 16.5% | 16.5% | 15.2% | 76.8% | 18.6% | 18.6% | 35.1% | 0 | 350 |
| M2743 | 8.3% | 8.3% | 8.3% | 76.8% | 4.5% | 4.5% | 24.5% | 950 | 100 |
| M2744 | 7.1% | 7.1% | 7.1% | 76.8% | 5.5% | 5.5% | 24.5% | 950 | 100 |
| M2745 | 17.8% | 17.8% | 17.8% | 76.8% | 15.0% | 15.0% | 32.8% | 1000 | 150 |
| M2746 | 26.3% | 26.3% | 26.3% | 76.8% | 15.0% | 15.0% | 41.3% | 0 | 300 |
| M2747 | 12.8% | 12.8% | 12.8% | 76.8% | 23.0% | 23.0% | 35.8% | 1000 | 200 |
| M2748 | 19.0% | 19.0% | 17.4% | 76.8% | 10.3% | 10.3% | 29.3% | 0 | 150 |
| M2749 | 15.5% | 15.5% | 15.5% | 76.8% | 4.9% | 4.9% | 31.4% | 950 | 200 |
| M2750 | 13.0% | 13.0% | 13.0% | 76.8% | 5.0% | 5.0% | 30.7% | 950 | 150 |
| M2751 | 8.4% | 8.4% | 8.4% | 76.8% | 7.2% | 7.2% | 19.9% | 950 | 0 |
| M2752 | 19.6% | 19.6% | 19.6% | 76.8% | 24.5% | 24.5% | 44.1% | 1050 | 250 |
| M2753 | 18.8% | 18.8% | 18.8% | 76.8% | 20.3% | 20.3% | 39.0% | 1200 | 200 |
| M2754 | 15.7% | 15.7% | 15.7% | 76.8% | 30.7% | 30.7% | 46.5% | 1050 | 400 |
| M2755 | 22.5% | 22.5% | 22.5% | 76.8% | 17.4% | 17.4% | 39.9% | 1000 | 250 |
| M2756 | 20.2% | 20.2% | 20.2% | 76.8% | 13.6% | 13.6% | 34.6% | 950 | 250 |
| M2757 | 10.5% | 10.5% | 10.5% | 76.8% | 20.0% | 20.0% | 30.5% | 1000 | 150 |
| M2758 | 10.5% | 10.5% | 10.5% | 76.8% | 20.5% | 20.5% | 31.0% | 950 | 200 |
| M2759 | 8.3% | 8.3% | 8.3% | 76.8% | 4.7% | 4.7% | 24.4% | 950 | 100 |
| M2760 | 15.9% | 15.9% | 15.9% | 76.8% | 29.0% | 29.0% | 44.9% | 1050 | 400 |
| M2761 | 27.5% | 27.5% | 27.5% | 76.8% | 4.8% | 4.8% | 32.3% | 0 | 250 |
| M2762 | 12.0% | 12.0% | 12.0% | 76.8% | 7.6% | 7.6% | 23.4% | 950 | 100 |
| M2763 | 12.8% | 12.8% | 12.8% | 76.8% | 21.5% | 21.5% | 34.3% | 1000 | 200 |
| M2764 | 19.8% | 19.8% | 19.8% | 76.8% | 22.0% | 22.0% | 41.8% | 1000 | 200 |
| M2765 | 23.0% | 23.0% | 22.6% | 76.8% | 10.3% | 10.3% | 33.3% | 0 | 250 |
| M2766 | 14.5% | 14.5% | 10.2% | 76.9% | 11.2% | 11.2% | 25.7% | 0 | 50 |
| M2767 | 13.0% | 13.0% | 13.0% | 76.9% | 12.7% | 12.7% | 29.6% | 950 | 150 |
| M2768 | 25.2% | 25.2% | 25.2% | 76.9% | 28.9% | 28.9% | 54.0% | 0 | 450 |
| M2769 | 11.5% | 11.5% | 9.4% | 76.9% | 12.3% | 12.3% | 23.8% | 0 | 0 |
| M2770 | 10.5% | 10.5% | 10.5% | 76.9% | 22.0% | 22.0% | 32.5% | 1000 | 150 |
| M2771 | 15.0% | 15.0% | 15.0% | 76.9% | 25.0% | 25.0% | 40.0% | 0 | 250 |
| M2772 | 25.2% | 25.2% | 22.5% | 76.9% | 18.0% | 18.0% | 43.2% | 0 | 250 |
| M2773 | 21.1% | 21.1% | 21.1% | 76.9% | 18.7% | 18.7% | 39.8% | 1000 | 250 |
| M2774 | 25.2% | 25.2% | 25.2% | 76.9% | 27.1% | 27.1% | 52.4% | 0 | 450 |
| M2775 | 7.1% | 7.1% | 7.1% | 76.9% | 6.7% | 6.7% | 22.5% | 950 | 50 |
| M2776 | 12.8% | 12.8% | 12.8% | 76.9% | 22.0% | 22.0% | 34.8% | 1000 | 200 |
| M2777 | 22.2% | 22.2% | 22.2% | 76.9% | 20.1% | 20.1% | 42.3% | 1000 | 250 |
| M2778 | 23.0% | 23.0% | 23.0% | 76.9% | 25.0% | 25.0% | 48.0% | 1050 | 300 |
| M2779 | 15.0% | 15.0% | 15.0% | 76.9% | 24.6% | 24.6% | 39.6% | 0 | 250 |
| M2780 | 26.4% | 26.4% | 26.4% | 76.9% | 14.8% | 14.8% | 41.2% | 0 | 300 |
| M2781 | 26.0% | 26.0% | 26.0% | 76.9% | 20.0% | 20.0% | 46.0% | 0 | 300 |
| M2782 | 24.8% | 24.8% | 21.4% | 76.9% | 16.3% | 16.3% | 48.1% | 0 | 450 |
| M2783 | 16.5% | 16.5% | 16.5% | 76.9% | 7.9% | 7.9% | 35.0% | 950 | 250 |
| M2784 | 19.7% | 19.7% | 16.8% | 76.9% | 11.3% | 11.3% | 31.0% | 0 | 150 |
| M2785 | 8.3% | 8.3% | 8.3% | 76.9% | 7.1% | 7.1% | 25.3% | 950 | 100 |
| M2786 | 21.3% | 21.3% | 20.7% | 76.9% | 15.2% | 15.2% | 36.6% | 0 | 200 |
| M2787 | 22.2% | 22.2% | 22.2% | 76.9% | 20.1% | 20.1% | 42.3% | 1000 | 250 |
| M2788 | 7.1% | 7.1% | 7.1% | 76.9% | 11.5% | 11.5% | 25.9% | 950 | 150 |
| M2789 | 27.5% | 27.5% | 27.5% | 76.9% | 4.4% | 4.4% | 31.9% | 1200 | 250 |
| M2790 | 14.7% | 14.7% | 11.0% | 76.9% | 11.3% | 11.3% | 26.0% | 0 | 50 |
| M2791 | 19.1% | 19.1% | 19.1% | 76.9% | 5.0% | 5.0% | 33.5% | 950 | 250 |
| M2792 | 25.5% | 25.5% | 24.7% | 76.9% | 17.6% | 17.6% | 51.0% | 0 | 450 |
| M2793 | 13.2% | 13.2% | 13.2% | 76.9% | 12.4% | 12.4% | 25.6% | 950 | 100 |
| M2794 | 18.0% | 18.0% | 18.0% | 76.9% | 4.8% | 4.8% | 30.7% | 950 | 250 |
| M2795 | 7.0% | 7.0% | 7.0% | 76.9% | 19.5% | 19.5% | 26.5% | 950 | 150 |
| M2796 | 10.5% | 10.5% | 10.5% | 76.9% | 22.5% | 22.5% | 33.0% | 1000 | 200 |
| M2797 | 24.0% | 24.0% | 24.0% | 76.9% | 12.6% | 12.6% | 36.6% | 1000 | 300 |
| M2798 | 7.1% | 7.1% | 7.1% | 76.9% | 11.6% | 11.6% | 22.4% | 950 | 50 |
| M2799 | 10.4% | 10.4% | 10.4% | 76.9% | 26.1% | 26.1% | 36.4% | 0 | 250 |
| M2800 | 25.5% | 25.5% | 24.2% | 76.9% | 12.4% | 12.4% | 50.1% | 0 | 450 |
| M2801 | 7.1% | 7.1% | 7.1% | 76.9% | 7.0% | 7.0% | 26.0% | 950 | 150 |
| M2802 | 10.5% | 10.5% | 10.5% | 76.9% | 23.5% | 23.5% | 34.0% | 0 | 200 |
| M2803 | 7.0% | 7.0% | 7.0% | 76.9% | 22.0% | 22.0% | 29.0% | 1000 | 150 |
| M2804 | 21.5% | 21.5% | 21.5% | 76.9% | 14.7% | 14.7% | 36.2% | 1000 | 250 |
| M2805 | 15.1% | 15.1% | 15.1% | 76.9% | 23.3% | 23.3% | 38.3% | 1050 | 200 |
| M2806 | 15.5% | 15.5% | 15.5% | 76.9% | 5.0% | 5.0% | 33.4% | 950 | 200 |
| M2807 | 22.5% | 22.5% | 17.8% | 76.9% | 7.3% | 7.3% | 43.4% | 0 | 350 |
| M2808 | 24.9% | 24.9% | 20.3% | 76.9% | 5.9% | 5.9% | 46.2% | 0 | 350 |
| M2809 | 25.4% | 25.4% | 25.4% | 76.9% | 25.6% | 25.6% | 51.0% | 0 | 400 |
| M2810 | 9.4% | 9.4% | 9.4% | 76.9% | 15.1% | 15.1% | 26.9% | 950 | 150 |

TABLE 11-continued

Compositions and thermodynamic criteria for vanadium carbides

| | | | | | | | | | |
|---|---|---|---|---|---|---|---|---|---|
| M2811 | 20.5% | 20.5% | 20.5% | 76.9% | 8.3% | 8.3% | 31.8% | 950 | 300 |
| M2812 | 16.4% | 16.4% | 15.0% | 76.9% | 18.5% | 18.5% | 34.9% | 0 | 400 |
| M2813 | 15.5% | 15.5% | 15.5% | 76.9% | 34.9% | 34.9% | 50.4% | 1150 | 450 |
| M2814 | 19.0% | 19.0% | 18.8% | 76.9% | 7.3% | 7.3% | 42.8% | 0 | 350 |
| M2815 | 12.1% | 12.1% | 12.1% | 76.9% | 14.0% | 14.0% | 26.1% | 1050 | 50 |
| M2816 | 27.4% | 27.4% | 27.4% | 76.9% | 16.7% | 16.7% | 44.0% | 0 | 350 |
| M2817 | 24.8% | 24.8% | 21.9% | 76.9% | 20.6% | 20.6% | 46.9% | 0 | 300 |
| M2818 | 8.4% | 8.4% | 8.4% | 76.9% | 5.4% | 5.4% | 20.8% | 950 | 50 |
| M2819 | 7.2% | 7.2% | 7.2% | 76.9% | 12.5% | 12.5% | 19.7% | 1000 | −50 |
| M2820 | 10.4% | 10.4% | 10.4% | 76.9% | 24.6% | 24.6% | 35.0% | 1050 | 200 |
| M2821 | 15.0% | 15.0% | 15.0% | 76.9% | 24.7% | 24.7% | 39.7% | 1050 | 250 |
| M2822 | 11.9% | 11.9% | 11.9% | 76.9% | 9.9% | 9.9% | 29.7% | 950 | 150 |
| M2823 | 20.4% | 20.4% | 20.4% | 76.9% | 7.8% | 7.8% | 33.7% | 950 | 300 |
| M2824 | 16.2% | 16.2% | 16.2% | 76.9% | 15.0% | 15.0% | 31.1% | 0 | 300 |
| M2825 | 16.5% | 16.5% | 14.8% | 76.9% | 16.9% | 16.9% | 33.4% | 0 | 350 |
| M2826 | 8.2% | 8.2% | 8.2% | 76.9% | 15.1% | 15.1% | 27.5% | 950 | 150 |
| M2827 | 20.5% | 20.5% | 20.5% | 76.9% | 9.9% | 9.9% | 31.2% | 950 | 300 |
| M2828 | 19.0% | 19.0% | 19.0% | 76.9% | 15.0% | 15.0% | 34.0% | 950 | 200 |
| M2829 | 14.3% | 14.3% | 14.3% | 76.9% | 7.2% | 7.2% | 31.4% | 950 | 200 |
| M2830 | 24.9% | 24.9% | 21.4% | 76.9% | 15.6% | 15.6% | 46.0% | 0 | 300 |
| M2831 | 22.5% | 22.5% | 20.5% | 76.9% | 10.3% | 10.3% | 32.8% | 0 | 200 |
| M2832 | 19.6% | 19.6% | 19.6% | 76.9% | 10.0% | 10.0% | 29.6% | 0 | 150 |
| M2833 | 8.2% | 8.2% | 8.2% | 76.9% | 22.0% | 22.0% | 30.2% | 0 | 150 |
| M2834 | 8.4% | 8.4% | 8.4% | 76.9% | 12.5% | 12.5% | 21.6% | 950 | 0 |
| M2835 | 20.2% | 20.2% | 20.2% | 76.9% | 17.5% | 17.5% | 37.8% | 0 | 200 |
| M2836 | 15.4% | 15.4% | 15.4% | 76.9% | 4.9% | 4.9% | 35.2% | 950 | 200 |
| M2837 | 20.4% | 20.4% | 20.4% | 76.9% | 8.0% | 8.0% | 33.7% | 950 | 300 |
| M2838 | 16.1% | 16.1% | 14.4% | 76.9% | 18.3% | 18.3% | 34.4% | 0 | 400 |
| M2839 | 11.9% | 11.9% | 11.9% | 76.9% | 7.4% | 7.4% | 30.7% | 950 | 150 |
| M2840 | 8.3% | 8.3% | 8.3% | 77.0% | 10.0% | 10.0% | 26.2% | 950 | 100 |
| M2841 | 15.8% | 15.8% | 15.8% | 77.0% | 30.2% | 30.2% | 46.0% | 1150 | 400 |
| M2842 | 8.1% | 8.1% | 8.1% | 77.0% | 26.6% | 26.6% | 34.6% | 1250 | 250 |
| M2843 | 21.5% | 21.5% | 21.3% | 77.0% | 4.7% | 4.7% | 43.5% | 0 | 250 |
| M2844 | 15.1% | 15.1% | 15.1% | 77.0% | 23.9% | 23.9% | 39.0% | 1050 | 200 |
| M2845 | 15.6% | 15.6% | 15.6% | 77.0% | 15.1% | 15.1% | 30.8% | 1300 | 100 |
| M2846 | 26.9% | 26.9% | 26.9% | 77.0% | 20.1% | 20.1% | 46.9% | 0 | 350 |
| M2847 | 19.5% | 19.5% | 19.5% | 77.0% | 11.2% | 11.2% | 30.7% | 0 | 200 |
| M2848 | 15.0% | 15.0% | 15.0% | 77.0% | 25.5% | 25.5% | 40.5% | 1050 | 250 |
| M2849 | 20.6% | 20.6% | 20.6% | 77.0% | 10.1% | 10.1% | 30.7% | 950 | 250 |
| M2850 | 24.0% | 24.0% | 24.0% | 77.0% | 4.8% | 4.8% | 46.1% | 0 | 400 |
| M2851 | 20.1% | 20.1% | 20.1% | 77.0% | 18.8% | 18.8% | 38.9% | 1000 | 200 |
| M2852 | 15.8% | 15.8% | 15.8% | 77.0% | 30.2% | 30.2% | 46.0% | 1050 | 400 |
| M2853 | 20.5% | 20.5% | 20.5% | 77.0% | 12.0% | 12.0% | 32.5% | 1000 | 250 |
| M2854 | 1.1% | 1.1% | 1.1% | 77.0% | 30.0% | 30.0% | 31.2% | 1050 | 300 |
| M2855 | 8.3% | 8.3% | 8.3% | 77.0% | 9.9% | 9.9% | 28.0% | 950 | 150 |
| M2856 | 19.3% | 19.3% | 19.3% | 77.0% | 9.0% | 9.0% | 32.3% | 950 | 250 |
| M2857 | 20.8% | 20.8% | 18.2% | 77.0% | 20.4% | 20.4% | 41.1% | 0 | 400 |
| M2858 | 18.0% | 18.0% | 18.0% | 77.0% | 7.4% | 7.4% | 33.4% | 950 | 250 |
| M2859 | 8.1% | 8.1% | 8.1% | 77.0% | 25.6% | 25.6% | 33.7% | 1050 | 250 |
| M2860 | 9.7% | 9.7% | 9.7% | 77.0% | 13.2% | 13.2% | 22.9% | 1050 | 0 |
| M2861 | 12.9% | 12.9% | 12.9% | 77.0% | 20.5% | 20.5% | 33.4% | 950 | 200 |
| M2862 | 16.2% | 16.2% | 16.2% | 77.0% | 17.1% | 17.1% | 33.3% | 0 | 350 |
| M2863 | 15.5% | 15.5% | 15.5% | 77.0% | 35.5% | 35.5% | 51.0% | 0 | 450 |
| M2864 | 24.8% | 24.8% | 24.3% | 77.0% | 4.3% | 4.3% | 29.1% | 0 | 150 |
| M2865 | 16.2% | 16.2% | 16.2% | 77.0% | 13.3% | 13.3% | 29.4% | 0 | 250 |
| M2866 | 15.1% | 15.1% | 15.1% | 77.0% | 23.5% | 23.5% | 38.6% | 1050 | 200 |
| M2867 | 12.1% | 12.1% | 12.1% | 77.0% | 13.6% | 13.6% | 25.8% | 0 | 50 |
| M2868 | 24.1% | 24.1% | 23.6% | 77.0% | 11.4% | 11.4% | 35.5% | 0 | 250 |
| M2869 | 16.2% | 16.2% | 16.2% | 77.0% | 21.0% | 21.0% | 37.2% | 0 | 350 |
| M2870 | 12.1% | 12.1% | 12.0% | 77.0% | 9.6% | 9.6% | 25.5% | 0 | 200 |
| M2871 | 15.4% | 15.4% | 15.4% | 77.0% | 16.2% | 16.2% | 32.8% | 1000 | 200 |
| M2872 | 12.4% | 12.4% | 12.4% | 77.0% | 9.2% | 9.2% | 21.6% | 1150 | 0 |
| M2873 | 15.5% | 15.5% | 15.5% | 77.0% | 10.0% | 10.0% | 33.5% | 950 | 200 |
| M2874 | 5.7% | 5.7% | 5.7% | 77.0% | 29.9% | 29.9% | 35.6% | 0 | 300 |
| M2875 | 15.5% | 15.5% | 15.5% | 77.0% | 34.3% | 34.3% | 49.8% | 0 | 450 |
| M2876 | 20.9% | 20.9% | 16.7% | 77.0% | 5.2% | 5.2% | 28.8% | 0 | 100 |
| M2877 | 15.4% | 15.4% | 15.4% | 77.0% | 35.9% | 35.9% | 51.3% | 0 | 450 |
| M2878 | 20.6% | 20.6% | 8.4% | 77.0% | 5.4% | 5.4% | 29.5% | 0 | 100 |
| M2879 | 15.8% | 15.8% | 15.8% | 77.0% | 30.8% | 30.8% | 46.5% | 0 | 400 |
| M2880 | 15.7% | 15.7% | 15.7% | 77.0% | 5.1% | 5.1% | 30.3% | 950 | 200 |
| M2881 | 9.4% | 9.4% | 9.4% | 77.0% | 19.9% | 19.9% | 29.4% | 1000 | 100 |
| M2882 | 24.1% | 24.1% | 23.2% | 77.0% | 4.5% | 4.5% | 36.1% | 0 | 250 |
| M2883 | 24.2% | 24.2% | 23.7% | 77.0% | 6.6% | 6.6% | 35.7% | 0 | 250 |
| M2884 | 8.4% | 8.4% | 8.4% | 77.0% | 5.0% | 5.0% | 26.6% | 950 | 100 |
| M2885 | 20.0% | 20.0% | 20.0% | 77.0% | 20.0% | 20.0% | 40.0% | 1050 | 200 |
| M2886 | 15.9% | 15.9% | 15.9% | 77.0% | 29.1% | 29.1% | 45.0% | 0 | 350 |
| M2887 | 11.9% | 11.9% | 11.9% | 77.0% | 16.8% | 16.8% | 28.7% | 1000 | 50 |
| M2888 | 24.0% | 24.0% | 24.0% | 77.0% | 14.9% | 14.9% | 38.9% | 1000 | 300 |

TABLE 11-continued

Compositions and thermodynamic criteria for vanadium carbides

| | | | | | | | | | |
|---|---|---|---|---|---|---|---|---|---|
| M2889 | 20.4% | 20.4% | 19.5% | 77.0% | 7.6% | 7.6% | 31.7% | 0 | 200 |
| M2890 | 20.6% | 20.6% | 20.6% | 77.0% | 12.2% | 12.2% | 32.8% | 1000 | 250 |
| M2891 | 24.1% | 24.1% | 23.6% | 77.0% | 7.5% | 7.5% | 36.6% | 0 | 250 |
| M2892 | 24.5% | 24.5% | 24.5% | 77.0% | 9.6% | 9.6% | 34.1% | 1050 | 300 |
| M2893 | 22.9% | 22.9% | 21.9% | 77.0% | 5.2% | 5.2% | 34.7% | 0 | 250 |
| M2894 | 13.1% | 13.1% | 13.1% | 77.1% | 10.0% | 10.0% | 31.3% | 1000 | 150 |
| M2895 | 23.4% | 23.4% | 23.4% | 77.1% | 22.0% | 22.0% | 45.3% | 0 | 250 |
| M2896 | 19.6% | 19.6% | 19.6% | 77.1% | 25.1% | 25.1% | 44.7% | 1050 | 300 |
| M2897 | 15.5% | 15.5% | 15.5% | 77.1% | 34.6% | 34.6% | 50.1% | 0 | 450 |
| M2898 | 15.9% | 15.9% | 15.9% | 77.1% | 29.5% | 29.5% | 45.4% | 0 | 400 |
| M2899 | 8.3% | 8.3% | 8.3% | 77.1% | 4.6% | 4.6% | 28.6% | 950 | 150 |
| M2900 | 18.0% | 18.0% | 18.0% | 77.1% | 15.2% | 15.2% | 33.2% | 1050 | 200 |
| M2901 | 8.3% | 8.3% | 8.3% | 77.1% | 19.8% | 19.8% | 28.1% | 0 | 100 |
| M2902 | 8.2% | 8.2% | 8.2% | 77.1% | 22.0% | 22.0% | 30.2% | 1100 | 150 |
| M2903 | 18.2% | 18.2% | 18.2% | 77.1% | 12.7% | 12.7% | 31.0% | 0 | 150 |
| M2904 | 10.1% | 10.1% | 10.1% | 77.1% | 18.7% | 18.7% | 33.9% | 1100 | 0 |
| M2905 | 10.5% | 10.5% | 10.5% | 77.1% | 22.7% | 22.7% | 33.2% | 1000 | 200 |
| M2906 | 17.8% | 17.8% | 17.8% | 77.1% | 18.0% | 18.0% | 35.8% | 1000 | 200 |
| M2907 | 15.9% | 15.9% | 15.9% | 77.1% | 29.7% | 29.7% | 45.6% | 0 | 400 |
| M2908 | 12.0% | 12.0% | 12.0% | 77.1% | 16.5% | 16.5% | 28.5% | 1100 | 50 |
| M2909 | 11.8% | 11.8% | 11.8% | 77.1% | 12.1% | 12.1% | 32.8% | 1000 | 200 |
| M2910 | 8.3% | 8.3% | 8.3% | 77.1% | 21.2% | 21.2% | 29.4% | 1100 | 100 |
| M2911 | 8.3% | 8.3% | 8.3% | 77.1% | 19.7% | 19.7% | 28.0% | 1000 | 100 |
| M2912 | 11.9% | 11.9% | 11.9% | 77.1% | 17.5% | 17.5% | 29.5% | 1000 | 50 |
| M2913 | 16.1% | 16.1% | 16.1% | 77.1% | 15.2% | 15.2% | 31.3% | 0 | 350 |
| M2914 | 24.3% | 24.3% | 24.3% | 77.1% | 7.4% | 7.4% | 36.8% | 0 | 250 |
| M2915 | 16.2% | 16.2% | 16.2% | 77.1% | 19.1% | 19.1% | 35.3% | 0 | 350 |
| M2916 | 12.0% | 12.0% | 12.0% | 77.1% | 15.2% | 15.2% | 27.3% | 0 | 50 |
| M2917 | 19.5% | 19.5% | 19.5% | 77.1% | 10.5% | 10.5% | 30.0% | 0 | 150 |
| M2918 | 15.6% | 15.6% | 15.6% | 77.1% | 34.3% | 34.3% | 49.9% | 1100 | 450 |
| M2919 | 7.3% | 7.3% | 7.3% | 77.1% | 4.5% | 4.5% | 22.2% | 950 | 0 |
| M2920 | 13.2% | 13.2% | 13.2% | 77.1% | 7.5% | 7.5% | 28.9% | 1000 | 150 |
| M2921 | 16.1% | 16.1% | 16.1% | 77.1% | 15.2% | 15.2% | 31.3% | 0 | 350 |
| M2922 | 24.2% | 24.2% | 24.2% | 77.1% | 12.4% | 12.4% | 36.6% | 0 | 250 |
| M2923 | 16.2% | 16.2% | 16.2% | 77.1% | 19.3% | 19.3% | 35.5% | 0 | 350 |
| M2924 | 17.0% | 17.0% | 17.0% | 77.1% | 10.4% | 10.4% | 27.8% | 1000 | 200 |
| M2925 | 9.3% | 9.3% | 9.3% | 77.1% | 25.0% | 25.0% | 34.3% | 0 | 200 |
| M2926 | 11.8% | 11.8% | 11.8% | 77.1% | 19.6% | 19.6% | 31.4% | 1050 | 100 |
| M2927 | 7.0% | 7.0% | 7.0% | 77.1% | 24.8% | 24.8% | 31.8% | 1100 | 200 |
| M2928 | 21.5% | 21.5% | 18.8% | 77.1% | 21.4% | 21.4% | 42.9% | 0 | 400 |
| M2929 | 8.2% | 8.2% | 8.2% | 77.1% | 22.5% | 22.5% | 30.7% | 1050 | 150 |
| M2930 | 16.2% | 16.2% | 16.2% | 77.1% | 21.0% | 21.0% | 37.1% | 0 | 350 |
| M2931 | 24.4% | 24.4% | 24.4% | 77.1% | 7.4% | 7.4% | 35.7% | 0 | 250 |
| M2932 | 19.9% | 19.9% | 19.9% | 77.1% | 6.3% | 6.3% | 26.1% | 1050 | 150 |
| M2933 | 8.5% | 8.5% | 8.5% | 77.1% | 5.1% | 5.1% | 21.5% | 950 | 50 |
| M2934 | 19.7% | 19.7% | 19.7% | 77.1% | 25.0% | 25.0% | 44.7% | 1050 | 300 |
| M2935 | 19.3% | 19.3% | 19.3% | 77.1% | 15.4% | 15.4% | 34.7% | 0 | 200 |
| M2936 | 15.9% | 15.9% | 15.9% | 77.1% | 30.0% | 30.0% | 45.8% | 0 | 400 |
| M2937 | 22.5% | 22.5% | 22.5% | 77.1% | 18.7% | 18.7% | 41.2% | 1050 | 250 |
| M2938 | 23.5% | 23.5% | 23.5% | 77.1% | 20.5% | 20.5% | 44.0% | 0 | 250 |
| M2939 | 19.8% | 19.8% | 19.8% | 77.1% | 23.5% | 23.5% | 43.3% | 1050 | 250 |
| M2940 | 9.7% | 9.7% | 9.7% | 77.1% | 7.5% | 7.5% | 21.7% | 1000 | 50 |
| M2941 | 24.3% | 24.3% | 24.3% | 77.1% | 5.1% | 5.1% | 37.5% | 0 | 250 |
| M2942 | 15.9% | 15.9% | 15.9% | 77.1% | 29.5% | 29.5% | 45.4% | 1100 | 400 |
| M2943 | 13.9% | 13.9% | 13.9% | 77.1% | 26.0% | 26.0% | 39.8% | 1100 | 250 |
| M2944 | 8.3% | 8.3% | 8.3% | 77.1% | 20.2% | 20.2% | 28.5% | 1050 | 100 |
| M2945 | 8.4% | 8.4% | 8.4% | 77.1% | 0.0% | 0.0% | 27.1% | 950 | 100 |
| M2946 | 24.7% | 24.7% | 24.7% | 77.1% | 7.0% | 7.0% | 31.7% | 1050 | 250 |
| M2947 | 12.0% | 12.0% | 12.0% | 77.1% | 6.8% | 6.8% | 30.0% | 1000 | 150 |
| M2948 | 9.6% | 9.6% | 9.6% | 77.1% | 4.8% | 4.8% | 28.3% | 950 | 100 |
| M2949 | 12.3% | 12.3% | 12.3% | 77.1% | 6.9% | 6.9% | 23.7% | 0 | 0 |
| M2950 | 12.1% | 12.1% | 12.1% | 77.1% | 14.0% | 14.0% | 26.1% | 1250 | 50 |
| M2951 | 8.1% | 8.1% | 8.1% | 77.1% | 25.3% | 25.3% | 33.4% | 1050 | 250 |
| M2952 | 9.7% | 9.7% | 9.7% | 77.1% | 15.7% | 15.7% | 25.4% | 0 | 0 |
| M2953 | 8.2% | 8.2% | 8.2% | 77.1% | 22.4% | 22.4% | 30.6% | 1250 | 150 |
| M2954 | 14.7% | 14.7% | 14.7% | 77.1% | 5.0% | 5.0% | 26.6% | 0 | 100 |
| M2955 | 8.3% | 8.3% | 8.3% | 77.1% | 20.6% | 20.6% | 28.9% | 1050 | 100 |
| M2956 | 7.0% | 7.0% | 7.0% | 77.1% | 24.5% | 24.5% | 31.5% | 1050 | 200 |
| M2957 | 14.9% | 14.9% | 14.9% | 77.1% | 27.4% | 27.4% | 42.3% | 1300 | 300 |
| M2958 | 24.7% | 24.7% | 24.7% | 77.1% | 15.0% | 15.0% | 39.8% | 0 | 350 |
| M2959 | 12.8% | 12.8% | 12.8% | 77.1% | 24.5% | 24.5% | 37.3% | 1050 | 250 |
| M2960 | 17.0% | 17.0% | 17.0% | 77.1% | 5.2% | 5.2% | 32.4% | 1000 | 250 |
| M2961 | 24.4% | 24.4% | 24.4% | 77.1% | 8.6% | 8.6% | 35.3% | 0 | 250 |
| M2962 | 7.0% | 7.0% | 7.0% | 77.1% | 23.5% | 23.5% | 30.5% | 0 | 150 |
| M2963 | 8.5% | 8.5% | 8.5% | 77.1% | 7.8% | 7.8% | 28.1% | 1000 | 100 |
| M2964 | 17.7% | 17.7% | 17.7% | 77.1% | 21.3% | 21.3% | 39.0% | 1050 | 200 |
| M2965 | 9.8% | 9.8% | 9.8% | 77.1% | 5.3% | 5.3% | 24.1% | 1000 | 100 |
| M2966 | 9.8% | 9.8% | 9.8% | 77.1% | 3.2% | 3.2% | 29.7% | 1000 | 150 |

TABLE 11-continued

Compositions and thermodynamic criteria for vanadium carbides

| M2967 | 15.8% | 15.8% | 15.8% | 77.1% | 30.2% | 30.2% | 46.0% | 0 | 400 |
|---|---|---|---|---|---|---|---|---|---|
| M2968 | 22.9% | 22.9% | 22.9% | 77.1% | 14.8% | 14.8% | 37.7% | 1150 | 250 |
| M2969 | 10.0% | 10.0% | 10.0% | 77.1% | 6.3% | 6.3% | 27.8% | 1000 | 100 |
| M2970 | 20.6% | 20.6% | 20.6% | 77.1% | 14.0% | 14.0% | 34.6% | 0 | 200 |
| M2971 | 8.6% | 8.6% | 8.6% | 77.1% | 6.6% | 6.6% | 27.5% | 1000 | 100 |
| M2972 | 7.3% | 7.3% | 7.3% | 77.1% | 10.5% | 10.5% | 26.1% | 1050 | 100 |
| M2973 | 7.4% | 7.4% | 7.4% | 77.1% | 6.5% | 6.5% | 27.2% | 1000 | 100 |
| M2974 | 11.0% | 11.0% | 11.0% | 77.1% | 7.0% | 7.0% | 24.4% | 1000 | 100 |
| M2975 | 12.2% | 12.2% | 12.2% | 77.1% | 4.6% | 4.6% | 30.9% | 1000 | 150 |
| M2976 | 12.2% | 12.2% | 12.2% | 77.1% | 5.3% | 5.3% | 31.8% | 1000 | 200 |
| M2977 | 19.8% | 19.8% | 19.8% | 77.1% | 23.8% | 23.8% | 43.6% | 1000 | 250 |
| M2978 | 10.8% | 10.8% | 10.8% | 77.1% | 6.6% | 6.6% | 33.0% | 1000 | 250 |
| M2979 | 14.2% | 14.2% | 14.2% | 77.1% | 18.8% | 18.8% | 37.4% | 1000 | 250 |
| M2980 | 14.5% | 14.5% | 14.5% | 77.1% | 12.3% | 12.3% | 33.3% | 1000 | 200 |
| M2981 | 12.2% | 12.2% | 12.2% | 77.1% | 2.6% | 2.6% | 29.5% | 1000 | 150 |
| M2982 | 8.2% | 8.2% | 8.2% | 77.1% | 24.7% | 24.7% | 32.8% | 1050 | 200 |
| M2983 | 7.3% | 7.3% | 7.3% | 77.1% | 4.9% | 4.9% | 23.0% | 1000 | 50 |
| M2984 | 9.7% | 9.7% | 9.7% | 77.1% | 7.5% | 7.5% | 28.5% | 1000 | 100 |
| M2985 | 9.7% | 9.7% | 9.7% | 77.1% | 7.4% | 7.4% | 29.0% | 1000 | 150 |
| M2986 | 19.6% | 19.6% | 19.6% | 77.1% | 5.6% | 5.6% | 31.3% | 0 | 200 |
| M2987 | 12.0% | 12.0% | 12.0% | 77.1% | 5.0% | 5.0% | 33.3% | 1000 | 200 |
| M2988 | 9.8% | 9.8% | 9.8% | 77.1% | 9.9% | 9.9% | 29.1% | 1050 | 150 |
| M2989 | 16.2% | 16.2% | 16.2% | 77.1% | 13.6% | 0.0% | 29.8% | 0 | 350 |
| M2990 | 8.5% | 8.5% | 8.5% | 77.1% | 4.5% | 4.5% | 32.2% | 1000 | 250 |
| M2991 | 24.9% | 24.9% | 24.9% | 77.1% | 14.8% | 14.8% | 39.7% | 0 | 400 |
| M2992 | 12.2% | 12.2% | 12.2% | 77.1% | 10.9% | 10.9% | 26.6% | 1050 | 100 |
| M2993 | 12.3% | 12.3% | 12.3% | 77.1% | 7.5% | 7.5% | 27.1% | 1050 | 150 |
| M2994 | 14.2% | 14.2% | 14.2% | 77.1% | 22.4% | 22.4% | 37.2% | 1000 | 250 |
| M2995 | 10.8% | 10.8% | 10.8% | 77.1% | 7.3% | 7.3% | 32.9% | 1000 | 200 |
| M2996 | 18.3% | 18.3% | 18.3% | 77.1% | 5.2% | 5.2% | 31.5% | 0 | 150 |
| M2997 | 12.1% | 12.1% | 12.1% | 77.1% | 9.7% | 9.7% | 33.1% | 1050 | 200 |
| M2998 | 12.2% | 12.2% | 12.2% | 77.1% | 12.4% | 12.4% | 30.9% | 1050 | 100 |
| M2999 | 24.3% | 24.3% | 24.3% | 77.1% | 4.8% | 4.8% | 38.8% | 0 | 250 |
| M3000 | 7.0% | 7.0% | 7.0% | 77.1% | 25.7% | 25.7% | 32.7% | 1100 | 200 |
| M3001 | 7.0% | 7.0% | 7.0% | 77.2% | 24.0% | 24.0% | 31.0% | 0 | 200 |
| M3002 | 10.5% | 10.5% | 10.5% | 77.2% | 24.0% | 24.0% | 34.5% | 0 | 200 |
| M3003 | 17.8% | 17.8% | 17.8% | 77.2% | 20.6% | 20.6% | 38.4% | 1000 | 200 |
| M3004 | 15.8% | 15.8% | 15.8% | 77.2% | 30.4% | 30.4% | 46.2% | 0 | 450 |
| M3005 | 27.2% | 27.2% | 27.2% | 77.2% | 15.0% | 15.0% | 42.2% | 0 | 350 |
| M3006 | 15.9% | 15.9% | 15.9% | 77.2% | 15.0% | 15.0% | 30.9% | 0 | 400 |
| M3007 | 19.8% | 19.8% | 19.8% | 77.2% | 23.5% | 23.5% | 43.3% | 1150 | 250 |
| M3008 | 7.5% | 7.5% | 7.5% | 77.2% | 5.1% | 5.1% | 26.8% | 1050 | 50 |
| M3009 | 12.2% | 12.2% | 12.2% | 77.2% | 11.9% | 11.9% | 31.4% | 1050 | 150 |
| M3010 | 19.6% | 19.6% | 19.6% | 77.2% | 6.7% | 6.7% | 31.0% | 0 | 200 |
| M3011 | 16.1% | 16.1% | 16.1% | 77.2% | 19.3% | 19.3% | 35.3% | 0 | 350 |
| M3012 | 8.3% | 8.3% | 8.3% | 77.2% | 20.6% | 20.6% | 31.8% | 1050 | 150 |
| M3013 | 11.7% | 11.7% | 11.7% | 77.2% | 24.2% | 24.2% | 35.9% | 0 | 200 |
| M3014 | 20.5% | 20.5% | 20.5% | 77.2% | 15.0% | 15.0% | 35.5% | 1100 | 250 |
| M3015 | 11.9% | 11.9% | 11.9% | 77.2% | 20.0% | 20.0% | 31.9% | 1050 | 100 |
| M3016 | 8.5% | 8.5% | 8.5% | 77.2% | 14.9% | 14.9% | 28.1% | 1050 | 50 |
| M3017 | 11.9% | 11.9% | 11.9% | 77.2% | 19.0% | 19.0% | 30.8% | 0 | 100 |
| M3018 | 7.3% | 7.3% | 7.3% | 77.2% | 14.0% | 14.0% | 28.7% | 1050 | 100 |
| M3019 | 20.5% | 20.5% | 20.5% | 77.2% | 21.2% | 21.2% | 41.7% | 0 | 400 |
| M3020 | 18.3% | 18.3% | 18.3% | 77.2% | 7.2% | 7.2% | 32.1% | 0 | 150 |
| M3021 | 21.9% | 21.9% | 21.9% | 77.2% | 4.8% | 4.8% | 36.4% | 0 | 250 |
| M3022 | 8.8% | 8.8% | 8.8% | 77.2% | 4.5% | 4.5% | 28.1% | 1000 | 100 |
| M3023 | 12.1% | 12.1% | 12.1% | 77.2% | 14.1% | 14.1% | 30.3% | 1050 | 100 |
| M3024 | 15.0% | 15.0% | 15.0% | 77.2% | 26.4% | 26.4% | 41.4% | 1100 | 300 |
| M3025 | 12.4% | 12.4% | 12.4% | 77.2% | 7.6% | 7.6% | 30.3% | 1050 | 150 |
| M3026 | 12.4% | 12.4% | 12.4% | 77.2% | 7.3% | 7.3% | 27.4% | 1050 | 150 |
| M3027 | 12.4% | 12.4% | 12.4% | 77.2% | 7.2% | 7.2% | 26.8% | 1050 | 150 |
| M3028 | 8.6% | 8.6% | 8.6% | 77.2% | 5.0% | 5.0% | 21.9% | 0 | −50 |
| M3029 | 12.9% | 12.9% | 12.9% | 77.2% | 25.0% | 25.0% | 37.9% | 1050 | 250 |
| M3030 | 20.1% | 20.1% | 20.1% | 77.2% | 5.1% | 5.1% | 25.2% | 0 | 100 |
| M3031 | 20.7% | 20.7% | 20.7% | 77.2% | 4.7% | 4.7% | 36.5% | 0 | 200 |
| M3032 | 15.6% | 15.6% | 15.6% | 77.2% | 35.1% | 35.1% | 50.7% | 1150 | 450 |
| M3033 | 19.3% | 19.3% | 19.3% | 77.2% | 15.3% | 15.3% | 34.6% | 0 | 200 |
| M3034 | 19.0% | 19.0% | 19.0% | 77.2% | 19.9% | 19.9% | 39.0% | 1050 | 200 |
| M3035 | 19.1% | 19.1% | 19.1% | 77.2% | 4.7% | 4.7% | 48.7% | 0 | 450 |
| M3036 | 17.0% | 17.0% | 17.0% | 77.2% | 7.1% | 7.1% | 32.2% | 0 | 150 |
| M3037 | 26.7% | 26.7% | 26.7% | 77.2% | 18.5% | 18.5% | 45.2% | 0 | 350 |
| M3038 | 15.7% | 15.7% | 15.7% | 77.2% | 15.0% | 15.0% | 30.8% | 1350 | 150 |
| M3039 | 25.4% | 25.4% | 25.4% | 77.2% | 20.0% | 20.0% | 45.4% | 0 | 350 |
| M3040 | 12.4% | 12.4% | 12.4% | 77.2% | 7.5% | 7.5% | 26.3% | 1050 | 100 |
| M3041 | 9.7% | 9.7% | 9.7% | 77.2% | 15.0% | 15.0% | 34.5% | 1000 | 200 |
| M3042 | 14.7% | 14.7% | 14.7% | 77.2% | 11.5% | 11.5% | 29.6% | 1050 | 150 |
| M3043 | 23.2% | 23.2% | 23.2% | 77.2% | 6.1% | 6.1% | 36.1% | 0 | 250 |
| M3044 | 12.3% | 12.3% | 12.3% | 77.2% | 6.5% | 6.5% | 23.8% | 0 | 50 |

TABLE 11-continued

Compositions and thermodynamic criteria for vanadium carbides

| | | | | | | | | | |
|---|---|---|---|---|---|---|---|---|---|
| M3045 | 12.1% | 12.1% | 12.1% | 77.2% | 14.3% | 14.3% | 26.4% | 0 | 50 |
| M3046 | 8.2% | 8.2% | 8.2% | 77.2% | 24.0% | 24.0% | 32.2% | 0 | 200 |
| M3047 | 22.8% | 22.8% | 22.8% | 77.2% | 5.0% | 5.0% | 27.8% | 0 | 150 |
| M3048 | 15.1% | 15.1% | 15.1% | 77.2% | 5.0% | 5.0% | 31.7% | 1100 | 150 |
| M3049 | 12.7% | 12.7% | 12.7% | 77.2% | 26.3% | 26.3% | 39.0% | 0 | 300 |
| M3050 | 11.8% | 11.8% | 11.8% | 77.2% | 22.3% | 22.3% | 34.1% | 0 | 200 |
| M3051 | 10.4% | 10.4% | 10.4% | 77.2% | 27.5% | 27.5% | 37.9% | 1200 | 300 |
| M3052 | 10.4% | 10.4% | 10.4% | 77.2% | 27.0% | 27.0% | 37.4% | 1200 | 250 |
| M3053 | 23.0% | 23.0% | 23.0% | 77.2% | 5.1% | 5.1% | 39.9% | 0 | 250 |
| M3054 | 24.8% | 24.8% | 24.8% | 77.2% | 6.5% | 6.5% | 31.4% | 1050 | 250 |
| M3055 | 8.7% | 8.7% | 8.7% | 77.2% | 8.5% | 8.5% | 26.9% | 1050 | 50 |
| M3056 | 15.7% | 15.7% | 15.7% | 77.2% | 15.9% | 15.9% | 31.6% | 0 | 150 |
| M3057 | 9.8% | 9.8% | 9.8% | 77.2% | 12.9% | 12.9% | 33.4% | 1050 | 150 |
| M3058 | 14.6% | 14.6% | 14.6% | 77.2% | 13.5% | 13.5% | 29.1% | 1050 | 150 |
| M3059 | 10.0% | 10.0% | 10.0% | 77.2% | 7.9% | 7.9% | 28.7% | 1050 | 100 |
| M3060 | 14.6% | 14.6% | 14.6% | 77.2% | 13.0% | 13.0% | 29.5% | 1050 | 150 |
| M3061 | 23.3% | 23.3% | 23.3% | 77.2% | 11.2% | 11.2% | 34.4% | 0 | 250 |
| M3062 | 19.8% | 19.8% | 19.8% | 77.2% | 23.9% | 23.9% | 43.7% | 1100 | 250 |
| M3063 | 12.3% | 12.3% | 12.3% | 77.2% | 11.0% | 11.0% | 23.3% | 1050 | 50 |
| M3064 | 4.6% | 4.6% | 4.6% | 77.2% | 30.1% | 30.1% | 34.7% | 0 | 300 |
| M3065 | 12.1% | 12.1% | 12.1% | 77.2% | 15.3% | 15.3% | 35.6% | 1050 | 200 |
| M3066 | 22.9% | 22.9% | 22.9% | 77.2% | 7.1% | 7.1% | 40.6% | 0 | 250 |
| M3067 | 24.5% | 24.5% | 24.5% | 77.2% | 8.1% | 8.1% | 35.5% | 0 | 250 |
| M3068 | 8.5% | 8.5% | 8.5% | 77.2% | 13.9% | 13.9% | 24.5% | 1050 | 0 |
| M3069 | 23.2% | 23.2% | 23.2% | 77.2% | 5.0% | 5.0% | 36.4% | 0 | 250 |
| M3070 | 20.1% | 20.1% | 20.1% | 77.2% | 5.7% | 5.7% | 25.7% | 0 | 150 |
| M3071 | 15.9% | 15.9% | 15.9% | 77.2% | 30.3% | 30.3% | 46.2% | 1150 | 400 |
| M3072 | 22.3% | 22.3% | 22.3% | 77.2% | 10.1% | 10.1% | 32.4% | 0 | 200 |
| M3073 | 7.5% | 7.5% | 7.5% | 77.2% | 8.5% | 8.5% | 30.6% | 1050 | 150 |
| M3074 | 11.7% | 11.7% | 11.7% | 77.2% | 24.5% | 24.5% | 36.1% | 0 | 200 |
| M3075 | 16.0% | 16.0% | 16.0% | 77.2% | 13.3% | 13.3% | 29.3% | 0 | 400 |
| M3076 | 23.5% | 23.5% | 23.5% | 77.2% | 7.2% | 7.2% | 30.9% | 1050 | 250 |
| M3077 | 12.0% | 12.0% | 12.0% | 77.2% | 18.1% | 18.1% | 30.4% | 1050 | 100 |
| M3078 | 20.9% | 20.9% | 20.9% | 77.2% | 5.6% | 5.6% | 32.6% | 0 | 200 |
| M3079 | 7.0% | 7.0% | 7.0% | 77.2% | 24.5% | 24.5% | 31.5% | 1100 | 200 |
| M3080 | 20.2% | 20.2% | 20.2% | 77.2% | 18.5% | 18.5% | 38.7% | 0 | 200 |
| M3081 | 11.9% | 11.9% | 11.9% | 77.2% | 20.0% | 20.0% | 33.6% | 1050 | 150 |
| M3082 | 17.2% | 17.2% | 17.2% | 77.2% | 5.2% | 5.2% | 29.1% | 0 | 150 |
| M3083 | 8.1% | 8.1% | 8.1% | 77.2% | 26.3% | 26.3% | 34.4% | 1100 | 250 |
| M3084 | 13.0% | 13.0% | 13.0% | 77.2% | 21.9% | 21.9% | 34.9% | 1050 | 150 |
| M3085 | 23.5% | 23.5% | 23.5% | 77.2% | 21.7% | 21.7% | 45.2% | 0 | 250 |
| M3086 | 19.4% | 19.4% | 19.4% | 77.2% | 7.6% | 7.6% | 36.9% | 0 | 200 |
| M3087 | 14.7% | 14.7% | 14.7% | 77.2% | 7.6% | 7.6% | 31.0% | 0 | 100 |
| M3088 | 22.4% | 22.4% | 22.4% | 77.2% | 7.5% | 7.5% | 34.0% | 1100 | 250 |
| M3089 | 14.0% | 14.0% | 14.0% | 77.2% | 23.9% | 23.9% | 37.9% | 0 | 250 |
| M3090 | 10.3% | 10.3% | 4.0% | 77.2% | 11.3% | 11.3% | 21.7% | 0 | 200 |
| M3091 | 11.7% | 11.7% | 11.7% | 77.2% | 24.8% | 24.8% | 36.4% | 0 | 250 |
| M3092 | 23.0% | 23.0% | 23.0% | 77.2% | 14.2% | 14.2% | 37.2% | 1100 | 250 |
| M3093 | 12.2% | 12.2% | 12.2% | 77.2% | 13.3% | 13.3% | 25.5% | 0 | 0 |
| M3094 | 14.9% | 14.9% | 14.9% | 77.2% | 7.0% | 7.0% | 27.8% | 1050 | 150 |
| M3095 | 15.0% | 15.0% | 15.0% | 77.2% | 6.0% | 6.0% | 28.7% | 1050 | 200 |
| M3096 | 19.4% | 19.4% | 19.4% | 77.2% | 5.4% | 5.4% | 44.1% | 0 | 400 |
| M3097 | 23.0% | 23.0% | 23.0% | 77.2% | 14.9% | 14.9% | 37.8% | 1050 | 250 |
| M3098 | 8.7% | 8.7% | 8.7% | 77.2% | 8.3% | 8.3% | 28.0% | 1050 | 50 |
| M3099 | 12.0% | 12.0% | 12.0% | 77.2% | 17.0% | 17.0% | 29.0% | 0 | 50 |
| M3100 | 7.3% | 7.3% | 7.3% | 77.2% | 14.6% | 14.6% | 22.0% | 1250 | −50 |
| M3101 | 12.1% | 12.1% | 12.1% | 77.2% | 15.7% | 15.7% | 27.8% | 1050 | 50 |
| M3102 | 7.2% | 7.2% | 7.2% | 77.2% | 18.0% | 18.0% | 35.9% | 1000 | 300 |
| M3103 | 15.1% | 15.1% | 15.1% | 77.2% | 24.8% | 24.8% | 39.9% | 0 | 250 |
| M3104 | 15.7% | 15.7% | 15.7% | 77.2% | 16.0% | 16.0% | 33.4% | 1000 | 150 |
| M3105 | 20.9% | 20.9% | 20.9% | 77.2% | 10.1% | 10.1% | 32.9% | 1000 | 250 |
| M3106 | 19.8% | 19.8% | 19.8% | 77.2% | 24.3% | 24.3% | 44.1% | 0 | 250 |
| M3107 | 20.4% | 20.4% | 20.4% | 77.2% | 12.3% | 12.3% | 37.8% | 0 | 200 |
| M3108 | 17.8% | 17.8% | 17.8% | 77.2% | 21.2% | 21.2% | 39.6% | 1050 | 200 |
| M3109 | 12.3% | 12.3% | 12.3% | 77.2% | 10.8% | 10.8% | 28.9% | 1050 | 100 |
| M3110 | 7.6% | 7.6% | 7.6% | 77.2% | 5.3% | 5.3% | 29.2% | 1050 | 100 |
| M3111 | 16.0% | 16.0% | 16.0% | 77.2% | 7.4% | 7.4% | 27.3% | 0 | 150 |
| M3112 | 16.0% | 16.0% | 16.0% | 77.2% | 4.8% | 4.8% | 28.0% | 0 | 150 |
| M3113 | 8.7% | 8.7% | 8.7% | 77.2% | 9.5% | 9.5% | 22.7% | 1050 | 0 |
| M3114 | 16.1% | 16.1% | 16.1% | 77.2% | 9.7% | 9.7% | 25.8% | 1100 | 100 |
| M3115 | 14.5% | 14.5% | 14.5% | 77.2% | 10.6% | 10.6% | 31.2% | 0 | 100 |
| M3116 | 7.2% | 7.2% | 7.2% | 77.2% | 19.0% | 19.0% | 26.2% | 0 | 50 |
| M3117 | 14.1% | 14.1% | 14.1% | 77.2% | 22.3% | 22.3% | 36.4% | 1100 | 150 |
| M3118 | 24.4% | 24.4% | 24.4% | 77.2% | 7.9% | 7.9% | 36.8% | 0 | 300 |
| M3119 | 19.0% | 19.0% | 19.0% | 77.2% | 19.3% | 19.3% | 38.3% | 1100 | 200 |
| M3120 | 20.2% | 20.2% | 20.2% | 77.2% | 19.2% | 19.2% | 39.5% | 1100 | 250 |
| M3121 | 10.0% | 10.0% | 10.0% | 77.2% | 7.7% | 7.7% | 24.1% | 1050 | 50 |
| M3122 | 23.0% | 23.0% | 23.0% | 77.2% | 7.3% | 7.3% | 39.4% | 0 | 250 |

TABLE 11-continued

Compositions and thermodynamic criteria for vanadium carbides

| | | | | | | | | |
|---|---|---|---|---|---|---|---|---|
| M3123 | 11.9% | 11.9% | 11.9% | 77.2% | 19.8% | 19.8% | 31.7% | 1050 | 100 |
| M3124 | 7.3% | 7.3% | 7.3% | 77.2% | 14.5% | 14.5% | 31.1% | 1050 | 150 |
| M3125 | 12.1% | 12.1% | 12.1% | 77.2% | 16.0% | 16.0% | 31.5% | 1050 | 100 |
| M3126 | 22.5% | 22.5% | 22.5% | 77.2% | 19.9% | 19.9% | 42.4% | 1100 | 250 |
| M3127 | 10.6% | 10.6% | 10.6% | 77.2% | 23.1% | 23.1% | 36.9% | 1050 | 250 |
| M3128 | 15.8% | 15.8% | 15.8% | 77.2% | 15.2% | 15.2% | 31.0% | 0 | 400 |
| M3129 | 12.3% | 12.3% | 12.3% | 77.2% | 7.0% | 7.0% | 23.7% | 0 | 0 |
| M3130 | 7.4% | 7.4% | 7.4% | 77.2% | 5.4% | 5.4% | 19.3% | 0 | −50 |
| M3131 | 13.9% | 13.9% | 13.9% | 77.2% | 26.4% | 26.4% | 40.3% | 0 | 300 |
| M3132 | 14.8% | 14.8% | 14.8% | 77.2% | 7.5% | 7.5% | 26.0% | 0 | 100 |
| M3133 | 10.1% | 10.1% | 2.5% | 77.2% | 9.5% | 9.5% | 19.6% | 0 | 250 |
| M3134 | 12.4% | 12.4% | 12.4% | 77.2% | 5.0% | 5.0% | 24.4% | 0 | −50 |
| M3135 | 16.0% | 16.0% | 16.0% | 77.2% | 10.3% | 10.3% | 26.3% | 0 | 100 |
| M3136 | 8.5% | 8.5% | 8.5% | 77.2% | 14.2% | 14.2% | 24.6% | 1050 | 0 |
| M3137 | 13.0% | 13.0% | 13.0% | 77.2% | 23.5% | 23.5% | 39.8% | 1050 | 300 |
| M3138 | 22.5% | 22.5% | 22.5% | 77.2% | 7.3% | 7.3% | 29.8% | 0 | 200 |
| M3139 | 16.0% | 16.0% | 16.0% | 77.2% | 9.1% | 9.1% | 28.0% | 0 | 150 |
| M3140 | 16.0% | 16.0% | 16.0% | 77.2% | 6.7% | 6.7% | 28.8% | 0 | 150 |
| M3141 | 9.7% | 9.7% | 9.7% | 77.2% | 16.2% | 16.2% | 34.9% | 1050 | 200 |
| M3142 | 20.1% | 20.1% | 20.1% | 77.2% | 20.7% | 20.7% | 40.8% | 1200 | 200 |
| M3143 | 18.5% | 18.5% | 18.5% | 77.2% | 9.9% | 9.9% | 31.7% | 1050 | 250 |
| M3144 | 23.0% | 23.0% | 23.0% | 77.2% | 26.4% | 26.4% | 49.4% | 0 | 350 |
| M3145 | 15.0% | 15.0% | 15.0% | 77.2% | 6.5% | 6.5% | 29.4% | 1050 | 200 |
| M3146 | 8.8% | 8.8% | 8.8% | 77.2% | 5.2% | 5.2% | 29.4% | 1050 | 100 |
| M3147 | 15.1% | 15.1% | 15.1% | 77.2% | 26.4% | 26.4% | 41.5% | 0 | 300 |
| M3148 | 14.7% | 14.7% | 14.7% | 77.2% | 7.5% | 7.5% | 27.3% | 0 | 100 |
| M3149 | 15.1% | 15.1% | 15.1% | 77.2% | 24.8% | 24.8% | 40.0% | 1250 | 250 |
| M3150 | 15.1% | 15.1% | 15.1% | 77.2% | 25.4% | 25.4% | 40.5% | 0 | 250 |
| M3151 | 7.6% | 7.6% | 7.6% | 77.2% | 4.2% | 4.2% | 24.2% | 1050 | 50 |
| M3152 | 10.0% | 10.0% | 10.0% | 77.2% | 7.1% | 7.1% | 21.1% | 1050 | 0 |
| M3153 | 14.9% | 14.9% | 14.9% | 77.2% | 8.0% | 8.0% | 27.6% | 1050 | 150 |
| M3154 | 20.4% | 20.4% | 20.4% | 77.2% | 17.4% | 17.4% | 37.8% | 1050 | 250 |
| M3155 | 12.5% | 9.1% | 9.1% | 77.2% | 14.0% | 14.0% | 36.2% | 1150 | 50 |
| M3156 | 12.2% | 12.2% | 12.2% | 77.2% | 14.5% | 14.5% | 31.6% | 1050 | 100 |
| M3157 | 12.4% | 12.4% | 12.4% | 77.2% | 9.5% | 9.5% | 27.4% | 1050 | 100 |
| M3158 | 23.4% | 23.4% | 23.4% | 77.2% | 4.9% | 4.9% | 35.3% | 0 | 250 |
| M3159 | 23.6% | 23.6% | 23.6% | 77.2% | 19.9% | 19.9% | 43.5% | 0 | 250 |
| M3160 | 19.9% | 19.9% | 19.9% | 77.2% | 7.1% | 7.1% | 30.7% | 1050 | 250 |
| M3161 | 12.6% | 12.6% | 12.6% | 77.2% | 4.7% | 4.7% | 25.4% | 1050 | 100 |
| M3162 | 20.0% | 20.0% | 20.0% | 77.2% | 6.5% | 6.5% | 31.0% | 1050 | 250 |
| M3163 | 15.7% | 15.7% | 15.7% | 77.2% | 34.1% | 34.1% | 49.8% | 0 | 450 |
| M3164 | 7.2% | 7.2% | 7.2% | 77.2% | 20.0% | 20.0% | 29.4% | 1100 | 100 |
| M3165 | 15.6% | 15.6% | 15.6% | 77.2% | 35.7% | 35.7% | 51.2% | 0 | 450 |
| M3166 | 24.9% | 24.9% | 24.9% | 77.2% | 1.7% | 1.7% | 37.8% | 0 | 200 |
| M3167 | 15.8% | 15.8% | 15.8% | 77.2% | 13.4% | 13.4% | 29.1% | 0 | 400 |
| M3168 | 16.1% | 16.1% | 16.1% | 77.2% | 10.3% | 10.3% | 26.4% | 0 | 50 |
| M3169 | 8.5% | 8.5% | 8.5% | 77.2% | 13.1% | 13.1% | 24.5% | 0 | 50 |
| M3170 | 19.1% | 19.1% | 19.1% | 77.2% | 20.1% | 20.1% | 39.1% | 1050 | 200 |
| M3171 | 15.0% | 15.0% | 15.0% | 77.2% | 27.7% | 27.7% | 42.6% | 0 | 300 |
| M3172 | 12.9% | 12.9% | 12.9% | 77.2% | 25.5% | 25.5% | 38.4% | 1050 | 250 |
| M3173 | 15.7% | 15.7% | 15.7% | 77.2% | 9.2% | 9.2% | 34.1% | 0 | 150 |
| M3174 | 17.2% | 17.2% | 17.2% | 77.2% | 7.6% | 7.6% | 28.4% | 0 | 100 |
| M3175 | 10.4% | 10.4% | 10.4% | 77.2% | 26.4% | 26.4% | 36.9% | 0 | 250 |
| M3176 | 7.5% | 7.5% | 7.5% | 77.2% | 5.3% | 5.3% | 19.4% | 0 | −50 |
| M3177 | 11.1% | 11.1% | 11.1% | 77.2% | 5.1% | 5.1% | 23.1% | 0 | 0 |
| M3178 | 12.4% | 12.4% | 12.4% | 77.2% | 4.4% | 4.4% | 24.5% | 0 | 0 |
| M3179 | 12.2% | 12.2% | 12.2% | 77.3% | 5.1% | 5.1% | 31.8% | 0 | 150 |
| M3180 | 12.5% | 12.5% | 12.5% | 77.3% | 7.5% | 7.5% | 24.5% | 1050 | 50 |
| M3181 | 22.2% | 22.2% | 22.2% | 77.3% | 9.9% | 9.9% | 32.1% | 0 | 200 |
| M3182 | 8.4% | 8.4% | 8.4% | 77.3% | 20.3% | 20.3% | 28.6% | 1100 | 100 |
| M3183 | 23.6% | 23.6% | 23.6% | 77.3% | 18.7% | 18.7% | 43.9% | 0 | 250 |
| M3184 | 8.3% | 8.3% | 8.3% | 77.3% | 20.8% | 20.8% | 34.8% | 1050 | 250 |
| M3185 | 15.9% | 15.9% | 15.9% | 77.3% | 30.9% | 30.9% | 46.8% | 0 | 400 |
| M3186 | 19.9% | 19.9% | 19.9% | 77.3% | 8.0% | 8.0% | 29.1% | 1100 | 200 |
| M3187 | 15.7% | 15.7% | 15.7% | 77.3% | 34.5% | 34.5% | 50.2% | 0 | 450 |
| M3188 | 14.1% | 14.1% | 14.1% | 77.3% | 22.7% | 22.7% | 36.8% | 1100 | 200 |
| M3189 | 13.4% | 13.4% | 13.4% | 77.3% | 5.1% | 5.1% | 33.0% | 0 | 150 |
| M3190 | 7.5% | 7.5% | 7.5% | 77.3% | 7.1% | 7.1% | 22.2% | 1100 | 0 |
| M3191 | 16.0% | 16.0% | 16.0% | 77.3% | 29.2% | 29.2% | 45.3% | 0 | 350 |
| M3192 | 23.7% | 23.7% | 23.7% | 77.3% | 18.6% | 18.6% | 44.0% | 0 | 250 |
| M3193 | 25.1% | 25.1% | 25.1% | 77.3% | 5.1% | 5.1% | 30.3% | 0 | 200 |
| M3194 | 25.5% | 25.5% | 25.5% | 77.3% | 15.2% | 15.2% | 40.7% | 0 | 350 |
| M3195 | 11.1% | 11.1% | 11.1% | 77.3% | 7.4% | 7.4% | 23.7% | 0 | 50 |
| M3196 | 12.1% | 12.1% | 12.1% | 77.3% | 12.1% | 12.1% | 30.8% | 0 | 150 |
| M3197 | 20.2% | 20.2% | 20.2% | 77.3% | 20.5% | 20.5% | 40.7% | 0 | 400 |
| M3198 | 13.4% | 13.4% | 13.4% | 77.3% | 9.7% | 9.7% | 30.3% | 0 | 100 |
| M3199 | 9.9% | 9.9% | 9.9% | 77.3% | 9.7% | 9.7% | 19.6% | 1100 | −50 |
| M3200 | 10.5% | 10.5% | 10.5% | 77.3% | 26.0% | 26.0% | 36.5% | 1050 | 250 |

TABLE 11-continued

Compositions and thermodynamic criteria for vanadium carbides

| | | | | | | | | | |
|---|---|---|---|---|---|---|---|---|---|
| M3201 | 10.7% | 10.7% | 10.7% | 77.3% | 22.6% | 22.6% | 38.5% | 1100 | 300 |
| M3202 | 20.5% | 20.5% | 20.5% | 77.3% | 6.2% | 6.2% | 41.0% | 0 | 250 |
| M3203 | 9.9% | 9.9% | 9.9% | 77.3% | 2.5% | 2.5% | 22.6% | 0 | −50 |
| M3204 | 14.6% | 14.6% | 14.6% | 77.3% | 6.8% | 6.8% | 33.7% | 0 | 150 |
| M3205 | 12.2% | 12.2% | 12.2% | 77.3% | 15.0% | 15.0% | 27.2% | 0 | 50 |
| M3206 | 12.1% | 12.1% | 12.1% | 77.3% | 16.1% | 16.1% | 35.4% | 1050 | 150 |
| M3207 | 9.7% | 9.7% | 9.7% | 77.3% | 14.8% | 14.8% | 24.6% | 1050 | 0 |
| M3208 | 20.5% | 20.5% | 20.5% | 77.3% | 8.0% | 8.0% | 41.6% | 0 | 250 |
| M3209 | 7.4% | 7.4% | 7.4% | 77.3% | 12.2% | 12.2% | 19.6% | 0 | −50 |
| M3210 | 20.6% | 20.6% | 20.6% | 77.3% | 5.2% | 5.2% | 40.1% | 0 | 250 |
| M3211 | 7.0% | 7.0% | 7.0% | 77.3% | 27.5% | 27.5% | 34.5% | 1150 | 250 |
| M3212 | 13.8% | 13.8% | 13.8% | 77.3% | 5.0% | 5.0% | 26.3% | 1100 | 100 |
| M3213 | 8.5% | 8.5% | 8.5% | 77.3% | 16.5% | 16.5% | 26.3% | 1100 | 0 |
| M3214 | 14.9% | 14.9% | 14.9% | 77.3% | 5.3% | 5.3% | 26.7% | 0 | 50 |
| M3215 | 19.9% | 19.9% | 19.9% | 77.3% | 7.3% | 7.3% | 28.8% | 1100 | 200 |
| M3216 | 19.5% | 19.5% | 19.5% | 77.3% | 5.3% | 5.3% | 37.8% | 0 | 200 |
| M3217 | 15.7% | 15.7% | 15.7% | 77.3% | 34.8% | 34.8% | 50.5% | 0 | 450 |
| M3218 | 7.4% | 7.4% | 7.4% | 77.3% | 10.3% | 10.3% | 24.2% | 1100 | 0 |
| M3219 | 15.6% | 15.6% | 15.6% | 77.3% | 36.4% | 36.4% | 51.9% | 0 | 450 |
| M3220 | 9.7% | 9.7% | 9.7% | 77.3% | 10.2% | 10.2% | 27.8% | 0 | 100 |
| M3221 | 24.6% | 24.6% | 24.6% | 77.3% | 10.5% | 10.5% | 35.1% | 1200 | 300 |
| M3222 | 14.2% | 14.2% | 14.2% | 77.3% | 22.2% | 22.2% | 36.4% | 1100 | 150 |
| M3223 | 16.0% | 16.0% | 16.0% | 77.3% | 29.6% | 29.6% | 45.7% | 0 | 400 |
| M3224 | 17.0% | 17.0% | 17.0% | 77.3% | 7.4% | 7.4% | 35.9% | 0 | 200 |
| M3225 | 11.7% | 11.7% | 11.7% | 77.3% | 24.5% | 24.5% | 36.2% | 0 | 200 |
| M3226 | 7.0% | 7.0% | 7.0% | 77.3% | 25.5% | 25.5% | 32.6% | 1050 | 200 |
| M3227 | 24.9% | 24.9% | 24.9% | 77.3% | 7.2% | 7.2% | 32.1% | 1200 | 250 |
| M3228 | 24.8% | 24.8% | 24.8% | 77.3% | 8.5% | 8.5% | 33.3% | 0 | 250 |
| M3229 | 10.5% | 10.5% | 10.5% | 77.3% | 26.5% | 26.5% | 37.0% | 1150 | 250 |
| M3230 | 14.8% | 14.8% | 14.8% | 77.3% | 9.9% | 9.9% | 32.0% | 1050 | 150 |
| M3231 | 8.6% | 8.6% | 8.6% | 77.3% | 9.6% | 9.6% | 21.8% | 0 | −50 |
| M3232 | 20.3% | 20.3% | 20.3% | 77.3% | 15.6% | 15.6% | 39.1% | 0 | 200 |
| M3233 | 21.0% | 21.0% | 21.0% | 77.3% | 7.6% | 7.6% | 32.1% | 0 | 250 |
| M3234 | 12.7% | 12.7% | 12.7% | 77.3% | 28.0% | 28.0% | 40.7% | 0 | 300 |
| M3235 | 14.3% | 14.3% | 14.3% | 77.3% | 21.1% | 21.1% | 37.2% | 1050 | 200 |
| M3236 | 15.0% | 15.0% | 15.0% | 77.3% | 7.0% | 7.0% | 30.7% | 1050 | 200 |
| M3237 | 9.9% | 9.9% | 9.9% | 77.3% | 5.0% | 5.0% | 23.2% | 0 | 0 |
| M3238 | 15.1% | 15.1% | 15.1% | 77.3% | 4.9% | 4.9% | 27.7% | 1050 | 150 |
| M3239 | 15.7% | 15.7% | 15.7% | 77.3% | 13.3% | 13.3% | 29.0% | 0 | 350 |
| M3240 | 21.5% | 21.5% | 21.5% | 77.3% | 12.4% | 12.4% | 42.6% | 0 | 250 |
| M3241 | 15.7% | 15.7% | 15.7% | 77.3% | 15.2% | 15.2% | 30.9% | 0 | 400 |
| M3242 | 8.6% | 8.6% | 8.6% | 77.3% | 10.8% | 10.8% | 34.9% | 1050 | 250 |
| M3243 | 19.8% | 19.8% | 19.8% | 77.3% | 24.8% | 24.8% | 44.6% | 0 | 300 |
| M3244 | 2.3% | 2.3% | 2.3% | 77.3% | 30.0% | 30.0% | 32.3% | 0 | 250 |
| M3245 | 12.4% | 12.4% | 12.4% | 77.3% | 6.1% | 6.1% | 25.3% | 0 | 50 |
| M3246 | 11.3% | 11.3% | 11.3% | 77.3% | 7.3% | 7.3% | 24.1% | 1100 | 50 |
| M3247 | 12.5% | 12.5% | 12.5% | 77.3% | 7.7% | 7.7% | 21.0% | 1100 | 50 |
| M3248 | 12.3% | 12.3% | 12.3% | 77.3% | 11.0% | 11.0% | 25.4% | 1100 | 100 |
| M3249 | 8.4% | 8.4% | 8.4% | 77.3% | 18.6% | 18.6% | 27.0% | 0 | 50 |
| M3250 | 7.3% | 7.3% | 7.3% | 77.3% | 10.9% | 10.9% | 24.0% | 0 | 50 |
| M3251 | 14.9% | 14.9% | 14.9% | 77.3% | 6.1% | 6.1% | 26.5% | 0 | 50 |
| M3252 | 19.9% | 19.9% | 19.9% | 77.3% | 4.6% | 4.6% | 31.9% | 0 | 150 |
| M3253 | 19.8% | 19.8% | 19.8% | 77.3% | 9.5% | 9.5% | 32.3% | 1050 | 250 |
| M3254 | 14.9% | 14.9% | 14.9% | 77.3% | 6.7% | 6.7% | 26.3% | 0 | 100 |
| M3255 | 19.9% | 19.9% | 19.9% | 77.3% | 8.4% | 8.4% | 31.4% | 1050 | 250 |
| M3256 | 12.3% | 12.3% | 12.3% | 77.3% | 10.6% | 10.6% | 25.1% | 0 | 50 |
| M3257 | 22.3% | 22.3% | 22.3% | 77.3% | 4.9% | 4.9% | 34.2% | 0 | 200 |
| M3258 | 7.5% | 7.5% | 7.5% | 77.3% | 8.0% | 8.0% | 33.9% | 1100 | 200 |
| M3259 | 12.4% | 12.4% | 12.4% | 77.3% | 7.1% | 7.1% | 26.3% | 0 | 100 |
| M3260 | 17.6% | 17.6% | 17.6% | 77.3% | 5.1% | 5.1% | 27.6% | 1100 | 150 |
| M3261 | 7.0% | 7.0% | 7.0% | 77.3% | 26.5% | 26.5% | 33.9% | 1050 | 250 |
| M3262 | 15.8% | 15.8% | 15.8% | 77.3% | 30.2% | 30.2% | 48.6% | 0 | 450 |
| M3263 | 19.5% | 19.5% | 19.5% | 77.3% | 7.6% | 7.6% | 37.1% | 0 | 200 |
| M3264 | 17.0% | 17.0% | 17.0% | 77.3% | 4.7% | 4.7% | 40.6% | 0 | 250 |
| M3265 | 19.6% | 19.6% | 19.6% | 77.3% | 6.9% | 6.9% | 37.3% | 0 | 250 |
| M3266 | 17.7% | 17.7% | 17.7% | 77.3% | 5.0% | 5.0% | 27.5% | 1200 | 150 |
| M3267 | 12.2% | 12.2% | 12.2% | 77.3% | 15.6% | 15.6% | 27.8% | 0 | 50 |
| M3268 | 14.6% | 14.6% | 14.6% | 77.3% | 15.0% | 15.0% | 29.6% | 0 | 100 |
| M3269 | 14.8% | 14.8% | 14.8% | 77.3% | 8.1% | 8.1% | 28.4% | 0 | 100 |
| M3270 | 13.9% | 13.9% | 13.9% | 77.3% | 27.8% | 27.8% | 41.7% | 0 | 300 |
| M3271 | 12.6% | 12.6% | 12.6% | 77.3% | 4.8% | 4.8% | 24.7% | 0 | 0 |
| M3272 | 7.4% | 7.4% | 7.4% | 77.3% | 5.0% | 5.0% | 25.9% | 0 | 0 |
| M3273 | 12.3% | 12.3% | 12.3% | 77.3% | 6.8% | 6.8% | 30.1% | 0 | 100 |
| M3274 | 10.0% | 10.0% | 3.1% | 77.3% | 13.1% | 13.1% | 23.1% | 0 | 300 |
| M3275 | 17.9% | 17.9% | 17.9% | 77.3% | 13.8% | 13.8% | 39.8% | 0 | 250 |
| M3276 | 19.7% | 19.7% | 19.7% | 77.3% | 25.4% | 25.4% | 45.1% | 0 | 300 |
| M3277 | 16.0% | 16.0% | 16.0% | 77.3% | 29.9% | 29.9% | 45.9% | 0 | 400 |
| M3278 | 14.0% | 14.0% | 14.0% | 77.3% | 26.6% | 26.6% | 41.3% | 1050 | 300 |

TABLE 11-continued

Compositions and thermodynamic criteria for vanadium carbides

| | | | | | | | | | |
|---|---|---|---|---|---|---|---|---|---|
| M3279 | 9.9% | 9.9% | 9.9% | 77.3% | 10.1% | 10.1% | 25.8% | 1100 | 50 |
| M3280 | 12.7% | 12.7% | 12.7% | 77.3% | 2.9% | 2.9% | 27.7% | 1100 | 150 |
| M3281 | 12.7% | 12.7% | 12.7% | 77.3% | 2.1% | 2.1% | 28.1% | 1150 | 150 |
| M3282 | 9.9% | 9.9% | 9.9% | 77.3% | 12.1% | 12.1% | 22.0% | 0 | −50 |
| M3283 | 7.2% | 7.2% | 7.2% | 77.3% | 13.5% | 13.5% | 28.1% | 0 | 150 |
| M3284 | 11.8% | 11.8% | 11.8% | 77.3% | 22.4% | 22.4% | 34.2% | 0 | 200 |
| M3285 | 19.7% | 19.7% | 19.7% | 77.3% | 26.5% | 26.5% | 46.2% | 0 | 350 |
| M3286 | 19.7% | 19.7% | 19.7% | 77.3% | 26.1% | 26.1% | 45.8% | 0 | 300 |
| M3287 | 12.3% | 12.3% | 12.3% | 77.3% | 15.2% | 15.2% | 27.5% | 1350 | 50 |
| M3288 | 10.4% | 10.4% | 10.4% | 77.3% | 28.0% | 28.0% | 38.4% | 0 | 300 |
| M3289 | 10.4% | 10.4% | 10.4% | 77.3% | 28.0% | 28.0% | 38.4% | 0 | 300 |
| M3290 | 16.0% | 16.0% | 16.0% | 77.3% | 5.3% | 5.3% | 31.8% | 0 | 150 |
| M3291 | 8.8% | 8.8% | 8.8% | 77.3% | 6.0% | 6.0% | 30.7% | 1150 | 100 |
| M3292 | 16.2% | 16.2% | 16.2% | 77.3% | 7.6% | 7.6% | 28.1% | 1100 | 150 |
| M3293 | 9.9% | 9.9% | 9.9% | 77.3% | 5.5% | 5.5% | 26.9% | 0 | 50 |
| M3294 | 19.4% | 19.4% | 19.4% | 77.3% | 7.8% | 7.8% | 39.5% | 0 | 250 |
| M3295 | 21.0% | 21.0% | 21.0% | 77.3% | 5.4% | 5.4% | 35.4% | 0 | 250 |
| M3296 | 26.5% | 26.5% | 26.5% | 77.3% | 16.9% | 16.9% | 43.4% | 0 | 350 |
| M3297 | 7.2% | 7.2% | 7.2% | 77.3% | 16.5% | 16.5% | 39.0% | 1100 | 350 |
| M3298 | 20.0% | 20.0% | 20.0% | 77.3% | 21.0% | 21.0% | 41.0% | 0 | 400 |
| M3299 | 13.6% | 13.6% | 13.6% | 77.3% | 7.6% | 7.6% | 26.1% | 0 | 100 |
| M3300 | 13.7% | 13.7% | 13.7% | 77.3% | 7.4% | 7.4% | 24.0% | 1100 | 100 |
| M3301 | 11.9% | 11.9% | 11.9% | 77.3% | 20.0% | 20.0% | 35.9% | 1050 | 200 |
| M3302 | 11.9% | 11.9% | 11.9% | 77.3% | 21.7% | 21.7% | 35.8% | 1100 | 200 |
| M3303 | 12.1% | 12.1% | 12.1% | 77.3% | 16.1% | 16.1% | 30.9% | 1100 | 100 |
| M3304 | 21.1% | 21.1% | 21.1% | 77.3% | 5.3% | 5.3% | 32.9% | 0 | 250 |
| M3305 | 19.6% | 19.6% | 19.6% | 77.3% | 5.2% | 5.2% | 36.6% | 0 | 200 |
| M3306 | 12.0% | 12.0% | 12.0% | 77.3% | 18.5% | 18.5% | 37.7% | 1100 | 250 |
| M3307 | 19.6% | 19.6% | 19.6% | 77.3% | 6.0% | 6.0% | 36.4% | 0 | 250 |
| M3308 | 19.6% | 19.6% | 19.6% | 77.3% | 5.1% | 5.1% | 36.7% | 0 | 250 |
| M3309 | 20.6% | 20.6% | 20.6% | 77.3% | 12.5% | 12.5% | 36.6% | 0 | 250 |
| M3310 | 18.0% | 18.0% | 18.0% | 77.3% | 12.1% | 12.1% | 39.1% | 0 | 200 |
| M3311 | 14.5% | 14.5% | 14.5% | 77.3% | 7.5% | 7.5% | 37.2% | 0 | 250 |
| M3312 | 12.2% | 12.2% | 12.2% | 77.3% | 14.5% | 14.5% | 30.4% | 1050 | 100 |
| M3313 | 9.7% | 9.7% | 9.7% | 77.3% | 12.5% | 12.5% | 28.3% | 0 | 100 |
| M3314 | 9.7% | 9.7% | 9.7% | 77.3% | 9.9% | 9.9% | 29.2% | 0 | 100 |
| M3315 | 12.4% | 12.4% | 12.4% | 77.3% | 8.7% | 8.7% | 31.7% | 1100 | 150 |
| M3316 | 9.8% | 9.8% | 9.8% | 77.3% | 7.7% | 7.7% | 29.9% | 0 | 150 |
| M3317 | 17.0% | 17.0% | 17.0% | 77.3% | 15.0% | 15.0% | 32.0% | 1300 | 150 |
| M3318 | 14.6% | 14.6% | 14.6% | 77.3% | 6.6% | 6.6% | 36.2% | 0 | 200 |
| M3319 | 12.1% | 12.1% | 12.1% | 77.3% | 5.9% | 5.9% | 39.2% | 0 | 300 |
| M3320 | 8.8% | 8.8% | 8.8% | 77.3% | 4.9% | 4.9% | 25.0% | 1100 | 50 |
| M3321 | 8.4% | 8.4% | 8.4% | 77.3% | 16.6% | 16.6% | 29.4% | 0 | 150 |
| M3322 | 19.9% | 19.9% | 19.9% | 77.3% | 7.7% | 7.7% | 30.9% | 0 | 150 |
| M3323 | 13.4% | 13.4% | 13.4% | 77.3% | 5.2% | 5.2% | 35.6% | 0 | 200 |
| M3324 | 8.3% | 8.3% | 8.3% | 77.3% | 22.9% | 22.9% | 36.4% | 1200 | 250 |
| M3325 | 8.9% | 8.9% | 8.9% | 77.3% | 1.1% | 1.1% | 27.6% | 1150 | 50 |
| M3326 | 20.1% | 20.1% | 20.1% | 77.3% | 5.5% | 5.5% | 30.4% | 1150 | 200 |
| M3327 | 15.8% | 15.8% | 15.8% | 77.3% | 7.6% | 7.6% | 38.4% | 0 | 250 |
| M3328 | 7.0% | 7.0% | 7.0% | 77.3% | 25.0% | 25.0% | 35.1% | 1150 | 250 |
| M3329 | 20.0% | 20.0% | 20.0% | 77.3% | 4.0% | 4.0% | 32.2% | 0 | 200 |
| M3330 | 15.1% | 15.1% | 15.1% | 77.3% | 5.3% | 5.3% | 29.5% | 1100 | 200 |
| M3331 | 15.6% | 15.6% | 15.6% | 77.3% | 35.1% | 35.1% | 50.7% | 0 | 450 |
| M3332 | 19.6% | 19.6% | 19.6% | 77.3% | 7.4% | 7.4% | 37.2% | 0 | 250 |
| M3333 | 19.6% | 19.6% | 19.6% | 77.3% | 6.6% | 6.6% | 37.5% | 0 | 250 |
| M3334 | 7.5% | 7.5% | 7.5% | 77.3% | 6.0% | 6.0% | 21.8% | 0 | −50 |
| M3335 | 19.9% | 19.9% | 19.9% | 77.3% | 10.3% | 10.3% | 37.7% | 0 | 250 |
| M3336 | 12.0% | 12.0% | 12.0% | 77.3% | 18.5% | 18.5% | 31.9% | 1100 | 100 |
| M3337 | 7.3% | 7.3% | 7.3% | 77.3% | 14.2% | 14.2% | 21.5% | 0 | −50 |
| M3338 | 19.6% | 19.6% | 19.6% | 77.3% | 27.7% | 27.7% | 47.3% | 0 | 350 |
| M3339 | 9.9% | 9.9% | 9.9% | 77.3% | 2.9% | 2.9% | 31.6% | 0 | 100 |
| M3340 | 12.3% | 12.3% | 12.3% | 77.3% | 5.9% | 5.9% | 30.5% | 0 | 100 |
| M3341 | 18.0% | 18.0% | 18.0% | 77.3% | 15.7% | 15.7% | 39.1% | 0 | 200 |
| M3342 | 14.2% | 14.2% | 14.2% | 77.3% | 22.8% | 22.8% | 37.5% | 1100 | 200 |
| M3343 | 16.0% | 16.0% | 16.0% | 77.3% | 29.5% | 29.5% | 46.6% | 0 | 450 |
| M3344 | 19.7% | 19.7% | 19.7% | 77.3% | 26.7% | 26.7% | 47.4% | 1100 | 350 |
| M3345 | 17.2% | 17.2% | 17.2% | 77.3% | 12.1% | 12.1% | 29.3% | 0 | 150 |
| M3346 | 20.1% | 20.1% | 20.1% | 77.3% | 19.7% | 19.7% | 42.4% | 0 | 250 |
| M3347 | 14.7% | 14.7% | 14.7% | 77.3% | 8.6% | 8.6% | 32.0% | 0 | 150 |
| M3348 | 7.5% | 7.5% | 7.5% | 77.3% | 10.8% | 10.8% | 18.2% | 0 | −50 |
| M3349 | 9.9% | 9.9% | 9.9% | 77.3% | 11.0% | 11.0% | 21.1% | 1150 | −50 |
| M3350 | 19.3% | 19.3% | 19.3% | 77.3% | 15.6% | 15.6% | 35.6% | 0 | 200 |
| M3351 | 8.6% | 8.6% | 8.6% | 77.3% | 12.8% | 12.8% | 29.6% | 1100 | 100 |
| M3352 | 7.5% | 7.5% | 7.5% | 77.3% | 4.5% | 4.5% | 25.3% | 1200 | 0 |
| M3353 | 12.2% | 12.2% | 12.2% | 77.3% | 16.8% | 16.8% | 29.0% | 0 | 50 |
| M3354 | 14.8% | 14.8% | 14.8% | 77.3% | 12.7% | 12.7% | 28.3% | 0 | 100 |
| M3355 | 19.8% | 19.8% | 19.8% | 77.3% | 25.5% | 25.5% | 45.5% | 1050 | 300 |
| M3356 | 18.5% | 18.5% | 18.5% | 77.3% | 5.3% | 5.3% | 36.8% | 0 | 200 |

TABLE 11-continued

Compositions and thermodynamic criteria for vanadium carbides

| | | | | | | | | | |
|---|---|---|---|---|---|---|---|---|---|
| M3357 | 8.5% | 8.5% | 8.5% | 77.3% | 7.0% | 7.0% | 36.5% | 0 | 300 |
| M3358 | 14.9% | 14.9% | 14.9% | 77.3% | 9.0% | 9.0% | 30.5% | 1100 | 150 |
| M3359 | 10.4% | 10.4% | 10.4% | 77.3% | 28.0% | 28.0% | 38.5% | 0 | 300 |
| M3360 | 15.0% | 15.0% | 15.0% | 77.3% | 28.1% | 28.1% | 43.1% | 0 | 350 |
| M3361 | 8.5% | 8.5% | 8.5% | 77.3% | 14.5% | 14.5% | 31.3% | 1100 | 150 |
| M3362 | 7.3% | 7.3% | 7.3% | 77.3% | 15.5% | 15.5% | 33.6% | 1100 | 200 |
| M3363 | 15.1% | 15.1% | 15.1% | 77.3% | 26.5% | 26.5% | 41.6% | 0 | 300 |
| M3364 | 12.0% | 12.0% | 12.0% | 77.3% | 18.0% | 18.0% | 33.5% | 1150 | 100 |
| M3365 | 20.0% | 20.0% | 20.0% | 77.3% | 20.6% | 20.6% | 43.2% | 0 | 300 |
| M3366 | 12.1% | 12.1% | 12.1% | 77.3% | 8.1% | 8.1% | 38.4% | 0 | 300 |
| M3367 | 20.1% | 20.1% | 20.1% | 77.3% | 18.2% | 18.2% | 44.1% | 0 | 300 |
| M3368 | 18.1% | 18.1% | 18.1% | 77.3% | 12.3% | 12.3% | 40.4% | 0 | 250 |
| M3369 | 21.2% | 21.2% | 21.2% | 77.3% | 7.5% | 7.5% | 30.7% | 1100 | 200 |
| M3370 | 15.3% | 15.3% | 15.3% | 77.3% | 23.0% | 23.0% | 39.5% | 1050 | 250 |
| M3371 | 15.9% | 15.9% | 15.9% | 77.3% | 5.1% | 5.1% | 38.1% | 0 | 200 |
| M3372 | 12.0% | 12.0% | 12.0% | 77.3% | 12.3% | 12.3% | 35.6% | 0 | 250 |
| M3373 | 19.6% | 19.6% | 19.6% | 77.3% | 8.7% | 8.7% | 35.6% | 0 | 250 |
| M3374 | 19.7% | 19.7% | 19.7% | 77.3% | 5.5% | 5.5% | 36.6% | 0 | 250 |
| M3375 | 9.9% | 9.9% | 9.9% | 77.3% | 9.2% | 9.2% | 20.6% | 0 | −50 |
| M3376 | 10.0% | 10.0% | 10.0% | 77.3% | 7.9% | 7.9% | 21.0% | 0 | −50 |
| M3377 | 17.5% | 17.5% | 17.5% | 77.3% | 24.7% | 24.7% | 44.8% | 1150 | 350 |
| M3378 | 10.0% | 10.0% | 10.0% | 77.3% | 5.0% | 5.0% | 34.2% | 1150 | 150 |
| M3379 | 14.6% | 14.6% | 14.6% | 77.3% | 14.0% | 14.0% | 33.6% | 1100 | 150 |
| M3380 | 14.9% | 14.9% | 14.9% | 77.3% | 5.1% | 5.1% | 28.2% | 0 | 100 |
| M3381 | 15.6% | 15.6% | 15.6% | 77.3% | 12.6% | 12.6% | 40.3% | 0 | 300 |
| M3382 | 8.1% | 8.1% | 8.1% | 77.3% | 27.3% | 27.3% | 35.4% | 0 | 300 |
| M3383 | 9.9% | 9.9% | 9.9% | 77.3% | 6.0% | 6.0% | 25.5% | 0 | 50 |
| M3384 | 12.1% | 12.1% | 12.1% | 77.3% | 14.3% | 14.3% | 37.7% | 1100 | 250 |
| M3385 | 10.1% | 10.1% | 10.1% | 77.3% | 3.4% | 3.4% | 21.3% | 1150 | 0 |
| M3386 | 14.6% | 14.6% | 14.6% | 77.3% | 5.1% | 5.1% | 40.5% | 0 | 300 |
| M3387 | 20.4% | 20.4% | 20.4% | 77.3% | 18.2% | 18.2% | 38.7% | 1150 | 250 |
| M3388 | 12.5% | 12.5% | 12.5% | 77.3% | 8.3% | 8.3% | 20.8% | 1250 | 0 |
| M3389 | 12.5% | 12.5% | 12.5% | 77.3% | 8.3% | 8.3% | 21.9% | 1250 | 50 |
| M3390 | 7.4% | 7.4% | 7.4% | 77.3% | 5.1% | 5.1% | 31.0% | 0 | 200 |
| M3391 | 21.7% | 21.7% | 21.7% | 77.3% | 15.2% | 15.2% | 40.4% | 0 | 250 |
| M3392 | 14.5% | 14.5% | 14.5% | 77.3% | 14.6% | 14.6% | 40.0% | 1100 | 250 |
| M3393 | 12.1% | 12.1% | 12.1% | 77.3% | 15.2% | 15.2% | 34.5% | 0 | 150 |
| M3394 | 20.0% | 20.0% | 20.0% | 77.3% | 7.1% | 7.1% | 30.6% | 0 | 200 |
| M3395 | 22.4% | 22.4% | 22.4% | 77.3% | 7.5% | 7.5% | 33.0% | 0 | 250 |
| M3396 | 8.4% | 8.4% | 8.4% | 77.3% | 17.0% | 17.0% | 38.8% | 0 | 350 |
| M3397 | 7.2% | 7.2% | 7.2% | 77.3% | 18.6% | 18.6% | 33.4% | 0 | 250 |
| M3398 | 13.7% | 13.7% | 13.7% | 77.3% | 5.1% | 5.1% | 30.8% | 0 | 150 |
| M3399 | 7.5% | 7.5% | 7.5% | 77.3% | 9.9% | 9.9% | 20.3% | 0 | −50 |
| M3400 | 11.0% | 11.0% | 11.0% | 77.3% | 14.5% | 14.5% | 26.2% | 0 | 50 |
| M3401 | 18.0% | 18.0% | 18.0% | 77.3% | 18.7% | 18.7% | 37.7% | 0 | 200 |
| M3402 | 10.0% | 10.0% | 10.0% | 77.3% | 4.1% | 4.1% | 31.1% | 0 | 100 |
| M3403 | 10.0% | 10.0% | 10.0% | 77.3% | 2.8% | 2.8% | 32.0% | 0 | 100 |
| M3404 | 9.9% | 9.9% | 9.9% | 77.3% | 5.5% | 5.5% | 35.7% | 0 | 250 |
| M3405 | 7.5% | 7.5% | 7.5% | 77.3% | 4.7% | 4.7% | 26.2% | 0 | 50 |
| M3406 | 9.9% | 9.9% | 9.9% | 77.3% | 6.2% | 6.2% | 35.8% | 0 | 250 |
| M3407 | 8.3% | 8.3% | 8.3% | 77.3% | 18.7% | 18.7% | 39.2% | 0 | 350 |
| M3408 | 8.4% | 8.4% | 8.4% | 77.3% | 12.3% | 12.3% | 40.7% | 0 | 400 |
| M3409 | 18.5% | 18.5% | 18.5% | 77.3% | 7.9% | 7.9% | 35.8% | 0 | 250 |
| M3410 | 10.0% | 10.0% | 10.0% | 77.3% | 4.2% | 4.2% | 30.1% | 0 | 100 |
| M3411 | 8.5% | 8.5% | 8.5% | 77.3% | 8.5% | 8.5% | 36.1% | 0 | 300 |
| M3412 | 16.1% | 16.1% | 16.1% | 77.3% | 7.6% | 7.6% | 33.5% | 0 | 200 |
| M3413 | 8.4% | 8.4% | 8.4% | 77.3% | 13.5% | 13.5% | 35.4% | 0 | 250 |
| M3414 | 16.2% | 16.2% | 16.2% | 77.3% | 5.0% | 5.0% | 34.6% | 0 | 200 |
| M3415 | 13.2% | 13.2% | 13.2% | 77.3% | 15.1% | 15.1% | 39.5% | 0 | 300 |
| M3416 | 8.6% | 8.6% | 8.6% | 77.3% | 4.6% | 4.6% | 36.3% | 0 | 300 |
| M3417 | 11.8% | 11.8% | 11.8% | 77.3% | 24.3% | 24.3% | 36.8% | 0 | 250 |
| M3418 | 8.4% | 8.4% | 8.4% | 77.3% | 12.5% | 12.5% | 37.0% | 0 | 300 |
| M3419 | 10.0% | 10.0% | 10.0% | 77.3% | 2.8% | 2.8% | 30.6% | 0 | 50 |
| M3420 | 9.7% | 9.7% | 9.7% | 77.3% | 6.2% | 6.2% | 40.6% | 0 | 400 |
| M3421 | 9.8% | 9.8% | 9.8% | 77.3% | 7.4% | 7.4% | 40.2% | 0 | 350 |
| M3422 | 14.7% | 14.7% | 14.7% | 77.3% | 13.4% | 13.4% | 29.0% | 0 | 150 |
| M3423 | 7.3% | 7.3% | 7.3% | 77.3% | 7.7% | 7.7% | 37.7% | 0 | 350 |
| M3424 | 14.9% | 14.9% | 14.9% | 77.3% | 10.4% | 10.4% | 27.5% | 0 | 150 |
| M3425 | 15.2% | 15.2% | 15.2% | 77.3% | 24.0% | 24.0% | 40.5% | 0 | 250 |
| M3426 | 14.9% | 14.9% | 14.9% | 77.3% | 5.2% | 5.2% | 33.4% | 0 | 150 |
| M3427 | 15.0% | 15.0% | 15.0% | 77.3% | 5.0% | 5.0% | 29.3% | 0 | 150 |
| M3428 | 15.0% | 15.0% | 15.0% | 77.3% | 4.9% | 4.9% | 29.5% | 0 | 150 |
| M3429 | 10.5% | 10.5% | 10.5% | 77.3% | 25.7% | 25.7% | 38.7% | 0 | 300 |
| M3430 | 12.2% | 12.2% | 12.2% | 77.3% | 9.3% | 9.3% | 35.7% | 0 | 200 |
| M3431 | 12.2% | 12.2% | 12.2% | 77.3% | 8.6% | 8.6% | 35.9% | 0 | 200 |
| M3432 | 10.1% | 10.1% | 10.1% | 77.3% | 5.4% | 5.4% | 23.2% | 0 | 0 |
| M3433 | 14.0% | 14.0% | 14.0% | 77.3% | 24.7% | 24.7% | 42.5% | 0 | 350 |
| M3434 | 12.0% | 12.0% | 12.0% | 77.3% | 16.7% | 16.7% | 37.5% | 0 | 250 |

TABLE 11-continued

Compositions and thermodynamic criteria for vanadium carbides

| | | | | | | | | |
|---|---|---|---|---|---|---|---|---|
| M3435 | 15.0% | 15.0% | 15.0% | 77.3% | 7.4% | 7.4% | 27.4% | 0 | 100 |
| M3436 | 12.2% | 12.2% | 12.2% | 77.3% | 11.8% | 11.8% | 33.3% | 0 | 150 |
| M3437 | 15.6% | 15.6% | 15.6% | 77.3% | 15.2% | 15.2% | 39.3% | 0 | 250 |
| M3438 | 12.0% | 12.0% | 12.0% | 77.3% | 14.1% | 14.1% | 38.5% | 0 | 300 |
| M3439 | 14.7% | 14.7% | 14.7% | 77.3% | 10.5% | 10.5% | 32.6% | 0 | 150 |
| M3440 | 7.4% | 7.4% | 7.4% | 77.3% | 6.8% | 6.8% | 33.2% | 0 | 200 |
| M3441 | 9.5% | 9.5% | 9.5% | 77.3% | 20.2% | 20.2% | 36.4% | 0 | 250 |
| M3442 | 11.0% | 11.0% | 11.0% | 77.3% | 10.6% | 10.6% | 33.6% | 0 | 150 |
| M3443 | 8.2% | 8.2% | 8.2% | 77.3% | 25.0% | 25.0% | 37.6% | 0 | 300 |
| M3444 | 12.4% | 12.4% | 12.4% | 77.3% | 5.1% | 5.1% | 36.1% | 0 | 200 |
| M3445 | 12.9% | 12.9% | 12.9% | 77.3% | 24.8% | 24.8% | 37.7% | 0 | 250 |
| M3446 | 14.7% | 14.7% | 14.7% | 77.3% | 10.7% | 10.7% | 36.3% | 0 | 150 |
| M3447 | 18.2% | 18.2% | 18.2% | 77.3% | 15.3% | 15.3% | 36.4% | 0 | 200 |
| M3448 | 14.8% | 14.8% | 14.8% | 77.3% | 7.7% | 7.7% | 37.1% | 0 | 200 |
| M3449 | 12.2% | 12.2% | 12.2% | 77.3% | 10.6% | 10.6% | 38.5% | 0 | 250 |
| M3450 | 12.7% | 12.7% | 12.7% | 77.3% | 27.6% | 27.6% | 40.5% | 1350 | 300 |
| M3451 | 20.3% | 20.3% | 20.3% | 77.3% | 17.0% | 17.0% | 40.9% | 0 | 250 |
| M3452 | 14.7% | 14.7% | 14.7% | 77.3% | 8.4% | 8.4% | 35.8% | 0 | 200 |
| M3453 | 12.2% | 12.2% | 12.2% | 77.3% | 6.7% | 6.7% | 39.0% | 0 | 300 |
| M3454 | 12.4% | 12.4% | 12.4% | 77.3% | 0.0% | 0.0% | 36.3% | 0 | 200 |
| M3455 | 9.7% | 9.7% | 9.7% | 77.3% | 12.3% | 12.3% | 30.9% | 0 | 150 |
| M3456 | 11.4% | 11.4% | 11.4% | 77.3% | 5.1% | 5.1% | 23.2% | 0 | 50 |
| M3457 | 15.0% | 15.0% | 15.0% | 77.3% | 7.6% | 7.6% | 26.1% | 0 | 100 |
| M3458 | 18.7% | 18.7% | 18.7% | 77.3% | 7.5% | 7.5% | 29.8% | 0 | 150 |
| M3459 | 12.4% | 12.4% | 12.4% | 77.3% | 6.0% | 6.0% | 28.0% | 0 | 100 |
| M3460 | 19.9% | 19.9% | 19.9% | 77.3% | 8.2% | 8.2% | 32.7% | 0 | 250 |
| M3461 | 12.4% | 12.4% | 12.4% | 77.3% | 10.1% | 10.1% | 24.6% | 0 | 50 |
| M3462 | 12.5% | 12.5% | 12.5% | 77.3% | 4.8% | 4.8% | 31.8% | 0 | 150 |
| M3463 | 16.5% | 16.5% | 16.5% | 77.3% | 20.5% | 20.5% | 42.0% | 0 | 300 |
| M3464 | 12.5% | 12.5% | 12.5% | 77.3% | 5.6% | 5.6% | 24.3% | 0 | 50 |
| M3465 | 20.0% | 20.0% | 20.0% | 77.3% | 5.1% | 5.1% | 31.2% | 0 | 200 |
| M3466 | 20.0% | 20.0% | 20.0% | 77.3% | 5.2% | 5.2% | 31.7% | 0 | 200 |
| M3467 | 7.0% | 7.0% | 7.0% | 77.3% | 24.5% | 24.5% | 36.0% | 1100 | 300 |
| M3468 | 21.5% | 21.5% | 21.5% | 77.3% | 5.1% | 5.1% | 26.6% | 0 | 150 |
| M3469 | 8.6% | 8.6% | 8.6% | 77.3% | 10.3% | 10.3% | 30.0% | 0 | 100 |
| M3470 | 7.1% | 7.1% | 7.1% | 77.3% | 22.7% | 22.7% | 31.9% | 0 | 200 |
| M3471 | 7.1% | 7.1% | 7.1% | 77.3% | 23.0% | 23.0% | 36.7% | 1100 | 300 |
| M3472 | 7.1% | 7.1% | 7.1% | 77.3% | 21.7% | 21.7% | 32.3% | 0 | 200 |
| M3473 | 8.6% | 8.6% | 8.6% | 77.3% | 8.0% | 8.0% | 31.3% | 0 | 150 |
| M3474 | 13.5% | 13.5% | 13.5% | 77.3% | 5.2% | 5.2% | 38.3% | 0 | 250 |
| M3475 | 15.0% | 15.0% | 15.0% | 77.3% | 8.5% | 8.5% | 31.0% | 0 | 150 |
| M3476 | 19.7% | 19.7% | 19.7% | 77.3% | 9.9% | 9.9% | 35.6% | 1150 | 250 |
| M3477 | 7.5% | 7.5% | 7.5% | 77.3% | 8.1% | 8.1% | 20.9% | 0 | −50 |
| M3478 | 16.0% | 16.0% | 16.0% | 77.3% | 12.6% | 12.6% | 29.1% | 0 | 150 |
| M3479 | 25.4% | 25.4% | 25.4% | 77.3% | 4.5% | 4.5% | 32.0% | 0 | 200 |
| M3480 | 24.9% | 24.9% | 24.9% | 77.3% | 7.5% | 7.5% | 36.1% | 0 | 250 |
| M3481 | 16.1% | 16.1% | 16.1% | 77.3% | 9.5% | 9.5% | 26.6% | 1200 | 100 |
| M3482 | 12.6% | 12.6% | 12.6% | 77.3% | 6.1% | 6.1% | 26.9% | 0 | 50 |
| M3483 | 19.6% | 19.6% | 19.6% | 77.3% | 28.1% | 28.1% | 47.7% | 0 | 400 |
| M3484 | 9.8% | 9.8% | 9.8% | 77.3% | 7.5% | 7.5% | 37.3% | 1150 | 250 |
| M3485 | 16.2% | 16.2% | 16.2% | 77.3% | 7.4% | 7.4% | 28.3% | 0 | 150 |
| M3486 | 19.8% | 19.8% | 19.8% | 77.3% | 25.8% | 25.8% | 45.6% | 0 | 350 |
| M3487 | 14.7% | 14.7% | 14.7% | 77.3% | 12.6% | 12.6% | 30.6% | 0 | 150 |
| M3488 | 14.4% | 14.4% | 14.4% | 77.3% | 18.0% | 18.0% | 33.6% | 0 | 150 |
| M3489 | 16.0% | 16.0% | 16.0% | 77.3% | 30.2% | 30.2% | 46.2% | 0 | 400 |
| M3490 | 13.4% | 13.4% | 13.4% | 77.3% | 7.7% | 7.7% | 38.5% | 0 | 250 |
| M3491 | 7.5% | 7.5% | 7.5% | 77.3% | 6.0% | 6.0% | 25.6% | 0 | 50 |
| M3492 | 7.0% | 7.0% | 7.0% | 77.3% | 26.8% | 26.8% | 33.9% | 0 | 250 |
| M3493 | 19.9% | 19.9% | 19.9% | 77.3% | 22.9% | 22.9% | 46.8% | 0 | 350 |
| M3494 | 8.4% | 8.4% | 8.4% | 77.3% | 14.8% | 14.8% | 39.5% | 0 | 350 |
| M3495 | 8.5% | 8.5% | 8.5% | 77.3% | 14.7% | 14.7% | 33.5% | 0 | 200 |
| M3496 | 7.5% | 7.5% | 7.5% | 77.3% | 4.0% | 4.0% | 26.4% | 0 | 50 |
| M3497 | 8.7% | 8.7% | 8.7% | 77.3% | 8.1% | 8.1% | 30.8% | 0 | 100 |
| M3498 | 7.5% | 7.5% | 7.5% | 77.3% | 7.5% | 7.5% | 19.3% | 0 | −50 |
| M3499 | 7.0% | 7.0% | 7.0% | 77.3% | 26.0% | 26.0% | 34.8% | 0 | 300 |
| M3500 | 13.0% | 13.0% | 13.0% | 77.3% | 19.7% | 19.7% | 44.4% | 0 | 400 |
| M3501 | 7.0% | 7.0% | 7.0% | 77.3% | 25.0% | 25.0% | 34.4% | 1150 | 250 |
| M3502 | 10.4% | 10.4% | 10.4% | 77.3% | 28.2% | 28.2% | 38.6% | 0 | 300 |
| M3503 | 11.9% | 11.9% | 11.9% | 77.3% | 19.5% | 19.5% | 35.4% | 0 | 200 |
| M3504 | 14.9% | 14.9% | 14.9% | 77.3% | 4.1% | 4.1% | 33.6% | 0 | 150 |
| M3505 | 20.0% | 20.0% | 20.0% | 77.3% | 17.0% | 17.0% | 37.0% | 0 | 350 |
| M3506 | 15.0% | 15.0% | 15.0% | 77.3% | 27.7% | 27.7% | 42.7% | 1150 | 350 |
| M3507 | 12.2% | 12.2% | 12.2% | 77.3% | 15.6% | 15.6% | 30.4% | 0 | 100 |
| M3508 | 7.2% | 7.2% | 7.2% | 77.3% | 17.2% | 17.2% | 33.7% | 0 | 250 |
| M3509 | 7.2% | 7.2% | 7.2% | 77.3% | 17.5% | 17.5% | 39.3% | 1100 | 400 |
| M3510 | 11.9% | 11.9% | 11.9% | 77.3% | 19.8% | 19.8% | 35.5% | 0 | 200 |
| M3511 | 7.2% | 7.2% | 7.2% | 77.3% | 16.2% | 16.2% | 33.8% | 0 | 200 |
| M3512 | 11.9% | 11.9% | 11.9% | 77.3% | 20.0% | 20.0% | 35.7% | 0 | 200 |

TABLE 11-continued

Compositions and thermodynamic criteria for vanadium carbides

| | | | | | | | | | |
|---|---|---|---|---|---|---|---|---|---|
| M3513 | 21.0% | 21.0% | 21.0% | 77.3% | 7.5% | 7.5% | 34.7% | 0 | 250 |
| M3514 | 19.0% | 19.0% | 19.0% | 77.3% | 19.7% | 19.7% | 39.8% | 0 | 200 |
| M3515 | 11.7% | 11.7% | 11.7% | 77.3% | 24.8% | 24.8% | 36.5% | 0 | 250 |
| M3516 | 8.6% | 8.6% | 8.6% | 77.3% | 10.4% | 10.4% | 25.3% | 0 | 0 |
| M3517 | 18.8% | 18.8% | 18.8% | 77.3% | 23.3% | 23.3% | 43.4% | 1100 | 250 |
| M3518 | 15.2% | 15.2% | 15.2% | 77.3% | 25.7% | 25.7% | 40.8% | 0 | 250 |
| M3519 | 12.0% | 12.0% | 12.0% | 77.3% | 15.0% | 15.0% | 35.9% | 0 | 250 |
| M3520 | 7.3% | 7.3% | 7.3% | 77.3% | 10.0% | 10.0% | 36.2% | 1200 | 300 |
| M3521 | 12.1% | 12.1% | 12.1% | 77.3% | 17.6% | 17.6% | 32.1% | 0 | 100 |
| M3522 | 19.6% | 19.6% | 19.6% | 77.3% | 21.3% | 21.3% | 40.8% | 0 | 400 |
| M3523 | 9.7% | 9.7% | 9.7% | 77.3% | 4.6% | 4.6% | 41.1% | 0 | 400 |
| M3524 | 8.5% | 8.5% | 8.5% | 77.3% | 12.7% | 12.7% | 36.3% | 0 | 250 |
| M3525 | 15.8% | 15.8% | 15.8% | 77.3% | 15.1% | 15.1% | 32.1% | 0 | 150 |
| M3526 | 18.1% | 18.1% | 18.1% | 77.3% | 13.0% | 13.0% | 40.1% | 0 | 250 |
| M3527 | 20.2% | 20.2% | 20.2% | 77.3% | 17.9% | 17.9% | 42.9% | 0 | 250 |
| M3528 | 12.7% | 12.7% | 12.7% | 77.3% | 28.1% | 28.1% | 40.8% | 0 | 300 |
| M3529 | 8.5% | 8.5% | 8.5% | 77.3% | 4.7% | 4.7% | 39.9% | 0 | 400 |
| M3530 | 12.0% | 12.0% | 12.0% | 77.3% | 15.6% | 15.6% | 34.5% | 0 | 200 |
| M3531 | 15.0% | 15.0% | 15.0% | 77.3% | 5.7% | 5.7% | 32.6% | 0 | 200 |
| M3532 | 11.9% | 11.9% | 11.9% | 77.3% | 18.5% | 18.5% | 38.8% | 0 | 250 |
| M3533 | 10.7% | 10.7% | 10.7% | 77.3% | 19.3% | 19.3% | 42.4% | 0 | 400 |
| M3534 | 15.0% | 15.0% | 15.0% | 77.3% | 4.9% | 4.9% | 33.0% | 0 | 200 |
| M3535 | 12.1% | 12.1% | 12.1% | 77.3% | 12.4% | 12.4% | 40.1% | 1150 | 300 |
| M3536 | 15.9% | 15.9% | 15.9% | 77.3% | 11.6% | 11.6% | 33.2% | 0 | 150 |
| M3537 | 12.3% | 12.3% | 12.3% | 77.3% | 6.4% | 6.4% | 36.7% | 0 | 250 |
| M3538 | 19.7% | 19.7% | 19.7% | 77.3% | 9.1% | 9.1% | 35.4% | 0 | 250 |
| M3539 | 19.7% | 19.7% | 19.7% | 77.3% | 8.3% | 8.3% | 35.7% | 0 | 250 |
| M3540 | 14.3% | 14.3% | 14.3% | 77.3% | 14.6% | 14.6% | 42.0% | 0 | 350 |
| M3541 | 12.5% | 12.5% | 12.5% | 77.3% | 7.1% | 7.1% | 29.1% | 0 | 50 |
| M3542 | 19.7% | 19.7% | 19.7% | 77.3% | 7.7% | 7.7% | 36.0% | 0 | 250 |
| M3543 | 7.4% | 7.4% | 7.4% | 77.3% | 8.2% | 8.2% | 35.8% | 1200 | 300 |
| M3544 | 12.0% | 12.0% | 12.0% | 77.3% | 18.0% | 18.0% | 36.4% | 0 | 200 |
| M3545 | 10.0% | 10.0% | 10.0% | 77.3% | 8.9% | 8.9% | 20.2% | 0 | −50 |
| M3546 | 20.7% | 20.7% | 20.7% | 77.3% | 13.1% | 13.1% | 36.3% | 0 | 250 |
| M3547 | 8.8% | 8.8% | 8.8% | 77.3% | 5.1% | 5.1% | 19.6% | 1200 | −50 |
| M3548 | 12.2% | 12.2% | 12.2% | 77.3% | 14.4% | 14.4% | 31.6% | 0 | 100 |
| M3549 | 14.9% | 14.9% | 14.9% | 77.3% | 9.0% | 9.0% | 25.9% | 0 | 100 |
| M3550 | 19.8% | 19.8% | 19.8% | 77.3% | 11.0% | 11.0% | 30.7% | 0 | 150 |
| M3551 | 15.0% | 15.0% | 15.0% | 77.3% | 7.7% | 7.7% | 27.0% | 0 | 100 |
| M3552 | 15.0% | 15.0% | 15.0% | 77.3% | 5.8% | 5.8% | 28.0% | 0 | 100 |
| M3553 | 15.0% | 15.0% | 15.0% | 77.3% | 5.2% | 5.2% | 28.2% | 0 | 100 |
| M3554 | 10.8% | 10.8% | 10.8% | 77.3% | 12.3% | 12.3% | 38.2% | 0 | 300 |
| M3555 | 14.2% | 14.2% | 14.2% | 77.3% | 19.6% | 19.6% | 41.2% | 0 | 350 |
| M3556 | 7.4% | 7.4% | 7.4% | 77.3% | 12.1% | 12.1% | 20.8% | 0 | −50 |
| M3557 | 14.8% | 14.8% | 14.8% | 77.3% | 6.3% | 6.3% | 34.1% | 0 | 150 |
| M3558 | 7.3% | 7.3% | 7.3% | 77.3% | 15.1% | 15.1% | 27.6% | 1150 | 50 |
| M3559 | 10.0% | 10.0% | 10.0% | 77.3% | 7.6% | 7.6% | 24.3% | 0 | 50 |
| M3560 | 10.0% | 10.0% | 10.0% | 77.3% | 6.8% | 6.8% | 25.3% | 0 | 50 |
| M3561 | 18.5% | 18.5% | 18.5% | 77.3% | 7.6% | 7.6% | 34.7% | 0 | 200 |
| M3562 | 8.7% | 8.7% | 8.7% | 77.3% | 0.0% | 0.0% | 28.7% | 0 | 50 |
| M3563 | 12.1% | 12.1% | 12.1% | 77.3% | 12.9% | 12.9% | 38.5% | 1200 | 250 |
| M3564 | 12.1% | 12.1% | 12.1% | 77.3% | 8.6% | 8.6% | 40.8% | 0 | 350 |
| M3565 | 7.5% | 7.5% | 7.5% | 77.3% | 9.8% | 9.8% | 17.6% | 0 | −50 |
| M3566 | 7.5% | 7.5% | 7.5% | 77.3% | 6.9% | 6.9% | 18.9% | 0 | −50 |
| M3567 | 11.3% | 11.3% | 11.3% | 77.3% | 4.9% | 4.9% | 23.3% | 0 | 0 |
| M3568 | 10.0% | 10.0% | 10.0% | 77.3% | 5.1% | 5.1% | 27.9% | 0 | 100 |
| M3569 | 17.5% | 17.5% | 17.5% | 77.3% | 4.9% | 4.9% | 32.6% | 1250 | 200 |
| M3570 | 18.8% | 18.8% | 18.8% | 77.3% | 5.2% | 5.2% | 31.3% | 0 | 200 |
| M3571 | 8.8% | 8.8% | 8.8% | 77.3% | 4.2% | 4.2% | 27.2% | 0 | 50 |
| M3572 | 12.5% | 12.5% | 12.5% | 77.3% | 7.1% | 7.1% | 23.9% | 1200 | 50 |
| M3573 | 11.2% | 11.2% | 11.2% | 77.3% | 4.7% | 4.7% | 27.2% | 0 | 50 |
| M3574 | 12.9% | 12.9% | 12.9% | 77.3% | 25.0% | 25.0% | 37.9% | 0 | 250 |
| M3575 | 17.6% | 17.6% | 17.6% | 77.3% | 5.0% | 5.0% | 28.5% | 1200 | 150 |
| M3576 | 12.1% | 12.1% | 12.1% | 77.3% | 14.7% | 14.7% | 40.1% | 1200 | 300 |
| M3577 | 20.8% | 20.8% | 20.8% | 77.3% | 26.6% | 26.6% | 47.4% | 0 | 350 |
| M3578 | 7.4% | 7.4% | 7.4% | 77.3% | 5.5% | 5.5% | 30.9% | 0 | 150 |
| M3579 | 7.5% | 7.5% | 7.5% | 77.3% | 6.6% | 6.6% | 29.9% | 0 | 100 |
| M3580 | 19.8% | 19.8% | 19.8% | 77.3% | 9.7% | 9.7% | 30.2% | 0 | 150 |
| M3581 | 19.7% | 19.7% | 19.7% | 77.3% | 21.2% | 21.2% | 40.9% | 0 | 400 |
| M3582 | 15.6% | 15.6% | 15.6% | 77.3% | 17.2% | 17.2% | 32.8% | 0 | 400 |
| M3583 | 16.5% | 16.5% | 16.5% | 77.3% | 0.0% | 0.0% | 30.1% | 0 | 150 |
| M3584 | 24.8% | 24.8% | 24.8% | 77.3% | 17.1% | 17.1% | 41.9% | 0 | 350 |
| M3585 | 16.3% | 16.3% | 16.3% | 77.3% | 0.0% | 0.0% | 31.2% | 0 | 150 |
| M3586 | 19.3% | 19.3% | 19.3% | 77.3% | 20.8% | 20.8% | 40.1% | 0 | 400 |
| M3587 | 8.8% | 8.8% | 8.8% | 77.3% | 0.0% | 0.0% | 29.1% | 0 | 50 |
| M3588 | 16.3% | 16.3% | 16.3% | 77.3% | 0.0% | 0.0% | 31.1% | 0 | 150 |
| M3589 | 12.7% | 12.7% | 12.7% | 77.3% | 7.8% | 7.8% | 20.5% | 1150 | 0 |
| M3590 | 16.3% | 16.3% | 16.3% | 77.3% | 0.0% | 0.0% | 31.2% | 0 | 150 |

TABLE 11-continued

Compositions and thermodynamic criteria for vanadium carbides

| | | | | | | | | | |
|---|---|---|---|---|---|---|---|---|---|
| M3591 | 10.2% | 10.2% | 10.2% | 77.4% | 11.7% | 11.7% | 21.8% | 0 | 400 |
| M3592 | 12.5% | 12.5% | 12.5% | 77.4% | 11.3% | 11.3% | 23.8% | 0 | 150 |
| M3593 | 12.6% | 12.6% | 12.6% | 77.4% | 0.0% | 0.0% | 31.6% | 0 | 100 |
| M3594 | 12.4% | 12.4% | 12.4% | 77.4% | 6.3% | 6.3% | 26.3% | 0 | 0 |
| M3595 | 10.2% | 10.2% | 10.2% | 77.4% | 13.6% | 13.6% | 23.8% | 0 | 0 |
| M3596 | 12.4% | 12.4% | 12.4% | 77.4% | 13.2% | 13.2% | 25.5% | 0 | 250 |
| M3597 | 11.3% | 11.3% | 11.3% | 77.4% | 10.1% | 10.1% | 21.4% | 0 | 0 |
| M3598 | 10.3% | 10.3% | 10.3% | 77.4% | 9.9% | 9.9% | 20.2% | 0 | 0 |
| M3599 | 16.1% | 9.8% | 9.8% | 77.6% | 12.2% | 12.2% | 30.3% | 1150 | 0 |
| M3600 | 26.5% | 10.3% | 10.3% | 77.8% | 15.0% | 15.0% | 41.5% | 1100 | 100 |
| M3601 | 26.5% | 4.5% | 4.5% | 78.5% | 19.9% | 19.9% | 46.5% | 1100 | 50 |
| M3602 | 11.4% | 11.4% | 11.4% | 79.3% | 12.2% | 12.2% | 67.4% | 1000 | 50 |
| M3603 | 13.2% | 6.3% | 6.3% | 79.4% | 12.2% | 12.2% | 31.1% | 1150 | -50 |
| M3604 | 27.4% | 6.6% | 6.6% | 79.4% | 12.3% | 12.3% | 39.7% | 1150 | 50 |
| M3605 | 16.8% | 9.6% | 9.6% | 80.2% | 19.9% | 19.9% | 39.5% | 1150 | 100 |
| M3606 | 12.5% | 12.5% | 12.5% | 80.4% | 14.2% | 14.2% | 26.7% | 0 | 0 |
| M3607 | 12.5% | 12.5% | 12.5% | 80.5% | 16.4% | 16.4% | 34.1% | 1050 | 0 |
| M3608 | 12.4% | 12.4% | 12.4% | 80.9% | 18.2% | 18.2% | 30.6% | 1050 | 0 |
| M3609 | 10.1% | 10.1% | 10.1% | 81.1% | 14.5% | 14.5% | 49.3% | 1000 | 0 |
| M3610 | 10.1% | 10.1% | 10.1% | 81.5% | 14.7% | 14.7% | 34.1% | 1200 | 50 |
| M3611 | 12.6% | 12.6% | 12.6% | 81.8% | 15.1% | 15.1% | 27.6% | 1200 | 0 |
| M3612 | 12.5% | 12.5% | 12.5% | 82.3% | 20.4% | 20.4% | 32.9% | 1150 | 50 |
| M3613 | 12.4% | 12.4% | 12.4% | 82.3% | 22.0% | 22.0% | 34.4% | 0 | 100 |
| M3614 | 27.8% | 3.9% | 3.9% | 82.4% | 15.0% | 15.0% | 42.8% | 1100 | 0 |
| M3615 | 5.4% | 4.4% | 4.4% | 82.4% | 14.2% | 14.2% | 26.9% | 1150 | -50 |
| M3616 | 18.1% | 2.0% | 2.0% | 82.4% | 12.2% | 12.2% | 35.0% | 1150 | -50 |
| M3617 | 14.1% | 2.7% | 2.7% | 82.4% | 12.2% | 12.2% | 33.5% | 1150 | -50 |
| M3618 | 24.8% | 0.5% | 0.5% | 82.4% | 18.2% | 18.2% | 43.0% | 1100 | 0 |
| M3619 | 28.1% | 2.1% | 2.1% | 82.4% | 12.3% | 12.3% | 40.4% | 1150 | 0 |
| M3620 | 24.8% | 0.8% | 0.8% | 82.4% | 12.2% | 12.2% | 39.1% | 1150 | -50 |
| M3621 | 8.7% | 5.6% | 5.6% | 82.4% | 12.2% | 12.2% | 33.3% | 1150 | -50 |
| M3622 | 27.2% | 1.8% | 1.8% | 82.4% | 20.1% | 20.1% | 47.3% | 1100 | 50 |
| M3623 | 9.2% | 9.2% | 9.2% | 82.5% | 12.2% | 12.2% | 39.8% | 1050 | 0 |
| M3624 | 12.5% | 12.5% | 12.5% | 82.6% | 16.0% | 16.0% | 28.5% | 1000 | 0 |
| M3625 | 15.0% | 15.0% | 15.0% | 82.7% | 20.4% | 20.4% | 35.4% | 1150 | 50 |
| M3626 | 12.4% | 12.4% | 12.4% | 82.9% | 19.4% | 19.4% | 31.9% | 1050 | 50 |
| M3627 | 5.6% | 5.6% | 5.6% | 83.0% | 12.2% | 12.2% | 51.2% | 1050 | -50 |
| M3628 | 7.8% | 7.8% | 7.8% | 83.3% | 15.0% | 15.0% | 26.5% | 1200 | -50 |
| M3629 | 7.4% | 7.4% | 7.4% | 84.0% | 15.6% | 15.6% | 28.9% | 0 | -50 |
| M3630 | 7.4% | 7.4% | 7.4% | 84.0% | 13.8% | 13.8% | 29.0% | 0 | -50 |
| M3631 | 7.5% | 7.5% | 7.5% | 84.1% | 0.0% | 0.0% | 51.7% | 1200 | 50 |

Microstructural Criteria

In some embodiments, the chromium free alloys can be described fully described by microstructural criterion. The alloys can meet some, or all, of the described microstructural criteria.

The main microstructural criterion is the total volume fraction of transition metal borides and borocarbides where the metallic component comprises ≥15 wt % (or ≥about 15 wt %) W+Mo. In some embodiments, a thermodynamic criterion is the total volume fraction of transition metal borides and borocarbides where the metallic component comprises ≥25 wt % (or ≥about 25%) W+Mo. In some embodiments, a thermodynamic criterion is the total volume fraction of transition metal borides and borocarbides where the metallic component comprises ≥50 wt % (or ≥about 50 wt %) W+Mo.

The main microstructural criterion is the total volume fraction of transition metal borides and borocarbides where the metallic component comprises ≥15 wt % (or ≥about 15 wt %) Ti+W+Mo+V. In some embodiments, a thermodynamic criterion is the total volume fraction of transition metal borides and borocarbides where the metallic component comprises ≥25 wt % (or ≥about 25%) Ti+W+Mo+V. In some embodiments, a thermodynamic criterion is the total volume fraction of transition metal borides and borocarbides where the metallic component comprises ≥50 wt % (or ≥about 50 wt %) Ti+W+Mo+V.

This criteria will be abbreviated as "complex boride and borocarbide". Increasing the volume fraction of complex boride can result in an improvement in the wear performance of the alloy. Because these complex boride phases are harder than borides with a metallic component that comprises mostly iron and/or chromium, a lower phase fraction is required to achieve comparable wear performance. Toughness is inversely correlated with boride phase fraction in most alloys so providing the same wear performance with a lower fraction is advantageous.

Figure 4:
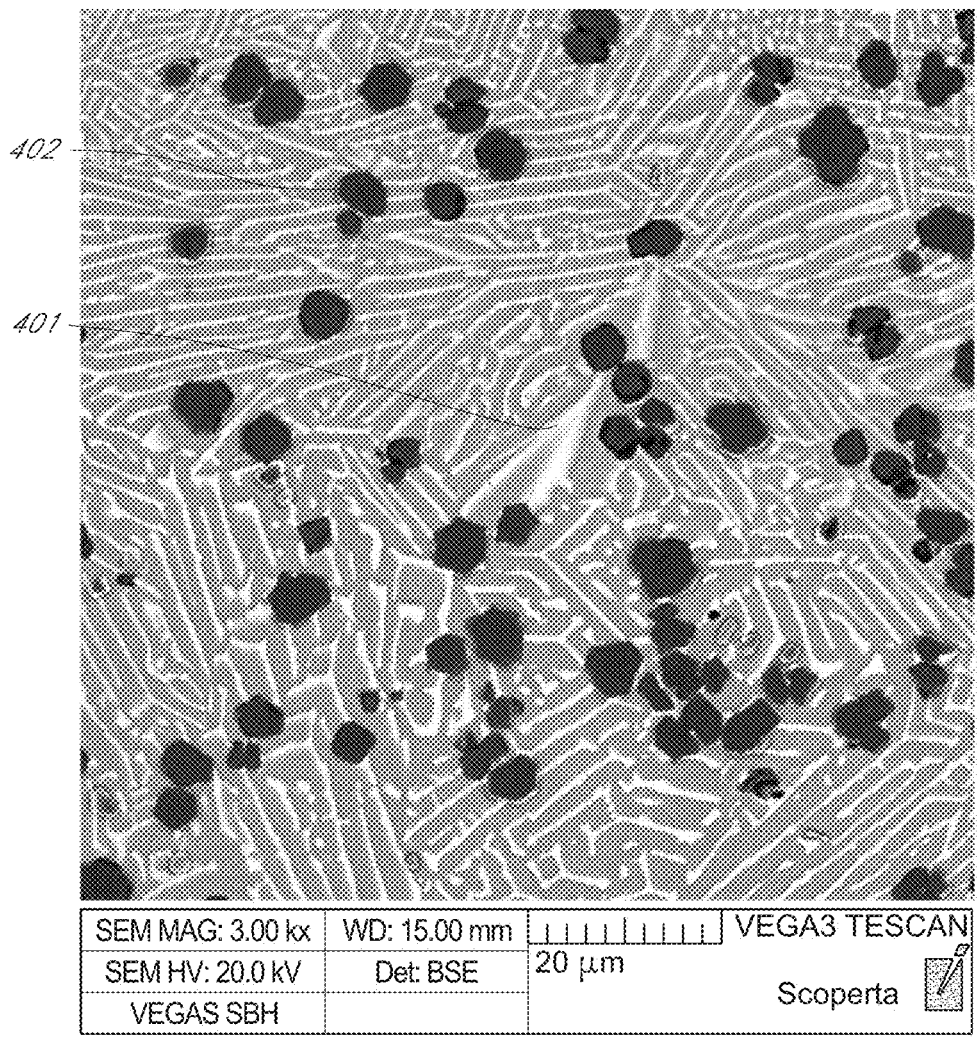
FIG. 4 shows an example micrograph of an embodiment of a disclosed alloy (X1).

The complex boride volume fraction is measured as the sum of all borides and borocarbides, which meet the chemistry requirement described above. In this disclosure the complex boride volume fraction is measured using quantitative metallography. Phases that may meet the chemistry requirement may comprise $M_2B$, $M_3B_2$, and $B_2M$. In FIG. 4 the complex boride phase fraction is 20% measured as the volume fraction of the light colored $M_3B_2$ phase [401]. The metallic component of the complex boride phase comprises ~25 wt % Mo satisfying the chemistry limitation. The alloy in FIG. 1 meets the most specific complex boride volume fraction embodiments.

Figure 5:
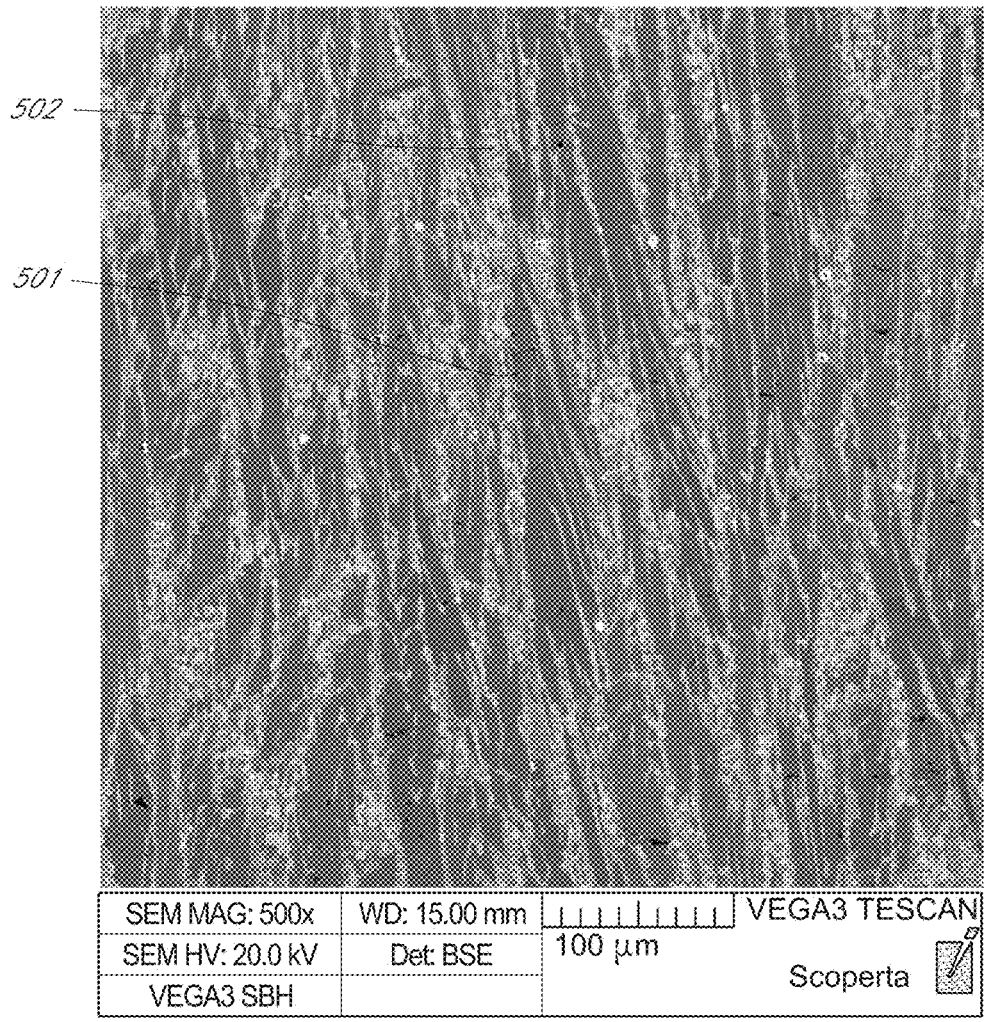
FIG. 5 shows an example micrograph of an embodiment of an alloy outside of the disclosure.

In contrast, the chrome free weld deposit, described in Wallin does not meet the embodiments of this criteria. A micrograph of this alloy is shown in FIG. 5. All the boride and borocarbide phases including iron boride [501] and niobium borocarbide [502] have <15 wt % W+Mo. This deposit, because it has numerous large borocarbide and/or boride phases present in the microstructure, has lower impact resistance and toughness. This can result in lower impact performance and subsequently lower life in service.

In some embodiments, the complex boride volume fraction of the alloy can be between 5 and 50% (or ≥about 5%). In some embodiments, the complex boride volume fraction of the alloy can be between 5 and 35% (or ≥about 10%). In some embodiments, the complex boride volume fraction of the alloy can be between 10 and 40% (or ≥about 15%). In some embodiments, the complex boride volume fraction of the alloy can be between 15% and 4% (or about 5% to about 45%). In some embodiments, the complex boride volume fraction of the alloy can be between 10% and 35% (or about 10% to about 35%). In some embodiments, the complex boride volume fraction of the alloy can be between 5% and 45% (or between about 5% and about 45%). In some embodiments, the complex boride volume fraction of the alloy can be between 5% and 30% (or between about 5% and about 30%). In some embodiments, the complex boride volume fraction of the alloy can be between 5% and 25% (or between about 5% and about 25%). In some embodiments, the complex boride volume fraction of the alloy can be between 7.5% and 30% (or between about 7.5% and about 30%). In some embodiments, the complex boride volume fraction of the alloy can be between 7.5% and 25% (or between about 7.5% and about 25%). In some embodiments, the complex boride volume fraction of the alloy can be between 10% and 30% (or between about 10% and about 30%). In some embodiments, the complex boride volume fraction of the alloy can be between 10% and 25% (or between about 10% and about 25%). In some embodiments, the complex boride volume fraction of the alloy can be between 12.5% and 25% (or between about 12.5% and about 25%). In some embodiments, the complex boride volume fraction of the alloy can be between 12.5% and 20% (or between about 12.5% and about 20%).

The next microstructural criterion is the volume fraction of isolated carbides. Examples of isolated carbides include those of the MC type that comprise mostly of one or more of the following elements: V, Ti, Nb, Zr, Hf, W, Mo. Carbides formed from these elements can form in a discrete and isolated morphology which reduces their impact on the alloy's toughness. This allows for increasing hard phase fraction and wear performance without embrittling the alloy. In contrast, $M_{23}C_6$, $M_7C_3$, and $M_3C$ are all examples of carbides that do not form an isolated morphology.

The volume fraction of isolated carbides is the measured as the sum, in cross section, of all carbide phases that adhere to the above composition. In the alloy of FIG. 4, the only isolated carbide is (Mo,V)C, so the volume fraction of isolated carbide is 13% [402].

In some embodiments, the isolated carbide volume fraction can be 0% (or about 0%). In some embodiments, the isolated carbide volume fraction can be ≥5% and <40% (or ≥about 5% and <about 40%). In some embodiments, the isolated carbide volume fraction can be ≥10% and <40% (or ≥about 10% and <about 40%). In some embodiments, the isolated carbide volume fraction can be ≥15% and <40% (or ≥about 15% and <about 40%). In some embodiments, the isolated carbide volume fraction can be ≥10% and <30% (or ≥about 10% and <about 30%). In some embodiments, the isolated carbide volume fraction can be ≥5% and <45% (or ≥about 5% and <about 45%). In some embodiments, the isolated carbide volume fraction can be ≥5% and <30% (or ≥about 5% and <about 30%). In some embodiments, the isolated carbide volume fraction can be ≥5% and <25% (or ≥about 5% and <about 25%). In some embodiments, the isolated carbide volume fraction can be ≥5% and <20% (or ≥about 5% and <about 20%). In some embodiments, the isolated carbide volume fraction can be ≥7.5% and <30% (or ≥about 7.5% and <about 30%). In some embodiments, the isolated carbide volume fraction can be ≥7.5% and <25% (or ≥about 7.5% and <about 25%). In some embodiments, the isolated carbide volume fraction can be ≥10% and <30% (or ≥about 10% and <about 30%). In some embodiments, the isolated carbide volume fraction can be ≥10% and <25% (or ≥about 10% and <about 25%). In some embodiments, the isolated carbide volume fraction can be ≥12.5% and <25% (or ≥about 12.5% and <about 25%). In some embodiments, the isolated carbide volume fraction can be ≥12.5% and <20% (or ≥about 12.5% and <about 20%).

In some embodiments the isolated carbides may comprise predominantly vanadium as the metallic component. These will be known as vanadium carbides defined as MC type carbides where M comprises ≥50% vanadium (or ≥about 50% vanadium) formed at lower temperatures facilitating the manufacture of powder, castings, and other components. Vanadium also is a cost effective alloying addition relative to its contribution to wear resistance.

The volume fraction of vanadium carbides is the measured as the sum of all MC type carbides that meet the above chemistry limitation. This criteria is measured at using a range of techniques including x-ray diffraction and quantitative microscopy to determine the volume fraction.

In some embodiments, the vanadium carbide volume fraction can be 0% (or about 0%). In some embodiments, the vanadium carbide volume fraction can be ≥5% and <40% (or ≥about 5% and <about 40%). In some embodiments, the vanadium carbide volume fraction can be ≥10% and <40% (or ≥about 10% and <about 40%). In some embodiments, the vanadium carbide volume fraction can be ≥15% and <40% (or ≥about 15% and <about 40%). In some embodiments, the vanadium carbide volume fraction can be ≥10% and <30% (or ≥about 10% and <about 30%). In some embodiments, the vanadium carbide volume fraction can be ≥5% and <45% (or ≥about 5% and <about 45%). In some embodiments, the vanadium carbide volume fraction can be ≥5% and <30% (or ≥about 5% and <about 30%). In some embodiments, the vanadium carbide volume fraction can be ≥5% and <25% (or ≥about 5% and <about 25%). In some embodiments, the vanadium carbide volume fraction can be ≥5% and <20% (or ≥about 5% and <about 20%). In some embodiments, the vanadium carbide volume fraction can be ≥7.5% and <30% (or ≥about 7.5% and <about 30%). In some embodiments, the vanadium carbide volume fraction can be ≥7.5% and <25% (or ≥about 7.5% and <about 25%). In some embodiments, the vanadium carbide volume fraction can be ≥10% and <30% (or ≥about 10% and <about 30%). In some embodiments, the vanadium carbide volume fraction can be ≥10% and <25% (or ≥about 10% and <about 25%). In some embodiments, the vanadium carbide volume fraction can be ≥12.5% and <25% (or ≥about 12.5% and <about 25%). In some embodiments, the vanadium carbide volume fraction can be ≥12.5% and <20% (or ≥about 12.5% and <about 20%).

Microstructural criteria can correlate very closely with thermodynamic criteria. For example, the alloy B: 1.4, C: 1.9, Mo: 14, V: 10, Fe: balance, has a calculated complex boride mole fraction of 17% and a vanadium carbide mole fraction of 18%. Using quantitative scanning electron microscopy, the volume fraction of complex boride was measured at 20% and vanadium carbide at 14%.

The next microstructural criterion is the total hard phase volume fraction. Hard phases in this instance are borides, borocarbides, nitrides, carbides, oxides, silicides, laves phases, aluminides, and carbonitrides. In some instances, in this alloy space, it can be advantageous to have additional hard phases to complement the complex borides. This allows for fine tuning the microstructure and alloy properties. For example, carbides may be added to the microstructure to further increase the hard phase fraction and as a result the wear performance of the alloy without substantially changing the morphology of the complex borides or other phases. This can allow for an alloy with even more wear performance than provided by complex borides or borocarbides alone.

The total hard phase volume fraction is measured as the sum of all hard phases, where a hard phase is any phase with a hardness ≥1000 HV. In FIG. 4 this is calculated as the sum of the lightest phase 20% [401] and the darkest phase (Mo,V)C 13% [402]. The total hard phase volume fraction of the alloy in FIG. 4 is 33% meeting some of the embodiments.

In some embodiments, the total hard phase volume fraction can be ≥5% (or ≥about 5%). In some embodiments, the total hard phase volume fraction can be ≥10% (or ≥about 10%). In some embodiments, the total hard phase volume fraction can be ≥15% (or ≥about 15%). In some embodiments, the total hard phase volume fraction can be ≥20% (or ≥about 20%). In some embodiments, the total hard phase volume fraction can be ≥25% (or ≥about 25%). In some embodiments, the total hard phase volume fraction can be ≥30% (or ≥about 30%). In some embodiments, the total hard phase volume fraction can be ≥35% (or ≥about 35%).

The next microstructural criterion is the volume fraction of embrittling hard phase. In this disclosure, embrittling hard phase is the sum of $M_{23}(C,B)_6$, $M_7(C,B)_3$, and $M_3(C,B)$ that form before the solidus and where M is ≥75 wt % Fe (or ≥about 75 wt % Fe). These phases are identified by EBSD, XRD, and/or EDX. These hard phases form an interconnected morphology that can embrittle the alloy reducing impact performance and toughness.

The volume fraction of embrittling hard phase is measured as the sum of $Fe2B$, $M_{23}(C,B)_6$, $M_7(C,B)_3$, and $M_3(C,B)$ in cross section. In FIG. 4 there are none of these phases present at the solidus so the value is 0%.

In some embodiments, the embrittling hard phase volume fraction can be ≤10% (or ≤about 10%). In some embodiments, the embrittling hard phase volume fraction can be ≤5% (or ≤about 5%). In some embodiments, the embrittling hard phase volume fraction can be ≤3% (or ≤about 3%). In some embodiments, the embrittling hard phase volume fraction can be 0% (or about 0%)

Powder Manufacture

It is often advantageous to manufacture an alloy into a powder as an intermediary step in producing a bulk product or applying a coating to a substrate. Powder can be manufactured via atomization or other manufacturing methods. The feasibility of such a process for a particular alloy is often a function of the alloy's solidification behavior and thus its thermodynamic characteristics.

To make a production of powder for processes such as PTA, HVOF, laser welding, and other powder metallurgy processes, it can be advantageous to be able to manufacture the powder at high yields in the size range specified above. The manufacturing process can include forming a melt of the alloy, forcing the melt through a nozzle to form a stream of material, and spraying water or air at the produced stream of the melt to solidify it into a powder form. The powder is then sifted to eliminate any particles that do not meet the specific size requirements.

Embodiments of the disclosed alloys can be produced as powders in high yields to be used in such processes. On the other hand, many alloys, such as those described in Wallin and other common wear resistant materials, would have low yields due to their properties, such as their thermodynamic properties, when atomized into a powder. Thus, they would not be suitable for powder manufacture.

The manufacturability is commonly characterized by the yield of intended powder size produced during the manufacturing process. In some embodiments, the alloy can be manufactured into a 53-180 μm (or about 53 to about 180 μm) powder size distribution at a 50% (or about 50%) or greater yield. In some embodiments, the alloy can be manufactured into a 53-180 μm (or about 53 to about 180 μm) powder size distribution at a 60% (or about 60%) or greater yield. In some embodiments, the alloy can be manufactured into a 53-180 μm (or about 53 to about 180 μm) powder size distribution at a 70% (or about 70%) or greater yield.

Wire Manufacture

It is often beneficial to manufacture an alloy into a wire as a feedstock for protecting a hardfacing coating via GMAW, GTAW, hot wire GTAW, OAW, SAW, laser cladding, and other application methods. Hardfacing wire is typically produced using a cored wire process where a metal strip is rolled around a core or fill of alloy powder. The resulting chemistry of the wire can match the specific embodiments elsewhere in this disclosure.

The price and feasibility of such a manufacturing process is a function of the achievable powder fill to metal strip ratio. This ratio varies based on the wire size and other factors. Additionally, different wires may be used for different application processes. Typically these processes will all produce a variable range of dilution when applied.

Alloys in this disclosure may be formulated into a wire such that a 5 to 50% (or about 5 to about 50%) dilution range will produce an alloy that meets the specific thermodynamic and microstructural embodiments. In some embodiments, a 5 to 15% (or about 5 to about 15%) dilution range will produce an alloy that meets the specific thermodynamic and microstructural embodiments. In some embodiments, a 10 to 25% (or about 10 to about 25%) dilution range will produce an alloy that meets the specific thermodynamic and microstructural embodiments. In some embodiments, a 15 to 35% (or about 15 to about 35%) dilution range will produce an alloy that meets the specific thermodynamic and microstructural embodiments. In some embodiments, a 20 to 40% (or about 20 to about 40%) dilution range will produce an alloy that meets the specific thermodynamic and microstructural embodiments. In some embodiments, a 25 to 35% (or about 25 to about 35%) dilution range will produce an alloy that meets the specific thermodynamic and microstructural embodiments.

Alloys in this disclosure may also be formulated to achieve the maximum possible fill possible for a given wire size. The wires may also be formulated to use ferro alloy powder additions to the core to reduce price. These ferro alloy additions may comprise all or a portion of the core fill.

Performance

Wear resistant alloys are often described by their performance in laboratory testing. The disclosed tests correlate well with wear resistant components in service.

In some embodiments, the alloy hardness can be ≥55HRC (or ≥about 55HRC). In some embodiments the alloy hardness can be ≥58HRC (or ≥about 58HRC). In some embodiments, the alloy hardness is ≥60HRC (or ≥about 60HRC). In some embodiments the alloy hardness can be ≥62HRC (or ≥about 62HRC). In some embodiments, the alloy hardness can be ≥64HRC (or ≥about 64HRC).

In some embodiments the alloy has an ASTM G65 procedure A mass loss ≤0.2 g (or ≤about 0.2 g). In some embodiments the alloy has an ASTM G65 procedure A mass loss ≤0.16 g (or ≤about 0.16 g). In some embodiments the alloy has an ASTM G65 procedure A mass loss ≤0.12 g (or ≤about 0.12 g). In some embodiments the alloy has an ASTM G65 procedure A mass loss ≤0.1 g (or ≤about 0.1 g). In some embodiments the alloy has an ASTM G65 procedure A mass loss ≤0.08 g (or ≤about 0.08 g).

Heat Treatment and Performance

Across many applications, especially those in mining and other industries, it can be advantageous to hardface a quench and temper type of steel to provide additional wear protection. The process of hardfacing yields a heat affected zone in the quench and temper substrate that may reduce the substrate yield strength and toughness. This reduction in toughness can lead to component failure due to impact or excessive stress during operation.

To combat this failure mechanism, alloys in this disclosure may be formulated to have similar performance both as welded and after a quench and temper cycle. These alloys maintain similar hardness and high wear resistance when subjected to the industry standard ASTM G65 testing.

Table 12 describes the results of wear testing a hardfacing deposit produced with a nominal bulk wire chemistry of B: 2.2, C: 2.8, Mn: 1, Mo: 17.7, Ni: 1.7 Si: 0.5, and V: 12. Samples of this hardfacing layer were subjected to a range of austenitizing temperatures for 2 hours then quenched in water. Then the samples were tempered at 150 C for 5 hours. Included for reference is the standard ASTM G65 range for hardfacing produced using this feedstock wire. This demonstrates that alloys in this space may be readily selected to yield high wear resistance before and after a range of heat treatment cycles.

TABLE 12

| Wear Testing Results | |
| --- | --- |
| Austenitizing Temperature (deg C.) | ASTM G65 Mass Loss (g) |
| None (Standard Range) | 0.056-0.090 |
| 850 | 0.078 |
| 875 | 0.081 |

TABLE 12-continued

| Wear Testing Results | |
| --- | --- |
| Austenitizing Temperature (deg C.) | ASTM G65 Mass Loss (g) |
| 900 | 0.080 |
| 925 | 0.073 |
| 950 | 0.072 |

Ingots of an alloy described in this disclosure were compared to two commercially available chromium bearing alloys before and after an austenitizing and quenching cycle. Table 13 describes the hardness of each alloy before and after austenitizing at 900 degree C. for 2 hours followed by and oil quench. The chemistries below are in weight percent with the balance iron. This chart demonstrates that alloys in this disclosure may have the same or similar hardness before and after a heat treat cycle. Table 13 demonstrates that the retention of hardness after heat treatment is not an inherent characteristic of hardfacing alloy comprising C and B.

TABLE 13

| Hardness before and after austenitizing | | | | | | | | | | | | | |
| --- | --- | --- | --- | --- | --- | --- | --- | --- | --- | --- | --- | --- | --- |
| Alloy | Initial Hardness (HRC) | Hardness after Quenching (HRC) | B | C | Cr | Mn | Mo | Nb | Ni | Si | Ti | V | W |
| Q #1 | 67 | 67 | 1.9 | 2.4 | 0 | 0 | 15.25 | 0 | 1.5 | 0 | 0 | 10.5 | 0 |
| Vecalloy 700 | 64 | 60 | 1.05 | 1.37 | 4.80 | 0.20 | 0 | 5.00 | | 0.50 | 0.50 | 2.0 | 10 |
| Vecalloy 752 | 67 | 62 | 4 | 1.08 | 11.29 | 1 | 12.25 | 3.4 | 0 | 0.5 | 1.5 | 0 | 0 |

Welding and Performance

Alloys described in this disclosure may have improved toughness, impact, and wear resistance over conventional hardfacing materials. The below Table 14 describes the testing results of two alloys described in this disclosure, I #1 and I #2, along with two commercially available and chromium bearing hardfacing materials, standard #1 and standard #2. These materials were welded using standard welding procedures to produce a deposit 25 mm wide by 6 mm thick. The welded samples were then tested for hardness, wear resistance according to ASTM G65 testing, and impacts until failure when subjected to 20 J of impact energy.

The wire feedstock designated as alloy I #1 has a nominal chemistry of B: 1.8, C: 2.2, Mn: 1, Mo: 15, Ni: 1.5, Si: 0.5, V: 9.35, Fe: balance. Alloy I #2 wire has a nominal chemistry B: 2.2, C: 2.8, Mn: 1, Mo: 17.7, Ni: 1.7, Si: 0.5, V: 12, Fe: balance. Standard #1 wire has a nominal chemistry of C: 5.0, Cr: 23, Mn: 2.0, Si: 1.0, Fe: balance. Standard #2 is sold commercially as SHS 9192 and has a measured chromium content using glow discharge spectroscopy of 16%. According to the data sheet of SHS 9192, the material has a chemistry of: Chromium<20% Molybdenum<10% Niobium<10% Tungsten<10% Aluminum<5% Boron<5% Carbon<5% Manganese<5% Silicon<2% Iron Balance. Table 14 demonstrates that the disclosed impact resistance is not an inherent characteristic of hardfacing alloys.

TABLE 14

Performance Testing Results

| Alloy | Wire Size (mm) | Impact to Failure | Astm G65 (gloss) | HRC | Voltage | Stickout (in) | Amperage | Wire Feed (in/min) | Deposit width (mm) | Thickness (mm) |
|---|---|---|---|---|---|---|---|---|---|---|
| I #1 | 1.6 | 9800 | 0.072 | 65 | 26 | 1.125 | 220 | 260 | 25 | 6 |
| I #2 | 2.8 | 10500 | 0.066 | 66 | 26.5 | 1.5 | 430 | 235 | 25 | 6 |
| Standard #1 | 1.6 | 2195 | 0.12 | 60 | 26 | 1.125 | 240 | 260 | 25 | 6 |
| Standard #2 | 1.6 | 965 | 0.062 | 65 | 24 | 1.125 | 200 | 275 | 25 | 6 |

Applications

The alloys described in this patent can be used in a variety of applications and industries. Some non-limiting examples of applications of use include:

Surface Mining applications include the following components and coatings for the following components: Wear resistant sleeves and/or wear resistant hardfacing for slurry pipelines, mud pump components including pump housing or impeller or hardfacing for mud pump components, ore feed chute components including chute blocks or hardfacing of chute blocks, separation screens including but not limited to rotary breaker screens, banana screens, and shaker screens, liners for autogenous grinding mills and semi-autogenous grinding mills, ground engaging tools and hardfacing for ground engaging tools, wear plate for buckets and dumptruck liners, heel blocks and hardfacing for heel blocks on mining shovels, grader blades and hardfacing for grader blades, stacker reclaimers, sizer crushers, general wear packages for mining components and other comminution components.

Downstream oil and gas applications include the following components and coatings for the following components: Downhole casing and downhole casing, drill pipe and coatings for drill pipe including hardbanding, mud management components, mud motors, fracking pump sleeves, fracking impellers, fracking blender pumps, stop collars, drill bits and drill bit components, directional drilling equipment and coatings for directional drilling equipment including stabilizers and centralizers, blow out preventers and coatings for blow out preventers and blow out preventer components including the shear rams, oil country tubular goods and coatings for oil country tubular goods.

Upstream oil and gas applications include the following components and coatings for the following components: Process vessels and coating for process vessels including steam generation equipment, amine vessels, distillation towers, cyclones, catalytic crackers, general refinery piping, corrosion under insulation protection, sulfur recovery units, convection hoods, sour stripper lines, scrubbers, hydrocarbon drums, and other refinery equipment and vessels.

Pulp and paper applications include the following components and coatings for the following components: Rolls used in paper machines including yankee dryers and other dryers, calendar rolls, machine rolls, press rolls, digesters, pulp mixers, pulpers, pumps, boilers, shredders, tissue machines, roll and bale handling machines, doctor blades, evaporators, pulp mills, head boxes, wire parts, press parts, M.G. cylinders, pope reels, winders, vacuum pumps, deflakers, and other pulp and paper equipment, Power generation applications include the following components and coatings for the following components: boiler tubes, precipitators, fireboxes, turbines, generators, cooling towers, condensers, chutes and troughs, augers, bag houses, ducts, ID fans, coal piping, and other power generation components.

Agriculture applications include the following components and coatings for the following components: chutes, base cutter blades, troughs, primary fan blades, secondary fan blades, augers, sugar cane harvesting, sugar cane milling operations, and other agricultural applications.

Construction applications include the following components and coatings for the following components: cement chutes, cement piping, bag houses, mixing equipment and other construction applications Machine element applications include the following components and coatings for the following components: Shaft journals, paper rolls, gear boxes, drive rollers, impellers, general reclamation and dimensional restoration applications and other machine element applications Steel applications include the following components and coatings for the following components: cold rolling mills, hot rolling mills, wire rod mills, galvanizing lines, continue pickling lines, continuous casting rolls and other steel mill rolls, and other steel applications.

The alloys described in this patent can be produced and or deposited in a variety of techniques effectively. Some non-limiting examples of processes include:

Thermal spray process including those using a wire feedstock such as twin wire arc, spray, high velocity arc spray, combustion spray and those using a powder feedstock such as high velocity oxygen fuel, high velocity air spray, plasma spray, detonation gun spray, and cold spray. Wire feedstock can be in the form of a metal core wire, solid wire, or flux core wire. Powder feedstock can be either a single homogenous alloy or a combination of multiple alloy powder which result in the desired chemistry when melted together.

Welding processes including those using a wire feedstock including but not limited to metal inert gas (MIG) welding, tungsten inert gas (TIG) welding, arc welding, submerged arc welding, open arc welding, bulk welding, laser cladding, and those using a powder feedstock including but not limited to laser cladding and plasma transferred arc welding. Wire feedstock can be in the form of a metal core wire, solid wire, or flux core wire. Powder feedstock can be either a single homogenous alloy or a combination of multiple alloy powder which result in the desired chemistry when melted together.

Casting processes including processes typical to producing cast iron including but not limited to sand casting, permanent mold casting, chill casting, investment casting, lost foam casting, die casting, centrifugal casting, glass casting, slip casting and process typical to producing wrought steel products including continuous casting processes.

Post processing techniques including but not limited to rolling, forging, surface treatments such as carburizing, nitriding, carbonitriding, boriding, heat treatments including but not limited to austenitizing, normalizing, annealing, stress relieving, tempering, aging, quenching, cryogenic treatments, flame hardening, induction hardening, differential hardening, case hardening, decarburization, machining, grinding, cold working, work hardening, and welding.

From the foregoing description, it will be appreciated that inventive products and approaches for chromium free and low-chromium alloys are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A low chromium or chromium-free ferrous alloy comprising less than or equal to about 1 wt. % chromium, C: about 2.0 to about 2.85 wt. %, and B: about 1.6 to about 2.2 wt. %, wherein the alloy is formed into or configured to form a welded material comprising, under equilibrium solidification conditions:
   a total mole fraction of transition metal borides and borocarbides of between about 10 and about 30%, wherein a metallic portion of the transition metal borides and borocarbides comprises greater than or equal to about 15 wt. % W+Mo; and
   a mole fraction of isolated carbides in the material between about 10 and about 25%, wherein isolated carbides are defined as MC carbides, wherein MC carbides comprise V and may optionally comprise one or more of the following elements: Ti, Nb, Zr, Hf, W, Mo;
   wherein the isolated carbides have a metallic component greater than or equal to about 50 wt. % vanadium;
   wherein the welded material demonstrates an impact resistance of surviving about 9,800 or greater 20 Joule impacts without failure; and
   wherein a hardness of the welded material remains substantially the same or greater after austenitizing at 900° C. for 2 hours followed by and oil quench as compared to a deposited hardness.

2. The alloy of claim 1, comprising less than or equal to about 0.01 wt. % chromium.

3. The alloy of claim 1, wherein a mole fraction of an embrittling hard phase in the material comprising $Fe_2B$, $M_{23}(C,B)_6$, $M_7(C,B)_3$, and $M_3(C,B)$ is less than or equal to about 10% when measured at a matrix solidus temperature, wherein M is greater than or equal to about 75 wt. % Fe.

4. The alloy of claim 1, wherein the metallic portion of the transition metal borides and borocarbides comprise greater than or equal to about 35 wt. % W+Mo.

5. The alloy of claim 1, wherein an FCC-BCC transition temperature of the material under equilibrium solidification conditions is less than or equal to about 1300K.

6. The alloy of claim 1, wherein a melt range of the material under equilibrium solidification conditions is less than or equal to about 250° C., melt range being defined as the difference between a formation temperature of a first hard phase to solidify and a matrix liquidus temperature.

7. The alloy of claim 1, wherein the deposited hardness of the material is greater than or equal to about 55HRC, and wherein the hardness of the material after austenitizing and quenching is greater than or equal to about 55HRC.

8. The alloy of claim 1 manufactured into a powder, wire, casting, and/or hardfacing layer for wear protection.

9. The alloy of claim 1, comprising, in weight percent, Fe and:
Mo+W: about 2.1 to about 25; and
wherein a weight ratio of Mo+1.9*W to B is between 6 and 10.25.

10. The alloy of claim 1, where the alloy comprises, in weight percent, Fe and:
B: 1.64, C: 2, Mo: 13.6, V: 8.5;
B: 1.8, C: 2.2, Mo: 15, V: 9.35;
B: 2.2, C: 2.8, Mo: 17.7, V: 12;
B: 2.05, C: 2.6, Mo: 16.3, V: 11.1;
B: 1.64, C: 2, Mn: 1, Mo: 13.6, Ni: 1.3, Si: 0.5 V: 8.5;
B: 1.8, C: 2.2, Mn: 1, Mo: 15, Ni: 1.5, Si: 0.5, V: 9.35;
B: 2.2, C: 2.8, Mn: 1, Mo: 17.7, Ni: 1.7; Si: 0.5, V_12;
B: 2.05, C: 2.6, Mn: 1, Mo: 16.3, Ni: 1.6, Si: 0.5, V11.1;
B: 2.0, C: 2.8, Mo: 18, V: 13;
B: 2.0, C: 2.8, Mo: 18, V: 11.5;
B: 1.85, C: 2.6, Mo: 18, V: 12;
B: 2.0, C: 2.8, Mn: 0.5, Mo: 18, Ni: 1.5, Si: 0.5, V: 13;
B: 2.0, C: 2.8, Mn: 0.5, Mo: 18, Ni: 1.5, Si: 0.5, V: 11.5; or
B: 1.85, C: 2.6, Mn: 0.5, Mo: 18, Ni: 1.5, Si: 0.5, V: 12;
wherein W may be substituted for Mo at about a 1:1 molar ratio.

11. Mining equipment incorporating the alloy of claim 1 for wear protection.

12. The mining equipment of claim 11, wherein the mining equipment comprises ground engaging tools, work tools, lip shrouds, cutting edges, blades, wear plates, and comminution equipment.

13. A low chromium or chromium free ferrous alloy comprising less than or equal to about 1 wt. % chromium, C: about 2.0 to about 2.85 wt. %, and B: about 1.6 to about 2.2 wt. %, wherein the alloy is formed into or configured to form a welded material comprising:
a total volume fraction of transition metal borides and borocarbides of between about 10 and about 30%, wherein a metallic portion of the transition metal borides and borocarbides comprises greater than or equal to about 15 wt. % W+Mo; and
a volume fraction of isolated carbides in the material between about 10 and about 25%, wherein isolated carbides are defined as MC carbides, wherein MC carbides comprise V and may optionally comprise one or more of the following elements: Ti, Nb, Zr, Hf, W, Mo;
wherein the isolated carbides have a metallic component greater than or equal to about 50 wt. % vanadium;
wherein the welded material demonstrates an impact resistance of surviving about 9,800 or greater 20 Joule impacts without failure; and
wherein a hardness of the welded material remains substantially the same or greater after austenitizing at 900° C. for 2 hours followed by and oil quench as compared to a deposited hardness.

14. The alloy of claim 13, wherein the alloy comprises less than or equal to about 0.01 wt. % chromium.

15. The alloy of claim 13, where a volume fraction of embrittling hard phase of the material is less than or equal to about 10%, where embrittling hard phases comprise $Fe_2B$, $M_{23}(C,B)_6$, $M_7(C,B)_3$, and $M_3(C,B)$ where M is greater than or equal to about 75 wt. % Fe.

16. The alloy of claim 13, wherein the deposited hardness of the material is greater than or equal to about 55HRC, and wherein the hardness of the material after austenitizing and quenching is greater than or equal to about 55HRC.

17. The alloy of claim 13 comprising, in weight percent, Fe and:
Mo+W: about 2.1 to about 25; and
wherein a weight ratio of Mo+1.9*W to B is between 6 and 10.25.

18. The alloy of claim 13, wherein the alloy comprises, in weight percent, Fe and:
B: 1.64, C: 2, Mo: 13.6, V: 8.5;
B: 1.8, C: 2.2, Mo: 15, V: 9.35;
B: 2.2, C: 2.8, Mo: 17.7, V: 12;
B: 2.05, C: 2.6, Mo: 16.3, V: 11.1;
B: 1.64, C: 2, Mn: 1, Mo: 13.6, Ni: 1.3, Si: 0.5 V: 8.5;
B: 1.8, C: 2.2, Mn: 1, Mo: 15, Ni: 1.5, Si: 0.5, V: 9.35;
B: 2.2, C: 2.8, Mn: 1, Mo: 17.7, Ni: 1.7; Si: 0.5, V12;
B: 2.05, C: 2.6, Mn: 1, Mo: 16.3, Ni: 1.6, Si: 0.5, V11.1;
B: 2.0, C: 2.8, Mo: 18, V: 13;
B: 2.0, C: 2.8, Mo: 18, V: 11.5;
B: 1.85, C: 2.6, Mo: 18, V: 12;
B: 2.0, C: 2.8, Mn: 0.5, Mo: 18, Ni: 1.5, Si: 0.5, V: 13;
B: 2.0, C: 2.8, Mn: 0.5, Mo: 18, Ni: 1.5, Si: 0.5, V: 11.5; or
B: 1.85, C: 2.6, Mn: 0.5, Mo: 18, Ni: 1.5, Si: 0.5, V: 12;
wherein W may be substituted for Mo at about a 1:1 molar ratio.

19. The alloy of claim 1, wherein the hardness of the welded material remains substantially the same after austenitizing at 900° C. for 2 hours followed by and oil quench as compared to the deposited hardness.

20. The alloy of claim 13, wherein the hardness of the welded material remains substantially the same after austenitizing at 900° C. for 2 hours followed by and oil quench as compared to the deposited hardness.

* * * * *